United States Patent
Dunham et al.

(10) Patent No.: US 12,507,679 B2
(45) Date of Patent: Dec. 30, 2025

(54) ENGINEERED CATFISH AND USES THEREOF

(71) Applicant: AUBURN UNIVERSITY, Auburn, AL (US)

(72) Inventors: Rex A. Dunham, Auburn, AL (US); Michael Coogan, Auburn, AL (US); Roger Cone, Ann Arbor, MI (US); Veronica Alston, Auburn, AL (US)

(73) Assignee: AUBURN UNIVERSITY, Auburn, AL (US)

( * ) Notice: Subject to any disclaimer, the term of this patent is extended or adjusted under 35 U.S.C. 154(b) by 0 days.

(21) Appl. No.: 17/723,159

(22) Filed: Apr. 18, 2022

(65) Prior Publication Data
US 2022/0338453 A1    Oct. 27, 2022

Related U.S. Application Data

(60) Provisional application No. 63/176,105, filed on Apr. 16, 2021, provisional application No. 63/176,067, filed on Apr. 16, 2021.

(51) Int. Cl.
*A01K 67/0276* (2024.01)
*A23K 10/22* (2016.01)
*C12Q 1/68* (2018.01)

(52) U.S. Cl.
CPC .......... *A01K 67/0276* (2013.01); *A23K 10/22* (2016.05); *A01K 2217/054* (2013.01); *A01K 2227/40* (2013.01); *C12Q 1/68* (2013.01)

(58) Field of Classification Search
CPC .......... A01K 67/0276; A01K 2217/054; A01K 2227/40; A01K 2267/02; A23K 10/22; C12Q 1/68; C07K 14/723; C12N 2310/20; C12N 15/11; C12N 15/90
See application file for complete search history.

(56) References Cited

U.S. PATENT DOCUMENTS

| | | | |
|---|---|---|---|
| 2018/0064077 A1* | 3/2018 | Dunham | C12N 15/90 |
| 2020/0253173 A1 | 8/2020 | Kinoshita et al. | |

FOREIGN PATENT DOCUMENTS

| | | | |
|---|---|---|---|
| CN | 1831136 A | 9/2006 | |
| CN | 102653756 A | 9/2012 | |
| CN | 106191114 B * | 2/2020 | A01K 67/0276 |
| WO | 2006002902 A2 | 1/2006 | |

OTHER PUBLICATIONS

Khalil et al, Scientific Reports, 7:7301, 2017 (Year: 2017).*
Morita, Hitoshi, et al. "Exogenous gene integration mediated by genome editing technologies in zebrafish." Bioengineered 8.3 (2017): 287-295. (Year: 2017).*
Khalil, Karim, et al. "Editing the melanocortin-4 receptor gene in channel catfish using the CRISPR-cas9 system." Fishes 8.2 (2023): 116. (Year: 2023).*
Khalil, et al., "Generation of Myostatin Gene-Edited Channel Catfish (*Ictalurus punctatus*) via Zygote Injection of CRISPR/Cas9 System," Scientific Reports, 7:7301 (Aug. 4, 2017); all enclosed pages cited.
Kincaid, et al., "Three Generations of Selection for Growth Rate in Fall-Spawning Rainbow Trout," Trans. Am Fish Soc., vol. 106, No. 6, 1977, all enclosed pages cited.
Kocabas, et al., Molecular characterization and differential expression of the myostatin gene in channel catfish (*Ictalurus punctatus*), Biochimica et Biophysica Acta 1575 (2002), all enclosed pages cited.
Koch, et al., "Generation and validation of homozygous fluorescent knock-in cells using CRISPR/Cas9 genome editing," Nat Protoc. Jun. 2018 ; 13(6): 1465-1487. doi:10.1038/nprot.2018.042.
Kurita, et al., "Transgenic zebrafish produced by retroviral infection of in vitro-cultured sperm," PNAS, Feb. 3, 2004, vol. 101, No. 5, all enclosed pages cited.
Lauwers, et al., "Post-transcriptional Regulation of Genes Encoding Anti-microbial Peptides in *Drosophila*," The Journal of Biological Chemistry vol. 284, No. 13, pp. 8973-8983, Mar. 27, 2009.
Lee, et al., "Antibacterial peptides from pig intestine: Isolation of a mammalian cecropin," Proc. Nati. Acad. Sci. vol. 86, pp. 9159-9162, Dec. 1989.
Li et al., "A deletion in the Hermansky-Pudlak syndrome 4 (Hps4) geneappears to be responsible for albinism in channel catfish," Mol Genet Genomics (2017) 292:663-670.
Li, et al., "Salt Sensitive Tet-Off-Like Systems to Knockdown Primordial Germ Cell Genes for Repressible Transgenic Sterilization in Channel Catfish, *Ictalurus punctatus*," Mar. Drugs 2017, 15, 155; doi:10.3390/md15060155.
Li, et al., "Repressible Transgenic Sterilization in Channel Catfish, *Ictalurus punctatus*, by Knockdown of Primordial Germ Cell Genes with Copper-Sensitive Constructs," Marine Biotechnology (2018) 20:324-342 https://doi.org/10.1007/s10126-018-9819-3.
Liang, et al., "Molecular cloning and characterization of cecropin from the housefly (*Musca domestica*) and its expression in *Escherichia coli*," Developmental and Comparative Immunology 30 (2006), all enclosed pages cited.
Liu, et al., "Efficient genome editing using CRISPR/Cas9 ribonucleoprotein approach in cultured Medaka fish cells," Biology Open (2018) 7, bio035170. doi:10.1242/bio.035170.
Livak, et al., "Analysis of Relative Gene Expression Data Using Real-Time Quantitative PCR and the 2-AACT Method," Methods 25, (2001), all enclosed pages cited.
Lv, et al., "Correlation between sheep YAP1 temporal and spatial expression trends and MSTN and MyoG gene expression," Genetics and Molecular Research 14 (2): 3244-3256 (2015).

(Continued)

*Primary Examiner* — Kara D Johnson
*Assistant Examiner* — Constantina E Stavrou
(74) *Attorney, Agent, or Firm* — Quarles & Brady, LLP

(57) ABSTRACT

Descried in certain example embodiments herein are engineered fish, particularly engineered catfish, that are engineered to contain modified myostatin, melanocortin-4 receptor, and/or one or more n-3 fatty acid biosynthesis pathway genes and/or gene products.

13 Claims, 11 Drawing Sheets
Specification includes a Sequence Listing.

(56) References Cited

OTHER PUBLICATIONS

Lv, et al., "Efficient Generation of Myostatin Gene Mutated Rabbit by CRISPR/Cas9," Scientific Reports, 6:25029, DOI:10.1038/srep25029, all enclosed pages cited.
Loch, et al., "Antimicrobial peptides extend lifespan in *Drosophila*," PLOS One, https://doi.org/10.1371/journal.pone.0176689, May 17, 2017, all enclosed pages cited.
Maccatrozzo, et al., "Characterization of the Myostatin Gene in the Gilthead Seabream (*Sparus aurata*): Sequence, Genomic Structure, and Expression Pattern," Mar. Biotechnol. 3, 224-230, 2001.
Metalfe, et al., "Growth versus lifespan: perspectives from evolutionary ecology," Experimental Gerontology 38 (2003), all enclosed pages cited.
Mcpherron, et al., "Double muscling in cattle due to mutations in the myostatin gene," Proc. Natl. Acad. Sci.vol. 94, pp. 12457-12461, Nov. 1997.
Mosher, et al., "A Mutation in the Myostatin Gene Increases Muscle Mass and Enhances Racing Performance in Heterozygote Dogs," PLOS Genetics, May 2007, vol. 3, Issue 5, all enclosed pages cited.
Muir, et al, "Possible ecological risks of transgenic organism release when transgenes affect mating success: Sexual selection and the Trojan gene hypothesis," PNAS, Nov. 23, 1999, vol. 96, No. 24, all enclosed pages cited.
Østbye, et al., "Myostatin (MSTN) gene duplications in Atlantic salmon (*Salmo salar*): Evidence for different selective pressure on teleost MSTN-1 and -2," Gene 403 (2007) all enclosed pages cited.
Peterman, "Direct Economic Impact of Fish Diseases on the East Mississippi Catfish Industry," North American Journal of Aquaculture 81:222-229, 2019.
Pfaffl, et al., "Relative expression software tool (RESTO) for group-wise comparison and statistical analysis of relative expression results in real-time PCR," Nucleic Acids Research, 2002, vol. 30, No. 9 e36, all enclosed pages cited.
Phelps, et al., "Effects of temperature on the induced spawning of channel catfish and the production of channel x blue catfish hybrid fry," Aquaculture 273 (2007), all enclosed pages cited.
Pillai, et al., "Cecropin P1 and novel nematode cecropins: a bacteria-inducible antimicrobial peptide family in the hematode Ascaris suum," Biochem. J. (2005) 390, 207-214.
Plumb, et al., "Health Maintenance and Principal Microbial Diseases of Cultured Fishes," Health Maintenance and Principal Microbial Diseases of Cultured Fishes, Third Edition, 2011, all enclosed pages cited.
Plunkett, et al., "Generation and characterization of the antibacterial activity of a novel hybrid antimicrobial peptide comprising functional domains from different insect cecropins," Can. J. Microbiol. 55: 520-528 (2009).
Qin, et al., "Editing of the Luteinizing Hormone Gene to Sterilize Channel Catfish, *Ictalurus punctatus*, Using a Modified Zinc Finger Nuclease Technology with Electroporation," Mar Biotechnol (2016) 18:255-263.
Ranawakage, et al, "Efficient CRISPR-Cas9-Mediated Knock-In of Composite Tags in Zebrafish Using Long ssDNA as a Donor," Frontiers in Cell and Developmental Biology, Feb. 2021, vol. 8, Article 598634, all enclosed pages cited.
Schumann, et al., "Generation of knock-in primary human T cells using Cas9 ribonucleoproteins," PNAS, Aug. 18, 2015, vol. 112, No. 33, all enclosed pages cited.
Shmakov, et al., "Discovery and functional characterization of diverse Class 2 CRISPR-Cas systems," Mol Cell. Nov. 5, 2015; 60(3): 385-397. doi:10.1016/j.molcel.2015.10.008.
Simora, et al., "CRISPR/Cas9-mediated knock-in of alligator cathelicidin gene in a non-coding region of channel catfish genome," Scientific Reports 10 (2020), all enclosed pages cited.
Simora, et al., "Cathelicidins enhance protection of channel catfish, *Ictalurus punctatus*, and channel catfish ♀ × blue catfish, *Ictalurus furcatus* ♂ hybrid catfish against Edwarsiella ictaluri infection," Journal of Fish Diseases, 43, 2020, all enclosed pages cited.
Simora, et al., "Effectiveness of Cathelicidin Antimicrobial Peptide against Ictalurid Catfish Bacterial Pathogens," Journal of Aquatic Animal Health 33:178-189, 2021.
Su, et al., "Supression and restoration of primordial germ cell marker gene expression in channel catfish, *Ictalurus punctatus*, using knockdown constructs regulated by copper transport protein gene promoters: potential for reversible transgenic sterilization," Theriogenology 84 (2015), all enclosed pages cited.
Su, et al., "Effects of transgenic sterilization constructs and their repressor compounds on hatch, developmental rate and early survival of electroporated channel catfish embryos and fry," Transgenic Res (2015) 24:333-352.
Tryselius, et al., "CecC, a cecropin gene expressed during metamorphosis in *Drosophila pupae*,"Eur. J. Biochem. 204, 395-399 (1992).
Zhang, et al., "Gene Transfer, Expression and Inheritance of pRSV-Rainbow Trout-GH cDNA in the Common Carp, Cyprinus carpio (Linnaeus)," Molecular Reproduction and Development 25:3-13 (1990).
Zhong, et al., "Targeted disruption of sp7 and myostatin with CRISPR-Cas9 results in severe bone defects and more muscular cells in common carp," Scientific Reports (2016) 6, all enclosed pages cited.
"Bulking Up: Increasing Muscle Mass in Fish with Gene Editing," Sciworthy, printed from the internet Dec. 5, 2019, all enclosed pages cited.
"Japan embraces CRISPR-edited fish," Nature Biotechnology, vol. 40, Jan. 2022, all enclosed pages cited.
Dunham, "The Contribution of Genetically Improved Aquatic Organisms to Global Food Security," 1995, all enclosed pages cited.
"The State of World Fisheries and Aquaculture," FAO of the United Nations, 2020, all enclosed pages cited.
Bhattacharya, et al., "A simple genotyping method to detect small CRISPR-Cas9 induced indels by agarose gel electrophoresis," Scientific Reports (2019) 9, all enclosed pages cited.
Chisada, et al., "Myostatin-deficient medaka exhibit a double-muscling phenotype with hyperplasia and hypertrophy, which occur sequentially during post-hatch development," Developmental Biology 359 (2011), all enclosed pages cited.
Costa, et al., "General and specific combining ability in Serrasalmidae," Aquaculture Research. 2019;50:717-724.
Kishimoto, et al., "Production of a breed of red sea bream Pagrus major with an increase of skeletal muscle mass and reduced body length by genome editing with CRISPR/Cas 9," Aquaculture 495 (2018), all enclosed pages cited.
Qin, "Gene Editing of Luteinizing Hormone, Follicle-stimulating Hormone and Gonadotropinreleasing Hormone Genes to Sterilize Channel Catfish, *Ictalurus punctatus*, using Zinc Finger Nuclease, Transcription Activator-like Effector Nuclease and Clustered Regularly Interspaced Short Palindromic Repeats/Cas9 Technologies," Dissertation submitted to Auburn University Dec. 12, 2015, all enclosed pages cited.
Rahimov, et al., "Cellular and molecular mechanisms underlying muscular dystrophy," J. Cell Biol., vol. 201, No. 4, all enclosed pages cited.
Tekedar, et al., "Complete Genome Sequence of Channel Catfish Gastrointestinal Septicemia Isolate Edwardsiella tarda C07-087," Genome Announcements, Nov./Dec. 2013, vol. 1, Issue 6, all enclosed pages cited.
Tlusty, et al., "Commentary: comparing efficiency in aquatic and terrestrial animal production systems," Environ. Res. Lett. 13 (2018) 128001.
Torrans, et al., "Effect of Grading Fingerling Hybrid Catfish (♀Channel Catfish ×♂ Blue Catfish) on Growth, Production, Feed Conversion, and Food Fish Size Distribution," North American Journal of Aquaculture 80:187-192, 2018.
Varshney, et al, "High-throughput gene targeting and phenotyping in zebrafish using CRISPR/Cas9," Genome Research, 25 (2015), all enclosed pages cited.
Wang, et al., "Deletion of mstna and mstnb impairs the immune system and affects growth performance in zebrafish," Fish and Shellfish Immunology 72 (2018), all enclosed pages cited.

(56) References Cited

OTHER PUBLICATIONS

Wang, et al., "Efficient Generation of Myostatin Mutations in Pigs Using the CRISPR/Cas9 System," Scientific Reports 5(2015), all enclosed pages cited.

Wang, et al., "CRISPR/Cas9-mediated MSTN disruption and heritable mutagenesis in goats causes increased body mass," Stichting International Foundation for Animal Genetics, 49, (2017) 43-51.

Wu, et al, "Autoregulation of Neurogenesis by GDF11," Neuron, vol. 37, (2003), all enclosed pages cited.

Xia, et al., "Zebrafish slc30a10 deficiency revealed a novel compensatory mechanism of Atp2c1 in maintaining manganese homeostasis," PLOS Genetics https://doi.org/10.1371/journal.pgen.1006892 Jul. 10, 2017, all enclosed pages cited.

Ye, et al, "Associations of myostatin gene polymorphisms with performance and mortality traits in broiler chickens," Genet. Sel. Evol. 39 (2007) 73-89.

Yeh, et al., "Using CRISPR/Cas9-mediated gene editing to further explore growth and trade-off effects in myostatinmutated F4 medaka (Oryzias latipes)," Scientific Reports, 7 (2017) all enclosed pages cited.

Yoshimi, et al., "ssODN-mediated knock-in with CRISPR-Cas for large genomic regions in zygotes," NATURE COMMUNICATIONSm 7:10431, DOI: 10.1038/ncomms10431, all enclosed pages cited.

Zhang, et al., "Polymorphisms of myostatin gene (MSTN) in four goat breeds and their effects on Boer goat growth performance," Mol Biol Rep (2012) 39:3081-3087.

Zhang, et al., "Pharmacological inhibition of myostatin suppresses systemic inflammation and muscle atrophy in mice with chronic kidney disease," Faseb Journal, vol. 25 (May 2011), all enclosed pages cited.

Nowak, et al., "Evolution of genetic redundancy," Nature, vol. 388, Jul. 10, 1997, all enclosed pages cited.

Cotterill, et al., "Additive and Dominance Genetic Effects in Pinus pinaster, P. Radiata and P. elliottii and some Implications for breeding strategy," Silvae Genetica 36 5-6, (1987), all enclosed pages cited.

Chen, et al., "Transgenic Fish and its application in basic and applied research," Biotechnology Annual Review, vol. 2 (1996) all enclosed pages cited.

Dunham, et al., "Crossbreeding channel catfish for improvement of body weight in earthen ponds," Growth, vol. XLVII, No. 1 (1983), all enclosed pages cited.

Dunham, "Comparison of six generations of selection, interspecific hybridization, intraspecific crossbreeding and gene transfer for growth improvement in ictalurid catfish," Aquaculture 272S1 (2007), all enclosed pages cited.

Dunham, et al., "Transfer, expression, and inheritance of salmonid growth hormone genes in channel catfish, Ictalurus punctatus, and effects on performance traits," Molecular Marine Biology and Biotechnology (1992), 1(4/5), all enclosed pages cited.

Dunham, et al., "Enchanced bacterial disease resistance of transgenic channel catfish Ictalurus punctatus possessing cecropin genes," Mar. Biotechnol. 4, (2002) all enclosed pages cited.

Dunham, et al., "Comparison of Production Traits of NWAC103 Channel Catfish, NWAC103 Channel Catfish 3 Blue Catfish Hybrids, Kansas Select 21 Channel Catfish, and Blue Catfish Grown at Commercial Densities and Exposed to Natural Bacterial Epizootics," North American Journal of Aquaculture 70:98-106, 2008.

Heath, et al., "Maternal Effects On Offspring Size: Variation Through Early Development of Chinook Salmon," Evolution, 53(5), 1999, pp. 1605-1611.

Li, et al., Effects of myostatin inhibitory peptides supplementation on growth performance, body composition, serum biochemical indices, serum and liver immune indices of sea bass (Lateolabrax japonicas). Chinese Journal of Animal Nutrition, (2017) 29, 519-528.

Li, et al., "Characterization of a myostatin gene (MSTN1) from spotted halibut (Verasper variegatus) and association between its promoter polymorphism and individual growth performance" Comparative Biochemistry and Physiology Part B: Biochemistry and Molecular Biology, 161, 315-322.

Okasha, et al., "Recombinant Expression of Cec-B Peptide in Escherichia coli with a Significant Anticancer Effect on Hepatocellular Carcinoma," Current Pharmaceutical Biotechnology, 2021, 22, 1235-1245.

Powers, et al., Electroporation: a method for transferring genes into the gametes of zebrafish (Brachydanio rerio), channel catfish (Ictalurus punctatus), and common carp (Cyprinus carpio), MolecularMarine Biology and Biotechnology (1992) 1(4(5), 301-308.

Powers, et al., "Gene-Spliced" Fish Experiments. Nov. 8, 1991; vol. 254(5033):779. DOI: 10.1126/science.1948056.

Qin, G., 2019. Gene Editing and Hormone Therapy to Control Reproduction in Channel Catfish, Ictalurus punctatus. Doctoral dissertation, Auburn University, AL, USA.

Smitherman, R. O., & Dunham, R. A. (1985). Genetics and breeding. Channel Catfish Culture. Elsevier Scientific Publishing, Amsterdam, 283-316.

Yant, D. R., Smitherman, R. O., & Green, O. L. (1975). Production of hybrid [blue Ictalurus furcatus (Lesueur) male, channel I. Punctatus (Rafinesque) female] catfish and channel catfish in earthen ponds. M. S. Thesis, Auburn University, AL.

Abass, et al., "Genotype-environment interactions for survival and growth rate at varying levels of sodium chloride for growth hormone transgenic channel catfish (Ictalurus punctatus), channel catfish, and albino channel catfish," Aquaculture 521 (2020), all enclosed pages cited.

Abass, et al. "Effects of family and promoter on growth performance of ccGH cDNA transgenic channel catfish, Ictalurus punctatus, grown in a trough culture system," Aquaculture 536 (2021), all enclosed pages cited.

Abass, et al., "Growth Differences of Growth Hormone Transgenic Female and Male Channel Catfish, Ictalurus punctatus, Grown in Earthen Ponds to Sexual Maturation," Marine Biotechnology (2021) 23, all enclosed pages cited.

Abass, et al. "Comparison of growth performance among channel-blue hybrid catfish, ccGH transgenic channel catfish, and channel catfish in a tank culture system," Scientific Reports, (2022) 12, all enclosed pages cited.

Bart, et al., "Effects of sperm concentration and egg number on fertilization efficiency with channel catfish (Ictalurus punctatus) eggs and blue catfish (I. furcatus) spermatozoa," Department of Fisheries and Allied Aquacultures, May 10, 1995, all enclosed pages cited.

Berkeley, et al., "Maternal Age as a Determinant of Larval Growth and Survival in a Marine Fish, Sebastes melanops," Ecology, 85(5), 2004, all enclosed pages cited.

Bosworth, et al., "General and specific combining ability of male blue catfish (Ictalurus furcatus) and female channel catfish (Ictalurus punctatus) for growth and carcass yield of their F1 hybrid progeny," Aquaculture 420-421 (2014), all enclosed pages cited.

Boulanger, et al., "A Novel antimicrobial peptide with antiparasitic actvity in the blood-sucking insect Stomoxys calcitrans," The Journal of Biochemical Chemistry, vol. 277, No. 51 (2004), all enclosed pages cited.

Chakrapani, et al., "Establishing targeted carp TLR22 gene disruption via homologous recombination using CRISPR/Cas 9," Developmental and Comparative Immunology 61 (2016), all enclosed pages cited.

Chen, et al., "Viral infection upregulates myostatin promoter activity in orange-spotted grouper (Epinephelus coioides)," PLOS One, https://doi.org/10.1371/journal.pone.0186506, Oct. 16, 2017, all enclosed pages cited.

Chiang, et al., "TALENs-mediated gene disruption of myostatin produces a larger phenotype of medaka with an apparently compromised immune system," Fish & Shellfish Immunology 48 (2016), all enclosed pages cited.

Clop, et al., "A mutation creating a potential illegitimate microRNA target site in the myostatin gene affects muscularity in sheep," Nature Genetics, vol. 38, No. 7 , Jul. 2006, all enclosed pages cited.

D'Agaro, et al., "Optimizing mating schemes in fish breeding," Ital. J. Anim. Sci. vol. 6 (Suppl. 1), 2007, all enclosed pages cited.

(56) References Cited

OTHER PUBLICATIONS

DeLuna, et al., "Exposing the fitness contribution of duplicated genes," Nature Genetics, vol. 40, No. 5, May 2008, all enclosed pages cited.
DeLuna, et al., "Need-Based Up-Regulation of Protein Levels in Response to Deletion of Their Duplicate Genes," PLOS Biology, Mar. 2010, vol. 8, Issue 3, All enclosed pages cited.
de Vrieze, et al., "Efficient Generation of Knock-In Zebrafish Models for Inherited Disorders Using CRISPR-Cas9 Ribonucleoprotein Complexes," Int. J. Mol. Sci. 2021, 22, all enclosed pages cited.
Dresher, et al., "Combining Ability of Channel Catfish (*Ictalurus punctatus*) Females and Blue Catfish (*Ictalurus furcatus*) Males for Tolerance of Low," Graduate Thesis, Auburn University, May 7, 2017, all enclosed pages cited.
Dong, et al., "Heritable Targeted Inactivation of Myostatin Gene in Yellow Catfish (*Pelteobagrus fulvidraco*) Using Engineered Zinc Finger Nucleases," PLOS One, Dec. 2011, vol. 6, Issue 12, all enclosed pages cited.
Dong, et al., "Generation of Myostatin b Knockout Yellow Catfish (*Tachysurus fulvidraco*) Using Transcription Activator-Like Effector Nucleases," Zebrafish, vol. 11, No. 3, 2014, all enclosed pages cited.
Du, et al., "Molecular characterization and differential expression of the myostatin gene in Coilia nasus," Gene 543 (2014), all enclosed pages cited.
Dunham, et al., "Response to Selection and realized heritability for body weight in three strains of channel catfish, *Ictalurus punctatus*, grown in earthen ponds," Aquaculture (1983), all enclosed pages cited.
Dunham, et al., "Comparison of Mass Selection, Crossbreeding, and Hybridization for Improving Growth of Channel Catfish," The Progressive Fish-Culturist 49 (1987), all enclosed pages cited.
Dunham, et al., "Genotype-environment interactions for growth of blue, channel and hybrid catfish in ponds and cages at varying densities," Aquaculture (1990), all enclosed pages cited.
Dunham, et al., "Gene Editing in Channel Catfish via Double Electroporation of Zinc-Finger Nucleases," Methods in Molecular Biology, vol. 1867, 2018, all enclosed pages cited.
Dupont-Nivet, et al. "Effect of different mating designs on inbreeding, genetic variance and response to selection when applying individual selection in fish breeding programs," Aquaculture 252 (2006), all enclosed pages cited.
Ekengren, et al., "*Drosophila* cecropin as an antifungal agent," Insect Biochemistry and Molecular Biology 29 (1999), all enclosed pages cited.
Elaswad, et al., "Microinjection of CRISPR/Cas9 Protein into Channel Catfish, *Ictalurus punctatus*, Embryos for Gene Editing," Journal of Visualized Experiments, Jan. 2018, 131, all enclosed pages cited.
Elaswad, et al., "Effects of CRISPR/Cas9 dosage on TICAM1 and RBL gene mutation rate, embryonic development, hatchability and fry survival in channel catfish," Scientific Reports (2018) 8, all enclosed pages cited.
Entis, "Aquadvantage salmon: A case study in transgenic food," Animal Biotechnology, 9(3) (1998), all enclosed pages cited.
Fang, et al., "An optimized CRISPR/Cas9 approach for precise genome editing in neurons," eLife (2021); 10, DOI: https://doi.org/10.7554/eLife.65202; all enclosed pages cited.
Gabillard, et al., "Revisiting the paradigm of myostatin in vertebrates: insights from fishes," General and Comparative Endocrinology, 194 (2013), all enclosed pages cited.

Gao, et al., "Depletion of Myostatin b Promotes somatic growth and lipid Metabolism in Zebrafish," Frontiers in Endocrinology, Jul. 2016, vol. 7, Art. 88, all enclosed pages cited.
Gjedrem, "Genetic improvement of cold-water fish species," Aquaculture Research, 31 (2000), all enclosed pages cited.
Gjedrem, et al., "Selection and Breeding programs in Aquaculture," (2005) all enclosed pages cited.
Gratacap, et al., "Efficient CRISPR/Cas9 genome editing in a salmonid fish cell line using a lentivirus delivery system," BMC Biotechnology (2020) 20:35, all enclosed pages cited.
Green, et al., "Maternal and paternal effects determine size, growth and performance in larvae of a tropical reef fish," Marine Ecology Progress Series, vol. 289: 263-272, 2005.
Gregory, et al., "Cloning and characterization of myogenic regulatory genes in three Ictalurid species," Animal Genetics, 35 (2004), all enclosed pages cited.
Griffing, "Concept of general and specific combining ability in relation to diallel crossing systems," Division of Plant Industry, Jun. 5, 1956, all enclosed pages cited.
Guo, et al., "Myostatin Inhibition in Muscle, but Not Adipose Tissue, Decreases Fat Mass and Improves Insulin Sensitivity," PLOS One, Mar. 2009, vol. 4, Issue 3, all enclosed pages cited.
Guo, et al., "Generation and evaluation of Myostatin knock-out rabbits and goats using CRISPR/Cas9 system," Scientific Reports, 6:29855, 2016, all enclosed pages cited.
Hanson, et al., "2014 US Catfish Database," Fisheries and Allied Aquaculture Department series No. 1, all enclosed pages cited.
Helterline, et al., "Embryonic and tissue-specific regulation of myostatin-1 and -2 gene expression in zebrafish," General and Comparative Endocrinology 151 (2007), all enclosed pages cited.
Henryon, et al., "Genetic variation for growth rate, feed conversion efficiency, and disease resistance exists within a farmed population of rainbow trout," Aquaculture, (2002), all enclosed pages cited.
Hruscha, et al., "Efficient CRISPR/Cas9 genome editing with low off-target effects in zebrafish," Development (2013) 140, all enclosed pages cited.
Huang, et al., "Direct and pleiotropic effects of the Masou Salmon Delta-5 Desaturase transgene in F1 channel catfish (*Ictalurus punctatus*)," Transgenic Res (2021) 30, all enclosed pages cited.
Jao, et al., "Efficient multiplex biallelic zebrafish genome editing using a CRISPR nuclease system," PNAS vol. 110, No. 34, Aug. 20, 2013, all enclosed pages cited.
Jeger, et al., "The use of the area under the disease-progress curve (AUDPC) to assess quantitative disease resistance in crop cultivars," Theor Appl Genet (2001) 102:32-40.
Kim, et al., "CRISPR/Cas9-mediated myostatin disruption enhances muscle mass in the olive flounder *Paralichthys olivaceus*," Aquaculture 512 (2019), all enclosed pages cited.
Kim, et al., "Generation of myostatin-knockout chickens mediated by D10A-Cas9 nickase," The FASEB Journal (2020) 34, all enclosed pages cited.
Kimura, et al., "Efficient generation of knock-in transgenic zebrafish carrying reporter/driver genes by CRISPR/Cas9-mediated genome engineering," Scientific Reports, 4 (2014), all enclosed pages cited.
Cuevas-Uribe, R., & Tiersch, T. R. (2011). Estimation of fish sperm concentration by use of spectrophotometry. Cryopreservation in Aquatic Species, 2nd edition. World Aquaculture Society, Baton Rouge, LA, 162-200.
Dunham, R. A., & Smitherman, R. O. (1983a). Crossbreeding channel catfish for improvement of body weight in earthen ponds. Growth, 47(1), 97-103.

\* cited by examiner

Wild-Type SEQ ID NO: 1
*actcctctctgagacctgacc*ctggctgatcATGCATTTAGCGCAGGTTCTGATTTCGCTGGGCTTCGTGGTGGCGTTCGGTCCGA<u>TGG</u>CGCGCACTG
ACACCGGAGCACCGGAGCAGCAGCAGCAGCAGCAACCTACCGCCGTGACGGAGGAGC<u>GCGAGGCGCAGTGTTCAGCGG</u>CCAGC
GCGTGCGCTTTCCGCCAGCACAGCAAGCAGCTCCGTCTGCAAGCCATCAAGTCCCAGATTCTGAGCAAACTGCGCCTCAAACAAGC
TCCCAACGTGAGCCGCGATGTGGTCAAGCAGTTGCTCCCGAAAGCGCCACC<u>GGTGCAGCAGCTGCTCGACCTGTACGACGTGCT</u>
CGGGGACGACGGCAAGCCGGGCACAGCGCTCCAGGACGAGGAGGAGGACGACGAGGAGCACGCCACCACCGAGACCGTCATGAG
CATGGCCGCCGAGCgtgagtccctt*actactgcttcatagcctaact*

MSTN-1
Wild Sequence
5' TTCGTGGTGGCGTTCGGTCCGA<u>TGG</u>CGCGCACTGACACCGGAGCACCGGAGCAGCAGCAGCAGCAGCAACCTACC 3' SEQ ID NO: 2
AA: FVVAFGPMARTDTGAPEQQQQQQPT SEQ ID NO: 3

Mutated Sequence
5' TTCGTGGTGGCGTTCGGTCCGA<u>TGG</u>CGCGCACTGACACCGGAGCACCGG------AGCAGCAGCAGCAGCAACCTACC 3' SEQ ID NO: 4       [-6]
AA: FVVAFGPMARTDTGAPEQQQPT [-2] SEQ ID NO: 5
 1-
MSTN-2
Wild Sequence
5' ACC//GAGCGCGAGGCGCAGTGTTCAG<u>CGG</u>CCAGCG// CCAACCCCACTGAACACGT 3' SEQ ID NO: 6
AA: T// EREAQCSAAS//PTPLNT SEQ ID NO: 7
Mutated Sequence
5' ACC------------------------------/------------------------------TCAACCCCACTGAACACGT 3' SEQ ID NO: 8       [-2184]
AA: T//------// STPLNT [-728] SEQ ID NO: 9

MSTN-3
Wild Sequence 5' AAGCAGTTGCTCCCGAAAGCGCCAC<u>CGG</u>TGCAGCAGCTGCTCGACCTGTACGA 3' SEQ ID NO: 10
AA: KQLLPKAPPVQQLLDLY SEQ ID NO: 11
Mutated Sequence
5' AGCAGTT-----------CGCCAC<u>CGG</u>TGCAGCAGCTGCTCGACCTGTACGA 3' SEQ ID NO: 12       [-11]
AA: SSPPVQQLLDLY [-7/+2] SEQ ID NO: 13

MSTN-1,2,3
Wild Sequence
5'TTCGTGGTGGCGTTCGGTCCGA<u>TGG</u>CG//AGCGCGAGGCGCAGTGTTCAG<u>CGG</u>CCAG//CCA<u>CCG</u>GTGCAGCAGCTGCTCGAC
CTGT 3' SEQ ID NO: 14

AA: FVVAFGPMA// REAQCSAA// PPVQQLLDL SEQ ID NO: 15

Mutated Sequence
5' AGCAGTT-----------CGCCACCGGTGCAGCAGCTGCTCGACCTGTACGA 3' SEQ ID NO: 16       [-11]
AA: *SSPPVQQLLDLY* [-7/+2] SEQ ID NO: 17

F1 MSTN-B
Wild Sequence
5' TTCGTGGTGGCGTTCGGTCCGA<u>TGG</u>CGCGCACTGACACCGGAGCACCGGAGCAGCAGCAGCAGCAGCAA 3' SEQ ID NO: 18
AA: FVVAFGPMARTDTGAPEQQQQQQPT SEQ ID NO: 19

Mutated Sequence
5' TTCGTGGTGGCGTTCGGTCCGA<u>TGG</u>CGCGCACTGACACCGGAGCACCGG-------AGCAGCAGCAGCAACCTACC 3' SEQ ID NO: 20       [-6]
AA: FVVAFGPMARTDTGAPEQQ--QQPT [-2] SEQ ID NO: 21

FIG. 8

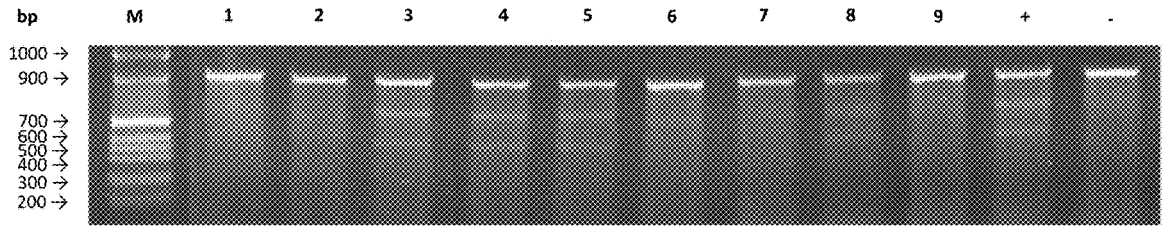

FIG. 14

Wild-type SEQ ID NO: 22
*ggagatggaggacacggaaga*agactcgcagattagaataaacgcag<u>ATG</u>AAGACGGAAAGCGGAGGACTGTGGTGAGGAGGTCTTGCGGATA
TGAACGTGTCGGAGCACCACGGGATGCAGCATGCACACCGGAACCACAGCCTGGGCGTGCAGATTGGAAACAAAGC
CGGCTCGGGGGAAAGGAACTCGGAGTC<u>GGG</u>CTGCTACGAGCAGCTGTTGATCTCCACCGAGGTCTTCATCACGCTA
GGGTTGGTCAGCCTTCTGGAGAACATCCTGGTAATCGCGGCCATCGTCAAGAACAAGAACTTCCACTCGCCCATGTAC
TTCTTCATCTGCAGCCTGGCGGTGGCCGACCTGCTGGTGAGCGTATCGAACGCGACAGAAACGGCT**GTGATGGCGCT
GATCACCAGC**<u>GG</u>CAACCTGACCATCTCTGGAGACGTCGTGAAAAGCATGGACAATGTGTTCGACTCCATGATCTGCA
GCTCACTCCTGGCCTCCATTTGGAGTCTCCTGGCCATCGCCGTGGACCGCTACGTCACCATCTTCTACGCCCTGCGCTA
CCACAACATCATGACCCAACGCCGCGCGGCCGCTCATCATCGTATGCATATGGAGCTTCTGCACGGCGTCCGGTGTGCT
CTTCATCATCTACTCGGAGAGCGCTACAGTCCTCATCTGCCTTATCAGCATGTTCTTCACCATGCTGGCCCTCATGGCC
TCGCTTTACGTGCACATGTTCCTCTTGGCGCGGCTTCACATGAAACGCATCGCCGCCTTACCGGGGAACGGCCCCGTG
TGGCAGGCGGCCAACATGAAGGGCG<u>CCC</u>GTGACGCTCACCATCCTGCTCGGAGTGTTTGTCGTGTGCTGGGCGCCGT
TTTTTCTCCACCTCATTCTCATGA*tctcttgtccgaggaacccgtattgcgtctgcttcatgtctc*

MC4R x MC4R
Wild Sequence
5' TGGAAACAAAGCCGGCTCGGGGGAAAGGAACTCGGAGTC<u>GGG</u>CTG//CAGGCGGCCAACATGA 3' SEQ ID NO: 23

AA:
GNKAGSGERNSESGCYEQLLISTEVFITLGLVSLLENILVIAAIVKNKNFHSPMYFFICSLAVADLLVSVSNATETAVMALITS
GNLTISGDVVKSMDNVFDSMICSSLLASIWSLLAIAVDRYVTIFYALRYHNIMTQRRAALIIVCIWSFCTASGVLFIIYSESAT
VLICLISMFFTMLALMASLYVHMFLLARLHMKRIAALPGNGPVWQAANM SEQ ID NO: 24

Mutated Sequence
5' TGGAAACAAAGCC-----------/------------CAGGCGGCCAACATGA 3' [-64†] SEQ ID NO: 25
AA: GNKAQAANM SEQ ID NO: 26

CNTRL x MC4R-1
Wild Sequence
5' aag//GGACAATGTGTTCGACTCC// TCAGCA// //TTCACATGAAACGCA////GAtctcttgtccgaggaacccgtat 3' SEQ ID NO: 27

AA: MDNVFDSMICSSLLASIWSLLAIAVDRYVTIFYALRYHNIMTQRRAALIIVCIWSFCTASGVLFIIYSESATVLICLISM
FFTMLALMASLYVHMFLLARLHMKRIAALPGNGPVWQAANMKGAVTLTILLGVFVVCWAPFFLHLILMISCPRNPYCVCF
MS SEQ ID NO: 28

Mutated Sequence
5'aag--/--G*AGTAGTA*TGT*C*CGA*TTC*--/--TCAG*TA*--/--TTCA*TATA*AA*GAGTA*--/--GA*CCAGTAATA*CG*T*GGA*TGACC*tat 3'
[-427, -211, -67, -127] SEQ ID NO: 29

AA: SSMSEFSVFI-RVDQ-YVDDLLRLLHV                    SEQ ID NO: 30

FIG. 15

ENGINEERED CATFISH AND USES THEREOF

CROSS-REFERENCE TO RELATED APPLICATIONS

This application claims the benefit of and priority to U.S. Provisional Patent Application No. 63/176,067, filed on Apr. 16, 2021, entitled "Melanocortin-receptor Gene Edited Channel Catfish, *Ictalurus Punctatus*" and U.S. Provisional Application No. 63/176,105, filed on Apr. 16, 2021, entitled "Genetic Technologies for Growth Enhancement in Catfish", the contents of which are incorporated by reference herein in their entireties.

STATEMENT REGARDING FEDERALLY SPONSORED RESEARCH

This invention was made with government support under Grant No. 2015-6701523488 awarded by United States Department of Agriculture—National Institute of Food and Agriculture. The government has certain rights in the invention.

SEQUENCE LISTING

This application contains a sequence listing filed in electronic form as an ASCII.txt file entitled AU-0210US_ST25.txt, created on Apr. 18, 2022 and having a size of 33,860 bytes (37 KB on disk). The content of the sequence listing is incorporated herein in its entirety.

TECHNICAL FIELD

The subject matter disclosed herein is generally directed to engineered fish, and more specifically engineered catfish.

BACKGROUND

Global seafood consumption has reached 155 billion kg and is projected to reach 201 billion kg by 2030. This increase must come from aquaculture as capture fisheries has been level or declining for the past 50 years. As such there exists a need for improved fish, genetics, husbandry, and other aquaculture compositions, techniques, and methods.

Citation or identification of any document in this application is not an admission that such a document is available as prior art to the present invention.

SUMMARY

Described in certain example embodiments herein are engineered fish comprising a modified melanocortin-4 receptor gene or gene product, wherein the modified melanocortin-4 receptor gene or gene product has decreased or eliminated expression, activity, or both as compared to a suitable control.

In certain example embodiments, the engineered fish further comprises a modified myostatin gene or gene product, wherein the modified myostatin gene or gene product has decreased or eliminated expression, activity, or both as compared to the suitable control.

In certain example embodiments, the engineered fish has increased body weight, increased body mass, increased growth rate, increased amount of n-3 fatty acids, sterility, or any combination thereof as compared to a suitable control.

In certain example embodiments, the modified melanocortin-4 receptor gene or gene product expression, activity, or both are each decreased 2-1000 fold.

In certain example embodiments, the modified melanocortin-4 receptor gene or gene product expression, activity, or both are each independently decreased 2-1000 fold, wherein the myostatin gene or gene product expression, activity, or both, are each independently decreased 2-1000 fold, or both.

In certain example embodiments, the engineered fish further comprises one or more exogenous genes selected from an elongase gene, an n-3 fatty acid biosynthesis gene, a cecropin gene, a cathelicidin gene, a growth hormone gene, or a follistatin gene, optionally wherein (a) a portion of or the entirety of the melanocortin-4 receptor gene is replaced with an exogenous gene; (b) a portion of or the entirety of the myostatin gene is replaced with an exogenous gene; or (c) both (a) and (b).

In certain example embodiments, the engineered fish has increased body mass, increased growth rate, increased amount of docosahexaenoic acid in one or more cells or tissues, increased amount of eicosapentaenoic acid in one or more cells or tissues, increased disease resistance, or any combination thereof as compared to a suitable control.

In certain example embodiments, the engineered fish has increased body mass, increased growth rate, increased amount of docosahexaenoic acid in one or more cells or tissues, increased amount of eicosapentaenoic acid in one or more cells or tissues, increased disease resistance, or any combination thereof as compared to a suitable control.

In certain example embodiments, the engineered fish further comprises one or more exogenous genes selected from an elongase gene, an n-3 fatty acid biosynthesis gene, a cecropin gene, a cathelicidin gene, a growth hormone gene, or a follistatin gene, optionally wherein a portion of or the entirety of the melanocortin-4 receptor gene is replaced with an exogenous gene.

In certain example embodiments, the engineered fish has increased body weight, growth rate, increased body weight, increased body mass, increased growth rate, increased amount of docosahexaenoic acid in one or more cells or tissues, increased amount of eicosapentaenoic acid in one or more cells or tissues, or any combination thereof as compared to a suitable control.

In certain example embodiments, the engineered fish is of the genus *Ictalurus, Ameiurus, Pylodictus,* or *Noturus*, or is a hybrid of any combination thereof. In certain example embodiments, the engineered fish is *I. punctatus, I. furcatus, A. catus, A. nebulosus, A. natalis, A. melas, P. olivaris, N. insignis*, or *N. flavus*, or is a hybrid of any combination thereof.

In certain example embodiments, the modified melanocortin-4 receptor gene or gene product is produced using a programmable nuclease system.

In certain example embodiments, the programmable nuclease system is a CRISPR-Cas system, a TALEN system, a Zinc Finger Nuclease system, or an IscB system.

Described in certain example embodiments herein are feed and/or food product comprising an engineered fish or portion thereof, wherein the engineered fish comprises a modified melanocortin-4 receptor gene or gene product, wherein the modified melanocortin-4 receptor gene or gene product has decreased or eliminated expression, activity, or both as compared to an unmodified control.

In certain example embodiments, the engineered fish further comprises one or more exogenous genes selected from an elongase gene, an n-3 fatty acid biosynthesis gene, a cecropin gene, a cathelicidin gene, a growth hormone gene, or a follistatin gene, optionally wherein a portion of or the entirety of the melanocortin-4 receptor gene is replaced with an exogenous gene.

In certain example embodiments, the engineered fish further comprises a modified myostatin gene.

In certain example embodiments, the engineered fish further comprises one or more exogenous genes selected from an elongase gene, an n-3 fatty acid biosynthesis gene, a cecropin gene, a cathelicidin gene, a growth hormone gene, or a follistatin gene, optionally wherein (a) a portion of or the entirety of the melanocortin-4 receptor gene is replaced with an exogenous gene; (b) a portion of or the entirety of the myostatin gene is replaced with an exogenous gene; or (c) both (a) and (b).

In certain example embodiments, the engineered fish is of the genus *Ictalurus, Ameiurus, Pylodictus,* or *Noturus,* or is a hybrid of any combination thereof. In certain example embodiments, the engineered fish is *I. punctatus, I. furcatus, A. catus, A. nebulosus, A. natalis, A. melas, P. olivaris, N. insignis,* or *N. flavus,* or is a hybrid of any combination thereof.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which:

(FIGS. 1C and 1D) Representative images of the ventral cross-sectional area of the epaxial muscle of wild-type (WT) (FIG. 1C) and mutant (individuals with frame-shift mutation from MSTN-Mix group) (FIG. 1D), shown by Hematoxylin and Eosin (H&E) staining. Scale bar in (FIGS. 1C and 1D): 25 m. Numbers of muscle fibers (FIG. 1E), the average area of the muscle fibers (FIG. 1F) and the total area of fibers (FIG. 1G) of mutant (blue) and wild-type (red), quantified H&E staining images (see FIGS. 1C and 1D) with ImageJ. Approximately 32 stained images for each treatment were quantified. Distribution percentage of the fibers (FIG. 1H) was calculated as the total area of fibers per cross-sectional area multiplied by 100. Statistical significance was set at p<0.05, and all data were presented as the mean±standard error (SEM)

FIG. 8 (SEQ ID NO. 1-21)—CRISPR/Cas9 induced mutations in exon 1 of myostatin (MSTN) gene coding sequence of channel catfish, *Ictalurus punctatus*, using various gRNAs. The exons and introns are indicated by upper and lower case and the underlined bold uppercase is the start codon. The primers used in PCR are indicated in italics. The guide RNA target sites are indicated in bold followed by PAM (Protospacer adjacent motif, NGG) indicated with underline. Deletion mutations are represented by a dashed line with each dash corresponding to a nucleotide that has been deleted. Double slash indicates wild-type continuation of the sequence for simplicity. Single slash indicates that there is a large deletion. Each sequence starting with 5' and ending with 3' came from a single reaction representing a single allele. Brackets indicate deletion/insertion/substitution value. Wild-type sequence acquired from Genbank (Accession No. AF396747.1). Corresponding predicted amino acid sequence indicated by "AA". Italic letters indicate substitutions. Predicted amino acid sequence acquired from Expasy and confirmed with NCBI ORFfinder.

FIG. 14—Identification of edited melanocortin-4 receptor (MC4R) gene sequences in channel catfish, *Ictalurus punctatus*, using the surveyor mutation detection assay. All samples were hybridized with an equal volume of non-injected control (Sample −) to detect both homozygotes/bi-allelic and heterozygotes. Wild-type sequences are indicated with a single 932 bp band, while mutations are signified by three bands. Samples 1 and 2 are MC4R x MC4R F1 progeny. Sample 3 is CNTRL x MC4R-1 F1 progeny. Samples 4 and 5 are CNTRL x MC4R-2 F1 progeny. Samples 6 and 7 are CNTRL x MC4R-3 F1 progeny. Samples 8 and 9 are CNTRL x MC4R-4 F1 progeny. Sample + is a previously identified MC4R x MC4R F1 progeny mutant. Sample−came from wild-type control. M indicates 1 kb marker.

FIG. 15 (SEQ ID NO. 22-30)—CRISPR/Cas9 induced mutations in exon 1 of melanocortin-4 receptor (MC4R) gene coding sequence of channel catfish, *Ictalurus punctatus*, in two F1 mutants. The exons and introns are indicated by upper and lower case and the underlined bold uppercase is the start codon. The primers used in PCR are indicated in italics. The guide RNA target sites are indicated with bolding followed by PAM (Protospacer adjacent motif, NGG)

indicated by underlined text. Deletion mutations are represented by a dashed line with each dash corresponding to a nucleotide that has been deleted. Double slash indicates wild-type continuation of the sequence for simplicity. Single slash indicates that there is a large deletion. Each sequence starting with 5' and ending with 3' came from a single reaction representing a single allele. Brackets indicate deletion/insertion/substitution value. Wild-type sequence acquired from Genbank (Accession No. LBML01001141.1). Corresponding predicted amino acid sequence indicated by "AA". Bolded and italicized letters indicate substitutions. Predicted amino acid sequence acquired from Expasy and confirmed with NCBI ORFfinder.

Figure 16:
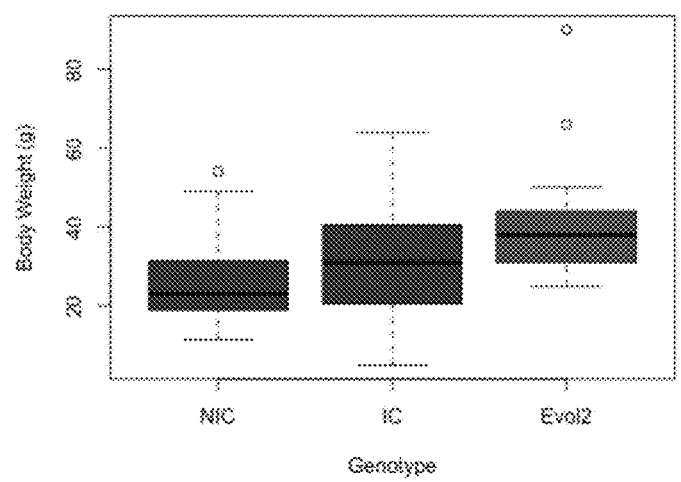

FIG. 16—Box and whisker plot of body weights (grams) of Non-Inject Control (NIC; blue), Inject-Control (IC; blue) and P1 ccβA-msEvol2 transgenic MC4R knock-out (Evol2; red) channel catfish, *Ictalurus punctatus*, generated in 2020, at 6-months post hatch. The ccβA-msEvol2 transgene containing *masu* salmon, *Oncorhynchus masou*, elongase gene driven by the common carp, *Cyprinus carpio*, beta-actin promoter was inserted into the channel catfish melanocortin-4 receptor (MC4R) gene using the 2-hit 2-oligo with plasmid (2H2OP) method. Mutants and controls were kept in separate 50 L aquaria at a maximum density of 1 fish/L and fed daily to satiation. The plot shows median of the data (dark line), the lower and upper quartiles (25% and 75%; top and bottom of the box respectively), the area 1.5 times the interquartile range (whiskers), and outlier (circle). At 6-months post hatch, ccβA-msEvol2 mutants were 41.81% and 12.01 g larger than controls (p=0.005).

Figure 17:
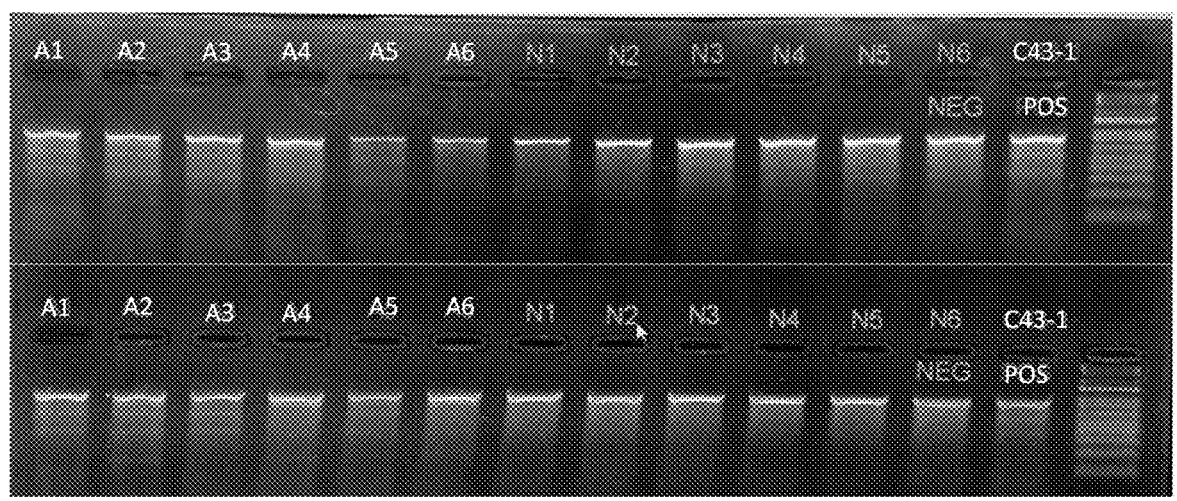

FIG. 17—The ccβA-msEvol2 plasmid containing *masu* salmon, *Oncorhynchus masou*, elongase gene driven by the common carp, *Cyprinus carpio*, beta-actin promoter was inserted into the channel catfish melanocortin-4 receptor (MC4R) gene using the 2-hit 2-oligo with plasmid (2H2OP) method. Six (A1-A6) channel catfish, *Ictalurus punctatus*, were microinjected with MC4R-A sgRNA in conjunction with ccβA-msEvol2 plasmid (Table 15). P1 fish were generated in 2020. Approximately 50n1 of solution, composed of 1 µg/µl Cas9 protein (1 µl), 400 ng/µl sgRNA MC4R-A (0.5 µl), 400 ng/µl sgRNA2 (0.5 µl), 50 ng/µl donor plasmid (1 µl), 100 ng/µl ssODN1 (0.5 µl), 100 ng/µl ssODN2 (0.5 µl) and 60% phenol red (1 µl), was injected into each embryo close to the blastodisc 15 min after fertilization using a glass capillary needle. All six fish tested using Surveyor mutation detection kit were mutants. Six channel catfish (N1-N6) were not injected to use as controls. None of the controls showed a mutation in the MC4R gene. Sample C43-1 was previously identified as an MC4R mutant and was used as a positive control. The top row was hybridized with wild-type by mixing equal volumes of sample PCR product with N6 negative control in order to identify homozygotes. The bottom row was not hybridized with wild-type in order to identify heterozygotes.

Figure 18:
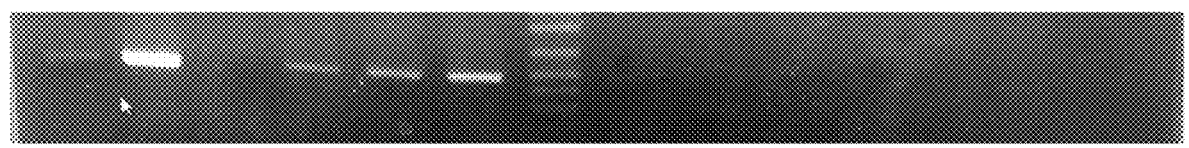

FIG. 18—The ccβA-msEvol2 plasmid containing *masu* salmon, *Oncorhynchus masou*, elongase gene driven by the common carp, *Cyprinus carpio*, beta-actin promoter was inserted into the channel catfish melanocortin-4 receptor (MC4R) gene using the 2-hit 2-oligo with plasmid (2H2OP) method. Six (A1-A6) channel catfish, *Ictalurus punctatus*, were microinjected with MC4R-A sgRNA in conjunction with ccβA-msEvol2 plasmid (Table 15). P1 fish were generated in 2020. Approximately 50n1 of solution, composed of 1 µg/µl Cas9 protein (1 µl), 400 ng/µl sgRNA MC4R-A (0.5 µl), 400 ng/µl sgRNA2 (0.5 µl), 50 ng/µl donor plasmid (1 µl), 100 ng/µl ssODN1 (0.5 µl), 100 ng/µl ssODN2 (0.5 µl) and 60% phenol red (1 µl), was injected into each embryo close to the blastodisc 15 min after fertilization using a glass capillary needle. Six channel catfish (N1-N6) were not injected to use as controls. Five out of six channel catfish (A1, A2, A4, A5, A6) are positive for the ccβA-msEvol2 transgene as indicated by 485 bp band. Six channel catfish (N7-N12) served as non-inject controls. None of the controls tested positive for the transgene. M indicates 1 kb marker.

Figure 19:
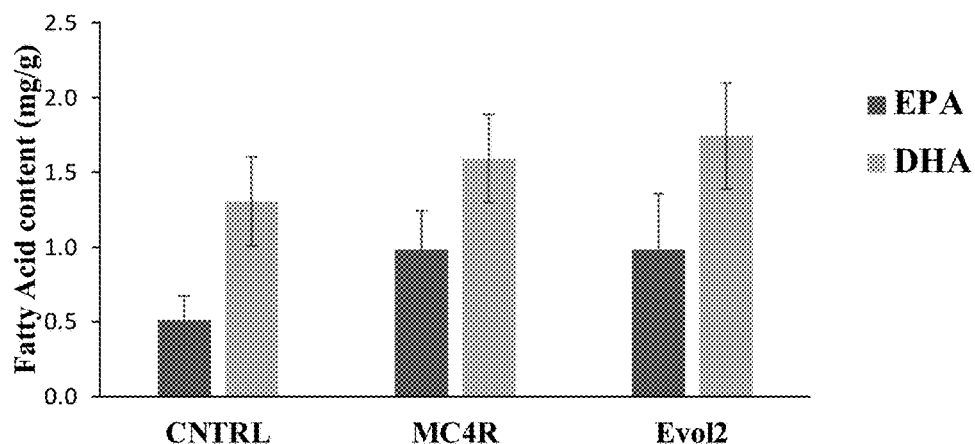

FIG. 19—Mean eicosapentaenoic acid (EPA, C20:5n-3) and docosahexaenoic acid (DHA, C22:6n-3) content (mg) per gram of muscle tissue in control (CNTRL), melanocortin-4 receptor (MC4R) knockout and MC4R knockout+ ccβA-msEvol2 transgene (Evol2) knock-in channel catfish, *Ictalurus punctatus*. The ccβA-msEvol2 transgene containing *masu* salmon, *Oncorhynchus masou*, elongase gene driven by the common carp, *Cyprinus carpio*, beta-actin promoter was inserted into the channel catfish melanocortin-4 receptor (MC4R) gene using the 2-hit 2-oligo with plasmid (2H2OP) method. Muscle was sampled from 3 fish from each treatment. Error bars indicate standard deviation. There was no significant difference in EPA or DHA levels between any of the groups using ANOVA (EPA: p=0.203; DHA: p=0.380).

Figure 20:
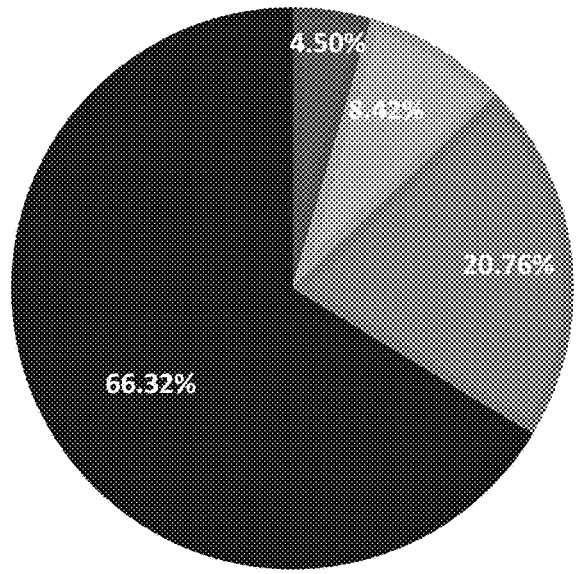

FIG. 20—Comparison of the sire and dam general combining ability (GCA) and specific combining ability (SCA) estimate percentages for the female channel catfish (*Ictalurus punctatus*) X male blue catfish (*I. furcatus*) hybrid mating for growth at 14-months post hatch raised in 50 L aquaria. The proportion of variation due to the dam, sire, dam x sire interaction and residual error is indicated by $\sigma^2 GCAd$, $\sigma^2 GCAds$, $\sigma^2 SCA$, and $\sigma^2 E$, respectively.

Figure 21:
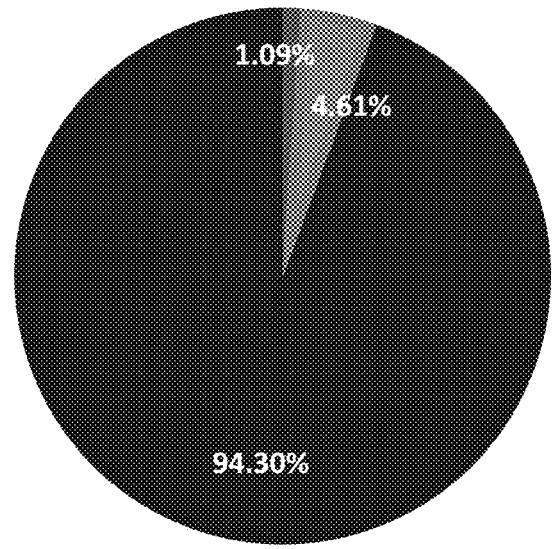

FIG. 21—Comparison of the sire and dam general combining ability (GCA) and specific combining ability (SCA) estimate percentages for the female channel catfish (*Ictalurus punctatus*) X male blue catfish (*I. furcatus*) hybrid mating for growth at 40-months post hatch in 0.04ha earthen ponds stocked at 14,000 fish/ha. The proportion of variation due to the dam, sire, dam x sire interaction and residual error is indicated by $\sigma^2 GCAd$, $\sigma^2 GCAds$, $\sigma^2 SCA$, and $\sigma^2 E$, respectively.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by reference as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

General Definitions

Unless defined otherwise, technical and scientific terms used herein have the same meaning as commonly understood by one of ordinary skill in the art to which this disclosure pertains. Definitions of common terms and techniques in molecular biology may be found in Molecular Cloning: A Laboratory Manual, $2^{nd}$ edition (1989) (Sambrook, Fritsch, and Maniatis); Molecular Cloning: A Laboratory Manual, $4^{th}$ edition (2012) (Green and Sambrook); Current Protocols in Molecular Biology (1987) (F. M. Ausubel et al. eds.); the series Methods in Enzymology (Academic Press, Inc.): PCR 2: A Practical Approach (1995) (M. J. MacPherson, B. D. Hames, and G. R. Taylor eds.): Antibodies, A Laboratory Manual (1988) (Harlow and Lane, eds.): Antibodies A Laboratory Manual, $2^{nd}$ edition 2013 (E. A. Greenfield ed.); Animal Cell Culture (1987) (R. I. Freshney, ed.); Benjamin Lewin, Genes IX, published by Jones and Bartlet, 2008 (ISBN 0763752223); Kendrew et al. (eds.), The Encyclopedia of Molecular Biology, published by Blackwell Science Ltd., 1994 (ISBN 0632021829); Robert A. Meyers (ed.), Molecular Biology and Biotechnology: a Comprehensive Desk Reference, published by VCH Publishers, Inc., 1995 (ISBN 9780471185710); Singleton et al., Dictionary of Microbiology and Molecular Biology 2nd ed., J. Wiley & Sons (New York, N.Y. 1994), March, Advanced Organic Chemistry Reactions, Mechanisms and Structure 4th ed., John Wiley & Sons (New York, N.Y. 1992); and Marten H. Hofker and January van Deursen, Transgenic Mouse Methods and Protocols, $2^{nd}$ edition (2011).

Definitions of common terms and techniques in chemistry and organic chemistry can be found in Smith. Organic Synthesis, published by Academic Press. 2016; Tinoco et al. Physical Chemistry, $5^{th}$ edition (2013) published by Pearson; Brown et al., Chemistry, The Central Science $14^{th}$ ed. (2017), published by Pearson, Clayden et al., Organic Chemistry, $2^{nd}$ ed. 2012, published by Oxford University Press; Carey and Sunberg, Advanced Organic Chemistry, Part A: Structure and Mechanisms, $5^{th}$ ed. 2008, published by Springer; Carey and Sunberg, Advanced Organic Chemistry, Part B: Reactions and Synthesis, $5^{th}$ ed. 2010, published by Springer, and Vollhardt and Schore, Organic Chemistry, Structure and Function; $8^{th}$ ed. (2018) published by W.H. Freeman.

Definitions of common terms, analysis, and techniques in genetics can be found in e.g., Hartl and Clark. Principles of Population Genetics. $4^{th}$ Ed. 2006, published by Oxford University Press. Published by Booker. Genetics: Analysis and Principles, $7^{th}$ Ed. 2021, published by McGraw Hill; Isik et la., Genetic Data Analysis for Plant and Animal Breeding. First ed. 2017. published by Springer International Publishing AG; Green, E. L. Genetics and Probability in Animal Breeding Experiments. 2014, published by Palgrave; Bourdon, R. M. Understanding Animal Breeding. 2000 $2^{nd}$ Ed. published by Prentice Hall; Pal and Chakravarty. Genetics and Breeding for Disease Resistance of Livestock. First Ed.

2019, published by Academic Press; Fasso, D. Classification of Genetic Variance in Animals. First Ed. 2015, published by Callisto Reference; Megahed, M. Handbook of Animal Breeding and Genetics, 2013, published by Omniscriptum Gmbh & Co. Kg., LAP Lambert Academic Publishing; Reece. Analysis of Genes and Genomes. 2004, published by John Wiley & Sons. Inc; Deonier et al., Computational Genome Analysis. $5^{th}$ Ed. 2005, published by Springer-Verlag, New York; Meneely, P. Genetic Analysis: Genes, Genomes, and Networks in Eukaryotes. $3^{rd}$ Ed. 2020, published by Oxford University Press.

As used herein, the singular forms "a" "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosed invention. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

The recitation of numerical ranges by endpoints includes all numbers and fractions subsumed within the respective ranges, as well as the recited endpoints.

As used herein, a "biological sample" refers to a sample obtained from, made by, secreted by, excreted by, or otherwise containing part of or from a biologic entity. A biologic sample can contain whole cells and/or live cells and/or cell debris, and/or cell products, and/or virus particles. The biological sample can contain (or be derived from) a "bodily fluid". The biological sample can be obtained from an environment (e.g., water source, soil, air, and the like). Such samples are also referred to herein as environmental samples. As used herein "bodily fluid" refers to any non-solid excretion, secretion, or other fluid present in an organism and includes, without limitation unless otherwise specified or is apparent from the description herein, amniotic fluid, aqueous humor, vitreous humor, bile, blood or component thereof (e.g. plasma, serum, etc.), breast milk, cerebrospinal fluid, cerumen (earwax), chyle, chyme, endolymph, perilymph, exudates, feces, female ejaculate, gastric acid, gastric juice, lymph, mucus (including nasal drainage and phlegm), pericardial fluid, peritoneal fluid, pleural fluid, pus, rheum, saliva, sebum (skin oil), semen, sputum, synovial fluid, sweat, tears, urine, vaginal secretion, vomit and mixtures of one or more thereof. Biological samples include cell cultures, bodily fluids, cell cultures from bodily fluids. Bodily fluids may be obtained from an organism, for example by puncture, or other collecting or sampling procedures.

As used herein, "administering" refers to any suitable administration for the agent(s) being delivered and/or subject receiving said agent(s) and can be oral, topical, intravenous, subcutaneous, transcutaneous, transdermal, intramuscular, intra-joint, parenteral, intra-arteriole, intradermal, intraventricular, intraosseous, intraocular, intracranial, intraperitoneal, intralesional, intranasal, intracardiac, intraarticular, intracavernous, intrathecal, intravireal, intracerebral, and intracerebroventricular, intratympanic, intracochlear, rectal, vaginal, by inhalation, by catheters, stents or via an implanted reservoir or other device that administers, either actively or passively (e.g. by diffusion) a composition the perivascular space and adventitia. For example, a medical device such as a stent can contain a composition or formulation disposed on its surface, which can then dissolve or be otherwise distributed to the surrounding tissue and cells. The term "parenteral" can include subcutaneous, intravenous, intramuscular, intra-articular, intra-synovial, intrasternal, intrathecal, intrahepatic, intralesional, and intracranial injections or infusion techniques. Administration routes can be, for instance, auricular (otic), buccal, conjunctival, cutaneous, dental, electro-osmosis, endocervical, endosinusial, endotracheal, enteral, epidural, extra-amniotic, extracorporeal, hemodialysis, infiltration, interstitial, intra abdominal, intra-amniotic, intra-arterial, intra-articular, intrabiliary, intrabronchial, intrabursal, intracardiac, intracartilaginous, intracaudal, intracavernous, intracavitary, intracerebral, intracisternal, intracorneal, intracoronal (dental), intracoronary, intracorporus cavernosum, intradermal, intradiscal, intraductal, intraduodenal, intradural, intraepidermal, intraesophageal, intragastric, intragingival, intraileal, intralesional, intraluminal, intralymphatic, intramedullary, intrameningeal, intramuscular, intraocular, intraovarian, intrapericardial, intraperitoneal, intrapleural, intraprostatic, intrapulmonary, intrasinal, intraspinal, intrasynovial, intratendinous, intratesticular, intrathecal, intrathoracic, intratubular, intratumor, intratym panic, intrauterine, intravascular, intravenous, intravenous bolus, intravenous drip, intraventricular, intravesical, intravitreal, iontophoresis, irrigation, laryngeal, nasal, nasogastric, occlusive dressing technique, ophthalmic, oral, oropharyngeal, other, parenteral, percutaneous, periarticular, peridural, perineural, periodontal, rectal, respiratory (inhalation), retrobulbar, soft tissue, subarachnoid, subconjunctival, subcutaneous, sublingual, submucosal, topical, transdermal, transmucosal, transplacental, transtracheal, transtympanic, ureteral, urethral, and/or vaginal administration, and/or any combination of the above administration routes, which typically depends on the disease to be treated, subject being treated, and/or agent(s) being administered.

As used herein, "control" refers to an alternative subject or sample used in an experiment for comparison purpose and included to minimize or distinguish the effect of variables other than an independent variable.

As used herein with reference to the relationship between DNA, cDNA, cRNA, RNA, protein/peptides, and the like "corresponding to" or "encoding" (used interchangeably herein) refers to the underlying biological relationship between these different molecules. As such, one of skill in the art would understand that operatively "corresponding to" can direct them to determine the possible underlying and/or resulting sequences of other molecules given the sequence of any other molecule which has a similar biological relationship with these molecules. For example, from a DNA sequence an RNA sequence can be determined and from an RNA sequence a cDNA sequence can be determined.

As used herein, "deoxyribonucleic acid (DNA)" and "ribonucleic acid (RNA)" can generally refer to any polyribonucleotide or polydeoxyribonucleotide (collectively polynucleotides), which may be unmodified RNA or DNA or modified RNA or DNA. RNA can be in the form of non-coding RNA such as tRNA (transfer RNA), snRNA (small nuclear RNA), rRNA (ribosomal RNA), anti-sense RNA, RNAi (RNA interference construct), siRNA (short interfering RNA), microRNA (miRNA), or ribozymes, aptamers, guide RNA (gRNA) or coding mRNA (messenger RNA).

The terms "subject," "individual," and are used interchangeably herein to refer to a vertebrate, preferably a fish, more preferably a catfish, such as a channel catfish or hybrid thereof. Tissues, cells and their progeny of a biological entity obtained in vivo or cultured in vitro are also encompassed.

A "suitable control" is a control that will be instantly appreciated by one of ordinary skill in the art as one that is included such that it can be determined if the variable being evaluated an effect, such as a desired effect or hypothesized effect. One of ordinary skill in the art will also instantly appreciate based on inter alia, the context, the variable(s), the desired or hypothesized effect, what is a suitable or an appropriate control needed. An exemplary suitable control for an engineered fish described herein is a non-engineered, full sibling, fish. For example, a suitable control for an engineered (such as an edited) fish having a modified melanocortin 4 receptor gene or gene product, wherein the modified melanocortin gene or gene product has decreased or eliminated expression, activity, or both can be a non-engineered (e.g., non-edited) full-sibling to the engineered fish.

As used herein, "expression" refers to the process by which polynucleotides are transcribed into RNA transcripts. In the context of mRNA and other translated RNA species, "expression" also refers to the process or processes by which the transcribed RNA is subsequently translated into peptides, polypeptides, or proteins. In some instances, "expression" can also be a reflection of the stability of a given RNA. For example, when one measures RNA, depending on the method of detection and/or quantification of the RNA as well as other techniques used in conjunction with RNA detection and/or quantification, it can be that increased/decreased RNA transcript levels are the result of increased/decreased transcription and/or increased/decreased stability and/or degradation of the RNA transcript. One of ordinary skill in the art will appreciate these techniques and the relation "expression" in these various contexts to the underlying biological mechanisms.

As used herein, "gene" refers to a hereditary unit corresponding to a sequence of DNA that occupies a specific location on a chromosome and that contains the genetic instruction for a characteristic(s) or trait(s) in an organism. The term gene can refer to or include translated and/or untranslated regions of a genome. "Gene" can refer to the specific sequence of DNA that is transcribed into an RNA transcript that can be translated into a polypeptide or be a catalytic RNA molecule, including but not limited to, tRNA, siRNA, piRNA, miRNA, long-non-coding RNA and shRNA.

As used herein "increased expression" or "overexpression" are both used to refer to an increased expression of a gene, such as a gene relating to an antigen processing and/or presentation pathway, or gene product thereof in a sample as compared to the expression of said gene or gene product in a suitable control. The term "increased expression" preferably refers to 10%, 20%, 30%, 40%, 50%, 60%, 70%, 80%, 90%, 100%0, 110%, 120%, 130%, 140%, 150%1, 160%, 170%, 180%, 190%, 200%, 210%, 220%, 230%, 240%, 250%, 260%, 270%, 280%, 290%, 300%, 310%, 320%, 330%, 340%, 350%, 360%, 370%, 380%, 390%, 400%, 410%, 420%, 430%, 440%, 450%, 460%, 470%, 480%, 490%, 500%, 510%, 520%, 530%, 540%, 550%, 560%, 570%, 580%, 590%, 600%, 610%, 620%, 630%, 640%, 650%, 660%, 670%, 680%, 690%, 700%, 710%, 720%, 730%, 740%, 750%, 760%, 770%, 780%, 790%, 800%, 810%, 820%, 830%, 840%, 850%, 860%, 870%, 880%, 890%, 900%, 910%, 920%, 930%, 940%, 950%, 960%, 970%, 980%, 990%, 1000%, 1010%, 1020%, 1030%, 1040%, 1050%, 1060%, 1070%, 1080%, 1090%, 1100%, 1110%, 1120%, 1130%, 1140%, 1150%, 1160%, 1170%, 1180%, 1190%, 1200%, 1210%, 1220%, 1230%, 1240%, 1250%, 1260%, 1270%, 1280%, 1290%, 1300%, 1310%, 1320%, 1330%, 1340%, 1350%, 1360%, 1370%, 1380%, 1390%, 1400%, 1410%, 1420%, 1430%, 1440%, 1450%, 1460%, 1470%, 1480%, 1490%, or/to 1500% or more increased expression relative to a suitable control.

The term "modification causing said increased expression" or similar phrases refer to a modification in a gene which affects the expression level of that or another gene such that expression of that or another gene is increased. In particular embodiments, the modification is in a gene relating to an antigen processing pathway. In some embodiments, the modification is in a gene relating to the cross-presentation pathway. Said modification can be any nucleic acid modification including, but not limited to, a mutation, a deletion, an insertion, a replacement, a ligation, a digestion, a break and a frameshift. Said modification is preferably selected from the group consisting of a mutation, a deletion and a frameshift. In particular embodiments, the modification is a mutation which results in reduced expression of the functional gene product.

As used herein, "negative control" can refer to a "control" that is designed to produce no effect or result, provided that all reagents are functioning properly and that the experiment is properly conducted. Other terms that are interchangeable with "negative control" include "sham," "placebo," and "mock."

As used herein, "nucleic acid," "nucleotide sequence," and "polynucleotide" can be used interchangeably herein and can generally refer to a string of at least two base-sugar-phosphate combinations and refers to, among others, single- and double-stranded DNA, DNA that is a mixture of single- and double-stranded regions, single- and double-stranded RNA, and RNA that is mixture of single- and double-stranded regions, hybrid molecules comprising DNA and RNA that may be single-stranded or, more typically, double-stranded or a mixture of single- and double-stranded regions. In addition, polynucleotide as used herein can refer to triple-stranded regions comprising RNA or DNA or both RNA and DNA. The strands in such regions can be from the same molecule or from different molecules. The regions may include all of one or more of the molecules, but more typically involve only a region of some of the molecules. One of the molecules of a triple-helical region often is an oligonucleotide. "Polynucleotide" and "nucleic acids" also encompasses such chemically, enzymatically or metabolically modified forms of polynucleotides, as well as the chemical forms of DNA and RNA characteristic of viruses and cells, including simple and complex cells, inter alia. For instance, the term polynucleotide as used herein can include DNAs or RNAs as described herein that contain one or more modified bases. Thus, DNAs or RNAs including unusual bases, such as inosine, or modified bases, such as tritylated bases, to name just two examples, are polynucleotides as the term is used herein. "Polynucleotide", "nucleotide sequences" and "nucleic acids" also includes PNAs (peptide nucleic acids), phosphorothioates, and other variants of the phosphate backbone of native nucleic acids. Natural nucleic acids have a phosphate backbone, artificial nucleic acids can contain other types of backbones, but contain the same bases. Thus, DNAs or RNAs with backbones modified for stability or for other reasons are "nucleic acids" or "polynucleotides" as that term is intended herein. As used herein, "nucleic acid sequence" and "oligonucleotide" also encompasses a nucleic acid and polynucleotide as defined elsewhere herein.

As used herein, a "population" of cells is any number of cells greater than 1, but is preferably at least $1\times10^3$ cells, at least $1\times10^4$ cells, at least at least $1\times10^5$ cells, at least $1\times10^6$ cells, at least $1\times10^7$ cells, at least $1\times10^8$ cells, at least $1\times10^9$ cells, or at least $1\times10^{10}$ cells.

As used herein, "positive control" refers to a "control" that is designed to produce the desired result, provided that all reagents are functioning properly and that the experiment is properly conducted.

As used herein, "polypeptides" or "proteins" refers to amino acid residue sequences. Those sequences are written left to right in the direction from the amino to the carboxy terminus. In accordance with standard nomenclature, amino acid residue sequences are denominated by either a three letter or a single letter code as indicated as follows: Alanine (Ala, A), Arginine (Arg, R), Asparagine (Asn, N), Aspartic Acid (Asp, D), Cysteine (Cys, C), Glutamine (Gln, Q), Glutamic Acid (Glu, E), Glycine (Gly, G), Histidine (His, H), Isoleucine (Ile, I), Leucine (Leu, L), Lysine (Lys, K), Methionine (Met, M), Phenylalanine (Phe, F), Proline (Pro, P), Serine (Ser, S), Threonine (Thr, T), Tryptophan (Trp, W), Tyrosine (Tyr, Y), and Valine (Val, V). "Protein" and "Polypeptide" can refer to a molecule composed of one or more chains of amino acids in a specific order. The term protein is used interchangeable with "polypeptide." The order is determined by the base sequence of nucleotides in the gene coding for the protein. Proteins can be required for the structure, function, and regulation of the body's cells, tissues, and organs.

As used herein, the term "recombinant" or "engineered" can generally refer to a non-naturally occurring nucleic acid, nucleic acid construct, or polypeptide. Such non-naturally occurring nucleic acids may include natural nucleic acids that have been modified, for example that have deletions, substitutions, inversions, insertions, etc., and/or combinations of nucleic acid sequences of different origin that are joined using molecular biology technologies (e.g., a nucleic acid sequences encoding a fusion protein (e.g., a protein or polypeptide formed from the combination of two different proteins or protein fragments)), the combination of a nucleic acid encoding a polypeptide to a promoter sequence, where the coding sequence and promoter sequence are from different sources or otherwise do not typically occur together naturally (e.g., a nucleic acid and a constitutive promoter), etc. Recombinant or engineered can also refer to the polypeptide encoded by the recombinant nucleic acid. Non-naturally occurring nucleic acids or polypeptides include nucleic acids and polypeptides modified by man.

As used herein "reduced expression" or "underexpression" refers to a reduced or decreased expression of a gene, such as a gene relating to an antigen processing pathway, or a gene product thereof in sample as compared to the expression of said gene or gene product in a suitable control. As used throughout this specification, "suitable control" is a control that will be instantly appreciated by one of ordinary skill in the art as one that is included such that it can be determined if the variable being evaluated an effect, such as a desired effect or hypothesized effect. One of ordinary skill in the art will also instantly appreciate based on inter alia, the context, the variable(s), the desired or hypothesized effect, what is a suitable or an appropriate control needed. In one embodiment, said control is a sample from a non-engineered organism, such as non-engineered a full sibling. The term "reduced expression" preferably refers to at least a 25% reduction, e.g., at least a 30%, 40%, 50%, 60%, 70%, 75%, 80%, 85%, 90%, 95%, 98% or 99% reduction, relative to such control.

The term "modification causing said reduced expression" and similar phrases refer to a modification in a gene which affects the expression level of that or another gene such that the expression level of that or another gene is reduced or decreased. In particular embodiments, the modification is in a gene relating to an antigen processing pathway. In some embodiments, the modification is in a gene relating to the cross-presentation pathway. Said modification can be any nucleic acid modification including, but not limited to, a mutation, a deletion, an insertion, a replacement, a ligation, a digestion, a break and a frameshift. Said modification is preferably selected from the group consisting of a mutation, a deletion and a frameshift. In particular embodiments, the modification is a mutation which results in reduced expression of the functional gene product.

As used herein, the term "specific binding" refers to non-covalent physical association of a first and a second moiety wherein the association between the first and second moieties is at least 2 times as strong, at least 5 times as strong as, at least 10 times as strong as, at least 50 times as strong as, at least 100 times as strong as, or stronger than the association of either moiety with most or all other moieties present in the environment in which binding occurs. Binding of two or more entities may be considered specific if the equilibrium dissociation constant, Kd, is $10^{-3}$ M or less, $10^{-4}$ M or less, $10^{-5}$ M or less, $10^{-6}$ M or less, $10^{-7}$ M or less, $10^{-8}$ M or less, $10^{-9}$ M or less, $10^{-10}$ M or less, $10^{-11}$ M or less, or $10^{-12}$ M or less under the conditions employed, e.g., under physiological conditions such as those inside a cell or consistent with cell survival. In some embodiments, specific binding can be accomplished by a plurality of weaker interactions (e.g., a plurality of individual interactions, wherein each individual interaction is characterized by a Kd of greater than $10^{-3}$ M). In some embodiments, specific binding, which can be referred to as "molecular recognition," is a saturable binding interaction between two entities that is dependent on complementary orientation of functional groups on each entity. Examples of specific binding interactions include primer-polynucleotide interaction, aptamer-aptamer target interactions, antibody-antigen interactions, avidin-biotin interactions, ligand-receptor interactions, metal-chelate interactions, hybridization between complementary nucleic acids, etc.

As used herein, "targeting moiety" refers to molecules, complexes, agents, and the like that is capable of specifically or selectively interacting with, binding with, acting on or with, or otherwise associating or recognizing a target molecule, agent, and/or complex that is associated with, part of, coupled to, another object, complex, surface, and the like, such as a cell or cell population, tissue, organ, subcellular locale, object surface, particle etc. Targeting moieties can be chemical, biological, metals, polymers, or other agents and molecules with targeting capabilities. Targeting moieties can be amino acids, peptides, polypeptides, nucleic acids, polynucleotides, lipids, sugars, metals, small molecule chemicals, combinations thereof, and the like. Targeting moieties can be antibodies or fragments thereof, aptamers, DNA, RNA such as guide RNA for a RNA guided nuclease or system, ligands, substrates, enzymes, combinations thereof, and the like. The specificity or selectivity of a targeting moiety can be determined by any suitable method or technique that will be appreciated by those of ordinary skill in the art. For example, in some embodiments, the methods described herein include determining the disassociation constant for the targeting moiety and target. In some embodiments, the targeting moiety has a specificity the equilibrium dissociation constant, Kd, is $10^{-3}$ M or less, $10^{-4}$ M or less, $10^{-5}$ M or less, $10^{-6}$ M or less, $10^{-7}$ M or less, $10^{-8}$ M or less, $10^{-9}$ M or less, $10^{-10}$ M or less, $10^{-11}$ M or less, or $10^{-12}$ M or less under the conditions employed, e.g., under physiological conditions such as those inside a cell or consistent with cell survival. In some embodiments, specific binding can be accomplished by a plurality of weaker interactions (e.g., a plurality of individual interactions, wherein each individual interaction is characterized by a Kd of greater than 10' M). In some embodiments, the targeting moiety has increased binding with, association with, interaction with, activity on as compared to non-targets, such as a 1 to 500 or more fold increase. Targets of targeting moieties can be amino acids, peptides, polypeptides, nucleic acids, polynucleotides, lipids, sugars, metals, small molecule chemicals, combinations thereof, and the like. Targets can be receptors, biomarkers, transporters, antigens, complexes, combinations thereof, and the like.

As used herein in the context of polynucleotides and polypeptides, "variant" can refer to a polynucleotide or polypeptide that differs from a reference polynucleotide or polypeptide, but retains essential and/or characteristic properties (structural and/or functional) of the reference polynucleotide or polypeptide. A typical variant of a polypeptide differs in amino acid sequence from another, reference polypeptide. The differences can be limited so that the sequences of the reference polypeptide and the variant are closely similar overall and, in many regions, identical. A variant and reference polypeptide may differ in nucleic or amino acid sequence by one or more modifications at the sequence level or post-transcriptional or post-translational modifications (e.g., substitutions, additions, deletions, methylation, glycosylations, etc.). A substituted nucleic acid may or may not be an unmodified nucleic acid of adenine, thiamine, guanine, cytosine, uracil, including any chemically, enzymatically or metabolically modified forms of these or other nucleotides. A substituted amino acid residue may or may not be one encoded by the genetic code. A variant of a polypeptide may be naturally occurring such as an allelic variant, or it may be a variant that is not known to occur naturally. "Variant" includes functional and structural variants.

As used herein, "wild-type" is the average form of an organism, variety, strain, gene, protein, or characteristic as it occurs in a given population in nature, as distinguished from mutant forms that may result from selective breeding, recombinant engineering, and/or transformation with a transgene.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present invention. Thus, appearances of the phrases "in one embodiment," "in an embodiment," or "an example embodiment" in various places throughout this specification are not necessarily all referring to the same embodiment but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention. For example, in the appended claims, any of the claimed embodiments can be used in any combination.

All publications, published patent documents, and patent applications cited herein are hereby incorporated by reference to the same extent as though each individual publication, published patent document, or patent application was specifically and individually indicated as being incorporated by reference.

Overview

Global seafood consumption has reached 155 billion kg and is projected to reach 201 billion kg by 2030. This increase must come from aquaculture as capture fisheries has been level or declining for the past 50 years. The United States is the leading global importer of fish and fishery products, and 91% of the seafood consumed by value is imported, resulting in a trade deficit, which is increasing every year and is now $11.2 billion annually. The United States is not in a position to take advantage of the opportunity of the expanding global market of aquaculturally-grown fish, including catfish. At $2.64/kg multiplied by 46 billion kg, $121 billion of opportunity is on the table.

Americans alone are consuming 500 million kg of catfish (round or live weight, the billion pound+ mark) (Jimmy Avery, Mississippi State University, personal communication). However, 350 million kg (projected round weight from fillets) are from Vietnamese imports of catfish. If this market could be recaptured, United States catfish production could be tripled, but production costs must be reduced to accomplish this. Further, an "empty niche" equivalent to $908 million in gross income to processors and $482 million to producers per year has been created from the implementation of USDA catfish inspection programs, which resulted in a decrease in Vietnamese catfish fillet imports, and a decrease in competing white fish (e.g., tilapia) importation/production.

Catfish farming was and is the largest aquaculture industry in the US topping out at 350 million kg produced annually and accounting for approximately 70% of all US aquaculture production in 2000. Because of high production costs, the US recession and competition with inexpensive imported fish, including Asian catfish, production dropped to 138 million kg by 2011. Now Vietnam provides 70% of the catfish fillets consumed in the US. Catfish production grew slightly to approximately 150 million kg in 2015-2017 and continues to slowly grow with 158 million kg produced in 2019 (USDA NASS 2020). Catfish farms that survived the downsizing have been quite profitable. However, US catfish farming must become more efficient, productive and sustainable or it could become susceptible during the next economic downturn or if fuel and feed costs rise again. In that event, the quantity of aquatic food that we import will continue to grow, which opens up another Pandora's box of food safety, food security, and national security issues. The importance of not relying on other countries for food should be even more obvious considering the potential ramifications of the current global health concerns.

As such, there exists a tremendous void and opportunity for improvement in catfish production within the U.S. and worldwide.

With that said, embodiments disclosed herein can provide engineered fish comprising a modified melanocortin-4 receptor gene or gene product, and/or a modified myostatin gene or gene product, and optionally one or more exogenous genes, wherein the expression of the modified melanocortin-4 receptor gene or gene product is eliminated or decreased, the expression of the modified myostatin gene or gene product is eliminated or decreased. The engineered fish can have increased body weight, increased body mass, increased growth rate, increased amount of n-3 fatty acids, sterility, or any combination thereof. In some embodiments, the engineered fish can be generated using a genetic engineering technique. Also described herein are feed and/or food products comprising an engineered fish described herein or a portion thereof. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Engineered Fish

Described in certain example embodiments herein are engineered fish comprising a modified melanocortin-4 receptor gene or gene product, and/or a modified myostatin gene or gene product, wherein the modified melanocortin gene or gene product has decreased or eliminated expression, activity, or both as compared to a suitable control, and wherein the modified myostatin gene or gene product has decreased or eliminated expression, activity, or both as compared to a suitable control.

In certain example embodiments, the engineered fish further comprises a modified myostatin gene or gene product, wherein the modified myostatin gene or gene product has decreased or eliminated expression, activity, or both as compared to the suitable control.

In certain example embodiments, the engineered fish has increased body weight, increased body mass, increased growth rate, increased amount of n-3 fatty acids, increased disease resistance, sterility, or any combination thereof as compared to a suitable control. In some embodiments, the sterility is reversible, such as with hormone therapy. In certain example embodiments, the engineered fish has increased amount of docosahexaenoic acid (DHA) in one or more cells or tissues, increased amount of eicosapentaenoic acid (EPA) in one or more cells or tissues, or both as compared to a suitable control.

In some embodiments, the body weight, body mass, growth rate, the amount of one or more n-3 fatty acids (e.g., DHA and/or EPA), or any combination thereof of the engineered fish are each individually increased 1 to 1000 fold or more, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, to/or 1000 fold or more, as compared to a suitable control.

In some embodiments, the body weight, body mass, growth rate, or any combination thereof of the engineered fish are each individually 1 to 1000 percent or more, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, to/or 1000 fold or more, as compared to a suitable control.

In certain example embodiments, the modified melanocortin 4 receptor gene or gene product expression, activity, or both are each decreased 2-1000 fold. In some embodiments, the modified melanocortin 4 receptor gene or gene product expression, activity, or both are each decreased 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, to/or 1000 percent or more as compared to a suitable control.

In certain example embodiments, the modified myostatin gene or gene product expression, activity, or both are each decreased 2-1000 fold. In some embodiments, the modified myostatin gene or gene product expression, activity, or both are each decreased 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, to/or 1000 fold as compared to a suitable control.

In certain example embodiments, the modified melanocortin-4 receptor gene or gene product expression, activity, or both are each independently decreased 2-1000 fold, wherein the myostatin gene or gene product expression, activity, or both, are each independently decreased 2-1000 fold, or both.

In some embodiments, the modification to the myostatin and/or mc4-r gene and/or addition of one or more exogenous genes herein can increase disease and/or infection resistance. The term "increase in infection and/or disease resistance" refers to an improved ability of an organism to not be infected by an infectious organism (or resist infection by said infectious organism), to clear and/or kill an infections organism (e.g., kill and/or clear more efficiently or faster), increased survivability (reduced mortality), decreased clinical or subclinical disease and/or symptoms or pathologies thereof, and any combination thereof. In some embodiments, the engineered fish has increased resistance to a pathogenic bacteria, protozoan, fungi, virus, or any combination thereof. In some embodiments, the engineered fish has increased resistance to disease or infection by *Edwardsiella ictaluri, E. piscicida, Flavobacterium columnare, Aeromonas* species pathogenic bacteria (e.g., *A. hydrophila* and other motile *Aeromonas* species bacteria), and combinations thereof, as compared to a wild-type, non-engineered control, or other suitable control. In some embodiments, the improved disease resistance is demonstrated by a reduction in the loss in feed conversion efficiency, growth rate, body mass, and/or other production characteristic that is normally reduced as a result of infection or disease. In some embodiments, the engineered fish has 1 to 100 percent less mortality to a pathogenic organism (e.g., *Edwardsiella ictaluri, E. piscicida, Flavobacterium columnare, Aeromonas* species pathogenic bacteria (e.g., *A. hydrophila* and other motile *Aeromonas* species bacteria), and combinations thereof) as compared to a suitable control.

In certain example embodiments, the engineered fish is of the genus *Ictalurus, Ameiurus, Pylodictus*, or *Noturus*. In certain example embodiments, the engineered fish is *I. punctatus, I. furcatus, A. catus, A. nebulosus, A. natalis, A. melas, P. olivaris, N. insignis*, or *N. flavus*.

In some embodiments, the engineered fish is a hybrid of two or more catfish species, each selected from a species of the genus *Ictalurus, Ameiurus, Pylodictus*, and *Noturus*. In some embodiments, the engineered fish is a hybrid of two or more catfish species each selected from. *punctatus, I. furcatus, A. catus, A. nebulosus, A. natalis, A. melas, P. olivaris, N. insignis*, and *N. flavus*.

In some embodiments, the engineered fish can have one or more insertions, deletions, or both in myostatin and/or mc4-r. In some embodiments, 1-5,000 or more nucleotides are inserted into the myostatin and/or mc4-r genes and/or regulatory regions thereof. In some embodiments, 1-5,000 or more nucleotides are deleted from the myostatin and/or mc4-r genes and/or regulatory regions thereof.

In some embodiments, the engineered fish contains a modification of the myostatin and/or mc4-r genes, and optionally, 1, 2, 3, 4, 5, 6, 7, 8, 9, or 10 or more exogenous genes. In some embodiments, the engineered fish are generated by modifying one gene or adding one exogenous gene at a time. In some embodiments, the engineered fish are generated by modifying both myostatin and mc4-r at the same time. In some embodiments, the engineered fish are generated by modifying myostatin and/or mc4-r and, at the same time the modifications are made to myostatin and/or mc4-r, adding one or more exogenous genes. In some embodiments, engineered fish containing multiple modifications and/or additions or specific combinations of modifications and/or additions are generated by crossing engineered fish with at least one different modification or addition to obtain a desired combination of modification and/or additions.

In some embodiments, engineered fish of different species with the same or different modifications and/or additions are crossed to obtain a desired hybrid of genetic backgrounds with the desired modifications and/or additions.

The term "engineered fish" includes the F1 fingered fish as well as F2 and subsequent progeny thereof, gametes thereof and other cells therefrom.

The engineered fish can be grown, reproduced, and otherwise managed using routine aquaculture and farming techniques, which are generally known in the art. In some embodiments where the engineered fish are sterile, sterility can be reversed with appropriate hormone replacement treatments. In some embodiments, sterility in an engineered fish can be reversed by administering an amount of human chorionic gonadotropin (hCG), an amount of luteinizing hormone releasing hormone (LHRH) or both to one or both engineered fish in a mating pair. In some embodiments, the amount of hCG administered is about 25-200 g/kg bodyweight, such as about 25 g/kg, 30 g/kg, 35 g/kg, 40 g/kg, 45 g/kg, 50 g/kg, 55 g/kg, 60 g/kg, 65 g/kg, 70 g/kg, 75 g/kg, 80 g/kg, 85 g/kg, 90 g/kg, 95 g/kg, 100 g/kg, 105 g/kg, 110 g/kg, 115 g/kg, 120 g/kg, 125 g/kg, 130 g/kg, 135 g/kg, 140 g/kg, 145 g/kg, 150 g/kg, 155 g/kg, 160 g/kg, 165 g/kg, 170 g/kg, 175 g/kg, 180 ag/kg, 185 ag/kg, 190 ag/kg, 195 ag/kg, to/or 200 g/kg bodyweight.

In some embodiments, the amount of hCG ranges from about 1,000 IU to about 3,000 IU, such as about 1000 IU, 1010 IU, 1020 IU, 1030 IU, 1040 IU, 1050 IU, 1060 IU, 1070 IU, 1080 IU, 1090 IU, 1100 IU, 1110 IU, 1120 IU, 1130 IU, 1140 IU, 1150 IU, 1160 IU, 1170 IU, 1180 IU, 1190 IU, 1200 IU, 1210 IU, 1220 IU, 1230 IU, 1240 IU, 1250 IU, 1260 IU, 1270 IU, 1280 IU, 1290 IU, 1300 IU, 1310 IU, 1320 IU, 1330 IU, 1340 IU, 1350 IU, 1360 IU, 1370 IU, 1380 IU, 1390 IU, 1400 IU, 1410 IU, 1420 IU, 1430 IU, 1440 IU, 1450 IU, 1460 IU, 1470 IU, 1480 IU, 1490 IU, 1500 IU, 1510 IU, 1520 IU, 1530 IU, 1540 IU, 1550 IU, 1560 IU, 1570 IU, 1580 IU, 1590 IU, 1600 IU, 1610 IU, 1620 IU, 1630 IU, 1640 IU, 1650 IU, 1660 IU, 1670 IU, 1680 IU, 1690 IU, 1700 IU, 1710 IU, 1720 IU, 1730 IU, 1740 IU, 1750 IU, 1760 IU, 1770 IU, 1780 IU, 1790 IU, 1800 IU, 1810 IU, 1820 IU, 1830 IU, 1840 IU, 1850 IU, 1860 IU, 1870 IU, 1880 IU, 1890 IU, 1900 IU, 1910 IU, 1920 IU, 1930 IU, 1940 IU, 1950 IU, 1960 IU, 1970 IU, 1980 IU, 1990 IU, 2000 IU, 2010 IU, 2020 IU, 2030 IU, 2040 IU, 2050 IU, 2060 IU, 2070 IU, 2080 IU, 2090 IU, 2100 IU, 2110 IU, 2120 IU, 2130 IU, 2140 IU, 2150 IU, 2160 IU, 2170 IU, 2180 IU, 2190 IU, 2200 IU, 2210 IU, 2220 IU, 2230 IU, 2240 IU, 2250 IU, 2260 IU, 2270 IU, 2280 IU, 2290 IU, 2300 IU, 2310 IU, 2320 IU, 2330 IU, 2340 IU, 2350 IU, 2360 IU, 2370 IU, 2380 IU, 2390 IU, 2400 IU, 2410 IU, 2420 IU, 2430 IU, 2440 IU, 2450 IU, 2460 IU, 2470 IU, 2480 IU, 2490 IU, 2500 IU, 2510 IU, 2520 IU, 2530 IU, 2540 IU, 2550 IU, 2560 IU, 2570 IU, 2580 IU, 2590 IU, 2600 IU, 2610 IU, 2620 IU, 2630 IU, 2640 IU, 2650 IU, 2660 IU, 2670 IU, 2680 IU, 2690 IU, 2700 IU, 2710 IU, 2720 IU, 2730 IU, 2740 IU, 2750 IU, 2760 IU, 2770 IU, 2780 IU, 2790 IU, 2800 IU, 2810 IU, 2820 IU, 2830 IU, 2840 IU, 2850 IU, 2860 IU, 2870 IU, 2880 IU, 2890 IU, 2900 IU, 2910 IU, 2920 IU, 2930 IU, 2940 IU, 2950 IU, 2960 IU, 2970 IU, 2980 IU, 2990 IU, to/or about 3000 IU.

In some embodiments, the amount of LHRH administered is about 25-200 µg/kg bodyweight, such as about 25 µg/kg, 30 µg/kg, 35 µg/kg, 40 µg/kg, 45 µg/kg, 50 µg/kg, 55 µg/kg, 60 µg/kg, 65 µg/kg, 70 µg/kg, 75 µg/kg, 80 µg/kg, 85 µg/kg, 90 µg/kg, 95 µg/kg, 100 µg/kg, 105 µg/kg, 110 µg/kg, 115 µg/kg, 120 µg/kg, 125 µg/kg, 130 µg/kg, 135 µg/kg, 140 µg/kg, 145 µg/kg, 150 µg/kg, 155 µg/kg, 160 µg/kg, 165 µg/kg, 170 µg/kg, 175 µg/kg, 180 µg/kg, 185 µg/kg, 190 µg/kg, 195 µg/kg, to/or 200 µg/kg bodyweight. In some embodiments, the amount of LHRH ranges from about 1,000 IU to about 3,000 IU, such as about 1000 IU, 1010 IU, 1020 IU, 1030 IU, 1040 IU, 1050 IU, 1060 IU, 1070 IU, 1080 IU, 1090 IU, 1100 IU, 1110 IU, 1120 IU, 1130 IU, 1140 IU, 1150 IU, 1160 IU, 1170 IU, 1180 IU, 1190 IU, 1200 IU, 1210 IU, 1220 IU, 1230 IU, 1240 IU, 1250 IU, 1260 IU, 1270 IU, 1280 IU, 1290 IU, 1300 IU, 1310 IU, 1320 IU, 1330 IU, 1340 IU, 1350 IU, 1360 IU, 1370 IU, 1380 IU, 1390 IU, 1400 IU, 1410 IU, 1420 IU, 1430 IU, 1440 IU, 1450 IU, 1460 IU, 1470 IU, 1480 IU, 1490 IU, 1500 IU, 1510 IU, 1520 IU, 1530 IU, 1540 IU, 1550 IU, 1560 IU, 1570 IU, 1580 IU, 1590 IU, 1600 IU, 1610 IU, 1620 IU, 1630 IU, 1640 IU, 1650 IU, 1660 IU, 1670 IU, 1680 IU, 1690 IU, 1700 IU, 1710 IU, 1720 IU, 1730 IU, 1740 IU, 1750 IU, 1760 IU, 1770 IU, 1780 IU, 1790 IU, 1800 IU, 1810 IU, 1820 IU, 1830 IU, 1840 IU, 1850 IU, 1860 IU, 1870 IU, 1880 IU, 1890 IU, 1900 IU, 1910 IU, 1920 IU, 1930 IU, 1940 IU, 1950 IU, 1960 IU, 1970 IU, 1980 IU, 1990 IU, 2000 IU, 2010 IU, 2020 IU, 2030 IU, 2040 IU, 2050 IU, 2060 IU, 2070 IU, 2080 IU, 2090 IU, 2100 IU, 2110 IU, 2120 IU, 2130 IU, 2140 IU, 2150 IU, 2160 IU, 2170 IU, 2180 IU, 2190 IU, 2200 IU, 2210 IU, 2220 IU, 2230 IU, 2240 IU, 2250 IU, 2260 IU, 2270 IU, 2280 IU, 2290 IU, 2300 IU, 2310 IU, 2320 IU, 2330 IU, 2340 IU, 2350 IU, 2360 IU, 2370 IU, 2380 IU, 2390 IU, 2400 IU, 2410 IU, 2420 IU, 2430 IU, 2440 IU, 2450 IU, 2460 IU, 2470 IU, 2480 IU, 2490 IU, 2500 IU, 2510 IU, 2520 IU, 2530 IU, 2540 IU, 2550 IU, 2560 IU, 2570 IU, 2580 IU, 2590 IU, 2600 IU, 2610 IU, 2620 IU, 2630 IU, 2640 IU, 2650 IU, 2660 IU, 2670 IU, 2680 IU, 2690 IU, 2700 IU, 2710 IU, 2720 IU, 2730 IU, 2740 IU, 2750 IU, 2760 IU, 2770 IU, 2780 IU, 2790 IU, 2800 IU, 2810 IU, 2820 IU, 2830 IU, 2840 IU, 2850 IU, 2860 IU, 2870 IU, 2880 IU, 2890 IU, 2900 IU, 2910 IU, 2920 IU, 2930 IU, 2940 IU, 2950 IU, 2960 IU, 2970 IU, 2980 IU, 2990 IU, to/or about 3000 IU.

Hormone replacement therapy can be administered to female and male engineered fish. In some embodiments, the hormone replacement therapy regime is different between males and females. Administration can be by any suitable method. In some embodiments, administration is intraperitoneal. In some embodiments, where more than one hormone is administrated, administration can be simultaneous or sequential with different hormones being given at different times apart from each other. In some embodiments, multiple dosages (at the same or different amounts) can be administered. In some embodiments, a priming dose that contains about 20 percent of the total amount of hormone to be administered is given first followed at about 12-18 hours later, optionally 15 hours later, by a resolving dose that contains the remaining 80% of the amount of hormone to be administered.

Exogenous Genes and Constructs

In certain example embodiments, the engineered fish is modified to include and/or express one or more exogenous genes and/or gene products. In some embodiments, the one or more exogenous genes are selected from an elongase gene and/or gene product, an n-3 fatty acid biosynthesis gene and/or gene product, a cecropin gene and/or gene product, a cathelicidin gene and/or gene product, a growth hormone gene and/or gene product, or a follistatin gene and/or gene product. Genes and gene products as used in this context refer to complete genes or gene products or fragments or portions thereof that produce a functional gene or gene product.

In some embodiments, the elongase is a fatty acid elongase 2 gene and/or gene product. Exemplary fatty acid elongase genes and/or gene products are shown in Table 21. In some embodiments, the elongase gene is a *masu* salmon, *Oncorhynchus masou*, elongase gene.

TABLE 21

Exogenous Elongase Genes and Gene Products

| Gene ID | Gene symbol | Description | Scientific name | Common name | RefSeq Transcript accessions | RefSeq Protein accessions |
|---|---|---|---|---|---|---|
| 54326 | Elovl2 | elongation of very long chain fatty acids (FEN1/Elo2, SUR4/Elo3, yeast)-like 2 | *Mus musculus* | house mouse | NM_019423.2 | NP_062296.1 |
| 54898 | ELOVL2 | ELOVL fatty acid elongase 2 | *Homo sapiens* | human | NM_017770.4 | NP_060240.3 |
| 420858 | ELOVL2 | ELOVL fatty acid elongase 2 | *Gallus gallus* | chicken | NM_001197308.1 | NP_001184237.1 |
| 488219 | ELOVL2 | ELOVL fatty acid elongase 2 | *Canis lupus familiaris* | dog | XM_014110644.3 | XP_013966119.2 |
| 498728 | Elovl2 | ELOVL fatty acid elongase 2 | *Rattus norvegicus* | Norway rat | XM_039096006.1 | XP_038951934.1 |
| 548913 | elovl2 | ELOVL fatty acid elongase 2 | *Xenopus tropicalis* | tropical clawed frog | NM_001016159.2 | NP_001016159.1 |

TABLE 21-continued

Exogenous Elongase Genes and Gene Products

| Gene ID | Gene symbol | Description | Scientific name | Common name | RefSeq Transcript accessions | RefSeq Protein accessions |
|---|---|---|---|---|---|---|
| 615756 | ELOVL2 | ELOVL fatty acid elongase 2 | Bos taurus | cattle | NM_001083517.1 | NP_001076986.1 |
| 678614 | elovl2 | ELOVL fatty acid elongase 2 | Danio rerio | zebrafish | XM_005162571.4 | XP_005162628.1 |
| 703030 | ELOVL2 | ELOVL fatty acid elongase 2 | Macaca mulatta | Rhesus monkey | XM_015135533.2 | XP_014991019.1 |
| 750765 | ELOVL2 | ELOVL fatty acid elongase 2 | Pan troglodytes | chimpanzee | XM_009450495.3 | XP_009448770.1 |
| 100026914 | ELOVL2 | ELOVL fatty acid elongase 2 | Monodelphis domestica | gray short-tailed opossum | XM_007487945.2 | XP_007488007.1 |
| 100063624 | ELOVL2 | ELOVL fatty acid elongase 2 | Equus caballus | horse | XM_023624455.1 | XP_023480223.1 |
| 100084190 | ELOVL2 | ELOVL fatty acid elongase 2 | Ornithorhynchus anatinus | platypus | XM_029053170.2 | XP_028909003.2 |
| 100153368 | ELOVL2 | ELOVL fatty acid elongase 2 | Sus scrofa | pig | XM_021100179.1 | XP_020955838.1 |
| 100190615 | ELOVL2 | ELOVL fatty acid elongase 2 | Taeniopygia guttata | zebra finch | NM_001245548.1 | NP_001232477.1 |
| 100192341 | elovl2 | ELOVL fatty acid elongase 2 | Salmo salar | Atlantic salmon | NM_001136553.1 | NP_001130025.1 |
| 100358530 | ELOVL2 | ELOVL fatty acid elongase 2 | Oryctolagus cuniculus | rabbit | XM_002714176.3 | XP_002714222.1 |
| 100386025 | ELOVL2 | ELOVL fatty acid elongase 2 | Callithrix jacchus | white-tufted-ear marmoset | XM_002746228.4 | XP_002746274.2 |
| 100454419 | ELOVL2 | ELOVL fatty acid elongase 2 | Pongo abelii | Sumatran orangutan | XM_002816422.3 | XP_002816468.1 |
| 100472915 | ELOVL2 | ELOVL fatty acid elongase 2 | Ailuropoda melanoleuca | giant panda | XM_019796060.2 | XP_019651619.2 |
| 100538879 | ELOVL2 | ELOVL fatty acid elongase 2 | Meleagris gallopavo | turkey | XM_003204749.4 | XP_003204797.1 |
| 100558809 | elovl2 | ELOVL fatty acid elongase 2 | Anolis carolinensis | green anole | XM_008114988.1 | XP_008113195.1 |
| 100600368 | ELOVL2 | ELOVL fatty acid elongase 2 | Nomascus leucogenys | northern white-cheeked gibbon | XM_030817289.1 | XP_030673149.1 |
| 100677669 | ELOVL2 | ELOVL fatty acid elongase 2 | Loxodonta africana | African savanna elephant | XM_010597575.2 | XP_010595877.2 |
| 100724371 | Elovl2 | ELOVL fatty acid elongase 2 | Cavia porcellus | domestic guinea pig | XM_023564692.1 | XP_023420460.1 |
| 100764278 | Elovl2 | ELOVL fatty acid elongase 2 | Cricetulus griseus | Chinese hamster | XM_007647023.4 | XP_007645213.1 |
| 100922613 | ELOVL2 | ELOVL fatty acid elongase 2 | Sarcophilus harrisii | Tasmanian devil | XM_003760177.4 | XP_003760225.2 |
| 100959216 | ELOVL2 | ELOVL fatty acid elongase 2 | Otolemur garnettii | small-eared galago | XM_012804222.2 | XP_012659676.1 |
| 100979903 | ELOVL2 | ELOVL fatty acid elongase 2 | Pan paniscus | pygmy chimpanzee | XM_034961430.1 | XP_034817321.1 |
| 101024536 | ELOVL2 | ELOVL fatty acid elongase 2 | Papio anubis | olive baboon | XM_009204445.4 | XP_009202709.1 |
| 101041837 | ELOVL2 | ELOVL fatty acid elongase 2 | Saimiri boliviensis | Bolivian squirrel monkey | XM_010338052.2 | XP_010336354.1 |
| 101093184 | ELOVL2 | ELOVL fatty acid elongase 2 | Felis catus | domestic cat | XM_011282182.3 | XP_011280484.2 |
| 101116613 | ELOVL2 | ELOVL fatty acid elongase 2 | Ovis aries | sheep | XM_042236832.1 | XP_042092766.1 |
| 101140898 | ELOVL2 | ELOVL fatty acid elongase 2 | Gorilla gorilla | western gorilla | XM_031012491.1 | XP_030868351.1 |
| 101280861 | ELOVL2 | ELOVL fatty acid elongase 2 | Orcinus orca | killer whale | XM_004281036.3 | XP_004281084.1 |
| 101328710 | ELOVL2 | ELOVL fatty acid elongase 2 | Tursiops truncatus | common bottlenose dolphin | XM_033863642.1 | XP_033719533.1 |
| 101379042 | ELOVL2 | ELOVL fatty acid elongase 2 | Odobenus rosmarus divergens | Pacific walrus | XM_004403708.2 | XP_004403765.1 |
| 101421389 | ELOVL2 | ELOVL fatty acid elongase 2 | Dasypus novemcinctus | nine-banded armadillo | XM_004476950.1 | XP_004477007.1 |
| 101518847 | ELOVL2 | ELOVL fatty acid elongase 2 | Ochotona princeps | American pika | XM_012931138.1 | XP_012786592.1 |
| 101539805 | ELOVL2 | ELOVL fatty acid elongase 2 | Sorex araneus | European shrew | XM_012935044.1 | XP_012790498.1 |
| 101567306 | Elovl2 | ELOVL fatty acid elongase 2 | Octodon degus | degu | XM_004628362.3 | XP_004628419.1 |
| 101608833 | Elovl2 | ELOVL fatty acid elongase 2 | Jaculus jaculus | lesser Egyptian jerboa | XM_004667953.1 | XP_004668010.1 |

TABLE 21-continued

Exogenous Elongase Genes and Gene Products

| Gene ID | Gene symbol | Description | Scientific name | Common name | RefSeq Transcript accessions | RefSeq Protein accessions |
|---|---|---|---|---|---|---|
| 101634823 | ELOVL2 | ELOVL fatty acid elongase 2 | Condylura cristata | star-nosed mole | XM_012734658.1 | XP_012590112.1 |
| 101640613 | ELOVL2 | ELOVL fatty acid elongase 2 | Echinops telfairi | small Madagascar hedgehog | XM_013007127.1 | XP_012862581.1 |
| 101684694 | ELOVL2 | ELOVL fatty acid elongase 2 | Mustela putorius furo | domestic ferret | XM_004753710.2 | XP_004753767.1 |
| 101699326 | Elovl2 | ELOVL fatty acid elongase 2 | Heterocephalus glaber | naked mole-rat | XM_021260656.1 | XP_021116315.1 |
| 101796744 | ELOVL2 | ELOVL fatty acid elongase 2 | Anas platyrhynchos | mallard | XM_038175034.1 | XP_038030962.1 |
| 101813473 | ELOVL2 | ELOVL fatty acid elongase 2 | Ficedula albicollis | Collared flycatcher | XM_016296596.1 | XP_016152082.1 |
| 101838453 | Elovl2 | ELOVL fatty acid elongase 2 | Mesocricetus auratus | golden hamster | XM_040755881.1 | XP_040611815.1 |
| 101916881 | ELOVL2 | ELOVL fatty acid elongase 2 | Falco peregrinus | peregrine falcon | XM_005239094.2 | XP_005239151.2 |
| 101939130 | ELOVL2 | ELOVL fatty acid elongase 2 | Chrysemys picta | Painted turtle | XM_005305217.3 | XP_005305274.1 |
| 101977837 | Elovl2 | ELOVL fatty acid elongase 2 | Ictidomys tridecemlineatus | thirteen-lined ground squirrel | XM_005327473.3 | XP_005327530.1 |
| 101989856 | Elovl2 | ELOVL fatty acid elongase 2 | Microtus ochrogaster | prairie vole | XM_005355080.1 | XP_005355137.1 |
| 102019043 | Elovl2 | ELOVL fatty acid elongase 2 | Chinchilla lanigera | long-tailed chinchilla | XM_005398829.2 | XP_005398886.1 |
| 102039991 | ELOVL2 | ELOVL fatty acid elongase 2 | Geospiza fortis | medium ground-finch | XM_005424919.3 | XP_005424976.1 |
| 102048237 | ELOVL2 | ELOVL fatty acid elongase 2 | Falco cherrug | Saker falcon | XM_005434897.2 | XP_005434954.2 |
| 102072400 | ELOVL2 | ELOVL fatty acid elongase 2 | Zonotrichia albicollis | white-throated sparrow | XM_005481722.3 | XP_005481779.1 |
| 102096454 | ELOVL2 | ELOVL fatty acid elongase 2 | Columba livia | rock pigeon | XM_021301338.1 | XP_021157013.1 |
| 102106501 | ELOVL2 | ELOVL fatty acid elongase 2 | Pseudopodoces humilis | Tibetan ground-tit | XM_005525293.1 | XP_005525350.1 |
| 102124038 | ELOVL2 | ELOVL fatty acid elongase 2 | Macaca fascicularis | crab-eating macaque | XM_015449903.1 | XP_015305389.1 |
| 102177113 | ELOVL2 | ELOVL fatty acid elongase 2 | Capra hircus | goat | XM_018039308.1 | XP_017894797.1 |
| 102245763 | ELOVL2 | ELOVL fatty acid elongase 2 | Myotis brandtii | Brandt's bat | XM_005878443.2 | XP_005878505.1 |
| 102274409 | ELOVL2 | ELOVL fatty acid elongase 2 | Bos mutus | wild yak | XM_005905495.2 | XP_005905557.2 |
| 102346933 | ELOVL2 | ELOVL fatty acid elongase 2 | Latimeria chalumnae | coelacanth | XM_006006388.1 | XP_006006450.1 |
| 102378375 | ELOVL2 | ELOVL fatty acid elongase 2 | Alligator sinensis | Chinese alligator | XM_006025429.1 | XP_006025491.1 |
| 102403874 | ELOVL2 | ELOVL fatty acid elongase 2 | Bubalus bubalis | water buffalo | XM_025265691.1 | XP_025121476.1 |
| 102423696 | ELOVL2 | ELOVL fatty acid elongase 2 | Myotis lucifugus | little brown bat | XM_006092924.3 | XP_006092986.3 |
| 102457606 | ELOVL2 | ELOVL fatty acid elongase 2 | Pelodiscus sinensis | Chinese soft-shelled turtle | XM_025179355.1 | XP_025035140.1 |
| 102468519 | ELOVL2 | ELOVL fatty acid elongase 2 | Tupaia chinensis | Chinese tree shrew | XM_014591018.1 | XP_014446504.1 |
| 102519943 | ELOVL2 | ELOVL fatty acid elongase 2 | Camelus ferus | Wild Bactrian camel | XM_006181086.3 | XP_006181148.2 |
| 102529612 | ELOVL2 | ELOVL fatty acid elongase 2 | Vicugna pacos | alpaca | XM_031688102.1 | XP_031543962.1 |
| 102566964 | ELOVL2 | ELOVL fatty acid elongase 2 | Alligator mississippiensis | American alligator | XM_006277463.3 | XP_006277525.1 |
| 102693156 | elovl2 | ELOVL fatty acid elongase 2 | Lepisosteus oculatus | spotted gar | XM_015354967.1 | XP_015210453.1 |
| 102750542 | ELOVL2 | ELOVL fatty acid elongase 2 | Leptonychotes weddellii | Weddell seal | XM_006739817.2 | XP_006739880.1 |
| 102763123 | ELOVL2 | ELOVL fatty acid elongase 2 | Myotis davidii | | XM_006769735.2 | XP_006769798.1 |
| 102826889 | ELOVL2 | ELOVL fatty acid elongase 2 | Chrysochloris asiatica | Cape golden mole | XM_006864122.1 | XP_006864184.1 |
| 102860662 | ELOVL2 | ELOVL fatty acid elongase 2 | Elephantulus edwardii | Cape elephant shrew | XM_006891629.1 | XP_006891691.1 |

TABLE 21-continued

Exogenous Elongase Genes and Gene Products

| Gene ID | Gene symbol | Description | Scientific name | Common name | RefSeq Transcript accessions | RefSeq Protein accessions |
|---|---|---|---|---|---|---|
| 102891448 | ELOVL2 | ELOVL fatty acid elongase 2 | Pteropus alecto | black flying fox | XM_015587266.2 | XP_015442752.1 |
| 102925219 | Elovl2 | ELOVL fatty acid elongase 2 | Peromyscus maniculatus bairdii | prairie deer mouse | XM_006972802.2 | XP_006972864.1 |
| 102930723 | ELOVL2 | ELOVL fatty acid elongase 2 | Chelonia mydas | Green sea turtle | XM_037893166.1 | XP_037749094.1 |
| 102972782 | ELOVL2 | ELOVL fatty acid elongase 2 | Panthera tigris altaica | Amur tiger | XM_015534683.1 | XP_015390169.1 |
| 102991233 | ELOVL2 | ELOVL fatty acid elongase 2 | Physeter catodon | sperm whale | XM_007119883.1 | XP_007119945.1 |
| 103008327 | ELOVL2 | ELOVL fatty acid elongase 2 | Balaenoptera acutorostrata scammoni | | XM_007174087.1 | XP_007174149.1 |
| 103027447 | elovl2 | ELOVL fatty acid elongase 2 | Astyanax mexicanus | Mexican tetra | XM_007260074.3 | XP_007260136.2 |
| 103059597 | ELOVL2 | ELOVL fatty acid elongase 2 | Python bivittatus | Burmese python | XM_007437494.2 | XP_007437556.1 |
| 103085369 | ELOVL2 | ELOVL fatty acid elongase 2 | Lipotes vexillifer | Yangtze River dolphin | XM_007466404.1 | XP_007466466.1 |
| 103120869 | ELOVL2 | ELOVL fatty acid elongase 2 | Erinaceus europaeus | western European hedgehog | XM_007531354.2 | XP_007531416.1 |
| 103184556 | elovl2 | ELOVL fatty acid elongase 2 | Callorhinchus milii | elephant shark | XM_007902629.1 | XP_007900820.1 |
| 103206303 | ELOVL2 | ELOVL fatty acid elongase 2 | Orycteropus afer afer | | XM_007951750.1 | XP_007949941.1 |
| 103222171 | ELOVL2 | ELOVL fatty acid elongase 2 | Chlorocebus sabaeus | green monkey | XM_007973691.2 | XP_007971882.1 |
| 103290183 | ELOVL2 | ELOVL fatty acid elongase 2 | Eptesicus fuscus | big brown bat | XM_008146115.2 | XP_008144337.2 |
| 103531476 | ELOVL2 | ELOVL fatty acid elongase 2 | Calypte anna | Anna's hummingbird | XM_030446206.1 | XP_030302066.1 |
| 103567404 | ELOVL2 | ELOVL fatty acid elongase 2 | Equus przewalskii | Przewalski's horse | XM_008544052.1 | XP_008542274.1 |
| 103597257 | ELOVL2 | ELOVL fatty acid elongase 2 | Galeopterus variegatus | Sunda flying lemur | XM_008581075.1 | XP_008579297.1 |
| 103613138 | ELOVL2 | ELOVL fatty acid elongase 2 | Corvus brachyrhynchos | American crow | XM_017730645.1 | XP_017586134.1 |
| 103664917 | ELOVL2 | ELOVL fatty acid elongase 2 | Ursus maritimus | polar bear | XM_040645042.1 | XP_040500976.1 |
| 103732892 | Elovl2 | ELOVL fatty acid elongase 2 | Nannospalax galili | Upper Galilee mountains blind mole rat | XM_029562837.1 | XP_029418697.1 |
| 103767367 | ELOVL2 | ELOVL fatty acid elongase 2 | Manacus vitellinus | golden-collared manakin | XM_018077704.2 | XP_017933193.1 |
| 103778727 | ELOVL2 | ELOVL fatty acid elongase 2 | Merops nubicus | carmine bee-eater | XM_008946331.1 | XP_008944579.1 |
| 103799833 | ELOVL2 | ELOVL fatty acid elongase 2 | Acanthisitta chloris | rifleman | XM_009072182.1 | XP_009070430.1 |
| 103814974 | ELOVL2 | ELOVL fatty acid elongase 2 | Serinus canaria | Common canary | XM_009088706.3 | XP_009086954.1 |
| 103894334 | ELOVL2 | ELOVL fatty acid elongase 2 | Aptenodytes forsteri | emperor penguin | XM_009273687.1 | XP_009271962.1 |
| 103919028 | ELOVL2 | ELOVL fatty acid elongase 2 | Pygoscelis adeliae | Adelie penguin | XM_009326472.1 | XP_009324747.1 |
| 104021823 | ELOVL2 | ELOVL fatty acid elongase 2 | Nipponia nippon | crested ibis | XM_009475431.1 | XP_009473706.1 |
| 104038335 | ELOVL2 | ELOVL fatty acid elongase 2 | Pelecanus crispus | Dalmatian pelican | XM_009492668.1 | XP_009490943.1 |
| 104052414 | ELOVL2 | ELOVL fatty acid elongase 2 | Phalacrocorax carbo | great cormorant | XM_009513676.1 | XP_009511971.1 |
| 104062153 | ELOVL2 | ELOVL fatty acid elongase 2 | Cuculus canorus | common cuckoo | XM_009564184.1 | XP_009562479.1 |
| 104078112 | ELOVL2 | ELOVL fatty acid elongase 2 | Fulmarus glacialis | Northern fulmar | XM_009579632.1 | XP_009577927.1 |
| 104124799 | ELOVL2 | ELOVL fatty acid elongase 2 | Egretta garzetta | little egret | XM_009637173.2 | XP_009635468.2 |
| 104146087 | ELOVL2 | ELOVL fatty acid elongase 2 | Struthio camelus australis | | XM_009677976.1 | XP_009676271.1 |
| 104161574 | ELOVL2 | ELOVL fatty acid elongase 2 | Cariama cristata | Red-legged seriema | XM_009700062.1 | XP_009698364.1 |
| 104277638 | ELOVL2 | ELOVL fatty acid elongase 2 | Apaloderma vittatum | bar-tailed trogon | XM_009874335.1 | XP_009872637.1 |

TABLE 21-continued

Exogenous Elongase Genes and Gene Products

| Gene ID | Gene symbol | Description | Scientific name | Common name | RefSeq Transcript accessions | RefSeq Protein accessions |
|---|---|---|---|---|---|---|
| 104285703 | ELOVL2 | ELOVL fatty acid elongase 2 | Charadrius vociferus | killdeer | XM_009884187.1 | XP_009882489.1 |
| 104302284 | ELOVL2 | ELOVL fatty acid elongase 2 | Dryobates pubescens | Downy woodpecker | XM_009902776.1 | XP_009901078.1 |
| 104326707 | ELOVL2 | ELOVL fatty acid elongase 2 | Opisthocomus hoazin | | XM_009931517.1 | XP_009929819.1 |
| 104354901 | ELOVL2 | ELOVL fatty acid elongase 2 | Leptosomus discolor | cuckoo roller | XM_009961944.1 | XP_009960246.1 |
| 104366846 | ELOVL2 | ELOVL fatty acid elongase 2 | Tyto alba | Barn owl | XM_032987753.1 | XP_032843644.1 |
| 104383589 | ELOVL2 | ELOVL fatty acid elongase 2 | Tauraco erythrolophus | red-crested turaco | XM_009991783.1 | XP_009990085.1 |
| 104391606 | ELOVL2 | ELOVL fatty acid elongase 2 | Chaetura pelagica | chimney swift | XM_010000930.1 | XP_009999232.1 |
| 104408005 | ELOVL2 | ELOVL fatty acid elongase 2 | Nestor notabilis | Kea | XM_010017437.1 | XP_010015739.1 |
| 104484464 | ELOVL2 | ELOVL fatty acid elongase 2 | Chlamydotis macqueenii | Macqueen's bustard | XM_010126549.1 | XP_010124851.1 |
| 104500415 | ELOVL2 | ELOVL fatty acid elongase 2 | Buceros rhinoceros silvestris | | XM_010144057.1 | XP_010142359.1 |
| 104504637 | ELOVL2 | ELOVL fatty acid elongase 2 | Eurypyga helias | sunbittern | XM_010152948.1 | XP_010151250.1 |
| 104542249 | ELOVL2 | ELOVL fatty acid elongase 2 | Mesitornis unicolor | brown roatelo | XM_010186489.1 | XP_010184791.1 |
| 104567573 | ELOVL2 | ELOVL fatty acid elongase 2 | Tinamus guttatus | white-throated tinamou | XM_010214407.1 | XP_010212709.1 |
| 104614582 | ELOVL2 | ELOVL fatty acid elongase 2 | Phaethon lepturus | White-tailed tropicbird | XM_010285403.1 | XP_010283705.1 |
| 104640284 | ELOVL2 | ELOVL fatty acid elongase 2 | Balearica regulorum gibbericeps | East African grey crowned-crane | XM_010308604.1 | XP_010306906.1 |
| 104657375 | ELOVL2 | ELOVL fatty acid elongase 2 | Rhinopithecus roxellana | golden snub-nosed monkey | XM_030929547.1 | XP_030785407.1 |
| 104691457 | ELOVL2 | ELOVL fatty acid elongase 2 | Corvus cornix cornix | | XM_039549440.1 | XP_039405374.1 |
| 104835307 | ELOVL2 | ELOVL fatty acid elongase 2 | Haliaeetus leucocephalus | bald eagle | XM_010573222.1 | XP_010571524.1 |
| 104861424 | Elovl2 | ELOVL fatty acid elongase 2 | Fukomys damarensis | Damara mole-rat | XM_010622857.1 | XP_010621159.1 |
| 104985620 | ELOVL2 | ELOVL fatty acid elongase 2 | Bison bison bison | | XM_010835862.1 | XP_010834164.1 |
| 105019517 | elovl2 | ELOVL fatty acid elongase 2 | Esox lucius | northern pike | XM_010885755.5 | XP_010884057.1 |
| 105061619 | ELOVL2 | ELOVL fatty acid elongase 2 | Camelus bactrianus | Bactrian camel | XM_010945723.1 | XP_010944025.1 |
| 105102078 | ELOVL2 | ELOVL fatty acid elongase 2 | Camelus dromedarius | Arabian camel | XM_031435200.1 | XP_031291060.1 |
| 105300850 | ELOVL2 | ELOVL fatty acid elongase 2 | Pteropus vampyrus | large flying fox | XM_011373238.2 | XP_011371540.2 |
| 105482420 | ELOVL2 | ELOVL fatty acid elongase 2 | Macaca nemestrina | pig-tailed macaque | XM_011742511.1 | XP_011740813.1 |
| 105526809 | ELOVL2 | ELOVL fatty acid elongase 2 | Colobus angolensis palliatus | | XM_011962914.1 | χP_011818304.1 |
| 105546490 | ELOVL2 | ELOVL fatty acid elongase 2 | Mandrillus leucophaeus | drill | XM_011989694.1 | XP_011845084.1 |
| 105572532 | ELOVL2 | ELOVL fatty acid elongase 2 | Cercocebus atys | sooty mangabey | XM_012031287.1 | XP_011886677.1 |
| 105708738 | ELOVL2 | ELOVL fatty acid elongase 2 | Aotus nancymaae | Ma's night monkey | XM_012440345.2 | XP_012295768.1 |
| 105823063 | ELOVL2 | ELOVL fatty acid elongase 2 | Propithecus coquereli | Coquerel's sifaka | XM_012660149.1 | XP_012515603.1 |
| 105865215 | ELOVL2 | ELOVL fatty acid elongase 2 | Microcebus murinus | gray mouse lemur | XM_012753660.1 | XP_012609114.1 |
| 105985948 | Elovl2 | ELOVL fatty acid elongase 2 | Dipodomys ordii | Ord's kangaroo rat | XM_013016658.1 | XP_012872112.1 |
| 106041854 | ELOVL2 | ELOVL fatty acid elongase 2 | Anser cygnoides domesticus | | XM_013190492.1 | XP_013045946.1 |
| 106483674 | ELOVL2 | ELOVL fatty acid elongase 2 | Apteryx mantelli mantelli | | XM_013941658.1 | XP_013797112.1 |

TABLE 21-continued

Exogenous Elongase Genes and Gene Products

| Gene ID | Gene symbol | Description | Scientific name | Common name | RefSeq Transcript accessions | RefSeq Protein accessions |
|---|---|---|---|---|---|---|
| 106833224 | ELOVL2 | ELOVL fatty acid elongase 2 | *Equus asinus* | ass | XM_014844387.1 | XP_014699873.1 |
| 106854686 | ELOVL2 | ELOVL fatty acid elongase 2 | *Sturnus vulgaris* | Common starling | XM_014878743.1 | XP_014734229.1 |
| 106887269 | ELOVL2 | ELOVL fatty acid elongase 2 | *Calidris pugnax* | ruff | XM_014940726.1 | XP_014796212.1 |
| 106972032 | ELOVL2 | ELOVL fatty acid elongase 2 | *Acinonyx jubatus* | cheetah | XM_027040288.1 | XP_026896089.1 |
| 107111768 | ELOVL2 | ELOVL fatty acid elongase 2 | *Gekko japonicus* | | XM_015412797.1 | XP_015268283.1 |
| 107149247 | Elovl2 | ELOVL fatty acid elongase 2 | *Marmota marmota marmota* | Alpine marmot | XM_015494010.1 | XP_015349496.1 |
| 107214099 | ELOVL2 | ELOVL fatty acid elongase 2 | *Parus major* | Great Tit | XM_015649138.2 | XP_015504624.1 |
| 107282982 | ELOVL2 | ELOVL fatty acid elongase 2 | *Protobothrops mucrosquamatus* | | XM_015810824.1 | XP_015666310.1 |
| 107309660 | ELOVL2 | ELOVL fatty acid elongase 2 | *Coturnix japonica* | Japanese quail | XM_015854637.2 | XP_015710123.1 |
| 107497211 | ELOVL2 | ELOVL fatty acid elongase 2 | *Rousettus aegyptiacus* | Egyptian rousette | XM_016118815.2 | XP_015974301.1 |
| 107530396 | ELOVL2 | ELOVL fatty acid elongase 2 | *Miniopterus natalensis* | | XM_016204162.1 | XP_016059648.1 |
| 107565488 | elovl2 | ELOVL fatty acid elongase 2 | *Sinocyclocheilus grahami* | | XM_016250727.1 | XP_016106213.1 |
| 107731498 | elovl2 | ELOVL fatty acid elongase 2 | *Sinocyclocheilus rhinocerous* | | XM_016542599.1 | XP_016398085.1 |
| 108256217 | elovl2 | ELOVL fatty acid elongase 2 | *Ictalurus punctatus* | channel catfish | XM_017452845.1 | XP_017308334.1 |
| 108394296 | ELOVL2 | ELOVL fatty acid elongase 2 | *Manis javanica* | Malayan pangolin | XM_037011682.1 | XP_036867577.1 |
| 108426576 | elovl2 | ELOVL fatty acid elongase 2 | *Pygocentrus nattereri* | red-bellied piranha | XM_017696189.2 | XP_017551678.1 |
| 108494277 | ELOVL2 | ELOVL fatty acid elongase 2 | *Lepidothrix coronata* | blue-crowned manakin | XM_017808627.1 | XP_017664116.1 |
| 108541609 | ELOVL2 | ELOVL fatty acid elongase 2 | *Rhinopithecus bieti* | black snub-nosed monkey | XM_017891169.1 | XP_017746658.1 |
| 108788457 | ELOVL2 | ELOVL fatty acid elongase 2 | *Nanorana parkeri* | | XM_018558212.1 | XP_018413714.1 |
| 108927542 | elovl2 | ELOVL fatty acid elongase 2 | *Scleropages formosus* | Asian bonytongue | XM_018740928.2 | XP_018596444.1 |
| 109249646 | ELOVL2 | ELOVL fatty acid elongase 2 | *Panthera pardus* | leopard | XM_019420122.1 | XP_019275667.1 |
| 109301401 | ELOVL2 | ELOVL fatty acid elongase 2 | *Gavialis gangeticus* | Gharial | XM_019522561.1 | XP_019378106.1 |
| 109315505 | ELOVL2 | ELOVL fatty acid elongase 2 | *Crocodylus porosus* | Australian saltwater crocodile | XM_019543236.1 | XP_019398781.1 |
| 109377448 | ELOVL2 | ELOVL fatty acid elongase 2 | *Hipposideros armiger* | great roundleaf bat | XM_019633791.1 | XP_019489336.1 |
| 109576753 | ELOVL2 | ELOVL fatty acid elongase 2 | *Bos indicus* | zebu cattle | XM_019985380.1 | XP_019840939.1 |
| 109678157 | Elovl2 | ELOVL fatty acid elongase 2 | *Castor canadensis* | American beaver | XM_020153813.1 | XP_020009402.1 |
| 109909793 | elovl2 | ELOVL fatty acid elongase 2 | *Oncorhynchus kisutch* | coho salmon | XM_020508818.2 | XP_020364407.1 |
| 109927373 | elovl2 | ELOVL fatty acid elongase 2 | *Rhincodon typus* | whale shark | XM_020527370.1 | XP_020382959.1 |
| 110080848 | ELOVL2 | ELOVL fatty acid elongase 2 | *Pogona vitticeps* | central bearded dragon | XM_020797098.1 | XP_020652757.1 |
| 110135785 | ELOVL2 | ELOVL fatty acid elongase 2 | *Odocoileus virginianus texanus* | | XM_020891074.1 | XP_020746733.1 |
| 110192019 | ELOVL2 | ELOVL fatty acid elongase 2 | *Phascolarctos cinereus* | koala | XM_020963043.1 | XP_020818702.1 |
| 110307913 | Elovl2 | ELOVL fatty acid elongase 2 | *Mus caroli* | Ryukyu mouse | XM_021180182.2 | XP_021035841.1 |
| 110333993 | Elovl2 | ELOVL fatty acid elongase 2 | *Mus pahari* | shrew mouse | XM_021215811.2 | XP_021071470.1 |
| 110394508 | ELOVL2 | ELOVL fatty acid elongase 2 | *Numida meleagris* | helmeted guineafowl | XM_021388406.1 | XP_021244081.1 |
| 110473728 | ELOVL2 | ELOVL fatty acid elongase 2 | *Lonchura striata domestica* | Bengalese finch | XM_021536528.1 | XP_021392203.1 |
| 110554600 | Elovl2 | ELOVL fatty acid elongase 2 | *Meriones unguiculatus* | Mongolian gerbil | XM_021647284.1 | XP_021502959.1 |

TABLE 21-continued

Exogenous Elongase Genes and Gene Products

| Gene ID | Gene symbol | Description | Scientific name | Common name | RefSeq Transcript accessions | RefSeq Protein accessions |
|---|---|---|---|---|---|---|
| 110586935 | ELOVL2 | ELOVL fatty acid elongase 2 | *Neomonachus schauinslandi* | Hawaiian monk seal | XM_021697232.1 | XP_021552907.1 |
| 111181363 | ELOVL2 | ELOVL fatty acid elongase 2 | *Delphinapterus leucas* | beluga whale | XM_022586653.1 | XP_022442361.1 |
| 111521796 | ELOVL2 | ELOVL fatty acid elongase 2 | *Piliocolobus tephrosceles* | Ugandan red Colobus | XM_023185396.2 | XP_023041164.2 |
| 111840844 | elovl2 | ELOVL fatty acid elongase 2 | *Paramormyrops kingsleyae* | | XM_023806138.1 | XP_023661906.1 |
| 111923801 | ELOVL2 | ELOVL fatty acid elongase 2 | *Cyanistes caeruleus* | blue tit | XM_023919730.1 | XP_023775498.1 |
| 111972818 | elovl2 | ELOVL fatty acid elongase 2 | *Salvelinus alpinus* | Arctic char | XM_023999917.1 | XP_023855685.1 |
| 112215311 | elovl2 | ELOVL fatty acid elongase 2 | *Oncorhynchus tshawytscha* | Chinook salmon | XM_024374239.1 | XP_024230007.1 |
| 112309242 | ELOVL2 | ELOVL fatty acid elongase 2 | *Desmodus rotundus* | common vampire bat | XM_024565445.1 | XP_024421213.1 |
| 112412459 | ELOVL2 | ELOVL fatty acid elongase 2 | *Neophocaena asiaeorientalis asiaeorientalis* | Yangtze finless porpoise | XM_024764150.1 | XP_024619918.1 |
| 112622847 | ELOVL2 | ELOVL fatty acid elongase 2 | *Theropithecus gelada* | gelada | XM_025382827.1 | XP_025238612.1 |
| 112658378 | ELOVL2 | ELOVL fatty acid elongase 2 | *Canis lupus dingo* | dingo | XM_025444509.2 | XP_025300294.2 |
| 112838398 | ELOVL2 | ELOVL fatty acid elongase 2 | *Callorhinus ursinus* | northern fur seal | XM_025891265.1 | XP_025747050.1 |
| 112853721 | ELOVL2 | ELOVL fatty acid elongase 2 | *Puma concolor* | puma | XM_025917283.1 | XP_025773068.1 |
| 112920434 | ELOVL2 | ELOVL fatty acid elongase 2 | *Vulpes vulpes* | red fox | XM_025999224.1 | XP_025855009.1 |
| 112947295 | ELOVL2 | ELOVL fatty acid elongase 2 | *Nothoprocta perdicaria* | | XM_026039347.1 | XP_025895132.1 |
| 112965355 | ELOVL2 | ELOVL fatty acid elongase 2 | *Apteryx rowi* | Okarito brown kiwi | XM_026064264.1 | XP_025920049.1 |
| 113100627 | elovl2 | ELOVL fatty acid elongase 2 | *Carassius auratus* | goldfish | XM_026265249.1 | XP_026121034.1 |
| 113179871 | Elovl2 | ELOVL fatty acid elongase 2 | *Urocitellus parryii* | Arctic ground squirrel | XM_026384628.1 | XP_026240413.1 |
| 113264241 | ELOVL2 | ELOVL fatty acid elongase 2 | *Ursus arctos horribilis* | | XM_026511149.1 | XP_026366934.1 |
| 113413547 | ELOVL2 | ELOVL fatty acid elongase 2 | *Notechis scutatus* | mainland tiger snake | XM_026669884.1 | XP_026525669.1 |
| 113445725 | ELOVL2 | ELOVL fatty acid elongase 2 | *Pseudonaja textilis* | | XM_026715044.1 | XP_026570829.1 |
| 113477006 | ELOVL2 | ELOVL fatty acid elongase 2 | *Athene cunicularia* | burrowing owl | XM_026843068.1 | XP_026698869.1 |
| 113532568 | elovl2 | ELOVL fatty acid elongase 2 | *Pangasianodon hypophthalmus* | striped catfish | XM_026923982.2 | XP_026779783.1 |
| 113579578 | elovl2 | ELOVL fatty acid elongase 2 | *Electrophorus electricus* | electric eel | XM_027013627.2 | XP_026869428.1 |
| 113631605 | ELOVL2 | ELOVL fatty acid elongase 2 | *Lagenorhynchus obliquidens* | Pacific white-sided dolphin | XM_027128178.1 | XP_026983979.1 |
| 113659760 | elovl2 | ELOVL fatty acid elongase 2 | *Tachysurus fulvidraco* | yellow catfish | XM_027172767.1 | XP_027028568.1 |
| 113881332 | ELOVL2 | ELOVL fatty acid elongase 2 | *Bos indicus* x *Bos taurus* | hybrid cattle | XM_027524288.1 | XP_027380089.1 |
| 113927700 | ELOVL2 | ELOVL fatty acid elongase 2 | *Zalophus californianus* | California sea lion | XM_027603729.2 | XP_027459530.1 |
| 113952287 | ELOVL2 | ELOVL fatty acid elongase 2 | *Corapipo altera* | White-ruffed manakin | XM_027654178.1 | XP_027509979.1 |
| 113964232 | ELOVL2 | ELOVL fatty acid elongase 2 | *Neopelma chrysocephalum* | saffron-crested tyrant-manakin | XM_027676199.1 | XP_027532000.1 |
| 114000627 | ELOVL2 | ELOVL fatty acid elongase 2 | *Pipra filicauda* | Wire-tailed manakin | XM_027745074.2 | XP_027600875.1 |
| 114031665 | ELOVL2 | ELOVL fatty acid elongase 2 | *Vombatus ursinus* | common wombat | XM_027846848.1 | XP_027702649.1 |
| 114066346 | ELOVL2 | ELOVL fatty acid elongase 2 | *Empidonax traillii* | willow flycatcher | XM_027900954.1 | XP_027756755.1 |
| 114102814 | Elovl2 | ELOVL fatty acid elongase 2 | *Marmota flaviventris* | yellow-bellied marmot | XM_027948331.1 | XP_027804132.1 |
| 114212559 | ELOVL2 | ELOVL fatty acid elongase 2 | *Eumetopias jubatus* | Steller sea lion | XM_028107472.1 | XP_027963273.1 |

TABLE 21-continued

Exogenous Elongase Genes and Gene Products

| Gene ID | Gene symbol | Description | Scientific name | Common name | RefSeq Transcript accessions | RefSeq Protein accessions |
|---|---|---|---|---|---|---|
| 114497924 | ELOVL2 | ELOVL fatty acid elongase 2 | *Phyllostomus discolor* | pale spear-nosed bat | XM_028513931.2 | XP_028369732.1 |
| 114600905 | ELOVL2 | ELOVL fatty acid elongase 2 | *Podarcis muralis* | Common wall lizard | XM_028737736.1 | XP_028593569.1 |
| 114617592 | Elovl2 | ELOVL fatty acid elongase 2 | *Grammomys surdaster* | | XM_028763188.1 | XP_028619021.1 |
| 114641802 | elovl2 | ELOVL fatty acid elongase 2 | *Erpetoichthys calabaricus* | reedfish | XM_028790827.1 | XP_028646660.1 |
| 114692106 | Elovl2 | ELOVL fatty acid elongase 2 | *Peromyscus leucopus* | white-footed mouse | XM_028867764.2 | XP_028723597.1 |
| 114776949 | elovl2 | ELOVL fatty acid elongase 2 | *Denticeps clupeoides* | denticle herring | XM_028966898.1 | XP_028822731.1 |
| 114908105 | ELOVL2 | ELOVL fatty acid elongase 2 | *Monodon monoceros* | narwhal | XM_029244406.1 | XP_029100239.1 |
| 115085073 | ELOVL2 | ELOVL fatty acid elongase 2 | *Rhinatrema bivittatum* | two-lined caecilian | XM_029590659.1 | XP_029446519.1 |
| 115104868 | elovl2 | ELOVL fatty acid elongase 2 | *Oncorhynchus nerka* | sockeye salmon | XM_029626224.1 | XP_029482084.1 |
| 115149990 | elovl2 | ELOVL fatty acid elongase 2 | *Salmo trutta* | river trout | XM_029692851.1 | XP_029548711.1 |
| 115295180 | ELOVL2 | ELOVL fatty acid elongase 2 | *Suricata suricatta* | meerkat | XM_029943138.1 | XP_029798998.1 |
| 115352905 | ELOVL2 | ELOVL fatty acid elongase 2 | *Aquila chrysaetos chrysaetos* | | XM_030041684.2 | XP_029897544.1 |
| 115475348 | ELOVL2 | ELOVL fatty acid elongase 2 | *Microcaecilia unicolor* | | XM_030210995.1 | XP_030066855.1 |
| 115513593 | ELOVL2 | ELOVL fatty acid elongase 2 | *Lynx canadensis* | Canada lynx | XM_030314853.1 | XP_030170713.1 |
| 115646504 | ELOVL2 | ELOVL fatty acid elongase 2 | *Gopherus evgoodei* | Goodes thornscrub tortoise | XM_030552394.1 | XP_030408254.1 |
| 115807988 | elovl2 | ELOVL fatty acid elongase 2 | *Chanos chanos* | milkfish | XM_030769215.1 | XP_030625075.1 |
| 115866006 | ELOVL2 | ELOVL fatty acid elongase 2 | *Globicephala melas* | long-finned pilot whale | XM_030881170.1 | XP_030737030.1 |
| 115901130 | ELOVL2 | ELOVL fatty acid elongase 2 | *Camarhynchus parvulus* | | XM_030943483.1 | XP_030799343.1 |
| 116082068 | Elovl2 | ELOVL fatty acid elongase 2 | *Mastomys coucha* | southern multimammate mouse | XM_031358871.1 | XP_031214731.1 |
| 116226514 | ELOVL2 | ELOVL fatty acid elongase 2 | *Phasianus colchicus* | Ring-necked pheasant | XM_031589434.1 | XP_031445294.1 |
| 116447009 | ELOVL2 | ELOVL fatty acid elongase 2 | *Corvus moneduloides* | New Caledonian crow | XM_032115546.1 | XP_031971437.1 |
| 116460167 | ELOVL2 | ELOVL fatty acid elongase 2 | *Hylobates moloch* | silvery gibbon | XM_032141099.1 | XP_031996990.1 |
| 116485466 | ELOVL2 | ELOVL fatty acid elongase 2 | *Aythya fuligula* | tufted duck | XM_032180825.1 | XP_032036716.1 |
| 116512657 | ELOVL2 | ELOVL fatty acid elongase 2 | *Thamnophis elegans* | Western terrestrial garter snake | XM_032223259.1 | XP_032079150.1 |
| 116531257 | ELOVL2 | ELOVL fatty acid elongase 2 | *Sapajus apella* | tufted capuchin | XM_032249947.1 | XP_032105838.1 |
| 116589135 | ELOVL2 | ELOVL fatty acid elongase 2 | *Mustela erminea* | ermine | XM_032341099.1 | XP_032196990.1 |
| 116644922 | ELOVL2 | ELOVL fatty acid elongase 2 | *Phoca vitulina* | harbor seal | XM_032424779.1 | XP_032280670.1 |
| 116761514 | ELOVL2 | ELOVL fatty acid elongase 2 | *Phocoena sinus* | vaquita | XM_032647321.1 | XP_032503212.1 |
| 116795200 | ELOVL2 | ELOVL fatty acid elongase 2 | *Chiroxiphia lanceolata* | lance-tailed manakin | XM_032704677.1 | XP_032560568.1 |
| 116828590 | ELOVL2 | ELOVL fatty acid elongase 2 | *Chelonoidis abingdonii* | Abingdon island giant tortoise | XM_032786925.1 | XP_032642816.1 |
| 116869933 | ELOVL2 | ELOVL fatty acid elongase 2 | *Lontra canadensis* | Northern American river otter | XM_032861562.1 | XP_032717453.1 |
| 116883459 | Elovl2 | ELOVL fatty acid elongase 2 | *Rattus rattus* | black rat | XM_032884607.1 | XP_032740498.1 |
| 116968255 | elovl2 | ELOVL fatty acid elongase 2 | *Amblyraja radiata* | thorny skate | XM_033014952.1 | XP_032870843.1 |
| 116999761 | ELOVL2 | ELOVL fatty acid elongase 2 | *Catharus ustulatus* | Swainson's thrush | XM_033066737.1 | XP_032922628.1 |
| 117027580 | ELOVL2 | ELOVL fatty acid elongase 2 | *Rhinolophus ferrumequinum* | greater horseshoe bat | XM_033115495.1 | XP_032971386.1 |

TABLE 21-continued

Exogenous Elongase Genes and Gene Products

| Gene ID | Gene symbol | Description | Scientific name | Common name | RefSeq Transcript accessions | RefSeq Protein accessions |
|---|---|---|---|---|---|---|
| 117049711 | ELOVL2 | ELOVL fatty acid elongase 2 | Lacerta agilis | | XM_033154558.1 | XP_033010449.1 |
| 117086722 | ELOVL2 | ELOVL fatty acid elonease 2 | Trachypithecus francoisi | Francois's langur | XM_033216216.1 | XP_033072107.1 |
| 117353468 | ELOVL2 | ELOVL fatty acid elongase 2 | Geotrypetes seraphini | | XM_033929428.1 | XP_033785319.1 |
| 117672482 | ELOVL2 | ELOVL fatty acid elongase 2 | Pantherophis guttatus | | XM_034429132.1 | XP_034285023.1 |
| 117714168 | Elovl2 | ELOVL fatty acid elongase 2 | Arvicanthis niloticus | African grass rat | XM_034510833.1 | XP_034366724.1 |
| 117873199 | ELOVL2 | ELOVL fatty acid elongase 2 | Trachemys scripta elegans | | XM_034762298.1 | XP_034618189.1 |
| 118027455 | ELOVL2 | ELOVL fatty acid elongase 2 | Mirounga leonina | Southern elephant seal | XM_035030842.1 | XP_034886733.1 |
| 118090446 | ELOVL2 | ELOVL fatty acid elongase 2 | Zootoca vivipara | common lizard | XM_035126179.1 | XP_034982070.1 |
| 118161385 | ELOVL2 | ELOVL fatty acid elongase 2 | Oxyura jamaicensis | ruddy duck | XM_035316683.1 | XP_035172574.1 |
| 118254766 | ELOVL2 | ELOVL fatty acid elongase 2 | Cygnus atratus | black swan | XM_035560352.1 | XP_035416245.1 |
| 118544670 | ELOVL2 | ELOVL fatty acid elongase 2 | Halichoerus grypus | gray seal | XM_036106560.1 | XP_035962453.1 |
| 118584516 | Elovl2 | ELOVL fatty acid elongase 2 | Onychomys torridus | southern grasshopper mouse | XM_036188815.1 | XP_036044708.1 |
| 118626259 | ELOVL2 | ELOVL fatty acid elongase 2 | Molossus molossus | Pallas's mastiff bat | XM_036255659.1 | XP_036111552.1 |
| 118677101 | ELOVL2 | ELOVL fatty acid elongase 2 | Myotis myotis | | XM_036351888.1 | XP_036207781.1 |
| 118701673 | ELOVL2 | ELOVL fatty acid elongase 2 | Molothrus ater | | XM_036406431.1 | XP_036262324.1 |
| 118723603 | ELOVL2 | ELOVL fatty acid elongase 2 | Pipistrellus kuhlii | Kuhl's pipistrelle | XM_036446103.1 | XP_036301996.1 |
| 118848652 | ELOVL2 | ELOVL fatty acid elongase 2 | Trichosurus vulpecula | common brushtail | XM_036757654.1 | XP_036613549.1 |
| 118904185 | ELOVL2 | ELOVL fatty acid elongase 2 | Balaenoptera musculus | Blue whale | XM_036870069.1 | XP_036725964.1 |
| 118914145 | ELOVL2 | ELOVL fatty acid elongase 2 | Manis pentadactyla | Chinese pangolin | XM_036888692.1 | XP_036744587.1 |
| 118981153 | ELOVL2 | ELOVL fatty acid elongase 2 | Sturnira hondurensis | | XM_037037873.1 | XP_036893768.1 |
| 119054858 | ELOVL2 | ELOVL fatty acid elongase 2 | Artibeus jamaicensis | Jamaican fruit-eating bat | XM_037152888.1 | XP_037008783.1 |
| 119145104 | ELOVL2 | ELOVL fatty acid elongase 2 | Falco rusticolus | gyrfalcon | XM_037381203.1 | XP_037237100.1 |
| 119251608 | ELOVL2 | ELOVL fatty acid elongase 2 | Talpa occidentalis | Iberian mole | XM_037518862.1 | XP_037374759.1 |
| 119540226 | ELOVL2 | ELOVL fatty acid elongase 2 | Choloepus didactylus | southern two-toed sloth | XM_037844309.1 | XP_037700237.1 |
| 119697271 | ELOVL2 | ELOVL fatty acid elongase 2 | Motacilla alba alba | | XM_038127818.1 | XP_037983746.1 |
| 119817907 | Elovl2 | ELOVL fatty acid elongase 2 | Arvicola amphibius | Eurasian water vole | XM_038335364.2 | XP_038191292.1 |
| 119850346 | ELOVL2 | ELOVL fatty acid elongase 2 | Dermochelys coriacea | leatherback sea turtle | XM_038388180.1 | XP_038244108.1 |
| 119949645 | ELOVL2 | ELOVL fatty acid elongase 2 | Tachyglossus aculeatus | Australian echidna | XM_038771532.1 | XP_038627460.1 |
| 120231668 | ELOVL2 | ELOVL fatty acid elongase 2 | Hyaena hyaena | striped hyena | XM_039231859.1 | XP_039087790.1 |
| 120310780 | ELOVL2 | ELOVL fatty acid elongase 2 | Crotalus tigris | Tiger rattlesnake | XM_039349553.1 | XP_039205487.1 |
| 120398889 | ELOVL2 | ELOVL fatty acid elongase 2 | Mauremys reevesii | Reeves's turtle | XM_039526646.1 | XP_039382580.1 |
| 120503581 | ELOVL2 | ELOVL fatty acid elongase 2 | Passer montanus | Eurasian tree sparrow | XM_039712209.1 | XP_039568143.1 |
| 120598646 | ELOVL2 | ELOVL fatty acid elongase 2 | Pteropus giganteus | Indian flying fox | XM_039857597.1 | XP_039713531.1 |
| 120751963 | ELOVL2 | ELOVL fatty acid elongase 2 | Hirundo rustica | Barn swallow | XM_040062529.1 | XP_039918463.1 |
| 120869909 | ELOVL2 | ELOVL fatty acid elongase 2 | Oryx dammah | scimitar-horned oryx | XM_040249253.1 | XP_040105187.1 |

TABLE 21-continued

Exogenous Elongase Genes and Gene Products

| Gene ID | Gene symbol | Description | Scientific name | Common name | RefSeq Transcript accessions | RefSeq Protein accessions |
|---|---|---|---|---|---|---|
| 120940714 | ELOVL2 | ELOVL fatty acid elongase 2 | Rana temporaria | common frog | XM_040353721.1 | XP_040209655.1 |
| 121001860 | ELOVL2 | ELOVL fatty acid elongase 2 | Bufo bufo | common toad | XM_040433078.1 | XP_040289012.1 |
| 121020305 | ELOVL2 | ELOVL fatty acid elongase 2 | Puma yagouaroundi | jaguarundi | XM_040460297.1 | XP_040316231.1 |
| 121065737 | ELOVL2 | ELOVL fatty acid elongase 2 | Cygnus olor | mute swan | XM_040548730.1 | XP_040404664.1 |
| 121085229 | ELOVL2 | ELOVL fatty acid elongase 2 | Falco naumanni | lesser kestrel | XM_040587684.1 | XP_040443618.1 |
| 121159012 | ELOVL2 | ELOVL fatty acid elongase 2 | Ochotona curzoniae | black-lipped pika | XM_040983998.1 | XP_040839932.1 |
| 121340442 | ELOVL2 | ELOVL fatty acid elongase 2 | Onychostruthus taczanowskii | white-rumped snowfinch | XM_041413198.1 | XP_041269132.1 |
| 121357794 | ELOVL2 | ELOVL fatty acid elongase 2 | Pyrgilauda ruficollis | rufous-necked snowfinch | XM_041475413.1 | XP_041331347.1 |
| 121434019 | Elovl2 | ELOVL fatty acid elongase 2 | Microtus oregoni | creeping vole | XM_041632764.1 | XP_041488698.1 |
| 121500799 | ELOVL2 | ELOVL fatty acid elongase 2 | Vulpes lagopus | Arctic fox | XM_041772892.1 | XP_041628826.1 |
| 121674597 | ELOVL2 | ELOVL fatty acid elongase 2 | Corvus kubaryi | Mariana crow | XM_042049068.1 | XP_041905002.1 |

In some embodiments, the n-3 fatty acid biosynthesis gene and/or gene product is a Δ-4 desaturase (DEGS1) gene and/or gene product, a Δ-5 desaturase gene (FADS1) and/or gene product, and/or a Δ-6 desaturase (FADS2) gene and/or gene product. Exemplary n-3 fatty acid biosynthesis gene and/or gene products are shown in Tables 22-24. ID C22j t

TABLE 22

Exemplary Δ-4 desaturase (DEGS1) gene and/or gene product.

| Gene ID | Gene symbol | Description | Scientific name | Common name | RefSeq Transcript accessions | RefSeq Protein accessions |
|---|---|---|---|---|---|---|
| 8560 | DEGS1 | delta 4-desaturase, sphingolipid 1 | Homo sapiens | human | NM_003676.4 | NP_003667.1 |
| 13244 | Degs1 | delta(4)-desaturase, sphingolipid 1 | Mus musculus | house mouse | NM_007853.5 | NP_031879.1 |
| 327075 | degs1 | delta(4)-desaturase, sphingolipid 1 | Danio rerio | zebrafish | NM_212700.1 | NP_997865.1 |
| 421327 | DEGS1 | delta 4-desaturase, sphingolipid 1 | Gallus gallus | chicken | NM_001012565.1 | NP_001012583.1 |
| 457770 | DEGS1 | delta 4-desaturase, sphingolipid 1 | Pan troglodytes | chimpanzee | XM_514228.5 | XP_514228.3 |
| 490395 | DEGS1 | delta 4-desaturase, sphingolipid 1 | Canis lupus familiaris | dog | XM_038569744.1 | XP_038425672.1 |
| 493214 | degs1 | delta(4)-desaturase, sphingolipid 1 | Xenopus tropicalis | tropical clawed frog | NM_001007484.1 | NP_001007485.1 |
| 507290 | DEGS1 | delta 4-desaturase, sphingolipid 1 | Bos taurus | cattle | NM_001034289.2 | NP_001029461.1 |
| 702128 | DEGS1 | delta 4-desaturase, sphingolipid 1 | Macaca mulatta | Rhesus monkey | NM_001266006.1 | NP_001252935.1 |
| 100018776 | DEGS1 | delta 4-desaturase, sphingolipid 1 | Monodelphis domestica | gray short-tailed opossum | XM_001367859.4 | XP_001367896.1 |
| 100055442 | DEGS1 | delta 4-desaturase, sphingolipid 1 | Equus caballus | horse | XM_023632619.1 | XP_023488387.1 |
| 100081682 | DEGS1 | delta 4-desaturase, sphingolipid 1 | Ornithorhynchus anatinus | platypus | XM_029047357.2 | XP_028903190.1 |
| 100135677 | DEGS1 | delta 4-desaturase, sphingolipid 1 | Sus scrofa | pig | NM_001244121.1 | NP_001231050.1 |
| 100171788 | DEGS1 | delta 4-desaturase, sphingolipid 1 | Pongo abelii | Sumatran orangutan | NM_001131446.1 | NP_001124918.1 |
| 100192315 | DEGS1 | delta 4-desaturase, sphingolipid 1 | Ovis aries | sheep | NM_001136489.1 | NP_001129961.1 |

TABLE 22-continued

Exemplary Δ-4 desaturase (DEGS1) gene and/or gene product.

| Gene ID | Gene symbol | Description | Scientific name | Common name | RefSeq Transcript accessions | RefSeq Protein accessions |
|---|---|---|---|---|---|---|
| 100219126 | DEGS1 | delta 4-desaturase, sphingolipid 1 | Taeniopygia guttata | zebra finch | XM_002196980.5 | XP_002197016.1 |
| 100355393 | DEGS1 | delta 4-desaturase, sphingolipid 1 | Oryctolagus cuniculus | rabbit | XM_008268365.2 | XP_008266587.2 |
| 100404123 | DEGS1 | delta 4-desaturase, sphingolipid 1 | Callithrix jacchus | white-tufted-ear marmoset | XM_002760474.5 | XP_002760520.1 |
| 100478672 | DEGS1 | delta 4-desaturase, sphingolipid 1 | Ailuropoda melanoleuca | giant panda | XM_011228915.3 | XP_011227217.1 |
| 100545871 | DEGS1 | delta 4-desaturase, sphingolipid 1 | Meleagris gallopavo | turkey | XM_010706668.3 | XP_010704970.1 |
| 100551856 | degs1 | delta 4-desaturase, sphingolipid 1 | Anolis carolinensis | green anole | XM_003216073.3 | XP_003216121.1 |
| 100591022 | DEGS1 | delta 4-desaturase, sphingolipid 1 | Nomascus leucogenys | northern white-cheeked gibbon | XM_003275068.4 | XP_003275116.1 |
| 100663518 | DEGS1 | delta 4-desaturase, sphingolipid 1 | Loxodonta africana | African savanna elephant | XM_010591079.2 | XP_010589381.1 |
| 100711880 | degs1 | delta(4)-desaturase, sphingolipid 1 | Oreochromis niloticus | Nile tilapia | XM_003456661.4 | XP_003456709.1 |
| 100717671 | Degs1 | delta 4-desaturase, sphingolipid 1 | Cavia porcellus | domestic guinea pig | XM_003474232.4 | XP_003474280.1 |
| 100753569 | Degs1 | delta 4-desaturase, sphingolipid 1 | Cricetulus griseus | Chinese hamster | XM_007640891.3 | XP_007639081.1 |
| 100924041 | DEGS1 | delta 4-desaturase, sphingolipid 1 | Sarcophilus harrisii | Tasmanian devil | XM_031967060.1 | XP_031822920.1 |
| 100947778 | DEGS1 | delta 4-desaturase, sphingolipid 1 | Otolemur garnettii | small-eared galago | XM_003790974.3 | XP_003791022.1 |
| 100990486 | DEGS1 | delta 4-desaturase, sphingolipid 1 | Pan paniscus | pygmy chimpanzee | XM_008967773.2 | XP_008966021.1 |
| 101020274 | DEGS1 | delta 4-desaturase, sphingolipid 1 | Papio anubis | olive baboon | XM_003893060.2 | XP_003893109.1 |
| 101034740 | DEGS1 | delta 4-desaturase, sphingolipid 1 | Saimiri boliviensis | Bolivian squirrel monkey | XM_010340910.2 | XP_010339212.1 |
| 101083993 | DEGS1 | delta 4-desaturase, sphingolipid 1 | Felis catus | domestic cat | XM_023247544.1 | XP_023103312.1 |
| 101151016 | DEGS1 | delta 4-desaturase, sphingolipid 1 | Gorilla gorilla | western gorilla | XM_031001778.1 | XP_030857638.1 |
| 101175288 | degs1 | delta(4)-desaturase, sphingolipid 1 | Oryzias latipes | Japanese medaka | XM_004084367.4 | XP_004084415.1 |
| 101269383 | DEGS1 | delta 4-desaturase, sphingolipid 1 | Orcinus orca | killer whale | XM_004270998.3 | XP_004271046.1 |
| 101338156 | DEGS1 | delta 4-desaturase, sphingolipid 1 | Tursiops truncatus | common bottlenose dolphin | XM_004315077.2 | XP_004315125.1 |
| 101365656 | DEGS1 | delta 4-desaturase, sphingolipid 1 | Odobenus rosmarus divergens | Pacific walrus | XM_004393531.2 | XP_004393588.1 |
| 101420853 | DEGS1 | delta 4-desaturase, sphingolipid 1 | Dasypus novemcinctus | nine-banded armadillo | XM_012527622.2 | XP_012383076.1 |
| 101475928 | degs1 | delta(4)-desaturase, sphingolipid 1 | Maylandia zebra | zebra mbuna | XM_004572054.2 | XP_004572111.1 |
| 101532189 | DEGS1 | delta 4-desaturase, sphingolipid 1 | Ochotona princeps | American pika | XM_004578611.2 | XP_004578668.1 |
| 101543104 | DEGS1 | delta 4-desaturase, sphingolipid 1 | Sorex araneus | European shrew | XM_012932038.1 | XP_012787492.1 |
| 101580020 | Degs1 | delta 4-desaturase, sphingolipid 1 | Octodon degus | degu | XM_012513755.2 | XP_012369209.2 |
| 101600315 | Degs1 | delta 4-desaturase, sphingolipid 1 | Jaculus jaculus | lesser Egyptian jerboa | XM_004653409.1 | XP_004653466.1 |
| 101630789 | DEGS1 | delta 4-desaturase, sphingolipid 1 | Condylura cristata | star-nosed mole | XM_004695708.2 | XP_004695765.1 |
| 101649787 | DEGS1 | delta 4-desaturase, sphingolipid 1 | Echinops telfairi | small Madagascar hedgehog | XM_004699937.1 | XP_004699994.1 |
| 101677134 | DEGS1 | delta 4-desaturase, sphingolipid 1 | Mustela putorius furo | domestic ferret | XM_004761878.2 | XP_004761935.2 |
| 101722992 | Degs1 | delta 4-desaturase, sphingolipid 1 | Heterocephalus glaber | naked mole-rat | XM_004867439.2 | XP_004867496.1 |
| 101803108 | DEGS1 | delta 4-desaturase, sphingolipid 1 | Anas platyrhynchos | mallard | XM_027453068.2 | XP_027308869.1 |
| 101820925 | DEGS1 | delta 4-desaturase, sphingolipid 1 | Ficedula albicollis | Collared flycatcher | XM_016297207.1 | XP_016152693.1 |

TABLE 22-continued

Exemplary Δ-4 desaturase (DEGS1) gene and/or gene product.

| Gene ID | Gene symbol | Description | Scientific name | Common name | RefSeq Transcript accessions | RefSeq Protein accessions |
|---|---|---|---|---|---|---|
| 101834205 | Degs1 | delta 4-desaturase, sphingolipid 1 | *Mesocricetus auratus* | golden hamster | XM_040737848.1 | XP_040593782.1 |
| 101919611 | DEGS1 | delta 4-desaturase, sphingolipid 1 | *Falco peregrinus* | peregrine falcon | XM_013302803.2 | XP_013158257.1 |
| 101978291 | Degs1 | delta 4-desaturase, sphingolipid 1 | *Ictidomys tridecemlineatus* | thirteen-lined ground squirrel | XM_021727160.2 | XP_021582835.1 |
| 101997050 | Degs1 | delta 4-desaturase, sphingolipid 1 | *Microtus ochrogaster* | prairie vole | XM_005348935.3 | XP_005348992.1 |
| 102010618 | Degs1 | delta 4-desaturase, sphingolipid 1 | *Chinchilla lanigera* | long-tailed chinchilla | XM_005409229.2 | XP_005409286.2 |
| 102044700 | DEGS1 | delta 4-desaturase, sphingolipid 1 | *Geospiza fortis* | medium ground-finch | XM_014309485.2 | XP_014164960.1 |
| 102072480 | DEGS1 | delta 4-desaturase, sphingolipid 1 | *Zonotrichia albicollis* | white-throated sparrow | XM_005488493.3 | XP_005488550.1 |
| 102084187 | DEGS1 | delta 4-desaturase, sphingolipid 1 | *Columba livia* | rock pigeon | XM_013370047.2 | XP_013225501.1 |
| 102110893 | DEGS1 | delta 4-desaturase, sphingolipid 1 | *Pseudopodoces humilis* | Tibetan ground-tit | XM_005523302.2 | XP_005523359.1 |
| 102125533 | DEGS1 | delta 4-desaturase, sphingolipid 1 | *Macaca fascicularis* | crab-eating macaque | XM_005540946.2 | XP_005541003.1 |
| 102181802 | DEGS1 | delta 4-desaturase, sphingolipid 1 | *Capra hircus* | goat | XM_018060204.1 | XP_017915693.1 |
| 102230059 | degs1 | delta(4)-desaturase, sphingolipid 1 | *Xiphophorus maculatus* | southern platyfish | XM_005812087.2 | XP_005812144.2 |
| 102260316 | DEGS1 | delta 4-desaturase, sphingolipid 1 | *Myotis brandtii* | Brandt's bat | XM_014539951.1 | XP_014395437.1 |
| 102270794 | DEGS1 | delta 4-desaturase, sphingolipid 1 | *Bos mutus* | wild yak | XM_005903725.2 | XP_005903787.1 |
| 102303533 | degs1 | delta(4)-desaturase, sphingolipid 1 | *Haplochromis burtoni* | Burton's mouthbrooder | XM_005947814.3 | XP_005947876.1 |
| 102357565 | DEGS1 | delta(4)-desaturase, sphingolipid 1 | *Latimeria chalumnae* | coelacanth | XM_006008937.2 | XP_006008999.1 |
| 102374259 | DEGS1 | delta 4-desaturase, sphingolipid 1 | *Alligator sinensis* | Chinese alligator | XM_014524550.2 | XP_014380036.2 |
| 102405878 | DEGS1 | delta 4-desaturase, sphingolipid 1 | *Bubalus bubalis* | water buffalo | XM_006044914.2 | XP_006044976.1 |
| 102421059 | DEGS1 | delta 4-desaturase, sphingolipid 1 | *Myotis lucifugus* | little brown bat | XM_006107344.3 | XP_006107406.1 |
| 102457738 | DEGS1 | delta 4-desaturase, sphingolipid 1 | *Pelodiscus sinensis* | Chinese soft-shelled turtle | XM_006133418.3 | XP_006133480.1 |
| 102546011 | DEGS1 | delta 4-desaturase, sphingolipid 1 | *Vicugna pacos* | alpaca | XM_015234837.2 | XP_015090323.1 |
| 102559976 | DEGS1 | delta 4-desaturase, sphingolipid 1 | *Alligator mississippiensis* | American alligator | XM_006276633.3 | XP_006276695.1 |
| 102683140 | degs1 | delta(4)-desaturase, sphingolipid 1 | *Lepisosteus oculatus* | spotted gar | XM_006638668.2 | XP_006638731.1 |
| 102747118 | DEGS1 | delta 4-desaturase, sphingolipid 1 | *Leptonychotes weddellii* | Weddell seal | XM_031017231.1 | XP_030873091.1 |
| 102768904 | DEGS1 | delta 4-desaturase, sphingolipid 1 | *Myotis davidii* |  | XM_015562362.1 | XP_015417848.1 |
| 102787838 | degs1 | delta(4)-desaturase, sphingolipid 1 | *Neolamprologus brichardi* |  | XM_006808305.2 | XP_006808368.1 |
| 102813965 | DEGS1 | delta 4-desaturase, sphingolipid 1 | *Chrysochloris asiatica* | Cape golden mole | XM_006871142.1 | XP_006871204.1 |
| 102884338 | DEGS1 | delta 4-desaturase, sphingolipid 1 | *Pteropus alecto* | black flying fox | XM_015592754.2 | XP_015448240.1 |
| 102902832 | Degs1 | delta 4-desaturase, sphingolipid 1 | *Peromyscus maniculatus bairdii* | prairie deer mouse | XM_006988597.2 | XP_006988659.1 |
| 102936544 | DEGS1 | delta 4-desaturase, sphingolipid 1 | *Chelonia mydas* | Green sea turtle | XM_037895657.1 | XP_037751585.1 |
| 102972723 | DEGS1 | delta 4-desaturase, sphingolipid 1 | *Panthera tigris altaica* | Amur tiger | XM_015544465.1 | XP_015399951.1 |
| 102974202 | DEGS1 | delta 4-desaturase, sphingolipid 1 | *Physeter catodon* | sperm whale | XM_007109729.1 | XP_007109791.1 |
| 103035033 | degs1 | delta(4)-desaturase, sphingolipid 1 | *Astyanax mexicanus* | Mexican tetra | XM_007253188.3 | XP_007253250.1 |
| 103057812 | DEGS1 | delta 4-desaturase, sphingolipid 1 | *Python bivittatus* | Burmese python | XM_007426288.3 | XP_007426350.1 |

TABLE 22-continued

Exemplary Δ-4 desaturase (DEGS1) gene and/or gene product.

| Gene ID | Gene symbol | Description | Scientific name | Common name | RefSeq Transcript accessions | RefSeq Protein accessions |
|---|---|---|---|---|---|---|
| 103077083 | DEGS1 | delta 4-desaturase, sphingolipid 1 | *Lipotes vexillifer* | Yangtze River dolphin | XM_007454482.1 | XP_007454544.1 |
| 103119842 | DEGS1 | delta 4-desaturase, sphingolipid 1 | *Erinaceus europaeus* | western European hedgehog | XM_007530169.2 | XP_007530231.1 |
| 103154293 | degs1 | delta(4)-desaturase, sphingolipid 1 | *Poecilia formosa* | Amazon molly | XM_007575514.2 | XP_007575576.1 |
| 103181614 | degs1 | delta(4)-desaturase, sphingolipid 1 | *Callorhinchus milii* | elephant shark | NM_001292276.1 | NP_001279205.1 |
| 103230017 | DEGS1 | delta 4-desaturase, sphingolipid 1 | *Chlorocebus sabaeus* | green monkey | XM_007988341.2 | XP_007986532.1 |
| 103293455 | DEGS1 | delta 4-desaturase, sphingolipid 1 | *Eptesicus fuscus* | big brown bat | XM_008149805.2 | XP_008148027.1 |
| 103357108 | degs1 | delta(4)-desaturase, sphingolipid 1 | *Stegastes partitus* | bicolor damselfish | XM_008281513.1 | XP_008279735.1 |
| 103387773 | degs1 | delta(4)-desaturase, sphingolipid 1 | *Cynoglossus semilaevis* | tongue sole | XM_008322545.3 | XP_008320767.1 |
| 103476669 | degs1 | delta(4J-desaturase, sphingolipid 1 | *Poecilia reticulata* | guppy | XM_008429155.2 | XP_008427377.1 |
| 103529818 | DEGS1 | delta 4-desaturase, sphingolipid 1 | *Calypte anna* | Anna's hummingbird | XM_030447913.1 | XP_030303773.1 |
| 103556478 | DEGS1 | delta 4-desaturase, sphingolipid 1 | *Equus przewalskii* | Przewalski's horse | XM_008528625.1 | XP_008526847.1 |
| 103612696 | DEGS1 | delta 4-desaturase, sphingolipid 1 | *Corvus brachyrhynchos* | American crow | XM_008630406.2 | XP_008628628.1 |
| 103667253 | DEGS1 | delta 4-desaturase, sphingolipid 1 | *Ursus maritimus* | polar bear | XM_040636142.1 | XP_040492076.1 |
| 103726263 | Degs1 | delta 4-desaturase, sphingolipid 1 | *Nannospalax galili* | Upper Galilee mountains blind mole rat | XM_008823739.2 | XP_008821961.1 |
| 103779018 | DEGS1 | delta 4-desaturase, sphingolipid 1 | *Merops nubicus* | carmine bee-eater | XM_008946635.1 | XP_008944883.1 |
| 103808615 | DEGS1 | delta 4-desaturase, sphingolipid 1 | *Acanthisitta chloris* | rifleman | XM_009081407.1 | XP_009079655.1 |
| 103819278 | DEGS1 | delta 4-desaturase, sphingolipid 1 | *Serinus canaria* | Common canary | XM_009093756.3 | XP_009092004.1 |
| 103894451 | DEGS1 | delta 4-desaturase, sphingolipid 1 | *Aptenodytes forsteri* | emperor penguin | XM_009273836.2 | XP_009272111.1 |
| 103925021 | DEGS1 | delta 4-desaturase, sphingolipid 1 | *Pygoscelis adeliae* | Adelie penguin | XM_009333661.1 | XP_009331936.1 |
| 104019281 | DEGS1 | delta 4-desaturase, sphingolipid 1 | *Nipponia nippon* | crested ibis | XM_009472521.1 | XP_009470796.1 |
| 104037434 | DEGS1 | delta 4-desaturase, sphingolipid 1 | *Pelecanus crispus* | Dalmatian pelican | XM_009491384.1 | XP_009489659.1 |
| 104041661 | DEGS1 | delta 4-desaturase, sphingolipid 1 | *Phalacrocorax carbo* | great cormorant | XM_009500958.1 | XP_009499253.1 |
| 104067032 | DEGS1 | delta 4-desaturase, sphingolipid 1 | *Cuculus canorus* | common cuckoo | XM_009569720.1 | XP_009568015.1 |
| 104072071 | DEGS1 | delta 4-desaturase, sphingolipid 1 | *Fulmarus glacialis* | Northern fulmar | XM_009575263.1 | XP_009573558.1 |
| 104124691 | DEGS1 | delta 4-desaturase, sphingolipid 1 | *Egretta garzetta* | little egret | XM_009637063.2 | XP_009635358.1 |
| 104168857 | DEGS1 | delta 4-desaturase, sphingolipid 1 | *Cariama cristata* | Red-legged seriema | XM_009709622.1 | XP_009707924.1 |
| 104252909 | DEGS1 | delta 4-desaturase, sphingolipid 1 | *Gavia stellata* | red-throated loon | XM_009808959.1 | XP_009807261.1 |
| 104270260 | DEGS1 | delta 4-desaturase, sphingolipid 1 | *Apaloderma vittatum* | bar-tailed trogon | XM_009864566.1 | XP_009862868.1 |
| 104294660 | DEGS1 | delta 4-desaturase, sphingolipid 1 | *Charadrius vociferus* | killdeer | XM_009894293.1 | XP_009892595.1 |
| 104300888 | DEGS1 | delta 4-desaturase, sphingolipid 1 | *Dryobates pubescens* | Downy woodpecker | XM_009901208.1 | XP_009899510.1 |
| 104315400 | DEGS1 | delta 4-desaturase, sphingolipid 1 | *Haliaeetus albicilla* | white-tailed eagle | XM_009915343.1 | XP_009913645.1 |
| 104331968 | DEGS1 | delta 4-desaturase, sphingolipid 1 | *Opisthocomus hoazin* | | XM_009937338.1 | XP_009935640.1 |
| 104351728 | DEGS1 | delta 4-desaturase, sphingolipid 1 | *Leptosomus discolor* | cuckoo roller | XM_009957894.1 | XP_009956196.1 |
| 104360506 | DEGS1 | delta 4-desaturase, sphingolipid 1 | *Tyto alba* | Barn owl | XM_032989465.1 | XP_032845356.1 |

TABLE 22-continued

Exemplary Δ-4 desaturase (DEGS1) gene and/or gene product.

| Gene ID | Gene symbol | Description | Scientific name | Common name | RefSeq Transcript accessions | RefSeq Protein accessions |
|---|---|---|---|---|---|---|
| 104371359 | DEGS1 | delta 4-desaturase, sphingolipid 1 | Tauraco erythrolophus | red-crested turaco | XM_009978546.1 | XP_009976848.1 |
| 104386200 | DEGS1 | delta 4-desaturase, sphingolipid 1 | Chaetura pelagica | chimney swift | XM_009994764.1 | XP_009993066.1 |
| 104401229 | DEGS1 | delta 4-desaturase, sphingolipid 1 | Nestor notabilis | Kea | XM_010009488.1 | XP_010007790.1 |
| 104460504 | DEGS1 | delta 4-desaturase, sphingolipid 1 | Pterocles gutturalis | yellow-throated sandgrouse | XM_010082141.1 | XP_010080443.1 |
| 104477354 | DEGS1 | delta 4-desaturase, sphingolipid 1 | Chlamydotis macqueenii | Macqueen's bustard | XM_010117418.1 | XP_010115720.1 |
| 104487971 | DEGS1 | delta 4-desaturase, sphingolipid 1 | Buceros rhinoceros silvestris | | XM_010138716.1 | XP_010137018.1 |
| 104535614 | DEGS1 | delta 4-desaturase, sphingolipid 1 | Mesitornis unicolor | brown roatelo | XM_010193740.1 | XP_010192042.1 |
| 104552337 | DEGS1 | delta 4-desaturase, sphingolipid 1 | Colius striatus | speckled mousebird | XM_010209034.1 | XP_010207336.1 |
| 104570275 | DEGS1 | delta 4-desaturase, sphingolipid 1 | Tinamus guttatus | white-throated tinamou | XM_010217270.1 | XP_010215572.1 |
| 104621624 | DEGS1 | delta 4-desaturase, sphingolipid 1 | Phaethon lepturus | White-tailed tropicbird | XM_010288159.1 | XP_010286461.1 |
| 104631532 | DEGS1 | delta 4-desaturase, sphingolipid 1 | Balearica regulorum gibbericeps | East African grey crowned-crane | XM_010298773.1 | XP_010297075.1 |
| 104677277 | DEGS1 | delta 4-desaturase, sphingolipid 1 | Rhinopithecus roxellana | golden snub-nosed monkey | XM_010382259.2 | XP_010380561.1 |
| 104838135 | DEGS1 | delta 4-desaturase, sphingolipid 1 | Haliaeetus leucocephalus | bald eagle | XM_010577696.1 | XP_010575998.1 |
| 104938997 | degs1 | delta(4)-desaturase, sphingolipid 1 | Larimichthys crocea | large yellow croaker | XM_010755461.3 | XP_010753763.1 |
| 104957390 | degs1 | delta(4)-desaturase, sphingolipid 1 | Notothenia coriiceps | black rockcod | XM_010785018.1 | XP_010783320.1 |
| 104997878 | DEGS1 | delta 4-desaturase, sphingolipid 1 | Bison bison bison | | XM_010852846.1 | XP_010851148.1 |
| 105023239 | degs1 | delta(4)-desaturase, sphingolipid 1 | Esox lucius | northern pike | XM_010892276.3 | XP_010890578.2 |
| 105083946 | DEGS1 | delta 4-desaturase, sphingolipid 1 | Camelus bactrianus | Bactrian camel | XM_010973972.1 | XP_010972274.1 |
| 105099817 | DEGS1 | delta 4-desaturase, sphingolipid 1 | Camelus dromedarius | Arabian camel | XM_031438438.1 | XP_031294298.1 |
| 105292590 | DEGS1 | delta 4-desaturase, sphingolipid 1 | Pteropus vampyrus | large flying fox | XM_011360847.2 | XP_011359149.1 |
| 105478262 | DEGS1 | delta 4-desaturase, sphingolipid 1 | Macaca nemestrina | pig-tailed macaque | XM_011735397.1 | XP_011733699.1 |
| 105554481 | DEGS1 | delta 4-desaturase, sphingolipid 1 | Mandrillus leucophaeus | drill | XM_012000982.1 | XP_011856372.1 |
| 105576957 | DEGS1 | delta 4-desaturase, sphingolipid 1 | Cercocebus atys | sooty mangabey | XM_012040579.1 | XP_011895969.1 |
| 105722304 | DEGS1 | delta 4-desaturase, sphingolipid 1 | Aotus nancymaae | Ma's night monkey | XM_021677316.1 | XP_021532991.1 |
| 105863773 | DEGS1 | delta 4-desaturase, sphingolipid 1 | Microcebus murinus | gray mouse lemur | XM_012751240.1 | XP_012606694.1 |
| 105916050 | degs1 | delta(4)-desaturase, sphingolipid 1 | Fundulus heteroclitus | mummichog | XM_012850351.3 | XP_012705805.1 |
| 105984962 | Degs1 | delta 4-desaturase, sphingolipid 1 | Dipodomys ordii | Ord's kangaroo rat | XM_013015352.1 | XP_012870806.1 |
| 106482702 | DEGS1 | delta 4-desaturase, sphingolipid 1 | Apteryx mantelli mantelli | | XM_013940323.1 | XP_013795777.1 |
| 106535193 | degs1 | delta(4)-desaturase, sphingolipid 1 | Austrofundulus limnaeus | | XM_014032136.1 | XP_013887590.1 |
| 106549644 | DEGS1 | delta 4-desaturase, sphingolipid 1 | Thamnophis sirtalis | | XM_0140673 47.1 | XP_013922822.1 |
| 106734250 | DEGS1 | delta 4-desaturase, sphingolipid 1 | Tupaia chinensis | Chinese tree shrew | XM_014585646.2 | XP_014441132.2 |
| 106833179 | DEGS1 | delta 4-desaturase, sphingolipid 1 | Equus asinus | ass | XM_014844306.1 | XP_014699792.1 |
| 106853899 | DEGS1 | delta 4-desaturase, sphingolipid 1 | Sturnus vulgaris | Common starling | XM_014877403.1 | XP_014732889.1 |

TABLE 22-continued

Exemplary Δ-4 desaturase (DEGS1) gene and/or gene product.

| Gene ID | Gene symbol | Description | Scientific name | Common name | RefSeq Transcript accessions | RefSeq Protein accessions |
|---|---|---|---|---|---|---|
| 106892892 | DEGS1 | delta 4-desaturase, sphingolipid 1 | *Calidris pugnax* | ruff | XM_014950463.1 | XP_014805949.1 |
| 106920215 | degs1 | delta(4)-desaturase, sphingolipid 1 | *Poecilia mexicana* | | XM_014991090.1 | XP_014846576.1 |
| 106959557 | degs1 | delta(4)-desaturase, sphingolipid 1 | *Poecilia latipinna* | sailfin molly | XM_015052202.1 | XP_014907688.1 |
| 106983185 | DEGS1 | delta 4-desaturase, sphingolipid 1 | *Acinonyx jubatus* | cheetah | XM_027046350.1 | XP_026902151.1 |
| 107088921 | degs1 | delta(4)-desaturase, sphingolipid 1 | *Cyprinodon variegatus* | sheepshead minnow | XM_015381387.1 | XP_015236873.1 |
| 107121631 | DEGS1 | delta 4-desaturase, sphingolipid 1 | *Gekko japonicus* | | XM_015424586.1 | XP_015280072.1 |
| 107140288 | Degs1 | delta 4-desaturase, sphingolipid 1 | *Marmota marmota marmota* | Alpine marmot | XM_015483322.1 | XP_015338808.1 |
| 107201542 | DEGS1 | delta 4-desaturase, sphingolipid 1 | *Parus major* | Great Tit | XM_015620918.2 | XP_015476404.1 |
| 107292031 | DEGS1 | delta 4-desaturase, sphingolipid 1 | *Protobothrops mucrosquamatus* | | XM_015821449.2 | XP_015676935.1 |
| 107311009 | DEGS1 | delta 4-desaturase, sphingolipid 1 | *Coturnix japonica* | Japanese quail | XM_015857166.2 | XP_015712652.1 |
| 107376444 | degs1 | delta(4)-desaturase, snhinuolinid 1 | *Nothobranchius furzeri* | turquoise killifish | XM_015945548.1 | XP_015801034.1 |
| 107521085 | DEGS1 | delta 4-desaturase, sphingolipid 1 | *Rousettus aegyptiacus* | Egyptian rousette | XM_016165515.2 | XP_016021001.1 |
| 107543612 | DEGS1 | delta 4-desaturase, sphingolipid 1 | *Miniopterus natalensis* | | XM_016221173.1 | XP_016076659.1 |
| 107565896 | degs1 | delta(4)-desaturase, sphingolipid 1 | *Sinocyclocheilus grahami* | | XM_016251192.1 | XP_016106678.1 |
| 108242396 | degs1 | delta(4)-desaturase, sphingolipid 1 | *Kryptolebias marmoratus* | mangrove rivulus | XM_017427192.3 | XP_017282681.1 |
| 108260864 | degs1 | delta(4)-desaturase, sphingolipid 1 | *Ictalurus punctatus* | channel catfish | XM_017461523.1 | XP_017317012.1 |
| 108405657 | DEGS1 | delta 4-desaturase, sphingolipid 1 | *Manis javanica* | Malayan pangolin | XM_03 7022699.1 | XP_036878594.1 |
| 108412154 | degs1 | delta(4)-desaturase, sphingolipid 1 | *Pygocentrus nattereri* | red-bellied piranha | XM_017684071.2 | XP_017539560.1 |
| 108528244 | DEGS1 | delta 4-desaturase, sphingolipid 1 | *Rhinopithecus bieti* | black snub-nosed monkey | XM_017869946.1 | XP_017725435.1 |
| 108787065 | DEGS1 | delta 4-desaturase, sphingolipid 1 | *Nanorana parkeri* | | XM_018556510.1 | XP_018412012.1 |
| 108894847 | degs1 | delta(4)-desaturase, sphingolipid 1 | *Lates calcarifer* | barramundi perch | XM_018693472.1 | XP_018548988.1 |
| 108942606 | degs1 | delta(4)-desaturase, sphingolipid 1 | *Scleropages formosus* | Asian bonytongue | XM_018766047.2 | XP_018621563.1 |
| 109258915 | DEGS1 | delta 4-desaturase, sphingolipid 1 | *Panthera pardus* | leopard | XM_019436136.1 | XP_019291681.1 |
| 109296892 | DEGS1 | delta 4-desaturase, sphingolipid 1 | *Gavialis gangeticus* | Gharial | XM_019516510.1 | XP_019372055.1 |
| 109319767 | DEGS1 | delta 4-desaturase, sphingolipid 1 | *Crocodylus porosus* | Australian saltwater crocodile | XM_019549533.1 | XP_019405078.1 |
| 109381186 | DEGS1 | delta 4-desaturase, sphingolipid 1 | *Hipposideros armiger* | great roundleaf bat | XM_019639605.1 | XP_019495150.1 |
| 109517137 | degs1 | delta(4)-desaturase, sphingolipid 1 | *Hippocampus comes* | tiger tail seahorse | XM_019872099.1 | XP_019727658.1 |
| 109570649 | DEGS1 | delta 4-desaturase, sphingolipid 1 | *Bos indicus* | zebu cattle | XM_019976755.1 | XP_019832314.1 |
| 109639876 | degs1 | delta(4)-desaturase, sphingolipid 1 | *Paralichthys olivaceus* | Japanese flounder | XM_020103564.1 | XP_019959123.1 |

TABLE 22-continued

Exemplary Δ-4 desaturase (DEGS1) gene and/or gene product.

| Gene ID | Gene symbol | Description | Scientific name | Common name | RefSeq Transcript accessions | RefSeq Protein accessions |
|---|---|---|---|---|---|---|
| 109677085 | Degs1 | delta 4-desaturase, sphingolipid 1 | Castor canadensis | American beaver | XM_020153236.1 | XP_020008825.1 |
| 109964347 | degs1 | delta(4)-desaturase, sphingolipid 1 | Monopterus albus | swamp eel | XM_020607586.1 | XP_020463242.1 |
| 109987225 | degs1 | delta(4)-desaturase, sphingolipid 1 | Labrus bergylta | ballan wrasse | XM_020638245.2 | XP_020493901.1 |
| 110075366 | DEGS1 | delta 4-desaturase, sphingolipid 1 | Pogona vitticeps | central bearded dragon | XM_020786571.1 | XP_020642230.1 |
| 110128634 | DEGS1 | delta 4-desaturase, sphingolipid 1 | Odocoileus virginianus texanus | | XM_020879496.1 | XP_020735155.1 |
| 110156995 | degs1 | delta(4)-desaturase, sphingolipid 1 | Boleophthalmus pectinirostris | great blue-spotted mudskipper | XM_020921229.1 | XP_020776888.1 |
| 110205533 | DEGS1 | delta 4-desaturase, sphingolipid 1 | Phascolarctos cinereus | koala | XM_020982183.1 | XP_020837842.1 |
| 110292749 | Degs1 | delta 4-desaturase, sphingolipid 1 | Mus caroli | Ryukyu mouse | XM_021160292.2 | XP_021015951.1 |
| 110321736 | Degs1 | delta 4-desaturase, sphingolipid 1 | Mus pahari | shrew mouse | XM_021198186.2 | XP_021053845.1 |
| 110396071 | DEGS1 | delta 4-desaturase, sphingolipid 1 | Numida meleagris | helmeted guineafowl | XM_021391384.1 | XP_021247059.1 |
| 110546668 | Degs1 | delta 4-desaturase, sphingolipid 1 | Meriones unguiculatus | Mongolian gerbil | XM_021633648.1 | XP_021489323.1 |
| 110571359 | DEGS1 | delta 4-desaturase, sphingolipid 1 | Neomonachus schauinslandi | Hawaiian monk seal | XM_021679458.1 | XP_021535133.1 |
| 110955379 | degs1 | delta(4)-desaturase, sphingolipid 1 | Acanthochromis polyacanthus | spiny chromis | XM_022200345.1 | XP_022056037.1 |
| 111177510 | DEGS1 | delta 4-desaturase, sphingolipid 1 | Delphinapterus leucas | beluga whale | XM_022579299.2 | XP_022435007.1 |
| 111239209 | degs1 | delta(4)-desaturase, sphingolipid 1 | Seriola dumerili | greater amberjack | XM_022769038.1 | XP_022624759.1 |
| 111563648 | degs1 | delta(4)-desaturase, sphingolipid 1 | Amphiprion ocellaris | clown anemonefish | XM_023262816.2 | XP_023118584.1 |
| 111926254 | DEGS1 | delta 4-desaturase, sphingolipid 1 | Cyanistes caeruleus | blue tit | XM_023922903.1 | XP_023778671.1 |
| 112138714 | degs1 | delta(4)-desaturase, sphingolipid 1 | Oryzias melastigma | Indian medaka | XM_024261325.2 | XP_024117093.1 |
| 112318898 | DEGS1 | delta 4-desaturase, sphingolipid 1 | Desmodus rotundus | common vampire bat | XM_024576132.1 | XP_024431900.1 |
| 112622488 | DEGS1 | delta 4-desaturase, sphingolipid 1 | Theropithecus gelada | gelada | XM_025382253.1 | XP_025238038.1 |
| 112648843 | DEGS1 | delta 4-desaturase, sphingolipid 1 | Canis lupus dingo | dingo | XM_025430726.2 | XP_025286511.1 |
| 112828600 | DEGS1 | delta 4-desaturase, sphingolipid 1 | Callorhinus ursinus | northern fur seal | XM_025877797.1 | XP_025733582.1 |
| 112863081 | DEGS1 | delta 4-desaturase, sphingolipid 1 | Puma concolor | puma | XM_025926197.1 | XP_025781982.1 |
| 112923572 | DEGS1 | delta 4-desaturase, sphingolipid 1 | Vulpes vulpes | red fox | XM_026003462.1 | XP_025859247.1 |
| 112954812 | DEGS1 | delta 4-desaturase, sphingolipid 1 | Nothoprocta perdicaria | | XM_026048066.1 | XP_025903851.1 |
| 112980024 | DEGS1 | delta 4-desaturase, sphingolipid 1 | Dromaius novaehollandiae | emu | XM_026094595.1 | XP_025950380.1 |
| 113034623 | degs1 | delta(4)-desaturase, sphingolipid 1 | Astatotilapia calliptera | eastern happy | XM_026189355.1 | XP_026045140.1 |
| 113131845 | degs1 | delta(4)-desaturase, sphingolipid 1 | Mastacembelus armatus | zig-zag eel | XM_026309554.1 | XP_026165339.1 |
| 113159160 | degs1 | delta(4)-desaturase, sphingolipid 1 | Anabas testudineus | climbing perch | XM_026355706.1 | XP_026211491.1 |
| 113195569 | Degs1 | delta 4-desaturase, sphingolipid 1 | Urocitellus panyii | Arctic ground squirrel | XM_026407142.1 | XP_026262927.1 |
| 113262903 | DEGS1 | delta 4-desaturase, sphingolipid 1 | Ursus arctos horribilis | | XM_026509488.1 | XP_026365273.1 |
| 113421693 | DEGS1 | delta 4-desaturase, sphingolipid 1 | Notechis scutatus | mainland tiger snake | XM_026682214.1 | XP_026537999.1 |

TABLE 22-continued

Exemplary Δ-4 desaturase (DEGS1) gene and/or gene product.

| Gene ID | Gene symbol | Description | Scientific name | Common name | RefSeq Transcript accessions | RefSeq Protein accessions |
|---|---|---|---|---|---|---|
| 113433234 | DEGS1 | delta 4-desaturase, sphingolipid 1 | *Pseudonaja textilis* | | XM_026695688.1 | XP_026551473.1 |
| 113477792 | DEGS1 | delta 4-desaturase, sphingolipid 1 | *Athene cunicularia* | burrowing owl | XM_026844406.1 | XP_026700207.1 |
| 113585484 | degs1 | delta(4)-desaturase, sphingolipid 1 | *Electrophorus electricus* | electric eel | XM_027022990.2 | XP_026878791.1 |
| 113628547 | DEGS1 | delta 4-desaturase, sphingolipid 1 | *Lagenorhynchus obliquidens* | Pacific white-sided dolphin | XM_027122282.1 | XP_026978083.1 |
| 113906438 | DEGS1 | delta 4-desaturase, sphingolipid 1 | *Bos indicus* x *Bos taurus* | hybrid cattle | XM_027564541.1 | XP_027420342.1 |
| 113933334 | DEGS1 | delta 4-desaturase, sphingolipid 1 | *Zalophus californianus* | California sea lion | XM_027613326.2 | XP_027469127.1 |
| 113966774 | DEGS1 | delta 4-desaturase, sphingolipid 1 | *Neopelma chrysocephalum* | saffron-crested tyrant-manakin | XM_027681779.1 | XP_027537580.1 |
| 114073706 | DEGS1 | delta 4-desaturase, sphingolipid 1 | *Empidonax traillii* | willow flycatcher | XM_027911438.1 | XP_027767239.1 |
| 114137810 | degs1 | delta(4)-desaturase, sphingolipid 1 | *Xiphophorus couchianus* | Monterrey platy fish | XM_028006640.1 | XP_027862441.1 |
| 114215576 | DEGS1 | delta 4-desaturase, sphingolipid 1 | *Eumetopias jubatus* | Steller sea lion | XM_028111660.1 | XP_027967461.1 |
| 114447557 | degs1 | delta(4)-desaturase, sphingolipid 1 | *Parambassis ranga* | Indian glassy fish | XM_028423902.1 | XP_028279703.1 |
| 114512331 | DEGS1 | delta 4-desaturase, sphingolipid 1 | *Phyllostomus discolor* | pale spear-nosed bat | XM_028531237.2 | XP_028387038.1 |
| 114571717 | degs1 | delta(4)-desaturase, sphingolipid 1 | *Perca flavescens* | yellow perch | XM_028602855.1 | XP_028458656.1 |
| 114666095 | degs1 | delta(4)-desaturase, sphingolipid 1 | *Erpetoichthys calabaricus* | reedfish | XM_028820832.1 | XP_028676665.1 |
| 114684427 | Degs1 | delta 4-desaturase, sphingolipid 1 | *Peromyscus leucopus* | white-footed mouse | XM_028859013.2 | XP_028714846.1 |
| 114870463 | degs1 | delta(4)-desaturase, sphingolipid 1 | *Betta splendens* | Siamese fighting fish | XM_029175080.2 | XP_029030913.1 |
| 114899593 | DEGS1 | delta 4-desaturase, sphingolipid 1 | *Monodon monoceros* | narwhal | XM_029230508.1 | XP_029086341.1 |
| 115020237 | degs1 | delta(4)-desaturase, sphingolipid 1 | *Cottoperca gobio* | | XM_029450190.1 | XP_029306050.1 |
| 115055353 | degs1 | delta(4)-desaturase, sphingolipid 1 | *Echeneis naucrates* | live sharksucker | XM_029521090.1 | XP_029376950.1 |
| 115086779 | DEGS1 | delta 4-desaturase, sphingolipid 1 | *Rhinatrema bivittatum* | two-lined caecilian | XM_029593098.1 | XP_029448958.1 |
| 115288024 | DEGS1 | delta 4-desaturase, sphingolipid 1 | *Suricata suricatta* | meerkat | XM_029934932.1 | XP_029790792.1 |
| 115349823 | DEGS1 | delta 4-desaturase, sphingolipid 1 | *Aquila chrysaetos chrysaetos* | | XM_030034558.2 | XP_029890418.1 |
| 115399619 | degs1 | delta(4)-desaturase, sphingolipid 1 | *Salaries fasciatus* | jewelled blenny | XM_030107119.1 | XP_029962979.1 |
| 115465477 | DEGS1 | delta 4-desaturase, sphingolipid 1 | *Microcaecilia unicolor* | | XM_030195963.1 | XP_030051823.1 |
| 115505554 | DEGS1 | delta 4-desaturase, sphingolipid 1 | *Lynx canadensis* | Canada lynx | XM_030303203.1 | XP_030159063.1 |
| 115560503 | degs1 | delta(4)-desaturase, sphingolipid 1 | *Gadus morhua* | Atlantic cod | XM_030379953.1 | XP_030235813.1 |
| 115596268 | degs1 | delta(4)-desaturase, sphingolipid 1 | *Spares aurata* | gilthead seabream | XM_030441159.1 | XP_030297019.1 |
| 115777501 | degs1 | delta(4)-desaturase, sphingolipid 1 | *Archocentres centrarchus* | flier cichlid | XM_030725422.1 | XP_030581282.1 |
| 115809600 | degs1 | delta(4)-desaturase, sphingolipid 1 | *Chanos chanos* | milkfish | XM_030771324.1 | XP_030627184.1 |

TABLE 22-continued

Exemplary Δ-4 desaturase (DEGS1) gene and/or gene product.

| Gene ID | Gene symbol | Description | Scientific name | Common name | RefSeq Transcript accessions | RefSeq Protein accessions |
|---|---|---|---|---|---|---|
| 115859444 | DEGS1 | delta 4-desaturase, sphingolipid 1 | *Globicephala melas* | long-finned pilot whale | XM_030868395.1 | XP_030724255.1 |
| 115901865 | DEGS1 | delta 4-desaturase, sphingolipid 1 | *Camarhynchus parvulus* | | XM_030944859.1 | XP_030800719.1 |
| 116065930 | degs1 | delta(4)-desaturase, sphingolipid 1 | *Sander lucioperca* | pikeperch | XM_031321587.2 | XP_031177447.1 |
| 116230921 | DEGS1 | delta 4-desaturase, sphingolipid 1 | *Phasianus colchicus* | Ring-necked pheasant | XM_031596381.1 | XP_031452241.1 |
| 116333034 | degs1 | delta(4)-desaturase, sphingolipid 1 | *Oreochromis aureus* | | XM_031756157.2 | XP_031612017.1 |
| 116457596 | DEGS1 | delta 4-desaturase, sphingolipid 1 | *Hylobates moloch* | silvery gibbon | XM_032136893.1 | XP_031992784.1 |
| 116487408 | DEGS1 | delta 4-desaturase, sphingolipid 1 | *Aythya fuligula* | tufted duck | XM_032184323.1 | XP_032040214.1 |
| 116507429 | DEGS1 | delta 4-desaturase, sphingolipid 1 | *Thamnophis elegans* | Western terrestrial garter snake | XM_032215551.1 | XP_032071442.1 |
| 116559003 | DEGS1 | delta 4-desaturase, sphingolipid 1 | *Sapajus apella* | tufted capuchin | XM_032289371.1 | XP_032145262.1 |
| 116576227 | DEGS1 | delta 4-desaturase, sphingolipid 1 | *Mustela erminea* | ermine | XM_032318219.1 | XP_032174110.1 |
| 116625450 | DEGS1 | delta 4-desaturase, sphingolipid 1 | *Phoca vitulina* | harbor seal | XM_032393972.1 | XP_032249863.1 |
| 116696464 | degs1 | delta(4J-desaturase, sphingolipid 1 | *Etheostoma spectabile* | orangethroat darter | XM_032527495.1 | XP_032383386.1 |
| 116712798 | degs1 | delta(4J-desaturase, sphingolipid 1 | *Xiphophorus hellerii* | green swordtail | XM_032552638.1 | XP_032408529.1 |
| 116757512 | DEGS1 | delta 4-desaturase, sphingolipid 1 | *Phocoena sinus* | vaquita | XM_032639229.1 | XP_032495120.1 |
| 116825592 | DEGS1 | delta 4-desaturase, sphingolipid 1 | *Chelonoidis abingdonii* | Abingdon island giant tortoise | XM_032781724.1 | XP_032637615.1 |
| 116855751 | DEGS1 | delta 4-desaturase, sphingolipid 1 | *Lontra canadensis* | Northern American river otter | XM_032838739.1 | XP_032694630.1 |
| 116911331 | Degs1 | delta 4-desaturase, sphingolipid 1 | *Rattus rattus* | black rat | XM_032915249.1 | XP_032771140.1 |
| 116993422 | DEGS1 | delta 4-desaturase, sphingolipid 1 | *Catharus ustulatus* | Swainson's thrush | XM_033053946.1 | XP_032909837.1 |
| 117018533 | DEGS1 | delta 4-desaturase, sphingolipid 1 | *Rhinolophus ferrumequinum* | greater horseshoe bat | XM_033099577.1 | XP_032955468.1 |
| 117044183 | DEGS1 | delta 4-desaturase, sphingolipid 1 | *Lacerta agilis* | | XM_033144690.1 | XP_033000581.1 |
| 117076319 | DEGS1 | delta 4-desaturase, sphingolipid 1 | *Trachypithecus francoisi* | Francois's langur | XM_033199663.1 | XP_033055554.1 |
| 117356878 | DEGS1 | delta 4-desaturase, sphingolipid 1 | *Geotrypetes seraphini* | | XM_033936726.1 | XP_033792617.1 |
| 117671754 | DEGS1 | delta 4-desaturase, sphingolipid 1 | *Pantherophis guttatus* | | XM_034427913.1 | XP_034283804.1 |
| 117874499 | DEGS1 | delta 4-desaturase, sphingolipid 1 | *Trachemys scripta elegans* | | XM_034764666.1 | XP_034620557.1 |
| 118012997 | DEGS1 | delta 4-desaturase, sphingolipid 1 | *Mirounga leonina* | Southern elephant seal | XM_035008641.1 | XP_034864532.1 |
| 118164064 | DEGS1 | delta 4-desaturase, sphingolipid 1 | *Oxyura jamaicensis* | ruddy duck | XM_035321339.1 | XP_035177230.1 |
| 118253056 | DEGS1 | delta 4-desaturase, sphingolipid 1 | *Cygnus atratus* | black swan | XM_035557040.1 | XP_035412933.1 |
| 118552460 | DEGS1 | delta 4-desaturase, sphingolipid 1 | *Halichoerus grypus* | gray seal | XM_036118904.1 | XP_035974797.1 |
| 118593545 | Degs1 | delta 4-desaturase, sphingolipid 1 | *Onychomys torridus* | southern grasshopper mouse | XM_036203089.1 | XP_036058982.1 |
| 118640781 | DEGS1 | delta 4-desaturase, sphingolipid 1 | *Molossus molossus* | Pallas's mastiff bat | XM_036277791.1 | XP_036133684.1 |
| 118678810 | DEGS1 | delta 4-desaturase, sphingolipid 1 | *Myotis myotis* | | XM_036354851.1 | XP_036210744.1 |
| 118684957 | DEGS1 | delta 4-desaturase, sphingolipid 1 | *Molothrus ater* | | XM_036380253.1 | XP_036236146.1 |
| 118727624 | DEGS1 | delta 4-desaturase, sphingolipid 1 | *Pipistrellus kuhlii* | Kuhl's pipistrelle | XM_036453431.1 | XP_036309324.1 |

TABLE 22-continued

Exemplary Δ-4 desaturase (DEGS1) gene and/or gene product.

| Gene ID | Gene symbol | Description | Scientific name | Common name | RefSeq Transcript accessions | RefSeq Protein accessions |
|---|---|---|---|---|---|---|
| 118846622 | DEGS1 | delta 4-desaturase, sphingolipid 1 | Trichosurus vulpecula | common brushtail | XM_036755352.1 | XP_036611247.1 |
| 118905587 | DEGS1 | delta 4-desaturase, sphingolipid 1 | Balaenoptera musculus | Blue whale | XM_036872278.1 | XP_036728173.1 |
| 118908735 | DEGS1 | delta 4-desaturase, sphingolipid 1 | Manis pentadactyla | Chinese pangolin | XM_036879007.1 | XP_036734902.1 |
| 119003264 | DEGS1 | delta 4-desaturase, sphingolipid 1 | Sturnira hondurensis | | XM_037069523.1 | XP_036925418.1 |
| 119044429 | DEGS1 | delta 4-desaturase, sphingolipid 1 | Artibeus jamaicensis | Jamaican fruit-eating bat | XM_037138766.1 | XP_036994661.1 |
| 119156321 | DEGS1 | delta 4-desaturase, sphingolipid 1 | Falco rusticolus | gyrfalcon | XM_037405953.1 | XP_037261850.1 |
| 119244393 | DEGS1 | delta 4-desaturase, sphingolipid 1 | Talpa occidentalis | Iberian mole | XM_037510170.1 | XP_037366067.1 |
| 119524427 | DEGS1 | delta 4-desaturase, sphingolipid 1 | Choloepus didactylus | southern two-toed sloth | XM_037823086.1 | XP_037679014.1 |
| 119853435 | DEGS1 | delta 4-desaturase, sphingolipid 1 | Dermochelys coriacea | leatherback sea turtle | XM_038396512.1 | XP_038252440.1 |
| 119940973 | DEGS1 | delta 4-desaturase, sphingolipid 1 | Tachyglossus aculeatus | Australian echidna | XM_038761388.1 | XP_038617316.1 |
| 120234158 | DEGS1 | delta 4-desaturase, sphingolipid 1 | Hyaena hyaena | striped hyena | XM_039235863.1 | XP_039091794.1 |
| 120307215 | DEGS1 | delta 4-desaturase, sphingolipid 1 | Crotalus tigris | Tiger rattlesnake | XM_039341695.1 | XP_039197629.1 |
| 120400955 | DEGS1 | delta 4-desaturase, sphingolipid 1 | Mauremys reevesii | Reeves's turtle | XM_039530327.1 | XP_039386261.1 |
| 120505907 | DEGS1 | delta 4-desaturase, sphingolipid 1 | Passer montanus | Eurasian tree sparrow | XM_039716858.1 | XP_039572792.1 |
| 120619140 | DEGS1 | delta 4-desaturase, sphingolipid 1 | Pteropus giganteus | Indian flying fox | XM_039883318.1 | XP_039739252.1 |
| 120751038 | DEGS1 | delta 4-desaturase, sphingolipid 1 | Hirundo rustica | Barn swallow | XM_040060325.1 | XP_039916259.1 |
| 120880367 | DEGS1 | delta 4-desaturase, sphingolipid 1 | Oryx dammah | scimitar-horned oryx | XM_040263697.1 | XP_040119631.1 |
| 120937864 | DEGS1 | delta 4-desaturase, sphingolipid 1 | Rana temporaria | common frog | XM_040351388.1 | XP_040207322.1 |
| 120999617 | DEGS1 | delta 4-desaturase, sphingolipid 1 | Bufo bufo | common toad | XM_040430582.1 | XP_040286516.1 |
| 121067164 | DEGS1 | delta 4-desaturase, sphingolipid 1 | Cygnus olor | mute swan | XM_040551321.1 | XP_040407255.1 |
| 121095978 | DEGS1 | delta 4-desaturase, sphingolipid 1 | Falco naumanni | lesser kestrel | XM_040611393.1 | XP_040467327.1 |
| 121160063 | DEGS1 | delta 4-desaturase, sphingolipid 1 | Ochotona curzoniae | black-lipped pika | XM_040985749.1 | XP_040841683.1 |
| 121357002 | DEGS1 | delta 4-desaturase, sphingolipid 1 | Pyrgilauda ruficollis | rufous-necked snowfinch | XM_041473921.1 | XP_041329855.1 |
| 121435931 | Degs1 | delta 4-desaturase, sphingolipid 1 | Microtus oregoni | creeping vole | XM_041635511.1 | XP_041491445.1 |
| 121675998 | DEGS1 | delta 4-desaturase, sphingolipid 1 | Corvus kubaryi | Mariana crow | XM_042051888.1 | XP_041907822.1 |

TABLE 24

Exemplary Δ-5 desaturase (FADS1) gene and/or gene products

| Gene ID | Gene symbol | Description | Scientific name | Common name | RefSeq Transcript accessions | RefSeq Protein accessions |
|---|---|---|---|---|---|---|
| 3992 | FADS1 | fatty acid desaturase 1 | Homo sapiens | human | NM_013402.7 | NP_037534.5 |
| 76267 | Fads1 | fatty acid desaturase 1 | Mus musculus | house mouse | NM_146094.2 | NP_666206.1 |
| 84575 | Fads1 | fatty acid desaturase 1 | Rattus norvegicus | Norway rat | XM_006231075.4 | XP_006231137.1 |
| 423120 | FADS1 | fatty acid desaturase 1 | Gallus gallus | chicken | XM_421052.6 | XP_421052.4 |
| 444995 | FADS1 | fatty acid desaturase 1 | Sus scrofa | pig | NM_001113041.1 | NP_001106512.1 |
| 451243 | FADS1 | fatty acid desaturase 1 | Pan troglodytes | chimpanzee | NM_001364483.1 | NP_001351412.1 |

TABLE 24-continued

Exemplary Δ-5 desaturase (FADS1) gene and/or gene products

| Gene ID | Gene symbol | Description | Scientific name | Common name | RefSeq Transcript accessions | RefSeq Protein accessions |
|---|---|---|---|---|---|---|
| 483793 | FADS1 | fatty acid desaturase 1 | *Canis lupus familiaris* | dog | XM_014120903.3 | XP_013976378.2 |
| 533107 | FADS1 | fatty acid desaturase 1 | *Bos taurus* | cattle | XM_005226961.4 | XP_005227018.1 |
| 722343 | FADS1 | fatty acid desaturase 1 | *Macaca mulatta* | Rhesus monkey | XM_015113990.2 | XP_014969476.1 |
| 100126707 | FADS1 | fatty acid desaturase 1 | *Papio anubis* | olive baboon | NM_001112627.1 | NP_001106097.1 |
| 100225746 | FADS1 | fatty acid desaturase 1 | *Taeniopygia guttata* | zebra finch | XM_002194890.6 | XP_002194926.1 |
| 100342403 | FADS1 | fatty acid desaturase 1 | *Oryctolagus cuniculus* | rabbit | XM_008274405.2 | XP_008272627.2 |
| 100389579 | FADS1 | fatty acid desaturase 1 | *Callithrix jacchus* | white-tufted-ear marmoset | XM_003734280.4 | XP_003734328.2 |
| 100436159 | FADS1 | fatty acid desaturase 1 | *Pongo abelii* | Sumatran orangutan | XM_002821675.4 | XP_002821721.2 |
| 100472955 | FADS1 | fatty acid desaturase 1 | *Ailuropoda melanoleuca* | giant panda | XM_011233618.3 | XP_011231920.3 |
| 100549825 | FADS1 | fatty acid desaturase 1 | *Meleagris gallopavo* | turkey | XM_010711277.2 | XP_010709579.2 |
| 100596120 | FADS1 | fatty acid desaturase 1 | *Nomascus leucogenys* | northern white-cheeked gibbon | XM_030810927.1 | XP_030666787.1 |
| 100723348 | Fads1 | fatty acid desaturase 1 | *Cavia porcellus* | domestic guinea pig | XM_023563409.1 | XP_023419177.1 |
| 100922163 | FADS1 | fatty acid desaturase 1 | *Sarcophilus harrisii* | Tasmanian devil | XM_031942020.1 | XP_031797880.1 |
| 100954652 | FADS1 | fatty acid desaturase 1 | *Otolemur garnettii* | small-eared galago | XM_003798740.3 | XP_003798788.1 |
| 100981162 | FADS1 | fatty acid desaturase 1 | *Pan paniscus* | pygmy chimpanzee | XM_003828463.3 | XP_003828511.3 |
| 101052172 | FADS1 | fatty acid desaturase 1 | *Saimiri boliviensis* | Bolivian squirrel monkey | XM_003920210.3 | XP_003920259.2 |
| 101083966 | FADS1 | fatty acid desaturase 1 | *Felis catus* | domestic cat | XM_003993434.5 | XP_003993483.2 |
| 101109049 | FADS1 | fatty acid desaturase 1 | *Ovis aries* | sheep | XM_004019593.5 | XP_004019642.1 |
| 101136185 | FADS1 | fatty acid desaturase 1 | *Gorilla gorilla* | western gorilla | XM_004051322.3 | XP_004051370.2 |
| 101275971 | FADS1 | fatty acid desaturase 1 | *Orcinus orca* | killer whale | XM_004264199.2 | XP_004264247.1 |
| 101323401 | FADS1 | fatty acid desaturase 1 | *Tursiops truncatus* | common bottlenose dolphin | XM_033860806.1 | XP_033716697.1 |
| 101347278 | LOC101347278 | fatty acid desaturase 1 | *Trichechus manatus latirostris* | Florida manatee | XM_004383859.3 | XP_004383916.1 |
| 101364825 | FADS1 | fatty acid desaturase 1 | *Odobenus rosmarus divergens* | Pacific walrus | XM_004410052.1 | XP_004410109.1 |
| 101394671 | LOC101394671 | fatty acid desaturase 1 | *Ceratotherium simum simum* | southern white rhinoceros | XM_004437464.2 | XP_004437521.1 |
| 101417194 | FADS1 | fatty acid desaturase 1 | *Dasypus novemcinctus* | nine-banded armadillo | XM_023585916.1 | XP_023441684.1 |
| 101524219 | FADS1 | fatty acid desaturase 1 | *Ochotona princeps* | American pika | XM_004599340.2 | XP_004599397.2 |
| 101540344 | FADS1 | fatty acid desaturase 1 | *Sorex araneus* | European shrew | XM_004620835.1 | XP_004620892.1 |
| 101584143 | Fads1 | fatty acid desaturase 1 | *Octodon degus* | degu | XM_004646760.2 | XP_004646817.2 |
| 101609121 | Fads1 | fatty acid desaturase 1 | *Jaculus jaculus* | lesser Egyptian jerboa | XM_004667560.2 | XP_004667617.2 |
| 101628625 | FADS1 | fatty acid desaturase 1 | *Condylura cristata* | star-nosed mole | XM_012725299.1 | XP_012580753.1 |
| 101661682 | FADS1 | fatty acid desaturase 1 | *Echinops telfairi* | small Madagascar hedgehog | XM_004714993.1 | XP_004714995.1 |
| 101676081 | FADS1 | fatty acid desaturase 1 | *Mustela putorius furo* | domestic ferret | XM_004770328.2 | XP_004770385.1 |
| 101698014 | Fads1 | fatty acid desaturase 1 | *Heterocephalus glaber* | naked mole-rat | XM_004874299.3 | XP_004874356.1 |
| 101799007 | FADS1 | fatty acid desaturase 1 | *Anas platyrhynchos* | mallard | XM_027459434.2 | XP_027315235.2 |
| 101809791 | FADS1 | fatty acid desaturase 1 | *Ficedula albicollis* | Collared flycatcher | XM_005046422.2 | XP_005046479.2 |
| 101844332 | Fads1 | fatty acid desaturase 1 | *Mesocricetus auratus* | golden hamster | XM_021226013.2 | XP_021081672.1 |
| 101864778 | FADS1 | fatty acid desaturase 1 | *Macaca fascicularis* | crab-eating macaque | XM_005577617.2 | XP_005577674.1 |

TABLE 24-continued

Exemplary Δ-5 desaturase (FADS1) gene and/or gene products

| Gene ID | Gene symbol | Description | Scientific name | Common name | RefSeq Transcript accessions | RefSeq Protein accessions |
|---|---|---|---|---|---|---|
| 101871876 | LOC101871876 | fatty acid desaturase 1 | *Melopsittacus undulatus* | budgerigar | XM_034061396.1 | XP_033917287.1 |
| 101912001 | FADS1 | fatty acid desaturase 1 | *Falco peregrinus* | peregrine falcon | XM_013304043.2 | XP_013159497.1 |
| 101936861 | FADS1 | fatty acid desaturase 1 | *Chrysemys picta* | Painted turtle | XM_005289235.2 | XP_005289292.1 |
| 101971137 | Fads1 | fatty acid desaturase 1 | *Ictidomys tridecemlineatus* | thirteen-lined ground squirrel | XM_005331512.4 | XP_0053 31569.1 |
| 101999492 | Fads1 | fatty acid desaturase 1 | *Microtus ochrogaster* | prairie vole | XM_005369621.3 | XP_005369678.1 |
| 102049758 | FADS1 | fatty acid desaturase 1 | *Falco cherrug* | Saker falcon | XM_014279317.2 | XP_014134792.1 |
| 102069595 | FADS1 | fatty acid desaturase 1 | *Zonotrichia albicollis* | white-throated sparrow | XM_014270343.2 | XP_014125818.1 |
| 102098315 | FADS1 | fatty acid desaturase 1 | *Columba livia* | rock pigeon | XM_005511038.2 | XP_005511095.1 |
| 102112391 | FADS1 | fatty acid desaturase 1 | *Pseudopodoces humilis* | Tibetan ground-tit | XM_005531768.2 | XP_005531825.1 |
| 102150261 | FADS1 | fatty acid desaturase 1 | *Equus caballus* | horse | XM_023654187.1 | XP_023509955.1 |
| 102178247 | FADS1 | fatty acid desaturase 1 | *Capra hircus* | goat | XM_018043052.1 | XP_017898541.1 |
| 102261592 | FADS1 | fatty acid desaturase 1 | *Myotis brandtii* | Brandt's bat | XM_005872201.2 | XP_005872263.2 |
| 102276098 | FADS1 | fatty acid desaturase 1 | *Bos mutus* | wild yak | XM_005901286.2 | XP_005901348.1 |
| 102405648 | FADS1 | fatty acid desaturase 1 | *Bubalus bubalis* | water buffalo | XM_025286506.1 | XP_025142291.1 |
| 102500595 | FADS1 | fatty acid desaturase 1 | *Tupaia chinensis* | Chinese tree shrew | XM_014584608.1 | XP_014440094.1 |
| 102506763 | FADS1 | fatty acid desaturase 1 | *Camelus ferus* | Wild Bactrian camel | XM_006173186.3 | XP_006173248.1 |
| 102543424 | FADS1 | fatty acid desaturase 1 | *Vicugna pacos* | alpaca | XM_006214869.3 | XP_006214931.1 |
| 102739160 | FADS1 | fatty acid desaturase 1 | *Leptonychotes weddellii* | Weddell seal | XM_006730326.2 | XP_006730389.1 |
| 102773181 | FADS1 | fatty acid desaturase 1 | *Myotis davidii* | | XM_015569831.1 | XP_015425317.1 |
| 102836291 | FADS1 | fatty acid desaturase 1 | *Chrysochloris asiatica* | Cape golden mole | XM_006875003.1 | XP_006875065.1 |
| 102867262 | FADS1 | fatty acid desaturase 1 | *Elephantulus edwardii* | Cape elephant shrew | XM_006899878.1 | XP_006899940.1 |
| 102894313 | FADS1 | fatty acid desaturase 1 | *Pteropus alecto* | black flying fox | XM_006911219.3 | XP_006911281.1 |
| 102927379 | Fads1 | fatty acid desaturase 1 | *Peromyscus maniculatus bairdii* | prairie deer mouse | XM_006993861.2 | XP_006993923.1 |
| 102968608 | FADS1 | fatty acid desaturase 1 | *Panthera tigris altaica* | Amur tiger | XM_007092116.1 | XP_007092178.1 |
| 102988776 | FADS1 | fatty acid desaturase 1 | *Physeter catodon* | sperm whale | XM_007106188.2 | XP_007106250.2 |
| 103008410 | FADS1 | fatty acid desaturase 1 | *Balaenoptera acutorostrata scammoni* | | XM_007174422.1 | XP_007174484.1 |
| 103050792 | FADS1 | fatty acid desaturase 1 | *Python bivittatus* | Burmese python | XM_007426542.2 | XP_007426604.1 |
| 103082696 | FADS1 | fatty acid desaturase 1 | *Lipotes vexillifer* | Yangtze River dolphin | XM_007462164.1 | XP_007462226.1 |
| 103171425 | FADS1 | fatty acid desaturase 1 | *Ornithorhynchus anatinus* | platypus | XM_029061341.2 | XP_028917174.1 |
| 103200385 | FADS1 | fatty acid desaturase 1 | *Orycteropus afer afer* | | XM_007944893.1 | XP_007943084.1 |
| 103234224 | FADS1 | fatty acid desaturase 1 | *Chlorocebus sabaeus* | green monkey | XM_007995914.2 | XP_007994105.2 |
| 103303329 | FADS1 | fatty acid desaturase 1 | *Eptesicus fuscus* | big brown bat | XM_028137482.1 | XP_027993283.1 |
| 103532528 | FADS1 | fatty acid desaturase 1 | *Calypte anna* | Anna's hummingbird | XM_030450969.1 | XP_030306829.1 |
| 103543089 | FADS1 | fatty acid desaturase 1 | *Equus przewalskii* | Przewalski's horse | XM_008510001.1 | XP_008508223.1 |
| 103604811 | FADS1 | fatty acid desaturase 1 | *Galeopterus variegatus* | Sunda flying lemur | XM_008589391.1 | XP_008587613.1 |

TABLE 24-continued

Exemplary Δ-5 desaturase (FADS1) gene and/or gene products

| Gene ID | Gene symbol | Description | Scientific name | Common name | RefSeq Transcript accessions | RefSeq Protein accessions |
|---|---|---|---|---|---|---|
| 103614730 | FADS1 | fatty acid desaturase 1 | *Corvus brachyrhynchos* | American crow | XM_017732984.1 | XP_017588473.1 |
| 103678230 | FADS1 | fatty acid desaturase 1 | *Ursus maritimus* | polar bear | XM_040638767.1 | XP_040494701.1 |
| 103729124 | Fads1 | fatty acid desaturase 1 | *Nannospalax galili* | Upper Galilee mountains blind mole rat | XM_008827113.3 | XP_008825335.1 |
| 103822124 | FADS1 | fatty acid desaturase 1 | *Serinus canaria* | Common canary | XM_009097084.3 | XP_009095332.1 |
| 103907211 | FADS1 | fatty acid desaturase 1 | *Aptenodytes forsteri* | emperor penguin | XM_009289346.2 | XP_009287621.1 |
| 103925828 | FADS1 | fatty acid desaturase 1 | *Pygoscelis adeliae* | Adelie penguin | XM_009334599.1 | XP_009332874.1 |
| 104009483 | FADS1 | fatty acid desaturase 1 | *Nipponia nippon* | crested ibis | XM_009461488.1 | XP_009459763.1 |
| 104051707 | FADS1 | fatty acid desaturase 1 | *Phalacrocorax carbo* | great cormorant | XM_009512820.1 | XP_009511115.1 |
| 104062401 | FADS1 | fatty acid desaturase 1 | *Cuculus canorus* | common cuckoo | XM_009564456.1 | XP_009562751.1 |
| 104287519 | FADS1 | fatty acid desaturase 1 | *Charadrius vociferus* | killdeer | XM_009886236.1 | XP_009884538.1 |
| 104304441 | FADS1 | fatty acid desaturase 1 | *Dryobates pubescens* | Downy woodpecker | XM_009905182.1 | XP_009903484.1 |
| 104339408 | FADS1 | fatty acid desaturase 1 | *Opisthocomus hoazin* | | XM_009945560.1 | XP_009943862.1 |
| 104368249 | FADS1 | fatty acid desaturase 1 | *Tyto alba* | Barn owl | XM_033006787.1 | XP_032862678.1 |
| 104397493 | FADS1 | fatty acid desaturase 1 | *Chaetura pelagica* | chimney swift | XM_010007454.1 | XP_010005756.1 |
| 104679375 | FADS1 | fatty acid desaturase 1 | *Rhinopithecus roxellana* | golden snub-nosed monkey | XM_010384924.2 | XP_010383226.1 |
| 104829426 | FADS1 | fatty acid desaturase 1 | *Haliaeetus leucocephalus* | bald eagle | XM_010563652.1 | XP_010561954.1 |
| 104868384 | Fads1 | fatty acid desaturase 1 | *Fukomys damarensis* | Damara mole-rat | XM_033756779.1 | XP_033612670.1 |
| 104998703 | FADS1 | fatty acid desaturase 1 | *Bison bison bison* | | XM_010854034.1 | XP_010852336.1 |
| 105070110 | FADS1 | fatty acid desaturase 1 | *Camelus bactrianus* | Bactrian camel | XM_010956404.1 | XP_010954706.1 |
| 105094872 | FADS1 | fatty acid desaturase 1 | *Camelus dromedarius* | Arabian camel | XM_010986962.2 | XP_010985264.1 |
| 105297785 | FADS1 | fatty acid desaturase 1 | *Pteropus vampyrus* | large flying fox | XM_011368614.1 | XP_011366916.1 |
| 105469425 | FADS1 | fatty acid desaturase 1 | *Macaca nemestrina* | pig-tailed macaque | XM_011720415.2 | XP_011718717.1 |
| 105512288 | FADS1 | fatty acid desaturase 1 | *Colobus angolensis palliatus* | | XM_011942713.1 | XP_011798103.1 |
| 105577579 | FADS1 | fatty acid desaturase 1 | *Cercocebus atys* | sooty mangabey | XM_012042106.1 | XP_011897496.1 |
| 105718626 | FADS1 | fatty acid desaturase 1 | *Aotus nancymaae* | Ma's night monkey | XM_012454398.1 | XP_012309821.1 |
| 105825052 | FADS1 | fatty acid desaturase 1 | *Propithecus coquereli* | Coquerel's sifaka | XM_012662718.1 | XP_012518172.1 |
| 105878618 | FADS1 | fatty acid desaturase 1 | *Microcebus murinus* | gray mouse lemur | XM_012778264.2 | XP_012633718.1 |
| 105995514 | Fads1 | fatty acid desaturase 1 | *Dipodomys ordii* | Ord's kangaroo rat | XM_013029243.1 | XP_012884697.1 |
| 106033871 | FADS1 | fatty acid desaturase 1 | *Anser cygnoides domesticus* | | XM_013177618.1 | XP_013033072.1 |
| 106146259 | Fads1 | fatty acid desaturase 1 | *Chinchilla lanigera* | long-tailed chinchilla | XM_013506431.1 | XP_013361885.1 |
| 106490045 | FADS1 | fatty acid desaturase 1 | *Apteryx mantelli mantelli* | | XM_013949377.1 | XP_013804831.1 |
| 106538435 | FADS1 | fatty acid desaturase 1 | *Thamnophis sirtalis* | | XM_014052923.1 | XP_013908398.1 |
| 106847567 | FADS1 | fatty acid desaturase 1 | *Equus asinus* | ass | XM_014866888.1 | XP_014722374.1 |
| 106854757 | FADS1 | fatty acid desaturase 1 | *Sturnus vulgaris* | Common stalling | XM_014878837.1 | XP_014734323.1 |
| 106892012 | FADS1 | fatty acid desaturase 1 | *Calidris pugnax* | ruff | XM_014948877.1 | XP_014804363.1 |

TABLE 24-continued

Exemplary Δ-5 desaturase (FADS1) gene and/or gene products

| Gene ID | Gene symbol | Description | Scientific name | Common name | RefSeq Transcript accessions | RefSeq Protein accessions |
|---|---|---|---|---|---|---|
| 106986968 | FADS1 | fatty acid desaturase 1 | *Acinonyx jubatus* | cheetah | XM_027045943.1 | XP_026901744.1 |
| 107108852 | FADS1 | fatty acid desaturase 1 | *Gekko japonicus* | | XM_015409373.1 | XP_015264859.1 |
| 107135906 | Fads1 | fatty acid desaturase 1 | *Marmota marmota marmota* | Alpine marmot | XM_015478062.1 | XP_015333548.1 |
| 107501590 | FADS1 | fatty acid desaturase 1 | *Rousettus aegyptiacus* | Egyptian rousette | XM_016127891.2 | XP_015983377.1 |
| 107527686 | FADS1 | fatty acid desaturase 1 | *Miniopterus natalensis* | | XM_016200471.1 | XP_016055957.1 |
| 107977238 | Fads1 | fatty acid desaturase 1 | *Cricetulus griseus* | Chinese hamster | XM_035437365.1 | XP_035293256.1 |
| 108286222 | FADS1 | fatty acid desaturase 1 | *Cebus imitator* | Panamanian white-faced capuchin | XM_017503841.2 | XP_017359330.2 |
| 108392394 | FADS1 | fatty acid desaturase 1 | *Manis javanica* | Malayan pangolin | XM_017652599.2 | XP_017508088.1 |
| 108503096 | FADS1 | fatty acid desaturase 1 | *Lepidothrix coronata* | blue-crowned manakin | XM_017826729.1 | XP_017682218.1 |
| 108533599 | FADS1 | fatty acid desaturase 1 | *Rhinopithecus bieti* | black snub-nosed monkey | XM_017878417.1 | XP_017733906.1 |
| 108794178 | FADS1 | fatty acid desaturase 1 | *Nanorana parkeri* | | XM_018565180.1 | XP_018420682.1 |
| 109246555 | FADS1 | fatty acid desaturase 1 | *Panthera pardus* | leopard | XM_019414636.1 | XP_019270181.1 |
| 109390020 | FADS1 | fatty acid desaturase 1 | *Hipposideros armiger* | great roundleaf bat | XM_019656000.1 | XP_019511545.1 |
| 109554369 | FADS1 | fatty acid desaturase 1 | *Bos indicus* | zebu cattle | XM_019954808.1 | XP_019810367.1 |
| 109685566 | Fads1 | fatty acid desaturase 1 | *Castor canadensis* | American beaver | XM_020162494.1 | XP_020018083.1 |
| 110086192 | FADS1 | fatty acid desaturase 1 | *Pogona vitticeps* | central bearded dragon | XM_020806984.1 | XP_020662643.1 |
| 110153006 | FADS1 | fatty acid desaturase 1 | *Odocoileus virginianus texanus* | | XM_020916865.1 | XP_020772524.1 |
| 110195308 | FADS1 | fatty acid desaturase 1 | *Phascolarctos cinereus* | koala | XM_020968000.1 | XP_020823659.1 |
| 110285897 | Fads1 | fatty acid desaturase 1 | *Mus caroli* | Ryukyu mouse | XM_021152361.2 | XP_021008020.1 |
| 110322451 | Fads1 | fatty acid desaturase 1 | *Mus pahari* | shrew mouse | XM_021199127.2 | XP_021054786.1 |
| 110401255 | FADS1 | fatty acid desaturase 1 | *Numida meleagris* | helmeted guineafowl | XM_021402136.1 | XP_021257811.1 |
| 110484927 | FADS1 | fatty acid desaturase 1 | *Lonchura striata domestica* | Bengalese finch | XM_021555917.1 | XP_021411592.1 |
| 110548091 | Fads1 | fatty acid desaturase 1 | *Meriones unguiculatus* | Mongolian gerbil | XM_021636096.1 | XP_021491771.1 |
| 110576324 | FADS1 | fatty acid desaturase 1 | *Neomonachus schauinslandi* | Hawaiian monk seal | XM_021685472.1 | XP_021541147.1 |
| 111149587 | LOC111149587 | fatty acid desaturase 1 | *Enhydra lutris kenyoni* | | XM_022506707.1 | XP_022362415.1 |
| 111183884 | FADS1 | fatty acid desaturase 1 | *Delphinapterus leucas* | beluga whale | XM_022591790.2 | XP_022447498.1 |
| 111524317 | FADS1 | fatty acid desaturase 1 | *Piliocolobus tephrosceles* | Ugandan red Colobus | XM_023189473.2 | XP_023045241.1 |
| 112317234 | FADS1 | fatty acid desaturase 1 | *Desmodus rotundus* | common vampire bat | XM_024574308.1 | XP_024430076.1 |
| 112402054 | FADS1 | fatty acid desaturase 1 | *Neophocaena asiaeorientalis asiaeorientalis* | Yangtze finless porpoise | XM_024748579.1 | XP_024604347.1 |
| 112606126 | FADS1 | fatty acid desaturase 1 | *Theropithecus gelada* | gelada | XM_025356194.1 | XP_025211979.1 |
| 112828985 | FADS1 | fatty acid desaturase 1 | *Callorhinus ursinus* | northern fur seal | XM_025878262.1 | XP_025734047.1 |
| 112911088 | FADS1 | fatty acid desaturase 1 | *Vulpes vulpes* | red fox | XM_025987460.1 | XP_025843245.1 |
| 112948005 | FADS1 | fatty acid desaturase 1 | *Nothoprocta perdicaria* | | XM_026040204.1 | XP_025895989.1 |
| 112978023 | FADS1 | fatty acid desaturase 1 | *Apteryx rowi* | Okarito brown kiwi | XM_026091055.1 | XP_025946840.1 |
| 112991696 | FADS1 | fatty acid desaturase 1 | *Dromaius novaehollandiae* | emu | XM_026114362.1 | XP_025970147.1 |
| 113195848 | Fads1 | fatty acid desaturase 1 | *Urocitellus parryii* | Arctic ground squirrel | XM_026407518.1 | XP_026263303.1 |

TABLE 24-continued

Exemplary Δ-5 desaturase (FADS1) gene and/or gene products

| Gene ID | Gene symbol | Description | Scientific name | Common name | RefSeq Transcript accessions | RefSeq Protein accessions |
|---|---|---|---|---|---|---|
| 113246984 | FADS1 | fatty acid desaturase 1 | Ursus arctos horribilis | | XM_026487774.1 | XP_026343559.1 |
| 113481355 | FADS1 | fatty acid desaturase 1 | Athene cunicularia | burrowing owl | XM_026850905.1 | XP_026706706.1 |
| 113611197 | FADS1 | fatty acid desaturase 1 | Lagenorhynchus obliquidens | Pacific white-sided dolphin | XM_027089823.1 | XP_026945624.1 |
| 113886561 | FADS1 | fatty acid desaturase 1 | Bos indicus x Bos taurus | hybrid cattle | XM_027532901.1 | XP_027388702.1 |
| 113914860 | FADS1 | fatty acid desaturase 1 | Zalophus californianus | California sea lion | XM_027580436.2 | XP_027436237.2 |
| 113958842 | FADS1 | fatty acid desaturase 1 | Corapipo altera | White-ruffed manakin | XM_027667413.1 | XP_027523214.1 |
| 113960646 | FADS1 | fatty acid desaturase 1 | Neopelma chrysocephalum | saffron-crested tyrant-manakin | XM_027670310.1 | XP_027526111.1 |
| 113991950 | FADS1 | fatty acid desaturase 1 | Pipra filicauda | Wire-tailed manakin | XM_027728729.2 | XP_027584530.1 |
| 114040670 | FADS1 | fatty acid desaturase 1 | Vombatus ursinus | common wombat | XM_027858795.1 | XP_027714596.1 |
| 114099687 | Fads1 | fatty acid desaturase 1 | Marmota flaviventris | yellow-bellied marmot | XM_027944073.1 | XP_027799874.1 |
| 114220205 | FADS1 | fatty acid desaturase 1 | Eumetopias jubatus | Steller sea lion | XM_028117890.1 | XP_027973691.1 |
| 114499452 | FADS1 | fatty acid desaturase 1 | Phyllostomus discolor | pale spear-nosed bat | XM_028515643.2 | XP_028371444.1 |
| 114629513 | Fads1 | fatty acid desaturase 1 | Grammomys surdaster | | XM_028777565.1 | XP_028633398.1 |
| 114703435 | Fads1 | fatty acid desaturase 1 | Peromyscus leucopus | white-footed mouse | XM_028884282.2 | XP_028740115.1 |
| 114886729 | FADS1 | fatty acid desaturase 1 | Monodon monoceros | narwhal | XM_029207625.1 | XP_029063458.1 |
| 115079139 | FADS1 | fatty acid desaturase 1 | Rhinatrema bivittatum | two-lined caecilian | XM_029582258.1 | XP_029438118.1 |
| 115306039 | FADS1 | fatty acid desaturase 1 | Suricata suricatta | meerkat | XM_029956202.1 | XP_029812062.1 |
| 115468973 | FADS1 | fatty acid desaturase 1 | Microcaecilia unicolor | | XM_030201181.1 | XP_030057041.1 |
| 115524909 | FADS1 | fatty acid desaturase 1 | Lynx canadensis | Canada lynx | XM_030331683.1 | XP_030187543.1 |
| 115840661 | FADS1 | fatty acid desaturase 1 | Globicephala melas | long-finned pilot whale | XM_030833959.1 | XP_030689819.1 |
| 115904063 | FADS1 | fatty acid desaturase 1 | Camarhynchus parvulus | | XM_030949143.1 | XP_030805003.1 |
| 116103544 | Fads1 | fatty acid desaturase 1 | Mastomys coucha | southern multimammate mouse | XM_031389653.1 | XP_031245513.1 |
| 116445340 | FADS1 | fatty acid desaturase 1 | Corvus moneduloides | New Caledonian crow | XM_032111897.1 | XP_031967788.1 |
| 116468867 | FADS1 | fatty acid desaturase 1 | Hylobates moloch | silvery gibbon | XM_032153057.1 | XP_032008948.1 |
| 116489696 | FADS1 | fatty acid desaturase 1 | Aythya fuligula | tufted duck | XM_032188248.1 | XP_032044139.1 |
| 116554913 | FADS1 | fatty acid desaturase 1 | Sapajus apella | tufted capuchin | XM_032283167.1 | XP_032139058.1 |
| 116598319 | FADS1 | fatty acid desaturase 1 | Mustela erminea | ermine | XM_032356961.1 | XP_032212852.1 |
| 116638370 | FADS1 | fatty acid desaturase 1 | Phoca vitulina | harbor seal | XM_032414284.1 | XP_032270175.1 |
| 116757880 | FADS1 | fatty acid desaturase 1 | Phocoena sinus | vaquita | XM_032640290.1 | XP_032496181.1 |
| 116789060 | FADS1 | fatty acid desaturase 1 | Chiroxiphia lanceolata | lance-tailed manakin | XM_032692393.1 | XP_032548284.1 |
| 116830901 | FADS1 | fatty acid desaturase 1 | Chelonoidis abingdonii | Abingdon island giant tortoise | XM_032790575.1 | XP_032646466.1 |
| 116880283 | FADS1 | fatty acid desaturase 1 | Lontra canadensis | Northern American river otter | XM_032879204.1 | XP_032735095.1 |
| 116890942 | Fads1 | fatty acid desaturase 1 | Rattus rattus | black rat | XM_032891584.1 | XP_032747475.1 |
| 116958593 | FADS1 | fatty acid desaturase 1 | Petromyzon marinus | sea lamprey | XM_032981312.1 | XP_032837203.1 |
| 116984727 | fads1 | fatty acid desaturase 1 | Amblyraja radiata | thorny skate | XM_033039059.1 | XP_032894950.1 |
| 116998114 | FADS1 | fatty acid desaturase 1 | Catharus ustulatus | Swainson's thrush | XM_033063520.1 | XP_032919411.1 |

TABLE 24-continued

Exemplary Δ-5 desaturase (FADS1) gene and/or gene products

| Gene ID | Gene symbol | Description | Scientific name | Common name | RefSeq Transcript accessions | RefSeq Protein accessions |
|---|---|---|---|---|---|---|
| 117030354 | FADS1 | fatty acid desaturase 1 | *Rhinolophus ferrumequinum* | greater horseshoe bat | XM_033120392.1 | XP_032976283.1 |
| 117080259 | FADS1 | fatty acid desaturase 1 | *Trachypithecus francoisi* | Francois's langur | XM_033205135.1 | XP_033061026.1 |
| 117352173 | FADS1 | fatty acid desaturase 1 | *Geotrypetes seraphini* |  | XM_033928425.1 | XP_033784316.1 |
| 117707570 | Fads1 | fatty acid desaturase 1 | *Arvicanthis niloticus* | African grass rat | XM_034500975.1 | XP_034356866.1 |
| 118015924 | FADS1 | fatty acid desaturase 1 | *Mirounga leonina* | Southern elephant seal | XM_035012987.1 | XP_034868878.1 |
| 118167419 | FADS1 | fatty acid desaturase 1 | *Oxyura jamaicensis* | ruddy duck | XM_035326765.1 | XP_035182656.1 |
| 118249736 | FADS1 | fatty acid desaturase 1 | *Cygnus atratus* | black swan | XM_035549985.1 | XP_035405878.1 |
| 118554574 | FADS1 | fatty acid desaturase 1 | *Halichoerus grypus* | gray seal | XM_036122284.1 | XP_035978177.1 |
| 118594829 | Fads1 | fatty acid desaturase 1 | *Onychomys torridus* | southern grasshopper mouse | XM_036205040.1 | XP_036060933.1 |
| 118627540 | FADS1 | fatty acid desaturase 1 | *Molossus molossus* | Pallas's mastiff bat | XM_036257757.1 | XP_036113650.1 |
| 118649002 | FADS1 | fatty acid desaturase 1 | *Myotis myotis* |  | XM_036295665.1 | XP_036151558.1 |
| 118687144 | FADS1 | fatty acid desaturase 1 | *Molothrus ater* |  | XM_036383893.1 | XP_036239786.1 |
| 118707199 | FADS1 | fatty acid desaturase 1 | *Pipistrellus kuhlii* | Kuhl's pipistrelle | XM_036417212.1 | XP_036273105.1 |
| 118853379 | FADS1 | fatty acid desaturase 1 | *Trichosurus vulpecula* | common brushtail | XM_036763402.1 | XP_036619297.1 |
| 118899179 | FADS1 | fatty acid desaturase 1 | *Balaenoptera musculus* | Blue whale | XM_036860450.1 | XP_036716345.1 |
| 118932245 | FADS1 | fatty acid desaturase 1 | *Manis pentadactyla* | Chinese pangolin | XM_036925532.1 | XP_036781427.1 |
| 118996919 | FADS1 | fatty acid desaturase 1 | *Sturnira hondurensis* |  | XM_037060570.1 | XP_036916465.1 |
| 119043682 | FADS1 | fatty acid desaturase 1 | *Artibeus jamaicensis* | Jamaican fruit-eating bat | XM_037137729.1 | XP_036993624.1 |
| 119154418 | FADS1 | fatty acid desaturase 1 | *Falco rusticolus* | gyrfalcon | XM_037401869.1 | XP_037257766.1 |
| 119250072 | FADS1 | fatty acid desaturase 1 | *Talpa occidentalis* | Iberian mole | XM_037517749.1 | XP_037373646.1 |
| 119535814 | FADS1 | fatty acid desaturase 1 | *Choloepus didactylus* | southern two-toed sloth | XM_037838228.1 | XP_037694156.1 |
| 119701668 | FADS1 | fatty acid desaturase 1 | *Motacilla alba alba* |  | XM_038138679.1 | XP_037994607.1 |
| 119813303 | Fads1 | fatty acid desaturase 1 | *Arvicola amphibius* | Eurasian water vole | XM_038328551.1 | XP_038184479.1 |
| 119943638 | FADS1 | fatty acid desaturase 1 | *Tachyglossus aculeatus* | Australian echidna | XM_038764746.1 | XP_038620674.1 |
| 120246150 | FADS1 | fatty acid desaturase 1 | *Hyaena hyaena* | striped hyena | XM_039253495.1 | XP_039109426.1 |
| 120499565 | FADS1 | fatty acid desaturase 1 | *Passer montanus* | Eurasian tree sparrow | XM_039703416.1 | XP_039559350.1 |
| 120600651 | FADS1 | fatty acid desaturase 1 | *Pteropus giganteus* | Indian flying fox | XM_039860119.1 | XP_039716053.1 |
| 120753733 | FADS1 | fatty acid desaturase 1 | *Hirundo rustica* | Barn swallow | XM_040066402.1 | XP_039922336.1 |
| 120874548 | FADS1 | fatty acid desaturase 1 | *Oryx dammah* | scimitar-horned oryx | XM_040255993.1 | XP_040111927.1 |
| 120917259 | FADS1 | fatty acid desaturase 1 | *Rana temporaria* | common frog | XM_040328420.1 | XP_040184354.1 |
| 120981188 | FADS1 | fatty acid desaturase 1 | *Bufo bufo* | common toad | XM_040410717.1 | XP_040266651.1 |
| 121043898 | FADS1 | fatty acid desaturase 1 | *Puma yagouaroundi* | jaguarundi | XM_040495883.1 | XP_040351817.1 |
| 121070714 | FADS1 | fatty acid desaturase 1 | *Cygnus olor* | mute swan | XM_040558274.1 | XP_040414208.1 |
| 121094618 | FADS1 | fatty acid desaturase 1 | *Falco naumanni* | lesser kestrel | XM_040608520.1 | XP_040464454.1 |
| 121157656 | FADS1 | fatty acid desaturase 1 | *Ochotona curzoniae* | black-lipped pika | XM_040981994.1 | XP_040837928.1 |

TABLE 24-continued

Exemplary Δ-5 desaturase (FADS1) gene and/or gene products

| Gene ID | Gene symbol | Description | Scientific name | Common name | RefSeq Transcript accessions | RefSeq Protein accessions |
|---|---|---|---|---|---|---|
| 121339155 | FADS1 | fatty acid desaturase 1 | *Onychostruthus taczanowskii* | white-rumped snowfinch | XM_041410755.1 | XP_041266689.1 |
| 121354751 | FADS1 | fatty acid desaturase 1 | *Pyrgilauda ruficollis* | rufous-necked snowfinch | XM_041469591.1 | XP_041325525.1 |
| 121453877 | Fads1 | fatty acid desaturase 1 | *Microtus oregoni* | creeping vole | XM_041660877.1 | XP_041516811.1 |
| 121472259 | FADS1 | fatty acid desaturase 1 | *Vulpes lagopus* | Arctic fox | XM_041723496.1 | XP_041579430.1 |
| 121661822 | FADS1 | fatty acid desaturase 1 | *Corvus kubaryi* | Mariana crow | XM_042022369.1 | XP_041878303.1 |

TABLE 24

Exemplary Δ-6 desaturase (FADS2) gene and/or gene products

| Gene ID | Gene symbol | Description | Scientific name | Common name | RefSeq Transcript accessions | RefSeq Protein accessions |
|---|---|---|---|---|---|---|
| 9415 | FADS2 | fatty acid desaturase 2 | *Homo sapiens* | human | NM_004265.4 | NP_004256.1 |
| 56473 | Fads2 | fatty acid desaturase 2 | *Mus musculus* | house mouse | NM_019699.2 | NP_062673.1 |
| 83512 | Fads2 | fatty acid desaturase 2 | *Rattus norvegicus* | Norway rat | NM_031344.2 | NP_112634.1 |
| 140615 | fads2 | fatty acid desaturase 2 | *Danio rerio* | zebrafish | NM_131645.2 | NP_571720.2 |
| 444997 | FADS2 | fatty acid desaturase 2 | *Sus scrofa* | pig | NM_001171750.1 | NP_001165221.1 |
| 451244 | FADS2 | fatty acid desaturase 2 | *Pan troglodytes* | chimpanzee | NM_001364482.1 | NP_001351411.1 |
| 483792 | FADS2 | fatty acid desaturase 2 | *Canis lupus familiaris* | dog | XM_014120904.3 | XP_013976379.2 |
| 521822 | FADS2 | fatty acid desaturase 2 | *Bos taurus* | cattle | NM_001083444.1 | NP_001076913.1 |
| 719037 | FADS2 | fatty acid desaturase 2 | *Macaca mulatta* | Rhesus monkey | XM_028832863.1 | XP_028688696.1 |
| 100062709 | FADS2 | fatty acid desaturase 2 | *Equus caballus* | horse | XM_023654186.1 | XP_023509954.1 |
| 100126749 | FADS2 | fatty acid desaturase 2 | *Papio anubis* | olive baboon | NM_001145087.1 | NP_001138559.1 |
| 100145314 | fads2 | fatty acid desaturase 2 | *Xenopus tropicalis* | tropical clawed frog | XM_012960613.2 | XP_012816067.1 |
| 100190814 | FADS2 | fatty acid desaturase 2 | *Pongo abelii* | Sumatran orangutan | NM_001135502.1 | NP_001128974.1 |
| 100352712 | FADS2 | fatty acid desaturase 2 | *Oryctolagus cuniculus* | rabbit | NM_001329067.1 | NP_001315996.1 |
| 100387410 | FADS2 | fatty acid desaturase 2 | *Callithrix jacchus* | white-tufted-ear marmoset | XM_009008303.3 | XP_009006551.2 |
| 100470289 | FADS2 | fatty acid desaturase 2 | *Ailuropoda melanoleuca* | giant panda | XM_002926221.4 | XP_002926267.1 |
| 100596455 | FADS2 | fatty acid desaturase 2 | *Nomascus leucogenys* | northern white-cheeked gibbon | XM_030810928.1 | XP_030666788.1 |
| 100724176 | Fads2 | fatty acid desaturase 2 | *Cavia porcellus* | domestic guinea pig | XM_005002002.3 | XP_005002059.2 |
| 100757464 | Fads2 | fatty acid desaturase 2 | *Cricetulus griseus* | Chinese hamster | XM_003513181.4 | XP_003513229.1 |
| 100930034 | FADS2 | fatty acid desaturase 2 | *Sarcophilus harrisii* | Tasmanian devil | XM_031942019.1 | XP_031797879.1 |
| 100953713 | FADS2 | fatty acid desaturase 2 | *Otolemur garnettii* | small-eared galago | XM_003798736.3 | XP_003798784.1 |
| 100980611 | FADS2 | fatty acid desaturase 2 | *Pan paniscus* | pygmy chimpanzee | XM_008953880.3 | XP_008952128.1 |
| 101051429 | FADS2 | fatty acid desaturase 2 | *Saimiri boliviensis* | Bolivian squirrel monkey | XM_003920207.3 | XP_003920256.1 |
| 101085071 | FADS2 | fatty acid desaturase 2 | *Felis catus* | domestic cat | XM_023239925.1 | XP_023095693.1 |
| 101108615 | FADS2 | fatty acid desaturase 2 | *Ovis aries* | sheep | XM_015103138.3 | XP_014958624.2 |

TABLE 24-continued

Exemplary Δ-6 desaturase (FADS2) gene and/or gene products

| Gene ID | Gene symbol | Description | Scientific name | Common name | RefSeq Transcript accessions | RefSeq Protein accessions |
|---|---|---|---|---|---|---|
| 101156321 | fads2 | fatty acid desaturase 2 | Oryzias latipes | Japanese medaka | XM_020704003.2 | XP_020559662.2 |
| 101275563 | FADS2 | fatty acid desaturase 2 | Orcinus orca | killer whale | XM_033414206.1 | XP_033270097.1 |
| 101324588 | FADS2 | fatty acid desaturase 2 | Tursiops truncatus | common bottlenose dolphin | XM_033860809.1 | XP_033716700.1 |
| 101347025 | LOC101347025 | fatty acid desaturase 2 | Trichechus manatus latirostris | Florida manatee | XM_004383858.3 | XP_004383915.1 |
| 101364529 | FADS2 | fatty acid desaturase 2 | Odobenus rosmarus divergens | Pacific walrus | XM_004410051.2 | XP_004410108.1 |
| 101395093 | LOC101395093 | fatty acid desaturase 2 | Ceratotherium simum simum | southern white rhinoceros | XM_004437465.2 | XP_004437522.1 |
| 101419118 | FADS2 | fatty acid desaturase 2 | Dasypus novemcinctus | nine-banded armadillo | XM_004483043.3 | XP_004483100.1 |
| 101520480 | FADS2 | fatty acid desaturase 2 | Ochotona princeps | American pika | XM_004599325.3 | XP_004599382.1 |
| 101540602 | FADS2 | fatty acid desaturase 2 | Sorex araneus | European shrew | XM_004620836.1 | XP_004620893.1 |
| 101564700 | Fads2 | fatty acid desaturase 2 | Octodon degus | degu | XM_004646723.2 | XP_004646780.1 |
| 101605073 | Fads2 | fatty acid desaturase 2 | Jaculus jaculus | lesser Egyptian jerboa | XM_004667665.1 | XP_004667722.1 |
| 101622962 | FADS2 | fatty acid desaturase 2 | Condylura cristata | star-nosed mole | XM_004682728.2 | XP_004682785.1 |
| 101661366 | FADS2 | fatty acid desaturase 2 | Echinops telfairi | small Madagascar hedgehog | XM_004714937.1 | XP_004714994.1 |
| 101675571 | FADS2 | fatty acid desaturase 2 | Mustela putorius furo | domestic ferret | XM_013044579.1 | XP_012900033.1 |
| 101726663 | Fads2 | fatty acid desaturase 2 | Heterocephalus glaber | naked mole-rat | XM_021251740.1 | XP_021107399.1 |
| 101798758 | FADS2 | fatty acid desaturase 2 | Anas platyrhynchos | mallard | XM_013103963.4 | XP_012959417.2 |
| 101844598 | Fads2 | fatty acid desaturase 2 | Mesocricetus auratus | golden hamster | XM_005063853.4 | XP_005063910.1 |
| 101874266 | LOC101874266 | fatty acid desaturase 2 | Melopsittacus undulatus | budgerigar | XM_031053581.2 | XP_030909441.2 |
| 101910606 | FADS2 | fatty acid desaturase 2 | Falco peregrinus | peregrine falcon | XM_013304041.2 | XP_013159495.1 |
| 101926688 | FADS2 | fatty acid desaturase 2 | Macaca fascicularis | crab-eating macaque | XM_005577619.2 | XP_005577676.1 |
| 101936434 | FADS2 | fatty acid desaturase 2 | Chrysemys picta | Painted turtle | XM_005289233.3 | XP_005289290.1 |
| 101971427 | Fads2 | fatty acid desaturase 2 | Ictidomys tridecemlineatus | thirteen-lined ground squirrel | XM_005331513.4 | XP_005331570.1 |
| 101999761 | Fads2 | fatty acid desaturase 2 | Microtus ochrogaster | prairie vole | XM_005369622.2 | XP_005369679.1 |
| 102020363 | Fads2 | fatty acid desaturase 2 | Chinchilla lanigera | long-tailed chinchilla | XM_013506432.1 | XP_013361886.1 |
| 102058085 | FADS2 | fatty acid desaturase 2 | Falco cherrug | Saker falcon | XM_014279311.2 | XP_014134786.1 |
| 102098615 | FADS2 | fatty acid desaturase 2 | Columba livia | rock pigeon | XM_005511040.2 | XP_005511097.1 |
| 102112585 | FADS2 | fatty acid desaturase 2 | Pseudopodoces humilis | Tibetan ground-tit | XM_014260416.1 | XP_014115891.1 |
| 102171133 | FADS2 | fatty acid desaturase 2 | Capra hircus | goat | XM_018043056.1 | XP_017898545.1 |
| 102213834 | fads2 | fatty acid desaturase 2 | Pundamilia nyererei | | XM_005730097.2 | XP_005730154.1 |
| 102223144 | fads2 | fatty acid desaturase 2 | Xiphophorus maculatus | southern platyfish | XM_005806955.3 | XP_005807012.1 |
| 102275533 | FADS2 | fatty acid desaturase 2 | Bos mutus | wild yak | XM_005901285.2 | XP_005901347.1 |
| 102405983 | FADS2 | fatty acid desaturase 2 | Bubalus bubalis | water buffalo | NM_001319796.1 | NP_001306725.1 |
| 102460236 | FADS2 | fatty acid desaturase 2 | Pelodiscus sinensis | Chinese soft-shelled turtle | XM_006111744.3 | XP_006111806.1 |
| 102475407 | FADS2 | fatty acid desaturase 2 | Tupaia chinensis | Chinese tree shrew | XM_027768727.1 | XP_027624528.1 |
| 102506325 | FADS2 | fatty acid desaturase 2 | Camelus ferus | Wild Bactrian camel | XM_006173184.3 | XP_006173246.2 |
| 102543923 | FADS2 | fatty acid desaturase 2 | Vicugna pacos | alpaca | XM_031690761.1 | XP_031546621.1 |

TABLE 24-continued

Exemplary Δ-6 desaturase (FADS2) gene and/or gene products

| Gene ID | Gene symbol | Description | Scientific name | Common name | RefSeq Transcript accessions | RefSeq Protein accessions |
|---|---|---|---|---|---|---|
| 102691516 | fads2 | fatty acid desaturase 2 | *Lepisosteus oculatus* | spotted gar | XM_015338726.1 | XP_015194212.1 |
| 102773468 | FADS2 | fatty acid desaturase 2 | *Myotis davidii* | | XM_015569812.1 | XP_015425298.1 |
| 102835916 | FADS2 | fatty acid desaturase 2 | *Chrysochloris asiatica* | Cape golden mole | XM_006875002.1 | XP_006875064.1 |
| 102845261 | FADS2 | fatty acid desaturase 2 | *Elephantulus edwardii* | Cape elephant shrew | XM_006899833.1 | XP_006899895.1 |
| 102894063 | FADS2 | fatty acid desaturase 2 | *Pteropus alecto* | black flying fox | XM_006911218.3 | XP_006911280.1 |
| 102927687 | Fads2 | fatty acid desaturase 2 | *Peromyscus maniculatus bairdii* | prairie deer mouse | XM_006993862.2 | XP_006993924.1 |
| 102933275 | FADS2 | fatty acid desaturase 2 | *Chelonia mydas* | Green sea turtle | XM_037899460.1 | XP_037755388.1 |
| 103000252 | FADS2 | fatty acid desaturase 2 | *Balaenoptera acutorostrata scammoni* | | XM_007174478.2 | XP_007174540.1 |
| 103027972 | fads2 | fatty acid desaturase 2 | *Astyanax mexicanus* | Mexican tetra | XM_007235121.3 | XP_007235183.2 |
| 103050551 | FADS2 | fatty acid desaturase 2 | *Python bivittatus* | Burmese python | XM_007426541.2 | XP_007426603.1 |
| 103083143 | FADS2 | fatty acid desaturase 2 | *Lipotes vexillifer* | Yangtze River dolphin | XM_007462166.1 | XP_007462228.1 |
| 103116439 | FADS2 | fatty acid desaturase 2 | *Erinaceus europaeus* | western European hedgehog | XM_007526330.2 | XP_007526392.1 |
| 103174861 | fads2 | fatty acid desaturase 2 | *Callorhinchus milii* | elephant shark | XM_007887445.1 | XP_007885636.1 |
| 103200511 | FADS2 | fatty acid desaturase 2 | *Orycteropus afer afer* | | XM_007945012.1 | XP_007943203.1 |
| 103234245 | FADS2 | fatty acid desaturase 2 | *Chlorocebus sabaeus* | green monkey | XM_037999217.1 | XP_037855145.1 |
| 103269267 | FADS2 | fatty acid desaturase 2 | *Carlito syrichta* | Philippine tarsier | XM_008066854.2 | XP_008065045.1 |
| 103303327 | FADS2 | fatty acid desaturase 2 | *Eptesicus fuscus* | big brown bat | XM_028137511.1 | XP_027993312.1 |
| 103371510 | fads2 | fatty acid desaturase 2 | *Stegastes partitus* | bicolor damselfish | XM_008300860.1 | XP_008299082.1 |
| 103380276 | fads2 | fatty acid desaturase 2 | *Cynoglossus semilaevis* | tongue sole | XM_008312161.3 | XP_008310383.1 |
| 103532527 | FADS2 | fatty acid desaturase 2 | *Calypte anna* | Anna's hummingbird | XM_030450968.1 | XP_030306828.1 |
| 103567043 | FADS2 | fatty acid desaturase 2 | *Equus przewalskii* | Przewalski's horse | XM_008543630.1 | XP_008541852.1 |
| 103604810 | FADS2 | fatty acid desaturase 2 | *Galeopterus variegatus* | Sunda flying lemur | XM_008589390.1 | XP_008587612.1 |
| 103614698 | FADS2 | fatty acid desaturase 2 | *Corvus brachyrhynchos* | American crow | XM_017733015.1 | XP_017588504.1 |
| 103729125 | Fads2 | fatty acid desaturase 2 | *Nannospalax galili* | Upper Galilee mountains blind mole rat | XM_008827114.3 | XP_008825336.1 |
| 103756377 | FADS2 | fatty acid desaturase 2 | *Manacus vitellinus* | golden-collared manakin | XM_018081834.2 | XP_017937323.1 |
| 103822123 | FADS2 | fatty acid desaturase 2 | *Serinus canaria* | Common canary | XM_009097082.3 | XP_009095330.1 |
| 103905746 | FADS2 | fatty acid desaturase 2 | *Aptenodytes forsteri* | emperor penguin | XM_009287533.1 | XP_009285808.1 |
| 103925785 | FADS2 | fatty acid desaturase 2 | *Pygoscelis adeliae* | Adelie penguin | XM_009334554.1 | XP_009332829.1 |
| 104009393 | FADS2 | fatty acid desaturase 2 | *Nipponia nippon* | crested ibis | XM_009461375.1 | XP_009459650.1 |
| 104062412 | FADS2 | fatty acid desaturase 2 | *Cuculus canorus* | common cuckoo | XM_009564467.1 | XP_009562762.1 |
| 104122147 | FADS2 | fatty acid desaturase 2 | *Egretta garzetta* | little egret | XM_035889895.1 | XP_035745788.1 |
| 104139314 | FADS2 | fatty acid desaturase 2 | *Struthio camelus australis* | | XM_009667408.1 | XP_009665703.1 |
| 104287520 | FADS2 | fatty acid desaturase 2 | *Charadrius vociferus* | killdeer | XM_009886237.1 | XP_009884539.1 |
| 104304413 | FADS2 | fatty acid desaturase 2 | *Dryobates pubescens* | Downy woodpecker | XM_009905151.1 | XP_009903453.1 |
| 104339401 | FADS2 | fatty acid desaturase 2 | *Opisthocomus hoazin* | | XM_009945554.1 | XP_009943856.1 |
| 104369427 | FADS2 | fatty acid desaturase 2 | *Tyto alba* | Barn owl | XM_033006786.1 | XP_032862677.1 |

TABLE 24-continued

Exemplary Δ-6 desaturase (FADS2) gene and/or gene products

| Gene ID | Gene symbol | Description | Scientific name | Common name | RefSeq Transcript accessions | RefSeq Protein accessions |
|---|---|---|---|---|---|---|
| 104397494 | FADS2 | fatty acid desaturase 2 | Chaetura pelagica | chimney swift | XM_010007455.1 | XP_010005757.1 |
| 104679373 | FADS2 | fatty acid desaturase 2 | Rhinopithecus roxellana | golden snub-nosed monkey | XM_010384923.2 | XP_010383225.1 |
| 104697641 | FADS2 | fatty acid desaturase 2 | Corvus cornix cornix | | XM_039552076.1 | XP_039408010.1 |
| 104829423 | FADS2 | fatty acid desaturase 2 | Haliaeetus leucocephalus | bald eagle | XM_010563649.1 | XP_010561951.1 |
| 104868385 | Fads2 | fatty acid desaturase 2 | Fukomys damarensis | Damara mole-rat | XM_033756579.1 | XP_033612470.1 |
| 104937137 | fads2 | fatty acid desaturase 2 | Larimichthys crocea | large yellow croaker | NM_001303363.1 | NP_001290292.1 |
| 104956187 | fads2 | fatty acid desaturase 2 | Notothenia coriiceps | black rockcod | XM_010783645.1 | XP_010781947.1 |
| 104998707 | FADS2 | fatty acid desaturase 2 | Bison bison bison | | XM_010854037.1 | XP_010852339.1 |
| 105018065 | fads2 | fatty acid desaturase 2 | Esox lucius | northern pike | XM_029114990.2 | XP_028970823.1 |
| 105070113 | FADS2 | fatty acid desaturase 2 | Camelus bactrianus | Bactrian camel | XM_010956406.1 | XP_010954708.1 |
| 105091525 | FADS2 | fatty acid desaturase 2 | Camelus dromedarius | Arabian camel | XM_031459473.1 | XP_031315333.1 |
| 105297786 | FADS2 | fatty acid desaturase 2 | Pteropus vampyrus | large flying fox | XM_011368616.2 | XP_011366918.1 |
| 105469424 | FADS2 | fatty acid desaturase 2 | Macaca nemestrina | pig-tailed macaque | XM_011720414.2 | XP_011718716.1 |
| 105512289 | FADS2 | fatty acid desaturase 2 | Colobus angolensis palliatus | | XM_011942714.1 | XP_011798104.1 |
| 105549019 | FADS2 | fatty acid desaturase 2 | Mandrillus leucophaeus | drill | XM_011993342.1 | XP_011848732.1 |
| 105577581 | FADS2 | fatty acid desaturase 2 | Cercocebus atys | sooty mangabey | XM_012042107.1 | XP_011897497.1 |
| 105718627 | FADS2 | fatty acid desaturase 2 | Aotus nancymaae | Ma's night monkey | XM_012454399.1 | XP_012309822.1 |
| 105825053 | FADS2 | fatty acid desaturase 2 | Propithecus coquereli | Coquerel's sifaka | XM_012662719.1 | XP_012518173.1 |
| 105878617 | FADS2 | fatty acid desaturase 2 | Microcebus murinus | gray mouse lemur | XM_012778263.1 | XP_012633717.1 |
| 105904229 | fads2 | fatty acid desaturase 2 | Clupea harengus | Atlantic herring | XM_031564643.1 | XP_031420503.1 |
| 105995277 | Fads2 | fatty acid desaturase 2 | Dipodomys ordii | Ord's kangaroo rat | XM_013028984.1 | XP_012884438.1 |
| 106521190 | fads2 | fatty acid desaturase 2 | Austrofundulus limnaeus | | XM_014013653.1 | XP_013869107.1 |
| 106538426 | FADS2 | fatty acid desaturase 2 | Thamnophis sirtalis | | XM_014052906.1 | XP_013908381.1 |
| 106847560 | FADS2 | fatty acid desaturase 2 | Equus asinus | ass | XM_014866880.1 | XP_014722366.1 |
| 106854756 | FADS2 | fatty acid desaturase 2 | Sturnus vulgaris | Common starling | XM_014878836.1 | XP_014734322.1 |
| 106986967 | FADS2 | fatty acid desaturase 2 | Acinonyx jubatus | cheetah | XM_027045940.1 | XP_026901741.1 |
| 107096151 | fads2 | fatty acid desaturase 2 | Cyprinodon variegatus | sheepshead minnow | XM_015392668.1 | XP_015248154.1 |
| 107108854 | FADS2 | fatty acid desaturase 2 | Gekko japonicus | | XM_015409378.1 | XP_015264864.1 |
| 107160135 | Fads2 | fatty acid desaturase 2 | Marmota marmota marmota | Alpine marmot | XM_015506790.1 | XP_015362276.1 |
| 107314439 | FADS2 | fatty acid desaturase 2 | Coturnix japonica | Japanese quail | XM_015863639.2 | XP_015719125.1 |
| 107501589 | FADS2 | fatty acid desaturase 2 | Rousettus aegyptiacus | Egyptian rousette | XM_016127886.2 | XP_015983372.2 |
| 107527684 | FADS2 | fatty acid desaturase 2 | Miniopterus natalensis | | XM_016200466.1 | XP_016055952.1 |
| 107561173 | fads2 | fatty acid desaturase 2 | Sinocyclocheilus grahami | | XM_016245549.1 | XP_016101035.1 |
| 107674834 | fads2 | fatty acid desaturase 2 | Sinocyclocheilus anshuiensis | | XM_016468947.1 | XP_016324433.1 |
| 107754339 | fads2 | fatty acid desaturase 2 | Sinocyclocheilus rhinocerous | | XM_016570752.1 | XP_016426238.1 |
| 108286221 | FADS2 | fatty acid desaturase 2 | Cebus imitator | Panamanian white-faced capuchin | XM_017503840.2 | XP_017359329.1 |
| 108407763 | FADS2 | fatty acid desaturase 2 | Manis javanica | Malayan pangolin | XM_036995856.1 | XP_036851751.1 |

TABLE 24-continued

Exemplary Δ-6 desaturase (FADS2) gene and/or gene products

| Gene ID | Gene symbol | Description | Scientific name | Common name | RefSeq Transcript accessions | RefSeq Protein accessions |
|---|---|---|---|---|---|---|
| 108432696 | fads2 | fatty acid desaturase 2 | *Pygocentrus nattereri* | red-bellied piranha | XM_017706719.2 | XP_017562208.2 |
| 108503095 | FADS2 | fatty acid desaturase 2 | *Lepidothrix coronata* | blue-crowned manakin | XM_017826727.1 | XP_017682216.1 |
| 108533600 | FADS2 | fatty acid desaturase 2 | *Rhinopithecus bieti* | black snub-nosed monkey | XM_017878418.1 | XP_017733907.1 |
| 108794176 | FADS2 | fatty acid desaturase 2 | *Nanorana parkeri* | | XM_018565178.1 | XP_018420680.1 |
| 108886851 | fads2 | fatty acid desaturase 2 | *Lates calcarifer* | barramundi perch | XM_018681923.1 | XP_018537439.1 |
| 109024898 | FADS2 | fatty acid desaturase 2 | *Gorilla gorilla* | western gorilla | XM_031016044.1 | XP_030871904.1 |
| 109246554 | FADS2 | fatty acid desaturase 2 | *Panthera pardus* | leopard | XM_019414633.1 | XP_019270178.1 |
| 109295789 | FADS2 | fatty acid desaturase 2 | *Gavialis gangeticus* | Gharial | XM_019514857.1 | XP_019370402.1 |
| 109390019 | FADS2 | fatty acid desaturase 2 | *Hipposideros armiger* | great roundleaf bat | XM_019655999.1 | XP_019511544.1 |
| 109507604 | fads2 | fatty acid desaturase 2 | *Hippocampus comes* | tiger tail seahorse | XM_019857158.1 | XP_019712717.1 |
| 109554370 | FADS2 | fatty acid desaturase 2 | *Bos indicus* | zebu cattle | XM_019954811.1 | XP_019810370.1 |
| 109623584 | fads2 | fatty acid desaturase 2 | *Paralichthys olivaceus* | Japanese flounder | XM_020078079.1 | XP_019933638.1 |
| 109695673 | Fads2 | fatty acid desaturase 2 | *Castor canadensis* | American beaver | XM_020178327.1 | XP_020033916.1 |
| 109937250 | fads2 | fatty acid desaturase 2 | *Rhincodon typus* | whale shark | XM_020535861.1 | XP_020391450.1 |
| 109971244 | fads2 | fatty acid desaturase 2 | *Monopterus albus* | swamp eel | XM_020619373.1 | XP_020475029.1 |
| 109982230 | fads2 | fatty acid desaturase 2 | *Labrus bergylta* | ballan wrasse | XM_020631363.2 | XP_020487019.1 |
| 110086191 | FADS2 | fatty acid desaturase 2 | *Pogona vitticeps* | central bearded dragon | XM_020806983.1 | XP_020662642.1 |
| 110167702 | fads2 | fatty acid desaturase 2 | *Boleophthalmus pectinirostris* | great blue-spotted mudskipper | XM_020933070.1 | XP_020788729.1 |
| 110195307 | FADS2 | fatty acid desaturase 2 | *Phascolarctos cinereus* | koala | XM_020967999.1 | XP_020823658.1 |
| 110285898 | Fads2 | fatty acid desaturase 2 | *Mus caroli* | Ryukyu mouse | XM_021152362.2 | XP_021008021.1 |
| 110322460 | Fads2 | fatty acid desaturase 2 | *Mus pahari* | shrew mouse | XM_021199139.2 | XP_021054798.1 |
| 110400735 | FADS2 | fatty acid desaturase 2 | *Numida meleagris* | helmeted guineafowl | XM_021400876.1 | XP_021256551.1 |
| 110484926 | FADS2 | fatty acid desaturase 2 | *Lonchura striata domestica* | Bengalese finch | XM_021555916.2 | XP_021411591.1 |
| 110548092 | Fads2 | fatty acid desaturase 2 | *Meriones unguiculatus* | Mongolian gerbil | XM_021636097.1 | XP_021491772.1 |
| 110576322 | FADS2 | fatty acid desaturase 2 | *Neomonachus schauinslandi* | Hawaiian monk seal | XM_021685470.1 | XP_021541145.1 |
| 110953745 | fads2 | fatty acid desaturase 2 | *Acanthochromis polyacanthus* | spiny chromis | XM_022197891.1 | XP_022053583.1 |
| 111149586 | LOC111149586 | fatty acid desaturase 2 | *Enhydra lutris kenyoni* | | XM_022506706.1 | XP_022362414.1 |
| 111183883 | FADS2 | fatty acid desaturase 2 | *Delphinapterus leucas* | beluga whale | XM_022591789.2 | XP_022447497.1 |
| 111229900 | fads2 | fatty acid desaturase 2 | *Seriola dumerili* | greater amberjack | XM_022756428.1 | XP_022612149.1 |
| 111524318 | FADS2 | fatty acid desaturase 2 | *Piliocolobus tephrosceles* | Ugandan red Colobus | XM_023189475.1 | XP_023045243.1 |
| 111582148 | fads2 | fatty acid desaturase 2 | *Amphiprion ocellaris* | clown anemonefish | XM_023290680.2 | XP_023146448.1 |
| 111666947 | fads2 | fatty acid desaturase 2 | *Seriola lalandi dorsalis* | | XM_023422477.1 | XP_023278245.1 |
| 111846795 | fads2 | fatty acid desaturase 2 | *Paramormyrops kingsleyae* | | XM_023817378.1 | XP_023673146.1 |
| 112071110 | fads2 | fatty acid desaturase 2 | *Salvelinus alpinus* | Arctic char | XM_024138583.1 | XP_023994351.1 |
| 112105262 | FADS2 | fatty acid desaturase 2 | *Terrapene carolina triunguis* | Three-toed box turtle | XM_024197971.2 | XP_024053739.1 |
| 112264870 | fads2 | fatty acid desaturase 2 | *Oncorhynchus tshawytscha* | Chinook salmon | XM_024441802.1 | XP_024297570.1 |
| 112317237 | FADS2 | fatty acid desaturase 2 | *Desmodus rotundus* | common vampire bat | XM_024574311.1 | XP_024430079.1 |

TABLE 24-continued

Exemplary Δ-6 desaturase (FADS2) gene and/or gene products

| Gene ID | Gene symbol | Description | Scientific name | Common name | RefSeq Transcript accessions | RefSeq Protein accessions |
|---|---|---|---|---|---|---|
| 112402052 | FADS2 | fatty acid desaturase 2 | *Neophocaena asiaeorientalis asiaeorientalis* | Yangtze finless porpoise | XM_024748575.1 | XP_024604343.1 |
| 112606127 | FADS2 | fatty acid desaturase 2 | *Theropithecus gelada* | gelada | XM_025356195.1 | XP_025211980.1 |
| 112659414 | FADS2 | fatty acid desaturase 2 | *Canis lupus dingo* | dingo | XM_025446192.2 | XP_025301977.1 |
| 112828984 | FADS2 | fatty acid desaturase 2 | *Callorhinus ursinus* | northern fur seal | XM_025878260.1 | XP_025734045.1 |
| 112851879 | FADS2 | fatty acid desaturase 2 | *Puma concolor* | puma | XM_025915333.1 | XP_025771118.1 |
| 112911087 | FADS2 | fatty acid desaturase 2 | *Vulpes vulpes* | red fox | XM_025987459.1 | XP_025843244.1 |
| 112948004 | FADS2 | fatty acid desaturase 2 | *Nothoprocta perdicaria* | | XM_026040203.1 | XP_025895988.1 |
| 112991695 | FADS2 | fatty acid desaturase 2 | *Dromaius novaehollandiae* | emu | XM_026114361.1 | XP_025970146.1 |
| 113132819 | fads2 | fatty acid desaturase 2 | *Mastacembelus armatus* | zig-zag eel | XM_026311175.1 | XP_026166960.1 |
| 113165428 | fads2 | fatty acid desaturase 2 | *Anabas testudineus* | climbing perch | XM_026364874.1 | XP_026220659.1 |
| 113195847 | Fads2 | fatty acid desaturase 2 | *Urocitellus parryii* | Arctic ground squirrel | XM_026407517.1 | XP_026263302.1 |
| 113246983 | FADS2 | fatty acid desaturase 2 | *Ursus arctos horribilis* | | XM_026487771.1 | XP_026343556.1 |
| 113588191 | fads2 | fatty acid desaturase 2 | *Electrophorus electricus* | electric eel | XM_027027273.2 | XP_026883074.2 |
| 113611196 | FADS2 | fatty acid desaturase 2 | *Lagenorhynchus obliquidens* | Pacific white-sided dolphin | XM_027089820.1 | XP_026945621.1 |
| 113886562 | FADS2 | fatty acid desaturase 2 | *Bos indicus × Bostaurus* | hybrid cattle | XM_027532904.1 | XP_027388705.1 |
| 113914859 | FADS2 | fatty acid desaturase 2 | *Zalophus californianus* | California sea lion | XM_027580434.2 | XP_027436235.1 |
| 113960647 | FADS2 | fatty acid desaturase 2 | *Neopelma chrysocephalum* | saffron-crested tyrant-manakin | XM_027670311.1 | XP_027526112.1 |
| 113991949 | FADS2 | fatty acid desaturase 2 | *Pipra filicauda* | Wire-tailed manakin | XM_027728727.2 | XP_027584528.1 |
| 114040669 | FADS2 | fatty acid desaturase 2 | *Vombatus ursinus* | common wombat | XM_027858792.1 | XP_027714593.1 |
| 114099688 | Fads2 | fatty acid desaturase 2 | *Marmota flaviventris* | yellow-bellied marmot | XM_027944076.2 | XP_027799877.1 |
| 114151221 | fads2 | fatty acid desaturase 2 | *Xiphophorus couchianus* | Monterrey platyfish | XM_028028305.1 | XP_027884106.1 |
| 114220204 | FADS2 | fatty acid desaturase 2 | *Eumetopias jubatus* | Steller sea lion | XM_028117888.1 | XP_027973689.1 |
| 114451863 | fads2 | fatty acid desaturase 2 | *Parambassis ranga* | Indian glassy fish | XM_028430808.1 | XP_028286609.1 |
| 114464727 | fads2 | fatty acid desaturase 2 | *Gouania willdenowi* | blunt-snouted clingfish | XM_028449222.1 | XP_028305023.1 |
| 114487991 | FADS2 | fatty acid desaturase 2 | *Physeter catodon* | sperm whale | XM_028501165.1 | XP_028356966.1 |
| 114499454 | FADS2 | fatty acid desaturase 2 | *Phyllostomus discolor* | pale spear-nosed bat | XM_028515644.2 | XP_028371445.1 |
| 114629514 | Fads2 | fatty acid desaturase 2 | *Grammomys surdaster* | | XM_028777566.1 | XP_028633399.1 |
| 114644499 | fads2 | fatty acid desaturase 2 | *Erpetoichthys calabaricus* | reedfish | XM_028792586.1 | XP_028648419.1 |
| 114703436 | Fads2 | fatty acid desaturase 2 | *Peromyscus leucopus* | white-footed mouse | XM_028884283.2 | XP_028740116.1 |
| 114766737 | fads2 | fatty acid desaturase 2 | *Deniceps clupeoides* | denticle herring | XM_028957886.1 | XP_028813719.1 |
| 114856803 | fads2 | fatty acid desaturase 2 | *Betta splendens* | Siamese fighting fish | XM_029152559.2 | XP_029008392.1 |
| 114886728 | FADS2 | fatty acid desaturase 2 | *Monodon monoceros* | narwhal | XM_029207622.1 | XP_029063455.1 |
| 115010175 | fads2 | fatty acid desaturase 2 | *Cottoperca gobio* | | XM_029434645.1 | XP_029290505.1 |
| 115056938 | fads2 | fatty acid desaturase 2 | *Echeneis naucrates* | live sharksucker | XM_029523743.1 | XP_029379603.1 |
| 115306038 | FADS2 | fatty acid desaturase 2 | *Suricata suricatta* | meerkat | XM_029956201.1 | XP_029812061.1 |
| 115352166 | FADS2 | fatty acid desaturase 2 | *Aquila chrysaetos chrysaetos* | | XM_030039894.2 | XP_029895754.1 |
| 115360808 | fads2 | fatty acid desaturase 2 | *Myripristis murdjan* | pinecone soldierfish | XM_030053956.1 | XP_029909816.1 |

TABLE 24-continued

Exemplary Δ-6 desaturase (FADS2) gene and/or gene products

| Gene ID | Gene symbol | Description | Scientific name | Common name | RefSeq Transcript accessions | RefSeq Protein accessions |
|---|---|---|---|---|---|---|
| 115420593 | fads2 | fatty acid desaturase 2 | Sphaeramia orbicularis | orbiculate cardinalfish | XM_030135956.1 | XP_029991816.1 |
| 115468974 | FADS2 | fatty acid desaturase 2 | Microcaecilia unicolor | | XM_030201183.1 | XP_030057043.1 |
| 115524908 | FADS2 | fatty acid desaturase 2 | Lynx canadensis | Canada lynx | XM_030331682.1 | XP_030187542.1 |
| 115551190 | fads2 | fatty acid desaturase 2 | Gadus morhua | Atlantic cod | XM_030366783.1 | XP_030222643.1 |
| 115586375 | fads2 | fatty acid desaturase 2 | Sparus aurata | gilthead seabream | XM_030425365.1 | XP_030281225.1 |
| 115826271 | fads2 | fatty acid desaturase 2 | Chanos chanos | milkfish | XM_030790021.1 | XP_030645881.1 |
| 115840660 | FADS2 | fatty acid desaturase 2 | Globicephala melas | long-finned pilot whale | XM_030833957.1 | XP_030689817.1 |
| 116038811 | fads2 | fatty acid desaturase 2 | Sander lucioperca | pikeperch | XM_031283486.2 | XP_031139346.2 |
| 116103546 | Fads2 | fatty acid desaturase 2 | Mastomys coucha | southern multimammate mouse | XM_031389654.1 | XP_031245514.1 |
| 116239008 | FADS2 | fatty acid desaturase 2 | Phasianus colchicus | Ring-necked pheasant | XM_031608988.1 | XP_031464848.1 |
| 116390120 | fads2 | fatty acid desaturase 2 | Anarrhichthys ocellatus | wolf-eel | XM_031859437.1 | XP_031715297.1 |
| 116468868 | FADS2 | fatty acid desaturase 2 | Hylobates moloch | silvery gibbon | XM_032153058.1 | XP_032008949.1 |
| 116489695 | FADS2 | fatty acid desaturase 2 | Aythya fuligula | tufted duck | XM_032188247.1 | XP_032044138.1 |
| 116554914 | FADS2 | fatty acid desaturase 2 | Sapajus apella | tufted capuchin | XM_032283168.1 | XP_032139059.1 |
| 116598317 | FADS2 | fatty acid desaturase 2 | Mustela erminea | ermine | XM_032356955.1 | XP_032212846.1 |
| 116638368 | FADS2 | fatty acid desaturase 2 | Phoca vitulina | harbor seal | XM_032414281.1 | XP_032270172.1 |
| 116693334 | fads2 | fatty acid desaturase 2 | Etheostoma spectabile | orangethroat darter | XM_032522237.1 | XP_032378128.1 |
| 116729638 | fads2 | fatty acid desaturase 2 | Xiphophorus hellerii | green swordtail | XM_032578312.1 | XP_032434203.1 |
| 116757879 | FADS2 | fatty acid desaturase 2 | Phocoena sinus | vaquita | XM_032640288.1 | XP_032496179.1 |
| 116830902 | FADS2 | fatty acid desaturase 2 | Chelonoidis abingdonii | Abingdon island giant tortoise | XM_032790577.1 | XP_032646468.1 |
| 116880282 | FADS2 | fatty acid desaturase 2 | Lontra canadensis | Northern American river otter | XM_032879200.1 | XP_032735091.1 |
| 116890943 | Fads2 | fatty acid desaturase 2 | Rattus rattus | black rat | XM_032891586.1 | XP_032747477.1 |
| 116984726 | fads2 | fatty acid desaturase 2 | Amblyraja radiata | thorny skate | XM_033039057.1 | XP_032894948.1 |
| 116998113 | FADS2 | fatty acid desaturase 2 | Catharus ustulatus | Swainson's thrush | XM_033063519.1 | XP_032919410.1 |
| 117030358 | FADS2 | fatty acid desaturase 2 | Rhinolophus ferrumequinum | greater horseshoe bat | XM_033120401.1 | XP_032976292.1 |
| 117080261 | FADS2 | fatty acid desaturase 2 | Trachypithecus francoisi | Francois's langur | XM_033205137.1 | XP_033061028.1 |
| 117352277 | FADS2 | fatty acid desaturase 2 | Geotrypetes seraphini | | XM_033928648.1 | XP_033784539.1 |
| 117707574 | Fads2 | fatty acid desaturase 2 | Arvicanthis niloticus | African grass rat | XM_034500990.1 | XP_034356881.1 |
| 117877425 | FADS2 | fatty acid desaturase 2 | Trachemys scripta elegans | | XM_034770540.1 | XP_034626431.1 |
| 118015922 | FADS2 | fatty acid desaturase 2 | Mirounga leonina | Southern elephant seal | XM_035012986.1 | XP_034868877.1 |
| 118167420 | FADS2 | fatty acid desaturase 2 | Oxyura jamaicensis | ruddy duck | XM_035326767.1 | XP_035182658.1 |
| 118249734 | FADS2 | fatty acid desaturase 2 | Cygnus atratus | black swan | XM_035549983.1 | XP_035405876.1 |
| 118554573 | FADS2 | fatty acid desaturase 2 | Halichoerus grypus | gray seal | XM_036122281.1 | XP_035978174.1 |
| 118594821 | Fads2 | fatty acid desaturase 2 | Onychomys torridus | southern grasshopper mouse | XM_036205028.1 | XP_036060921.1 |
| 118627539 | FADS2 | fatty acid desaturase 2 | Molossus molossus | Pallas's mastiff bat | XM_036257756.1 | XP_036113649.1 |
| 118649000 | FADS2 | fatty acid desaturase 2 | Myotis myotis | | XM_036295664.1 | XP_036151557.1 |

TABLE 24-continued

Exemplary Δ-6 desaturase (FADS2) gene and/or gene products

| Gene ID | Gene symbol | Description | Scientific name | Common name | RefSeq Transcript accessions | RefSeq Protein accessions |
|---|---|---|---|---|---|---|
| 118707198 | FADS2 | fatty acid desaturase 2 | Pipistrellus kuhlii | Kuhl's pipistrelle | XM_036417211.1 | XP_036273104.1 |
| 118853378 | FADS2 | fatty acid desaturase 2 | Trichosurus vulpecula | common brushtail | XM_036763401.1 | XP_036619296.1 |
| 118899178 | FADS2 | fatty acid desaturase 2 | Balaenoptera musculus | Blue whale | XM_036860449.1 | XP_036716344.1 |
| 118932203 | FADS2 | fatty acid desaturase 2 | Manis pentadactyla | Chinese pangolin | XM_036925486.1 | XP_036781381.1 |
| 118996917 | FADS2 | fatty acid desaturase 2 | Sturnira hondurensis | | XM_037060568.1 | XP_036916463.1 |
| 119043681 | FADS2 | fatty acid desaturase 2 | Artibeus jamaicensis | Jamaican fruit-eating bat | XM_037137727.1 | XP_036993622.1 |
| 119154417 | FADS2 | fatty acid desaturase 2 | Falco rusticolus | gyrfalcon | XM_037401868.1 | XP_037257765.1 |
| 119250071 | FADS2 | fatty acid desaturase 2 | Talpa occidentalis | Iberian mole | XM_037517748.1 | XP_037373645.1 |
| 119416318 | fads2 | fatty acid desaturase 2 | Nematolebias whitei | Rio pearlfish | XM_037683547.1 | XP_037539475.1 |
| 119535813 | FADS2 | fatty acid desaturase 2 | Choloepus didactylus | southern two-toed sloth | XM_037838227.1 | XP_037694155.1 |
| 119701670 | FADS2 | fatty acid desaturase 2 | Motacilla alba alba | | XM_038138686.1 | XP_037994614.1 |
| 119814598 | Fads2 | fatty acid desaturase 2 | Arvicola amphibius | Eurasian water vole | XM_038330482.1 | XP_038186410.1 |
| 119943637 | FADS2 | fatty acid desaturase 2 | Tachyglossus aculeatus | Australian echidna | XM_038764745.1 | XP_038620673.1 |
| 120246152 | FADS2 | fatty acid desaturase 2 | Hyaena hyaena | striped hyena | XM_039253499.1 | XP_039109430.1 |
| 120499564 | FADS2 | fatty acid desaturase 2 | Passer montanus | Eurasian tree sparrow | XM_039703413.1 | XP_039559347.1 |
| 120600650 | FADS2 | fatty acid desaturase 2 | Pteropus giganteus | Indian flying fox | XM_039860117.1 | XP_039716051.1 |
| 120874547 | FADS2 | fatty acid desaturase 2 | Oryx dammah | scimitar-horned oryx | XM_040255992.1 | XP_040111926.1 |
| 120917257 | FADS2 | fatty acid desaturase 2 | Rana temporaria | common frog | XM_040328418.1 | XP_040184352.1 |
| 120981189 | FADS2 | fatty acid desaturase 2 | Bufo bufo | common toad | XM_040410718.1 | XP_040266652.1 |
| 121043312 | FADS2 | fatty acid desaturase 2 | Puma yagouaroundi | jaguarundi | XM_040494920.1 | XP_040350854.1 |
| 121070715 | FADS2 | fatty acid desaturase 2 | Cygnus olor | mute swan | XM_040558277.1 | XP_040414211.1 |
| 121094617 | FADS2 | fatty acid desaturase 2 | Falco naumanni | lesser kestrel | XM_040608518.1 | XP_040464452.1 |
| 121157655 | FADS2 | fatty acid desaturase 2 | Ochotona curzoniae | black-lipped pika | XM_040981991.1 | XP_040837925.1 |
| 121339150 | FADS2 | fatty acid desaturase 2 | Onychostruthus taczanowskii | white-rumped snowfinch | XM_041410744.1 | XP_041266678.1 |
| 121354750 | FADS2 | fatty acid desaturase 2 | Pyrgilauda ruficollis | rufous-necked snowfinch | XM_041469589.1 | XP_041325523.1 |
| 121453878 | Fads2 | fatty acid desaturase 2 | Microtus oregoni | creeping vole | XM_041660879.1 | XP_041516813.1 |
| 121472257 | FADS2 | fatty acid desaturase 2 | Vulpes lagopus | Arctic fox | XM_041723493.1 | XP_041579427.1 |
| 121661821 | FADS2 | fatty acid desaturase 2 | Corvus kubaryi | Mariana crow | XM_042022366.1 | XP_041878300.1 |

In some embodiments, the exogenous gene and/or gene product is a cecropin gene or gene product or a derivative or variant thereof. Cecropins are antimicrobial peptides (see e.g., Lauwers et al., 2009. J. Biol. Chem. 284(13):8973-8983; Liang Y, et al. Dev Comp Immunol, 2006. PMJD 15982736; Plunkett R M, et al. Can J Microbiol, 2009 May. PMJD 19483780; Loch Gl, et al. PLoS One, 2017. PMJD 28520752; Boulanger N, et al. J Biol Chem, 2002 Dec. 20. PMJD 12372834; Tryselius Y, et al. Eur J Biochem, 1992 Feb. 15. PMTD 1740152; Okasha H, et al. Cuff Pharm Biotechnol, 2021. PMJD 33397234; Ekengren 5, et al. Insect Biochem Mol Biol, 1999 November PMID 10560137; Lee J.-Y., Boman A., Sun C. X., Andersson M., Jdrnvall H., Mutt V., Boman H. G. Antibacterial peptides from pig intestine: isolation of a mammalian cecropin. Proc. Natl. Acad. Sci. U.S.A. 1989; 86:9159-9162, and Pillai et al., 2005. Biochem. J. 390(Pt 1):207-214). Cecropins can enhance bacterial disease resistance in catfish. See e.g., Dunham et al., Mar Biotechnol (NY). 2002 June; 4(3):338-44 and Simora et al., J Aquat Anim Health. 2021 September; 33(3):178-189. In some embodiments, the cecropin gene or gene product is cecropin A1 or cecropin A2. In some embodiments, the cecropin gene or gene product is cecropin B. In some embodiments, the cecropin gene or gene product is cecropin P1, P2, P3, or P4. In some embodiments, the cecropin gene or gene product is Papiliocin. In some embodiments, the cecropin gene is CecC. In some embodiments, the cecropin gene is CECD. Exemplary Cecropin genes and gene products are shown in Table 25. In some embodiments, the cecropin is propeptide, the exogenous gene can include sequences encoding the secretory signal peptide and/or pro-regions.

TABLE 25

Exemplary Cecropin genes and/or gene products.

| Gene ID | Gene symbol | Description | Scientific name | Common name | RefSeq Transcript accessions or sequence | RefSeq Protein accessions or sequence |
|---|---|---|---|---|---|---|
| 43596 | CecA1 | Cercropin A1 | Drosophila melanogaster | Fruit fly | NM_079849.4 | NP_524588.1 |
| 43957 | CecA2 | Cercropin A2 | Drosophila melanogaster | Fruit fly | NM_079850.4 | NP_524589.1 |
| 43598 | CecB | Cecropin B | Drosophila melanogaster | Fruit fly | NM_079851.3 | NP_524590.1 |
| | CecB | Cecropin B | H. cecropia | Moth | M10309.1 | AAA29184.1 |
| | | Cercropin P1 | Ascaris suum | Pig intestinal nematode | | SWLSKTAKKLENSAKKRISEGIAIAIQGGPR (SEQ ID NO: 31) |
| | | Cercropin P2 | | | | SWLSKTYKKLENSAKKRISEGIAIAIQGGPR (SEQ ID NO: 32) (mature peptide sequence) |
| | | Cercropin P3 | | | | SWLSKTYKKLENSAKKRISEGIAIAIKGGSR (SEQ ID NO: 33) (mature peptide sequence) |
| | | Cercropin P4 | | | | SWLSKTYKKLENSAKKRISEGIAIAILGGLR (SEQ ID NO: 34) (mature peptide sequence) |
| 43599 | CecC | Cercropin C | Drosophila melanogaster | Fruit fly | NM_079852.3 | NP_524591.1 |
| 692369 | CecD | Cercropin D | Bombyx mori | Domestic silkworm | NM_001043368.2 | NP_001036866.1 |

Cathelicidin can enhance protection of catfish against infectious organisms such as Ewardsiella ictaluri. See e.g., Simora et al., J Fish Dis. 2020 December; 43(12):1553-1562. In some embodiments, the exogenous gene and/or gene product is a cathelicidin gene and/or gene product. Exemplary cathelicidin genes and gene products are shown in Table 26.

TABLE 26

Exemplary cathelicidin genes and gene products.

| Gene ID | Gene symbol | Description | Scientific name | Common name | RefSeq Transcript accessions | RefSeq Protein accessions |
|---|---|---|---|---|---|---|
| 820 | CAMP | cathelicidin antimicrobial peptide | Homo sapiens | human | NM_004345.5 | NP_004336.4 |
| 12796 | Camp | cathelicidin antimicrobial peptide | Mus musculus | house mouse | NM_009921.2 | NP_034051.2 |
| 316010 | Camp | cathelicidin antimicrobial peptide | Rattus norvegicus | Norway rat | NM001100724.1 | NP001094194.1 |
| 442947 | CAMP | cathelicidin antimicrobial peptide | Canis lupus familiaris | dog | NM_001003359.1 | NP_001003359.1 |
| 619186 | CAMP | cathelicidin antimicrobial peptide | Macaca mulatta | Rhesus monkey | NM_001033509.2 | NP_001028681.1 |

TABLE 26-continued

Exemplary cathelicidin genes and gene products.

| Gene ID | Gene symbol | Description | Scientific name | Common name | RefSeq Transcript accessions | RefSeq Protein accessions |
|---|---|---|---|---|---|---|
| 741881 | CAMP | cathelicidin antimicrobial peptide | Pan troglodytes | chimpanzee | NM_001071815.1 | NP_001065283.1 |
| 100009142 | CAMP | cathelicidin antimicrobial peptide | Oryctolagus cuniculus | rabbit | XM_008260452.2 | XP_008258674.1 |
| 100409435 | CAMP | cathelicidin antimicrobial peptide | Callithrix jacchus | white-tufted-ear marmoset | XM_035275359.1 | XP_035131250.1 |
| 100458748 | CAMP | cathelicidin antimicrobial peptide | Pongo abelii | Sumatran orangutan | XM_002813799.4 | XP_002813845.2 |
| 100476997 | CAMP | cathelicidin antimicrobial peptide | Ailuropoda melanoleuca | giant panda | XM_002926030.4 | XP_002926076.1 |
| 100533978 | CAMP | cathelicidin antimicrobial peptide | Felis catus | domestic cat | NM_001204778.1 | NP_001191707.1 |
| 100588557 | CAMP | cathelicidin antimicrobial peptide | Nomascus leucogenys | northern white-cheeked gibbon | XM_003257003.4 | XP_003257051.2 |
| 100653643 | CAMP | cathelicidin antimicrobial peptide | Loxodonta africana | African savanna elephant | XM_003409891.2 | XP_003409939.1 |
| 100767672 | Camp | cathelicidin antimicrobial peptide | Cricetulus griseus | Chinese hamster | XM_035443984.1 | XP_035299875.1 |
| 100924204 | CAMP | cathelicidin antimicrobial peptide | Sarcophilus harrisii | Tasmanian devil | XM_023498557.2 | XP_023354325.1 |
| 100943189 | CAMP | cathelicidin antimicrobial peptide | Otolemur garnettii | small-eared galago | XM_012811886.1 | XP_012667340.1 |
| 100985563 | CAMP | cathelicidin antimicrobial peptide | Pan paniscus | pygmy chimpanzee | XM_003818426.3 | XP_003818474.1 |
| 101017082 | CAMP | cathelicidin antimicrobial peptide | Papio anubis | olive baboon | XM_003894490.3 | XP_003894539.2 |
| 101039558 | LOC101039558 | cathelicidin antimicrobial peptide | Saimiri boliviensis | Bolivian squirrel monkey | XM_003926293.3 | XP_003926342.1 |
| 101141595 | CAMP | cathelicidin antimicrobial peptide | Gorilla gorilla | western gorilla | XM_004034062.3 | XP_004034110.1 |
| 101370308 | CAMP | cathelicidin antimicrobial peptide | Odobenus rosmarus divergens | Pacific walrus | XM_004399186.2 | XP_004399243.1 |
| 101389167 | LOC101389167 | cathelicidin antimicrobial peptide | Ceratotherium simum simum | southern white rhinoceros | XM_004419642.2 | XP_004419699.1 |
| 101532199 | LOC101532199 | cathelicidin antimicrobial peptide | Ochotona princeps | American pika | XM_004581739.2 | XP_004581796.1 |
| 101541277 | CAMP | cathelicidin antimicrobial peptide | Sorex araneus | European shrew | XM_004615147.1 | XP_004615204.1 |
| 101583314 | Camp | cathelicidin antimicrobial peptide | Octodon degus | degu | XM_004640784.2 | XP_004640841.1 |
| 101617713 | Camp | cathelicidin antimicrobial peptide | Jaculus jaculus | lesser Egyptian jerboa | XM_004661953.2 | XP_004662010.1 |
| 101621468 | CAMP | cathelicidin antimicrobial peptide | Condylura cristata | star-nosed mole | XM_012735223.1 | XP_012590677.1 |
| 101641205 | CAMP | cathelicidin antimicrobial peptide | Echinops telfairi | small Madagascar hedgehog | XM_013004997.1 | XP_012860451.1 |
| 101677996 | CAMP | cathelicidin antimicrobial peptide | Mustela putorius furo | domestic ferret | XM_013060760.1 | XP_012916214.1 |
| 101698769 | Camp | cathelicidin antimicrobial peptide | Heterocephalus glaber | naked mole-rat | XM_004834939.3 | XP_004834996.1 |

TABLE 26-continued

Exemplary cathelicidin genes and gene products.

| Gene ID | Gene symbol | Description | Scientific name | Common name | RefSeq Transcript accessions | RefSeq Protein accessions |
|---|---|---|---|---|---|---|
| 101731161 | camp | cathelicidin antimicrobial peptide | *Xenopus tropicalis* | tropical clawed frog | XM_004915510.4 | XP_004915567.1 |
| 101829350 | LOC101829350 | cathelicidin antimicrobial peptide | *Mesocricetus auratus* | golden hamster | XM_005075080.4 | XP_005075137.1 |
| 101914489 | CAMP | cathelicidin antimicrobial peptide | *Falco peregrinus* | peregrine falcon | XM_005229571.2 | XP_005229628.1 |
| 102002439 | Camp | cathelicidin antimicrobial peptide | *Microtus ochrogaster* | prairie vole | XM_005347967.2 | XP_005348024.1 |
| 102014676 | Camp | cathelicidin antimicrobial peptide | *Chinchilla lanigera* | long-tailed chinchilla | XM_005383402.2 | XP_005383459.1 |
| 102053768 | CAMP | cathelicidin antimicrobial peptide | *Falco cherrug* | Saker falcon | XM_005442412.2 | XP_005442469.1 |
| 102098555 | CAMP | cathelicidin antimicrobial peptide | *Columba livia* | rock pigeon | XM_005512142.2 | XP_005512199.1 |
| 102105831 | CAMP | cathelicidin antimicrobial peptide | *Pseudopodoces humilis* | Tibetan ground-tit | XM_005532140.2 | XP_005532197.1 |
| 102139204 | CAMP | cathelicidin antimicrobial peptide | *Macaca fascicularis* | crab-eating macaque | XM_005547003.2 | XP_005547060.1 |
| 102261369 | CAMP | cathelicidin antimicrobial peptide | *Myotis brandtii* | Brandt's bat | XM_014540508.1 | XP_014395994.1 |
| 102742380 | CAMP | cathelicidin antimicrobial peptide | *Leptonychotes weddellii* | Weddell seal | XM_006732991.2 | XP_006733054.1 |
| 102771171 | CAMP | cathelicidin antimicrobial peptide | *Myotis davidii* | | XM_006770430.2 | XP_006770493.1 |
| 102817414 | CAMP | cathelicidin antimicrobial peptide | *Chrysochloris asiatica* | Cape golden mole | XM_006868787.1 | XP_006868849.1 |
| 102867055 | CAMP | cathelicidin antimicrobial peptide | *Elephantulus edwardii* | Cape elephant shrew | XM_006893030.1 | XP_006893092.1 |
| 102884331 | CAMP | cathelicidin antimicrobial peptide | *Pteropus alecto* | black flying fox | XM_006914918.3 | XP_006914980.3 |
| 102906537 | LOC102906537 | cathelicidin antimicrobial peptide | *Peromyscus maniculatus bairdii* | prairie deer mouse | XM_006985875.2 | XP_006985937.2 |
| 102960275 | CAMP | cathelicidin antimicrobial peptide | *Panthera tigris altaica* | Amur tiger | XM_007088448.2 | XP_007088510.1 |
| 103122990 | CAMP | cathelicidin antimicrobial peptide | *Erinaceus europaeus* | western European hedgehog | XM_007533605.2 | XP_007533667.2 |
| 103227575 | LOC103227575 | cathelicidin antimicrobial peptide | *Chlorocebus sabaeus* | green monkey | XM_007984093.2 | XP_007982284.1 |
| 103251010 | CAMP | cathelicidin antimicrobial peptide | *Carlito syrichta* | Philippine tarsier | XM_008049604.2 | XP_008047795.1 |
| 103299036 | CAMP | cathelicidin antimicrobial peptide | *Eptesicus fuscus* | big brown bat | XM_008155908.2 | XP_008154130.1 |
| 103591601 | CAMP | cathelicidin antimicrobial peptide | *Galeopterus variegatus* | Sunda flying lemur | XM_008574075.1 | XP_008572297.1 |
| 103674860 | LOC103674860 | cathelicidin antimicrobial peptide | *Ursus maritimus* | polar bear | XM_008703850.2 | XP_008702072.1 |
| 103801688 | CAMP | cathelicidin antimicrobial peptide | *Acanthisitta chloris* | rifleman | XM_009074112.1 | XP_009072360.1 |
| 103812672 | CAMP | cathelicidin antimicrobial peptide | *Serinus canaria* | Common canary | XM_009085744.3 | XP_009083992.2 |

TABLE 26-continued

Exemplary cathelicidin genes and gene products.

| Gene ID | Gene symbol | Description | Scientific name | Common name | RefSeq Transcript accessions | RefSeq Protein accessions |
|---|---|---|---|---|---|---|
| 104289686 | CAMP | cathelicidin antimicrobial peptide | Charadrius vociferus | killdeer | XM_009888674.1 | XP_009886976.1 |
| 104409398 | CAMP | cathelicidin antimicrobial peptide | Nestor notabilis | Kea | XM_010019251.1 | XP_010017553.1 |
| 104671298 | CAMP | cathelicidin antimicrobial peptide | Rhinopithecus roxellana | golden snub-nosed monkey | XM_010374719.2 | XP_010373021.2 |
| 104828306 | CAMP | cathelicidin antimicrobial peptide | Haliaeetus leucocephalus | bald eagle | XM_010561930.1 | XP_010560232.1 |
| 105302406 | CAMP | cathelicidin antimicrobial peptide | Pteropus vampyrus | large flying fox | XM_011375446.2 | XP_011373748.1 |
| 105480395 | CAMP | cathelicidin antimicrobial peptide | Macaca nemestrina | pig-tailed macaque | XM_011739190.1 | XP_011737492.1 |
| 105509745 | CAMP | cathelicidin antimicrobial peptide | Colobus angolensis palliatus | | XM_011939188.1 | XP_011794578.1 |
| 105540398 | CAMP | cathelicidin antimicrobial peptide | Mandrillus leucophaeus | drill | XM_011981014.1 | XP_011836404.1 |
| 105573643 | CAMP | cathelicidin antimicrobial peptide | Cercocebus atys | sooty mangabey | XM_012033522.1 | XP_011888912.1 |
| 105731890 | CAMP | cathelicidin antimicrobial peptide | Aotus nancymaae | Ma's night monkey | XM_012473812.1 | XP_012329235.1 |
| 105816226 | CAMP | cathelicidin antimicrobial peptide | Propithecus coquereli | Coquerel's sifaka | XM_012651620.1 | XP_012507074.1 |
| 105874914 | CAMP | cathelicidin antimicrobial peptide | Microcebus murinus | gray mouse lemur | XM_012771138.2 | XP_012626592.1 |
| 105994613 | Camp | cathelicidin antimicrobial peptide | Dipodomys ordii | Ord's kangaroo rat | XM_013028231.1 | XP_012883685.1 |
| 106862795 | CAMP | cathelicidin antimicrobial peptide | Sturnus vulgaris | Common starling | XM_014892011.1 | XP_014747497.1 |
| 106895835 | CAMP | cathelicidin antimicrobial peptide | Calidris pugnax | ruff | XM_014955479.1 | XP_014810965.1 |
| 106979177 | CAMP | cathelicidin antimicrobial peptide | Acinonyx jubatus | cheetah | XM_027038616.1 | XP_026894417.1 |
| 107198784 | CAMP | cathelicidin antimicrobial peptide | Pares major | Great Tit | XM_015615997.3 | XP_015471483.1 |
| 107513294 | LOC107513294 | cathelicidin antimicrobial peptide | Rousettus aegyptiacus | Egyptian rousette | XM_036219680.1 | XP_036075573.1 |
| 107529421 | CAMP | cathelicidin antimicrobial peptide | Miniopteres natalensis | | XM_016202809.1 | XP_016058295.1 |
| 107604613 | CAMP | cathelicidin antimicrobial peptide | Ficedula albicollis | Collared flycatcher | XM_016306185.1 | XP_016161671.1 |
| 108294082 | LOC108294082 | cathelicidin antimicrobial peptide | Cebus imitator | Panamanian white-faced capuchin | XM_017515861.1 | XP_017371350.1 |
| 108402645 | LOC108402645 | cathelicidin antimicrobial peptide | Manis javanica | Malayan pangolin | XM_017669314.2 | XP_017524803.2 |
| 108508214 | CAMP | cathelicidin antimicrobial peptide | Lepidothrix coronata | blue-crowned manakin | XM_017836834.1 | XP_017692323.1 |
| 108517622 | CAMP | cathelicidin antimicrobial peptide | Rhinopithecus bieti | black snub-nosed monkey | XM_017855649.1 | XP_017711138.1 |
| 109247748 | CAMP | cathelicidin antimicrobial peptide | Panthera pardus | leopard | XM_019416664.1 | XP_019272209.1 |

TABLE 26-continued

Exemplary cathelicidin genes and gene products.

| Gene ID | Gene symbol | Description | Scientific name | Common name | RefSeq Transcript accessions | RefSeq Protein accessions |
|---|---|---|---|---|---|---|
| 109375616 | CAMP | cathelicidin antimicrobial peptide | *Hipposideros armiger* | great roundleaf bat | XM_019631070.1 | XP_019486615.1 |
| 109699008 | Camp | cathelicidin antimicrobial peptide | *Castor canadensis* | American beaver | XM_020183496.1 | XP_020039085.1 |
| 110302518 | Camp | cathelicidin antimicrobial peptide | *Mus caroli* | Ryukyu mouse | XM_021173305.1 | XP_021028964.1 |
| 110328557 | Camp | cathelicidin antimicrobial peptide | *Mus pahari* | shrew mouse | XM_021207978.1 | XP_021063637.1 |
| 110390676 | CAMP | cathelicidin antimicrobial peptide | *Numida meleagris* | helmeted guineafowl | XM_021382086.1 | XP_021237761.1 |
| 110476933 | CAMP | cathelicidin antimicrobial peptide | *Lonchura striata domestica* | Bengalese finch | XM_021542233.1 | XP_021397908.1 |
| 110564535 | Camp | cathelicidin antimicrobial peptide | *Meriones unguiculatus* | Mongolian gerbil | XM_021662017.1 | XP_021517692.1 |
| 110577659 | CAMP | cathelicidin antimicrobial peptide | *Neomonachus schauinslandi* | Hawaiian monk seal | XM_021687057.1 | XP_021542732.1 |
| 111144247 | LOC111144247 | cathelicidin antimicrobial peptide | *Enhydra lutris kenyoni* | | XM_022498466.1 | XP_022354174.1 |
| 111174439 | CAMP | cathelicidin antimicrobial peptide | *Delphinapterus leucas* | beluga whale | XM_022573274.2 | XP_022428982.1 |
| 111555562 | CAMP | cathelicidin antimicrobial peptide | *Piliocolobus tephrosceles* | Ugandan red Colobus | XM_023231747.1 | XP_023087515.1 |
| 112309821 | CAMP | cathelicidin antimicrobial peptide | *Desmodus rotundus* | common vampire bat | XM_024566029.1 | XP_024421797.1 |
| 112618660 | CAMP | cathelicidin antimicrobial peptide | *Theropithecus gelada* | gelada | XM_025375964.1 | XP_025231749.1 |
| 112665735 | LOC112665735 | cathelicidin antimicrobial peptide | *Canis lupus dingo* | dingo | XM_025455716.2 | XP_025311501.1 |
| 112834214 | CAMP | cathelicidin antimicrobial peptide | *Callorhinus ursinus* | northern fur seal | XM_025885675.1 | XP_025741460.1 |
| 112852707 | CAMP | cathelicidin antimicrobial peptide | *Puma concolor* | puma | XM_025916237.1 | XP_025772022.1 |
| 112913251 | CAMP | cathelicidin antimicrobial peptide | *Vulpes vulpes* | red fox | XM_025989838.1 | XP_025845623.1 |
| 112951549 | CAMP | cathelicidin antimicrobial peptide | *Nothoprocta perdicaria* | | XM_026044257.1 | XP_025900042.1 |
| 113256532 | CAMP | cathelicidin antimicrobial peptide | *Ursus arctos horribilis* | | XM_026500358.1 | XP_026356143.1 |
| 113476776 | CAMP | cathelicidin antimicrobial peptide | *Athene cunicularia* | burrowing owl | XM_026842699.1 | XP_026698500.1 |
| 113615812 | CAMP | cathelicidin antimicrobial peptide | *Lagenorhynchus obliquidens* | Pacific white-sided dolphin | XM_027098652.1 | XP_026954453.1 |
| 113917623 | LOC113917623 | cathelicidin antimicrobial peptide | *Zalophus californianus* | California sea lion | XM_027585515.1 | XP_027441316.1 |
| 113960437 | CAMP | cathelicidin antimicrobial peptide | *Corapipo altera* | White-ruffed manakin | XM_027670011.1 | XP_027525812.1 |
| 113977478 | CAMP | cathelicidin antimicrobial peptide | *Neopelma chrysocephalum* | saffron-crested tyrant-manakin | XM_027703612.1 | XP_027559413.1 |
| 113992643 | LOC113992643 | cathelicidin antimicrobial peptide | *Pipra filicauda* | Wire-tailed manakin | XM_027730130.2 | XP_027585931.2 |

TABLE 26-continued

Exemplary cathelicidin genes and gene products.

| Gene ID | Gene symbol | Description | Scientific name | Common name | RefSeq Transcript accessions | RefSeq Protein accessions |
|---|---|---|---|---|---|---|
| 114070397 | CAMP | cathelicidin antimicrobial peptide | Empidonax traillii | willow flycatcher | XM_027907759.1 | XP_027763560.1 |
| 114224947 | CAMP | cathelicidin antimicrobial peptide | Eumetopias jubatus | Steller sea lion | XM_028124238.1 | XP_027980039.1 |
| 114501854 | LOC114501854 | cathelicidin antimicrobial peptide | Phyllostomus discolor | pale spear-nosed bat | XM_028518614.2 | XP_028374415.1 |
| 114705253 | LOC114705253 | cathelicidin antimicrobial peptide | Peromyscus leucopus | white-footed mouse | XM_028887051.2 | XP_028742884.1 |
| 115275000 | CAMP | cathelicidin antimicrobial peptide | Suricata suricatta | meerkat | XM_029918581.1 | XP_029774441.1 |
| 115339568 | LOC115339568 | cathelicidin antimicrobial peptide | Aquila chrysaetos chrysaetos | | XM_030009733.1 | XP_029865593.1 |
| 115493593 | LOC115493593 | cathelicidin antimicrobial peptide | Taeniopygia guttata | zebra finch | XM_030264102.3 | XP_030119962.3 |
| 115508217 | LOC115508217 | cathelicidin antimicrobial peptide | Lynx canadensis | Canada lynx | XM_030306648.1 | XP_030162508.1 |
| 115917446 | CAMP | cathelicidin antimicrobial peptide | Camarhynchus parvulus | | XM_030971500.1 | XP_030827360.1 |
| 116072925 | Camp | cathelicidin antimicrobial peptide | Mastomys coucha | southern multimammate mouse | XM_031344517.1 | XP_031200377.1 |
| 116453123 | CAMP | cathelicidin antimicrobial peptide | Corvus moneduloides | New Caledonian crow | XM_032128280.1 | XP_031984171.1 |
| 116472331 | CAMP | cathelicidin antimicrobial peptide | Hylobates moloch | silvery gibbon | XM_032159121.1 | XP_032015012.1 |
| 116564681 | CAMP | cathelicidin antimicrobial peptide | Sapajus apella | tufted capuchin | XM_032297901.1 | XP_032153792.1 |
| 116576346 | CAMP | cathelicidin antimicrobial peptide | Mustela erminea | ermine | XM_032318507.1 | XP_032174398.1 |
| 116637238 | CAMP | cathelicidin antimicrobial peptide | Phoca vitulina | harbor seal | XM_032412657.1 | XP_032268548.1 |
| 116762344 | CAMP | cathelicidin antimicrobial peptide | Phocoena sinus | vaquita | XM_032649205.1 | XP_032505096.1 |
| 116786372 | CAMP | cathelicidin antimicrobial peptide | Chiroxiphia lanceolata | lance-tailed manakin | XM_032686906.1 | XP_032542797.1 |
| 116873828 | CAMP | cathelicidin antimicrobial peptide | Lontra canadensis | Northern American river otter | XM_032867939.1 | XP_032723830.1 |
| 116907646 | Camp | cathelicidin antimicrobial peptide | Rattus rattus | black rat | XM_032910715.1 | XP_032766606.1 |
| 117036976 | CAMP | cathelicidin antimicrobial peptide | Rhinolophus ferrumequinum | greater horseshoe bat | XM_033132622.1 | XP_032988513.1 |
| 117080792 | CAMP | cathelicidin antimicrobial peptide | Trachypithecus francoisi | Francois's langur | XM_033206082.1 | XP_033061973.1 |
| 117355613 | CAMP | cathelicidin antimicrobial peptide | Geotrypetes seraphini | | XM_033934439.1 | XP_033790330.1 |
| 118005110 | CAMP | cathelicidin antimicrobial peptide | Mirounga leonina | Southern elephant seal | XM_034996847.1 | XP_034852738.1 |
| 118157009 | CAMP | cathelicidin antimicrobial peptide | Oxyura jamaicensis | ruddy duck | XM_O35311264.1 | XP_035167155.1 |
| 118251813 | CAMP | cathelicidin antimicrobial peptide | Cygnus atratus | black swan | XM_035554387.1 | XP_035410280.1 |

TABLE 26-continued

Exemplary cathelicidin genes and gene products.

| Gene ID | Gene symbol | Description | Scientific name | Common name | RefSeq Transcript accessions | RefSeq Protein accessions |
|---|---|---|---|---|---|---|
| 118520648 | LOC118520648 | cathelicidin antimicrobial peptide | Halichoerus grypus | gray seal | XM_036068756.1 | XP_035924649.1 |
| 118587742 | LOC118587742 | cathelicidin antimicrobial peptide | Onychomys torridus | southern grasshopper mouse | XM_036193790.1 | XP_036049683.1 |
| 118633461 | LOC118633461 | cathelicidin antimicrobial peptide | Molossus molossus | Pallas's mastiff bat | XM_036267411.1 | XP_036123304.1 |
| 118668521 | LOC118668521 | cathelicidin antimicrobial peptide | Myotis myotis | | XM_036333676.1 | XP_036189569.1 |
| 118684405 | LOC118684405 | cathelicidin antimicrobial peptide | Molothrus ater | | XM_036379239.1 | XP_036235132.1 |
| 118715792 | LOC118715792 | cathelicidin antimicrobial peptide | Pipistrellus kuhlii | Kuhl's pipistrelle | XM_036432411.1 | XP_036288304.1 |
| 118908621 | LOC118908621 | cathelicidin antimicrobial peptide | Manis pentadactyla | Chinese pangolin | XM_036878390.1 | XP_036734285.1 |
| 118989523 | LOC118989523 | cathelicidin antimicrobial peptide | Sturnira hondurensis | | XM_037049832.1 | XP_036905727.1 |
| 119036638 | LOC119036638 | cathelicidin antimicrobial peptide | Artibeus jamaicensis | Jamaican fruit-eating bat | XM_037128524.1 | XP_036984419.1 |
| 119259496 | LOC119259496 | cathelicidin antimicrobial peptide | Talpa occidentalis | Iberian mole | XM_037528412.1 | XP_037384309.1 |
| 119697434 | LOC119697434 | cathelicidin antimicrobial peptide | Motacilla alba alba | | XM_038128210.1 | XP_037984138.1 |
| 119810851 | LOC119810851 | cathelicidin antimicrobial peptide | Arvicola amphibius | Eurasian water vole | XM_038324527.1 | XP_038180455.1 |
| 120229326 | LOC120229326 | cathelicidin antimicrobial peptide | Hyaena hyaena | striped hyena | XM_039228265.1 | XP_039084196.1 |
| 120409827 | LOC120409827 | cathelicidin antimicrobial peptide | Corvus cornix cornix | | XM_039550210.1 | XP_039406144.1 |
| 120510575 | LOC120510575 | cathelicidin antimicrobial peptide | Passer montanus | Eurasian tree sparrow | XM_039726515.1 | XP_039582449.1 |
| 120582302 | LOC120582302 | cathelicidin antimicrobial peptide | Pteropus giganteus | Indian flying fox | XM_039837646.1 | XP_039693580.1 |
| 120757408 | LOC120757408 | cathelicidin antimicrobial peptide | Hirundo rustica | Barn swallow | XM_040074721.1 | XP_039930655.1 |
| 121011151 | LOC121011151 | cathelicidin antimicrobial peptide | Puma yagouaroundi | jaguarundi | XM_040445238.1 | XP_040301172.1 |
| 121064890 | LOC121064890 | cathelicidin antimicrobial peptide | Cygnus olor | mute swan | XM_040547111.1 | XP_040403045.1 |
| 121087913 | LOC121087913 | cathelicidin antimicrobial peptide | Falco naumanni | lesser kestrel | XM_040593443.1 | XP_040449377.1 |
| 121165969 | LOC121165969 | cathelicidin antimicrobial peptide | Ochotona curzoniae | black-lipped pika | XM_040994990.1 | XP_040850924.1 |
| 121338000 | LOC121338000 | cathelicidin antimicrobial peptide | Onychostruthus taczanowskii | white-rumped snowfinch | XM_041408527.1 | XP_041264461.1 |
| 121351806 | LOC121351806 | cathelicidin antimicrobial peptide | Pyrgilauda ruficollis | rufous-necked snowfinch | XM_041464176.1 | XP_041320110.1 |
| 121464146 | LOC121464146 | cathelicidin antimicrobial peptide | Microtus oregoni | creeping vole | XM_041676751.1 | XP_041532685.1 |
| 121495894 | LOC121495894 | cathelicidin antimicrobial peptide | Vulpes lagopus | Arctic fox | XM_041763963.1 | XP_041619897.1 |

TABLE 26-continued

Exemplary cathelicidin genes and gene products.

| Gene ID | Gene symbol | Description | Scientific name | Common name | RefSeq Transcript accessions | RefSeq Protein accessions |
|---|---|---|---|---|---|---|
| 121661784 | LOC121661784 | cathelicidin antimicrobial peptide | *Corvus kubaryi* | Mariana crow | XM_042022310.1 | XP_041878244.1 |

In some embodiments, the exogenous gene is a growth hormone gene and/or gene product. Exemplary growth hormone gene and/or gene products are shown in Table 27.

TABLE 27

Exemplary GH gene and/or gene products.

| Gene ID | Gene symbol | Description | Scientific name | Common name | RefSeq Transcript accessions | RefSeq Protein accessions |
|---|---|---|---|---|---|---|
| 2688 | GH1 | growth hormone 1 | *Homo sapiens* | human | NM_000515.5 | NP_000506.2 |
| 407639 | GH1 | growth hormone 1 | *Danio rerio* | zebrafish | NM_001020492.2 | NP_001018328.2 |
| LOC100136588 | GH | Growth hormone prepeptide | *Salmo salar* | Atlantic salmon | NM_001123676.1 | NP_001117148.1 |
| 14599 | Gh | growth hormone | *Mus musculus* | house mouse | NM_008117.3 | NP_032143.1 |
| 280804 | GH1 | growth hormone 1 | *Bos taurus* | cattle | XM_005220810.3 | XP_005220867.2 |
| 454774 | GH1 | growth hormone 1 | *Pan troglodytes* | chimpanzee | XM_024350096.1 | XP_024205864.1 |
| 718156 | GH1 | growth hormone 1 | *Macaca mulatta* | Rhesus monkey | XM_015120065.2 | XP_014975551.2 |
| 100126758 | GH1 | growth hormone 1 | *Papio anubis* | olive baboon | NM_001290304.1 | NP_001277233.1 |
| 100379559 | Gh1 | growth hormone 1 | *Cavia porcellus* | domestic guinea Pig | NM_001172859.1 | NP_001166330.1 |
| 100392546 | GH1 | growth hormone 1 | *Callithrix jacchus* | white-tufted-ear marmoset | XM_035297845.1 | XP_035153736.1 |
| 100448861 | GH1 | growth hormone 1 | *Pongo abelii* | Sumatran orangutan | XM_009251912.2 | XP_009250187.1 |
| 100770534 | Gh1 | growth hormone 1 | *Cricetulus griseus* | Chinese hamster | XM_035448159.1 | XP_035304050.1 |
| 101039453 | GH1 | growth hormone 1 | *Saimiri boliviensis* | Bolivian squirrel monkey | NM_001279978.1 | NP_001266907.1 |
| 101124194 | GH1 | growth hormone 1 | *Gorilla gorilla* | western gorilla | XM_031011112.1 | XP_030866972.1 |
| 101393384 | LOC101393384 | growth hormone 1 | *Ceratotherium simum simum* | southern white rhinoceros | XM_004432654.2 | XP_004432711.1 |
| 101530491 | GH1 | growth hormone 1 | *Ochotona princeps* | American pika | XM_004597248.1 | XP_004597305.1 |
| 101878541 | LOC101878541 | growth hormone 1 | *Melopsittacus undulatus* | budgerigar | XM_005140292.2 | XP_005140349.2 |
| 101911583 | GH1 | growth hormone 1 | *Falco peregrinus* | peregrine falcon | XM_005238817.1 | XP_005238874.1 |
| 101981176 | Gh1 | growth hormone 1 | *Microtus ochrogaster* | prairie vole | XM_026780072.1 | XP_026635873.1 |
| 102050341 | GH1 | growth hormone 1 | *Falco cherrug* | Saker falcon | XM_005439430.1 | XP_005439487.1 |
| 102387497 | GH1 | growth hormone 1 | *Alligator sinensis* | Chinese alligator | XM_014516984.1 | XP_014372470.1 |
| 102841515 | GH1 | growth hormone 1 | *Chrysochloris asiatica* | Cape golden mole | XM_006833578.1 | XP_006833641.1 |
| 102870522 | GH1 | growth hormone 1 | *Elephantulus edwardii* | Cape elephant shrew | XM_006886410.1 | XP_006886472.1 |
| 103077460 | GH1 | growth hormone 1 | *Lipotes vexillifer* | Yangtze River dolphin | XM_007456768.1 | XP_007456830.1 |
| 103117600 | GH1 | growth hormone 1 | *Erinaceus europaeus* | western European hedgehog | NM_001323333.1 | NP_001310262.1 |
| 103250786 | GH1 | growth hormone 1 | *Carlito syrichta* | Philippine tarsier | XM_008049375.1 | XP_008047566.1 |

TABLE 27-continued

Exemplary GH gene and/or gene products.

| Gene ID | Gene symbol | Description | Scientific name | Common name | RefSeq Transcript accessions | RefSeq Protein accessions |
|---|---|---|---|---|---|---|
| 103536457 | GH1 | growth hormone 1 | Calypte anna | Anna's hummingbird | XM_008502621.2 | XP_008500843.1 |
| 103595645 | GH1 | growth hormone 1 | Galeopterus variegatus | Sunda flying lemur | XM_008579089.1 | XP_008577311.1 |
| 103766621 | GH1 | growth hormone 1 | Manacus vitellinus | golden-collared manakin | XM_008933674.3 | XP_008931922.1 |
| 104857066 | Gh1 | growth hormone 1 | Fukomys damarensis | Damara mole-rat | XM_010616749.2 | XP_010615051.1 |
| 105468988 | GH1 | growth hormone 1 | Macaca nemestrina | pig-tailed macaque | XM_011719479.2 | XP_011717781.1 |
| 107114953 | GH1 | growth hormone 1 | Gekko japonicus | | XM_015416561.1 | XP_015272047.1 |
| 107215237 | GH1 | growth hormone 1 | Pares major | Great Tit | XM_015651253.1 | XP_015506739.1 |
| 108295581 | GH1 | growth hormone 1 | Cebus imitator | Panamanian white-faced capuchin | XM_037734652.1 | XP_037590580.1 |
| 109700526 | Gh1 | growth hormone 1 | Castor canadensis | American beaver | XM_020185726.1 | XP_020041315.1 |
| 110305672 | Gh1 | growth hormone 1 | Mus caroli | Ryukyu mouse | XM_021177735.1 | XP_021033394.1 |
| 110332223 | Gh1 | growth hormone 1 | Mus pahari | shrew mouse | XM_021213324.1 | XP_021068983.1 |
| 110479562 | GH1 | growth hormone 1 | Lonchura striata domestica | Bengalese finch | XM_021546944.1 | XP_021402619.1 |
| 112110158 | GH1 | growth hormone 1 | Terrapene carolina triunguis | Three-toed box turtle | XM_024205023.3 | XP_024060791.2 |
| 113976494 | GH1 | growth hormone 1 | Neopelma chrysocephalum | saffron-crested tyrant-manakin | XM_027701722.1 | XP_027557523.1 |
| 114070629 | GH1 | growth hormone 1 | Empidonax traillii | willow flycatcher | XM_027908151.1 | XP_027763952.1 |
| 114582042 | GH1 | growth hormone 1 | Podarcis muralis | Common wall lizard | XM_028702812.1 | XP_028558645.1 |
| 114815005 | GH1 | growth hormone 1 | Ornithorhynchus anatinus | platypus | XM_029074725.1 | XP_028930558.1 |
| 114889157 | GH1 | growth hormone 1 | Monodon monoceros | narwhal | XM_029212141.1 | XP_029067974.1 |
| 115617777 | GH1 | growth hormone 1 | Strigops habroptila | Kakapo | XM_030508656.1 | XP_030364516.1 |
| 116798838 | GH1 | growth hormone 1 | Chiroxiphia lanceolata | lance-tailed manakin | XM_032711495.1 | XP_032567386.1 |
| 117347125 | GH1 | growth hormone 1 | Geotrypetes seraphini | | XM_033917555.1 | XP_033773446.1 |
| 117869418 | GH1 | growth hormone 1 | Trachemys scripta elegans | | XM_034756256.1 | XP_034612147.1 |
| 118094575 | GH1 | growth hormone 1 | Zootoca vivipara | common lizard | XM_035135100.1 | XP_034990991.1 |
| 119158776 | GH1 | growth hormone 1 | Falco resticolus | gyrfalcon | XM_037411105.1 | XP_037267002.1 |
| 119514791 | GH1 | growth hormone 1 | Choloepus didactylus | southern two-toed sloth | XM_037810516.1 | XP_037666444.1 |
| 119849035 | GH1 | growth hormone 1 | Dermochelys coriacea | leatherback sea turtle | XM_038385617.1 | XP_038241545.1 |
| 119934712 | GH1 | growth hormone 1 | Tachyglossus aculeatus | Australian echidna | XM_038754265.1 | XP_038610193.1 |
| 120384947 | GH1 | growth hormone 1 | Mauremys reevesii | Reeves's turtle | XM_039504049.1 | XP_039359983.1 |
| 120766129 | GH1 | growth hormone 1 | Hirundo rustica | Barn swallow | XM_040091494.1 | XP_039947428.1 |
| 121098858 | GH1 | growth hormone 1 | Falco naumanni | lesser kestrel | XM_040617310.1 | XP_040473244.1 |
| 121333015 | GH1 | growth hormone 1 | Onychostruthus taczanowskii | white-rumped snowfinch | XM_041399030.1 | XP_041254964.1 |
| 407639 | gh1 | growth hormone 1 | Danio rerio | zebrafish | NM_001020492.2 | NP_001018328.2 |
| 100136733 | gh1 | growth hormone 1 | Oncorhynchus mykiss | rainbow trout | NM_001124689.1 | NP_001118161.1 |
| 100305005 | gh1 | growth hormone 1 | Ictalurus punctatus | channel catfish | NM_001200245.1 | NP_001187174.1 |
| 100534452 | gh1 | growth hormone 1 | Oreochromis niloticus | Nile tilapia | XM_003442542.5 | XP_003442590.1 |
| 101061166 | gh1 | growth hormone 1 | Takifugu rubripes | torafugu | XM_029836218.1 | XP_029692078.1 |
| 101171460 | gh1 | growth hormone 1 | Oryzias latipes | Japanese medaka | XM_004084500.3 | XP_004084548.1 |

TABLE 27-continued

Exemplary GH gene and/or gene products.

| Gene ID | Gene symbol | Description | Scientific name | Common name | RefSeq Transcript accessions | RefSeq Protein accessions |
|---|---|---|---|---|---|---|
| 101482244 | gh1 | growth hormone 1 | *Maylandia zebra* | zebra mbuna | XM_004556550.1 | XP_004556607.1 |
| 102222100 | gh1 | growth hormone 1 | *Xiphophorus maculatus* | southern platyfish | XM_023348379.1 | XP_023204147.1 |
| 102298120 | gh1 | growth hormone 1 | *Haplochromis burtoni* | Burton's mouthbrooder | XM_005951881.2 | XP_005951943.1 |
| 102349296 | GH1 | growth hormone 1 | *Latimeria chalumnae* | coelacanth | XM_014490978.1 | XP_014346464.1 |
| 102694171 | gh1 | growth hormone 1 | *Lepisosteus oculatus* | spotted gar | XM_006638287.2 | XP_006638350.1 |
| 102776637 | gh1 | growth hormone 1 | *Neolamprologus brichardi* |  | XM_006805238.2 | XP_006805301.2 |
| 103022738 | gh1 | growth hormone 1 | *Astyanax mexicanus* | Mexican tetra | XM_022666735.1 | XP_022522456.1 |
| 103146889 | gh1 | growth hormone 1 | *Poecilia formosa* | Amazon molly | XM_007564985.2 | XP_007565047.1 |
| 103187720 | gh1 | growth hormone 1 | *Callorhinchus milii* | elephant shark | XM_007907353.1 | XP_007905544.1 |
| 103370773 | gh1 | growth hormone 1 | *Stegastes partitus* | bicolor damselfish | XM_008299926.1 | XP_008298148.1 |
| 103387754 | gh1 | growth hormone 1 | *Cynoglossus semilaevis* | tongue sole | NM_001294211.1 | NP_001281140.1 |
| 103469032 | gh1 | growth hormone 1 | *Poecilia reticulata* | guppy | XM_008416502.2 | XP_008414724.1 |
| 104931893 | gh1 | growth hormone 1 | *Larimichthys crocea* | large yellow croaker | NM_001303325.1 | NP_001290254.1 |
| 105023357 | gh1 | growth hormone 1 | *Esox lucius* | northern pike | NM_001303940.1 | NP_001290869.1 |
| 105890783 | gh1 | growth hormone 1 | *Clupea harengus* | Atlantic herring | XM_031567293.1 | XP_031423153.1 |
| 105932808 | gh1 | growth hormone 1 | *Fundulus heteroclitus* | mummichog | XM_012872083.3 | XP_012727537.1 |
| 106528097 | gh1 | growth hormone 1 | *Austrofundulus limnaeus* |  | XM_014023173.1 | XP_013878627.1 |
| 106908006 | gh1 | growth hormone 1 | *Poecilia mexicana* |  | XM_014974317.1 | XP_014829803.1 |
| 106951157 | gh1 | growth hormone 1 | *Poecilia latipinna* | sailfin molly | XM_015038508.1 | XP_014893994.1 |
| 107089309 | gh1 | growth hormone 1 | *Cyprinodon variegatus* | sheepshead minnow | XM_015382034.1 | XP_015237520.1 |
| 107390293 | gh1 | growth hormone 1 | *Nothobranchius furzeri* | turquoise killifish | XM_015966915.1 | XP_015822401.1 |
| 107740644 | gh1 | growth hormone 1 | *Sinocyclocheilus rhinocerous* |  | XM_016553136.1 | XP_016408622.1 |
| 108243233 | gh1 | growth hormone 1 | *Kryptolebias marmoratus* | mangrove rivulus | NM_001329353.1 | NP_001316282.1 |
| 108439136 | gh1 | growth hormone 1 | *Pygocentrus nattereri* | red-bellied piranha | XM_017717373.1 | XP_017572862.1 |
| 108873234 | gh1 | growth hormone 1 | *Lates calcarifer* | barramundi perch | XM_018661387.1 | XP_018516903.1 |
| 108941578 | gh1 | growth hormone 1 | *Scleropages formosus* | Asian bonytongue | XM_018764341.2 | XP_018619857.1 |
| 109513754 | gh1 | growth hormone 1 | *Hippocampus comes* | tiger tail seahorse | XM_019866396.1 | XP_019721955.1 |
| 109643344 | gh1 | growth hormone 1 | *Paralichthys olivaceus* | Japanese flounder | XM_020108431.1 | XP_019963990.1 |
| 109893213 | gh1 | growth hormone 1 | *Oncorhynchus kisutch* | coho salmon | XM_020486328.1 | XP_020341917.1 |
| 109972673 | gh1 | growth hormone 1 | *Monopterus albus* | swamp eel | XM_020621687.1 | XP_020477343.1 |
| 109989318 | gh1 | growth hormone 1 | *Labrus bergylta* | ballan wrasse | XM_020641023.1 | XP_020496679.1 |
| 110164350 | gh1 | growth hormone 1 | *Boleophthalmus pectinirostris* | great blue-spotted mudskipper | XM_020929380.1 | XP_020785039.1 |
| 110963661 | gh1 | growth hormone 1 | *Acanthochromis polyacanthus* | spiny chromis | XM_022212105.1 | XP_022067797.1 |
| 111239800 | gh1 | growth hormone 1 | *Seriola dumerili* | greater amberjack | XM_022769709.1 | XP_022625430.1 |
| 111568175 | gh1 | growth hormone 1 | *Amphiprion ocellaris* | clown anemonefish | XM_023269682.2 | XP_023125450.1 |

TABLE 27-continued

Exemplary GH gene and/or gene products.

| Gene ID | Gene symbol | Description | Scientific name | Common name | RefSeq Transcript accessions | RefSeq Protein accessions |
|---|---|---|---|---|---|---|
| 111657519 | gh1 | growth hormone 1 | Seriola lalandi dorsalis | | XM_023409722.1 | XP_023265490.1 |
| 111856077 | gh1 | growth hormone 1 | Paramormyrops kingsleyae | | XM_023835741.1 | XP_023691509.1 |
| 111980263 | gh1 | growth hormone 1 | Salvelinus alpinus | Arctic char | XM_024010963.1 | XP_023866731.1 |
| 112139712 | gh1 | growth hormone 1 | Oryzias melastigma | Indian medaka | XM_024262545.2 | XP_024118313.1 |
| 112258502 | gh1 | growth hormone 1 | Oncorhynchus tshawytscha | Chinook salmon | XM_024432922.1 | XP_024288690.1 |
| 113019958 | gh1 | growth hormone 1 | Astatotilapia calliptera | eastern happy | XM_026163621.1 | XP_026019406.1 |
| 113048197 | gh1 | growth hormone 1 | Carassius auratus | goldfish | XM_026209832.1 | XP_026065617.1 |
| 113140986 | gh1 | growth hormone 1 | Mastacembelus armatus | zig-zag eel | XM_026325145.1 | XP_026180930.1 |
| 113156240 | gh1 | growth hormone 1 | Anabas testudineus | climbing perch | XM_026351247.1 | XP_026207032.1 |
| 113543885 | gh1 | growth hormone 1 | Pangasianodon hypophthalmus | striped catfish | XM_026942413.2 | XP_026798214.1 |
| 113587837 | gh1 | growth hormone 1 | Electrophorus electricus | electric eel | XM_027026729.2 | XP_026882530.1 |
| 113662765 | gh1 | growth hormone 1 | Tachysurus fulvidraco | yellow catfish | XM_027177856.1 | XP_027033657.1 |
| 114159494 | gh1 | growth hormone 1 | Xiphophorus couchianus | Monterrey platyfish | XM_028041458.1 | XP_027897259.1 |
| 114439503 | gh1 | growth hormone 1 | Parambassis ranga | Indian glassy fish | XM_028411470.1 | XP_028267271.1 |
| 114468109 | gh1 | growth hormone 1 | Gouania willdenowi | blunt-snouted clingfish | XM_028454811.1 | XP_028310612.1 |
| 114568956 | gh1 | growth hormone 1 | Perca flavescens | yellow perch | XM_028598648.1 | XP_028454449.1 |
| 114664390 | gh1 | growth hormone 1 | Erpetoichthys calabaricus | reedfish | XM_028818474.1 | XP_028674307.1 |
| 114793813 | gh1 | growth hormone 1 | Denticeps clupeoides | denticle herring | XM_028985943.1 | XP_028841776.1 |
| 114861059 | gh1 | growth hormone 1 | Betta splendens | Siamese fighting fish | XM_029160044.2 | XP_029015877.1 |
| 115047016 | gh1 | growth hormone 1 | Echeneis naucrates | live sharksucker | XM_029507641.1 | XP_029363501.1 |
| 115363560 | gh1 | growth hormone 1 | Myripristis murdjan | pinecone soldierfish | XM_030057829.1 | XP_029913689.1 |
| 115386537 | gh1 | growth hormone 1 | Salarias fasciatus | jewelled blenny | XM_030088891.1 | XP_029944751.1 |
| 115416472 | gh1 | growth hormone 1 | Sphaeramia orbicularis | oibiculate cardinalfish | XM_030130247.1 | XP_029986107.1 |
| 115532095 | gh1 | growth hormone 1 | Gadus morhua | Atlantic cod | XM_030341618.1 | XP_030197478.1 |
| 115574857 | gh1 | growth hormone 1 | Sparus aurata | gilthead seabream | XM_030406481.1 | XP_030262341.1 |
| 115784061 | gh1 | growth hormone 1 | Archocentrus centrarchus | flier cichlid | XM_030735123.1 | XP_030590983.1 |
| 115829874 | gh1 | growth hormone 1 | Chanos chanos | milkfish | XM_030794045.1 | XP_030649905.1 |
| 116063544 | gh1 | growth hormone 1 | Sander lucioperca | pikeperch | XM_031318542.2 | XP_031174402.1 |
| 116319389 | gh1 | growth hormone 1 | Oreochromis aureus | | XM_031738690.1 | XP_031594550.1 |
| 116401140 | gh1 | growth hormone 1 | Anarrhichthys ocellatus | wolf-eel | XM_031879401.1 | XP_031735261.1 |

TABLE 27-continued

Exemplary GH gene and/or gene products.

| Gene ID | Gene symbol | Description | Scientific name | Common name | RefSeq Transcript accessions | RefSeq Protein accessions |
|---|---|---|---|---|---|---|
| 116736294 | gh1 | growth hormone 1 | *Xiphophorus hellerii* | green swordtail | XM_032588686.1 | XP_032444577.1 |
| 119421286 | gh1 | growth hormone 1 | *Nematolebias whitei* | Rio pearlfish | XM_037688659.1 | XP_037544587.1 |

In some embodiments, the exogenous gene is a follistatin (FST) gene and/or gene product. Exemplary follistatin genes and/or gene products are shown in Table 28.

TABLE 28

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 10468 | FST | follistatin | *Homo sapiens* | human | NM_013409.3 | NP_037541.1 |
| 10468 | FST | follistatin | *Homo sapiens* | human | NM_006350.5 | NP_006341.1 |
| 10468 | FST | follistatin | *Homo sapiens* | human | XM_005248400.4 | XP_005248457.1 |
| 10468 | FST | follistatin | *Homo sapiens* | human | XM_005248401.4 | XP_005248458.1 |
| 10468 | FST | follistatin | *Homo sapiens* | human | XM_005248402.4 | XP_005248459.1 |
| 10468 | FST | follistatin | *Homo sapiens* | human | XM_005248403.4 | XP_005248460.1 |
| 10468 | FST | follistatin | *Homo sapiens* | human | XM_011543099.2 | XP_011541401.1 |
| 10468 | FST | follistatin | *Homo sapiens* | human | XM_017008954.1 | XP_016864443.1 |
| 10468 | FST | follistatin | *Homo sapiens* | human | XM_017008955.1 | XP_016864444.1 |
| 10468 | FST | follistatin | *Homo sapiens* | human | XM_024454326.1 | XP_024310094.1 |
| 14313 | Fst | follistatin | *Mus musculus* | house mouse | NM_001301373.1 | NP_001288302.1 |
| 14313 | Fst | follistatin | *Mus musculus* | house mouse | NM_008046.3 | NP_032072.1 |
| 14313 | Fst | follistatin | *Mus musculus* | house mouse | NM_001301375.1 | NP_001288304.1 |
| 14313 | Fst | follistatin | *Mus musculus* | house mouse | XM_030247150.2 | XP_030103010.1 |
| 24373 | Fst | follistatin | *Rattus norvegicus* | Norway rat | NM_012561.3 | NP_036693.1 |
| 24373 | Fst | follistatin | *Rattus norvegicus* | Norway rat | XM_006231953.4 | XP_006232015.1 |
| 24373 | Fst | follistatin | *Rattus norvegicus* | Norway rat | XM_006231954.4 | XP_006232016.1 |
| 24373 | Fst | follistatin | *Rattus norvegicus* | Norway rat | XM_039101713.1 | XP_038957641.1 |
| 327681 | FST | follistatin | *Bos taurus* | cattle | NM_175801.3 | NP_786995.2 |
| 327681 | FST | follistatin | *Bos taurus* | cattle | XM_005221516.4 | XP_005221573.1 |
| 327681 | FST | follistatin | *Bos taurus* | cattle | XM_005221517.4 | XP_005221574.1 |
| 396119 | FST | follistatin | *Gallus gallus* | chicken | NM_205200.1 | NP_990531.1 |
| 396119 | FST | follistatin | *Gallus gallus* | chicken | XM_015277250.3 | XP_015132736.1 |
| 396119 | FST | follistatin | *Gallus gallus* | chicken | XM_040655440.1 | XP_040511374.1 |
| 443323 | FST | follistatin | *Ovis aries* | sheep | NM_001257093.1 | NP_001244022.1 |
| 443323 | FST | follistatin | *Ovis aries* | sheep | XM_012096672.4 | XP_011952062.2 |
| 443323 | FST | follistatin | *Ovis aries* | sheep | XM_012096675.4 | XP_011952065.2 |
| 445002 | FST | follistatin | *Sus scrofa* | pig | NM_001003662.1 | NP_001003662.1 |
| 461879 | FST | follistatin | *Pan troglodytes* | chimpanzee | XM_003310709.5 | XP_003310757.1 |
| 461879 | FST | follistatin | *Pan troglodytes* | chimpanzee | XM_517768.6 | XP_517768.3 |
| 461879 | FST | follistatin | *Pan troglodytes* | chimpanzee | XM_009449166.3 | XP_009447441.1 |
| 461879 | FST | follistatin | *Pan troglodytes* | chimpanzee | XM_009449169.3 | XP_009447444.1 |
| 479336 | FST | follistatin | *Canis lupus familiaris* | dog | XM_038498199.1 | XP_038354127.1 |
| 479336 | FST | follistatin | *Canis lupus familiaris* | dog | XM_038474020.1 | XP_038329948.1 |
| 479336 | FST | follistatin | *Canis lupus familiaris* | dog | XM_038474021.1 | XP_038329949.1 |
| 479336 | FST | follistatin | *Canis lupus familiaris* | dog | XM_038474022.1 | XP_038329950.1 |
| 479336 | FST | follistatin | *Canis lupus familiaris* | dog | XM_038498206.1 | XP_038354134.1 |
| 479336 | FST | follistatin | *Canis lupus familiaris* | dog | XM_038498215.1 | XP_038354143.1 |
| 479336 | FST | follistatin | *Canis lupus familiaris* | dog | XM_038535119.1 | XP_038391047.1 |
| 479336 | FST | follistatin | *Canis lupus familiaris* | dog | XM_038535120.1 | XP_038391048.1 |
| 479336 | FST | follistatin | *Canis lupus familiaris* | dog | XM_038535121.1 | XP_038391049.1 |
| 479336 | FST | follistatin | *Canis lupus familiaris* | dog | XM_038599413.1 | XP_038455341.1 |
| 479336 | FST | follistatin | *Canis lupus familiaris* | dog | XM_038599414.1 | XP_038455342.1 |
| 479336 | FST | follistatin | *Canis lupus familiaris* | dog | XM_038599415.1 | XP_038455343.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 479336 | FST | follistatin | Canis lupus familiaris | dog | XM_038663721.1 | XP_038519649.1 |
| 479336 | FST | follistatin | Canis lupus familiaris | dog | XM_038663722.1 | XP_038519650.1 |
| 479336 | FST | follistatin | Canis lupus familiaris | dog | XM_038663723.1 | XP_038519651.1 |
| 493419 | fst | follistatin | Xenopus tropicalis | tropical clawed frog | XM_012960359.3 | XP_012815813.1 |
| 493419 | fst | follistatin | Xenopus tropicalis | tropical clawed frog | NM_001008056.1 | NP_001008057.1 |
| 493419 | fst | follistatin | Xenopus tropicalis | tropical clawed frog | XM_012960363.3 | XP_012815817.1 |
| 493419 | fst | follistatin | Xenopus tropicalis | tropical clawed frog | XM_031898689.1 | XP_031754549.1 |
| 653006 | fsta | follistatin a | Takifugu rubripes | torafugu | XM_029828961.1 | XP_029684821.1 |
| 653006 | fsta | follistatin a | Takifugu rubripes | torafugu | NM_001037858.2 | NP_001032947.1 |
| 653006 | fsta | follistatin a | Takifugu rubripes | torafugu | XM_011615650.2 | XP_011613952.1 |
| 653006 | fsta | follistatin a | Takifugu rubripes | torafugu | XM_011615651.2 | XP_011613953.1 |
| 707420 | FST | follistatin | Macaca mulatta | Rhesus monkey | XM_001095829.4 | XP_001095829.2 |
| 707420 | FST | follistatin | Macaca mulatta | Rhesus monkey | XM_015140070.2 | XP_014995556.1 |
| 707420 | FST | follistatin | Macaca mulatta | Rhesus monkey | XM_015140071.2 | XP_014995557.1 |
| 707420 | FST | follistatin | Macaca mulatta | Rhesus monkey | XM_015140072.2 | XP_014995558.1 |
| 100004116 | fsta | follistatin a | Danio rerio | zebrafish | XM_005165257.4 | XP_005165314.1 |
| 100004116 | fsta | follistatin a | Danio rerio | zebrafish | NM_131037.3 | NP_571112.3 |
| 100004116 | fsta | follistatin a | Danio rerio | zebrafish | XM_009301618.3 | XP_009299893.1 |
| 100016406 | FST | follistatin | Monodelphis domestica | gray short-tailed opossum | XM_001365291.4 | XP_001365328.1 |
| 100016406 | FST | follistatin | Monodelphis domestica | gray short-tailed opossum | XM_007486293.2 | XP_007486355.1 |
| 100016406 | FST | follistatin | Monodelphis domestica | gray short-tailed opossum | XM_007486294.2 | XP_007486356.1 |
| 100033825 | FST | follistatin | Equus caballus | horse | NM_001081811.2 | NP_001075280.1 |
| 100033825 | FST | follistatin | Equus caballus | horse | XM_023625236.1 | XP_023481004.1 |
| 100033825 | FST | follistatin | Equus caballus | horse | XM_023625237.1 | XP_023481005.1 |
| 100033825 | FST | follistatin | Equus caballus | horse | XM_023625239.1 | XP_023481007.1 |
| 100075750 | FST | follistatin | Ornithorhynchus anatinus | platypus | XM_029072241.2 | XP_028928074.1 |
| 100075750 | FST | follistatin | Ornithorhynchus anatinus | platypus | XM_029072303.2 | XP_028928136.1 |
| 100226154 | FST | follistatin | Taeniopygia guttata | zebra finch | XM_002197254.6 | XP_002197290.3 |
| 100301657 | fsta | follistatin a | Oncorhynchus mykiss | rainbow trout | XM_036934621.1 | XP_036790516.1 |
| 100301657 | fsta | follistatin a | Oncorhynchus mykiss | rainbow trout | NM_001160488.1 | NP_001153960.1 |
| 100343725 | FST | follistatin | Oryctolagus cuniculus | rabbit | XM_008262197.2 | XP_008260419.2 |
| 100412680 | FST | follistatin | Callithrix jacchus | white-tufted-ear marmoset | XM_002744986.5 | XP_002745032.1 |
| 100412680 | FST | follistatin | Callithrix jacchus | white-tufted-ear marmoset | XM_002744987.5 | XP_002745033.1 |
| 100412680 | FST | follistatin | Callithrix jacchus | white-tufted-ear marmoset | XM_008992077.3 | XP_008990325.1 |
| 100412680 | FST | follistatin | Callithrix jacchus | white-tufted-ear marmoset | XM_008992078.3 | XP_008990326.1 |
| 100441294 | FST | follistatin | Pongo abelii | Sumatran orangutan | XM_002815551.4 | XP_002815597.1 |
| 100441294 | FST | follistatin | Pongo abelii | Sumatran orangutan | XM_009240704.2 | XP_009238979.1 |
| 100441294 | FST | follistatin | Pongo abelii | Sumatran orangutan | XM_009240705.2 | XP_009238980.1 |
| 100441294 | FST | follistatin | Pongo abelii | Sumatran orangutan | XM_009240706.2 | XP_009238981.1 |
| 100441294 | FST | follistatin | Pongo abelii | Sumatran orangutan | XM_024247622.1 | XP_024103390.1 |
| 100441294 | FST | follistatin | Pongo abelii | Sumatran orangutan | XM_024247623.1 | XP_024103391.1 |
| 100471063 | FST | follistatin | Ailuropoda melanoleuca | giant panda | XM_002929325.4 | XP_002929371.1 |
| 100471063 | FST | follistatin | Ailuropoda melanoleuca | giant panda | XM_011237337.3 | XP_011235639.1 |
| 100471063 | FST | follistatin | Ailuropoda melanoleuca | giant panda | XM_011237338.3 | XP_011235640.1 |
| 100558257 | fst | follistatin | Anolis carolinensis | green anole | XM_003216189.3 | XP_003216237.1 |
| 100558257 | fst | follistatin | Anolis carolinensis | green anole | XM_008102798.2 | XP_008101005.1 |
| 100590138 | FST | follistatin | Nomascus leucogenys | northern white-cheeked gibbon | XM_003276522.3 | XP_003276570.1 |
| 100590138 | FST | follistatin | Nomascus leucogenys | northern white-cheeked gibbon | XM_003276523.3 | XP_003276571.1 |
| 100590138 | FST | follistatin | Nomascus leucogenys | northern white-cheeked gibbon | XM_012507849.2 | XP_012363303.1 |
| 100665588 | FST | follistatin | Loxodonta africana | African savanna elephant | XM_003408029.3 | XP_003408077.1 |
| 100665588 | FST | follistatin | Loxodonta africana | African savanna elephant | XM_010588140.1 | XP_010586442.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 100695151 | fsta | follistatin a | Oreochromis niloticus | Nile tilapia | XM_005473553.4 | XP_005473610.1 |
| 100695151 | fsta | follistatin a | Oreochromis niloticus | Nile tilapia | XM_003451019.5 | XP_003451067.2 |
| 100727862 | Fst | follistatin | Cavia porcellus | domestic guinea pig | XM_005003777.3 | XP_005003834.1 |
| 100727862 | Fst | follistatin | Cavia porcellus | domestic guinea pig | XM_003470187.3 | XP_003470235.1 |
| 100727862 | Fst | follistatin | Cavia porcellus | domestic guinea pig | XM_013152925.2 | XP_013008379.1 |
| 100774874 | Fst | follistatin | Cricetulus griseus | Chinese hamster | XM_027401432.2 | XP_027257233.1 |
| 100774874 | Fst | follistatin | Cricetulus griseus | Chinese hamster | XM_027401433.2 | XP_027257234.1 |
| 100774874 | Fst | follistatin | Cricetulus griseus | Chinese hamster | XM_027401434.2 | XP_027257235.1 |
| 100774874 | Fst | follistatin | Cricetulus griseus | Chinese hamster | XM_035455723.1 | XP_035311614.1 |
| 100774874 | Fst | follistatin | Cricetulus griseus | Chinese hamster | XM_035455724.1 | XP_035311615.1 |
| 100774874 | Fst | follistatin | Cricetulus griseus | Chinese hamster | XM_035455725.1 | XP_035311616.1 |
| 100860914 | FST | follistatin | Capra hircus | goat | NM_001285764.1 | NP_001272693.1 |
| 100860914 | FST | follistatin | Capra hircus | goat | XM_005694718.3 | XP_005694775.3 |
| 100930409 | FST | follistatin | Sarcophilus harrisii | Tasmanian devil | XM_003759356.4 | XP_003759404.1 |
| 100930409 | FST | follistatin | Sarcophilus harrisii | Tasmanian devil | XM_023495744.2 | XP_023351512.1 |
| 100930409 | FST | follistatin | Sarcophilus harrisii | Tasmanian devil | XM_031964951.1 | XP_031820811.1 |
| 100940348 | FST | follistatin | Otolemur gamettii | small-eared galago | XM_003782779.3 | XP_003782827.1 |
| 100940348 | FST | follistatin | Otolemur gamettii | small-eared galago | XM_012812529.2 | XP_012667983.1 |
| 100940348 | FST | follistatin | Otolemur gamettii | small-eared galago | XM_012812534.2 | XP_012667988.1 |
| 100940348 | FST | follistatin | Otolemur gamettii | small-eared galago | XM_012812539.2 | XP_012667993.1 |
| 100968663 | FST | follistatin | Pan paniscus | pygmy chimpanzee | XM_034960103.1 | XP_034815994.1 |
| 100968663 | FST | follistatin | Pan paniscus | pygmy chimpanzee | XM_034960104.1 | XP_034815995.1 |
| 100968663 | FST | follistatin | Pan paniscus | pygmy chimpanzee | XM_034960105.1 | XP_034815996.1 |
| 100968663 | FST | follistatin | Pan paniscus | pygmy chimpanzee | XM_034960106.1 | XP_034815997.1 |
| 101016296 | FST | follistatin | Papio anubis | olive baboon | XM_003899662.5 | XP_003899711.1 |
| 101016296 | FST | follistatin | Papio anubis | olive baboon | XM_003899663.5 | XP_003899712.1 |
| 101016296 | FST | follistatin | Papio anubis | olive baboon | XM_009208397.4 | XP_009206661.1 |
| 101016296 | FST | follistatin | Papio anubis | olive baboon | XM_009208400.4 | XP_009206664.1 |
| 101039893 | FST | follistatin | Saimiri boliviensis | Bolivian squirrel monkey | XM_003925865.3 | XP_003925914.1 |
| 101039893 | FST | follistatin | Saimiri boliviensis | Bolivian squirrel monkey | XM_010336616.2 | XP_010334918.1 |
| 101089985 | FST | follistatin | Felis catus | domestic cat | XM_023260781.1 | XP_023116549.1 |
| 101089985 | FST | follistatin | Felis catus | domestic cat | XM_023260782.1 | XP_023116550.1 |
| 101089985 | FST | follistatin | Felis catus | domestic cat | XM_023260784.1 | XP_023116552.1 |
| 101124464 | FST | follistatin | Gorilla gorilla | western gorilla | XM_004058863.2 | XP_004058911.1 |
| 101124464 | FST | follistatin | Gorilla gorilla | western gorilla | XM_004058864.2 | XP_004058912.1 |
| 101124464 | FST | follistatin | Gorilla gorilla | western gorilla | XM_019013708.2 | XP_018869253.1 |
| 101124464 | FST | follistatin | Gorilla gorilla | western gorilla | XM_019013709.2 | XP_018869254.1 |
| 101167370 | fsta | follistatin a | Oryzias latipes | Japanese medaka | XM_011478869.3 | XP_011477171.1 |
| 101167370 | fsta | follistatin a | Oryzias latipes | Japanese medaka | XM_004072152.4 | XP_004072200.1 |
| 101167370 | fsta | follistatin a | Oryzias latipes | Japanese medaka | XM_020705734.2 | XP_020561393.1 |
| 101167370 | fsta | follistatin a | Oryzias latipes | Japanese medaka | XM_020705735.2 | XP_020561394.1 |
| 101281095 | FST | follistatin | Orcinus orca | killer whale | XM_004275129.3 | XP_004275177.1 |
| 101281095 | FST | follistatin | Orcinus orca | killer whale | XM_004275130.2 | XP_004275178.1 |
| 101281095 | FST | follistatin | Orcinus orca | killer whale | XM_012534939.2 | XP_012390393.1 |
| 101323813 | FST | follistatin | Tursiops truncatus | common bottlenose dolphin | XM_033852857.1 | XP_033708748.1 |
| 101323813 | FST | follistatin | Tursiops truncatus | common bottlenose dolphin | XM_033852858.1 | XP_033708749.1 |
| 101323813 | FST | follistatin | Tursiops truncatus | common bottlenose dolphin | XM_033852859.1 | XP_033708750.1 |
| 101378021 | FST | follistatin | Odobenus rosmarus divergens | Pacific walrus | XM_004413281.2 | XP_004413338.1 |
| 101378021 | FST | follistatin | Odobenus rosmarus divergens | Pacific walrus | XM_004413282.2 | XP_004413339.1 |
| 101378021 | FST | follistatin | Odobenus rosmarus divergens | Pacific walrus | XM_012566967.1 | XP_012422421.1 |
| 101446946 | FST | follistatin | Dasypus novemcinctus | nine-banded armadillo | XM_004456174.3 | XP_004456231.1 |
| 101446946 | FST | follistatin | Dasypus novemcinctus | nine-banded armadillo | XM_004456175.3 | XP_004456232.1 |
| 101487624 | fsta | follistatin a | Maylandia zebra | zebra mbuna | XM_004546982.3 | XP_004547039.1 |
| 101487624 | fsta | follistatin a | Maylandia zebra | zebra mbuna | XM_004546983.3 | XP_004547040.1 |
| 101487624 | fsta | follistatin a | Maylandia zebra | zebra mbuna | XM_004546985.2 | XP_004547042.1 |
| 101487624 | fsta | follistatin a | Maylandia zebra | zebra mbuna | XM_024804560.1 | XP_024660328.1 |
| 101520741 | FST | follistatin | Ochotona princeps | American pika | XM_004583694.2 | XP_004583751.1 |
| 101520741 | FST | follistatin | Ochotona princeps | American pika | XM_004583695.2 | XP_004583752.1 |
| 101520741 | FST | follistatin | Ochotona princeps | American pika | XM_004583696.2 | XP_004583753.1 |
| 101551747 | FST | follistatin | Sorex araneus | European shrew | XM_012932731.1 | XP_012788185.1 |
| 101551747 | FST | follistatin | Sorex araneus | European shrew | XM_012932732.1 | XP_012788186.1 |
| 101571254 | Fst | follistatin | Octodon degus | degu | XM_004623102.3 | XP_004623159.1 |
| 101571254 | Fst | follistatin | Octodon degus | degu | XM_004623103.2 | XP_004623160.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 101571254 | Fst | follistatin | *Octodon degus* | degu | XM_004623104.2 | XP_004623161.1 |
| 101614423 | Fst | follistatin | *Jaculus jaculus* | lesser Egyptian jerboa | XM_012950240.1 | XP_012805694.1 |
| 101634752 | FST | follistatin | *Condylura cristata* | star-nosed mole | XM_004678328.1 | XP_004678385.1 |
| 101634752 | FST | follistatin | *Condylura cristata* | star-nosed mole | XM_012721714.1 | XP_012577168.1 |
| 101650536 | FST | follistatin | *Echinops telfairi* | small Madagascar hedgehog | XM_013004915.1 | XP_012860369.1 |
| 101675432 | FST | follistatin | *Mustela putorius furo* | domestic ferret | XM_004737896.1 | XP_004737953.1 |
| 101675432 | FST | follistatin | *Mustela putorius furo* | domestic ferret | XM_004737897.1 | XP_004737954.1 |
| 101675432 | FST | follistatin | *Mustela putorius furo* | domestic ferret | XM_004737898.2 | XP_004737955.1 |
| 101675432 | FST | follistatin | *Mustela putorius furo* | domestic ferret | XM_013051293.1 | XP_012906747.1 |
| 101699924 | Fst | follistatin | *Heterocephalus glaber* | naked mole-rat | XM_004848529.3 | XP_004848586.1 |
| 101699924 | Fst | follistatin | *Heterocephalus glaber* | naked mole-rat | XM_004848530.3 | XP_004848587.1 |
| 101699924 | Fst | follistatin | *Heterocephalus glaber* | naked mole-rat | XM_004848531.3 | XP_004848588.1 |
| 101802885 | FST | follistatin | *Anas platyrhynchos* | mallard | XM_005027327.4 | XP_005027384.3 |
| 101802885 | FST | follistatin | *Anas platyrhynchos* | mallard | XM_027446660.2 | XP_027302461.1 |
| 101819785 | FST | follistatin | *Ficedula albicollis* | Collared flycatcher | XM_005060617.2 | XP_005060674.1 |
| 101835278 | Fst | follistatin | *Mesocricetus auratus* | golden hamster | XM_040729042.1 | XP_040584976.1 |
| 101835278 | Fst | follistatin | *Mesocricetus auratus* | golden hamster | XM_005082770.4 | XP_005082827.1 |
| 101835278 | Fst | follistatin | *Mesocricetus auratus* | golden hamster | XM_005082771.4 | XP_005082828.1 |
| 101835278 | Fst | follistatin | *Mesocricetus auratus* | golden hamster | XM_021234523.2 | XP_021090182.1 |
| 101835278 | Fst | follistatin | *Mesocricetus auratus* | golden hamster | XM_040729043.1 | XP_040584977.1 |
| 101913049 | FST | follistatin | *Falco peregrinus* | peregrine falcon | XM_005241996.2 | XP_005242053.1 |
| 101913049 | FST | follistatin | *Falco peregrinus* | peregrine falcon | XM_027793311.1 | XP_027649112.1 |
| 101946966 | FST | follistatin | *Chrysemys picta* | Painted turtle | XM_005282168.3 | XP_005282225.1 |
| 101946966 | FST | follistatin | *Chrysemys picta* | Painted turtle | XM_008168707.2 | XP_008166929.1 |
| 101964628 | Fst | follistatin | *Ictidomys tridecemlineatus* | thirteen-lined ground squirrel | XM_013356062.3 | XP_013211516.3 |
| 101964628 | Fst | follistatin | *Ictidomys tridecemlineatus* | thirteen-lined ground squirrel | XM_040272980.1 | XP_040128914.1 |
| 101964628 | Fst | follistatin | *Ictidomys tridecemlineatus* | thirteen-lined ground squirrel | XM_040272981.1 | XP_040128915.1 |
| 101992873 | Fst | follistatin | *Microtus ochrogaster* | prairie vole | XM_005356819.3 | XP_005356876.1 |
| 101992873 | Fst | follistatin | *Microtus ochrogaster* | prairie vole | XM_005356820.3 | XP_005356877.1 |
| 101992873 | Fst | follistatin | *Microtus ochrogaster* | prairie vole | XM_013349773.2 | XP_013205227.1 |
| 102025060 | Fst | follistatin | *Chinchilla lanigera* | long-tailed chinchilla | XM_005392720.2 | XP_005392777.1 |
| 102038114 | FST | follistatin | *Geospiza fortis* | medium ground-finch | XM_031057846.1 | XP_030913706.1 |
| 102038114 | FST | follistatin | *Geospiza fortis* | medium ground-finch | XR_004081830.1 | |
| 102070375 | FST | follistatin | *Zonotrichia albicollis* | white-throated sparrow | XM_005490664.3 | XP_005490721.1 |
| 102091911 | FST | follistatin | *Columba livia* | rock pigeon | XM_005500881.3 | XP_005500938.1 |
| 102091911 | FST | follistatin | *Columba livia* | rock pigeon | XM_005500882.2 | XP_005500939.1 |
| 102105581 | FST | follistatin | *Pseudopodoces humilis* | Tibetan ground-tit | XM_005531148.2 | XP_005531205.1 |
| 102135455 | FST | follistatin | *Macaca fascicularis* | crab-eating macaque | XM_005556882.2 | XP_005556939.1 |
| 102135455 | FST | follistatin | *Macaca fascicularis* | crab-eating macaque | XM_005556883.2 | XP_005556940.1 |
| 102135455 | FST | follistatin | *Macaca fascicularis* | crab-eating macaque | XM_005556885.2 | XP_005556942.1 |
| 102135455 | FST | follistatin | *Macaca fascicularis* | crab-eating macaque | XM_015451504.1 | XP_015306990.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 102230366 | fsta | follistatin a | *Xiphophorus maculatus* | southern platyfish | XM_023344081.1 | XP_023199849.1 |
| 102230366 | fsta | follistatin a | *Xiphophorus maculatus* | southern platyfish | XM_005798403.3 | XP_005798460.2 |
| 102230366 | fsta | follistatin a | *Xiphophorus maculatus* | southern platyfish | XM_023344082.1 | XP_023199850.1 |
| 102244041 | FST | follistatin | *Myotis brandtii* | Brandt's bat | XM_014542272.1 | XP_014397758.1 |
| 102275083 | FST | follistatin | *Bos mutus* | wild yak | XM_005887365.2 | XP_005887427.2 |
| 102307735 | fsta | follistatin a | *Haplochromis burtoni* | Burton's mouthbrooder | XM_005924442.3 | XP_005924504.1 |
| 102307735 | fsta | follistatin a | *Haplochromis burtoni* | Burton's mouthbrooder | XM_005924443.3 | XP_005924505.1 |
| 102307735 | fsta | follistatin a | *Haplochromis burtoni* | Burton's mouthbrooder | XM_005924444.3 | XP_005924506.1 |
| 102307735 | fsta | follistatin a | *Haplochromis burtoni* | Burton's mouthbrooder | XM_005924445.3 | XP_005924507.1 |
| 102379402 | FST | follistatin | *Alligator sinensis* | Chinese alligator | XM_006017281.3 | XP_006017343.1 |
| 102379402 | FST | follistatin | *Alligator sinensis* | Chinese alligator | XM_025196124.1 | XP_025051909.1 |
| 102407536 | FST | follistatin | *Bubalus bubalis* | water buffalo | NM_001290906.1 | NP_001277835.1 |
| 102407536 | FST | follistatin | *Bubalus bubalis* | water buffalo | XM_006058302.2 | XP_006058364.1 |
| 102407536 | FST | follistatin | *Bubalus bubalis* | water buffalo | XM_006058303.2 | XP_006058365.1 |
| 102427213 | FST | follistatin | *Myotis lucifugus* | little brown bat | XM_006106641.3 | XP_006106703.1 |
| 102453812 | FST | follistatin | *Pelodiscus sinensis* | Chinese soft-shelled turtle | XM_006139532.3 | XP_006139594.1 |
| 102453812 | FST | follistatin | *Pelodiscus sinensis* | Chinese soft-shelled turtle | XM_006139535.3 | XP_006139597.1 |
| 102453812 | FST | follistatin | *Pelodiscus sinensis* | Chinese soft-shelled turtle | XM_006139536.3 | XP_006139598.1 |
| 102453812 | FST | follistatin | *Pelodiscus sinensis* | Chinese soft-shelled turtle | XM_025179683.1 | XP_025035468.1 |
| 102523674 | FST | follistatin | *Camelus ferus* | Wild Bactrian camel | XM_006185919.2 | XP_006185981.1 |
| 102523674 | FST | follistatin | *Camelus ferus* | Wild Bactrian camel | XM_006185920.3 | XP_006185982.1 |
| 102523674 | FST | follistatin | *Camelus ferus* | Wild Bactrian camel | XM_014560290.2 | XP_014415776.1 |
| 102544868 | FST | follistatin | *Vicugna pacos* | alpaca | XM_006205984.2 | XP_006206046.1 |
| 102544868 | FST | follistatin | *Vicugna pacos* | alpaca | XM_006205985.3 | XP_006206047.1 |
| 102544868 | FST | follistatin | *Vicugna pacos* | alpaca | XM_015240723.2 | XP_015096209.1 |
| 102561473 | FST | follistatin | *Alligator mississippiensis* | American alligator | NM_001287297.1 | NP_001274226.1 |
| 102561473 | FST | follistatin | *Alligator mississippiensis* | American alligator | XM_014593924.2 | XP_014449410.2 |
| 102741997 | FST | follistatin | *Leptonychotes weddellii* | Weddell seal | XM_006739261.2 | XP_006739324.1 |
| 102741997 | FST | follistatin | *Leptonychotes weddellii* | Weddell seal | XM_006739262.2 | XP_006739325.1 |
| 102741997 | FST | follistatin | *Leptonychotes weddellii* | Weddell seal | XM_006739263.2 | XP_006739326.1 |
| 102760348 | FST | follistatin | *Myotis davidii* | | XM_006761807.2 | XP_006761870.1 |
| 102791513 | fsta | follistatin a | *Neolamprologus brichardi* | | XM_006789984.2 | XP_006790047.1 |
| 102791513 | fsta | follistatin a | *Neolamprologus brichardi* | | XM_006789982.2 | XP_006790045.1 |
| 102791513 | fsta | follistatin a | *Neolamprologus brichardi* | | XM_006789983.2 | XP_006790046.1 |
| 102820781 | FST | follistatin | *Chrysochloris asiatica* | Cape golden mole | XM_006865741.1 | XP_006865803.1 |
| 102820781 | FST | follistatin | *Chrysochloris asiatica* | Cape golden mole | XM_006865742.1 | XP_006865804.1 |
| 102885249 | FST | follistatin | *Pteropus alecto* | black flying fox | XM_015589835.2 | XP_015445321.1 |
| 102915049 | Fst | follistatin | *Peromyscus maniculatus bairdii* | prairie deer mouse | XM_006979435.2 | XP_006979497.1 |
| 102915049 | Fst | follistatin | *Peromyscus maniculatus bairdii* | prairie deer mouse | XM_006979436.2 | XP_006979498.1 |
| 102915049 | Fst | follistatin | *Peromyscus maniculatus bairdii* | prairie deer mouse | XM_015998097.1 | XP_015853583.1 |
| 102933010 | FST | follistatin | *Chelonia mydas* | Green sea turtle | XM_007052812.3 | XP_007052874.1 |
| 102933010 | FST | follistatin | *Chelonia mydas* | Green sea turtle | XM_007052813.3 | XP_007052875.1 |
| 102958597 | FST | follistatin | *Panthera tigris altaica* | Amur tiger | XM_015535076.1 | XP_015390562.1 |
| 102958597 | FST | follistatin | *Panthera tigris altaica* | Amur tiger | XM_007076658.2 | XP_007076720.2 |
| 102958597 | FST | follistatin | *Panthera tigris altaica* | Amur tiger | XM_015535077.1 | XP_015390563.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 102958597 | FST | follistatin | Panthera tigris altaica | Amur tiger | XM_015535078.1 | XP_015390564.1 |
| 102994393 | FST | follistatin | Physeter catodon | sperm whale | XM_007121217.3 | XP_007121279.2 |
| 102994393 | FST | follistatin | Physeter catodon | sperm whale | XM_024125119.1 | XP_023980887.1 |
| 102994393 | FST | follistatin | Physeter catodon | sperm whale | XM_024125123.2 | XP_023980891.1 |
| 102994393 | FST | follistatin | Physeter catodon | sperm whale | XM_024125128.2 | XP_023980896.1 |
| 103024347 | fsta | follistatin a | Astyanax mexicanus | Mexican tetra | XM_022664911.1 | XP_022520632.1 |
| 103024347 | fsta | follistatin a | Astyanax mexicanus | Mexican tetra | XM_022664912.1 | XP_022520633.1 |
| 103053542 | FST | follistatin | Python bivittatus | Burmese python | XM_007433874.2 | XP_007433936.1 |
| 103053542 | FST | follistatin | Python bivittatus | Burmese python | XM_007433875.2 | XP_007433937.1 |
| 103085247 | FST | follistatin | Lipotes vexillifer | Yangtze River dolphin | XM_007457197.1 | XP_007457259.1 |
| 103085247 | FST | follistatin | Lipotes vexillifer | Yangtze River dolphin | XM_007457198.1 | XP_007457260.1 |
| 103109800 | FST | follistatin | Erinaceus europaeus | western European hedgehog | XM_007518915.2 | XP_007518977.1 |
| 103145891 | fsta | follistatin a | Poecilia formosa | Amazon molly | XM_007563543.2 | XP_007563605.1 |
| 103145891 | fsta | follistatin a | Poecilia formosa | Amazon molly | XM_007563544.2 | XP_007563606.1 |
| 103145891 | fsta | follistatin a | Poecilia formosa | Amazon molly | XM_007563545.2 | XP_007563607.1 |
| 103177837 | fsta | follistatin a | Callorhinchus milii | elephant shark | XM_007892196.1 | XP_007890387.1 |
| 103177837 | fsta | follistatin a | Callorhinchus milii | elephant shark | XM_007892197.1 | XP_007890388.1 |
| 103221328 | FST | follistatin | Chlorocebus sabaeus | green monkey | XM_007972220.2 | XP_007970411.1 |
| 103221328 | FST | follistatin | Chlorocebus sabaeus | green monkey | XM_007972226.2 | XP_007970417.1 |
| 103221328 | FST | follistatin | Chlorocebus sabaeus | green monkey | XM_007972236.2 | XP_007970427.1 |
| 103221328 | FST | follistatin | Chlorocebus sabaeus | green monkey | XM_037994647.1 | XP_037850575.1 |
| 103298066 | FST | follistatin | Eptesicus fuscus | big brown bat | XM_008154801.2 | XP_008153023.1 |
| 103298066 | FST | follistatin | Eptesicus fuscus | big brown bat | XM_028130099.1 | XP_027985900.1 |
| 103298066 | FST | follistatin | Eptesicus fuscus | big brown bat | XM_028130100.1 | XP_027985901.1 |
| 103298066 | FST | follistatin | Eptesicus fuscus | big brown bat | XM_028130101.1 | XP_027985902.1 |
| 103298066 | FST | follistatin | Eptesicus fuscus | big brown bat | XM_028130102.1 | XP_027985903.1 |
| 103359550 | fsta | follistatin a | Stegastes partitus | bicolor damselfish | XM_008284944.1 | XP_008283166.1 |
| 103359550 | fsta | follistatin a | Stegastes partitus | bicolor damselfish | XM_008284945.1 | XP_008283167.1 |
| 103469996 | fsta | follistatin a | Poecilia reticulata | guppy | XM_008418097.2 | XP_008416319.1 |
| 103469996 | fsta | follistatin a | Poecilia reticulata | guppy | XM_008418098.2 | XP_008416320.1 |
| 103469996 | fsta | follistatin a | Poecilia reticulata | guppy | XM_008418099.2 | XP_008416321.1 |
| 103534205 | FST | follistatin | Calypte anna | Anna's hummingbird | XM_008500140.2 | XP_008498362.1 |
| 103534205 | FST | follistatin | Calypte anna | Anna's hummingbird | XM_030467688.1 | XP_030323548.1 |
| 103558117 | FST | follistatin | Equus przewalskii | Przewalski's horse | XM_008530922.1 | XP_008529144.1 |
| 103558117 | FST | follistatin | Equus przewalskii | Przewalski's horse | XM_008530931.1 | XP_008529153.1 |
| 103558117 | FST | follistatin | Equus przewalskii | Przewalski's horse | XM_008530939.1 | XP_008529161.1 |
| 103623958 | FST | follistatin | Corvus brachyrhynchos | American crow | XM_008643143.2 | XP_008641365.2 |
| 103664631 | FST | follistatin | Ursus maritimus | polar bear | XM_008692551.2 | XP_008690773.1 |
| 103664631 | FST | follistatin | Ursus maritimus | polar bear | XM_008692552.2 | XP_008690774.1 |
| 103664631 | FST | follistatin | Ursus maritimus | polar bear | XM_008692553.2 | XP_008690775.1 |
| 103664631 | FST | follistatin | Ursus maritimus | polar bear | XM_040630444.1 | XP_040486378.1 |
| 103734045 | Fst | follistatin | Nannospalax galili | Upper Galilee mountains blind mole rat | XM_008832943.3 | XP_008831165.1 |
| 103734045 | Fst | follistatin | Nannospalax galili | Upper Galilee mountains blind mole rat | XM_008832944.2 | XP_008831166.1 |
| 103734045 | Fst | follistatin | Nannospalax galili | Upper Galilee mountains blind mole rat | XM_008832945.3 | XP_008831167.1 |
| 103774397 | FST | follistatin | Merops nubicus | carmine bee-eater | XM_008941799.1 | XP_008940047.1 |
| 103809047 | FST | follistatin | Acanthisitta chloris | rifleman | XM_009081858.1 | XP_009080106.1 |
| 103821024 | FST | follistatin | Serinus canaria | Common canary | XM_030237546.1 | XP_030093406.1 |
| 103893407 | FST | follistatin | Aptenodytes forsteri | emperor penguin | XM_009272530.2 | XP_009270805.1 |
| 103919435 | FST | follistatin | Pygoscelis adeliae | Adelie penguin | XM_009326941.1 | XP_009325216.1 |
| 104037688 | FST | follistatin | Pelecanus crispus | Dalmatian pelican | XM_009491750.1 | XP_009490025.1 |
| 104054776 | FST | follistatin | Cuculus canorus | common cuckoo | XM_009555834.1 | XP_009554129.1 |
| 104082847 | FST | follistatin | Fulmarus glacialis | Northern fulmar | XM_009586104.1 | XP_009584399.1 |
| 104134687 | FST | follistatin | Egretta garzetta | little egret | XM_009648267.2 | XP_009646562.1 |
| 104162299 | FST | follistatin | Cariama cristata | Red-legged seriema | XM_009700996.1 | XP_009699298.1 |
| 104252536 | FST | follistatin | Gavia stellata | red-throated loon | XM_009813323.1 | XP_009811625.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 104273551 | FST | follistatin | *Apaloderma vittatum* | bar-tailed trogon | XM_009868913.1 | XP_009867215.1 |
| 104294574 | FST | follistatin | *Charadrius vociferus* | killdeer | XM_009894192.1 | XP_009892494.1 |
| 104304333 | FST | follistatin | *Dryobates pubescens* | Downy woodpecker | XM_009905062.1 | XP_009903364.1 |
| 104313256 | FST | follistatin | *Haliaeetus albicilla* | white-tailed eagle | XM_009912116.1 | XP_009910418.1 |
| 104337782 | FST | follistatin | *Opisthocomus hoazin* | | XM_009943767.1 | XP_009942069.1 |
| 104353848 | FST | follistatin | *Leptosomus discolor* | cuckoo roller | XM_009960564.1 | XP_009958866.1 |
| 104359013 | FST | follistatin | *Tyto alba* | Barn owl | XM_033009189.1 | XP_032865080.1 |
| 104378937 | FST | follistatin | *Tauraco erythrolophus* | red-crested turaco | XM_009986089.1 | XP_009984391.1 |
| 104395661 | FST | follistatin | *Chaetura pelagica* | chimney swift | XM_010005390.1 | XP_010003692.1 |
| 104465848 | FST | follistatin | *Pterocles gutturalis* | yellow-throated sandgrouse | XM_010079058.1 | XP_010077360.1 |
| 104482316 | FST | follistatin | *Chlamydotis macqueenii* | Macqueen's bustard | XM_010123778.1 | XP_010122080.1 |
| 104499162 | FST | follistatin | *Buceros rhinoceros silvestris* | | XM_010142631.1 | XP_010140933.1 |
| 104510958 | FST | follistatin | *Eurypyga helias* | sunbittem | XM_010153381.1 | XP_010151683.1 |
| 104534719 | FST | follistatin | *Mesitornis unicolor* | brown roatelo | XM_010184355.1 | XP_010182657.1 |
| 104563900 | FST | follistatin | *Colius striatus* | speckled mousebird | XM_010210492.1 | XP_010208794.1 |
| 104570340 | FST | follistatin | *Tinamus guttatus* | white-throated tinamou | XM_010217341.1 | XP_010215643.1 |
| 104570340 | FST | follistatin | *Tinamus guttatus* | white-throated tinamou | XM_010217342.1 | XP_010215644.1 |
| 104615559 | FST | follistatin | *Phaethon lepturus* | White-tailed tropicbird | XM_010287616.1 | XP_010285918.1 |
| 104639935 | FST | follistatin | *Balearica regulorum gibbericeps* | East African grey crowned-crane | XM_010308139.1 | XP_010306441.1 |
| 104672474 | FST | follistatin | *Rhinopithecus roxellana* | golden snub-nosed monkey | XM_010376269.2 | XP_010374571.1 |
| 104672474 | FST | follistatin | *Rhinopithecus roxellana* | golden snub-nosed monkey | XM_010376270.2 | XP_010374572.1 |
| 104829356 | FST | follistatin | *Haliaeetus leucocephalus* | bald eagle | XM_010563543.1 | XP_010561845.1 |
| 104922976 | fsta | follistatin a | *Larimichthys crocea* | large yellow croaker | NM_001303338.1 | NP_001290267.1 |
| 104961565 | fsta | follistatin a | *Notothenia coriiceps* | black rockcod | XM_010789876.1 | XP_010788178.1 |
| 104961565 | fsta | follistatin a | *Notothenia coriiceps* | black rockcod | XM_010789877.1 | XP_010788179.1 |
| 104961565 | fsta | follistatin a | *Notothenia coriiceps* | black rockcod | XM_010789878.1 | XP_010788180.1 |
| 105001054 | FST | follistatin | *Bison bison bison* | | XM_010857168.1 | XP_010855470.1 |
| 105014556 | fsta | follistatin a | *Esox lucius* | northern pike | XM_010876967.3 | XP_010875269.1 |
| 105077820 | FST | follistatin | *Camelus bactrianus* | Bactrian camel | XM_010966299.1 | XP_010964601.1 |
| 105077820 | FST | follistatin | *Camelus bactrianus* | Bactrian camel | XM_010966300.1 | XP_010964602.1 |
| 105084297 | FST | follistatin | *Camelus dromedarius* | Arabian camel | XM_031444954.1 | XP_031300814.1 |
| 105084297 | FST | follistatin | *Camelus dromedarius* | Arabian camel | XM_031444956.1 | XP_031300816.1 |
| 105084297 | FST | follistatin | *Camelus dromedarius* | Arabian camel | XM_031444957.1 | XP_031300817.1 |
| 105305798 | FST | follistatin | *Pteropus vampyrus* | large flying fox | XM_011380601.2 | XP_011378903.1 |
| 105305798 | FST | follistatin | *Pteropus vampyrus* | large flying fox | XM_011380600.2 | XP_011378902.1 |
| 105305798 | FST | follistatin | *Pteropus vampyrus* | large flying fox | XM_011380602.2 | XP_011378904.1 |
| 105499365 | FST | follistatin | *Macaca nemestrina* | pig-tailed macaque | XM_011771908.2 | XP_011770210.1 |
| 105499365 | FST | follistatin | *Macaca nemestrina* | pig-tailed macaque | XM_011771909.2 | XP_011770211.1 |
| 105499365 | FST | follistatin | *Macaca nemestrina* | pig-tailed macaque | XM_011771912.2 | XP_011770214.1 |
| 105499365 | FST | follistatin | *Macaca nemestrina* | pig-tailed macaque | XM_011771913.2 | XP_011770215.1 |
| 105553461 | FST | follistatin | *Mandrillus leucophaeus* | drill | XM_011999536.1 | XP_011854926.1 |
| 105553461 | FST | follistatin | *Mandrillus leucophaeus* | drill | XM_011999537.1 | XP_011854927.1 |
| 105553461 | FST | follistatin | *Mandrillus leucophaeus* | drill | XM_011999538.1 | XP_011854928.1 |
| 105598090 | FST | follistatin | *Cercocebus atys* | sooty mangabey | XM_012087006.1 | XP_011942396.1 |
| 105598090 | FST | follistatin | *Cercocebus atys* | sooty mangabey | XM_012087007.1 | XP_011942397.1 |
| 105598090 | FST | follistatin | *Cercocebus atys* | sooty mangabey | XM_012087008.1 | XP_011942398.1 |
| 105598090 | FST | follistatin | *Cercocebus atys* | sooty mangabey | XM_012087009.1 | XP_011942399.1 |
| 105598090 | FST | follistatin | *Cercocebus atys* | sooty mangabey | XM_012087010.1 | XP_011942400.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 105598090 | FST | follistatin | Cercocebus atys | sooty mangabey | XM_012087011.1 | XP_011942401.1 |
| 105715277 | FST | follistatin | Aotus nancymaae | Ma's night monkey | XM_012449562.1 | XP_012304985.1 |
| 105715277 | FST | follistatin | Aotus nancymaae | Ma's night monkey | XM_012449563.1 | XP_012304986.1 |
| 105715277 | FST | follistatin | Aotus nancymaae | Ma's night monkey | XM_012449566.1 | XP_012304989.1 |
| 105715277 | FST | follistatin | Aotus nancymaae | Ma's night monkey | XM_012449567.1 | XP_012304990.1 |
| 105715277 | FST | follistatin | Aotus nancymaae | Ma's night monkey | XM_012449568.1 | XP_012304991.1 |
| 105715277 | FST | follistatin | Aotus nancymaae | Ma's night monkey | XM_012449569.1 | XP_012304992.1 |
| 105715277 | FST | follistatin | Aotus nancymaae | Ma's night monkey | XR_001107016.1 | |
| 105867022 | FST | follistatin | Microcebus murinus | gray mouse lemur | XM_012756751.1 | XP_012612205.1 |
| 105867022 | FST | follistatin | Microcebus murinus | gray mouse lemur | XM_012756752.1 | XP_012612206.1 |
| 105867022 | FST | follistatin | Microcebus murinus | gray mouse lemur | XM_012756753.1 | XP_012612207.1 |
| 105867022 | FST | follistatin | Microcebus murinus | gray mouse lemur | XM_012756754.1 | XP_012612208.1 |
| 105867022 | FST | follistatin | Microcebus murinus | gray mouse lemur | XM_012756755.1 | XP_012612209.1 |
| 105901234 | fsta | follistatin a | Clupea harengus | Atlantic herring | XM_012828661.2 | XP_012684115.1 |
| 105901234 | fsta | follistatin a | Clupea harengus | Atlantic herring | XM_012828663.2 | XP_012684117.1 |
| 105901234 | fsta | follistatin a | Clupea harengus | Atlantic herring | XM_012828664.2 | XP_012684118.1 |
| 105901234 | fsta | follistatin a | Clupea harengus | Atlantic herring | XM_012828665.2 | XP_012684119.1 |
| 105928403 | fsta | follistatin a | Fundulus heteroclitus | mummichog | XM_012865646.3 | XP_012721100.2 |
| 105928403 | fsta | follistatin a | Fundulus heteroclitus | mummichog | XM_012865647.3 | XP_012721101.2 |
| 105928403 | fsta | follistatin a | Fundulus heteroclitus | mummichog | XM_012865648.3 | XP_012721102.2 |
| 105928403 | fsta | follistatin a | Fundulus heteroclitus | mummichog | XM_012865649.3 | XP_012721103.2 |
| 105987327 | Fst | follistatin | Dipodomys ordii | Ord's kangaroo rat | XM_013018543.1 | XP_012873997.1 |
| 105987327 | Fst | follistatin | Dipodomys ordii | Ord's kangaroo rat | XM_013018544.1 | XP_012873998.1 |
| 106494556 | FST | follistatin | Apteryx mantelli mantelli | | XM_013954842.1 | XP_013810296.1 |
| 106494556 | FST | follistatin | Apteryx mantelli mantelli | | XM_013954844.1 | XP_013810298.1 |
| 106494556 | FST | follistatin | Apteryx mantelli mantelli | | XM_013954845.1 | XP_013810299.1 |
| 106494556 | FST | follistatin | Apteryx mantelli mantelli | | XM_013954846.1 | XP_013810300.1 |
| 106519902 | fsta | follistatin a | Austrofundulus limnaeus | | XM_014011758.1 | XP_013867212.1 |
| 106519902 | fsta | follistatin a | Austrofundulus limnaeus | | XM_014011759.1 | XP_013867213.1 |
| 106548877 | FST | follistatin | Thamnophis sirtalis | | XM_014066371.1 | XP_013921846.1 |
| 106570922 | fsta | follistatin a | Salmo salar | Atlantic salmon | XM_014143509.1 | XP_013998984.1 |
| 106843330 | FST | follistatin | Equus asinus | ass | XM_014860314.1 | XP_014715800.1 |
| 106861369 | FST | follistatin | Sturnus vulgaris | Common starling | XM_014889715.1 | XP_014745201.1 |
| 106901843 | FST | follistatin | Calidris pugnax | ruff | XM_014964856.1 | XP_014820342.1 |
| 106929042 | fsta | follistatin a | Poecilia mexicana | | XM_015005706.1 | XP_014861192.1 |
| 106929042 | fsta | follistatin a | Poecilia mexicana | | XM_015005707.1 | XP_014861193.1 |
| 106929042 | fsta | follistatin a | Poecilia mexicana | | XM_015005708.1 | XP_014861194.1 |
| 106962839 | fsta | follistatin a | Poecilia latipinna | sailfin molly | XM_015057475.1 | XP_014912961.1 |
| 106962839 | fsta | follistatin a | Poecilia latipinna | sailfin molly | XM_015057476.1 | XP_014912962.1 |
| 106962839 | fsta | follistatin a | Poecilia latipinna | sailfin molly | XM_015057477.1 | XP_014912963.1 |
| 106976291 | FST | follistatin | Acinonyx jubatus | cheetah | XM_027076511.1 | XP_026932312.1 |
| 106976291 | FST | follistatin | Acinonyx jubatus | cheetah | XM_027076513.1 | XP_026932314.1 |
| 106976291 | FST | follistatin | Acinonyx jubatus | cheetah | XM_027076516.1 | XP_026932317.1 |
| 107089689 | fsta | follistatin a | Cyprinodon variegatus | sheepshead minnow | XM_015382604.1 | XP_015238090.1 |
| 107089689 | fsta | follistatin a | Cyprinodon variegatus | sheepshead minnow | XM_015382605.1 | XP_015238091.1 |
| 107089689 | fsta | follistatin a | Cyprinodon variegatus | sheepshead minnow | XM_015382606.1 | XP_015238092.1 |
| 107117112 | FST | follistatin | Gekko japonicus | | XM_015419168.1 | XP_015274654.1 |
| 107117112 | FST | follistatin | Gekko japonicus | | XM_015419176.1 | XP_015274662.1 |
| 107151899 | Fst | follistatin | Marmota marmota marmota | Alpine marmot | XM_015497312.1 | XP_015352798.1 |
| 107151899 | Fst | follistatin | Marmota marmota marmota | Alpine marmot | XM_015497313.1 | XP_015352799.1 |
| 107151899 | Fst | follistatin | Marmota marmota marmota | Alpine marmot | XM_015497314.1 | XP_015352800.1 |
| 107215711 | FST | follistatin | Pares major | Great Tit | XM_015652092.3 | XP_015507578.1 |
| 107286756 | FST | follistatin | Protobothrops mucrosquamatus | | XM_015815175.1 | XP_015670661.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 107286756 | FST | follistatin | Protobothrops mucrosquamatus | | XM_015815177.1 | XP_015670663.1 |
| 107286756 | FST | follistatin | Protobothrops mucrosquamatus | | XM_015815178.1 | XP_015670664.1 |
| 107305980 | FST | follistatin | Coturnix japonica | Japanese quail | NM_001323191.1 | NP_001310120.1 |
| 107305980 | FST | follistatin | Coturnix japonica | Japanese quail | XM_015848705.2 | XP_015704191.1 |
| 107305980 | FST | follistatin | Coturnix japonica | Japanese quail | XM_015848706.2 | XP_015704192.1 |
| 107394289 | fsta | follistatin a | Nothobranchius furzeri | turquoise killifish | XM_015973174.1 | XP_015828660.1 |
| 107394289 | fsta | follistatin a | Nothobranchius furzeri | turquoise killifish | XM_015973172.1 | XP_015828658.1 |
| 107394289 | fsta | follistatin a | Nothobranchius furzeri | turquoise killifish | XM_015973173.1 | XP_015828659.1 |
| 107509659 | FST | follistatin | Rousettus aegyptiacus | Egyptian rousette | XM_016142363.2 | XP_015997849.1 |
| 107509659 | FST | follistatin | Rousettus aegyptiacus | Egyptian rousette | XM_016142364.2 | XP_015997850.1 |
| 107509659 | FST | follistatin | Rousettus aegyptiacus | Egyptian rousette | XM_016142365.2 | XP_015997851.1 |
| 107509659 | FST | follistatin | Rousettus aegyptiacus | Egyptian rousette | XM_016142366.2 | XP_015997852.1 |
| 108233656 | fsta | follistatin a | Kryptolebias marmoratus | mangrove rivulus | XM_017412250.3 | XP_017267739.1 |
| 108233656 | fsta | follistatin a | Kryptolebias marmoratus | mangrove rivulus | XM_017412251.3 | XP_017267740.1 |
| 108233656 | fsta | follistatin a | Kryptolebias marmoratus | mangrove rivulus | XM_017412252.3 | XP_017267741.1 |
| 108233656 | fsta | follistatin a | Kryptolebias marmoratus | mangrove rivulus | XM_037976290.1 | XP_037832218.1 |
| 108256050 | fsta | follistatin a | Ictalures punctatus | channel catfish | XM_017452541.1 | XP_017308030.1 |
| 108256050 | fsta | follistatin a | Ictalures punctatus | channel catfish | XM_017452542.1 | XP_017308031.1 |
| 108256050 | fsta | follistatin a | Ictalures punctatus | channel catfish | XM_017452543.1 | XP_017308032.1 |
| 108393736 | FST | follistatin | Manis javanica | Malayan pangolin | XM_017654769.2 | XP_017510258.1 |
| 108393736 | FST | follistatin | Manis javanica | Malayan pangolin | XM_017654770.2 | XP_017510259.1 |
| 108393736 | FST | follistatin | Manis javanica | Malayan pangolin | XM_017654771.2 | XP_017510260.1 |
| 108393736 | FST | follistatin | Manis javanica | Malayan pangolin | XM_017654772.2 | XP_017510261.1 |
| 108438331 | fsta | follistatin a | Pygocentrus nattereri | red-bellied piranha | XM_017716056.2 | XP_017571545.1 |
| 108438331 | fsta | follistatin a | Pygocentrus nattereri | red-bellied piranha | XM_017716058.2 | XP_017571547.1 |
| 108518314 | FST | follistatin | Rhinopithecus bieti | black snub-nosed monkey | XM_017856573.1 | XP_017712062.1 |
| 108792527 | FST | follistatin | Nanorana parkeri | | XM_018563321.1 | XP_018418823.1 |
| 108881314 | fsta | follistatin a | Lates calcarifer | barramundi perch | XM_018673243.1 | XP_018528759.1 |
| 108938465 | fsta | follistatin a | Scleropages formosus | Asian bonytongue | XM_018759026.2 | XP_018614542.1 |
| 109275898 | FST | follistatin | Panthera pardus | leopard | XM_019464328.1 | XP_019319873.1 |
| 109275898 | FST | follistatin | Panthera pardus | leopard | XM_019464329.1 | XP_019319874.1 |
| 109275898 | FST | follistatin | Panthera pardus | leopard | XM_019464330.1 | XP_019319875.1 |
| 109297826 | FST | follistatin | Gavialis gangeticus | Gharial | XM_019517876.1 | XP_019373421.1 |
| 109297826 | FST | follistatin | Gavialis gangeticus | Gharial | XM_019517877.1 | XP_019373422.1 |
| 109307904 | FST | follistatin | Crocodylus porosus | Australian saltwater crocodile | XM_019532050.1 | XP_019387595.1 |
| 109307904 | FST | follistatin | Crocodylus porosus | Australian saltwater crocodile | XM_019532051.1 | XP_019387596.1 |
| 109382113 | FST | follistatin | Hipposideros armiger | great roundleaf bat | XM_019641418.1 | XP_019496963.1 |
| 109382113 | FST | follistatin | Hipposideros armiger | great roundleaf bat | XM_019641419.1 | XP_019496964.1 |
| 109382113 | FST | follistatin | Hipposideros armiger | great roundleaf bat | XM_019641420.1 | XP_019496965.1 |
| 109382113 | FST | follistatin | Hipposideros armiger | great roundleaf bat | XM_019641421.1 | XP_019496966.1 |
| 109526767 | fsta | follistatin a | Hippocampus comes | tiger tail seahorse | XM_019888249.1 | XP_019743808.1 |
| 109526767 | fsta | follistatin a | Hippocampus comes | tiger tail seahorse | XM_019888259.1 | XP_019743818.1 |
| 109526767 | fsta | follistatin a | Hippocampus comes | tiger tail seahorse | XM_019888268.1 | XP_019743827.1 |
| 109574972 | FST | follistatin | Bos indicus | zebu cattle | XM_019983027.1 | XP_019838586.1 |
| 109574972 | FST | follistatin | Bos indicus | zebu cattle | XM_019983028.1 | XP_019838587.1 |
| 109574972 | FST | follistatin | Bos indicus | zebu cattle | XM_019983030.1 | XP_019838589.1 |
| 109637161 | fsta | follistatin a | Paralichthys olivaceus | Japanese flounder | XM_020099353.1 | XP_019954912.1 |
| 109637161 | fsta | follistatin a | Paralichthys olivaceus | Japanese flounder | XM_020099354.1 | XP_019954913.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 109637161 | fsta | follistatin a | Paralichthys olivaceus | Japanese flounder | XM_020099355.1 | XP_019954914.1 |
| 109691801 | Fst | follistatin | Castor canadensis | American beaver | XM_020171997.1 | XP_020027586.1 |
| 109691801 | Fst | follistatin | Castor canadensis | American beaver | XM_020171998.1 | XP_020027587.1 |
| 109691801 | Fst | follistatin | Castor canadensis | American beaver | XM_020171999.1 | XP_020027588.1 |
| 109956679 | fsta | follistatin a | Monopterus albus | swamp eel | XM_020593986.1 | XP_020449642.1 |
| 109956679 | fsta | follistatin a | Monopterus albus | swamp eel | XM_020593987.1 | XP_020449643.1 |
| 109956679 | fsta | follistatin a | Monopterus albus | swamp eel | XM_020593988.1 | XP_020449644.1 |
| 109991601 | fsta | follistatin a | Labrus bergylta | ballan wrasse | XM_020643928.2 | XP_020499584.1 |
| 109991601 | fsta | follistatin a | Labrus bergylta | ballan wrasse | XM_020643930.2 | XP_020499586.1 |
| 109991601 | fsta | follistatin a | Labrus bergylta | ballan wrasse | XM_020643931.2 | XP_020499587.1 |
| 110073924 | FST | follistatin | Pogona vitticeps | central bearded dragon | XM_020783654.1 | XP_020639313.1 |
| 110073924 | FST | follistatin | Pogona vitticeps | central bearded dragon | XM_020783655.1 | XP_020639314.1 |
| 110142525 | FST | follistatin | Odocoileus virginianus texanus | | XM_020901748.1 | XP_020757407.1 |
| 110142525 | FST | follistatin | Odocoileus virginianus texanus | | XM_020901749.1 | XP_020757408.1 |
| 110142525 | FST | follistatin | Odocoileus virginianus texanus | | XM_020901750.1 | XP_020757409.1 |
| 110161295 | fsta | follistatin a | Boleophthalmus pectinirostris | great blue-spotted mudskipper | XM_020926058.1 | XP_020781717.1 |
| 110161295 | fsta | follistatin a | Boleophthalmus pectinirostris | great blue-spotted mudskipper | XM_020926131.1 | XP_020781790.1 |
| 110161295 | fsta | follistatin a | Boleophthalmus pectinirostris | great blue-spotted mudskipper | XM_020926203.1 | XP_020781862.1 |
| 110161295 | fsta | follistatin a | Boleophthalmus pectinirostris | great blue-spotted mudskipper | XM_020926277.1 | XP_020781936.1 |
| 110161295 | fsta | follistatin a | Boleophthalmus pectinirostris | great blue-spotted mudskipper | XM_020926356.1 | XP_020782015.1 |
| 110215453 | FST | follistatin | Phascolarctos cinereus | koala | XM_020996918.1 | XP_020852577.1 |
| 110215453 | FST | follistatin | Phascolarctos cinereus | koala | XM_020996930.1 | XP_020852589.1 |
| 110307956 | Fst | follistatin | Mus caroli | Ryukyu mouse | XM_021180264.1 | XP_021035923.1 |
| 110307956 | Fst | follistatin | Mus caroli | Ryukyu mouse | XM_021180265.1 | XP_021035924.1 |
| 110307956 | Fst | follistatin | Mus caroli | Ryukyu mouse | XM_021180266.2 | XP_021035925.1 |
| 110328968 | Fst | follistatin | Mus pahari | shrew mouse | XM_021208475.2 | XP_021064134.1 |
| 110328968 | Fst | follistatin | Mus pahari | shrew mouse | XM_021208476.1 | XP_021064135.1 |
| 110328968 | Fst | follistatin | Mus pahari | shrew mouse | XM_021208477.2 | XP_021064136.1 |
| 110389795 | FST | follistatin | Numida meleagris | helmeted guineafowl | XM_021380734.1 | XP_021236409.1 |
| 110389795 | FST | follistatin | Numida meleagris | helmeted guineafowl | XM_021380735.1 | XP_021236410.1 |
| 110565358 | Fst | follistatin | Meriones unguiculatus | Mongolian gerbil | XM_021663033.1 | XP_021518708.1 |
| 110565358 | Fst | follistatin | Meriones unguiculatus | Mongolian gerbil | XM_021663034.1 | XP_021518709.1 |
| 110565358 | Fst | follistatin | Meriones unguiculatus | Mongolian gerbil | XM_021663035.1 | XP_021518710.1 |
| 110586589 | FST | follistatin | Neomonachus schauinslandi | Hawaiian monk seal | XM_021696815.1 | XP_021552490.1 |
| 110586589 | FST | follistatin | Neomonachus schauinslandi | Hawaiian monk seal | XM_021696825.1 | XP_021552500.1 |
| 110968245 | fsta | follistatin a | Acanthochromis polyacanthus | spiny chromis | XM_022218084.1 | XP_022073776.1 |
| 110968245 | fsta | follistatin a | Acanthochromis polyacanthus | spiny chromis | XM_022218085.1 | XP_022073777.1 |
| 111163133 | FST | follistatin | Delphinapterus leucas | beluga whale | XM_022551613.1 | XP_022407321.1 |
| 111163133 | FST | follistatin | Delphinapterus leucas | beluga whale | XM_022551624.2 | XP_022407332.1 |
| 111236471 | fsta | follistatin a | Seriola dumerili | greater amberjack | XM_022765210.1 | XP_022620931.1 |
| 111236471 | fsta | follistatin a | Seriola dumerili | greater amberjack | XM_022765211.1 | XP_022620932.1 |
| 111567825 | fsta | follistatin a | Amphiprion ocellaris | clown anemonefish | XM_023269155.2 | XP_023124923.1 |
| 111567825 | fsta | follistatin a | Amphiprion ocellaris | clown anemonefish | XM_023269156.2 | XP_023124924.1 |
| 111567825 | fsta | follistatin a | Amphiprion ocellaris | clown anemonefish | XM_035947641.1 | XP_035803534.1 |
| 111941409 | FST | follistatin | Cyanistes caeruleus | blue tit | XM_023944540.1 | XP_023800308.1 |
| 112148295 | fsta | follistatin a | Oryzias melastigma | Indian medaka | XM_024275280.2 | XP_024131048.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 112148295 | fsta | follistatin a | Oryzias melastigma | Indian medaka | XM_024275281.2 | XP_024131049.1 |
| 112148295 | fsta | follistatin a | Oryzias melastigma | Indian medaka | XM_024275282.2 | XP_024131050.1 |
| 112148295 | fsta | follistatin a | Oryzias melastigma | Indian medaka | XM_036213417.1 | XP_036069310.1 |
| 112148295 | fsta | follistatin a | Oryzias melastigma | Indian medaka | XM_036213418.1 | XP_036069311.1 |
| 112262496 | fsta | follistatin a | Oncorhynchus tshawytscha | Chinook salmon | XM_024438115.1 | XP_024293883.1 |
| 112262496 | fsta | follistatin a | Oncorhynchus tshawytscha | Chinook salmon | XM_024438113.1 | XP_024293881.1 |
| 112262496 | fsta | follistatin a | Oncorhynchus tshawytscha | Chinook salmon | XM_024438114.1 | XP_024293882.1 |
| 112315278 | FST | follistatin | Desmodus rotundus | common vampire bat | XM_024571961.1 | XP_024427729.1 |
| 112626804 | FST | follistatin | Theropithecus gelada | gelada | XM_025389148.1 | XP_025244933.1 |
| 112626804 | FST | follistatin | Theropithecus gelada | gelada | XM_025389149.1 | XP_025244934.1 |
| 112626804 | FST | follistatin | Theropithecus gelada | gelada | XM_025389151.1 | XP_025244936.1 |
| 112626804 | FST | follistatin | Theropithecus gelada | gelada | XM_025389152.1 | XP_025244937.1 |
| 112626804 | FST | follistatin | Theropithecus gelada | gelada | XM_025389153.1 | XP_025244938.1 |
| 112626804 | FST | follistatin | Theropithecus gelada | gelada | XM_025389154.1 | XP_025244939.1 |
| 112820221 | FST | follistatin | Callorhinus ursinus | northern fur seal | XM_025867292.1 | XP_025723077.1 |
| 112820221 | FST | follistatin | Callorhinus ursinus | northern fur seal | XM_025867293.1 | XP_025723078.1 |
| 112820221 | FST | follistatin | Callorhinus ursinus | northern fur seal | XM_025867294.1 | XP_025723079.1 |
| 112820221 | FST | follistatin | Callorhinus ursinus | northern fur seal | XM_025867295.1 | XP_025723080.1 |
| 112860476 | FST | follistatin | Puma concolor | puma | XM_025923779.1 | XP_025779564.1 |
| 112933767 | FST | follistatin | Vulpes vulpes | red fox | XM_026017016.1 | XP_025872801.1 |
| 112933767 | FST | follistatin | Vulpes vulpes | red fox | XM_026017017.1 | XP_025872802.1 |
| 112933767 | FST | follistatin | Vulpes vulpes | red fox | XM_026017018.1 | XP_025872803.1 |
| 112944327 | FST | follistatin | Nothoprocta perdicaria | | XM_026035735.1 | XP_025891520.1 |
| 112944327 | FST | follistatin | Nothoprocta perdicaria | | XM_026035742.1 | XP_025891527.1 |
| 112995786 | FST | follistatin | Dromaius novaehollandiae | emu | XM_026120983.1 | XP_025976768.1 |
| 112995786 | FST | follistatin | Dromaius novaehollandiae | emu | XM_026120984.1 | XP_025976769.1 |
| 112995786 | FST | follistatin | Dromaius novaehollandiae | emu | XM_026120985.1 | XP_025976770.1 |
| 113034074 | fsta | follistatin a | Astatotilapia calliptera | eastern happy | XM_026188371.1 | XP_026044156.1 |
| 113034074 | fsta | follistatin a | Astatotilapia calliptera | eastern happy | XM_026188372.1 | XP_026044157.1 |
| 113138729 | fsta | follistatin a | Mastacembelus armatus | zig-zag eel | XM_026321412.2 | XP_026177197.1 |
| 113138729 | fsta | follistatin a | Mastacembelus armatus | zig-zag eel | XM_026321413.2 | XP_026177198.1 |
| 113150568 | fsta | follistatin a | Anabas testudineus | climbing perch | XM_026343128.1 | XP_026198913.1 |
| 113150568 | fsta | follistatin a | Anabas testudineus | climbing perch | XM_026343129.1 | XP_026198914.1 |
| 113150568 | fsta | follistatin a | Anabas testudineus | climbing perch | XM_026343130.1 | XP_026198915.1 |
| 113180790 | Fst | follistatin | Urocitellus parryii | Arctic ground squirrel | XM_026385943.1 | XP_026241728.1 |
| 113263911 | FST | follistatin | Ursus arctos horribilis | | XM_026510680.1 | XP_026366465.1 |
| 113263911 | FST | follistatin | Ursus arctos horribilis | | XM_026510681.1 | XP_026366466.1 |
| 113263911 | FST | follistatin | Ursus arctos horribilis | | XM_026510682.1 | XP_026366467.1 |
| 113263911 | FST | follistatin | Ursus arctos horribilis | | XM_026510684.1 | XP_026366469.1 |
| 113425296 | FST | follistatin | Notechis scutatus | mainland tiger snake | XM_026687390.1 | XP_026543175.1 |
| 113446710 | FST | follistatin | Pseudonaja textilis | | XM_026716484.1 | XP_026572269.1 |
| 113446710 | FST | follistatin | Pseudonaja textilis | | XM_026716493.1 | XP_026572278.1 |
| 113446710 | FST | follistatin | Pseudonaja textilis | | XM_026716501.1 | XP_026572286.1 |
| 113446710 | FST | follistatin | Pseudonaja textilis | | XM_026716511.1 | XP_026572296.1 |

TABLE 28-continued

Exemplary follistatin genes and/or gene products.

| Gene ID | Gene symbol | Description | Scientific name | Common name | RefSeq Transcript accessions | RefSeq Protein accessions |
| --- | --- | --- | --- | --- | --- | --- |
| 113489646 | FST | follistatin | Athene cunicularia | burrowing owl | XM_026865566.1 | XP_026721367.1 |
| 113589819 | fsta | follistatin a | Electrophorus electricus | electric eel | XM_027029665.2 | XP_026885466.1 |
| 113617555 | FST | follistatin | Lagenorhynchus obliquidens | Pacific white-sided dolphin | XM_027101130.1 | XP_026956931.1 |
| 113617555 | FST | follistatin | Lagenorhynchus obliquidens | Pacific white-sided dolphin | XM_027101131.1 | XP_026956932.1 |
| 113617555 | FST | follistatin | Lagenorhynchus obliquidens | Pacific white-sided dolphin | XM_027101132.1 | XP_026956933.1 |
| 113878983 | FST | follistatin | Bos indicus × Bos taurus | hybrid cattle | XM_027520199.1 | XP_027376000.1 |
| 113878983 | FST | follistatin | Bos indicus × Bos taurus | hybrid cattle | XM_027520200.1 | XP_027376001.1 |
| 113878983 | FST | follistatin | Bos indicus × Bos taurus | hybrid cattle | XM_027520201.1 | XP_027376002.1 |
| 113929788 | FST | follistatin | Zalophus californianus | California sea lion | XM_027606936.2 | XP_027462737.1 |
| 113929788 | FST | follistatin | Zalophus californianus | California sea lion | XM_027606937.2 | XP_027462738.1 |
| 113929788 | FST | follistatin | Zalophus californianus | California sea lion | XM_027606938.1 | XP_027462739.1 |
| 113981780 | FST | follistatin | Neopelma chrysocephalum | saffron-crested tyrant-manakin | XM_027709360.1 | XP_027565161.1 |
| 113981780 | FST | follistatin | Neopelma chrysocephalum | saffron-crested tyrant-manakin | XM_027709361.1 | XP_027565162.1 |
| 114044168 | FST | follistatin | Vombatus ursinus | common wombat | XM_027863496.1 | XP_027719297.1 |
| 114044168 | FST | follistatin | Vombatus ursinus | common wombat | XM_027863497.1 | XP_027719298.1 |
| 114072516 | FST | follistatin | Empidonax traillii | willow flycatcher | XM_027910407.1 | XP_027766208.1 |
| 114072516 | FST | follistatin | Empidonax traillii | willow flycatcher | XM_027910415.1 | XP_027766216.1 |
| 114094969 | Fst | follistatin | Marmota flaviventris | yellow-bellied marmot | XM_027938122.1 | XP_027793923.1 |
| 114094969 | Fst | follistatin | Marmota flaviventris | yellow-bellied marmot | XM_027938123.2 | XP_027793924.1 |
| 114154714 | fsta | follistatin a | Xiphophorus couchianus | Monterrey platyfish | XM_028034049.1 | XP_027889850.1 |
| 114154714 | fsta | follistatin a | Xiphophorus couchianus | Monterrey platyfish | XM_028034051.1 | XP_027889852.1 |
| 114154714 | fsta | follistatin a | Xiphophorus couchianus | Monterrey platyfish | XM_028034052.1 | XP_027889853.1 |
| 114154714 | fsta | follistatin a | Xiphophorus couchianus | Monterrey platyfish | XM_028034053.1 | XP_027889854.1 |
| 114211938 | FST | follistatin | Eumetopias jubatus | Steller sea lion | XM_028106654.1 | XP_027962455.1 |
| 114211938 | FST | follistatin | Eumetopias jubatus | Steller sea lion | XM_028106655.1 | XP_027962456.1 |
| 114211938 | FST | follistatin | Eumetopias jubatus | Steller sea lion | XM_028106656.1 | XP_027962457.1 |
| 114211938 | FST | follistatin | Eumetopias jubatus | Steller sea lion | XM_028106657.1 | XP_027962458.1 |
| 114441645 | fsta | follistatin a | Parambassis ranga | Indian glassy fish | XM_028414661.1 | XP_028270462.1 |
| 114441645 | fsta | follistatin a | Parambassis ranga | Indian glassy fish | XM_028414662.1 | XP_028270463.1 |
| 114500867 | FST | follistatin | Phyllostomus discolor | pale spear-nosed bat | XM_028517630.2 | XP_028373431.1 |
| 114500867 | FST | follistatin | Phyllostomus discolor | pale spear-nosed bat | XM_036020156.1 | XP_035876049.1 |
| 114500867 | FST | follistatin | Phyllostomus discolor | pale spear-nosed bat | XM_036020157.1 | XP_035876050.1 |
| 114556105 | fsta | follistatin a | Perea flavescens | yellow perch | XM_028578962.1 | XP_028434763.1 |
| 114606515 | FST | follistatin | Podarcis muralis | Common wall lizard | XM_028748865.1 | XP_028604698.1 |
| 114606515 | FST | follistatin | Podarcis muralis | Common wall lizard | XM_028748866.1 | XP_028604699.1 |
| 114654814 | fsta | follistatin a | Erpetoichthys calabaricus | reedfish | XM_028805619.1 | XP_028661452.1 |
| 114654814 | fsta | follistatin a | Erpetoichthys calabaricus | reedfish | XM_028805620.1 | XP_028661453.1 |
| 114654814 | fsta | follistatin a | Erpetoichthys calabaricus | reedfish | XM_028805621.1 | XP_028661454.1 |
| 114703713 | Fst | follistatin | Peromyscus leucopus | white-footed mouse | XM_028884585.2 | XP_028740418.1 |
| 114703713 | Fst | follistatin | Peromyscus leucopus | white-footed mouse | XM_028884588.2 | XP_028740421.1 |
| 114703713 | Fst | follistatin | Peromyscus leucopus | white-footed mouse | XM_028884597.2 | XP_028740430.1 |
| 114862477 | fsta | follistatin a | Betta splendens | Siamese fighting fish | XM_029162808.2 | XP_029018641.1 |
| 114862477 | fsta | follistatin a | Betta splendens | Siamese fighting fish | XM_029162809.2 | XP_029018642.1 |
| 114893383 | FST | follistatin | Monodon monoceros | narwhal | XM_029219138.1 | XP_029074971.1 |

TABLE 28-continued

Exemplary follistatin genes and/or gene products.

| Gene ID | Gene symbol | Description | Scientific name | Common name | RefSeq Transcript accessions | RefSeq Protein accessions |
| --- | --- | --- | --- | --- | --- | --- |
| 115013848 | fsta | follistatin a | Cottoperca gobio | | XM_029440383.1 | XP_029296243.1 |
| 115013848 | fsta | follistatin a | Cottoperca gobio | | XM_029440384.1 | XP_029296244.1 |
| 115049185 | fsta | follistatin a | Echeneis naucrates | live sharksucker | XM_029511210.1 | XP_029367070.1 |
| 115049185 | fsta | follistatin a | Echeneis naucrates | live sharksucker | XM_029511211.1 | XP_029367071.1 |
| 115049185 | fsta | follistatin a | Echeneis naucrates | live sharksucker | XM_029511212.1 | XP_029367072.1 |
| 115076244 | FST | follistatin | Rhinatrema bivittatum | two-lined caecilian | XM_029577474.1 | XP_029433334.1 |
| 115076244 | FST | follistatin | Rhinatrema bivittatum | two-lined caecilian | XM_029577484.1 | XP_029433344.1 |
| 115076244 | FST | follistatin | Rhinatrema bivittatum | two-lined caecilian | XR_003852712.1 | |
| 115293773 | FST | follistatin | Suricata suricatta | meerkat | XM_029941471.1 | XP_029797331.1 |
| 115293773 | FST | follistatin | Suricata suricatta | meerkat | XM_029941472.1 | XP_029797332.1 |
| 115293773 | FST | follistatin | Suricata suricatta | meerkat | XM_029941473.1 | XP_029797333.1 |
| 115337401 | FST | follistatin | Aquila chrysaetos chrysaetos | | XM_030005665.2 | XP_029861525.1 |
| 115337401 | FST | follistatin | Aquila chrysaetos chrysaetos | | XM_030005667.2 | XP_029861527.1 |
| 115398055 | fsta | follistatin a | Salarias fasciatus | jewelled blenny | XM_030104682.1 | XP_029960542.1 |
| 115398055 | fsta | follistatin a | Salarias fasciatus | jewelled blenny | XM_030104683.1 | XP_029960543.1 |
| 115462982 | FST | follistatin | Microcaecilia unicolor | | XM_030193118.1 | XP_030048978.1 |
| 115462982 | FST | follistatin | Microcaecilia unicolor | | XM_030193119.1 | XP_030048979.1 |
| 115462982 | FST | follistatin | Microcaecilia unicolor | | XM_030193120.1 | XP_030048980.1 |
| 115523762 | FST | follistatin | Lynx canadensis | Canada lynx | XM_030330028.1 | XP_030185888.1 |
| 115523762 | FST | follistatin | Lynx canadensis | Canada lynx | XM_030330037.1 | XP_030185897.1 |
| 115523762 | FST | follistatin | Lynx canadensis | Canada lynx | XM_030330039.1 | XP_030185899.1 |
| 115523762 | FST | follistatin | Lynx canadensis | Canada lynx | XM_030330040.1 | XP_030185900.1 |
| 115523762 | FST | follistatin | Lynx canadensis | Canada lynx | XM_030330043.1 | XP_030185903.1 |
| 115523762 | FST | follistatin | Lynx canadensis | Canada lynx | XM_030330044.2 | XP_030185904.1 |
| 115554096 | fsta | follistatin a | Gadus morhua | Atlantic cod | XM_030370711.1 | XP_030226571.1 |
| 115554096 | fsta | follistatin a | Gadus morhua | Atlantic cod | XM_030370712.1 | XP_030226572.1 |
| 115581546 | fsta | follistatin a | Spares aurata | gilthead seabream | XM_030416715.1 | XP_030272575.1 |
| 115581546 | fsta | follistatin a | Spares aurata | gilthead seabream | XM_030416716.1 | XP_030272576.1 |
| 115581546 | fsta | follistatin a | Spares aurata | gilthead seabream | XM_030416717.1 | XP_030272577.1 |
| 115785746 | fsta | follistatin a | Archocentres centrarchus | flier cichlid | XM_030737569.1 | XP_030593429.1 |
| 115785746 | fsta | follistatin a | Archocentres centrarchus | flier cichlid | XM_030737570.1 | XP_030593430.1 |
| 115812709 | fsta | follistatin a | Chanos chanos | milkfish | XM_030775201.1 | XP_030631061.1 |
| 115866461 | FST | follistatin | Globicephala melas | long-finned pilot whale | XM_030881958.1 | XP_030737818.1 |
| 115866461 | FST | follistatin | Globicephala melas | long-finned pilot whale | XM_030881960.1 | XP_030737820.1 |
| 115866461 | FST | follistatin | Globicephala melas | long-finned pilot whale | XM_030881961.1 | XP_030737821.1 |
| 115915700 | FST | follistatin | Camarhynchus parvulus | | XM_030969318.1 | XP_030825178.1 |
| 116083576 | Fst | follistatin | Mastomys coucha | southern multimammate mouse | XM_031360361.1 | XP_031216221.1 |
| 116083576 | Fst | follistatin | Mastomys coucha | southern multimammate mouse | XM_031360362.1 | XP_031216222.1 |
| 116083576 | Fst | follistatin | Mastomys coucha | southern multimammate mouse | XM_031360363.1 | XP_031216223.1 |
| 116239361 | FST | follistatin | Phasianus colchicus | Ring-necked pheasant | XM_031609451.1 | XP_031465311.1 |
| 116462251 | FST | follistatin | Hylobates moloch | silvery gibbon | XM_032144556.1 | XP_032000447.1 |
| 116462251 | FST | follistatin | Hylobates moloch | silvery gibbon | XM_032144557.1 | XP_032000448.1 |
| 116462251 | FST | follistatin | Hylobates moloch | silvery gibbon | XM_032144558.1 | XP_032000449.1 |
| 116500689 | FST | follistatin | Aythya fill igula | tufted duck | XM_032205869.1 | XP_032061760.1 |
| 116500689 | FST | follistatin | Aythya fuligula | tufted duck | XM_032205870.1 | XP_032061761.1 |
| 116500689 | FST | follistatin | Aythya fuligula | tufted duck | XM_032205871.1 | XP_032061762.1 |
| 116506000 | FST | follistatin | Thamnophis elegans | Western terrestrial garter snake | XM_032213536.1 | XP_032069427.1 |
| 116506000 | FST | follistatin | Thamnophis elegans | Western terrestrial garter snake | XM_032213537.1 | XP_032069428.1 |
| 116506000 | FST | follistatin | Thamnophis elegans | Western terrestrial garter snake | XM_032213538.1 | XP_032069429.1 |
| 116553487 | FST | follistatin | Sapajus apella | tufted capuchin | XM_032281029.1 | XP_032136920.1 |
| 116553487 | FST | follistatin | Sapajus apella | tufted capuchin | XM_032281038.1 | XP_032136929.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 116553487 | FST | follistatin | Sapajus apella | tufted capuchin | XM_032281047.1 | XP_032136938.1 |
| 116553487 | FST | follistatin | Sapajus apella | tufted capuchin | XM_032281058.1 | XP_032136949.1 |
| 116586898 | FST | follistatin | Mustela erminea | ermine | XM_032337421.1 | XP_032193312.1 |
| 116586898 | FST | follistatin | Mustela erminea | ermine | XM_032337422.1 | XP_032193313.1 |
| 116586898 | FST | follistatin | Mustela erminea | ermine | XM_032337423.1 | XP_032193314.1 |
| 116586898 | FST | follistatin | Mustela erminea | ermine | XM_032337424.1 | XP_032193315.1 |
| 116626120 | FST | follistatin | Phoca vitulina | harbor seal | XM_032395295.1 | XP_032251186.1 |
| 116626120 | FST | follistatin | Phoca vitulina | harbor seal | XM_032395296.1 | XP_032251187.1 |
| 116689478 | fsta | follistatin a | Etheostoma spectabile | orangethroat darter | XM_032516030.1 | XP_032371921.1 |
| 116689478 | fsta | follistatin a | Etheostoma spectabile | orangethroat darter | XM_032516031.1 | XP_032371922.1 |
| 116729916 | fsta | follistatin a | Xiphophorus hellerii | green swordtail | XM_032578794.1 | XP_032434685.1 |
| 116729916 | fsta | follistatin a | Xiphophorus hellerii | green swordtail | XM_032578795.1 | XP_032434686.1 |
| 116729916 | fsta | follistatin a | Xiphophorus hellerii | green swordtail | XM_032578796.1 | XP_032434687.1 |
| 116729916 | fsta | follistatin a | Xiphophorus hellerii | green swordtail | XM_032578797.1 | XP_032434688.1 |
| 116752270 | FST | follistatin | Phocoena sinus | vaquita | XM_032629109.1 | XP_032485000.1 |
| 116752270 | FST | follistatin | Phocoena sinus | vaquita | XM_032629110.1 | XP_032485001.1 |
| 116752270 | FST | follistatin | Phocoena sinus | vaquita | XM_032629111.1 | XP_032485002.1 |
| 116752270 | FST | follistatin | Phocoena sinus | vaquita | XM_032629112.1 | XP_032485003.1 |
| 116752270 | FST | follistatin | Phocoena sinus | vaquita | XM_032629113.1 | XP_032485004.1 |
| 116752270 | FST | follistatin | Phocoena sinus | vaquita | XM_032629115.1 | XP_032485006.1 |
| 116835779 | FST | follistatin | Chelonoidis abingdonii | Abingdon island giant tortoise | XM_032798914.1 | XP_032654805.1 |
| 116864160 | FST | follistatin | Lontra canadensis | Northern American river otter | XM_032851458.1 | XP_032707349.1 |
| 116864160 | FST | follistatin | Lontra canadensis | Northern American river otter | XM_032851459.1 | XP_032707350.1 |
| 116864160 | FST | follistatin | Lontra canadensis | Northern American river otter | XM_032851460.1 | XP_032707351.1 |
| 116864160 | FST | follistatin | Lontra canadensis | Northern American river otter | XM_032851461.1 | XP_032707352.1 |
| 116895646 | Fst | follistatin | Rattus rattus | black rat | XM_032896850.1 | XP_032752741.1 |
| 116895646 | Fst | follistatin | Rattus rattus | black rat | XM_032896851.1 | XP_032752742.1 |
| 116941961 | FST | follistatin | Petromyzon marinus | sea lamprey | XM_032953394.1 | XP_032809285.1 |
| 116941961 | FST | follistatin | Petromyzon marinus | sea lamprey | XM_032953395.1 | XP_032809286.1 |
| 117011063 | FST | follistatin | Catharus ustulatus | Swainson's thrush | XM_033086297.1 | XP_032942188.1 |
| 117025363 | FST | follistatin | Rhinolophus ferrumequinum | greater horseshoe bat | XM_033111270.1 | XP_032967161.1 |
| 117025363 | FST | follistatin | Rhinolophus ferrumequinum | greater horseshoe bat | XM_033111271.1 | XP_032967162.1 |
| 117025363 | FST | follistatin | Rhinolophus ferrumequinum | greater horseshoe bat | XM_033111272.1 | XP_032967163.1 |
| 117054873 | FST | follistatin | Lacerta agilis | | XM_033164078.1 | XP_033019969.1 |
| 117054873 | FST | follistatin | Lacerta agilis | | XM_033164080.1 | XP_033019971.1 |
| 117065108 | FST | follistatin | Trachypithecus francoisi | Francois's langur | XM_033179549.1 | XP_033035440.1 |
| 117065108 | FST | follistatin | Trachypithecus francoisi | Francois's langur | XM_033179550.1 | XP_033035441.1 |
| 117065108 | FST | follistatin | Trachypithecus francoisi | Francois's langur | XM_033179551.1 | XP_033035442.1 |
| 117065108 | FST | follistatin | Trachypithecus francoisi | Francois's langur | XM_033179552.1 | XP_033035443.1 |
| 117679180 | FST | follistatin | Pantherophis guttatus | | XM_034440859.1 | XP_034296750.1 |
| 117679180 | FST | follistatin | Pantherophis guttatus | | XM_034440860.1 | XP_034296751.1 |
| 117679180 | FST | follistatin | Pantherophis guttatus | | XM_034440861.1 | XP_034296752.1 |
| 117679180 | FST | follistatin | Pantherophis guttatus | | XM_034440862.1 | XP_034296753.1 |
| 117724011 | Fst | follistatin | Arvicanthis niloticus | African grass rat | XM_034523632.1 | XP_034379523.1 |
| 117724011 | Fst | follistatin | Arvicanthis niloticus | African grass rat | XM_034523633.1 | XP_034379524.1 |
| 117724011 | Fst | follistatin | Arvicanthis niloticus | African grass rat | XM_034523634.1 | XP_034379525.1 |
| 117879432 | FST | follistatin | Trachemys scripta elegans | | XM_034774622.1 | XP_034630513.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 117879432 | FST | follistatin | *Trachemys scripta elegans* | | XM_034774623.1 | XP_034630514.1 |
| 118077143 | FST | follistatin | *Zootoca vivipara* | common lizard | XM_035100573.1 | XP_034956464.1 |
| 118077143 | FST | follistatin | *Zootoca vivipara* | common lizard | XM_035100574.1 | XP_034956465.1 |
| 118156338 | FST | follistatin | *Oxyura jamaicensis* | ruddy duck | XM_035310322.1 | XP_035166213.1 |
| 118156338 | FST | follistatin | *Oxyura jamaicensis* | ruddy duck | XM_035310323.1 | XP_035166214.1 |
| 118251466 | FST | follistatin | *Cygnus atratus* | black swan | XM_035553585.1 | XP_035409478.1 |
| 118251466 | FST | follistatin | *Cygnus atratus* | black swan | XM_035553586.1 | XP_035409479.1 |
| 118251466 | FST | follistatin | *Cygnus atratus* | black swan | XM_035553587.1 | XP_035409480.1 |
| 118549858 | FST | follistatin | *Halichoerus grypus* | gray seal | XM_036114464.1 | XP_035970357.1 |
| 118549858 | FST | follistatin | *Halichoerus grypus* | gray seal | XM_036114466.1 | XP_035970359.1 |
| 118549858 | FST | follistatin | *Halichoerus grypus* | gray seal | XM_036114467.1 | XP_035970360.1 |
| 118596331 | Fst | follistatin | *Onychomys torridus* | southern grasshopper mouse | XM_036207163.1 | XP_036063056.1 |
| 118596331 | Fst | follistatin | *Onychomys torridus* | southern grasshopper mouse | XM_036207164.1 | XP_036063057.1 |
| 118596331 | Fst | follistatin | *Onychomys torridus* | southern grasshopper mouse | XM_036207165.1 | XP_036063058.1 |
| 118641955 | FST | follistatin | *Molossus molossus* | Pallas's mastiff bat | XM_036279626.1 | XP_036135519.1 |
| 118641955 | FST | follistatin | *Molossus molossus* | Pallas's mastiff bat | XM_036279627.1 | XP_036135520.1 |
| 118656266 | FST | follistatin | *Myotis myotis* | | XM_036309355.1 | XP_036165248.1 |
| 118656266 | FST | follistatin | *Myotis myotis* | | XM_036309356.1 | XP_036165249.1 |
| 118656266 | FST | follistatin | *Myotis myotis* | | XM_036309357.1 | XP_036165250.1 |
| 118699285 | FST | follistatin | *Molothrus ater* | | XM_036403194.1 | XP_036259087.1 |
| 118703454 | FST | follistatin | *Pipistrellus kuhlii* | Kuhl's pipistrelle | XM_036410405.1 | XP_036266298.1 |
| 118703454 | FST | follistatin | *Pipistrellus kuhlii* | Kuhl's pipistrelle | XM_036410406.1 | XP_036266299.1 |
| 118703454 | FST | follistatin | *Pipistrellus kuhlii* | Kuhl's pipistrelle | XM_036410407.1 | XP_036266300.1 |
| 118703454 | FST | follistatin | *Pipistrellus kuhlii* | Kuhl's pipistrelle | XM_036410408.1 | XP_036266301.1 |
| 118831753 | FST | follistatin | *Trichosurus vulpecula* | common brushtail | XM_036739193.1 | XP_036595088.1 |
| 118893332 | FST | follistatin | *Balaenoptera musculus* | Blue whale | XM_036848751.1 | XP_036704646.1 |
| 118893332 | FST | follistatin | *Balaenoptera musculus* | Blue whale | XM_036848752.1 | XP_036704647.1 |
| 118893332 | FST | follistatin | *Balaenoptera musculus* | Blue whale | XM_036848753.1 | XP_036704648.1 |
| 118919939 | FST | follistatin | *Manis pentadactyla* | Chinese pangolin | XM_036900378.1 | XP_036756273.1 |
| 118919939 | FST | follistatin | *Manis pentadactyla* | Chinese pangolin | XM_036900379.1 | XP_036756274.1 |
| 118919939 | FST | follistatin | *Manis pentadactyla* | Chinese pangolin | XM_036900380.1 | XP_036756275.1 |
| 118919939 | FST | follistatin | *Manis pentadactyla* | Chinese pangolin | XM_036900381.1 | XP_036756276.1 |
| 118981683 | FST | follistatin | *Sturnira hondurensis* | | XM_037038502.1 | XP_036894397.1 |
| 118981683 | FST | follistatin | *Sturnira hondurensis* | | XM_037038503.1 | XP_036894398.1 |
| 118981683 | FST | follistatin | *Sturnira hondurensis* | | XM_037038505.1 | XP_036894400.1 |
| 119049167 | FST | follistatin | *Artibeus jamaicensis* | Jamaican fruit-eating bat | XM_037145117.1 | XP_037001012.1 |
| 119049167 | FST | follistatin | *Artibeus jamaicensis* | Jamaican fruit-eating bat | XM_037145118.1 | XP_037001013.1 |
| 119049167 | FST | follistatin | *Artibeus jamaicensis* | Jamaican fruit-eating bat | XM_037145119.1 | XP_037001014.1 |
| 119141609 | FST | follistatin | *Falco rusticolus* | gyrfalcon | XM_037374080.1 | XP_037229977.1 |
| 119141609 | FST | follistatin | *Falco rusticolus* | gyrfalcon | XM_037374082.1 | XP_037229979.1 |
| 119260869 | FST | follistatin | *Talpa occidentalis* | Iberian mole | XM_037529971.1 | XP_037385868.1 |
| 119260869 | FST | follistatin | *Talpa occidentalis* | Iberian mole | XM_037529972.1 | XP_037385869.1 |
| 119260869 | FST | follistatin | *Talpa occidentalis* | Iberian mole | XM_037529973.1 | XP_037385870.1 |
| 119506146 | FST | follistatin | *Choloepus didactylus* | southern two-toed sloth | XM_037799081.1 | XP_037655009.1 |
| 119506146 | FST | follistatin | *Choloepus didactylus* | southern two-toed sloth | XM_037799082.1 | XP_037655010.1 |
| 119855921 | FST | follistatin | *Dermochelys coriacea* | leatherback sea turtle | XM_038402867.1 | XP_038258795.1 |
| 119944615 | FST | follistatin | *Tachyglossus aculeatus* | Australian echidna | XM_038765640.1 | XP_038621568.1 |
| 119944615 | FST | follistatin | *Tachyglossus aculeatus* | Australian echidna | XM_038765641.1 | XP_038621569.1 |
| 119944615 | FST | follistatin | *Tachyglossus aculeatus* | Australian echidna | XM_038765642.1 | XP_038621570.1 |
| 120248050 | FST | follistatin | *Hyaena hyaena* | striped hyena | XM_039256213.1 | XP_039112144.1 |
| 120248050 | FST | follistatin | *Hyaena hyaena* | striped hyena | XM_039256214.1 | XP_039112145.1 |
| 120248050 | FST | follistatin | *Hyaena hyaena* | striped hyena | XM_039256215.1 | XP_039112146.1 |
| 120313711 | FST | follistatin | *Crotalus tigris* | Tiger rattlesnake | XM_039355886.1 | XP_039211820.1 |
| 120313711 | FST | follistatin | *Crotalus tigris* | Tiger rattlesnake | XM_039355894.1 | XP_039211828.1 |
| 120313711 | FST | follistatin | *Crotalus tigris* | Tiger rattlesnake | XM_039355902.1 | XP_039211836.1 |

TABLE 28-continued

Exemplary follistatin genes and/or gene products.

| Gene ID | Gene symbol | Description | Scientific name | Common name | RefSeq Transcript accessions | RefSeq Protein accessions |
|---|---|---|---|---|---|---|
| 120313711 | FST | follistatin | Crotalus tigris | Tiger rattlesnake | XM_039355911.1 | XP_039211845.1 |
| 120313711 | FST | follistatin | Crotalus tigris | Tiger rattlesnake | XM_039355921.1 | XP_039211855.1 |
| 120313711 | FST | follistatin | Crotalus tigris | Tiger rattlesnake | XM_039355930.1 | XP_039211864.1 |
| 120407548 | FST | follistatin | Mauremys reevesii | Reeves's turtle | XM_039543219.1 | XP_039399153.1 |
| 120407548 | FST | follistatin | Mauremys reevesii | Reeves's turtle | XM_039543220.1 | XP_039399154.1 |
| 120407548 | FST | follistatin | Mauremys reevesii | Reeves's turtle | XM_039543221.1 | XP_039399155.1 |
| 120502493 | FST | follistatin | Passer montanus | Eurasian tree sparrow | XM_039709974.1 | XP_039565908.1 |
| 120608169 | FST | follistatin | Pteropus giganteus | Indian flying fox | XM_039869925.1 | XP_039725859.1 |
| 120608169 | FST | follistatin | Pteropus giganteus | Indian flying fox | XM_039869926.1 | XP_039725860.1 |
| 120608169 | FST | follistatin | Pteropus giganteus | Indian flying fox | XM_039869927.1 | XP_039725861.1 |
| 120765889 | FST | follistatin | Hirundo rustica | Barn swallow | XM_040091106.1 | XP_039947040.1 |
| 120879300 | FST | follistatin | Oryx dammah | scimitar-horned oryx | XM_040262265.1 | XP_040118199.1 |
| 120879300 | FST | follistatin | Oryx dammah | scimitar-horned oryx | XM_040262267.1 | XP_040118201.1 |
| 120879300 | FST | follistatin | Oryx dammah | scimitar-horned oryx | XM_040262268.1 | XP_040118202.1 |
| 120879300 | FST | follistatin | Oryx dammah | scimitar-horned oryx | XM_040262269.1 | XP_040118203.1 |
| 120928226 | FST | follistatin | Rana temporaria | common frog | XM_040339335.1 | XP_040195269.1 |
| 120928226 | FST | follistatin | Rana temporaria | common frog | XM_040339340.1 | XP_040195274.1 |
| 120992320 | FST | follistatin | Bufo bufo | common toad | XM_040421232.1 | XP_040277166.1 |
| 121081364 | FST | follistatin | Falco naumanni | lesser kestrel | XM_040580343.1 | XP_040436277.1 |
| 121081364 | FST | follistatin | Falco naumanni | lesser kestrel | XM_040580344.1 | XP_040436278.1 |
| 121154655 | FST | follistatin | Ochotona curzoniae | black-lipped pika | XM_040977684.1 | XP_040833618.1 |
| 121154655 | FST | follistatin | Ochotona curzoniae | black-lipped pika | XM_040977685.1 | XP_040833619.1 |
| 121154655 | FST | follistatin | Ochotona curzoniae | black-lipped pika | XM_040977686.1 | XP_040833620.1 |
| 121355465 | FST | follistatin | Pyrgilauda ruficollis | rufous-necked snowfinch | XM_041470917.1 | XP_041326851.1 |
| 121455996 | Fst | follistatin | Microtus oregoni | creeping vole | XM_041663795.1 | XP_041519729.1 |
| 121455996 | Fst | follistatin | Microtus oregoni | creeping vole | XM_041663796.1 | XP_041519730.1 |
| 121455996 | Fst | follistatin | Microtus oregoni | creeping vole | XM_041663797.1 | XP_041519731.1 |
| 121664801 | FST | follistatin | Corvus kubaryi | Mariana crow | XM_042028368.1 | XP_041884302.1 |

In some embodiments, the optionally wherein (a) a portion of or the entirety of the melanocortin-4 receptor gene is replaced with an exogenous gene; (b) a portion of or the entirety of the myostatin gene is replaced with an exogenous; or (c) both (a) and (b). In some embodiments, where a portion of the melanocortin-4 receptor gene is replaced with an exogenous gene a sufficient or appropriate portion of the melanocortin-4 receptor gene is replaced such that expression of a melanocortin-4 receptor gene is decreased or eliminated. In some embodiments, where a portion of the myostatin gene is replaced with an exogenous gene a sufficient or appropriate portion of the myostatin gene is replaced such that expression of a myostatin gene is decreased or eliminated.

Exogenous Gene Constructs

The exogenous gene can be introduced into the engineered fish by random integration or site-directed integration using any appropriate gene integration/recombinant engineering technique known in the art. In some embodiments, the gene construct is knocked in using a CRISPR-Cas mediated knock in technique. In some embodiments, the exogenous gene is introduced into the genome such that it is operably coupled to one or more endogenous regulatory elements (e.g., promoters and/or the like). For example, where the exogenous gene is inserted into an endogenous gene (e.g., myostatin and/or mc4-r) the exogenous gene is operably coupled to the promoter and/or other regulatory elements of the endogenous gene (e.g., myostatin and/or mc4-r). In some embodiments, the exogenous gene constructs can include a nucleic acid encoding an exogenous gene product operably coupled to one or more regulatory elements (e.g., promoters, enhancers, repressors, and/or the like). In some embodiments, the exogenous gene construct is contained in a vector or vector system. In some embodiments, the regulatory element is a ubiquitous promoter (e.g., a beta-actin promoter, elongation factor alpha promoter, CAG promoter, CMV promoter, SV40 promoter, and others). In some embodiments, the regulator element is an inducible promoter. Exemplary polynucleotide constructs, vector and vector systems, regulator elements, gene delivery and gene integration methods and techniques are described in greater detail elsewhere herein. One of ordinary skill in the art, in view of the description herein will appreciate how to configure and utilize such compositions and techniques to introduce one or more exogenous genes described herein into the engineered fish.

Additional exemplary methods of modifying fish, particularly catfish, are described in e.g., Dunham et al., Mol Mar Biol Biotechnol. 1992 August-October; 1(4-5):380-9; Su et al., Transgenic Res. 2015 April; 24(2):333-52; Su et al., Theriogenology. 2015 December; 84(9):1499-512; Quin et al., Mar Biotechnol (NY). 2016 April; 18(2):255-63; Li et al., Mol Genet Genomics. 2017 June; 292(3):663-670; Li et al., Mar Drugs. 2017 May 31; 15(6):155; Khalil et al., Sci Rep. 2017 Aug. 4; 7(1):7301; Elaswad et al., J Vis Exp. 2018 Jan. 20; (131):56275; Li et al., Mar Biotechnol (NY). 2018 June; 20(3):324-342; Dunham et al., Methods Mol Biol. 2018; 1867:201-214; Elaswad et al., Sci Rep. 2018 Nov. 7;

8(1):16499; Powers et al., Mol Mar Biol Biotechnol. 1992 August-October; 1(4-5):301-8; Dunham et al., Mar Biotechnol (NY). 2002 June; 4(3):338-44; Zhang et al., Mol Reprod Dev. 1990 January; 25(1):3-13; Powers et al., Biotechnology. 1991; 16:307-24; Powers et al., Science. 1991 Nov. 8; 254(5033):779; Chen et al., Biotechnol Annu Rev. 1996; 2:205-36; Abass et al., Sci Rep. 2022 Jan. 14; 12(1):740; Abass et al., Mar Biotechnol (NY). 2021 December; 23(6): 870-880; Huang et al., Transgenic Res. 2021 April; 30(2): 185-200; and Simora et al., Sci Rep. 2020 Dec. 17; 10(1): 22271.

Compositions and Methods of Making Engineered Fish

Engineered fish and fish cell(s) can be engineered using any suitable genetic modification technique or system. Exemplary systems, techniques and strategies are described below and elsewhere herein. Other suitable systems and approaches will be appreciated by one of ordinary skill in the art in view of the description herein and are within the scope of the present description. Engineered fish cells and/or fish (i.e., engineered fish containing a modified myostatin gene, modified mc4-r gene, and/or one or more exogenous genes of the present disclosure) can be generated using appropriate techniques used to make genetically modified organisms, such as fish, particularly catfish. See also e.g., Dunham et al., Mol Mar Biol Biotechnol. 1992 August-October; 1(4-5): 380-9; Su et al., Transgenic Res. 2015 April; 24(2):333-52; Su et al., Theriogenology. 2015 December; 84(9):1499-512; Quin et al., Mar Biotechnol (NY). 2016 April; 18(2):255-63; Li et al., Mol Genet Genomics. 2017 June; 292(3):663-670; Li et al., Mar Drugs. 2017 May 31; 15(6):155; Khalil et al., Sci Rep. 2017 Aug. 4; 7(1):7301; Elaswad et al., J Vis Exp. 2018 Jan. 20; (131):56275; Li et al., Mar Biotechnol (NY). 2018 June; 20(3):324-342; Dunham et al., Methods Mol Biol. 2018; 1867:201-214; Elaswad et al., Sci Rep. 2018 Nov. 7; 8(1): 16499; Powers et al., Mol Mar Biol Biotechnol. 1992 August-October; 1(4-5):301-8; Dunham et al., Mar Biotechnol (NY). 2002 June; 4(3):338-44; Zhang et al., Mol Reprod Dev. 1990 January; 25(1):3-13; Powers et al., Biotechnology. 1991; 16:307-24; Powers et al., Science. 1991 Nov. 8; 254(5033):779; Chen et al., Biotechnol Annu Rev. 1996; 2:205-36; Abass et al., Sci Rep. 2022 Jan. 14; 12(1):740; Abass et al., Mar Biotechnol (NY). 2021 December; 23(6):870-880; Huang et al., Transgenic Res. 2021 April; 30(2):185-200; and Simora et al., Sci Rep. 2020 Dec. 17; 10(1):22271, which can be adapted for use with the present disclosure.

In some embodiments, the method of generating an engineered fish of the present disclosure includes delivering a genetic modifying system and/or other optional exogenous cargo polynucleotide and/or polypeptide and/or components thereof to a cell or cells to be modified. Delivery can occur in vivo, in vitro, ex vivo, or in situ. Exemplary delivery compositions, systems, and techniques are further described below and elsewhere herein.

In some embodiments, a genetic modifying system can be used to introduce an exogenous or heterologous gene (such as a gene native to another species or organism or a native gene copy or variant that is in addition to a native copy or variant). In some embodiments, a genetic modifying system is used to introduce an exogenous an engineered gene construct to a cell. In some embodiments introduce an exogenous an engineered gene construct to a fish cell or embryo. In some embodiments, the genetic modification system can be used to perform gene editing. In some embodiments, the genetic modification system can be used to perform gene knock in and/or knock out. In some embodiments, the genetic modification system can be used to perform simultaneous gene knock in and knock out. In some embodiments, the genetic modification system can modify DNA (such as genomic DNA), or RNA (e.g., gene transcripts).

Exemplary Genetic Modification Systems

In certain embodiments, the genetic modification system includes a programmable nuclease system (e.g., a CRISPR (or CRISPR-Cas) system, a zinc finger nuclease (ZFN) system, a TALEN, a meganuclease), an RNAi system, transposon system, or a combination thereof. Various genetic modification systems have been used to modify fish cells and/or generate modified fish (including catfish), including CRISPR-Cas systems, ZFNs, TALENs, and others. See e.g., Dunham et al., Mol Mar Biol Biotechnol. 1992 August-October; 1(4-5):380-9; Su et al., Transgenic Res. 2015 April; 24(2):333-52; Su et al., Theriogenology. 2015 December; 84(9):1499-512; Quin et al., Mar Biotechnol (NY). 2016 April; 18(2):255-63; Li et al., Mol Genet Genomics. 2017 June; 292(3):663-670; Li et al., Mar Drugs. 2017 May 31; 15(6):155; Khalil et al., Sci Rep. 2017 Aug. 4; 7(1):7301; Elaswad et al., J Vis Exp. 2018 Jan. 20; (131):56275; Li et al., Mar Biotechnol (NY). 2018 June; 20(3):324-342; Dunham et al., Methods Mol Biol. 2018; 1867:201-214; Elaswad et al., Sci Rep. 2018 Nov. 7; 8(1): 16499; Powers et al., Mol Mar Biol Biotechnol. 1992 August-October; 1(4-5):301-8; Dunham et al., Mar Biotechnol (NY). 2002 June; 4(3):338-44; Zhang et al., Mol Reprod Dev. 1990 January; 25(1):3-13; Powers et al., Biotechnology. 1991; 16:307-24; Powers et al., Science. 1991 Nov. 8; 254(5033):779; Chen et al., Biotechnol Annu Rev. 1996; 2:205-36; Abass et al., Sci Rep. 2022 Jan. 14; 12(1):740; Abass et al., Mar Biotechnol (NY). 2021 December; 23(6): 870-880; Huang et al., Transgenic Res. 2021 April; 30(2): 185-200; and Simora et al., Sci Rep. 2020 Dec. 17; 10(1): 22271, which are all incorporated by reference herein as if expressed in their entireties and can be adapted for use with the present disclosure. These and other suitable genetic modifying systems for fish, particuraly catfish, genetic modification are described in greater below and in e.g., the Working Examples herein.

CRISPR-Cas Systems

In some embodiments, the myostatin and/or mc-4r gene(s) is/are modified using a CRISPR-Cas system. An exemplary use of a CRISPR-Cas system to generate myostatin and/or mc-4r gene(s) deficient cell and organisms is shown in the Working Examples herein. In some embodiments, a CRISPR-Cas system can be used to knock in one or more exogenous genes (see e.g., Koch et al., 2018. Nat. Prot. 13:1465-1487, Ranawakage et al., 2021. Front. Cell. Dev. Biol. https://doi.org/10.3389/fcell.2020.598634; Fang et al., 2021, Neuroscience. eLife: 10e65202; Schumann et al. 112(33):10437-10442; Kimura et al., 2014. Sci Rep. 6545; Gratacap et al., BMC Biotech. 2020. Art. No. 35.; and de Vrieze et al., Int. J. Mol. Sci. 2021. 22:9429, which are incorporated by reference herein and can be adapted for use with present description).

In general, a CRISPR-Cas or CRISPR system as used in herein and in documents, such as WO 2014/093622, refers collectively to transcripts and other elements involved in the expression of or directing the activity of CRISPR-associated ("Cas") genes, including sequences encoding a Cas gene, a tracr (trans-activating CRISPR) sequence (e.g. tracrRNA or an active partial tracrRNA), a tracr-mate sequence (encompassing a "direct repeat" and a tracrRNA-processed partial direct repeat in the context of an endogenous CRISPR system), a guide sequence (also referred to as a "spacer" in the context of an endogenous CRISPR system), or "guide RNA(s)" as that term is herein used (e.g., RNA(s) to guide Cas, such as Cas9, e.g. CRISPR RNA and transactivating (tracr) RNA or a single guide RNA (sgRNA) (chimeric RNA)) or other sequences and transcripts from a CRISPR locus. In general, a CRISPR system is characterized by elements that promote the formation of a CRISPR complex at the site of a target sequence (also referred to as a protospacer in the context of an endogenous CRISPR system). See, e.g., Shmakov et al. (2015) "Discovery and Functional Characterization of Diverse Class 2 CRISPR-Cas Systems", Molecular Cell, DOI: dx.doi.org/10.1016/j.molcel.2015.10.008. CRISPR-Cas systems can be used to edit one or more nucleotides, remove one or more nucleotides, and/or delete one or more nucleotides.

Any suitable CRISPR-Cas system can be used in the context of the present disclosure to modify a myostatin, mc4-rpolynucleotide in a fish cell and/or introduce an exogenous gene as described elsewhere herein. In some embodiments, the CRISPR-Cas system is a Class 1 system. In some embodiments, the CRISPR-Cas system is a Class 2 system.

Class 1 Systems

In some embodiments, the CRISPR-Cas system is a Class 1 CRISPR-Cas system. In certain example embodiments, the Class 1 system may be Type I, Type III or Type IV Cas proteins as described in Makarova et al. "Evolutionary classification of CRISPR-Cas systems: a burst of class 2 and derived variants" Nature Reviews Microbiology, 18:67-81 (February 2020)., incorporated in its entirety herein by reference, and particularly as described in FIG. 1, p. 326; Koonin E V, Makarova K S. 2019 Origins and evolution of CRISPR-Cas systems. Phil. Trans. R. Soc. B 374: 20180087, DOI: 10.1098/rstb.2018.0087, particularly at FIGS. 1 and 2. In some embodiments, the Class 1 CRISPR-Cas system is a subtype Type I-A, I-B, I-C, I-U, I-D, I-E, and I-F, Type IV-A and IV-B, and Type III-A, III-D, III-C, and III-B system. In some embodiments, the Class 1 CRISPR-Cas system is a variant system, such as a Type I-A, I-B, I-E, I-F and I-U variants, which can include variants carried by transposons and plasmids, including versions of subtype I-F encoded by a large family of Tn7-like transposon and smaller groups of Tn7-like transposons that encode similarly degraded subtype I-B systems. Peters et al., PNAS 114 (35) (2017); DOI: 10.1073/pnas.1709035114; see also, Makarova et al, the CRISPR Journal, v. 1, n5, FIG. 5.

Class 2 Systems

In some embodiments, the CRISPR-Cas system is a Class 2 CRISPR-Cas system. Class 2 systems are distinguished from Class 1 systems in that they have a single, large, multi-domain effector protein. In certain example embodiments, the Class 2 system is a Type II, Type V, or Type VI system, which are described in Makarova et al. "Evolutionary classification of CRISPR-Cas systems: a burst of class 2 and derived variants" Nature Reviews Microbiology, 18:67-81 (February 2020), incorporated herein by reference. In some embodiments, the CRISPR-Cas system is a Type II subtype, such as II-A, II-B, II-C1, or II-C2 system. In some embodiments, the Type II CRISPR-Cas system is a Cas9 system. In some embodiments, the CRISPR-Cas system is a Type V subtype, such as V-A, V-B1, V-B2, V-C, V-D, V-E, V-F1, V-F1(V-U3), V-F2, V-F3, V-G, V-H, V-I, V-K (V-U5), V-U1, V-U2, or V-U4 system. In some embodiments, the Type V CRISPR-Cas system includes a Cas12a (Cpf1), Cas12b (C2c1), Cas12c (C2c3), Cas12d (CasY), Cas12e (CasX), Cas14, and/or CasΦ. In some embodiments, the CRISPR-Cas system is a Type VI subtype, such as a VI-A, VI-B1, VI-B2, VI-C, or VI-D system. In some embodiments, the Type VI CRISPR-Cas system includes a Cas13a (C2c2), Cas13b (Group 29/30), Cas13c, and/or Cas13d.

Guide RNAs

The CRISPR-Cas system described herein includes one or more guide RNAs (also referred interchangeably herein as "guide molecules" "guide polynucleotides" and "guide sequences"). The terms guide molecule, guide sequence and guide polynucleotide refer to polynucleotides capable of guiding Cas to a target genomic locus and are used interchangeably as in foregoing cited documents such as International Patent Publication No. WO 2014/093622. In general, a guide sequence is any polynucleotide sequence having sufficient complementarity with a target polynucleotide sequence to hybridize with the target sequence and direct sequence-specific binding of a CRISPR complex to the target sequence. The guide molecule can be a polynucleotide. The ability of a guide sequence (within a nucleic acid-targeting guide RNA) to direct sequence-specific binding of a nucleic acid-targeting complex to a target nucleic acid sequence may be assessed by any suitable assay. For example, the components of a nucleic acid-targeting CRISPR system sufficient to form a nucleic acid-targeting complex, including the guide sequence to be tested, may be provided to a host cell having the corresponding target nucleic acid sequence, such as by transfection with vectors encoding the components of the nucleic acid-targeting complex, followed by an assessment of preferential targeting (e.g., cleavage) within the target nucleic acid sequence, such as by Surveyor assay (Qui et al. 2004. BioTechniques. 36(4)702-707). Similarly, cleavage of a target nucleic acid sequence may be evaluated in a test tube by providing the target nucleic acid sequence, components of a nucleic acid-targeting complex, including the guide sequence to be tested and a control guide sequence different from the test guide sequence, and comparing binding or rate of cleavage at the target sequence between the test and control guide sequence reactions. Other assays are possible and will occur to those skilled in the art.

The guide molecules can be any polynucleotide sequence having sufficient complementarity with a target nucleic acid sequence to hybridize with the target nucleic acid sequence and direct sequence-specific binding of a nucleic acid-targeting complex to the target nucleic acid sequence. In some embodiments, the degree of complementarity, when optimally aligned using a suitable alignment algorithm, can be about or more than about 50%, 60%, 75%, 80%, 85%, 90%, 95%, 97.5%, 99%, or more. Optimal alignment may be determined with the use of any suitable algorithm for aligning sequences, non-limiting examples of which include the Smith-Waterman algorithm, the Needleman-Wunsch algorithm, algorithms based on the Burrows-Wheeler Transform (e.g., the Burrows Wheeler Aligner), ClustalW, Clustal X, BLAT, Novoalign (Novocraft Technologies; available at www.novocraft.com), ELAND (Illumina, San Diego, CA), SOAP (available at soap.genomics.org.cn), and Maq (available at maq.sourceforge.net).

A guide sequence, and hence a nucleic acid-targeting guide, may be selected to target any target nucleic acid sequence. Target sequences are further discussed below.

In some embodiments, a nucleic acid-targeting guide is selected to reduce the degree secondary structure within the nucleic acid-targeting guide. In some embodiments, about or less than about 75%, 50%, 40%, 30%, 25%, 20%, 15%, 10%, 5%, 1%, or fewer of the nucleotides of the nucleic acid-targeting guide participate in self-complementary base pairing when optimally folded. Optimal folding may be determined by any suitable polynucleotide folding algorithm. Some programs are based on calculating the minimal Gibbs free energy. An example of one such algorithm is mFold, as described by Zuker and Stiegler (Nucleic Acids Res. 9 (1981), 133-148). Another example folding algorithm is the online webserver RNAfold, developed at Institute for Theoretical Chemistry at the University of Vienna, using the centroid structure prediction algorithm (see e.g., A. R. Gruber et al., 2008, Cell 106(1): 23-24; and PA Carr and GM Church, 2009, Nature Biotechnology 27(12): 1151-62).

In certain embodiments, a guide RNA or crRNA may comprise, consist essentially of, or consist of a direct repeat (DR) sequence and a guide sequence or spacer sequence. In certain embodiments, the guide RNA or crRNA may comprise, consist essentially of, or consist of a direct repeat sequence fused or linked to a guide sequence or spacer sequence. In certain embodiments, the direct repeat sequence may be located upstream (i.e., 5') from the guide sequence or spacer sequence. In other embodiments, the direct repeat sequence may be located downstream (i.e., 3') from the guide sequence or spacer sequence.

In certain embodiments, the crRNA comprises a stem loop, preferably a single stem loop. In certain embodiments, the direct repeat sequence forms a stem loop, preferably a single stem loop.

In certain embodiments, the spacer length of the guide RNA is from 15 to 35 nt. In certain embodiments, the spacer length of the guide RNA is at least 15 nucleotides. In certain embodiments, the spacer length is from 15 to 17 nt, e.g., 15, 16, or 17 nt, from 17 to 20 nt, e.g., 17, 18, 19, or 20 nt, from 20 to 24 nt, e.g., 20, 21, 22, 23, or 24 nt, from 23 to 25 nt, e.g., 23, 24, or 25 nt, from 24 to 27 nt, e.g., 24, 25, 26, or 27 nt, from 27 to 30 nt, e.g., 27, 28, 29, or 30 nt, from 30 to 35 nt, e.g., 30, 31, 32, 33, 34, or 35 nt, or 35 nt or longer.

The "tracrRNA" sequence or analogous terms includes any polynucleotide sequence that has sufficient complementarity with a crRNA sequence to hybridize. In some embodiments, the degree of complementarity between the tracrRNA sequence and crRNA sequence along the length of the shorter of the two when optimally aligned is about or more than about 25%, 30%, 40%, 50%, 60%, 70%, 80%, 90%, 95%, 97.5%, 99%, or higher. In some embodiments, the tracr sequence is about or more than about 5, 6, 7, 8, 9, 10, 11, 12, 13, 14, 15, 16, 17, 18, 19, 20, 25, 30, 40, 50, or more nucleotides in length. In some embodiments, the tracr sequence and crRNA sequence are contained within a single transcript, such that hybridization between the two produces a transcript having a secondary structure, such as a hairpin.

In general, degree of complementarity is with reference to the optimal alignment of the sca sequence and tracr sequence, along the length of the shorter of the two sequences. Optimal alignment may be determined by any suitable alignment algorithm and may further account for secondary structures, such as self-complementarity within either the sca sequence or tracr sequence. In some embodiments, the degree of complementarity between the tracr sequence and sca sequence along the length of the shorter of the two when optimally aligned is about or more than about 25%, 30%, 40%, 50%, 60%, 70%, 80%, 90%, 95%, 97.5%, 99%, or higher.

In some embodiments, the degree of complementarity between a guide sequence and its corresponding target sequence can be about or more than about 50%, 60%, 75%, 80%, 85%, 90%, 95%, 97.5%, 99%, or 100%; a guide or RNA or sgRNA can be about or more than about 5, 10, 11, 12, 13, 14, 15, 16, 17, 18, 19, 20, 21, 22, 23, 24, 25, 26, 27, 28, 29, 30, 35, 40, 45, 50, 75, or more nucleotides in length; or guide or RNA or sgRNA can be less than about 75, 50, 45, 40, 35, 30, 25, 20, 15, 12, or fewer nucleotides in length; and tracr RNA can be 30 or 50 nucleotides in length. In some embodiments, the degree of complementarity between a guide sequence and its corresponding target sequence is greater than 94.5% or 95% or 95.5% or 96% or 96.5% or 97% or 97.5% or 98% or 98.5% or 99% or 99.5% or 99.9%, or 100%. Off target is less than 100% or 99.9% or 99.5% or 99% or 99% or 98.5% or 98% or 97.5% or 97% or 96.5% or 96% or 95.5% or 95% or 94.5% or 94% or 93% or 92% or 91% or 90% or 89% or 88% or 87% or 86% or 85% or 84% or 83% or 82% or 81% or 80% complementarity between the sequence and the guide, with it being advantageous that off target is 100% or 99.9% or 99.5% or 99% or 99% or 98.5% or 98% or 97.5% or 97% or 96.5% or 96% or 95.5% or 95% or 94.5% complementarity between the sequence and the guide.

In some embodiments, the guide RNA (capable of guiding Cas to a target locus) can include (1) a guide sequence capable of hybridizing to a genomic target locus in the eukaryotic cell; (2) a tracr sequence; and (3) a tracr mate sequence. All (1) to (3) may reside in a single RNA, i.e., an sgRNA (arranged in a 5' to 3' orientation), or the tracr RNA may be a different RNA than the RNA containing the guide and tracr sequence. The tracr hybridizes to the tracr mate sequence and directs the CRISPR/Cas complex to the target sequence. Where the tracr RNA is on a different RNA than the RNA containing the guide and tracr sequence, the length of each RNA may be optimized to be shortened from their respective native lengths, and each may be independently chemically modified to protect from degradation by cellular RNase or otherwise increase stability.

Many modifications to guide sequences are known in the art and within the spirit and scope of this disclosure. Various modifications may be used to increase the specificity of binding to the target sequence and/or increase the activity of the Cas protein and/or reduce off-target effects. Example guide sequence modifications are described in International Patent Application WO2020033601, specifically paragraphs [0178]-[0333]. which is incorporated herein by reference.

Target Sequences, PAMs, and PFSs

In the context of formation of a CRISPR complex, "target sequence" refers to a sequence to which a guide sequence is designed to have complementarity, where hybridization between a target sequence and a guide sequence promotes the formation of a CRISPR complex. A target sequence may comprise RNA polynucleotides. The term "target RNA" refers to an RNA polynucleotide being or including the target sequence. Likewise, a "target polynucleotide" as used in this context herein refers to a polynucleotide sequence being or including the target sequence for a guide polynucleotide. In other words, the target polynucleotide can be a polynucleotide or a part of a polynucleotide to which a part of the guide sequence is designed to have complementarity with and to which the effector function mediated by the complex comprising the CRISPR effector protein and a guide molecule is to be directed. In some embodiments, a target sequence is located in the nucleus or cytoplasm of a cell.

The guide sequence can specifically bind a target sequence in a target polynucleotide. The target polynucleotide can be DNA. The target polynucleotide can be RNA. The target polynucleotide can have one or more (e.g., 1, 2, 3, 4, 5, 6, 7, 8, 9, 10, etc. or more) target sequences. The target polynucleotide can be on a vector. The target polynucleotide can be genomic DNA. The target polynucleotide can be episomal. Other forms of the target polynucleotide are described elsewhere herein.

In some embodiments, the target sequence may be a sequence within an RNA molecule selected from the group consisting of messenger RNA (mRNA), pre-mRNA, ribosomal RNA (rRNA), transfer RNA (tRNA), micro-RNA (miRNA), small interfering RNA (siRNA), small nuclear RNA (snRNA), small nucleolar RNA (snoRNA), double stranded RNA (dsRNA), non-coding RNA (ncRNA), long non-coding RNA (lncRNA), and small cytoplasmatic RNA (scRNA). In some preferred embodiments, the target sequence (also referred to herein as a target polynucleotide) may be a sequence within an RNA molecule selected from the group consisting of mRNA, pre-mRNA, and rRNA. In some preferred embodiments, the target sequence may be a sequence within an RNA molecule selected from the group consisting of ncRNA, and lncRNA. In some more preferred embodiments, the target sequence may be a sequence within an mRNA molecule or a pre-mRNA molecule.

PAM and PFS Elements

PAM elements are sequences that can be recognized and bound by Cas proteins. Cas proteins/effector complexes can then unwind the dsDNA at a position adjacent to the PAM element. It will be appreciated that Cas proteins and systems that include them that target RNA do not require PAM sequences (Marraffini et al. 2010. Nature. 463:568-571). Instead, many rely on PFSs, which are discussed elsewhere herein. In certain embodiments, the target sequence should be associated with a PAM (protospacer adjacent motif) or PFS (protospacer flanking sequence or site), that is, a short sequence recognized by the CRISPR complex. Depending on the nature of the CRISPR-Cas protein, the target sequence should be selected, such that its complementary sequence in the DNA duplex (also referred to herein as the non-target sequence) is upstream or downstream of the PAM. In the embodiments, the complementary sequence of the target sequence is downstream or 3' of the PAM or upstream or 5' of the PAM. The precise sequence and length requirements for the PAM differ depending on the Cas protein used, but PAMs are typically 2-5 base pair sequences adjacent the protospacer (that is, the target sequence). Examples of the natural PAM sequences for different Cas proteins are provided herein below and the skilled person will be able to identify further PAM sequences for use with a given Cas protein.

The ability to recognize different PAM sequences depends on the Cas polypeptide(s) included in the system. See e.g., Gleditzsch et al. 2019. RNA Biology. 16(4):504-517. Table 29 (from Gleditzsch et al. 2019) below shows several Cas polypeptides and the PAM sequence they recognize.

TABLE 29

Example PAM Sequences

| Cas Protein | PAM Sequence |
|---|---|
| SpCas9 | NGG/NRG |
| SaCas9 | NGRRT or NGRRN |
| NmeCas9 | NNNNGATT |
| CjCas9 | NNNNRYAC |
| StCas9 | NNAGAAW |
| Cas12a (Cpf1) (including LbCpf1 and AsCpf1) | TTTV |
| Cas12b (C2c1) | TTT, TTA, and TTC |
| Cas12c (C2c3) | TA |
| Cas12d (CasY) | TA |
| Cas12e (CasX) | 5'-TTCN-3' |

Sequences are provided using IUPAC nucleotide single letter codes

In a preferred embodiment, the CRISPR effector protein may recognize a 3' PAM. In certain embodiments, the CRISPR effector protein may recognize a 3' PAM which is 5'H, wherein HisA, C orU.

Further, engineering of the PAM Interacting (PI) domain on the Cas protein may allow programming of PAM specificity, improve target site recognition fidelity, and increase the versatility of the CRISPR-Cas protein, for example as described for Cas9 in Kleinstiver B P et al. Engineered CRISPR-Cas9 nucleases with altered PAM specificities. Nature. 2015 Jul. 23; 523(7561):481-5. doi: 10.1038/nature14592. As further detailed herein, the skilled person will understand that Cas13 proteins may be modified analogously. Gao et al, "Engineered Cpf1 Enzymes with Altered PAM Specificities," bioRxiv 091611; doi: dx.doi.org/10.1101/091611 (Dec. 4, 2016). Doench et al. 2014 Nat Biotechnol. 2014 December; 32(12):1262-7 created a pool of sgRNAs, tiling across all possible target sites of a panel of six endogenous mouse and three endogenous human genes and quantitatively assessed their ability to produce null alleles of their target gene by antibody staining and flow cytometry. Doench et al. can demonstrate that optimization of the PAM improved activity and also provided an on-line tool for designing sgRNAs. Such approaches can be adapted for use with the present disclosure.

PAM sequences can be identified in a polynucleotide using an appropriate design tool, which are commercially available as well as online. Such freely available tools include, but are not limited to, CRISPRFinder and CRISPRTarget. Mojica et al. 2009. Microbiol. 155(Pt. 3):733-740; Atschul et al. 1990. J. Mol. Biol. 215:403-410; Biswass et al. 2013 RNA Biol. 10:817-827; and Grissa et al. 2007. Nucleic Acid Res. 35:W52-57. Experimental approaches to PAM identification can include, but are not limited to, plasmid depletion assays (Jiang et al. 2013. Nat. Biotechnol. 31:233-239; Esvelt et al. 2013. Nat. Methods. 10:1116-1121; Kleinstiver et al. 2015. Nature. 523:481-485), screened by a high-throughput in vivo model called PAM-SCNAR (Pattanayak et al. 2013. Nat. Biotechnol. 31:839-843 and Leenay et al. 2016.Mol. Cell. 16:253), and negative screening (Zetsche et al. 2015. Cell. 163:759-771).

As previously mentioned, CRISPR-Cas systems that target RNA do not typically rely on PAM sequences. Instead, such systems typically recognize protospacer flanking sites (PFSs) instead of PAMs Thus, Type VI CRISPR-Cas systems typically recognize protospacer flanking sites (PFSs) instead of PAMs. PFSs represents an analogue to PAMs for RNA targets. Type VI CRISPR-Cas systems employ a Cas13. Some Cas13 proteins analyzed to date, such as Cas13a (C2c2) identified from Leptotrichia shahii (LShCAs13a) have a specific discrimination against G at the 3'end of the target RNA. The presence of a C at the corresponding crRNA repeat site can indicate that nucleotide pairing at this position is rejected. However, some Cas13 proteins (e.g., LwaCAs13a and PspCas13b) do not seem to have a PFS preference. See e.g., Gleditzsch et al. 2019. RNA Biology. 16(4):504-517.

Some Type VI proteins, such as subtype B, have 5'-recognition of D (G, T, A) and a 3'-motif requirement of NAN or NNA. One example is the Cas13b protein identified in Bergeyella zoohelcum (BzCas13b). See e.g., Gleditzsch et al. 2019. RNA Biology. 16(4):504-517.

Overall Type VI CRISPR-Cas systems appear to have less restrictive rules for substrate (e.g., target sequence) recognition than those that target DNA (e.g., Type V and type II).

Nuclear Targeting and Transportation Sequences

For modification of nuclear located polynucleotides including, but not limited to, genomic DNA one or more components of the CRISPR-Cas system can include one or more sequences or signals for nucleus targeting and/or transportation. Although these are discussed with specific reference to CRISPR-Cas systems, such sequences and signals can be applied to other genetic modification systems or components thereof discussed elsewhere herein.

Such sequence may facilitate the one or more components in the composition for targeting a sequence within a cell. In order to improve targeting of the CRISPR-Cas protein and/or the nucleotide deaminase protein or catalytic domain thereof used in the methods of the present disclosure to the nucleus, it may be advantageous to provide one or both of these components with one or more nuclear localization sequences (NLSs).

In some embodiments, the NLSs used in the context of the present disclosure are heterologous to the proteins. Non-limiting examples of NLSs include an NLS sequence derived from: the NLS of the SV40 virus large T-antigen, having the amino acid sequence PKKKRKV (SEQ ID NO: 35) or PKKKRKVEAS (SEQ ID NO: 36); the NLS from nucleoplasmin (e.g., the nucleoplasmin bipartite NLS with the sequence KRPAATKKAGQAKKKK (SEQ ID NO: 37)); the c-myc NLS having the amino acid sequence PAAKRVKLD (SEQ ID NO: 38) or RQRRNELKRSP (SEQ ID NO: 39); the hRNPA1 M9 NLS having the sequence NQSSNFGPMKGGNFGGRSSGPYGGGGQYFAK-PRNQGGY (SEQ ID NO: 40); the sequence RMRIZFKNKGKDTAELRRRRVEVSVELRKAKKD-EQILKRRNV (SEQ ID NO: 41) of the IBB domain from importin-alpha; the sequences VSRKRPRP (SEQ ID NO: 42) and PPKKARED (SEQ ID NO: 43) of the myoma T protein; the sequence PQPKKKPL (SEQ ID NO: 44) of human p53; the sequence SALIKKKKKMAP (SEQ ID NO: 45) of mouse c-abl IV; the sequences DRLRR (SEQ ID NO: 46) and PKQKKRK (SEQ ID NO: 47) of the influenza virus NS1; the sequence RKLKKKIKKL (SEQ ID NO: 48) of the Hepatitis virus delta antigen; the sequence REKKKFLKRR (SEQ ID NO: 49) of the mouse Mx1 protein; the sequence KRKGDEVDGVDEVAKKKSKK (SEQ ID NO: 50) of the human poly(ADP-ribose) polymerase; and the sequence RKCLQAGMNLEARKTKK (SEQ ID NO: 51) of the steroid hormone receptors (human) glucocorticoid. In general, the one or more NLSs are of sufficient strength to drive accumulation of the DNA-targeting Cas protein in a detectable amount in the nucleus of a eukaryotic cell. In general, strength of nuclear localization activity may derive from the number of NLSs in the CRISPR-Cas protein, the particular NLS(s) used, or a combination of these factors. Detection of accumulation in the nucleus may be performed by any suitable technique. For example, a detectable marker may be fused to the nucleic acid-targeting protein, such that location within a cell may be visualized, such as in combination with a means for detecting the location of the nucleus (e.g., a stain specific for the nucleus such as DAPI). Cell nuclei may also be isolated from cells, the contents of which may then be analyzed by any suitable process for detecting protein, such as immunohistochemistry, Western blot, or enzyme activity assay. Accumulation in the nucleus may also be determined indirectly, such as by an assay for the effect of nucleic acid-targeting complex formation (e.g., assay for deaminase activity) at the target sequence, or assay for altered gene expression activity affected by DNA-targeting complex formation and/or DNA-targeting, as compared to a control not exposed to the CRISPR-Cas protein and deaminase protein or exposed to a CRISPR-Cas and/or deaminase protein lacking the one or more NLSs.

The CRISPR-Cas and/or nucleotide deaminase proteins may be provided with 1 or more, such as with, 2, 3, 4, 5, 6, 7, 8, 9, 10, or more heterologous NLSs. In some embodiments, the proteins comprises about or more than about 1, 2, 3, 4, 5, 6, 7, 8, 9, 10, or more NLSs at or near the amino-terminus, about or more than about 1, 2, 3, 4, 5, 6, 7, 8, 9, 10, or more NLSs at or near the carboxy-terminus, or a combination of these (e.g., zero or at least one or more NLS at the amino-terminus and zero or at one or more NLS at the carboxy terminus). When more than one NLS is present, each may be selected independently of the others, such that a single NLS may be present in more than one copy and/or in combination with one or more other NLSs present in one or more copies. In some embodiments, an NLS is considered near the N- or C-terminus when the nearest amino acid of the NLS is within about 1, 2, 3, 4, 5, 10, 15, 20, 25, 30, 40, 50, or more amino acids along the polypeptide chain from the N- or C-terminus. In preferred embodiments of the CRISPR-Cas proteins, an NLS attached to the C-terminal of the protein.

In CRISPR-Cas systems including a deaminase, the CRISPR-Cas protein and the deaminase protein are delivered to the cell or expressed within the cell as separate proteins. In these embodiments, each of the CRISPR-Cas and deaminase protein can be provided with one or more NLSs as described herein. In certain embodiments, the CRISPR-Cas and deaminase proteins are delivered to the cell or expressed with the cell as a fusion protein. In these embodiments one or both of the CRISPR-Cas and deaminase protein is provided with one or more NLSs. Where the nucleotide deaminase is fused to an adaptor protein (such as MS2) as described above, the one or more NLS can be provided on the adaptor protein, provided that this does not interfere with aptamer binding. In particular embodiments, the one or more NLS sequences may also function as linker sequences between the nucleotide deaminase and the CRISPR-Cas protein.

In some embodiments, a component of the CRISPR-Cas system includes a one or more nuclear export signals (NES), one or more one or more nuclear localization signals (NLS), or any combinations thereof. In some cases, the NES may be an HIV Rev NES. In certain cases, the NES may be MAPK NES. When the component is a protein, the NES or NLS may be at the C terminus of component. In some embodiments, the NES or NLS may be at the N terminus of component. In some examples, the Cas protein and optionally said nucleotide deaminase protein or catalytic domain thereof comprise one or more heterologous nuclear export signal(s) (NES(s)) or nuclear localization signal(s) (NLS(s)), preferably an HIV Rev NES or MAPK NES, preferably C-terminal.

Donor Templates

In some embodiments the CRISPR-Cas system includes a donor template, e.g., a recombination template. A template may be a component of another vector as described herein, contained in a separate vector, or provided as a separate polynucleotide. In some embodiments, a recombination template is designed to serve as a template in homologous recombination, such as within or near a target sequence nicked or cleaved by a nucleic acid-targeting effector protein as a part of a nucleic acid-targeting complex.

In an embodiment, the template nucleic acid alters the sequence of the target position. In an embodiment, the template nucleic acid results in the incorporation of a modified, or non-naturally occurring base into the target nucleic acid.

The template sequence may undergo a breakage mediated or catalyzed recombination with the target sequence. In an embodiment, the template nucleic acid may include sequence that corresponds to a site on the target sequence that is cleaved by a Cas protein mediated cleavage event. In an embodiment, the template nucleic acid may include a sequence that corresponds to both, a first site on the target sequence that is cleaved in a first Cas protein mediated event, and a second site on the target sequence that is cleaved in a second Cas protein mediated event.

In certain embodiments, the template nucleic acid can include a sequence which results in an alteration in the coding sequence of a translated sequence, e.g., one which results in the substitution of one amino acid for another in a protein product, e.g., transforming a mutant allele into a wild type allele, transforming a wild type allele into a mutant allele, and/or introducing a stop codon, insertion of an amino acid residue, deletion of an amino acid residue, or a nonsense mutation. In certain embodiments, the template nucleic acid can include a sequence which results in an alteration in a non-coding sequence, e.g., an alteration in an exon or in a 5' or 3' non-translated or non-transcribed region. Such alterations include an alteration in a control element, e.g., a promoter, enhancer, and an alteration in a cis-acting or trans-acting control element.

A template nucleic acid having homology with a target position in a target gene may be used to alter the structure of a target sequence. The template sequence may be used to alter an unwanted structure, e.g., an unwanted or mutant nucleotide. The template nucleic acid may include a sequence which, when integrated, results in decreasing the activity of a positive control element; increasing the activity of a positive control element; decreasing the activity of a negative control element; increasing the activity of a negative control element; decreasing the expression of a gene; increasing the expression of a gene; increasing resistance to a disorder or disease; increasing resistance to viral entry; correcting a mutation or altering an unwanted amino acid residue conferring, increasing, abolishing or decreasing a biological property of a gene product, e.g., increasing the enzymatic activity of an enzyme, or increasing the ability of a gene product to interact with another molecule.

The template nucleic acid may include a sequence which results in a change in sequence of 1, 2, 3, 4, 5, 6, 7, 8, 9, 10, 1 1, 12 or more nucleotides of the target sequence.

A template polynucleotide may be of any suitable length, such as about or more than about 10, 15, 20, 25, 50, 75, 100, 150, 200, 500, 1000, or more nucleotides in length. In an embodiment, the template nucleic acid may be 20+/−10, 30+/−10, 40+/−10, 50+/−10, 60+/−10, 70+/−10, 80+/−10, 90+/−10, 100+/−10, 110+/−10, 120+/−10, 130+/−10, 140+/−10, 150+/−10, 160+/−10, 170+/−10, 180+/−10, 190+/−10, 200+/−10, 210+/−10, of 220+/−10 nucleotides in length. In an embodiment, the template nucleic acid may be 30+/−20, 40+/−20, 50+/−20, 60+/−20, 70+/−20, 80+/−20, 90+/−20, 100+/−20, 110+/−20, 120+/−20, 130+/−20, 140+/−20, 150+/−20, 160+/−20, 170+/−20, 180+/−20, 190+/−20, 200+/−20, 210+/−20, of 220+/−20 nucleotides in length. In an embodiment, the template nucleic acid is 10 to 1,000, 20 to 900, 30 to 800, 40 to 700, 50 to 600, 50 to 500, 50 to 400, 50 to 300, 50 to 200, or 50 to 100 nucleotides in length.

In some embodiments, the template polynucleotide is complementary to a portion of a polynucleotide comprising the target sequence. When optimally aligned, a template polynucleotide might overlap with one or more nucleotides of a target sequences (e.g., about or more than about 1, 5, 10, 15, 20, 25, 30, 35, 40, 45, 50, 60, 70, 80, 90, 100 or more nucleotides). In some embodiments, when a template sequence and a polynucleotide comprising a target sequence are optimally aligned, the nearest nucleotide of the template polynucleotide is within about 1, 5, 10, 15, 20, 25, 50, 75, 100, 200, 300, 400, 500, 1000, 5000, 10000, or more nucleotides from the target sequence.

The exogenous polynucleotide template comprises a sequence to be integrated (e.g., a mutated gene). The sequence for integration may be a sequence endogenous or exogenous to the cell. Examples of a sequence to be integrated include polynucleotides encoding a protein or a non-coding RNA (e.g., a microRNA). Thus, the sequence for integration may be operably linked to an appropriate control sequence or sequences. Alternatively, the sequence to be integrated may provide a regulatory function.

An upstream or downstream sequence may comprise from about 20 bp to about 2500 bp, for example, about 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, or 2500 bp. In some methods, the exemplary upstream or downstream sequence have about 200 bp to about 2000 bp, about 600 bp to about 1000 bp, or more particularly about 700 bp to about 1000.

An upstream or downstream sequence may comprise from about 20 bp to about 2500 bp, for example, about 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, or 2500 bp. In some methods, the exemplary upstream or downstream sequence have about 200 bp to about 2000 bp, about 600 bp to about 1000 bp, or more particularly about 700 bp to about 1000

In certain embodiments, one or both homology arms may be shortened to avoid including certain sequence repeat elements. For example, a 5' homology arm may be shortened to avoid a sequence repeat element. In other embodiments, a 3' homology arm may be shortened to avoid a sequence repeat element. In some embodiments, both the 5' and the 3' homology arms may be shortened to avoid including certain sequence repeat elements.

In some embodiments, the exogenous polynucleotide template may further comprise a marker. Such a marker may make it easy to screen for targeted integrations. Examples of suitable markers include restriction sites, fluorescent proteins, or selectable markers. The exogenous polynucleotide template of the disclosure can be constructed using recombinant techniques (see, for example, Sambrook et al., 2001 and Ausubel et al., 1996).

In certain embodiments, a template nucleic acid for correcting a mutation may designed for use as a single-stranded oligonucleotide. When using a single-stranded oligonucleotide, 5' and 3' homology arms may range up to about 200 base pairs (bp) in length, e.g., at least 25, 50, 75, 100, 125, 150, 175, or 200 bp in length.

Suzuki et al. describe in vivo genome editing via CRISPR/Cas9 mediated homology-independent targeted integration (2016, Nature 540:144-149). The strategy and techniques Of Suzuki et al. can be adapted for use with the present disclosure.

Specialized Cas-Based Systems

Dead Cas (dCas) Systems

In some embodiments, the system is a Cas-based system that is capable of performing a specialized function or activity. For example, the Cas protein may be fused, operably coupled to, or otherwise associated with one or more functionals domains. In certain example embodiments, the Cas protein may be a catalytically dead Cas protein ("dCas") and/or have nickase activity. A nickase is a Cas protein that cuts only one strand of a double stranded target. In such embodiments, the dCas or nickase provide a sequence specific targeting functionality that delivers the functional domain to or proximate a target sequence. Example functional domains that may be fused to, operably coupled to, or otherwise associated with a Cas protein can be or include, but are not limited to a nuclear localization signal (NLS) domain, a nuclear export signal (NES) domain, a translational activation domain, a transcriptional activation domain (e.g. VP64, p65, MyoD1, HSF1, RTA, and SET7/9), a translation initiation domain, a transcriptional repression domain (e.g., a KRAB domain, NuE domain, NcoR domain, and a SID domain such as a SID4X domain), a nuclease domain (e.g., FokI), a histone modification domain (e.g., a histone acetyltransferase), a light inducible/controllable domain, a chemically inducible/controllable domain, a transposase domain, a homologous recombination machinery domain, a recombinase domain, an integrase domain, and combinations thereof. Methods for generating catalytically dead Cas9 or a nickase Cas9 (WO 2014/204725, Ran et al. Cell. 2013 Sep. 12; 154(6):1380-1389), Cas12 (Liu et al. Nature Communications, 8, 2095 (2017)), and Cas13 (International Patent Publication Nos. WO2019/005884 and WO2019/060746) are known in the art and incorporated herein by reference.

In some embodiments, the functional domains can have one or more of the following activities: methylase activity, demethylase activity, translation activation activity, translation initiation activity, translation repression activity, transcription activation activity, transcription repression activity, transcription release factor activity, histone modification activity, nuclease activity, single-strand RNA cleavage activity, double-strand RNA cleavage activity, single-strand DNA cleavage activity, double-strand DNA cleavage activity, molecular switch activity, chemical inducibility, light inducibility, and nucleic acid binding activity. In some embodiments, the one or more functional domains may comprise epitope tags or reporters. Non-limiting examples of epitope tags include histidine (His) tags, V5 tags, FLAG tags, influenza hemagglutinin (HA) tags, Myc tags, VSV-G tags, and thioredoxin (Trx) tags. Examples of reporters include, but are not limited to, glutathione-S-transferase (GST), horseradish peroxidase (HRP), chloramphenicol acetyltransferase (CAT) beta-galactosidase, beta-glucuronidase, luciferase, green fluorescent protein (GFP), HcRed, DsRed, cyan fluorescent protein (CFP), yellow fluorescent protein (YFP), and auto-fluorescent proteins including blue fluorescent protein (BFP).

The one or more functional domain(s) may be positioned at, near, and/or in proximity to a terminus of the effector protein (e.g., a Cas protein). In embodiments having two or more functional domains, each of the two can be positioned at or near or in proximity to a terminus of the effector protein (e.g., a Cas protein). In some embodiments, such as those where the functional domain is operably coupled to the effector protein, the one or more functional domains can be tethered or linked via a suitable linker (including, but not limited to, GlySer linkers) to the effector protein (e.g., a Cas protein). When there is more than one functional domain, the functional domains can be same or different. In some embodiments, all the functional domains are the same. In some embodiments, all of the functional domains are different from each other. In some embodiments, at least two of the functional domains are different from each other. In some embodiments, at least two of the functional domains are the same as each other.

Other suitable functional domains can be found, for example, in International Patent Publication No. WO 2019/018423, which can be adapted for use with the present disclosure.

Split-Cas Systems

In some embodiments, the CRISPR-Cas system is a split CRISPR-Cas system. See e.g., Zetche et al., 2015. Nat. Biotechnol. 33(2): 139-142 and International Patent Publication WO2019/018423, the compositions and techniques of which can be used in and/or adapted for use with the present invention. Split CRISPR-Cas proteins are set forth herein and in documents incorporated herein by reference in further detail herein. In certain embodiments, each part of a split CRISPR protein are attached to a member of a specific binding pair, and when bound with each other, the members of the specific binding pair maintain the parts of the CRISPR protein in proximity. In certain embodiments, each part of a split CRISPR protein is associated with an inducible binding pair. An inducible binding pair is one which is capable of being switched "on" or "off" by a protein or small molecule that binds to both members of the inducible binding pair. In some embodiments, CRISPR proteins may preferably split between domains, leaving domains intact. In particular embodiments, said Cas split domains (e.g., RuvC and HNH domains in the case of Cas9) can be simultaneously or sequentially introduced into the cell such that said split Cas domain(s) process the target nucleic acid sequence in the algae cell. The reduced size of the split Cas compared to the wildtype Cas allows other methods of delivery of the systems to the cells, such as the use of cell penetrating peptides as described herein.

DNA and RNA Base Editing Systems

In some embodiments, a polynucleotide of the present disclosure described elsewhere herein is modified using a base editing system. In some embodiments, a Cas protein is connected or fused to a nucleotide deaminase. Thus, in some embodiments the Cas-based system can be a base editing system. As used herein, "base editing" refers generally to the process of polynucleotide modification via a CRISPR-Cas-based or Cas-based system that does not include excising nucleotides to make the modification. Base editing can convert base pairs at precise locations without generating excess undesired editing byproducts that can be made using traditional CRISPR-Cas systems.

In certain example embodiments, the nucleotide deaminase may be a DNA base editor used in combination with a DNA binding Cas protein such as, but not limited to, Class 2 Type II and Type V systems. Two classes of DNA base editors are generally known: cytosine base editors (CBEs) and adenine base editors (ABEs). CBEs convert a C•G base pair into a T•A base pair (Komor et al. 2016. Nature. 533:420-424; Nishida et al. 2016. Science. 353; and Li et al.

Nat. Biotech. 36:324-327) and ABEs convert an A•T base pair to a G•C base pair. Collectively, CBEs and ABEs can mediate all four possible transition mutations (C to T, A to G, T to C, and G to A). Rees and Liu. 2018. Nat. Rev. Genet. 19(12): 770-788, particularly at FIGS. 1b, 2a-2c, 3a-3f, and Table 1. In some embodiments, the base editing system includes a CBE and/or an ABE. In some embodiments, a polynucleotide of the present invention described elsewhere herein can be modified using a base editing system. Rees and Liu. 2018. Nat. Rev. Gent. 19(12):770-788. Base editors also generally do not need a DNA donor template and/or rely on homology-directed repair. Komor et al. 2016. Nature. 533: 420-424; Nishida et al. 2016. Science. 353; and Gaudeli et al. 2017. Nature. 551:464-471. Upon binding to a target locus in the DNA, base pairing between the guide RNA of the system and the target DNA strand leads to displacement of a small segment of ssDNA in an "R-loop". Nishimasu et al. Cell. 156:935-949. DNA bases within the ssDNA bubble are modified by the enzyme component, such as a deaminase. In some systems, the catalytically disabled Cas protein can be a variant or modified Cas can have nickase functionality and can generate a nick in the non-edited DNA strand to induce cells to repair the non-edited strand using the edited strand as a template. Komor et al. 2016. Nature. 533:420-424; Nishida et al. 2016. Science. 353; and Gaudeli et al. 2017. Nature. 551:464-471, which can be adapted for use with the present disclosure.

Other Example Type V base editing systems are described in International Patent Publication Nos. WO2018/213708, WO2018/213726, WO2019126709, WO2019126716, and WO2019126762, each of which is incorporated herein by reference and can be adapted for use with the present disclosure.

In certain example embodiments, the base editing system may be an RNA base editing system. As with DNA base editors, a nucleotide deaminase capable of converting nucleotide bases may be fused to a Cas protein. However, in these embodiments, the Cas protein will need to be capable of binding RNA. Example RNA binding Cas proteins include, but are not limited to, RNA-binding Cas9s such as *Francisella novicida* Cas9 ("FnCas9"), and Class 2 Type VI Cas systems. The nucleotide deaminase may be a cytidine deaminase or an adenosine deaminase, or an adenosine deaminase engineered to have cytidine deaminase activity. In certain example embodiments, the RNA base editor may be used to delete or introduce a post-translation modification site in the expressed mRNA. In contrast to DNA base editors, whose edits are permanent in the modified cell, RNA base editors can provide edits where finer, temporal control may be needed, for example in modulating a particular immune response. Example Type VI RNA-base editing systems are described in Cox et al. 2017. Science 358: 1019-1027, International Patent Publication Nos. WO 2019/005884, WO2019/005886, and WO2019/071048, WO2019126709, which are incorporated herein by reference and can be adapted for use with the present disclosure. An example FnCas9 system that may be adapted for RNA base editing purposes is described in International Patent Publication No. WO2016/106236, which is incorporated herein by reference and can be adapted for use with the present disclosure.

An example method for delivery of base-editing systems, including use of a split-intein approach to divide CBE and ABE into reconstitutable halves, is described in Levy et al. Nature Biomedical Engineering doi.org/10.1038/s41441-019-0505-5 (2019), which is incorporated herein by reference and can be adapted for use with the present disclosure.

Prime Editor Systems

In some embodiments, a polynucleotide of the present disclosure described elsewhere herein is modified using a prime editing system. See e.g., Anzalone et al. 2019. Nature. 576: 149-157. Like base editing systems, prime editing systems can be capable of targeted modification of a polynucleotide without generating double stranded breaks and does not require donor templates. Further prime editing systems can be capable of all 12 possible combination swaps. Prime editing can operate via a "search-and-replace" methodology and can mediate targeted insertions, deletions, all 12 possible base-to-base conversion and combinations thereof. Generally, a prime editing system, as exemplified by PE1, PE2, and PE3 (Id.), can include a reverse transcriptase fused or otherwise coupled or associated with an RNA-programmable nickase and a prime-editing extended guide RNA (pegRNA) to facility direct copying of genetic information from the extension on the pegRNA into the target polynucleotide. Embodiments that can be used with the present invention include these and variants thereof. Prime editing can have the advantage of lower off-target activity than traditional CRISPR-Cas systems along with few byproducts and greater or similar efficiency as compared to traditional CRISPR-Cas systems.

In some embodiments, the prime editing guide molecule can specify both the target polynucleotide information (e.g., sequence) and contain a new polynucleotide cargo that replaces target polynucleotides. To initiate transfer from the guide molecule to the target polynucleotide, the PE system can nick the target polynucleotide at a target side to expose a 3'hydroxyl group, which can prime reverse transcription of an edit-encoding extension region of the guide molecule (e.g., a prime editing guide molecule or peg guide molecule) directly into the target site in the target polynucleotide. See e.g., Anzalone et al. 2019. Nature. 576: 149-157, particularly at FIGS. 1b, 1c, related discussion, and Supplementary discussion.

In some embodiments, a prime editing system can be composed of a Cas polypeptide having nickase activity, a reverse transcriptase, and a guide molecule. The Cas polypeptide can lack nuclease activity. The guide molecule can include a target binding sequence as well as a primer binding sequence and a template containing the edited polynucleotide sequence. The guide molecule, Cas polypeptide, and/or reverse transcriptase can be coupled together or otherwise associate with each other to form an effector complex and edit a target sequence. In some embodiments, the Cas polypeptide is a Class 2, Type V Cas polypeptide. In some embodiments, the Cas polypeptide is a Cas9 polypeptide (e.g., is a Cas9 nickase). In some embodiments, the Cas polypeptide is fused to the reverse transcriptase. In some embodiments, the Cas polypeptide is linked to the reverse transcriptase.

In some embodiments, the prime editing system can be a PE1 system or variant thereof, a PE2 system or variant thereof, or a PE3 (e.g., PE3, PE3b) system. See e.g., Anzalone et al. 2019. Nature. 576: 149-157, particularly at pgs. 2-3, FIGS. 2a, 3a-3f, 4a-4b, Extended data FIGS. 3a-3b, 4.

The peg guide molecule can be about 10 to about 200 or more nucleotides in length, such as 10 to/or 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, or 200 or more nucleotides in length. Optimization of the peg guide molecule can be accomplished as described in Anzalone et al. 2019. Nature. 576: 149-157, particularly at pg. 3, FIG. 2a-2b, and Extended Data FIGS. 5a-c.

CRISPR Associated Transposase (CAST) Systems

In some embodiments, a polynucleotide of the present disclosure described elsewhere herein can be modified using a CRISPR Associated Transposase ("CAST") system. The CAST system can include a Cas protein that is catalytically inactive, or engineered to be catalytically active, and further comprises a transposase (or subunits thereof) that catalyze RNA-guided DNA transposition. Such systems are able to insert DNA sequences at a target site in a DNA molecule without relying on host cell repair machinery. CAST systems can be Class1 or Class 2 CAST systems. An example Class 1 system is described in Klompe et al. Nature, doi: 10.1038/s41586-019-1323, which is in incorporated herein by reference. An example Class 2 system is described in Strecker et al. Science. 10/1126/science. aax9181 (2019), and PCT/US2019/066835 which are incorporated herein by reference and can be adapted for use with the present disclosure.

TALE Nucleases

In some embodiments, a TALE nuclease or TALE nuclease system can be used to modify a polynucleotide, such as a myostatin and/or mc4-r gene or introduce an exogenous gene described herein. In some embodiments, the methods provided herein use isolated, non-naturally occurring, recombinant or engineered DNA binding proteins that comprise TALE monomers or TALE monomers or half monomers as a part of their organizational structure that enable the targeting of nucleic acid sequences with improved efficiency and expanded specificity.

Naturally occurring TALEs or "wild type TALEs" are nucleic acid binding proteins secreted by numerous species of proteobacteria. TALE polypeptides contain a nucleic acid binding domain composed of tandem repeats of highly conserved monomer polypeptides that are predominantly 33, 34 or 35 amino acids in length and that differ from each other mainly in amino acid positions 12 and 13. In advantageous embodiments the nucleic acid is DNA. As used herein, the term "polypeptide monomers", "TALE monomers" or "monomers" will be used to refer to the highly conserved repetitive polypeptide sequences within the TALE nucleic acid binding domain and the term "repeat variable di-residues" or "RVD" will be used to refer to the highly variable amino acids at positions 12 and 13 of the polypeptide monomers. As provided throughout the disclosure, the amino acid residues of the RVD are depicted using the IUPAC single letter code for amino acids. A general representation of a TALE monomer which is comprised within the DNA binding domain is $X_{1-11}(X_{12}X_{13})$-$X_{14-33}$ or $X_{34}$ or $X_{35}$, where the subscript indicates the amino acid position and X represents any amino acid. $X_{12}X_{13}$ indicate the RVDs. In some polypeptide monomers, the variable amino acid at position 13 is missing or absent and in such monomers, the RVD consists of a single amino acid. In such cases the RVD may be alternatively represented as X*, where X represents $X_{12}$ and (*) indicates that $X_{13}$ is absent. The DNA binding domain comprises several repeats of TALE monomers and this may be represented as $(X_{1-11}$-$(X_{12}X_{13})$-$X_{14-33}$ or $X_{34}$ or $X_{35})_z$, where in an advantageous embodiment, z is at least 5 to 40. In a further advantageous embodiment, z is at least 10 to 26.

The TALE monomers can have a nucleotide binding affinity that is determined by the identity of the amino acids in its RVD. For example, polypeptide monomers with an RVD of NI can preferentially bind to adenine (A), monomers with an RVD of NG can preferentially bind to thymine (T), monomers with an RVD of HD can preferentially bind to cytosine (C) and monomers with an RVD of NN can preferentially bind to both adenine (A) and guanine (G). In some embodiments, monomers with an RVD of IG can preferentially bind to T. Thus, the number and order of the polypeptide monomer repeats in the nucleic acid binding domain of a TALE determines its nucleic acid target specificity. In some embodiments, monomers with an RVD of NS can recognize all four base pairs and can bind to A, T, G or C. The structure and function of TALEs is further described in, for example, Moscou et al., Science 326:1501 (2009); Boch et al., Science 326:1509-1512 (2009); and Zhang et al., Nature Biotechnology 29:149-153 (2011).

The polypeptides used in methods of the invention can be isolated, non-naturally occurring, recombinant or engineered nucleic acid-binding proteins that have nucleic acid or DNA binding regions containing polypeptide monomer repeats that are designed to target specific nucleic acid sequences.

As described herein, polypeptide monomers having an RVD of HN or NH preferentially bind to guanine and thereby allow the generation of TALE polypeptides with high binding specificity for guanine containing target nucleic acid sequences. In some embodiments, polypeptide monomers having RVDs RN, NN, NK, SN, NH, KN, HN, NQ, HH, RG, KH, RH and SS can preferentially bind to guanine. In some embodiments, polypeptide monomers having RVDs RN, NK, NQ, HH, KH, RH, SS and SN can preferentially bind to guanine and can thus allow the generation of TALE polypeptides with high binding specificity for guanine containing target nucleic acid sequences. In some embodiments, polypeptide monomers having RVDs HH, KH, NH, NK, NQ, RH, RN and SS can preferentially bind to guanine and thereby allow the generation of TALE polypeptides with high binding specificity for guanine containing target nucleic acid sequences. In some embodiments, the RVDs that have high binding specificity for guanine are RN, NH RH and KH. Furthermore, polypeptide monomers having an RVD of NV can preferentially bind to adenine and guanine. In some embodiments, monomers having RVDs of H*, HA, KA, N*, NA, NC, NS, RA, and S* bind to adenine, guanine, cytosine and thymine with comparable affinity.

The predetermined N-terminal to C-terminal order of the one or more polypeptide monomers of the nucleic acid or DNA binding domain determines the corresponding predetermined target nucleic acid sequence to which the polypeptides of the invention will bind. As used herein the monomers and at least one or more half monomers are "specifically ordered to target" the genomic locus or gene of interest. In plant genomes, the natural TALE-binding sites always begin with a thymine (T), which may be specified by a cryptic signal within the non-repetitive N-terminus of the TALE polypeptide; in some cases, this region may be referred to as repeat 0. In animal genomes, TALE binding sites do not necessarily have to begin with a thymine (T) and polypeptides of the invention may target DNA sequences that begin with T, A, G or C. The tandem repeat of TALE monomers always ends with a half-length repeat or a stretch of sequence that may share identity with only the first 20 amino acids of a repetitive full-length TALE monomer and this half repeat may be referred to as a half-monomer. Therefore, it follows that the length of the nucleic acid or DNA being targeted is equal to the number of full monomers plus two.

In some embodiments, the TALEs can include N- and/or C-terminal capping regions, which can increase TALE polypeptide binding efficiency (see e.g., Zhang et al., Nature Biotechnology 29:149-153 (2011)). Such "capping regions" can be directly N-terminal and/or C-terminal of the DNA binding region of a TALE. Exemplary amino acid sequence of a N-terminal capping region and C-terminal capping regions are generally known in the art.

As used herein, the predetermined "N-terminus" to "C terminus" orientation of the N-terminal capping region, the DNA binding domain comprising the repeat TALE monomers and the C-terminal capping region provide structural basis for the organization of different domains in the d-TALEs or polypeptides described herein.

In some embodiments, the entire N-terminal and/or C-terminal capping regions are not necessary to enhance the binding activity of the DNA binding region. Therefore, in certain embodiments, fragments of the N-terminal and/or C-terminal capping regions are included in the TALE polypeptides described herein.

In certain embodiments, the TALE polypeptides described herein contain an N-terminal capping region fragment that included at least 10, 20, 30, 40, 50, 54, 60, 70, 80, 87, 90, 94, 100, 102, 110, 117, 120, 130, 140, 147, 150, 160, 170, 180, 190, 200, 210, 220, 230, 240, 250, 260 or 270 amino acids of an N-terminal capping region. In certain embodiments, the N-terminal capping region fragment amino acids are of the C-terminus (the DNA-binding region proximal end) of an N-terminal capping region. As described in Zhang et al., Nature Biotechnology 29:149-153 (2011), N-terminal capping region fragments that include the C-terminal 240 amino acids enhance binding activity equal to the full length capping region, while fragments that include the C-terminal 147 amino acids retain greater than 80% of the efficacy of the full length capping region, and fragments that include the C-terminal 117 amino acids retain greater than 50% of the activity of the full-length capping region.

In some embodiments, the TALE polypeptides described herein contain a C-terminal capping region fragment that included at least 6, 10, 20, 30, 37, 40, 50, 60, 68, 70, 80, 90, 100, 110, 120, 127, 130, 140, 150, 155, 160, 170, 180 amino acids of a C-terminal capping region. In certain embodiments, the C-terminal capping region fragment amino acids are of the N-terminus (the DNA-binding region proximal end) of a C-terminal capping region. In some embodiments, the C-terminal capping region includes only or at least the 68 C-terminal amino acids, which enhance binding activity equal to the full-length capping region. See e.g., Zhang et al., Nature Biotechnology 29:149-153 (2011). In some embodiments, the C-terminal capping region includes only or at least the 20 C-terminal amino acids, which have about 50% or greater the efficacy of the full-length capping region. See e.g., Zhang et al., Nature Biotechnology 29:149-153 (2011).

In certain embodiments, the capping regions of the TALE polypeptides described herein do not need to have identical sequences to the capping region sequences provided herein. Thus, in some embodiments, the capping region of the TALE polypeptides described herein have sequences that are at least 50%, 60%, 70%, 80%, 85%, 90%, 91%, 92%, 93%, 94%, 95%, 96%, 97%, 98% or 99% identical or share identity to the capping region amino acid sequences provided herein. Sequence identity is related to sequence homology. Homology comparisons may be conducted by eye, or more usually, with the aid of readily available sequence comparison programs. These commercially available computer programs may calculate percent (%) homology between two or more sequences and may also calculate the sequence identity shared by two or more amino acid or nucleic acid sequences. In some preferred embodiments, the capping region of the TALE polypeptides described herein have sequences that are at least 95% identical or share identity to the capping region amino acid sequences provided herein.

Sequence homologies can be generated by any of a number of computer programs known in the art, which include but are not limited to BLAST or FASTA. Suitable computer programs for carrying out alignments like the GCG Wisconsin Bestfit package may also be used. Once the software has produced an optimal alignment, it is possible to calculate % homology, preferably % sequence identity. The software typically does this as part of the sequence comparison and generates a numerical result.

In some embodiments described herein, the TALE polypeptides include a nucleic acid binding domain linked to the one or more effector domains. The terms "effector domain" or "regulatory and functional domain" refer to a polypeptide sequence that has an activity other than binding to the nucleic acid sequence recognized by the nucleic acid binding domain. By combining a nucleic acid binding domain with one or more effector domains, the polypeptides of the invention may be used to target the one or more functions or activities mediated by the effector domain to a particular target DNA sequence to which the nucleic acid binding domain specifically binds.

In some embodiments of the TALE polypeptides described herein, the activity mediated by the effector domain is a biological activity. For example, in some embodiments the effector domain is a transcriptional inhibitor (i.e., a repressor domain), such as an mSin interaction domain (SID). SID4X domain or a Kruppel-associated box (KRAB) or fragments of the KRAB domain. In some embodiments, the effector domain is an enhancer of transcription (i.e., an activation domain), such as the VP16, VP64 or p65 activation domain. In some embodiments, the nucleic acid binding is linked, for example, with an effector domain that includes but is not limited to a transposase, integrase, recombinase, resolvase, invertase, protease, DNA methyltransferase, DNA demethylase, histone acetylase, histone deacetylase, nuclease, transcriptional repressor, transcriptional activator, transcription factor recruiting, protein nuclear-localization signal or cellular uptake signal.

In some embodiments, the effector domain is a protein domain which exhibits activities which include but are not limited to transposase activity, integrase activity, recombinase activity, resolvase activity, invertase activity, protease activity, DNA methyltransferase activity, DNA demethylase activity, histone acetylase activity, histone deacetylase activity, nuclease activity, nuclear-localization signaling activity, transcriptional repressor activity, transcriptional activator activity, transcription factor recruiting activity, or cellular uptake signaling activity. Other preferred embodiments of the invention may include any combination of the activities described herein.

A variety of additional TALEN-based systems have been described in the art, and modifications thereof are regularly reported; see, e.g., Boch, Science 326(5959):1509-12

(2009); Mak et al., Science 335(6069):716-9 (2012); and Moscou et al., Science 326(5959):1501 (2009). The use of TALENs based on the "Golden Gate" platform, or cloning scheme, has been described by multiple groups; see, e.g., Cermak et al., Nucleic Acids Res. 39(12):e82 (2011); Li et al., Nucleic Acids Res. 39(14):6315-25 (2011); Weber et al., PLoS One. 6(2):e16765 (2011); Wang et al., J Genet Genomics 41(6):339-47, Epub 2014 May 17 (2014); and Cermak T et al., Methods Mol Biol. 1239:133-59 (2015), any of which can be adapted for use with the present disclosure.

Zinc Finger Nucleases

In some embodiments, a polynucleotide, such as a myostatin and/or mc4-r polynucleotide, is modified using a zinc finger system. In some embodiments, a ZFN system can be used to introduce an exogenous gene, such as any of those described elsewhere herein. One type of programmable DNA-binding domain is provided by artificial zinc-finger (ZF) technology, which involves arrays of ZF modules to target new DNA-binding sites in the genome. Each finger module in a ZF array targets three DNA bases. A customized array of individual zinc finger domains is assembled into a ZF protein (ZFP).

Zinc Finger proteins can comprise a functional domain. The first synthetic zinc finger nucleases (ZFNs) were developed by fusing a ZF protein to the catalytic domain of the Type IIS restriction enzyme FokI. (Kim, Y. G. et al., 1994, Chimeric restriction endonuclease, Proc. Natl. Acad. Sci. U.S.A. 91, 883-887; Kim, Y. G. et al., 1996, Hybrid restriction enzymes: zinc finger fusions to Fok I cleavage domain. Proc. Natl. Acad. Sci. U.S.A. 93, 1156-1160). Increased cleavage specificity can be attained with decreased off target activity by use of paired ZFN heterodimers, each targeting different nucleotide sequences separated by a short spacer. (Doyon, Y. et al., 2011, Enhancing zinc-finger-nuclease activity with improved obligate heterodimeric architectures. Nat. Methods 8, 74-79). ZFPs can also be designed as transcription activators and repressors and have been used to target many genes in a wide variety of organisms. These and any other ZFN systems can be used to modify the genome, such as the myostatin and/or mc4-r gene. Exemplary methods of genome editing using ZFNs can be found for example in U.S. Pat. Nos. 6,534,261, 6,607,882, 6,746,838, 6,794,136, 6,824,978, 6,866,997, 6,933,113, 6,979,539, 7,013,219, 7,030,215, 7,220,719, 7,241,573, 7,241,574, 7,585,849, 7,595,376, 6,903,185, and 6,479,626, all of which are specifically incorporated by reference and whose systems and methods can be adapted for use with the present disclosure to generate a myostatin and/or mc4-r deficient cells and/or organism.

A variety of ZFN-based systems have been described in the art, modifications thereof are regularly reported, and numerous references describe rules and parameters that are used to guide the design of ZFNs; see, e.g., Segal et al., Proc Natl Acad Sci USA 96(6):2758-63 (1999); Dreier B et al., J Mol Biol. 303(4):489-502 (2000); Liu Q et al., J Biol Chem. 277(6):3850-6 (2002); Dreier et al., J Biol Chem 280(42): 35588-97 (2005); and Dreier et al., J Biol Chem. 276(31): 29466-78 (2001).

Homing Endonucleases

In some embodiments, the genetic modifying system is or includes one or more homing endonucleases. Homing endonucleases (HEs) are sequence-specific endonucleases that have long recognition sequences (14-44 base pairs) and cleave DNA with high specificity-often at sites unique in the genome. There are at least six known families of HEs as classified by their structure, including GIY-YIG, His-Cis box, H—N—H, PD-(D/E)xK, and Vsr-like that are derived from a broad range of hosts, including eukaryotes, protists, bacteria, archaea, cyanobacteria and phage. As with ZFNs and TALENs, HEs can be used to create a DSB at a target locus as the initial step in genome editing. In addition, some natural and engineered HEs cut only a single strand of DNA, thereby functioning as site-specific nickases. The large target sequence of HEs and the specificity that they offer have made them attractive candidates to create site-specific DSBs.

A variety of HE-based systems have been described in the art, and modifications thereof are regularly reported; see, e.g., the reviews by Steentoft et al., Glycobiology 24(8): 663-80 (2014); Belfort and Bonocora, Methods Mol Biol. 1123:1-26 (2014); Hafez and Hausner, Genome 55(8):553-69 (2012); and references cited therein, which can be adapted for use with the present disclosure.

Meganucleases and Hybrid Meganucleases

In some embodiments, a meganuclease, a hybrid mega nuclease, or system thereof can be used to modify a polynucleotide, such as a myostatin or mc4-r polynucleotide or donor cell polynucleotide. Meganucleases are endodeoxyribonucleases that are characterized by a large recognition site (double-stranded DNA sequences of 12 to 40 base pairs). Exemplary meganucelases and methods for using meganucleases can be found in U.S. Pat. Nos. 8,163,514, 8,133,697, 8,021,867, 8,119,361, 8,119,381, 8,124,369, and 8,129,134, which are specifically incorporated herein by reference. Such methods can be adapted for use to generate an engineered fish of the present disclosure.

Exemplary hybrid meganucleases include, without limitation, the MegaTal system and Tev-mTALEN systems, which use a fusion of TALE DNA binding domains and catalytically active HEs, taking advantage of both the tunable DNA binding and specificity of the TALE, as well as the cleavage sequence specificity of the HE; see, e.g., Boissel et al., NAR 42: 2591-2601 (2014); Kleinstiver et al., G3 4:1155-65 (2014); and Boissel and Scharenberg, Methods Mol. Biol. 1239: 171-96 (2015). Other exemplary hybrid meganucleases include, without limitation, the MegaTev system, which includes fusion of a meganuclease (Mega) with the nuclease domain derived from the GIY-YIG homing endonuclease I-TevI (Tev) where two active sites are positioned about 30 bp apart on a DNA substrate and generate two DSBs with non-compatible cohesive ends; see, e.g., Wolfs et al., NAR 42, 8816-29 (2014).

RNAi

In certain embodiments, the genetic modification system is an interfering RNA (RNAi) system or agent (e.g., shRNA). As used herein, "gene silencing" or "gene silenced" in reference to an activity of an RNAi molecule or system, for example a siRNA or miRNA refers to a decrease in the mRNA level in a cell for a target gene by at least about 5%, about 10%, about 20%, about 30%, about 40%, about 50%, about 60%, about 70%, about 80%, about 90%, about 95%, about 99%, about 100% of the mRNA level found in the cell without the presence of the miRNA or RNA interference molecule. In one preferred embodiment, the mRNA levels are decreased by at least about 70%, about 80%, about 90%, about 95%, about 99%, about 100%.

As used herein, the term "RNAi" refers to any type of interfering RNA system or molecule, including but not limited to, siRNAi, shRNAi, endogenous microRNA, long non-coding RNA, and artificial microRNA. For instance, it includes sequences previously identified as siRNA, regardless of the mechanism of up- or down-stream processing of the RNA (i.e., although siRNAs are believed to have a specific method of in vivo processing resulting in the cleavage of mRNA, such sequences can be incorporated into the vectors in the context of the flanking sequences described herein). The term "RNAi" can include both gene silencing RNAi molecules, and also RNAi effector molecules which activate the expression of a gene.

As used herein, a "siRNA" refers to a nucleic acid that forms a double stranded RNA, which double stranded RNA has the ability to reduce or inhibit expression of a gene or target gene when the siRNA is present or expressed in the same cell as the target gene. The double stranded RNA siRNA can be formed by the complementary strands. In one embodiment, a siRNA refers to a nucleic acid that can form a double stranded siRNA. The sequence of the siRNA can correspond to the full-length target gene, or a subsequence thereof. Typically, the siRNA is at least about 15-50 nucleotides in length (e.g., each complementary sequence of the double stranded siRNA is about 15-50 nucleotides in length, and the double stranded siRNA is about 15-50 base pairs in length, preferably about 19-30 base nucleotides, preferably about 20-25 nucleotides in length, e.g., 20, 21, 22, 23, 24, 25, 26, 27, 28, 29, or 30 nucleotides in length).

As used herein "shRNA" or "small hairpin RNA" (also called stem loop) is a type of siRNA. In one embodiment, these shRNAs are composed of a short, e.g., about 19 to about 25 nucleotide, antisense strand, followed by a nucleotide loop of about 5 to about 9 nucleotides, and the analogous sense strand. Alternatively, the sense strand can precede the nucleotide loop structure and the antisense strand can follow.

The terms "microRNA" or "miRNA" are used interchangeably herein are endogenous RNAs, some of which are known to regulate the expression of protein-coding genes at the posttranscriptional level. Endogenous microRNAs are small RNAs naturally present in the genome that are capable of modulating the productive utilization of mRNA. The term artificial microRNA includes any type of RNA sequence, other than endogenous microRNA, which is capable of modulating the productive utilization of mRNA. MicroRNA sequences have been described in publications such as Lim, et al., Genes & Development, 17, p. 991-1008 (2003), Lim et al Science 299, 1540 (2003), Lee and Ambros Science, 294, 862 (2001), Lau et al., Science 294, 858-861 (2001), Lagos-Quintana et al, Current Biology, 12, 735-739 (2002), Lagos Quintana et al, Science 294, 853-857 (2001), and Lagos-Quintana et al, RNA, 9, 175-179 (2003), which are incorporated herein by reference. Multiple microRNAs can also be incorporated into a precursor molecule. Furthermore, miRNA-like stem-loops can be expressed in cells as a vehicle to deliver artificial miRNAs and short interfering RNAs (siRNAs) for the purpose of modulating the expression of endogenous genes through the miRNA and/or RNAi pathways.

As used herein, "double stranded RNA" or "dsRNA" refers to RNA molecules that are comprised of two strands. Double-stranded molecules include those comprised of a single RNA molecule that doubles back on itself to form a two-stranded structure. For example, the stem loop structure of the progenitor molecules from which the single-stranded miRNA is derived, called the pre-miRNA (Bartel et al. 2004. Cell 1 16:281-297), comprises a dsRNA molecule.

RNAi molecules can be delivered as the final active RNAi molecule or via a DNA polynucleotide or vector that encodes the RNAi molecule.

In some embodiments, the RNAi molecule or system targets a myostatin or mc4-r RNA molecule, such a myostatin or mc4-r mRNA. In some embodiments, the RNAi molecule or system produces an RNAi molecule that binds to and results in the degradation of a myostatin or mc4-r RNA and/or inhibition of translation of a myostatin or mc4-r mRNA. In some embodiments, the amount of a myostatin or mc4-r RNA is reduced below detectable levels and/or reduces the amount of a myostatin or mc4-r protein so as to effectively eliminate the function of myostatin or mc4-r.

In some embodiments, the RNAi molecule or system targets one or more RNA molecules in a donor cell(s) to target a gene product of interest to generate a cell or organism having a desired phenotype or characteristic.

Transposon Systems

In some embodiments, the myostatin or mc4-r polynucleotide in a host cell or a target polynucleotide in a donor cell is modified using a transposon system. Exemplary transposons systems that can be utilized for modifying a polynucleotide are described herein and will be appreciated by those of ordinary skill in the art in view of this disclosure. In some embodiments, the transposon system is a Class I transposon system polypeptide. In some embodiments, the transposon system is a Class II transposon system polypeptide. As used herein, "transposon" (also referred to as transposable element) refers to a polynucleotide sequence that is capable of moving form location in a genome to another. There are several classes of transposons. Transposons include retrotransposons (Class I transposons) and DNA transposons (Class II transposons). Retrotransposons require the transcription of the polynucleotide that is moved (or transposed) in order to transpose the polynucleotide to a new genome or polynucleotide. DNA transposons are those that do not require reverse transcription of the polynucleotide that is moved (or transposed) in order to transpose the polynucleotide to a new genome or polynucleotide.

Suitable Class I transposon systems include any of those in, without limitation, LTR and non-LTR retrotransposon systems. Exemplary Class I transposon systems include, without limitation, CRE, R2, R4, L1, RTE, Tad, R1, LOA, I, Jockey, CR1 polypeptides. See e.g., Proc Natl Acad Sci USA. 2006 Nov. 21; 103(47):17602-7; Eickbush T H et al, Integration, Regulation, and Long-Term Stability of R2 Retrotransposons, Microbiol Spectr. 2015 April; 3(2): MDNA3-0011-2014. doi: 10.1128/microbiolspec.MDNA3-0011-2014; Han J S, Non-long terminal repeat (non-LTR) retrotransposons: mechanisms, recent developments, and unanswered questions, Mob DNA. 2010 May 12; 1(1):15. doi: 10.1186/1759-8753-1-15; Malik H S et al., The age and evolution of non-LTR retrotransposable elements, Mol Biol Evol. 1999 June; 16(6):793-805, which are incorporated by reference herein in their entireties.

Suitable Class II transposon systems include any of those in, without limitation, the following transposon systems: Sleeping Beauty transposon system (Tc1/mariner superfamily) (see e.g., Ivics et al. 1997. Cell. 91(4): 501-510), piggyBac (piggyBac superfamily) (see e.g., Li et al. 2013 110(25): E2279-E2287 and Yusa et al. 2011. PNAS. 108(4): 1531-1536), Tol2 (superfamily hAT), Frog Prince (Tc1/mariner superfamily) (see e.g., Miskey et al. 2003 Nucleic Acid Res. 31(23):6873-6881) and variants thereof. In some embodiments, the Class II transposon system is a DD[E/D] transposon or transposon polypeptide. In some embodiments, the Class II transposon system is a Tc1/mariner, PiggyBac, Frog Prince, Tn3, Tn5, hAT, CACTA, P, Mutator, PIF/Harbinger, Transib, or a Merlin/IS1016 transposon polypeptide.

Suitable Class II transposon systems and components that can be utilized in the context of the present invention include and are not limited to those described in e.g., Han et al., 2013. BMC Genomics. 14:71, doi: 10.1186/1471-2164-14-71, Lopez and Garcia-Perez. 2010. Curr. Genomics. 11(2): 115-128; Wessler. 2006. PNAS. 103(47): 176000-17601; Gao et al., 2017. Marine Genomics. 34:67-77; Bradic et al. 2014. Mobile DNA. 5(12) doi:10.1186/1759-8753-5-12; Li et al., 2013. PNAS. 110(25)E2279-E2287; Kebriaei et al. 2017. Trends in Genetics. 33(11): 852-870; Miskey et al. 2003. Nucleic Acid res. 31(23):6873-6881; Nicolas et al. 2015. Microbiol Spectr. 3(4) doi: 10.1128/microbiolspec.MDNA3-0060-2014; W. S. Reznikoff. 1993. Annu Rev. Microbiol. 47:945-963; Rubin et al. 2001. Genetics. 158(3): 949-957; Wicker et al. 2003. Plant Physiol. 132(1): 52-63; Majumdar and Rio. 2015. Microbiol. Spectr. 3(2) doi: 10.1 128/microbiolspec.MDNA3-0004-2014; D. Lisch. 2002. Trends in Plant Sci. 7(11): 498-504; Sinzelle et al. 2007. PNAS. 105(12): 4715-4720; Han et al. 2014; Genome Biol. Evol. 6(7):1748-1757; Grzebelus et al. 2006; Mol. Genet. Genomics. 275(5):450-459; Zhang et al. 2004. Genetics. 166(2):971-986; Chen and Li. 2008. Gene. 408 (1-2):51-63; and C. Feschotte. 2004. Mol. Biol. Evol. 21(9): 1769-1780.

Recombinase Systems

In some embodiments, the genetic modification system to modify a genome is a recombinase system. Generally, recombinases are enzymes that catalyze site-specific recombination events, and recombination systems employ such enzymes to achieve site-specific polynucleotide integration or disruption. Many recombinase systems for gene knock-in, gene knock-out, and other genome or polynucleotide modifications are generally known in the art since their introduction several decades ago (see e.g., Sauer, B. Mol Cell Biol 7(6):2087-2096 (1987)) and can be used in the context of the present disclosure to introduce a transgene of the present disclosure and/or one or more components of another genetic modifying system described herein and/or generally known to a genome of a cell or another polynucleotide. Exemplary systems include without limitations, Cre-lox and FLP-FRT systems (see e.g., Maizels et al., J. Immunol. 2013. 161(1): doi:10.4049/jimmunol.1301241; Graham et al., Biotech J. 2009. 4(1):108-118; Chen et al. Animal. 4(5):767-771 (2010); Kalds et al. Front. Genet. 2019, doi.org/10.3389/fgene.2019.00750; Gurusinghe et al., J Cell Biochem. 2017. 118(5):1201-1215; and Wang et al., Plant Cell Rep (2011) 30:267-285), which are each incorporated by reference as if expressed in their entirety and can be adapted for use with the present disclosure.

Delivery of Polynucleotides and Polypeptides

The genetic modification system or component thereof (including any polynucleotides, polypeptides (or complexes thereof), vectors, vector systems, and/or the like) can be delivered to a cell or cell population, such as that to be modified, using any suitable delivery composition, system or technique. Exemplary delivery compositions, systems, and/or techniques are described below and elsewhere herein.

Physical Delivery

In some embodiments, the genetic modifying system or component thereof, may be introduced to cells by physical delivery methods. Examples of physical methods include microinjection, electroporation, and hydrodynamic delivery. Both nucleic acid and proteins may be delivered using such methods. For example, Cas protein may be prepared in vitro, isolated, (refolded and purified if needed), and introduced to cells by a physical delivery method or technique.

Microinjection

Microinjection of the genetic modifying system or component thereof directly to cells can achieve high efficiency, e.g., above 90% or about 100%. In some embodiments, microinjection may be performed using a microscope and a needle (e.g., with 0.5-5.0 m in diameter) to pierce a cell membrane and deliver the cargo directly to a target site within the cell. Microinjection may be used for in vitro and ex vivo delivery.

Plasmids comprising coding sequences for Cas or other genetic modifying system effector proteins and/or any associated polynucleotides (e.g., guide RNAs, mRNAs, and/or guide RNAs), may be microinjected. In some cases, microinjection may be used i) to deliver DNA directly to a cell nucleus, and/or ii) to deliver mRNA (e.g., in vitro transcribed) to a cell nucleus or cytoplasm. In certain examples, microinjection may be used to delivery sgRNA directly to the nucleus and Cas or other effector protein-encoding mRNA to the cytoplasm, e.g., facilitating translation and shuttling of Cas or other effector protein to the cell nucleus.

Microinjection may be used to generate genetically modified animals. For example, gene modification systems or components thereof may be injected into zygotes, blastomeres, blastocysts, embryonic stem cells, pluripotent stem cells, induced pluripotent stem cells, primordial germ cells, primordial germ cell like-cells, and/or the like to allow for gene medication, such as germline modification.

Microinjection has been used to deliver nucleic acids, polypeptides, and complexes to fish cells. See e.g., Shirakashi et al., Biomicrofluidics. 2015 November; 9(6): 064109; Porazinski et al., J Vis Exp. 2010; (46): 1937; Schubert et al., Environmental Sciences Europe volume 26, Article number: 32 (2014); Zhu and Sun et al., Cell Research volume 10, pages 17-27 (2000); Hartmann and Englert. 2012. Developmental Dynamics 241:1133-1141; Dunham R. A., Elaswad A., Qin Z. (2018) Gene Editing in Channel Catfish via Double Electroporation of Zinc-Finger Nucleases. In: Liu J. (eds) Zinc Finger Proteins. Methods in Molecular Biology, vol 1867. Humana Press, New York, NY. https://doi.org/10.1007/978-1-4939-8799-3_15 (pp. 201-214); and Elaswad et al., 2018. Genetics. doi: 10.3791/56275, which are incorporated by reference herein as if expressed in their entireties and can be adapted for use with the present disclosure.

Electroporation

In some embodiments, the cargos and/or delivery vehicles may be delivered by electroporation. Electroporation may use pulsed high-voltage electrical currents to transiently open nanometer-sized pores within the cellular membrane of cells suspended in buffer, allowing for components with hydrodynamic diameters of tens of nanometers to flow into the cell. In some cases, electroporation may be used on various cell types and efficiently transfer cargo into cells. Electroporation may be used for in vitro and ex vivo delivery.

Electroporation has been used to deliver exogenous polynucleotides and/or polypeptides to fish cells. Such approaches include those described in e.g., Powers et al., Mol Mar Biol Biotechnol. August-October 1992; 1(4-5): 301-8; Dunham et al., Methods Mol Biol. 2018; 1867:201-214. doi: 10.1007/978-1-4939-8799-3_15; Inoue et al., Cell Diff. Devel. 1990. 29(2):123-128; and Bates. "Production of Transgenic Channel Catfish." (1997). LSU Historical Dissertations and Theses. 6465, which are incorporated by reference as if expressed herein in their entireties and can be adapted for use with the present description.

Electroporation has been used to deliver nucleic acids and proteins to into the nuclei of mammalian cells by applying specific voltage and reagents, e.g., by nucleofection. Such approaches include those described in Wu Y, et al. (2015). Cell Res 25:67-79; Ye L, et al. (2014). Proc Natl Acad Sci USA 111:9591-6; Choi P S, Meyerson M. (2014). Nat Commun 5:3728; Wang J, Quake S R. (2014). Proc Natl Acad Sci 111:13157-62. Electroporation may also be used to deliver the cargo in vivo, e.g., with methods described in Zuckermann M, et al. (2015). Nat Commun 6:7391, which can be adapted for use with the present disclosure.

Electroporation has been used to deliver exogenous polynucleotides and/or polypeptides to bovine zygotes. See e.g., Lin and Van Eenennaam. Front Genet. 2021; 12: 648482, doi.org/10.3389/fgene.2021.648482, particularly at supplementary table 1. In some embodiments, the voltage and number of pulses for delivery of an exogenous polynucleotide to a bovine cell, such as a zygote or blastocyst, via electroporation is 10-20 V/mm and 2-6 pulses, 10-20V/mm and 2-3 pulses, 15-20V/mm and 2-3 pulses, 15V/mm and 6 pulses See e.g., Tanihara, F., Hirata, M., Morikawa, S., Nguyen, N. T., Le, Q. A., Hirano, T., et al. (2019). The effects of electroporation on viability and quality of in vivo-derived bovine blastocysts. J. Reprod. Dev. 65, 475-479. doi: 10.1262/jrd.2019-049; Namula, Z., Wittayarat, M., Hirata, M., Hirano, T., Nguyen, N. T., Le, Q. A., et al. (2019). Genome mutation after the introduction of the gene editing by electroporation of Cas9 protein (GEEP) system into bovine putative zygotes. In Vitro Cell. Dev. An. 55, 598-603; Miao, D., Giassetti, M. I., Ciccarelli, M., Lopez-Biladeau, B., and Oatley, J. M. (2019). Simplified pipelines for genetic engineering of mammalian embryos by CRISPR-Cas9 electroporation dagger. Biol. Reprod. 101, 177-187; Ciccarelli, M., Giassetti, M. I., Miao, D., Oatley, M. J., Robbins, C., Lopez-Biladeau, B., et al. (2020). Donor-derived spermatogenesis following stem cell transplantation in sterile NANOS2 knockout males. Proc. Natl. Acad. Sci. U.S.A 117, 24195-24204; Camargo, L. S. A., Owen, J. R., Van Eenennaam, A. L., and Ross, P. J. (2020). Efficient one-step knockout by electroporation of ribonucleoproteins into zona-intact bovine embryos. Front. Genet. 11:570069; and Wei, J., Gaynor, P., Cole, S., Brophy, B., Oback, B., and Laible, G. (2018). "Developing the laboratory conditions for bovine zygote-mediated genome editing by electroporation" in Proceedings of the World Congress on Genetics Applied to Livestock Production, which are incorporated by reference herein and can be adapted for use with the present disclosure.

Hydrodynamic Delivery

Hydrodynamic delivery can also be used for delivering the gene modification system, e.g., for in vivo delivery. In some examples, hydrodynamic delivery may be performed by rapidly pushing a large volume (8-10% body weight) solution containing the gene modification system into the bloodstream of a subject (e.g., a fish). As blood is incompressible, the large bolus of liquid may result in an increase in hydrodynamic pressure that temporarily enhances permeability into endothelial and parenchymal cells, allowing for cargo not normally capable of crossing a cellular membrane to pass into cells. This approach may be used for delivering naked DNA plasmids and proteins.

Transfection

Nucleic acids and/or polypeptides, can be introduced to cells by transfection methods for introducing nucleic acids into cells. Examples of transfection methods include calcium phosphate-mediated transfection, cationic transfection, liposome transfection, dendrimer transfection, heat shock transfection, magnetofection, lipofection, impalefection, optical transfection, proprietary agent-enhanced uptake of nucleic acid. Nucleic acids and vectors and vector systems that can encode a genetic modifying system and/or components thereof are described in greater detail else wherein herein. Transfection has been used to deliver nucleic acid constructs to bovine cells. See e.g., Tajik et al., Iran J Vet Res. 2017 Spring; 18(2): 113-118; Jafarnejad et al., S African J Anim Sci, Vol. 48 No. 1 (2018) DOI: 10.4314/sajas.v48i1.13; Duarte et al., Anim Biotechnol. 2020 Dec. 30; 1-11. doi: 10.1080/10495398.2020.1862137; and Osorio Gene. 2017 Aug. 30; 626:200-208, which are incorporated by reference as if expressed in their entireties herein and can be adapted for use with the present disclosure.

Transduction

The genetic modifying systems and/or components thereof, e.g., nucleic acids and/or polypeptides, can be introduced to cells by transduction by a viral, pseudoviral, and/or virus like particle. Methods of packaging the genetic modifying systems and/or components thereof in viral particles can be accomplished using any suitable viral vector or vector systems. Such viral vector and vector systems are described in greater detail elsewhere herein. As used in this context herein "transduction" refers to the process by which foreign nucleic acids and/or proteins are introduced to a cell (prokaryote or eukaryote) by a viral, pseudoviral, and/or virus like particle. After packaging in a viral, pseudoviral, and/or virus like particle, the viral particles can be exposed to cells (e.g., in vitro, ex vivo, or in vivo) where the viral, pseudoviral, and/or virus like particle infects the cell and delivers the cargo to the cell via transduction. Viral, pseudoviral, and/or virus like particles can be optionally concentrated prior to exposure to target cells. In some embodiments, the virus titer of a composition containing viral and/or pseudoviral particles can be obtained and a specific titer be used to transduce cells. Viral vectors and systems and generation of viral (or pseudoviral, and/or virus like particle) delivery particles is described in greater detail elsewhere herein. Viral transduction has been used to deliver exogenous nucleic acid constructs to fish cells. See e.g., Liu et al., PLoS One. 2015; 10(6): e0127961; Leisy et al., J Gen Virol. 2003. 84:1173-1178; Huang et al., 2011. Journal of Virological Methods 173(2):294-9; and Kurita et al., 2004. PNAS. 101(5):1263-1267; which are incorporated by reference as if expressed in their entireties herein and can be adapted for use with the present disclosure.

Biolistics

The genetic modifying systems and/or components thereof, e.g., nucleic acids and/or polypeptides, can be introduced to cells using a biolistic method or technique. The term of art "biolistic", as used herein refers to the delivery of nucleic acids to cells by high-speed particle bombardment. In some embodiments, the genetic modifying systems and/or components thereof can be attached, associated with, or otherwise coupled to particles, which than can be delivered to the cell via a gene-gun (see e.g., Liang et al. 2018. Nat. Protocol. 13:413-430; Svitashev et al. 2016. Nat. Comm. 7:13274; Ortega-Escalante et al., 2019. Plant. J. 97:661-672). Gene gun has been used to deliver nucleic acids and/or polypeptides to fish cells. See e.g., Lee et al., Mar Biotechnol (NY). 2000 May; 2(3):254-258. doi: 10.1007/s101269900030; Gomez-Chiarri et al., 1996. Diseases of Aquatic Organisms. 27(1):5-12; and Torgersen et al., 2000. Marine Biotechnol. 2(3):293-300, which are incorporated by reference as if expressed in their entireties herein and can be adapted for use with the present disclosure. In some embodiments, the particles can be gold, tungsten, palladium, rhodium, platinum, or iridium particles.

Implantable Devices

In some embodiments, the delivery system can include an implantable device that incorporates or is coated with a genetic modifying systems and/or components thereof described herein. Various implantable devices are described in the art, and include any device, graft, or other composition that can be implanted into a subject, such as a fish.

Delivery Vehicles

Polynucleotides and/or polypeptides of the present disclosure, such as a genetic modifying system, can be delivered (e.g., to a target cell to be modified) via one or more delivery vehicles. The delivery vehicles can deliver a cargo, such as a polynucleotide or polypeptide of the present disclosure (such as a genetic modifying system), into cells, tissues, organs, or organisms (e.g., animals or plants). In some embodiments, delivery vehicles are sued to deliver a cargo, such as a genetic modifying system or component thereof or other polynucleotide or polypeptide of the present disclosure to a target fish cell. The cargos may be packaged, carried, or otherwise associated with the delivery vehicles. The delivery vehicles may be selected based on the types of cargo to be delivered, and/or the delivery is in vitro and/or in vivo. Examples of delivery vehicles include vectors, viruses (e.g., virus particles, pseudoviral particles, or virus like particles), non-viral vehicles (e.g., exosomes, liposomes, etc.), and other delivery reagents described herein and those appreciated by one of ordinary skill in the art in view of the present disclosure.

The delivery vehicles described herein can have a greatest dimension or greatest average dimension (e.g., diameter or greatest average diameter) of less than 100 microns (μm). In some embodiments, the delivery vehicles have a greatest dimension or greatest average dimension of less than 10 μm. In some embodiments, the delivery vehicles may have a greatest dimension or greatest average dimension of less than 2000 nanometers (nm). In some embodiments, the delivery vehicles may have a greatest dimension or greatest average dimension of less than 1000 nanometers (nm). In some embodiments, the delivery vehicles may have a greatest dimension or greatest average dimension (e.g., diameter or average diameter) of less than 900 nm, less than 800 nm, less than 700 nm, less than 600 nm, less than 500 nm, less than 400 nm, less than 300 nm, less than 200 nm, less than 150 nm, or less than 100 nm, less than 50 nm. In some embodiments, the delivery vehicles may have a greatest dimension or greatest average dimension ranging between 25 nm and 200 nm.

Particles

In some embodiments, the delivery vehicles may be or comprise particles. For example, the delivery vehicle may be or comprise nanoparticles (e.g., particles with a greatest dimension or greatest average dimension (e.g., diameter or greatest average diameter) no greater than 1000 nm. The particles may be provided in different forms, e.g., as solid particles (e.g., metal such as silver, gold, iron, titanium), non-metal, lipid-based solids, polymers), suspensions of particles, or combinations thereof. Metal, dielectric, and semiconductor particles may be prepared, as well as hybrid structures (e.g., core-shell particles).

Nanoparticles may also be used to deliver the compositions and systems to cells, as described in US20130185823, WO2008042156, and WO2015089419. In general, a "nanoparticle" refers to any particle having a diameter of less than 1000 nm. In certain embodiments, nanoparticles of the invention have a greatest dimension or greatest average dimension (e.g., diameter or average diameter) of 500 nm or less. In other embodiments, nanoparticles of the invention have a greatest dimension or greatest average dimension ranging between 25 nm and 200 nm. In other embodiments, nanoparticles of the invention have a greatest dimension or greatest average dimension of 100 nm or less. In other embodiments, nanoparticles of the invention have a greatest dimension or greatest average dimensions ranging between 35 nm and 60 nm. It will be appreciated that reference made herein to particles or nanoparticles can be interchangeable, where appropriate. Nanoparticles made of semiconducting material may also be labeled quantum dots if they are small enough (typically sub 10 nm) that quantization of electronic energy levels occurs. Such nanoscale particles are used in biomedical applications as drug carriers or imaging agents and may be adapted for similar purposes in the present invention. Semi-solid and soft nanoparticles have been manufactured and are within the scope of the present invention. Nanoparticles with one half hydrophilic and the other half hydrophobic are termed Janus particles and are particularly effective for stabilizing emulsions. They can self-assemble at water/oil interfaces and act as solid surfactants.

Particle characterization (including e.g., characterizing morphology, dimension, etc.) is done using a variety of different techniques. Common techniques are electron microscopy (TEM, SEM), atomic force microscopy (AFM), dynamic light scattering (DLS), X-ray photoelectron spectroscopy (XPS), powder X-ray diffraction (XRD), Fourier transform infrared spectroscopy (FTIR), matrix-assisted laser desorption/ionization time-of-flight mass spectrometry (MALDI-TOF), ultraviolet-visible spectroscopy, dual polarization interferometry and nuclear magnetic resonance (NMR). Characterization (dimension measurements) may be made as to native particles (i.e., preloading) or after loading of the cargo (e.g., one or more components of a genetic modifying system (e.g., a CRISPR-Cas system or component(s) thereof) and can include additional carriers and/or excipients) to provide particles of an optimal size for delivery for any in vitro, ex vivo and/or in vivo application of the present disclosure. In some embodiments, particle dimension (e.g., diameter) characterization is based on measurements using dynamic laser scattering (DLS). See also e.g., U.S. Pat. Nos. 8,709,843; 6,007,845; 5,855,913; 5,985, 309; 5,543,158; and Dahlman et al. Nature Nanotechnology (2014), doi:10.1038/nnano.2014.84, describes particles, methods of making and using them, and measurements thereof which can be adapted for use with the present disclosure.

Vectors and Vector Systems

In some embodiments the delivery vehicle is a vector or vector system or particle, such as a virus or viral like particle, produced from such a vector or vector system. As such, also provided herein are vectors that can contain one or more of the genetic modifying system polynucleotides described herein. In certain embodiments, the vector can contain one or more polynucleotides encoding one or more elements of a genetic modifying system described herein. The vectors can be useful in producing bacterial, fungal, yeast, plant cells, animal cells, and transgenic animals that can express one or more components of the genetic modifying system described herein, and as such, contain a genetic modification or be rendered capable of producing particles (e.g., viral or viral like particles) that can be used to deliver a genetic modifying system described herein to a cell, such as a fish cell.

Within the scope of this disclosure are vectors containing one or more of the polynucleotide sequences described herein, such as those relevant to introducing a modification to myostatin and/or mc4-r and/or introducing an exogenous gene. One or more of the polynucleotides that are part of a genetic modifying system can be included in a vector or vector system. The vectors and/or vector systems can be used, for example, to express one or more of the polynucleotides in a cell, such as a producer cell, to produce a genetic modifying system containing virus particles described elsewhere herein. Other uses for the vectors and vector systems described herein are also within the scope of this disclosure. In general, and throughout this specification, the term "vector" refers to a tool that allows or facilitates the transfer of an entity from one environment to another. In some contexts which will be appreciated by those of ordinary skill in the art, "vector" can be a term of art to refer to a nucleic acid molecule capable of transporting another nucleic acid to which it has been linked. A vector can be a replicon, such as a plasmid, phage, or cosmid, into which another DNA segment may be inserted so as to bring about the replication of the inserted segment. Generally, a vector is capable of replication when associated with the proper control elements.

Vectors include, but are not limited to, nucleic acid molecules that are single-stranded, double-stranded, or partially double-stranded; nucleic acid molecules that comprise one or more free ends, no free ends (e.g., circular); nucleic acid molecules that comprise DNA, RNA, or both; and other varieties of polynucleotides known in the art. One type of vector is a "plasmid," which refers to a circular double stranded DNA loop into which additional DNA segments can be inserted, such as by standard molecular cloning techniques. Another type of vector is a viral vector, wherein virally-derived DNA or RNA sequences are present in the vector for packaging into a virus (e.g., retroviruses, replication defective retroviruses, adenoviruses, replication defective adenoviruses, and adeno-associated viruses (AAVs)). Viral vectors also include polynucleotides carried by a virus for transfection into a host cell. Certain vectors are capable of autonomous replication in a host cell into which they are introduced (e.g., bacterial vectors having a bacterial origin of replication and episomal mammalian vectors). Other vectors (e.g., non-episomal mammalian vectors) are integrated into the genome of a host cell upon introduction into the host cell, and thereby are replicated along with the host genome. Moreover, certain vectors are capable of directing the expression of genes to which they are operatively-linked. Such vectors are referred to herein as "expression vectors." Common expression vectors of utility in recombinant DNA techniques are often in the form of plasmids.

Recombinant expression vectors can be composed of a nucleic acid (e.g., a polynucleotide) of the invention in a form suitable for expression of the nucleic acid in a host cell, which means that the recombinant expression vectors include one or more regulatory elements, which can be selected on the basis of the host cells to be used for expression, that is operatively-linked to the nucleic acid sequence to be expressed. Within a recombinant expression vector, "operably linked" and "operatively-linked" are used interchangeably herein and mean that the nucleotide sequence of interest is linked to the regulatory element(s) in a manner that allows for expression of the nucleotide sequence (e.g., in an in vitro transcription/translation system or in a host cell when the vector is introduced into the host cell). Advantageous vectors include lentiviruses and adeno-associated viruses, and types of such vectors can also be selected for targeting particular types of cells. These and other embodiments of the vectors and vector systems are described elsewhere herein.

In some embodiments, the vector can be a bicistronic vector. In some embodiments, a bicistronic vector can be used for one or more elements of the genetic modifying system described herein. In some embodiments, expression of elements of the genetic modifying system described herein can be driven by the CBh promoter or other ubiquitous promoter. Where the element of the genetic modifying system is an RNA, its expression can be driven by a Pol III promoter, such as a U6 promoter. In some embodiments, the two are combined.

Cell-based Vector Amplification and Expression

Vectors may be introduced and propagated in a prokaryotic cell or eukaryotic cell. In some embodiments, a prokaryote is used to amplify copies of a vector to be introduced into a eukaryotic cell or as an intermediate vector in the production of a vector to be introduced into a eukaryotic cell (e.g., amplifying a plasmid as part of a viral vector packaging system). The vectors can be viral-based or non-viral based. In some embodiments, a prokaryote is used to amplify copies of a vector and express one or more nucleic acids, such as to provide a source of one or more proteins for delivery to a host cell or host organism.

Vectors can be designed for expression of one or more elements of the genetic modifying system described herein (e.g., nucleic acid transcripts, proteins, enzymes, and combinations thereof) in a suitable host cell. In some embodiments, the suitable host cell is a prokaryotic cell. Suitable host cells include, but are not limited to, bacterial cells, yeast cells, insect cells, and mammalian cells. In some embodiments, the suitable host cell is a eukaryotic cell. In some embodiments the host cell is a cell to be modified by a genetic modifying system. In some embodiments the host cell is a producer cell capable of producing particles (e.g., virus particles, virus like particles, exosomes, and/or the like) that can be used to deliver a genetic modifying system or component thereof to a cell.

In some embodiments, the suitable host cell is a suitable bacterial cell. Suitable bacterial cells include but are not limited to bacterial cells from the bacteria of the species *Escherichia coli*. Many suitable strains of *E. coli* are known in the art for expression of vectors. These include, but are not limited to Pir1, Stbl2, Stbl3, Stbl4, TOP10, XL1 Blue, and XL10 Gold. In some embodiments, the host cell is a suitable insect cell. Suitable insect cells include those from *Spodoptera frugiperda*. Suitable strains of *S. frugiperda* cells include, but are not limited to, Sf9 and Sf21. In some embodiments, the host cell is a suitable yeast cell. In some embodiments, the yeast cell can be from *Saccharomyces cerevisiae*. In some embodiments, the host cell is a suitable mammalian cell. Many types of mammalian cells have been developed to express vectors. Suitable mammalian cells include, but are not limited to, HEK293, Chinese Hamster Ovary Cells (CHOs), mouse myeloma cells, HeLa, U20S, A549, HT1080, CAD, P19, NIH 3T3, L929, N2a, MCF-7, Y79, SO-Rb50, HepG G2, DIKX-X11, J558 L, Baby hamster kidney cells (BHK), and chicken embryo fibroblasts (CEFs). Suitable host cells are discussed further in Goeddel, GENE EXPRESSION TECHNOLOGY: METHODS IN ENZYMOLOGY 185, Academic Press, San Diego, Calif (1990). In some embodiments, the suitable host cell is a fish cell, more particularly a catfish cell, including but not limited to, fish embryonic stem cells, fish induced pluripotent stem cells, fish blastocyst cells, fish zygotes, or other fish cells described elsewhere herein.

In some embodiments, the vector can be a yeast expression vector. Examples of vectors for expression in yeast *Saccharomyces cerevisiae* include pYepSec1 (Baldari, et al., 1987. EMBO J. 6: 229-234), pMFa (Kuijan and Herskowitz, 1982. Cell 30: 933-943), pJRY88 (Schultz et al., 1987. Gene 54: 113-123), pYES2 (Invitrogen Corporation, San Diego, Calif.), and picZ (InVitrogen Corp, San Diego, Calif.). As used herein, a "yeast expression vector" refers to a nucleic acid that contains one or more sequences encoding an RNA and/or polypeptide and may further contain any desired elements that control the expression of the nucleic acid(s), as well as any elements that enable the replication and maintenance of the expression vector inside the yeast cell. Many suitable yeast expression vectors and features thereof are known in the art; for example, various vectors and techniques are illustrated in Yeast Protocols, 2nd edition, Xiao, W., ed. (Humana Press, New York, 2007) and Buckholz, R. G. and Gleeson, M. A. (1991) Biotechnology (NY) 9(11): 1067-72. Yeast vectors can contain, without limitation, a centromeric (CEN) sequence, an autonomous replication sequence (ARS), a promoter, such as an RNA Polymerase III promoter, operably linked to a sequence or gene of interest, a terminator such as an RNA polymerase III terminator, an origin of replication, and a marker gene (e.g., auxotrophic, antibiotic, or other selectable markers). Examples of expression vectors for use in yeast may include plasmids, yeast artificial chromosomes, 2μ plasmids, yeast integrative plasmids, yeast replicative plasmids, shuttle vectors, and episomal plasmids.

In some embodiments, the vector is a baculovirus vector or expression vector and can be suitable for expression of polynucleotides and/or proteins in insect cells. In some embodiments, the suitable host cell is an insect cell. Baculovirus vectors available for expression of proteins in cultured insect cells (e.g., SF9 cells) include the pAc series (Smith, et al., 1983. Mol. Cell. Biol. 3: 2156-2165) and the pVL series (Lucklow and Summers, 1989. Virology 170: 31-39). rAAV (recombinant Adeno-associated viral) vectors are preferably produced in insect cells, e.g., *Spodoptera frugiperda* Sf9 insect cells, grown in serum-free suspension culture. Serum-free insect cells can be purchased from commercial vendors, e.g., Sigma Aldrich (EX-CELL 405). Baculoviral vectors have been used to introduce transgenes to fish. See e.g., Huang et al., 2011. J Virol Methods. 2011 May; 173(2):294-9. doi: 10.1016/j.jviromet.2011.02.022 and Wang et al., Int J Mol Sci. 2018 Nov. 27; 19(12):3767. doi: 10.3390/ijms19123767, which are incorporated by reference as if expressed in their entireties herein and can be adapted for use with the present disclosure.

In some embodiments, the vector is a mammalian expression vector. In some embodiments, the mammalian expression vector is capable of expressing one or more polynucleotides and/or polypeptides in a mammalian cell. Examples of mammalian expression vectors include, but are not limited to, pCDM8 (Seed, 1987. Nature 329: 840) and pMT2PC (Kaufman, et al., 1987. EMBO J. 6: 187-195). The mammalian expression vector can include one or more suitable regulatory elements capable of controlling expression of the one or more polynucleotides and/or proteins in the mammalian cell. For example, commonly used promoters are derived from polyoma, adenovirus 2, cytomegalovirus, simian virus 40, and others disclosed herein and known in the art. More detail on suitable regulatory elements is provided elsewhere herein.

For other suitable expression vectors and vector systems for both prokaryotic and eukaryotic cells see, e.g., Chapters 16 and 17 of Sambrook, et al., MOLECULAR CLONING: A LABORATORY MANUAL. 2nd ed., Cold Spring Harbor Laboratory, Cold Spring Harbor Laboratory Press, Cold Spring Harbor, N.Y., 1989.

In some embodiments, the vector can be a fusion vector or fusion expression vector. In some embodiments, fusion vectors add a number of amino acids to a protein encoded therein, such as to the amino terminus, carboxy terminus, or both of a recombinant protein. Such fusion vectors can serve one or more purposes, such as: (i) to increase expression of recombinant protein; (ii) to increase the solubility of the recombinant protein; and (iii) to aid in the purification of the recombinant protein by acting as a ligand in affinity purification. In some embodiments, expression of polynucleotides (such as non-coding polynucleotides) and proteins in prokaryotes can be carried out in *Escherichia coli* with vectors containing constitutive or inducible promoters directing the expression of either fusion or non-fusion polynucleotides and/or proteins. In some embodiments, the fusion expression vector can include a proteolytic cleavage site, which can be introduced at the junction of the fusion vector backbone or other fusion moiety and the recombinant polynucleotide or protein to enable separation of the recombinant polynucleotide or protein from the fusion vector backbone or other fusion moiety subsequent to purification of the fusion polynucleotide or protein. Such enzymes, and their cognate recognition sequences, include Factor Xa, thrombin and enterokinase. Example fusion expression vectors include pGEX (Pharmacia Biotech Inc; Smith and Johnson, 1988. Gene 67: 31-40), pMAL (New England Biolabs, Beverly, Mass.) and pRIT5 (Pharmacia, Piscataway, N.J.) that fuse glutathione S-transferase (GST), maltose E binding protein, or protein A, respectively, to the target recombinant protein. Examples of suitable inducible non-fusion *E. coli* expression vectors include pTrc (Amrann et al., (1988) Gene 69:301-315) and pET lid (Studier et al., GENE EXPRESSION TECHNOLOGY: METHODS IN ENZYMOLOGY 185, Academic Press, San Diego, Calif. (1990) 60-89).

In some embodiments, one or more vectors driving expression of one or more elements of a genetic modifying system described herein are introduced into a host cell such that expression of the elements of the delivery system described herein direct formation of a genetic modifying system complex (e.g., a CRISPR-Cas complex) at one or more target sites at on a target polynucleotide, such as in a target cell or target cell genome. For example, a CRISPR-Cas effector protein describe herein and a nucleic acid component (e.g., a guide polynucleotide) can each be operably linked to separate regulatory elements on separate vectors. RNA(s) of different elements of a genetic modifying (e.g., CRISPR-Cas) system can be delivered to an animal, plant, microorganism or cell thereof to produce an animal (e.g., as a fish, particularly a catfish), that constitutively, inducibly, or conditionally expresses different elements of the genetic modifying (e.g., CRISPR-Cas) system described herein that incorporates one or more elements of the genetic modifying system (e.g., a CRISPR-Cas system) described herein or contains one or more cells that incorporates and/or expresses one or more elements of the genetic modifying (e.g., CRISPR-Cas) system described herein.

Cell-Free Vector and Polynucleotide Expression

In some embodiments, the polynucleotide encoding one or more features of the genetic modifying system or other polynucleotide described herein can be expressed from a vector or suitable polynucleotide in a cell-free in vitro system. In other words, the polynucleotide can be transcribed and optionally translated in vitro. In vitro transcription/translation systems and appropriate vectors are generally known in the art and commercially available. Generally, in vitro transcription and in vitro translation systems replicate the processes of RNA and protein synthesis, respectively, outside of the cellular environment. Vectors and suitable polynucleotides for in vitro transcription can include T7, SP6, T3, promoter regulatory sequences that can be recognized and acted upon by an appropriate polymerase to transcribe the polynucleotide or vector.

In vitro translation can be stand-alone (e.g., translation of a purified polyribonucleotide) or linked/coupled to transcription. In some embodiments, the cell-free (or in vitro) translation system can include extracts from rabbit reticulocytes, wheat germ, and/or *E. coli*. The extracts can include various macromolecular components that are needed for translation of exogenous RNA (e.g., 70S or 80S ribosomes, tRNAs, aminoacyl-tRNA, synthetases, initiation, elongation factors, termination factors, etc.). Other components can be included or added during the translation reaction, including but not limited to, amino acids, energy sources (ATP, GTP), energy regenerating systems (creatine phosphate and creatine phosphokinase (eukaryotic systems)) (phosphoenolpyruvate and pyruvate kinase for bacterial systems), and other co-factors ($Mg^{2+}$, $K^+$, etc.). As previously mentioned, in vitro translation can be based on RNA or DNA starting material. Some translation systems can utilize an RNA template as starting material (e.g., reticulocyte lysates and wheat germ extracts). Some translation systems can utilize a DNA template as a starting material (e.g., *E coli*-based systems). In these systems transcription and translation are coupled and DNA is first transcribed into RNA, which is subsequently translated. Suitable standard and coupled cell-free translation systems are generally known in the art and are commercially available.

Vector Features

The vectors can include additional features that can confer one or more functionalities to the vector, the polynucleotide to be delivered, a virus or other particle (e.g., viral like particle or exosome) produced there from, or polypeptide expressed thereof. Such features include, but are not limited to, regulatory elements, selectable markers, molecular identifiers (e.g., molecular barcodes), stabilizing elements, and the like. It will be appreciated by those skilled in the art that the design of the expression vector and additional features included can depend on such factors as the choice of the host cell to be transformed, the level of expression desired, etc.

Regulatory Elements

In certain embodiments, the polynucleotides and/or vectors thereof described herein (such as the genetic modifying system polynucleotides described herein) can include one or more regulatory elements that can be operatively linked to the polynucleotide. The term "regulatory element" is intended to include promoters, enhancers, internal ribosomal entry sites (IRES), other expression control elements (e.g., transcription termination signals, such as polyadenylation signals and poly-U sequences) and cellular localization signals (e.g., nuclear localization or export signals). Such regulatory elements are described, for example, in Goeddel, GENE EXPRESSION TECHNOLOGY: METHODS IN ENZYMOLOGY 185, Academic Press, San Diego, Calif. (1990). Regulatory elements include those that direct constitutive expression of a nucleotide sequence in many types of host cell and those that direct expression of the nucleotide sequence only in certain host cells (e.g., tissue-specific regulatory sequences). A tissue-specific promoter can direct expression primarily in a desired tissue of interest, such as muscle, neuron, bone, skin, blood, specific organs (e.g., liver, pancreas), or particular cell types (e.g., lymphocytes). Regulatory elements may also direct expression in a temporal-dependent manner, such as in a cell-cycle dependent or developmental stage-dependent manner, which may or may not also be tissue or cell-type specific. In some embodiments, a vector comprises one or more pol III promoter (e.g., 1, 2, 3, 4, 5, or more pol III promoters), one or more pol II promoters (e.g., 1, 2, 3, 4, 5, or more pol II promoters), one or more pol I promoters (e.g., 1, 2, 3, 4, 5, or more pol I promoters), or combinations thereof. Examples of pol III promoters include, but are not limited to, U6 and H1 promoters. Examples of pol II promoters include, but are not limited to, the retroviral Rous sarcoma virus (RSV) LTR promoter (optionally with the RSV enhancer), the cytomegalovirus (CMV) promoter (optionally with the CMV enhancer) (see, e.g., Boshart et al, Cell, 41:521-530 (1985)), the SV40 promoter, the dihydrofolate reductase promoter, the β-actin promoter, the phosphoglycerol kinase (PGK) promoter, and the EF1α promoter. Also encompassed by the term "regulatory element" are enhancer elements, such as WPRE; CMV enhancers; the R-U5' segment in LTR of HTLV-I (Mol. Cell. Biol., Vol. 8(1), p. 466-472, 1988); SV40 enhancer; and the intron sequence between exons 2 and 3 of rabbit β-globin (Proc. Natl. Acad. Sci. USA., Vol. 78(3), p. 1527-31, 1981).

In some embodiments, the regulatory sequence can be a regulatory sequence described in U.S. Pat. No. 7,776,321, U.S. Pat. Pub. No. 2011/0027239, or International Patent Publication No. WO 2011/028929, the contents of which are incorporated by reference herein in their entireties. In some embodiments, the vector can contain a minimal promoter. In some embodiments, the minimal promoter is the Mecp2 promoter, tRNA promoter, or U6. In a further embodiment, the minimal promoter is tissue specific. In some embodiments, the length of the vector polynucleotide the minimal promoters and polynucleotide sequences is less than 4.4 Kb.

To express a polynucleotide, the vector can include one or more transcriptional and/or translational initiation regulatory sequences, e.g., promoters, that direct the transcription of the gene and/or translation of the encoded protein in a cell. In some embodiments a constitutive promoter may be employed. Suitable constitutive promoters for mammalian cells are generally known in the art and include, but are not limited to SV40, CAG, CMV, EF-1α, β-actin, RSV, and PGK. Suitable constitutive promoters for bacterial cells, yeast cells, and fungal cells are generally known in the art, such as a T-7 promoter for bacterial expression and an alcohol dehydrogenase promoter for expression in yeast.

In some embodiments, the regulatory element can be a regulated promoter. As used herein, "regulated promoter" refers to promoters that direct gene expression not constitutively, but in a temporally- and/or spatially-regulated manner, and includes tissue-specific, tissue-preferred and inducible promoters. Regulated promoters include conditional promoters and inducible promoters. In some embodiments, conditional promoters can be employed to direct expression of a polynucleotide in a specific cell type, under certain environmental conditions, and/or during a specific state of development. Suitable tissue specific promoters can include, but are not limited to, liver specific promoters (e.g. APOA2, SERPIN A1 (hAAT), CYP3A4, and MIR122), pancreatic cell promoters (e.g. INS, IRS2, Pdx1, Alx3, Ppy), cardiac specific promoters (e.g. Myh6 (alpha MHC), MYL2 (MLC-2v), TNI3 (cTn1), NPPA (ANF), Slc8a1 (Ncx1)), central nervous system cell promoters (SYN1, GFAP, INA, NES, MOBP, MBP, TH, FOXA2 (HNF3 beta)), skin cell specific promoters (e.g. FLG, K14, TGM3), immune cell specific promoters, (e.g. ITGAM, CD43 promoter, CD14 promoter, CD45 promoter, CD68 promoter), urogenital cell specific promoters (e.g. Pbsn, Upk2, Sbp, Ferl14), endothelial cell specific promoters (e.g. ENG), pluripotent and embryonic germ layer cell specific promoters (e.g. Oct4, NANOG, Synthetic Oct4, T brachyury, NES, SOX17, FOXA2, MIR122), and muscle cell specific promoter (e.g. myostatin, Desmin). Other tissue and/or cell specific promoters are generally known in the art and are within the scope of this disclosure.

Inducible/conditional promoters can be positively inducible/conditional promoters (e.g. a promoter that activates transcription of the polynucleotide upon appropriate interaction with an activated activator), or an inducer (compound, environmental condition, or other stimulus), or a negative/conditional inducible promoter (e.g. a promoter that is repressed (e.g. bound by a repressor) until the repressor condition of the promotor is removed (e.g. inducer binds a repressor bound to the promoter stimulating release of the promoter by the repressor or removal of a chemical repressor from the promoter environment). The inducer can be a compound, environmental condition, or other stimulus. Thus, inducible/conditional promoters can be responsive to any suitable stimuli such as chemical, biological, or other molecular agents, temperature, light, and/or pH. Suitable inducible/conditional promoters include, but are not limited to, Tet-On, Tet-Off, Lac promoter, pBad, AlcA, LexA, Hsp70 promoter, Hsp90 promoter, pDawn, XVE/OlexA, GVG, and pOp/LhGR.

Examples of promoters that are inducible and that can allow for spatiotemporal control of gene editing or gene expression may use a form of energy. The form of energy may include but is not limited to sound energy, electromagnetic radiation, chemical energy and/or thermal energy. Examples of inducible systems include tetracycline inducible promoters (Tet-On or Tet-Off), small molecule two-hybrid transcription activations systems (FKBP, ABA, etc.), or light inducible systems (Phytochrome, LOV domains, or cryptochrome)., such as a Light Inducible Transcriptional Effector (LITE) that direct changes in transcriptional activity in a sequence-specific manner. The components of a light inducible system may include one or more elements of the CRISPR-Cas system described herein, a light-responsive cytochrome heterodimer (e.g., from *Arabidopsis thaliana*), and a transcriptional activation/repression domain. In some embodiments, the vector can include one or more of the inducible DNA binding proteins provided in International Patent Publication No. WO 2014/018423 and U.S. Patent Publication Nos., 2015/0291966, 2017/0166903, 2019/0203212, which describe e.g., embodiments of inducible DNA binding proteins and methods of use and can be adapted for use with the present invention.

In some embodiments, transient or inducible expression can be achieved by including, for example, chemical-regulated promotors, i.e., whereby the application of an exogenous chemical induces gene expression. Modulation of gene expression can also be obtained by including a chemical-repressible promoter, where application of the chemical represses gene expression. Chemical-inducible promoters include, but are not limited to, the maize ln2-2 promoter, activated by benzene sulfonamide herbicide safeners (De Veylder et al., (1997) Plant Cell Physiol 38:568-77), the maize GST promoter (GST-ll-27, WO93/01294), activated by hydrophobic electrophilic compounds used as pre-emergent herbicides, and the tobacco PR-1 a promoter (Ono et al., (2004) Biosci Biotechnol Biochem 68:803-7) activated by salicylic acid. Promoters that are regulated by antibiotics, such as tetracycline-inducible and tetracycline-repressible promoters (Gatz et al., (1991) Mol Gen Genet 227:229-37; U.S. Pat. Nos. 5,814,618 and 5,789,156) can also be used herein.

In some embodiments where multiple elements are to be expressed from the same vector or within the same vector system, different promoters or regulatory elements can be used for each element to be expressed to avoid or limit loss of expression due to competition between promoters and/or other regulatory elements.

In some embodiments, the polynucleotide, vector or system thereof can include one or more elements capable of translocating and/or expressing a polynucleotide to/in a specific cell component or organelle. Such organelles can include, but are not limited to, nucleus, ribosome, endoplasmic reticulum, Golgi apparatus, chloroplast, mitochondria, vacuole, lysosome, cytoskeleton, plasma membrane, cell wall, peroxisome, centrioles, etc. Such regulatory elements can include, but are not limited to, nuclear localization signals (examples of which are described in greater detail elsewhere herein), any such as those that are annotated in the LocSigDB database (see e.g., genome.unmc.edu/LocSigDB/ and Negi et al., 2015. Database. 2015: bav003; doi: 10.1093/database/bav003), nuclear export signals (e.g., LXXXLXXLXL (SEQ ID NO: 52) and others described elsewhere herein), endoplasmic reticulum localization/retention signals (e.g., KDEL (SEQ ID NO: 53), KDXX (SEQ ID NO: 54), KKXX (SEQ ID NO: 55), KXX, and others described elsewhere herein; and see e.g., Liu et al. 2007 Mol. Biol. Cell. 18(3):1073-1082 and Gorleku et al., 2011. J. Biol. Chem. 286:39573-39584), mitochondria targeting signals (see e.g., Chin, R. M., et al, 2018, Cell Reports. 22:2818-2826, particularly at FIG. 2; Doyle et al. 2013. PLoS ONE 8, e67938; Funes et al. 2002. J. Biol. Chem. 277:6051-6058; Matouschek et al. 1997. PNAS USA 85:2091-2095; Oca-Cossio et al., 2003. 165:707-720; Waltner et al., 1996. J. Biol. Chem. 271:21226-21230; Wilcox et al., 2005. PNAS USA 102:15435-15440; Galanis et al., 1991. FEBS Lett 282:425-430), and peroxisome targeting signals (e.g. (S/A/C)-(K/R/H)-(L/A), SLK, (R/K)-(L/V/I)-XXXXX-(H/Q)-(L/A/F) (SEQ ID NO: 56)). Suitable protein targeting motifs can also be designed or identified using any suitable database or prediction tool, including but not limited to Minimotif Miner (minimotifminer.org, mitominer.mrc-mbu.cam.ac.uk/release-4.0/embodiment.do?name=Protein %20MTS), LocDB (see above), PTSs predictor, TargetP-2.0 (www.cbs.dtu.dk/services/TargetP/), ChloroP (www.cbs.dtu.dk/services/ChloroP/); NetNES (www.cbs.dtu.dk/services/NetNES/), Predotar (urgi.versailles.inra.fr/predotar/), and SignalP (www.cbs.dtu.dk/services/SignalP/).

Selectable Markers and Tags

One or more of the polynucleotides described herein, such as those of or encoding a genetic modifying system and/or exogenous gene can be operably linked, fused to, or otherwise modified to include a polynucleotide that encodes or is a selectable marker or tag, which can be a polynucleotide or polypeptide. In some embodiments, the polypeptide encoding a polypeptide selectable marker is incorporated in the genetic modifying system polynucleotide or other polynucleotide of the present disclosure such that the selectable marker polypeptide, when translated, is inserted between two amino acids between the N- and C-terminus of the genetic modifying system polypeptide (or other polypeptide of the present disclosure) or at the N- and/or C-terminus of the genetic modifying system polypeptide (or other polypeptide of the present disclosure). In some embodiments, the selectable marker or tag is a polynucleotide barcode or unique molecular identifier (UMI).

It will be appreciated that the polynucleotide encoding such selectable markers or tags can be incorporated into a polynucleotide encoding one or more components of the genetic modifying system (or other polynucleotide) described herein in an appropriate manner to allow expression of the selectable marker or tag. Such techniques and methods are described elsewhere herein and will be instantly appreciated by one of ordinary skill in the art in view of this disclosure. Many such selectable markers and tags are generally known in the art and are intended to be within the scope of this disclosure.

Suitable selectable markers and tags include, but are not limited to, affinity tags, such as chitin binding protein (CBP), maltose binding protein (MBP), glutathione-S-transferase (GST), poly(His) tag; solubilization tags such as thioredoxin (TRX) and poly(NANP), MBP, and GST; chromatography tags such as those consisting of polyanionic amino acids, such as FLAG-tag; epitope tags such as V5-tag, Myc-tag, HA-tag and NE-tag; protein tags that can allow specific enzymatic modification (such as biotinylation by biotin ligase) or chemical modification (such as reaction with FlAsH-EDT2 for fluorescence imaging), DNA and/or RNA segments that contain restriction enzyme or other enzyme cleavage sites; DNA segments that encode products that provide resistance against otherwise toxic compounds including antibiotics, such as, spectinomycin, ampicillin, kanamycin, tetracycline, Basta, neomycin phosphotransferase II (NEO), hygromycin phosphotransferase (HPT)) and the like; DNA and/or RNA segments that encode products that are otherwise lacking in the recipient cell (e.g., tRNA genes, auxotrophic markers); DNA and/or RNA segments that encode products which can be readily identified (e.g., phenotypic markers such as β-galactosidase, GUS; fluorescent proteins such as green fluorescent protein (GFP), cyan (CFP), yellow (YFP), red (RFP), luciferase, and cell surface proteins); polynucleotides that can generate one or more new primer sites for PCR (e.g., the juxtaposition of two DNA sequences not previously juxtaposed), DNA sequences not acted upon or acted upon by a restriction endonuclease or other DNA modifying enzyme, chemical, etc.; epitope tags (e.g. GFP, FLAG- and His-tags), and, DNA sequences that make a molecular barcode or unique molecular identifier (UMI), DNA sequences required for a specific modification (e.g., methylation) that allows its identification. Other suitable markers will be appreciated by those of skill in the art.

Selectable markers and tags can be operably linked to one or more components of the genetic modifying system (or other polypeptide) described herein via suitable linker, such as a glycine or glycine serine linkers as short as GS or GG up to (GGGGG)$_3$ (SEQ ID NO: 57) or (GGGGS)$_3$(SEQ ID NO: 58). Other suitable linkers are described elsewhere herein.

Targeting Moieties

The vector or vector system (or other polynucleotide) can include one or more polynucleotides that are or encode one or more targeting moieties. In some embodiments, the targeting moiety encoding polynucleotides can be included in the vector or vector system, such as a viral vector system, such that they are expressed within and/or on the virus particle(s) produced such that the virus particles can be targeted to specific cells, tissues, organs, etc. In some embodiments, the targeting moiety encoding polynucleotides can be included in the vector or vector system such that the genetic modifying system polynucleotide(s) and/or products expressed therefrom include the targeting moiety and can be targeted to specific cells, tissues, organs, etc. In some embodiments, such as non-viral carriers, the targeting moiety can be attached to the carrier (e.g., polymer, lipid, inorganic molecule etc.) and can be capable of targeting the carrier and any attached or associated genetic modifying system polynucleotide(s) to specific cells, tissues, organs, etc. In some embodiments, the targeting moieties can target integrins on cell surfaces. Optionally, the binding affinity of the targeting moiety is in the range of 1 nM to 1 µM.

Exemplary targeting moieties that can be included are described elsewhere herein. See description related to "Targeted Delivery" and/or "Responsive Delivery" herein.

Codon Optimization

As described elsewhere herein, the polynucleotide encoding one or more embodiments of the genetic modifying system or other polypeptides (such as those to be delivered to a target cell) of the present disclosure described herein can be codon optimized. In some embodiments, one or more polynucleotides contained in a vector ("vector polynucleotides") described herein that are in addition to an optionally codon optimized polynucleotide encoding embodiments of the genetic modifying system described herein can be codon optimized. In general, codon optimization refers to a process of modifying a nucleic acid sequence for enhanced expression in the host cells of interest by replacing at least one codon (e.g., about or more than about 1, 2, 3, 4, 5, 10, 15, 20, 25, 50, or more codons) of the native sequence with codons that are more frequently or most frequently used in the genes of that host cell while maintaining the native amino acid sequence. Various species exhibit particular bias for certain codons of a particular amino acid. Codon bias (differences in codon usage between organisms) often correlates with the efficiency of translation of messenger RNA (mRNA), which is in turn believed to be dependent on, among other things, the properties of the codons being translated and the availability of particular transfer RNA (tRNA) molecules. The predominance of selected tRNAs in a cell is generally a reflection of the codons used most frequently in peptide synthesis. Accordingly, genes can be tailored for optimal gene expression in a given organism based on codon optimization. Codon usage tables are readily available, for example, at the "Codon Usage Database" available at www.kazusa.or.jp/codon/and these tables can be adapted in a number of ways. See Nakamura, Y., et al. "Codon usage tabulated from the international DNA sequence databases: status for the year 2000" Nucl. Acids Res. 28:292 (2000). Computer algorithms for codon optimizing a particular sequence for expression in a particular host cell are also available, such as Gene Forge (Aptagen; Jacobus, PA), are also available. In some embodiments, one or more codons (e.g., 1, 2, 3, 4, 5, 10, 15, 20, 25, 50, or more, or all codons) in a sequence encoding a DNA/RNA-targeting Cas protein corresponds to the most frequently used codon for a particular amino acid. As to codon usage in yeast, reference is made to the online Yeast Genome database available at www.yeastgenome.org/community/codon_usage.shtml, or Codon selection in yeast, Bennetzen and Hall, J Biol Chem. 1982 Mar. 25; 257(6):3026-31. As to codon usage in plants including algae, reference is made to Codon usage in higher plants, green algae, and cyanobacteria, Campbell and Gowri, Plant Physiol. 1990 January; 92(1): 1-11.; as well as Codon usage in plant genes, Murray et al, Nucleic Acids Res. 1989 Jan. 25; 17(2):477-98; or Selection on the codon bias of chloroplast and cyanelle genes in different plant and algal lineages, Morton B R, J Mol Evol. 1998 April; 46(4):449-59.

The vector polynucleotide can be codon optimized for expression in a specific cell-type, tissue type, organ type, and/or subject type, such as a fish cell. In some embodiments, a codon optimized sequence is a sequence optimized for expression in a eukaryote, e.g., fish (i.e., being optimized for expression in a fish or fish cell, particularly a catfish). Such codon optimized sequences are within the ambit of the ordinary skilled artisan in view of the description herein. In some embodiments, the polynucleotide is codon optimized for a specific cell type. Such cell types can include, but are not limited to, epithelial cells (including skin cells, cells lining the gastrointestinal tract, cells lining other hollow organs), nerve cells (nerves, brain cells, spinal column cells, nerve support cells (e.g. astrocytes, glial cells, Schwann cells etc.)), muscle cells (e.g. cardiac muscle, smooth muscle cells, and skeletal muscle cells), connective tissue cells (fat and other soft tissue padding cells, bone cells, tendon cells, cartilage cells), blood cells, stem cells (including embryonic stem cells, primordial germ cells, primordial germ cell like cells, pluripotent stem cells, totipotent stem cells, blastocysts, etc.) and other progenitor cells, immune system cells, germ cells, and combinations thereof. Such codon optimized sequences are within the ambit of the ordinary skilled artisan in view of the description herein. In some embodiments, the polynucleotide is codon optimized for a specific tissue type. Such tissue types can include, but are not limited to, muscle tissue, connective tissue, connective tissue, nervous tissue, and epithelial tissue. Such codon optimized sequences are within the ambit of the ordinary skilled artisan in view of the description herein. In some embodiments, the polynucleotide is codon optimized for a specific organ. Such organs include, but are not limited to, muscles, skin, intestines, liver, spleen, brain, lungs, stomach, heart, kidneys, gallbladder, pancreas, bladder, thyroid, bone, blood vessels, blood, and combinations thereof. Such codon optimized sequences are within the ambit of the ordinary skilled artisan in view of the description herein.

In some embodiments, a vector polynucleotide is codon optimized for expression in particular cells, such as prokaryotic or eukaryotic cells. The eukaryotic cells may be those of or derived from a particular organism, such as a fish, and more particularly a catfish.

Vector Construction

The vectors described herein can be constructed using any suitable process or technique. In some embodiments, one or more suitable recombination and/or cloning methods or techniques can be used to the vector(s) described herein. Suitable recombination and/or cloning techniques and/or methods can include, but not limited to, those described in U.S. Patent Publication No. US 2004/0171156 A1. Other suitable methods and techniques are described elsewhere herein.

Construction of recombinant AAV vectors are described in a number of publications, including U.S. Pat. No. 5,173,414; Tratschin et al., Mol. Cell. Biol. 5:3251-3260 (1985); Tratschin, et al., Mol. Cell. Biol. 4:2072-2081 (1984); Hermonat & Muzyczka, PNAS 81:6466-6470 (1984); and Samulski et al., J. Virol. 63:03822-3828 (1989). Any of the techniques and/or methods can be used and/or adapted for constructing an AAV or other vectors described herein. nAAV vectors are discussed elsewhere herein.

In some embodiments, a vector comprises one or more insertion sites, such as a restriction endonuclease recognition sequence (also referred to as a "cloning site"). In some embodiments, one or more insertion sites (e.g., about or more than about 1, 2, 3, 4, 5, 6, 7, 8, 9, 10, or more insertion sites) are located upstream and/or downstream of one or more sequence elements of one or more vectors. When multiple different guide polynucleotides are used, a single expression construct may be used to target nucleic acid-targeting activity to multiple different, corresponding target sequences within a cell. For example, a single vector may comprise about or more than about 1, 2, 3, 4, 5, 6, 7, 8, 9, 10, 15, 20, or more guide polynucleotides. In some embodiments, about or more than about 1, 2, 3, 4, 5, 6, 7, 8, 9, 10, or more such guide-polynucleotide-containing vectors may be provided, added, and optionally delivered to a cell.

Delivery vehicles, vectors, particles, nanoparticles, formulations and components thereof for expression of one or more elements of a genetic modifying system or other polynucleotides described herein are as used in the foregoing documents, such as International Patent Publication No. WO 2014/093622 and are discussed in greater detail herein.

Viral Vectors

In some embodiments, the vector is a viral vector. The term of art "viral vector" and as used herein in this context refers to polynucleotide based vectors that contain one or more elements from or based upon one or more elements of a virus that can be capable of expressing and packaging a polynucleotide, such as a genetic modifying system polynucleotide of the present invention, into a virus particle and producing said virus particle when used alone or with one or more other viral vectors (such as in a viral vector system). Viral vectors and systems thereof can be used for producing viral particles for delivery of and/or expression of one or more components of the genetic modifying system described herein. The viral vector can be part of a viral vector system involving multiple vectors. In some embodiments, systems incorporating multiple viral vectors can increase the safety of these systems. Suitable viral vectors can include retroviral-based vectors, lentiviral-based vectors, adenoviral-based vectors, adeno associated vectors, helper-dependent adenoviral (HdAd) vectors, hybrid adenoviral vectors, herpes simplex virus-based vectors, poxvirus-based vectors, and Epstein-Barr virus-based vectors. Other embodiments of viral vectors and viral particles produce therefrom are described elsewhere herein. In some embodiments, the viral vectors are configured to produce replication incompetent viral particles for improved safety of these systems.

In certain embodiments, the virus structural component, which can be encoded by one or more polynucleotides in a viral vector or vector system, comprises one or more capsid proteins including an entire capsid. In certain embodiments, such as wherein a viral capsid comprises multiple copies of different proteins, the delivery system can provide one or more of the same protein or a mixture of such proteins. For example, AAV comprises 3 capsid proteins, VP1, VP2, and VP3, thus delivery systems of the invention can comprise one or more of VP1, and/or one or more of VP2, and/or one or more of VP3. Accordingly, the present invention is applicable to a virus within the family Adenoviridae, such as Atadenovirus, e.g., Ovine atadenovirus D, Aviadenovirus, e.g., Fowl aviadenovirus A, Ichtadenovirus, e.g., Sturgeon ichtadenovirus A, Mastadenovirus (which includes adenoviruses such as all human adenoviruses), e.g., Human mastadenovirus C, and Siadenovirus, e.g., Frog siadenovirus A. Thus, a virus of within the family Adenoviridae is contemplated as within the invention with discussion herein as to adenovirus applicable to other family members. Target-specific AAV capsid variants can be used or selected. Non-limiting examples include capsid variants selected to bind to chronic myelogenous leukemia cells, human CD34 PBPC cells, breast cancer cells, cells of lung, heart, dermal fibroblasts, melanoma cells, stem cell, glioblastoma cells, coronary artery endothelial cells and keratinocytes. See, e.g., Buning et al, 2015, Current Opinion in Pharmacology 24, 94-104. From teachings herein and knowledge in the art as to modifications of adenovirus (see, e.g., U.S. Pat. Nos. 9,410,129, 7,344,872, 7,256,036, 6,911,199, 6,740,525; Matthews, "Capsid-Incorporation of Antigens into Adenovirus Capsid Proteins for a Vaccine Approach," Mol Pharm, 8(1): 3-11 (2011)), as well as regarding modifications of AAV, the skilled person can readily obtain a modified adenovirus that has a large payload protein or a CRISPR-protein, despite that heretofore it was not expected that such a large protein could be provided on an adenovirus. And as to the viruses related to adenovirus mentioned herein, as well as to the viruses related to AAV mentioned elsewhere herein, the teachings herein as to modifying adenovirus and AAV, respectively, can be applied to those viruses without undue experimentation from this disclosure and the knowledge in the art.

In some embodiments, the viral vector is configured such that when the cargo is packaged the cargo(s) (e.g., one or more components of the genetic modifying system, including but not limited to a Cas effector), is external to the capsid or virus particle. In the sense that it is not inside the capsid (enveloped or encompassed with the capsid) but is externally exposed so that it can contact the target genomic DNA. In some embodiments, the viral vector is configured such that all the cargo(s) are contained within the capsid after packaging.

Split Viral Vector Systems

When the viral vector or vector system (be it a retroviral (e.g., AAV) or lentiviral vector) is designed so as to position the cargo(s) (e.g., one or more CRISPR-Cas system components) at the internal surface of the capsid once formed, the cargo(s) will fill most or all of internal volume of the capsid. In other embodiments, the genetic modifying effector (e.g., Cas) (or other exogenous gene or protein) may be modified or divided so as to occupy a less of the capsid internal volume. Accordingly, in certain embodiments, the genetic modifying system or component thereof (e.g., a Cas effector protein) or other exogenous gene or protein can be divided in two portions, which can be packaged in separate viral or viral like particles. In certain embodiments, by splitting the genetic modifying system or component thereof in two (or more) portions, space is made available to link one or more heterologous domains to one or both genetic modifying system component (e.g., Cas protein) or other protein portions. Such systems can be referred to as "split vector systems". This split protein approach is also described elsewhere herein. When the concept is applied to a vector system, it thus describes putting pieces of the split proteins on different vectors thus reducing the payload of any one vector. This approach can facilitate delivery of systems where the total system size is close to or exceeds the packaging capacity of the vector. This is independent of any regulation of the genetic modifying system (e.g., a CRISPR-Cas) system that can be achieved with a split system or split protein design.

Split CRISPR proteins or other exogenous proteins whose encoding polynucleotides can be incorporated into the viral or other vectors described herein are set forth elsewhere herein and in documents incorporated herein by reference in further detail herein. In certain embodiments, each part of a split protein are attached to a member of a specific binding pair, and when bound with each other, the members of the specific binding pair maintain the parts of the spit protein in proximity. In certain embodiments, each part of a split protein is associated with an inducible binding pair. An inducible binding pair is one which is capable of being switched "on" or "off" by a protein or small molecule that binds to both members of the inducible binding pair. In general, according to the invention, some proteins may preferably split between domains, leaving domains intact. Where the cargo is a Cas protein, non-limiting examples of such Cas proteins include, without limitation, Cas protein, and orthologues. Non-limiting examples of split points include, with reference to SpCas9: a split position between 202A/203S; a split position between 255F/256D; a split position between 310E/311I; a split position between 534R/535K; a split position between 572E/573C; a split position between 7135/714G; a split position between 1003 L/104E; a split position between 1054G/1055E; a split position between 1114N/1115S; a split position between 1152K/1153S; a split position between 1245K/1246G; or a split between 1098 and 1099. Corresponding positions in other Cas proteins can be appreciated in view of these positions made with reference to SpCas9.

Retroviral and Lentiviral Vectors

Retroviral vectors can be composed of cis-acting long terminal repeats with packaging capacity for up to 6-10 kb of foreign sequence. The minimum cis-acting LTRs are sufficient for replication and packaging of the vectors, which are then used to integrate the therapeutic gene into the target cell to provide permanent transgene expression. Suitable retroviral vectors for the delivery of a cargo (e.g., a genetic modifying systems or other exogenous polynucleotide) can include, but are not limited to, those vectors based upon murine leukemia virus (MuLV), gibbon ape leukemia virus (GaLV), Simian immunodeficiency virus (SIV), human immunodeficiency virus (HIV), equine infections anemia (EIA), and combinations thereof (see, e.g., Buchscher et al., J. Virol. 66:2731-2739 (1992); Johann et al., J. Virol. 66:1635-1640 (1992); Sommnerfelt et al., Virol. 176:58-59 (1990); Wilson et al., J. Virol. 63:2374-2378 (1989); Miller et al., J. Virol. 65:2220-2224 (1991); WO1994026877). Other exemplary retroviral vectors are described elsewhere herein. Retroviruses have been used to deliver transgenes to fish. See e.g., Kurita et al., Proc Natl Acad Sci USA. 2004 Feb. 3; 101(5): 1263-1267.

The tropism of a retrovirus can be altered by incorporating foreign envelope proteins, expanding the potential target population of target cells. Lentiviral vectors are retroviral vectors that are able to transduce or infect non-dividing cells and are described in greater detail elsewhere herein. A retrovirus can also be engineered to allow for conditional expression of the inserted transgene, such that only certain cell types are infected by the lentivirus.

Lentiviruses are complex retroviruses that have the ability to infect and express their genes in both mitotic and post-mitotic cells. Advantages of using a lentiviral approach can include the ability to transduce or infect non-dividing cells and their ability to typically produce high viral titers, which can increase efficiency or efficacy of production and delivery. Exemplary lentiviral vectors include, but are not limited to, human immunodeficiency virus (HIV)-based lentiviral vectors, feline immunodeficiency virus (FIV)-based lentiviral vectors, simian immunodeficiency virus (SIV)-based lentiviral vectors, Moloney Murine Leukemia Virus (Mo-MLV), Visna-maedi virus (VMV)-based lentiviral vector, caprine arthritis-encephalitis virus (CAEV)-based lentiviral vector, bovine immune deficiency virus (BIV)-based lentiviral vector, and Equine infectious anemia (EIAV)-based lentiviral vector. In some embodiments, an HIV-based lentiviral vector system can be used. In some embodiments, a FIV-based lentiviral vector system can be used.

In some embodiments, the lentiviral vector is an EIAV-based lentiviral vector or vector system. See e.g., Balagaan, J Gene Med 2006; 8: 275-285; Binley et al., HUMAN GENE THERAPY 23:980-991 (September 2012), which can be modified for use with the present disclosure.

In some embodiments, the lentiviral vector or vector system thereof can be a first-generation lentiviral vector or vector system thereof. First-generation lentiviral vectors can contain a large portion of the lentivirus genome, including the gag and pol genes, other additional viral proteins (e.g., VSV-G) and other accessory genes (e.g., vif, vprm vpu, nef, and combinations thereof), regulatory genes (e.g., tat and/or rev) as well as the gene of interest between the LTRs. First generation lentiviral vectors can result in the production of virus particles that can be capable of replication in vivo, which may not be appropriate for some instances or applications.

In some embodiments, the lentiviral vector or vector system thereof can be a second-generation lentiviral vector or vector system thereof. Second-generation lentiviral vectors do not contain one or more accessory virulence factors and do not contain all components necessary for virus particle production on the same lentiviral vector. This can result in the production of a replication-incompetent virus particle and thus increase the safety of these systems over first-generation lentiviral vectors. In some embodiments, the second-generation vector lacks one or more accessory virulence factors (e.g., vif, vprm, vpu, nef, and combinations thereof). Unlike the first-generation lentiviral vectors, no single second generation lentiviral vector includes all features necessary to express and package a polynucleotide into a virus particle. In some embodiments, the envelope and packaging components are split between two different vectors with the gag, pol, rev, and tat genes being contained on one vector and the envelope protein (e.g., VSV-G) are contained on a second vector. The gene of interest, its promoter, and LTRs can be included on a third vector that can be used in conjunction with the other two vectors (packaging and envelope vectors) to generate a replication-incompetent virus particle.

In some embodiments, the lentiviral vector or vector system thereof can be a third-generation lentiviral vector or vector system thereof. Third-generation lentiviral vectors and vector systems thereof have increased safety over first- and second-generation lentiviral vectors and systems thereof because, for example, the various components of the viral genome are split between two or more different vectors but used together in vitro to make virus particles, they can lack the tat gene (when a constitutively active promoter is included up-stream of the LTRs), and they can include one or more deletions in the 3'LTR to create self-inactivating (SIN) vectors having disrupted promoter/enhancer activity of the LTR. In some embodiments, a third-generation lentiviral vector system can include (i) a vector plasmid that contains the polynucleotide of interest and upstream promoter that are flanked by the 5' and 3' LTRs, which can optionally include one or more deletions present in one or both of the LTRs to render the vector self-inactivating; (ii) a "packaging vector(s)" that can contain one or more genes involved in packaging a polynucleotide into a virus particle that is produced by the system (e.g. gag, pol, and rev) and upstream regulatory sequences (e.g. promoter(s)) to drive expression of the features present on the packaging vector, and (iii) an "envelope vector" that contains one or more envelope protein genes and upstream promoters. In certain embodiments, the third-generation lentiviral vector system can include at least two packaging vectors, with the gag-pol being present on a different vector than the rev gene.

In some embodiments, self-inactivating lentiviral vectors with an siRNA targeting a common exon shared by HIV tat/rev, a nucleolar-localizing TAR decoy, and an anti-CCR5-specific hammerhead ribozyme (see, e.g., DiGiusto et al. (2010) Sci Transl Med 2:36ra43) can be used and/or adapted to deliver a genetic modifying system or exogenous polynucleotide of the present disclosure.

In some embodiments, the pseudotype and infectivity or tropism of a lentivirus particle can be tuned by altering the type of envelope protein(s) included in the lentiviral vector or system thereof. As used herein, an "envelope protein" or "outer protein" means a protein exposed at the surface of a viral particle that is not a capsid protein. For example, envelope or outer proteins typically comprise proteins embedded in the envelope of the virus. In some embodiments, a lentiviral vector or vector system thereof can include a VSV-G envelope protein. VSV-G mediates viral attachment to an LDL receptor (LDLR) or an LDLR family member present on a host cell, which triggers endocytosis of the viral particle by the host cell. Because LDLR is expressed by a wide variety of cells, viral particles expressing the VSV-G envelope protein can infect or transduce a wide variety of cell types. Other suitable envelope proteins can be incorporated based on the host cell that a user desires to be infected by a virus particle produced from a lentiviral vector or system thereof described herein and can include, but are not limited to, feline endogenous virus envelope protein (RD 114) (see e.g., Hanawa et al. Molec. Ther. 2002 5(3) 242-251), modified Sindbis virus envelope proteins (see e.g., Morizono et al. 2010. J. Virol. 84(14) 6923-6934; Morizono et al. 2001. J. Virol. 75:8016-8020; Morizono et al. 2009. J. Gene Med. 11:549-558; Morizono et al. 2006 Virology 355:71-81; Morizono et al J. Gene Med. 11:655-663, Morizono et al. 2005 Nat. Med. 11:346-352), baboon retroviral envelope protein (see e.g., Girard-Gagnepain et al. 2014. Blood. 124: 1221-1231); Tupaia paramyxovirus glycoproteins (see e.g., Enkirch T. et al., 2013. Gene Ther. 20:16-23); measles virus glycoproteins (see e.g., Funke et al. 2008. Molec. Ther. 16(8): 1427-1436), rabies virus envelope proteins, MLV envelope proteins, Ebola envelope proteins, baculovirus envelope proteins, filovirus envelope proteins, hepatitis E1 and E2 envelope proteins, gp41 and gp120 of HIV, hemagglutinin, neuraminidase, M2 proteins of influenza virus, and combinations thereof.

In some embodiments, the tropism of the resulting lentiviral particle can be tuned by incorporating cell targeting peptides into a lentiviral vector such that the cell targeting peptides are expressed on the surface of the resulting lentiviral particle. In some embodiments, a lentiviral vector can contain an envelope protein that is fused to a cell targeting protein (see e.g., Buchholz et al. 2015. Trends Biotechnol. 33:777-790; Bender et al. 2016. PLoS Pathog. 12(e1005461); and Friedrich et al. 2013. Mol. Ther. 2013. 21: 849-859).

In some embodiments, a split-intein-mediated approach to target lentiviral particles to a specific cell type can be used (see e.g., Chamoun-Emaneulli et al. 2015. Biotechnol. Bioeng. 112:2611-2617, Ramirez et al. 2013. Protein. Eng. Des. Sel. 26:215-233). In these embodiments, a lentiviral vector can contain one half of a splicing-deficient variant of the naturally split intein from *Nostoc punctiforme* fused to a cell targeting peptide and the same or different lentiviral vector can contain the other half of the split intein fused to an envelope protein, such as a binding-deficient, fusion-competent virus envelope protein. This can result in production of a virus particle from the lentiviral vector or vector system that includes a split intein that can function as a molecular Velcro linker to link the cell-binding protein to the pseudotyped lentivirus particle. This approach can be advantageous for use where surface-incompatibilities can restrict the use of, e.g., cell targeting peptides.

In some embodiments, a covalent-bond-forming protein-peptide pair can be incorporated into one or more of the lentiviral vectors described herein to conjugate a cell targeting peptide to the virus particle (see e.g., Kasaraneni et al. 2018. Sci. Reports (8) No. 10990). In some embodiments, a lentiviral vector can include an N-terminal PDZ domain of InaD protein (PDZ1) and its pentapeptide ligand (TEFCA) from NorpA, which can conjugate the cell targeting peptide to the virus particle via a covalent bond (e.g., a disulfide bond). In some embodiments, the PDZ1 protein can be fused to an envelope protein, which can optionally be binding deficient and/or fusion competent virus envelope protein and included in a lentiviral vector. In some embodiments, the TEFCA can be fused to a cell targeting peptide and the TEFCA-CPT fusion construct can be incorporated into the same or a different lentiviral vector as the PDZ 1-envelope protein construct. During virus production, specific interaction between the PDZ1 and TEFCA facilitates producing virus particles covalently functionalized with the cell targeting peptide and thus capable of targeting a specific cell-type based upon a specific interaction between the cell targeting peptide and cells expressing its binding partner. This approach can be advantageous for use where surface-incompatibilities can restrict the use of, e.g., cell targeting peptides.

Various exemplary lentiviral vectors, such as those used in the treatment of Parkinson's disease, ocular diseases, delivery to the brain, are described in e.g., US Patent Publication No. 20120295960, 20060281180, 20090007284, US20110117189; US20090017543; US20070054961, US20100317109, US20110293571; US20110293571, US20040013648, US20070025970, US20090111106, and U.S. Pat. Nos. 7,259,015, 7,303,910 and 7,351,585. Any of these systems can be used or adapted to deliver a genetic modifying system polynucleotide or other exogenous polynucleotide of the present disclosure.

In some embodiments, a lentiviral vector system can include one or more transfer plasmids. Transfer plasmids can be generated from various other vector backbones and can include one or more features that can work with other retroviral and/or lentiviral vectors in the system that can, for example, improve safety of the vector and/or vector system, increase virial titers, and/or increase or otherwise enhance expression of the desired insert to be expressed and/or packaged into the viral particle. Suitable features that can be included in a transfer plasmid can include, but are not limited to, 5'LTR, 3'LTR, SIN/LTR, origin of replication (Ori), selectable marker genes (e.g., antibiotic resistance genes), Psi (Ψ), RRE (rev response element), cPPT (central polypurine tract), promoters, WPRE (woodchuck hepatitis post-transcriptional regulatory element), SV40 polyadenylation signal, pUC origin, SV40 origin, F1 origin, and combinations thereof.

In another embodiment, the viral vector is a Cocal vesiculovirus envelope pseudotyped retroviral or lentiviral vector particles are contemplated (see, e.g., US Patent Publication No. 20120164118). Cocal virus is in the Vesiculovirus genus and is a causative agent of vesicular stomatitis in mammals, and as such vectors based on this virus can be used to deliver cells to a wide variety of animals, including insects, cattle, and horses (see e.g., Jonkers et al., Am. J. Vet. Res. 25:236-242 (1964) and Travassos da Rosa et al., Am. J. Tropical Med. & Hygiene 33:999-1006 (1984)). In some embodiments, Cocal vesiculovirus envelope pseudotyped retroviral vector particles may include for example, lentiviral, alpharetroviral, betaretroviral, gammaretroviral, deltaretroviral, and epsilonretroviral vector particles that may comprise retroviral Gag, Pol, and/or one or more accessory protein(s) and a Cocal vesiculovirus envelope protein. In certain embodiments of these embodiments, the Gag, Pol, and accessory proteins are lentiviral and/or gammaretroviral. In some embodiments, a retroviral vector can contain encoding polypeptides for one or more Cocal vesiculovirus envelope proteins such that the resulting viral or pseudoviral particles are Cocal vesiculovirus envelope pseudotyped.

Adenoviral Vectors, Helper-Dependent Adenoviral Vectors, and Hybrid Adenoviral Vectors In some embodiments, the vector can be an adenoviral vector. In some embodiments, the adenoviral vector can include elements such that the virus particle produced using the vector or system thereof can be any suitable serotype, such as serotype 2, 5, 8, 9, and others. In some embodiments, the polynucleotide to be delivered via the adenoviral particle can be up to about 8 kb. Thus, in some embodiments, an adenoviral vector can include a DNA polynucleotide to be delivered that can range in size from about 0.001 kb to about 8 kb. Adenoviral vectors have been used successfully in several contexts (see e.g., Teramato et al. 2000. Lancet. 355:1911-1912; Lai et al. 2002. DNA Cell. Biol. 21:895-913; Flotte et al., 1996. Hum. Gene. Ther. 7:1145-1159; and Kay et al. 2000. Nat. Genet. 24:257-261.

In some embodiments the vector can be a helper-dependent adenoviral vector or system thereof. These are also referred to in the art as "gutless" or "gutted" vectors and are a modified generation of adenoviral vectors (see e.g., Thrasher et al. 2006. Nature. 443:E5-7). In certain embodiments of the helper-dependent adenoviral vector system one vector (the helper) can contain all the viral genes required for replication but contains a conditional gene defect in the packaging domain. The second vector of the system can contain only the ends of the viral genome, one or more exogenous polynucleotides, and the native packaging recognition signal, which can allow selective packaged release from the cells (see e.g., Cideciyan et al. 2009. N Engl J Med. 361:725-727). Helper-dependent adenoviral vector systems have been successful for gene delivery in several contexts (see e.g., Simonelli et al. 2010. J Am Soc Gene Ther. 18:643-650; Cideciyan et al. 2009. N Engl J Med. 361:725-727; Crane et al. 2012. Gene Ther. 19(4):443-452; Alba et al. 2005. Gene Ther. 12:18-S27; Croyle et al. 2005. Gene Ther. 12:579-587; Amalfitano et al. 1998. J. Virol. 72:926-933; and Morral et al. 1999. PNAS. 96:12816-12821). The techniques and vectors described in these publications can be adapted for inclusion and delivery of the CRISPR-Cas system polynucleotides described herein. In some embodiments, the polynucleotide to be delivered via the viral particle produced from a helper-dependent adenoviral vector or system thereof can be up to about 37 kb. Thus, in some embodiments, an adenoviral vector can include a DNA polynucleotide to be delivered that can range in size from about 0.001 kb to about 37 kb (see e.g. Rosewell et al. 2011. J. Genet. Syndr. Gene Ther. Suppl. 5:001).

In some embodiments, the vector is a hybrid-adenoviral vector or system thereof. Hybrid adenoviral vectors are composed of the high transduction efficiency of a gene-deleted adenoviral vector and the long-term genome-integrating potential of adeno-associated, retroviruses, lentivirus, and transposon based-gene transfer. In some embodiments, such hybrid vector systems can result in stable transduction and limited integration site. See e.g., Balague et al. 2000. Blood. 95:820-828; Morral et al. 1998. Hum. Gene Ther. 9:2709-2716; Kubo and Mitani. 2003. J. Virol. 77(5): 2964-2971; Zhang et al. 2013. PloS One. 8(10) e76771; and Cooney et al. 2015. Mol. Ther. 23(4):667-674, whose techniques and vectors described therein can be modified and adapted for use to deliver a polynucleotide or system of the present invention. In some embodiments, a hybrid-adenoviral vector can include one or more features of a retrovirus and/or an adeno-associated virus. In some embodiments the hybrid-adenoviral vector can include one or more features of a spuma retrovirus or foamy virus (FV). See e.g., Ehrhardt et al. 2007. Mol. Ther. 15:146-156 and Liu et al. 2007. Mol. Ther. 15:1834-1841, whose techniques and vectors described therein can be modified and adapted for use in the CRISPR-Cas system of the present invention. Advantages of using one or more features from the FVs in the hybrid-adenoviral vector or system thereof can include the ability of the viral particles produced therefrom to infect a broad range of cells, a large packaging capacity as compared to other retroviruses, and the ability to persist in quiescent (non-dividing) cells. See also e.g., Ehrhardt et al. 2007. Mol. Ther. 156:146-156 and Shuji et al. 2011. Mol. Ther. 19:76-82, whose techniques and vectors described therein can be modified and adapted for use in the CRISPR-Cas system of the present invention.

Adeno Associated Viral (AAV) Vectors

In an embodiment, the vector can be an adeno-associated virus (AAV) vector. See, e.g., West et al., Virology 160:38-47 (1987); U.S. Pat. No. 4,797,368; WO 93/24641; Kotin, Human Gene Therapy 5:793-801 (1994); and Muzyczka, J. Clin. Invest. 94:1351 (1994). Although similar to adenoviral vectors in some of their features, AAVs have some deficiency in their replication and/or pathogenicity and thus can be safer that adenoviral vectors. In some embodiments the AAV can integrate into a specific site on chromosome 19 of a human cell with no observable side effects. In some embodiments, the capacity of the AAV vector, system thereof, and/or AAV particles can be up to about 4.7 kb. In some embodiments, utilizing homologs of the Cas effector protein that are shorter can be utilized, such for example those in Table 30.

TABLE 30

Exemplary shorter Cas effector homologs.

| Species | Cas9 Size (nt) |
| --- | --- |
| Corynebacter diphtheriae | 3252 |
| Eubacterium ventriosum | 3321 |
| Streptococcus pasteurianus | 3390 |
| Lactobacillus farciminis | 3378 |
| Sphaerochaeta globus | 3537 |
| Azospirillum B510 | 3504 |
| Gluconacetobacter diazotrophicus | 3150 |
| Neisseria cinerea | 3246 |
| Roseburia intestinalis | 3420 |
| Parvibaculum lavamentivorans | 3111 |
| Staphylococcus aureus | 3159 |
| Nitratifractor salsuginis DSM 16511 | 3396 |
| Campylobacter lari CF89-12 | 3009 |
| Campylobacter jejuni | 2952 |
| Streptococcus thermophilus LMD-9 | 3396 |

The AAV vector or system thereof can include one or more regulatory molecules. In some embodiments the regulatory molecules can be promoters, enhancers, repressors and the like, which are described in greater detail elsewhere herein. In some embodiments, the AAV vector or system thereof can include one or more polynucleotides that can encode one or more regulatory proteins. In some embodiments, the one or more regulatory proteins can be selected from Rep78, Rep68, Rep52, Rep40, variants thereof, and combinations thereof.

The AAV vector or system thereof can include one or more polynucleotides that can encode one or more capsid proteins. The capsid proteins can be selected from VP1, VP2, VP3, and combinations thereof. The capsid proteins can be capable of assembling into a protein shell of the AAV virus particle. In some embodiments, the AAV capsid can contain 60 capsid proteins. In some embodiments, the ratio of VP1:VP2:VP3 in a capsid can be about 1:1:10.

In some embodiments, the AAV vector or system thereof can include one or more adenovirus helper factors or polynucleotides that can encode one or more adenovirus helper factors. Such adenovirus helper factors can include, but are not limited, E1A, E1B, E2A, E40RF6, and VA RNAs. In some embodiments, a producing host cell line expresses one or more of the adenovirus helper factors.

The AAV vector or system thereof can be configured to produce AAV particles having a specific serotype.

AAV particles, packaging polynucleotides encoding compositions of the present disclosure may comprise or be derived from any natural or recombinant AAV serotype. According to the present disclosure, the AAV particles may utilize or be based on a serotype selected from any of the following serotypes, and variants thereof including but not limited to AAV1, AAV10, AAV106.1/hu.37, AAV11, AAV114.3/hu.40, AAV12, AAV127.2/hu.41, AAV127.5/hu.42, AAV128.1/hu.43, AAV128.3/hu.44, AAV130.4/hu.48, AAV145.1/hu.53, AAV145.5/hu.54, AAV145.6/hu.55, AAV16.12/hu.11, AAV16.3, AAV16.8/hu.10, AAV161.10/hu.60, AAV161.6/hu.61, AAV1-7/rh.48, AAV1-8/rh.49, AAV2, AAV2.5T, AAV2-15/rh.62, AAV223.1, AAV223.2, AAV223.4, AAV223.5, AAV223.6, AAV223.7, AAV2-3/rh.61, AAV24.1, AAV2-4/rh.50, AAV2-5/rh.51, AAV27.3, AAV29.3/bb.1, AAV29.5/bb.2, AAV2G9, AAV-2-pre-miRNA-101, AAV3, AAV3.1/hu.6, AAV3.1/hu.9, AAV3-11/rh.53, AAV3-3, AAV33.12/hu.17, AAV33.4/hu.15, AAV33.8/hu.16, AAV3-9/rh.52, AAV3a, AAV3b, AAV4, AAV4-19/rh.55, AAV42.12, AAV42-10, AAV42-11, AAV42-12, AAV42-13, AAV42-15, AAV42-1b, AAV42-2, AAV42-3a, AAV42-3b, AAV42-4, AAV42-5a, AAV42-5b, AAV42-6b, AAV42-8, AAV42-aa, AAV43-1, AAV43-12, AAV43-20, AAV43-21, AAV43-23, AAV43-25, AAV43-5, AAV4-4, AAV44.1, AAV44.2, AAV44.5, AAV46.2/hu.28, AAV46.6/hu.29, AAV4-8/ri1.64, AAV4-8/rh.64, AAV4-9/rh.54, AAV5, AAV52.1/hu.20, AAV52/hu.19, AAV5-22/rh.58, AAV5-3/rh.57, AAV54.1/hu.21, AAV54.2/hu.22, AAV54.4R/hu.27, AAV54.5/hu.23, AAV54.7/hu.24, AAV58.2/hu.25, AAV6, AAV6.1, AAV6.1.2, AAV6.2, AAV7, AAV7.2, AAV7.3/hu.7, AAV8, AAV-8b, AAV-8h, AAV9, AAV9.11, AAV9.13, AAV9.16, AAV9.24, AAV9.45, AAV9.47, AAV9.61, AAV9.68, AAV9.84, AAV9.9, AAVA3.3, AAVA3.4, AAVA3.5, AAVA3.7, AAV-b, AAVC1, AAVC2, AAVC5, AAVCh.5, AAVCh.5R1, AAVcy.2, AAVcy.3, AAVcy.4, AAVcy.5, AAVCy.5R1, AAVCy.5R2, AAVCy.5R3, AAVCy.5R4, AAVcy.6, AAV-DJ, AAV-DJ8, AAVF3, AAVF5, AAV-h, AAVH-1/hu.1, AAVH2, AAVH-5/hu.3, AAVH6, AAVhE1.1, AAVhER1.14, AAVhEr1.16, AAVhEr1.18, AAVhER1.23, AAVhEr1.35, AAVhEr1.36, AAVhEr1.5, AAVhEr1.7, AAVhEr1.8, AAVhEr2.16, AAVhEr2.29, AAVhEr2.30, AAVhEr2.31, AAVhEr2.36, AAVhEr2.4, AAVhEr3.1, AAVhu.1, AAVhu.10, AAVhu.11, AAVhu.11, AAVhu.12, AAVhu.13, AAVhu.14/9, AAVhu.15, AAVhu.16, AAVhu.17, AAVhu.18, AAVhu.19, AAVhu.2, AAVhu.20, AAVhu.21, AAVhu.22, AAVhu.23.2, AAVhu.24, AAVhu.25, AAVhu.27, AAVhu.28, AAVhu.29, AAVhu.29R, AAVhu.3, AAVhu.31, AAVhu.32, AAVhu.34, AAVhu.35, AAVhu.37, AAVhu.39, AAVhu.4, AAVhu.40, AAVhu.41, AAVhu.42, AAVhu.43, AAVhu.44, AAVhu.44R1, AAVhu.44R2, AAVhu.44R3, AAVhu.45, AAVhu.46, AAVhu.47, AAVhu.48, AAVhu.48R1, AAVhu.48R2, AAVhu.48R3, AAVhu.49, AAVhu.5, AAVhu.51, AAVhu.52, AAVhu.53, AAVhu.54, AAVhu.55, AAVhu.56, AAVhu.57, AAVhu.58, AAVhu.6, AAVhu.60, AAVhu.61, AAVhu.63, AAVhu.64, AAVhu.66, AAVhu.67, AAVhu.7, AAVhu.8, AAVhu.9, AAVhu.t 19, AAVLG-10/rh.40, AAVLG-4/rh.38, AAVLG-9/hu.39, AAVLG-9/hu.39, AAV-LK01, AAV-LK02, AAVLK03, AAV-LK03, AAV-LK04, AAV-LK05, AAV-LK06, AAV-LK07, AAV-LK08, AAV-LK09, AAV-LK10, AAV-LK11, AAV-LK12, AAV-LK13, AAV-LK14, AAV-LK15, AAV-LK17, AAV-LK18, AAV-LK19, AAVN721-8/rh.43, AAV-PAEC, AAV-PAEC11, AAV-PAEC12, AAV-PAEC2, AAV-PAEC4, AAV-PAEC6, AAV-PAEC7, AAV-PAEC8, AAVpi.1, AAVpi.2, AAVpi.3, AAVrh.10, AAVrh.12, AAVrh.13, AAVrh.13R, AAVrh.14, AAVrh.17, AAVrh.18, AAVrh.19, AAVrh.2, AAVrh.20, AAVrh.21, AAVrh.22, AAVrh.23, AAVrh.24, AAVrh.25, AAVrh.2R, AAVrh.31, AAVrh.32, AAVrh.33, AAVrh.34, AAVrh.35, AAVrh.36, AAVrh.37, AAVrh.37R2, AAVrh.38, AAVrh.39, AAVrh.40, AAVrh.43, AAVrh.44, AAVrh.45, AAVrh.46, AAVrh.47, AAVrh.48, AAVrh.48, AAVrh.48.1, AAVrh.48.1.2, AAVrh.48.2, AAVrh.49, AAVrh.50, AAVrh.51, AAVrh.52, AAVrh.53, AAVrh.54, AAVrh.55, AAVrh.56, AAVrh.57, AAVrh.58, AAVrh.59, AAVrh.60, AAVrh.61, AAVrh.62, AAVrh.64, AAVrh.64R1, AAVrh.64R2, AAVrh.65, AAVrh.67, AAVrh.68, AAVrh.69, AAVrh.70, AAVrh.72, AAVrh.73, AAVrh.74, AAVrh.8, AAVrh.8R, AAVrh8R, AAVrh8R A586R mutant, AAVrh8R R533A mutant, BAAV, BNP61 AAV, BNP62 AAV, BNP63 AAV, bovine AAV, caprine AAV, Japanese AAV 10, true type AAV (ttAAV), UPENN AAV 10, AAV-LK16, AAAV, AAV Shuffle 100-1, AAV Shuffle 100-2, AAV Shuffle 100-3, AAV Shuffle 100-7, AAV Shuffle 10-2, AAV Shuffle 10-6, AAV Shuffle 10-8, AAV SM 100-10, AAV SM 100-3, AAV SM 10-1, AAV SM 10-2, and/or AAV SM 10-8.

In some embodiments s, the AAV serotype may be, or have, a mutation in the AAV9 sequence as described by N Pulicherla et al. (Molecular Therapy 19(6):1070-1078 (2011)), such as but not limited to, AAV9.9, AAV9.11, AAV9.13, AAV9.16, AAV9.24, AAV9.45, AAV9.47, AAV9.61, AAV9.68, AAV9.84.

In some embodiments, the AAV serotype may be, or have, a sequence as described in U.S. Pat. No. 6,156,303, such as, but not limited to, AAV3B (SEQ ID NO: 1 and 10 of U.S. Pat. No. 6,156,303), AAV6 (SEQ ID NO: 2, 7 and 11 of U.S. Pat. No. 6,156,303), AAV2 (SEQ ID NO: 3 and 8 of U.S. Pat. No. 6,156,303), AAV3A (SEQ ID NO: 4 and 9, of U.S. Pat. No. 6,156,303), or derivatives thereof.

In some embodiments, the serotype may be AAVDJ or a variant thereof, such as AAVDJ8 (or AAV-DJ8), as described by Grimm et al. Journal of Virology 82(12): 5887-5911 (2008). The amino acid sequence of AAVDJ8 may comprise two or more mutations in order to remove the heparin binding domain (HBD). As a non-limiting example, the AAV-DJ sequence described as SEQ ID NO: 1 in U.S. Pat. No. 7,588,772 may comprise two mutations: (1) R587Q where arginine (R; Arg) at amino acid 587 is changed to glutamine (Q; Gln) and (2) R590T where arginine (R; Arg) at amino acid 590 is changed to threonine (T; Thr). As another non-limiting example, may comprise three mutations: (1) K406R where lysine (K; Lys) at amino acid 406 is changed to arginine (R; Arg), (2) R587Q where arginine (R; Arg) at amino acid 587 is changed to glutamine (Q; Gln) and (3) R590T where arginine (R; Arg) at amino acid 590 is changed to threonine (T; Thr).

In some embodiments, the AAV serotype may be, or have, a sequence as described in International Publication No. WO2015121501, such as, but not limited to, true type AAV (ttAAV) (SEQ ID NO: 2 of WO2015121501), "UPenn AAV10" (SEQ ID NO: 8 of WO2015/121501), "Japanese AAV10" (SEQ ID NO: 9 of WO2015/121501), or variants thereof.

According to the present disclosure, AAV capsid serotype selection or use may be from a variety of species. In one example, the AAV may be an avian AAV (AAAV). The AAAV serotype may be, or have, a sequence as described in U.S. Pat. No. 9,238,800, such as, but not limited to, AAAV (SEQ ID NO: 1, 2, 4, 6, 8, 10, 12, and 14 of U.S. Pat. No. 9,238,800), or variants thereof.

In one example, the AAV may be a bovine AAV (BAAV). The BAAV serotype may be, or have, a sequence as described in U.S. Pat. No. 9,193,769, such as, but not limited to, BAAV (SEQ ID NO: 1 and 6 of U.S. Pat. No. 9,193,769), or variants thereof. The BAAV serotype may be or have a sequence as described in U.S. Pat. No. 7,427,396, such as, but not limited to, BAAV (SEQ ID NO: 5 and 6 of U.S. Pat. No. 7,427,396), or variants thereof.

In one example, the AAV may be a caprine AAV. The caprine AAV serotype may be, or have, a sequence as described in U.S. Pat. No. 7,427,396, such as, but not limited to, caprine AAV (SEQ ID NO: 3 of U.S. Pat. No. 7,427,396), or variants thereof.

In other examples the AAV may be engineered as a hybrid AAV from two or more parental serotypes. In one example, the AAV may be AAV2G9 which comprises sequences from AAV2 and AAV9. The AAV2G9 AAV serotype may be, or have, a sequence as described in United States Patent Publication No. US2016/0017005.

In one example, the AAV may be a serotype generated by the AAV9 capsid library with mutations in amino acids 390-627 (VP1 numbering) as described by Pulicherla et al. Molecular Therapy 19(6):1070-1078 (2011). The serotype and corresponding nucleotide and amino acid substitutions may be, but is not limited to, AAV9.1 (G1594C; D532H), AAV6.2 (T1418A and T1436X; V473D and I479K), AAV9.3 (T1238A; F413Y), AAV9.4 (T1250C and A1617T; F417S), AAV9.5 (A1235G, A1314T, A1642G, C1760T; Q412R, T548A, A587V), AAV9.6 (T1231A; F411I), AAV9.9 (G1203A, G1785T; W595C), AAV9.10 (A1500G, T1676C; M559T), AAV9.11 (A1425T, A1702C, A1769T; T568P, Q590 L), AAV9.13 (A1369C, A1720T; N457H, T574S), AAV9.14 (T1340A, T1362C, T1560C, G1713A; L447H), AAV9.16 (A1775T; Q592 L), AAV9.24 (T1507C, T1521G; W503R), AAV9.26 (A1337G, A1769C; Y446C, Q590P), AAV9.33 (A1667C; D556A), AAV9.34 (A1534G, C1794T; N512D), AAV9.35 (A1289T, T1450A, C1494T, A1515T, C1794A, G1816A; Q430 L, Y484N, N98K, V6061), AAV9.40 (A1694T, E565V), AAV9.41 (A1348T, T1362C; T450S), AAV9.44 (A1684C, A1701T, A1737G; N562H, K567N), AAV9.45 (A1492T, C1804T; N498Y, L602F), AAV9.46 (G1441C, T1525C, T1549G; G481R, W509R, L517V), 9.47 (G1241A, G1358A, A1669G, C1745T; S414N, G453D, K557E, T582I), AAV9.48 (C1445T, A1736T; P482 L, Q579 L), AAV9.50 (A1638T, C1683T, T1805A; Q546H, L602H), AAV9.53 (G1301A, A1405C, C1664T, G1811T; R134Q, S469R, A555V, G604V), AAV9.54 (C1531A, T1609A; L511I, L537M), AAV9.55 (T1605A; F535 L), AAV9.58 (C1475T, C1579A; T492I, H527N), AAV.59 (T1336C; Y446H), AAV9.61 (A1493T; N498I), AAV9.64 (C1531A, A1617T; L511I), AAV9.65 (C1335T, T1530C, C1568A; A523D), AAV9.68 (C1510A; P504T), AAV9.80 (G1441A; G481R), AAV9.83

(C1402A, A1500T; P468T, E500D), AAV9.87 (T1464C, T1468C; S490P), AAV9.90 (A1196T; Y399F), AAV9.91 (T1316G, A1583T, C1782G, T1806C; L439R, K528I), AAV9.93 (A1273G, A1421G, A1638C, C1712T, G1732A, A1744T, A1832T; S425G, Q474R, Q546H, P571 L, G578R, T582S, D611V), AAV9.94 (A1675T; M559 L) and AAV9.95 (T1605A; F535 L).

In one example, the AAV may be a serotype including at least one AAV capsid CD8+ T-cell epitope. As a non-limiting example, the serotype may be AAV1, AAV2 or AAV8.

In one example, the AAV may be a variant, such as PHP.A or PHP.B as described in Deverman. 2016. Nature Biotechnology. 34(2): 204-209. AAV vector serotypes can be matched to target cell types. For example, the following exemplary cell types can be transduced by the indicated AAV serotypes among others.

In some embodiments, the serotype can be AAV-1, AAV-2, AAV-3, AAV-4, AAV-5, AAV-6, AAV-8, AAV-9 or any combinations thereof. In some embodiments, the AAV can be AAV1, AAV-2, AAV-5 or any combination thereof. One can select the AAV of the AAV with regard to the cells to be targeted; e.g., one can select AAV serotypes 1, 2, 5 or a hybrid capsid AAV-1, AAV-2, AAV-5 or any combination thereof for targeting brain and/or neuronal cells; and one can select AAV-4 for targeting cardiac tissue; and one can select AAV8 for delivery to the liver. Thus, in some embodiments, an AAV vector or system thereof capable of producing AAV particles capable of targeting the brain and/or neuronal cells can be configured to generate AAV particles having serotypes 1, 2, 5 or a hybrid capsid AAV-1, AAV-2, AAV-5 or any combination thereof. In some embodiments, an AAV vector or system thereof capable of producing AAV particles capable of targeting cardiac tissue can be configured to generate an AAV particle having an AAV-4 serotype. In some embodiments, an AAV vector or system thereof capable of producing AAV particles capable of targeting the liver can be configured to generate an AAV having an AAV-8 serotype. In some embodiments, the AAV vector is a hybrid AAV vector or system thereof. Hybrid AAVs are AAVs that include genomes with elements from one serotype that are packaged into a capsid derived from at least one different serotype. For example, if it is the rAAV2/5 that is to be produced, and if the production method is based on the helper-free, transient transfection method discussed above, the 1st plasmid and the 3rd plasmid (the adeno helper plasmid) will be the same as discussed for rAAV2 production. However, the second plasmid, the pRepCap will be different. In this plasmid, called pRep2/Cap5, the Rep gene is still derived from AAV2, while the Cap gene is derived from AAV5. The production scheme is the same as the above-mentioned approach for AAV2 production. The resulting rAAV is called rAAV2/5, in which the genome is based on recombinant AAV2, while the capsid is based on AAV5. It is assumed the cell or tissue-tropism displayed by this AAV2/5 hybrid virus should be the same as that of AAV5.

A tabulation of certain AAV serotypes as to these cells can be found in Grimm, D. et al, J. Virol. 82: 5887-5911 (2008) and in Table 31.

TABLE 31

| Tissue/Cell Types and Exemplary Serotypes | |
| --- | --- |
| liver | AAV3, AAV5, AAV8, AAV9 |
| Skeletal muscle | AAV1, AAV7, AAV6, AAV8, AAV9 |
| Central nervous system | AAV5, AAV1, AAV4, AAV9 |

TABLE 31-continued

| Tissue/Cell Types and Exemplary Serotypes | |
| --- | --- |
| RPE | AAV5, AAV4 |
| Lung | AAV9 |
| Heart | AAV8 |
| Pancreas | AAV8 |
| Kidney | AAV2, AAV8 |
| Hematopoietic Stem Cells | AAV6 |

In some embodiments, the AAV vector or system thereof is configured as a "gutless" vector, similar to that described in connection with a retroviral vector. In some embodiments, the "gutless" AAV vector or system thereof can have the cis-acting viral DNA elements involved in genome amplification and packaging in linkage with the heterologous sequences of interest (e.g., the genetic modifying system polynucleotide(s)).

In some embodiments, the AAV vectors are produced in insect cells, e.g., *Spodoptera frugiperda* Sf9 insect cells, grown in serum-free suspension culture. Serum-free insect cells can be purchased from commercial vendors, e.g., Sigma Aldrich (EX-CELL 405).

In some embodiments, an AAV vector or vector system can contain or consists essentially of one or more polynucleotides encoding one or more components of a genetic modifying system or other exogenous polynucleotide to be delivered to a cell. Specific cassette configuration for delivery of a genetic modifying system and/or other exogenous polynucleotide(s) will be appreciated by one of ordinary skill in the art in view of the description herein.

In some embodiments, one or more components of a genetic modifying system or other polypeptides and/or polynucleotides are associated with Adeno Associated Virus (AAV), e.g., an AAV comprising a polypeptide of the genetic modification system or exogenous polypeptide as a fusion, with or without a linker, to or with an AAV capsid protein such as VP1, VP2, and/or VP3. More in particular, modifying the knowledge in the art, e.g., Rybniker et al., "Incorporation of Antigens into Viral Capsids Augments Immunogenicity of Adeno-Associated Virus Vector-Based Vaccines," J Virol. December 2012; 86(24): 13800-13804, Lux K, et al. 2005. Green fluorescent protein-tagged adeno-associated virus particles allow the study of cytosolic and nuclear trafficking. J. Virol. 79:11776-11787, Munch R C, et al. 2012. "Displaying high-affinity ligands on adeno-associated viral vectors enables tumor cell-specific and safe gene transfer." Mol. Ther. [Epub ahead of print.]doi:10.1038/mt.2012.186 and Warrington K H, Jr, et al. 2004. Adeno-associated virus type 2 VP2 capsid protein is nonessential and can tolerate large peptide insertions at its N terminus. J. Virol. 78:6595-6609, each incorporated herein by reference, one can obtain a modified AAV capsid as described herein. It will be understood by those skilled in the art that the modifications described herein if inserted into the AAV cap gene may result in modifications in the VP1, VP2 and/or VP3 capsid subunits. Alternatively, the capsid subunits can be expressed independently to achieve modification in only one or two of the capsid subunits (VP1, VP2, VP3, VP1+ VP2, VP1+VP3, or VP2+VP3). One can modify the cap gene to have expressed at a desired location a non-capsid protein advantageously a large payload protein, such as a Cas protein or other exogenous polypeptide. Likewise, these can be fusions, with the protein, e.g., large payload protein such as a Cas protein fused in a manner analogous to prior art fusions. See, e.g., US Patent Publication 20090215879; Nance et al., "Perspective on Adeno-Associated Virus Capsid Modification for Duchenne Muscular Dystrophy Gene Therapy," Hum Gene Ther. 26(12):786-800 (2015) and documents cited therein, incorporated herein by reference. The skilled person, from this disclosure and the knowledge in the art can make and use modified AAV or AAV capsid as with other aspects of the present disclosure, and through this description herein one knows now that large payload proteins can be fused to the AAV capsid. Accordingly, the approaches described herein are also applicable to a virus in the genus Dependoparvovirus or in the family Parvoviridae, for instance, AAV, or a virus of Amdoparvovirus, e.g., Carnivore amdoparvovirus 1, a virus of Aveparvovirus, e.g., Galliform aveparvovirus 1, a virus of Bocaparvovirus, e.g., Ungulate bocaparvovirus 1, a virus of Copiparvovirus, e.g., Ungulate copiparvovirus 1, a virus of Dependoparvovirus, e.g., Adeno-associated dependoparvovirus A, a virus of Erythroparvovirus, e.g., Primate erythroparvovirus 1, a virus of Protoparvovirus, e.g., Rodent protoparvovirus 1, a virus of Tetraparvovirus, e.g., Primate tetraparvovirus 1.

In some embodiments, a genetic modifying system polypeptide or other exogenous polypeptide is external to the capsid or virus particle, such as an AAV capsid. Although this approach is discussed in the context of AAVs, such an approach is applicable to other viral systems or viral like particle systems where capsids are formed. In these embodiments, the cargo polypeptide is not inside the capsid (enveloped or encompassed with the capsid), but is externally exposed so that it can contact the target genomic or other target DNA or RNA. In some embodiments, the cargo polypeptide is associated with the AAV VP2 domain by way of a fusion protein. In some embodiments, the association may be considered to be a modification of the VP2 domain. In some embodiments, the AAV VP2 domain may be associated (or tethered) to the cargo polypeptide via a connector protein, for example using a system such as the streptavidin-biotin system. Also provided herein are polynucleotides encoding a cargo polypeptide (e.g., a genetic modifying polypeptide or other exogenous cargo polypeptide) and associated AAV VP2 domain. In some preferred embodiments, the cargo polypeptide is fused or tethered (e.g., via linker) to the VP2 domain so that, a non-naturally occurring modified AAV having a VP2-cargo polypeptide fusion or otherwise modified capsid protein is formed. In some embodiments, where the cargo is tethered via a linker, the cargo can be distanced from the remainder of the AAV (or other viral or viral like particle). The fusion or tether can be at the N-terminus, C-terminus, or both of the capsid polypeptide. In some embodiments, an NLS and/or a linker (such as a GlySer linker) or other tether is positioned between the C-terminal end of the cargo and the N-terminal end of the capsid domain. In some embodiments, an NLS and/or a linker (such as a GlySer linker) or other tether is positioned between the N-terminal end of the cargo and the C—terminal end of the capsid domain. In some embodiments, the capsid polypeptide that is modified with a cargo polypeptide is truncated or contains a loss of one or more internal amino acids with the N- and C— terminal amino acids (e.g., the first (or last) 2-10 amino acids) of the capsid domain intact. In these embodiments, the cargo polypeptide can be inserted between the intact N- and/or C-terminal amino acids via a fusion (e.g., an in-frame fusion) or linker or other tether (such as a streptavidin/biotin system or other adaptor molecule such as MS2). In some embodiments where a linker is used, the linker can be a branched linker, which can allow for more distance between the cargo polypeptide and capsid. A cargo polypeptide can be incorporated into other capsid domains of the AAV (e.g., VP1 and/or VP3) in a similar fashion as described with respect to VP2. Likewise, similar approaches (e.g., fusion or tethered) can be used to modified non-AAV capsids of other viral and viral-like delivery systems described herein.

Herpes Simplex Viral Vectors

In some embodiments, the vector is a Herpes Simplex Viral (HSV)-based vector or system thereof. HSV systems can include the disabled infections single copy (DISC) viruses, which are composed of a glycoprotein H defective mutant HSV genome. When the defective HSV is propagated in complementing cells, virus particles can be generated that are capable of infecting subsequent cells permanently replicating their own genome but are not capable of producing more infectious particles. See e.g., 2009. Trobridge. Exp. Opin. Biol. Ther. 9:1427-1436, whose techniques and vectors described therein can be modified and adapted for use in the CRISPR-Cas system of the present invention. In some embodiments where an HSV vector or system thereof is utilized, the host cell can be a complementing cell. In some embodiments, HSV vector or system thereof can be capable of producing virus particles capable of delivering a polynucleotide cargo of up to 150 kb. Thus, in some embodiments the cargo polynucleotide(s) included in the HSV-based viral vector or system thereof can sum from about 0.001 to about 150 kb. HSV-based vectors and systems thereof have been successfully used in several contexts including various models of neurologic disorders. See e.g., Cockrell et al. 2007. Mol. Biotechnol. 36:184-204; Kafri T. 2004. Mol. Biol. 246:367-390; Balaggan and Ali. 2012. Gene Ther. 19:145-153; Wong et al. 2006. Hum. Gen. Ther. 2002. 17:1-9; Azzouz et al. J. Neruosci. 22 L10302-10312; and Betchen and Kaplitt. 2003. Curr. Opin. Neurol. 16:487-493, whose techniques and vectors described therein can be modified and adapted for use with the present disclosure.

Poxvirus Vectors

In some embodiments, the vector can be a poxvirus vector or system thereof. In some embodiments, the poxvirus vector can result in cytoplasmic expression of one or more cargo polynucleotides of the present disclosure. In some embodiments the capacity of a poxvirus vector or system thereof can be about 25 kb or more. In some embodiments, a poxvirus vector or system thereof can include one or more cargo polynucleotides described herein.

Virus Particle Production from Viral Vectors

Retroviral Production

In some embodiments, one or more viral vectors and/or system thereof can be delivered to a suitable cell line for production of virus particles containing the polynucleotide or other payload to be delivered to a host cell. Suitable host cells for virus production from viral vectors and systems thereof described herein are known in the art and are commercially available. For example, suitable host cells include HEK 293 cells and its variants (HEK 293T and HEK 293TN cells). In some embodiments, the suitable host cell for virus production from viral vectors and systems thereof described herein can stably express one or more genes involved in packaging (e.g., pol, gag, and/or VSV-G) and/or other supporting genes.

In some embodiments, after delivery of one or more viral vectors to the suitable host cells for or virus production from viral vectors and systems thereof, the cells are incubated for an appropriate length of time to allow for viral gene expression from the vectors, packaging of the polynucleotide to be delivered (e.g., a genetic modifying system polynucleotide or other polynucleotide of the present disclosure), and virus particle assembly, and secretion of mature virus particles into the culture media. Various other methods and techniques are generally known to those of ordinary skill in the art.

Mature virus particles can be collected from the culture media by a suitable method. In some embodiments, this can involve centrifugation to concentrate the virus. The titer of the composition containing the collected virus particles can be obtained using a suitable method. Such methods can include transducing a suitable cell line (e.g., NIH 3T3 cells) and determining transduction efficiency, infectivity in that cell line by a suitable method. Suitable methods include PCR-based methods, flow cytometry, and antibiotic selection-based methods. Various other methods and techniques are generally known to those of ordinary skill in the art. The concentration of virus particle can be adjusted as needed. In some embodiments, the resulting composition containing virus particles can contain $1 \times 10^1$-$1 \times 10^{20}$ or more particles/mL.

Lentiviruses may be prepared from any lentiviral vector or vector system described herein. In one example embodiment, after cloning a polynucleotide to be delivered into a suitable lentiviral vector (which contains a lentiviral transfer plasmid backbone), HEK293FT at low passage (p=5) can be seeded in a T-75 flask to 50% confluence the day before transfection in DMEM with 10% fetal bovine serum and without antibiotics. After 20 hours, the media can be changed to OptiMEM (serum-free) media and transfection of the lentiviral vectors can done 4 hours later. Cells can be transfected with 10 μg of lentiviral transfer plasmid (pCasES10) and the appropriate packaging plasmids (e.g., 5 μg of pMD2.G (VSV-g pseudotype), and 7.5 g of psPAX2 (gag/pol/rev/tat)). Transfection can be carried out in 4 mL OptiMEM with a cationic lipid delivery agent (50 L Lipofectamine 2000 and 100 L Plus reagent). After 6 hours, the media can be changed to antibiotic-free DMEM with 10% fetal bovine serum. These methods can use serum during cell culture, but serum-free methods are preferred.

Following transfection and allowing the producing cells (also referred to as packaging cells) to package and produce virus particles with packaged cargo, the lentiviral particles can be purified. In an exemplary embodiment, virus-containing supernatants can be harvested after 48 hours. Collected virus-containing supernatants can first be cleared of debris and filtered through a 0.45 m low protein binding (PVDF) filter. They can then be spun in an ultracentrifuge for 2 hours at 24,000 rpm. The resulting virus-containing pellets can be resuspended in 50 μL of DMEM overnight at 4 degrees C. They can be then aliquoted and used immediately or immediately frozen at −80 degrees C. for storage.

See also Merten et al., 2016. "Production of lentiviral vectors." Mol. Ther. 3: 10617 for additional methods and techniques for lentiviral vector and particle production, which can be adapted for use with the present disclosure.

AAV Particle Production

General principles of rAAV production are reviewed in, for example, Carter, 1992, Current Opinions in Biotechnology, 1533-539; and Muzyczka, 1992, Curr. Topics in Microbial. and Immunol., 158:97-129. Various approaches are described in Ratschin et al., Mol. Cell. Biol. 4:2072 (1984); Hermonat et al., Proc. Natl. Acad. Sci. USA, 81:6466 (1984); Tratschin et al., Mol. Cell. Biol. 5:3251 (1985); McLaughlin et al., J. Virol., 62:1963 (1988); and Lebkowski et al., 1988 Mol. Cell. Biol., 7:349 (1988). Samulski et al. (1989, J. Virol., 63:3822-3828); U.S. Pat. No. 5,173,414; WO 95/13365 and corresponding U.S. Pat. No. 5,658,776; WO 95/13392; WO 96/17947; PCT/US98/18600; WO 97/09441 (PCT/US96/14423); WO 97/08298 (PCT/US96/13872); WO 97/21825 (PCT/US96/20777); WO 97/06243 (PCT/FR96/01064); WO 99/11764; Perrin et al. (1995) Vaccine 13:1244-1250; Paul et al. (1993) Human Gene Therapy 4:609-615; Clark et al. (1996) Gene Therapy 3:1124-1132; U.S. Pat. Nos. 5,786,211; 5,871,982; and 6,258,595.

In general, there are two main strategies for producing AAV particles from AAV vectors and systems thereof, such as those described herein, which depend on how the adenovirus helper factors are provided (helper v. helper free). In some embodiments, a method of producing AAV particles from AAV vectors and systems thereof can include adenovirus infection into cell lines that stably harbor AAV replication and capsid encoding polynucleotides along with AAV vector containing the cargo polynucleotide to be packaged and delivered by the resulting AAV particle (e.g., the genetic modifying system polynucleotide(s)). In some embodiments, a method of producing AAV particles from AAV vectors and systems thereof can be a "helper free" method, which includes co-transfection of an appropriate producing cell line with three vectors (e.g., plasmid vectors): (1) an AAV vector that contains a cargo polynucleotide (e.g., the CRISPR-Cas system polynucleotide(s)) between 2 ITRs; (2) a vector that carries the AAV Rep-Cap encoding polynucleotides; and (helper polynucleotides). One of skill in the art will appreciate various methods and variations thereof that are both helper and -helper free and as well as the different advantages of each system. See also Kimur et al., 2019. Sci. Rep. 6:13601; Shin et al., Meth. Mol Biol. 2012. 798:267-284; Negrini et al., 2020. Curr. Prot. Neurosci. 93:e103; Dobrowsky et al., 2021. Curr. Op. Biomed. Eng. 20:100353 for additional methods and techniques for AAV vector and particle production, which can be adapted for use with the present disclosure.

Non-Viral Vectors

In some embodiments, the vector is a non-viral vector or vector system. The term of art "Non-viral vector" and as used herein in this context refers to molecules and/or compositions that are vectors but that are not based on one or more component of a virus or virus genome (excluding any nucleotide to be delivered and/or expressed by the non-viral vector) that can be capable of incorporating cargo polynucleotide(s) and delivering said cargo polynucleotide(s) to a cell and/or expressing the polynucleotide in the cell. It will be appreciated that this does not exclude vectors containing a polynucleotide designed to target a virus-based polynucleotide that is to be delivered. For example, if a gRNA to be delivered is directed against a virus component and it is inserted or otherwise coupled to an otherwise non-viral vector or carrier, this would not make said vector a "viral vector". Non-viral vectors can include, without limitation, naked polynucleotides and polynucleotide (non-viral) based vector and vector systems.

Naked Polynucleotides

In some embodiments one or more polynucleotides of the present disclosure described elsewhere herein can be included in a naked polynucleotide. The term of art "naked polynucleotide" as used herein refers to polynucleotides that are not associated with another molecule (e.g., proteins, lipids, and/or other molecules) that can often help protect it from environmental factors and/or degradation. As used herein, associated with includes, but is not limited to, linked to, adhered to, adsorbed to, enclosed in, enclosed in or within, mixed with, and the like. Naked polynucleotides that include one or more of the cargo polynucleotides described herein can be delivered directly to a host cell and optionally expressed therein. The naked polynucleotides can have any suitable two- and three-dimensional configurations. By way of non-limiting examples, naked polynucleotides can be single-stranded molecules, double stranded molecules, circular molecules (e.g., plasmids and artificial chromosomes), molecules that contain portions that are single stranded and portions that are double stranded (e.g., ribozymes), and the like. In some embodiments, the naked polynucleotide contains only the cargo polynucleotide(s). In some embodiments, the naked polynucleotide can contain other nucleic acids and/or polynucleotides in addition to the cargo polynucleotide(s). The naked polynucleotides can include one or more elements of a transposon system. Transposons and system thereof are described in greater detail elsewhere herein.

Non-Viral Polynucleotide Vectors

In some embodiments, one or more of the polynucleotides of the present disclosure can be included in a non-viral polynucleotide vector. Suitable non-viral polynucleotide vectors include, but are not limited to, transposon vectors and vector systems, plasmids, bacterial artificial chromosomes, yeast artificial chromosomes, AR (antibiotic resistance)-free plasmids and miniplasmids, circular covalently closed vectors (e.g. minicircles, minivectors, miniknots,), linear covalently closed vectors ("dumbbell shaped"), MIDGE (minimalistic immunologically defined gene expression) vectors, MiLV (micro-linear vector) vectors, Ministrings, mini-intronic plasmids, PSK systems (post-segregationally killing systems), ORT (operator repressor titration) plasmids, and the like. See e.g., Hardee et al. 2017. Genes. 8(2):65.

In some embodiments, the non-viral polynucleotide vector can have a conditional origin of replication. In some embodiments, the non-viral polynucleotide vector can be an ORT plasmid. In some embodiments, the non-viral polynucleotide vector can have a minimalistic immunologically defined gene expression. In some embodiments, the non-viral polynucleotide vector can have one or more post-segregationally killing system genes. In some embodiments, the non-viral polynucleotide vector is AR-free. In some embodiments, the non-viral polynucleotide vector is a mini-vector. In some embodiments, the non-viral polynucleotide vector includes a nuclear localization signal. In some embodiments, the non-viral polynucleotide vector can include one or more CpG motifs. In some embodiments, the non-viral polynucleotide vectors can include one or more scaffold/matrix attachment regions (S/MARs). See e.g., Mirkovitch et al. 1984. Cell. 39:223-232, Wong et al. 2015. Adv. Genet. 89:113-152, whose techniques and vectors can be adapted for use in the present invention. S/MARs are AT-rich sequences that play a role in the spatial organization of chromosomes through DNA loop base attachment to the nuclear matrix. S/MARs are often found close to regulatory elements such as promoters, enhancers, and origins of DNA replication. Inclusion of one or S/MARs can facilitate a once-per-cell-cycle replication to maintain the non-viral polynucleotide vector as an episome in daughter cells. In certain embodiments, the S/MAR sequence is located downstream of an actively transcribed polynucleotide (e.g., one or more cargo polynucleotides) included in the non-viral polynucleotide vector. In some embodiments, the S/MAR can be a S/MAR from the beta-interferon gene cluster. See e.g., Verghese et al. 2014. Nucleic Acid Res. 42:e53; Xu et al. 2016. Sci. China Life Sci. 59:1024-1033; Jin et al. 2016. 8:702-711; Koirala et al. 2014. Adv. Exp. Med. Biol. 801: 703-709; and Nehlsen et al. 2006. Gene Ther. Mol. Biol. 10:233-244, whose techniques and vectors can be adapted for use in the present invention.

In some embodiments, the non-viral vector is a transposon vector or system thereof. As used herein, "transposon" (also referred to as transposable element) refers to a polynucleotide sequence that is capable of moving form location in a genome to another. There are several classes of transposons. Transposons include retrotransposons and DNA transposons. Retrotransposons require the transcription of the polynucleotide that is moved (or transposed) in order to transpose the polynucleotide to a new genome or polynucleotide. DNA transposons are those that do not require reverse transcription of the polynucleotide that is moved (or transposed) in order to transpose the polynucleotide to a new genome or polynucleotide. In some embodiments, the non-viral polynucleotide vector can be a retrotransposon vector. In some embodiments, the retrotransposon vector includes long terminal repeats. In some embodiments, the retrotransposon vector does not include long terminal repeats. In some embodiments, the non-viral polynucleotide vector can be a DNA transposon vector. DNA transposon vectors can include a polynucleotide sequence encoding a transposase. In some embodiments, the transposon vector is configured as a non-autonomous transposon vector, meaning that the transposition does not occur spontaneously on its own. In some of these embodiments, the transposon vector lacks one or more polynucleotide sequences encoding proteins required for transposition. In some embodiments, the non-autonomous transposon vectors lack one or more Ac elements.

In some embodiments a non-viral polynucleotide transposon vector system can include a first polynucleotide vector that contains the cargo polynucleotide(s) of the present invention flanked on the 5' and 3' ends by transposon terminal inverted repeats (TIRs) and a second polynucleotide vector that includes a polynucleotide capable of encoding a transposase coupled to a promoter to drive expression of the transposase. When both are expressed in the same cell the transposase can be expressed from the second vector and can transpose the material between the TIRs on the first vector (e.g., the cargo polynucleotide(s) of the present invention) and integrate it into one or more positions in the host cell's genome. In some embodiments the transposon vector or system thereof can be configured as a gene trap. In some embodiments, the TTRs can be configured to flank a strong splice acceptor site followed by a reporter and/or other gene (e.g., one or more of the cargo polynucleotide(s) of the present invention) and a strong poly A tail. When transposition occurs while using this vector or system thereof, the transposon can insert into an intron of a gene and the inserted reporter or other gene can provoke a mis-splicing process and as a result it in activates the trapped gene.

Any suitable transposon system can be used. Suitable transposon and systems thereof can include without limitation Sleeping Beauty transposon system (Tc 1/mariner superfamily) (see e.g., Ivics et al. 1997. Cell. 91(4): 501-510), piggyBac (piggyBac superfamily) (see e.g., Li et al. 2013 110(25): E2279-E2287 and Yusa et al. 2011. PNAS. 108(4): 1531-1536), Tol2 (superfamily hAT), Frog Prince (Tc1/mariner superfamily) (see e.g., Miskey et al. 2003 Nucleic Acid Res. 31(23):6873-6881) and variants thereof.

Non-Vector Delivery Vehicles

The delivery vehicles may comprise non-vector vehicles. In general, methods and vehicles capable of delivering nucleic acids and/or proteins may be used for delivering the systems compositions herein. Examples of non-vector vehicles include lipid nanoparticles, cell-penetrating peptides (CPPs), DNA nanoclews, metal nanoparticles, streptolysin O, multifunctional envelope-type nanodevices (MENDs), lipid-coated mesoporous silica particles, and other inorganic nanoparticles.

Lipid Particles

The delivery vehicles can include or be composed of lipid particles, e.g., lipid nanoparticles (LNPs) and liposomes. Lipofection is described in e.g., U.S. Pat. Nos. 5,049,386, 4,946,787; and 4,897,355) and lipofection reagents are sold commercially (e.g., Transfectam™ and Lipofectin™). Cationic and neutral lipids that are suitable for efficient receptor-recognition lipofection of polynucleotides include those of Felgner, International Patent Publication Nos. WO 91/17424 and WO 91/16024. The preparation of lipid: nucleic acid complexes, including targeted liposomes such as immunolipid complexes, is well known to one of skill in the art (see, e.g., Crystal, Science 270:404-410 (1995); Blaese et al., Cancer Gene Ther. 2:291-297 (1995); Behr et al., Bioconjugate Chem. 5:382-389 (1994); Remy et al., Bioconjugate Chem. 5:647-654 (1994); Gao et al., Gene Therapy 2:710-722 (1995); Ahmad et al., Cancer Res. 52:4817-4820 (1992); U.S. Pat. Nos. 4,186,183, 4,217,344, 4,235,871, 4,261,975, 4,485,054, 4,501,728, 4,774,085, 4,837,028, and 4,946,787).

Lipid Nanoparticles (LNPs)

LNPs may encapsulate nucleic acids within cationic lipid particles (e.g., liposomes), and may be delivered to cells with relative ease. In some examples, lipid nanoparticles do not contain any viral components, which helps minimize safety and immunogenicity concerns. Lipid particles may be used for in vitro, ex vivo, and in vivo deliveries. Lipid particles may be used for various scales of cell populations.

In some examples. LNPs may be used for delivering DNA molecules (e.g., those comprising coding sequences of a cargo polypeptide) and/or RNA molecules (e.g., mRNA of encoding a cargo polypeptide and/or other RNA cargos such as gRNAs). In certain cases, LNPs may be use for delivering RNP complexes of e.g., Cas/gRNA.

Components in LNPs may comprise cationic lipids 1,2-dilinoleoyl-3-dimethylammonium-propane (DLinDAP), 1,2-dilinoleoyloxy-3-N,N-dimethylaminopropane (DLinDMA), 1,2-dilinoleyloxyketo-N,N-dimethyl-3-aminopropane (DLinK-DMA), 1,2-dilinoleyl-4-(2-dimethylaminoethyl)-[1,3]-dioxolane (DLinKC2-DMA), 3-ω-[2"-(methoxypolyethyleneglycol 2000) succinoyl]-1,2-dimyristoyl-sn-glycol (PEG-S-DMG), R-3-[(ω-methoxy-poly(ethyleneglycol)2000) carbamoyl]-1,2-dimyristyloxlpropyl-3-amine (PEG-c-DOMG, and any combination thereof. Preparation of LNPs and encapsulation may be adapted from Rosin et al, Molecular Therapy, vol. 19, no. 12, pages 1286-2200, December 2011).

In some embodiments, an LNP delivery vehicle can be used to deliver a virus particle containing cargo polypeptides or polynucleotides. In some embodiments, the virus particle (s) can be adsorbed to the lipid particle, such as through electrostatic interactions, and/or can be attached to the liposomes via a linker.

In some embodiments, the LNP contains a nucleic acid, wherein the charge ratio of nucleic acid backbone phosphates to cationic lipid nitrogen atoms is about 1: 1.5-7 or about 1:4.

In some embodiments, the LNP also includes a shielding compound, which is removable from the lipid composition under in vivo conditions. In some embodiments, the shielding compound is a biologically inert compound. In some embodiments, the shielding compound does not carry any charge on its surface or on the molecule as such. In some embodiments, the shielding compounds are polyethylene glycols (PEGs), hydroxyethylglucose (HEG) based polymers, polyhydroxyethyl starch (polyHES) and polypropylene. In some embodiments, the PEG, HEG, polyHES, and a polypropylene weight between about 500 to 10,000 Da or between about 2000 to 5000 Da. In some embodiments, the shielding compound is PEG2000 or PEG5000.

In some embodiments, the LNP can include one or more helper lipids. In some embodiments, the helper lipid can be a phosphor lipid or a steroid. In some embodiments, the helper lipid is between about 20 mol % to 80 mol % of the total lipid content of the composition. In some embodiments, the helper lipid component is between about 35 mol % to 65 mol % of the total lipid content of the LNP. In some embodiments, the LNP includes lipids at 50 mol % and the helper lipid at 50 mol % of the total lipid content of the LNP.

Other non-limiting, exemplary LNP delivery vehicles are described in U.S. Patent Publication Nos. US 20160174546, US 20140301951, US 20150105538, US 20150250725, Wang et al., J. Control Release, 2017 Jan. 31. pii: 50168-3659(17)30038-X. doi: 10.1016/j.jconrel.2017.01.037.; Altmoğlu et al., Biomater Sci., 4(12):1773-80, Nov. 15, 2016; Wang et al., PNAS, 113(11):2868-73 Mar. 15, 2016; Wang et al., PloS One, 10(11): e0141860. doi: 10.1371/journal.pone.0141860. eCollection 2015, Nov. 3, 2015; Takeda et al., Neural Regen Res. 10(5):689-90, May 2015; Wang et al., Adv. Healthc Mater., 3(9):1398-403, September 2014; and Wang et al., Agnew Chem Int Ed Engl., 53(11): 2893-8, Mar. 10, 2014; James E. Dahlman and Carmen Barnes et al. Nature Nanotechnology (2014) published online 11 May 2014, doi:10.1038/nnano.2014.84; Coelho et al., N Engl J Med 2013; 369:819-29; Aleku et al., Cancer Res., 68(23): 9788-98 (Dec. 1, 2008), Strumberg et al., Int. J. Clin. Pharmacol. Ther., 50(1): 76-8 (January 2012), Schultheis et al., J. Clin. Oncol., 32(36): 4141-48 (Dec. 20, 2014), and Fehring et al., Mol. Ther., 22(4): 811-20 (Apr. 22, 2014); Novobrantseva, Molecular Therapy-Nucleic Acids (2012) 1, e4; doi:10.1038/mtna.2011.3; WO2012135025; US 20140348900; US 20140328759; US 20140308304; WO 2005/105152; WO 2006/069782; WO 2007/121947; US 2015/082080; US 20120251618; U.S. Pat. Nos. 7,982, 027; 7,799,565; 8,058,069; 8,283,333; 7,901,708; 7,745, 651; 7,803,397; 8,101,741; 8,188,263; 7,915,399; 8,236,943 and 7,838,658 and European Pat. Nos 1766035; 1519714; 1781593 and 1664316.

Liposomes

In some embodiments, a lipid particle may be liposome. Liposomes are spherical vesicle structures composed of a uni- or multilamellar lipid bilayer surrounding internal aqueous compartments and a relatively impermeable outer lipophilic phospholipid bilayer. In some embodiments, liposomes are biocompatible, nontoxic, can deliver both hydrophilic and lipophilic drug molecules, protect their cargo from degradation by plasma enzymes, and transport their load across biological membranes and the blood brain barrier (BBB).

Liposomes can be made from several different types of lipids, e.g., phospholipids. A liposome may comprise natural phospholipids and lipids such as 1,2-distearoryl-sn-glycero-3-phosphatidyl choline (DSPC), sphingomyelin, egg phosphatidylcholines, monosialoganglioside, or any combination thereof.

Several other additives may be added to liposomes in order to modify their structure and properties. For instance, liposomes may further comprise cholesterol, sphingomyelin, and/or 1,2-dioleoyl-sn-glycero-3-phosphoethanolamine (DOPE), e.g., to increase stability and/or to prevent the leakage of the liposomal inner cargo.

In some embodiments, a liposome delivery vehicle can be used to deliver a virus particle containing cargo polypeptide (s) and/or polynucleotide(s). In some embodiments, the virus particle(s) can be adsorbed to the liposome, such as through electrostatic interactions, and/or can be attached to the liposomes via a linker.

In some embodiments, the liposome can be a Trojan Horse liposome (also known in the art as Molecular Trojan Horses), see e.g., cshprotocols.cshlp.org/content/2010/4/pdb.prot5407.long, the teachings of which can be applied and/or adapted to generated and/or deliver the genetic modifying systems and/or other cargo polypeptides or polynucleotides described herein.

Other non-limiting, exemplary liposomes can be those as set forth in Wang et al., ACS Synthetic Biology, 1, 403-07 (2012); Wang et al., PNAS, 113(11) 2868-2873 (2016); Spuch and Navarro, Journal of Drug Delivery, vol. 2011, Article ID 469679, 12 pages, 2011. doi:10.1155/2011/469679; WO 2008/042973; U.S. Pat. No. 8,071,082; WO 2014/186366; 20160257951; US 20160129120; US 20160244761; US 20120251618; WO 2013/093648; Lipofectin (a combination of DOTMA and DOPE), Lipofectase, LIPOFECTAMINE® (e.g., LIPOFECTAMINE® 2000, LIPOFECTAMINE® 3000, LIPOFECTAMINE® RNAiMAX, LIPOFECTAMINE® LTX), SAINT-RED (Synvolux Therapeutics, Groningen Netherlands), DOPE, Cytofectin (Gilead Sciences, Foster City, Calif), and Eufectins (JBL, San Luis Obispo, Calif.).

Stable Nucleic-Acid-Lipid Particles (SNALPs)

In some embodiments, the lipid particles contain or are composed entirely of stable nucleic acid lipid particles (SNALPs). SNALPs may comprise an ionizable lipid (DLinDMA) (e.g., cationic at low pH), a neutral helper lipid, cholesterol, a diffusible polyethylene glycol (PEG)-lipid, or any combination thereof. In some examples, SNALPs may comprise synthetic cholesterol, dipalmitoylphosphatidylcholine, 3-N-[(w-methoxy polyethylene glycol)2000 carbamoyl]-1,2-dimyrestyloxypropylamine, and cationic 1,2-dilinoleyloxy-3-N,Ndimethylaminopropane. In some examples, SNALPs may comprise synthetic cholesterol, 1,2-distearoyl-sn-glycero-3-phosphocholine, PEG-cDMA, and 1,2-dilinoleyloxy-3-(N;N-dimethyl)aminopropane (DLinDMAo).

Other non-limiting, exemplary SNALPs that can be used to deliver the cargos described herein can be any such SNALPs as described in Morrissey et al., Nature Biotechnology, Vol. 23, No. 8, August 2005, Zimmerman et al., Nature Letters, Vol. 441, 4 May 2006; Geisbert et al., Lancet 2010; 375: 1896-905; Judge, J. Clin. Invest. 119:661-673 (2009); and Semple et al., Nature Biotechnology, Volume 28 Number 2 Feb. 2010, pp. 172-177.

Other Lipids

The lipid particles may also comprise one or more other types of lipids, e.g., cationic lipids, such as amino lipid 2,2-dilinoleyl-4-dimethylaminoethyl-[1,3]-dioxolane (DLin-KC2-DMA), DLin-KC2-DMA4, C12-200 and colipids disteroylphosphatidyl choline, cholesterol, and PEG-DMG.

In some embodiments, the delivery vehicle can be or include a lipidoid, such as any of those set forth in, for example, US 20110293703.

In some embodiments, the delivery vehicle can be or include an amino lipid, such as any of those set forth in, for example, Jayaraman, Angew. Chem. Int. Ed. 2012, 51, 8529-8533.

In some embodiments, the delivery vehicle can be or include a lipid envelope, such as any of those set forth in, for example, Korman et al., 2011. Nat. Biotech. 29:154-157.

Lipoplexes/Polyplexes

In some embodiments, the delivery vehicles contain or be composed entirely of lipoplexes and/or polyplexes. Lipoplexes may bind to negatively charged cell membrane and induce endocytosis into the cells. Examples of lipoplexes may be complexes comprising lipid(s) and non-lipid components. Examples of lipoplexes and polyplexes include FuGENE-6 reagent, a non-liposomal solution containing lipids and other components, zwitterionic amino lipids (ZALs), Ca2p (e.g., forming DNA/$Ca^{2+}$ microcomplexes), polyethenimine (PEI) (e.g., branched PEI), and poly(L-lysine) (PLL).

Sugar-Based Particles

In some embodiments, the delivery vehicle can be a sugar-based particle. In some embodiments, the sugar-based particles can be or include GalNAc, such as any of those described in WO2014118272; US 20020150626; Nair, J K et al., 2014, Journal of the American Chemical Society 136 (49), 16958-16961; østergaard et al., Bioconjugate Chem., 2015, 26 (8), pp 1451-1455.

Cell Penetrating Peptides

In some embodiments, the delivery vehicles contain or are composed entirely of cell penetrating peptides (CPPs). CPPs are short peptides that facilitate cellular uptake of various molecular cargo (e.g., from nanosized particles to small chemical molecules and large fragments of DNA).

CPPs may be of different sizes, amino acid sequences, and charges. In some examples, CPPs can translocate the plasma membrane and facilitate the delivery of various molecular cargoes to the cytoplasm or an organelle. CPPs may be introduced into cells via different mechanisms, e.g., direct penetration in the membrane, endocytosis-mediated entry, and translocation through the formation of a transitory structure.

CPPs may have an amino acid composition that either contains a high relative abundance of positively charged amino acids such as lysine or arginine or has sequences that contain an alternating pattern of polar/charged amino acids and non-polar, hydrophobic amino acids. These two types of structures are referred to as polycationic or amphipathic, respectively. A third class of CPPs are the hydrophobic peptides, containing only apolar residues, with low net charge or have hydrophobic amino acid groups that are crucial for cellular uptake. Another type of CPPs is the trans-activating transcriptional activator (Tat) from Human Immunodeficiency Virus 1 (HIV-1). Examples of CPPs include to Penetratin, Tat (48-60), Transportan, and (R-AhX-R4) (Ahx refers to aminohexanoyl), Kaposi fibroblast growth factor (FGF) signal peptide sequence, integrin β3 signal peptide sequence, polyarginine peptide Args sequence, Guanine rich-molecular transporters, and sweet arrow peptide. Examples of CPPs and related applications also include those described in U.S. Pat. No. 8,372,951.

CPPs can be used for in vitro and ex vivo work quite readily, and extensive optimization for each cargo and cell type is usually required. In some examples, CPPs may be covalently attached to the Cas protein directly, which is then complexed with the gRNA and delivered to cells. In some examples, separate delivery of CPP-Cas and CPP-gRNA to multiple cells may be performed. CPP may also be used to delivery RNPs.

CPPs may be used to deliver the compositions and systems to plants. In some examples, CPPs may be used to deliver the components to plant protoplasts, which are then regenerated to plant cells and further to plants.

DNA Nanoclews

In some embodiments, the delivery vehicles contain or are composed entirely of DNA nanoclews. A DNA nanoclew refers to a sphere-like structure of DNA (e.g., with a shape of a ball of yarn). The nanoclew may be synthesized by rolling circle amplification with palindromic sequences that aide in the self-assembly of the structure. The sphere may then be loaded with a payload. An example of DNA nanoclew is described in Sun W et al, J Am Chem Soc. 2014 Oct. 22; 136(42):14722-5; and Sun W et al, Angew Chem Int Ed Engl. 2015 Oct. 5; 54(41):12029-33. DNA nanoclew may have a palindromic sequences to be partially complementary to the gRNA within the Cas:gRNA ribonucleoprotein complex. A DNA nanoclew may be coated, e.g., coated with PEI to induce endosomal escape.

Metal Nanoparticles in some embodiments, the delivery vehicles contain or are composed entirely of metal nanoparticles. In some embodiments, the delivery vehicles contain or are composed entirely of gold nanoparticles (also referred to AuNPs or colloidal gold). Gold nanoparticles may form complex with cargos, e.g., Cas:gRNA RNP. Gold nanoparticles may be coated, e.g., coated in a silicate and an endosomal disruptive polymer, PAsp(DET). Examples of gold nanoparticles include AuraSense Therapeutics' Spherical Nucleic Acid (SNA™) constructs, and those described in Mout R, et al. (2017). ACS Nano 11:2452-8; Lee K, et al. (2017). Nat Biomed Eng 1:889-901. Other metal nanoparticles can also be complexed with cargo(s). Such metal nanoparticles include, without limitation, tungsten, palladium, rhodium, platinum, and iridium particles. Other non-limiting, exemplary metal nanoparticles suitable for delivery vehicles are described in US 20100129793.

iTOP

In some embodiments, the delivery vehicles contain or are composed entirely of iTOP. iTOP refers to a combination of small molecules drives the highly efficient intracellular delivery of native proteins, independent of any transduction peptide. iTOP may be used for induced transduction by osmocytosis and propanebetaine, using NaCl-mediated hyperosmolality together with a transduction compound (propanebetaine) to trigger macropinocytotic uptake into cells of extracellular macromolecules. Examples of iTOP methods and reagents include those described in D'Astolfo D S, Pagliero R J, Pras A, et al. (2015). Cell 161:674-690.

Polymer-Based Particles

In some embodiments, the delivery vehicles contain or are composed entirely of polymer-based particles (e.g., nanoparticles). In some embodiments, the polymer-based particles may mimic a viral mechanism of membrane fusion. The polymer-based particles may be a synthetic copy of Influenza virus machinery and form transfection complexes with various types of nucleic acids (siRNA, miRNA, plasmid DNA or shRNA, mRNA) that cells take up via the endocytosis pathway, a process that involves the formation of an acidic compartment. The low pH in late endosomes acts as a chemical switch that renders the particle surface hydrophobic and facilitates membrane crossing. Once in the cytosol, the particle releases its payload for cellular action. This Active Endosome Escape technology is safe and maximizes transfection efficiency as it is using a natural uptake pathway. In some embodiments, the polymer-based particles may comprise alkylated and carboxyalkylated branched polyethylenimine. In some examples, the polymer-based particles are VIROME®, e.g., VIROME® RNAi, VIROME® RED, VIROME® mRNA, VIROME® CRISPR. Example methods of delivering the systems and compositions herein include those described in Bawage S S et al., Synthetic mRNA expressed Cas13a mitigates RNA virus infections, www.biorxiv.org/content/10.1101/370460v1.full doi: doi.org/10.1101/370460, Viromer® RED, a powerful tool for transfection of keratinocytes. doi: 10.13140/RG.2.2.16993.61281, Viromer® Transfection— Factbook 2018: technology, product overview, users' data., doi:10.13140/RG.2.2.23912.16642. Other exemplary and non-limiting polymeric particles suitable for delivery vehicles are described in US 20170079916, US 20160367686, US 20110212179, US 20130302401, U.S. Pat. Nos. 6,007,845, 5,855,913, 5,985,309, 5,543,158, WO2012135025, US 20130252281, US 20130245107, US 20130244279; US 20050019923, 20080267903.

Streptolysin O (SLO)

The delivery vehicles can contain or be composed entirely of streptolysin 0 (SLO). SLO is a toxin produced by Group A streptococci that works by creating pores in mammalian cell membranes. SLO may act in a reversible manner, which allows for the delivery of proteins (e.g., up to 100 kDa) to the cytosol of cells without compromising overall viability. Examples of SLO include those described in Sierig G, et al. (2003). Infect Immun 71:446-55; Walev I, et al. (2001). Proc Natl Acad Sci USA 98:3185-90; Teng K W, et al. (2017). Elife 6:e25460.

Multifunctional Envelope-Type Nanodevice (MEND)

The delivery vehicles can contain or be composed entirely of multifunctional envelope-type nanodevice (MENDs). MENDs may comprise condensed plasmid DNA, a PLL core, and a lipid film shell. A MEND may further comprise cell-penetrating peptide (e.g., stearyl octaarginine). The cell penetrating peptide may be in the lipid shell. The lipid envelope may be modified with one or more functional components, e.g., one or more of: polyethylene glycol (e.g., to increase vascular circulation time), ligands for targeting of specific tissues/cells, additional cell-penetrating peptides (e.g., for greater cellular delivery), lipids to enhance endosomal escape, and nuclear delivery tags. In some examples, the MEND may be a tetra-lamellar MEND (T-MEND), which may target the cellular nucleus and mitochondria. In certain examples, a MEND may be a PEG-peptide-DOPE-conjugated MEND (PPD-MEND), which may target bladder cancer cells. Examples of MENDs include those described in Kogure K, et al. (2004). J Control Release 98:317-23; Nakamura T, et al. (2012). Acc Chem Res 45:1113-21.

Lipid-Coated Mesoporous Silica Particles

The delivery vehicles can contain or be composed entirely of lipid-coated mesoporous silica particles. Lipid-coated mesoporous silica particles may comprise a mesoporous silica nanoparticle core and a lipid membrane shell. The silica core may have a large internal surface area, leading to high cargo loading capacities. In some embodiments, pore sizes, pore chemistry, and overall particle sizes may be modified for loading different types of cargos. The lipid coating of the particle may also be modified to maximize cargo loading, increase circulation times, and provide precise targeting and cargo release. Examples of lipid-coated mesoporous silica particles include those described in Du X, et al. (2014). Biomaterials 35:5580-90; Durfee P N, et al. (2016). ACS Nano 10:8325-45.

Inorganic Nanoparticles

The delivery vehicles can contain or be composed entirely of inorganic nanoparticles. Examples of inorganic nanoparticles include carbon nanotubes (CNTs) (e.g., as described in Bates K and Kostarelos K. (2013). Adv Drug Deliv Rev 65:2023-33.), bare mesoporous silica nanoparticles (MSNPs) (e.g., as described in Luo G F, et al. (2014). Sci Rep 4:6064), and dense silica nanoparticles (SiNPs) (as described in Luo D and Saltzman W M. (2000). Nat Biotechnol 18:893-5).

Exosomes

The delivery vehicles can contain or be composed entirely of exosomes. Exosomes include membrane bound extracellular vesicles, which can be used to contain and delivery various types of biomolecules, such as proteins, carbohydrates, lipids, and nucleic acids, and complexes thereof (e.g., RNPs). Examples of exosomes include those described in Schroeder A, et al., J Intern Med. 2010 January; 267(1):9-21; El-Andaloussi S, et al., Nat Protoc. 2012 December; 7(12):2112-26; Uno Y, et al., Hum Gene Ther. 2011 June; 22(6):711-9; Zou W, et al., Hum Gene Ther. 2011 April; 22(4):465-75.

In some examples, the exosome forms a complex (e.g., by binding directly or indirectly) to one or more components of the cargo. In certain examples, a molecule of an exosome may be fused with first adapter protein and a component of the cargo may be fused with a second adapter protein. The first and the second adapter protein may specifically bind each other, thus associating the cargo with the exosome. Examples of such exosomes include those described in Ye Y, et al., Biomater Sci. 2020 Apr. 28. doi: 10.1039/dObm00427h.

Other non-limiting, exemplary exosomes include any of those set forth in Alvarez-Erviti et al. 2011, Nat Biotechnol 29: 341; El-Andaloussi et al. Nature Protocols 7:2112-2126 (2012); and Wahlgren et al. (Nucleic Acids Research, 2012, Vol. 40, No. 17 e130).

Spherical Nucleic Acids (SNAs)

Spherical nucleic acids (SNA) are three-dimensional arrangements of nucleic acids, with densely packed and radially arranged oligonucleotides on a central nanoparticle core. In its simplest form the SNA is composed of oligonucleotides and a core. In some embodiments, the delivery vehicle can contain or be composed entirely of SNAs. SNAs are three dimensional nanostructures that can be composed of densely functionalized and highly oriented nucleic acids that can be covalently attached to the surface of spherical nanoparticle cores. The core may be a hollow core which is produced by a 3-dimensional arrangement of molecules which form the outer boundary of the core. For instance, the molecules may be in the form of a lipid layer or bilayer which has a hollow center. In other embodiments, the molecules may be in the form of lipids, such as amphipathic lipids, i.e., sterols which are linked to an end the oligonucleotide. Sterols such as cholesterol linked to an end of an oligonucleotide may associate with one another and form the outer edge of a hollow core with the oligonucleotides radiating outward from the core. The core may also be a solid or semi-solid core.

The oligonucleotides to be delivered can be associated with the core of an SNP. An oligonucleotide that is associated with the core may be covalently linked to the core or non-covalently linked to the core, i.e., potentially through hydrophobic interactions. For instance, when a sterol forms the outer edge of the core an oligonucleotide may be covalently linked to the sterol directly or indirectly. When a lipid layer forms the core, the oligonucleotide may be covalently linked to the lipid or may be non-covalently linked to the lipids e.g., by interactions with the oligonucleotide or a molecule such as a cholesterol attached to the oligonucleotide directly or indirectly through a linker.

A spherical nucleic acid (SNA) can be functionalized in order to attach a polynucleotide. Alternatively or additionally, the polynucleotide can be functionalized. One mechanism for functionalization is the alkanethiol method, whereby oligonucleotides are functionalized with alkanethiols at their 3' or 5' termini prior to attachment to gold nanoparticles or nanoparticles comprising other metals, semiconductors or magnetic materials. Such methods are described, for example Whitesides, Proceedings of the Robert A. Welch Foundation 39th Conference on Chemical Research Nanophase Chemistry, Houston, Tex., pages 109-121 (1995), and Mucic et al. Chem. Commun. 555-557 (1996). Oligonucleotides can also be attached to nanoparticles using other functional groups such as phosphonothioate groups, as described in and incorporated by reference from U.S. Pat. No. 5,472,881, or substituted alkylsiloxanes, as described in and incorporated by reference from Burwell, Chemical Technology, 4, 370-377 (1974) and Matteucci and Caruthers, J. Am. Chem. Soc., 103, 3185-3191 (1981). In some instances, oligonucleotides are attached to nanoparticles by terminating the polynucleotide with a 5' or 3' thionucleoside. In other instances, an aging process is used to attach oligonucleotides to nanoparticles as described in and incorporated by reference from U.S. Pat. Nos. 6,361,944, 6,506,569, 6,767,702 and 6,750,016 and PCT Publication Nos. WO 1998/004740, WO 2001/000876, WO 2001/051665 and WO 2001/073123. In some embodiments, the core is a metal core. In some embodiments, the core is an inorganic metal core. In some embodiments, the core is a gold core.

In some instances, the oligonucleotide is attached or inserted in the SNA. A spacer sequence can be included between the attachment site and the oligonucleotide. In some embodiments, a spacer sequence comprises or consists of an oligonucleotide, a peptide, a polymer or an oligoethylene glycol. In a preferred embodiment, the spacer is oligoethylene glycol and more preferably, hexaethyleneglycol.

Non-limiting, exemplary SNAs can be any of those set forth in Cutler et al., J. Am. Chem. Soc. 2011 133:9254-9257, Hao et al., Small. 2011 7:3158-3162, Zhang et al., ACS Nano. 2011 5:6962-6970, Cutler et al., J. Am. Chem. Soc. 2012 134:1376-1391, Young et al., Nano Lett. 2012 12:3867-71, Zheng et al., Proc. Natl. Acad. Sci. USA. 2012 109:11975-80, Mirkin, Nanomedicine 2012 7:635-638 Zhang et al., J. Am. Chem. Soc. 2012 134:16488-1691, Weintraub, Nature 2013 495:S14-S16, Choi et al., Proc. Natl. Acad. Sci. USA. 2013 110(19):7625-7630, Jensen et al., Sci. Transl. Med. 5, 209ra152 (2013) and Mirkin, et al., U.S. Pat. App. Pub. US20210002640 and US20200188521.

Self-Assembling Nanoparticles

In some embodiments, the delivery vehicle contains or is composed entirely of a self-assembling nanoparticle. The self-assembling nanoparticles can contain one or more polymers. The self-assembling nanoparticles can be PEGylated. Self-assembling nanoparticles are known in the art. Non-limiting, exemplary self-assembling nanoparticles can any as set forth in Schiffelers et al., Nucleic Acids Research, 2004, Vol. 32, No. 19, Bartlett et al. PNAS, Sep. 25, 2007,vol. 104, no. 39; Davis et al., Nature, Vol 464, 15 Apr. 2010.

Supercharged Proteins

In some embodiments, the delivery vehicle contains or is composed entirely of supercharged protein. As used herein "Supercharged proteins" are a class of engineered or naturally occurring proteins with unusually high positive or negative net theoretical charge. Non-limiting, exemplary supercharged proteins can be any of those set forth in Lawrence et al., 2007, Journal of the American Chemical Society 129, 10110-10112.

Targeted Delivery

In some embodiments, the delivery vehicle is configured for targeted delivery to a specific cell, tissue, organ, or system. In such embodiments, the delivery vehicle can include one or more targeting moieties that can direct targeted delivery of the cargo(s). In an embodiment, the delivery vehicle comprises a targeting moiety, such as on its surface. Exemplary targeting moieties include, without limitation, small molecule, polypeptide, and/or polynucleotide ligands for cell surface molecules, antibodies, affibodies, aptamers, or any combination thereof. In some embodiments, a targeted delivery vehicle can be generated by coupling, conjugating, attaching, or otherwise associating a targeting moiety with a delivery vehicle described elsewhere herein. In some embodiments, multiple targeting moieties with different targets are coupled to a delivery vehicle. In some embodiments a multivalent approach can be employed. Multivalent presentation of targeting moieties (e.g., antibodies) can also increase the uptake and signaling properties of targeting moiety fragments. In some embodiments, targeted delivery can be to one cell type or to multiple cell types. Methods of coupling conjugating, attaching, or otherwise associating a targeting moiety with a delivery vehicle are generally known in the art.

In some embodiments, the targeting moiety is an aptamer. Aptamers are ssDNA or RNA oligonucleotides that impart high affinity and specific recognition of the target molecules by electrostatic interactions, hydrogen bonding and hydrophobic interactions as opposed to the Watson-Crick base pairing, which is typical for the bonding interactions of oligonucleotides. Aptamers as a targeting moiety can have advantages over antibodies: aptamers can demonstrate higher target antigen recognition as compared with antibodies; aptamers can be more stable and smaller in size as compared with antibodies; aptamers can be easily synthesized and chemically modified for molecular conjugation; and aptamers can be changed in sequence for improved selectivity and can be developed to recognize poorly immunogenic targets.

Targeted delivery includes intracellular delivery. Delivery vehicles that utilize the endocytic pathway are entrapped in the endosomes (pH 6.5-6) and subsequently fuse with lysosomes (pH<5), where they undergo degradation that results in a lower therapeutic potential. The low endosomal pH can be taken advantage of to escape degradation. Fusogenic lipids or peptides, which destabilize the endosomal membrane after the conformational transition/activation at a lowered pH can be included in the delivery vehicle. Such lipids or peptides can include amines, which are protonated at an acidic pH and cause endosomal swelling and rupture by a buffer effect, pore-forming protein listeriolysin O, histidine-rich peptides have the ability to fuse with the endosomal membrane, resulting in pore formation, and can buffer the proton pump causing membrane lysis, and/or unsaturated dioleoylphosphatidylethanolamine (DOPE) that readily adopt an inverted hexagonal shape at a low pH and causes fusion of liposomes to the endosomal membrane. Inclusion of such molecules can result in an efficient endosomal release and/or may provide an endosomal escape mechanism to increase cargo delivery by the vehicle.

In some embodiments, the delivery vehicle is or includes modified CPP(s) that can facilitate intracellular delivery via macropinocytosis followed by endosomal escape. CPPs are described in greater detail elsewhere herein.

In some embodiments, targeted delivery is organelle-specific targeted delivery. A delivery vehicle can be surface-functionalized with a targeting moiety that can direct organelle specific delivery, such as a nuclear localization sequence, ribosomal entry sequence, mitochondria specific moiety, and/or the like. The invention further comprehends a lipid entity of the invention targeting the nucleus, e.g., via a DNA-intercalating moiety.

In some embodiments, the targeted delivery is multifunctional targeted delivery that can be accomplished by attaching more than one targeting moiety to the surface of the delivery vehicle. In some embodiments, such an enhances accumulation in a desired site and/or promotes organelle-specific delivery and/or target a particular type of cell and/or respond to the local environmental stimuli such as temperature (e.g., elevated), pH (e.g., acidic or basic), respond to targeted or localized externally applied stimuli such as a magnetic field, light, energy, heat or ultrasound (e.g., responsive delivery, which is described in greater detail elsewhere herein) and/or promote intracellular delivery of the cargo.

Exemplary targeting moieties are generally known in the art, and include without limitation, those described in e.g., in e.g., Deshpande et al, "Current trends in the use of liposomes for tumor targeting," Nanomedicine (Lond). 8(9), doi: 10.2217/nnm.13.118 (2013), International Patent Publication No. WO 2016/027264, Lorenzer et al, "Going beyond the liver: Progress and challenges of targeted delivery of siRNA therapeutics," Journal of Controlled Release, 203: 1-15 (2015); Surace et al, "Lipoplexes targeting the CD44 hyaluronic acid receptor for efficient transfection of breast cancer cells," J. Mol Pharm 6(4):1062-73; doi: 10.1021/mp800215d (2009); Sonoke et al, "Galactose-modified cationic liposomes as a liver-targeting delivery system for small interfering RNA," Biol Pharm Bull. 34(8):1338-42 (2011); Torchilin, "Antibody-modified liposomes for cancer chemotherapy," Expert Opin. Drug Deliv. 5 (9), 1003-1025 (2008); Manjappa et al, "Antibody derivatization and conjugation strategies: application in preparation of stealth immunoliposome to target chemotherapeutics to tumor," J. Control. Release 150 (1), 2-22 (2011); Sofou S "Antibody-targeted liposomes in cancer therapy and imaging," Expert Opin. Drug Deliv. 5 (2): 189-204 (2008); Gao J et al, "Antibody-targeted immunoliposomes for cancer treatment," Mini. Rev. Med. Chem. 13(14): 2026-2035 (2013); Molavi et al, "Anti-CD30 antibody conjugated liposomal doxorubicin with significantly improved therapeutic efficacy against anaplastic large cell lymphoma," Biomaterials 34(34):8718-25 (2013), Zhao et al., 2020. Cell 181:151-167, particularly at tables 1-5; Liu et al., Front. Bioeng. Biotechnol. 2021. 9:701504. doi: 10.3389/fbioe.2021.701504; US20210379192 (describes exemplary skeletal muscle cell targeting moieties), Snow-Lisy et al., Drug. Deliv. Transl. Res. 1:351(2011); US20060263336 (describes exemplary progenitor cell targeting moieties) each of which and the documents cited therein are hereby incorporated herein by reference.

Other exemplary targeting moieties are described elsewhere herein, such as epitope tags, reporter and selectable markers, and/or the like which can be configured for and/or operate in some embodiments as targeting moieties.

Responsive Delivery

In some embodiments, the delivery vehicle can allow for responsive delivery of the cargo(s). Responsive delivery, as used in this context herein, refers to delivery of cargo(s) by the delivery vehicle in response to an external stimuli. Examples of suitable stimuli include, without limitation, an energy (light, heat, cold, and the like), a chemical stimuli (e.g., chemical composition, etc.), and a biologic or physiologic stimuli (e.g., environmental pH, osmolarity, salinity, biologic molecule, etc.). In some embodiments, a targeting moiety is responsive to an external stimuli and facilitate responsive delivery. In other embodiments, responsiveness is determined by a non-targeting moiety component of the delivery vehicle.

In some embodiments, the responsive delivery is stimuli-sensitive, e.g., sensitive to an externally applied stimuli, such as magnetic fields, ultrasound or light; and pH-triggering can also be used, e.g., a labile linkage can be used between a hydrophilic moiety such as PEG and a hydrophobic moiety such as a lipid entity of the invention, which is cleaved only upon exposure to the relatively acidic conditions characteristic of a particular environment or microenvironment such as an endocytic vacuole or the acidotic tumor mass. pH-sensitive copolymers can also be incorporated in embodiments of the invention can provide shielding; diortho esters, vinyl esters, cysteine-cleavable lipopolymers, double esters and hydrazones are a few examples of pH-sensitive bonds that are quite stable at pH 7.5, but are hydrolyzed relatively rapidly at pH 6 and below, e.g., a terminally alkylated copolymer of N-isopropylacrylamide and methacrylic acid that copolymer facilitates destabilization of a lipid entity of the invention and release in compartments with decreased pH value; or, the invention comprehends ionic polymers for generation of a pH-responsive lipid entity of the invention (e.g., poly(methacrylic acid), poly(diethylaminoethyl methacrylate), poly(acrylamide) and poly(acrylic acid)).

In some embodiments, the responsive delivery is temperature-triggered delivery. Many pathological areas, such as inflamed tissues and tumors, show a distinctive hyperthermia compared with normal tissues. Utilizing this hyperthermia is an attractive strategy in cancer therapy since hyperthermia is associated with increased tumor permeability and enhanced uptake. This technique involves local heating of the site to increase microvascular pore size and blood flow, which, in turn, can result in an increased extravasation of embodiments of the invention. Temperature-sensitive lipid entity of the invention can be prepared from thermosensitive lipids or polymers with a low critical solution temperature. Above the low critical solution temperature (e.g., at site such as tumor site or inflamed tissue site), the polymer precipitates, disrupting the liposomes to release. Lipids with a specific gel-to-liquid phase transition temperature are used to prepare these lipid entities of the invention; and a lipid for a thermosensitive embodiment can be dipalmitoylphosphatidylcholine. Thermosensitive polymers can also facilitate destabilization followed by release, and a useful thermosensitive polymer is poly (N-isopropylacrylamide). Another temperature triggered system can employ lysolipid temperature-sensitive liposomes.

In some embodiments, the responsive delivery is redox-triggered delivery. The difference in redox potential between normal and inflamed or tumor tissues, and between the intra- and extra-cellular environments has been exploited for delivery, e.g., GSH is a reducing agent abundant in cells, especially in the cytosol, mitochondria and nucleus. The GSH concentrations in blood and extracellular matrix are just one out of 100 to one out of 1000 of the intracellular concentration, respectively. This high redox potential difference caused by GSH, cysteine and other reducing agents can break the reducible bonds, destabilize a lipid entity of the invention and result in release of payload. The disulfide bond can be used as the cleavable/reversible linker in a lipid entity of the invention, because it causes sensitivity to redox owing to the disulfide-to-thiol reduction reaction; a lipid entity of the invention can be made reduction sensitive by using e.g., two forms of a disulfide-conjugated multifunctional lipid as cleavage of the disulfide bond (e.g., via tris(2-carboxyethyl)phosphine, dithiothreitol, L-cysteine or GSH), can cause removal of the hydrophilic head group of the conjugate and alter the membrane organization leading to release of payload. Calcein release from reduction-sensitive lipid entity of the invention containing a disulfide conjugate can be more useful than a reduction-insensitive embodiment.

Enzymes can also be used as a trigger to release payload. Enzymes, including MMPs (e.g. MMP2), phospholipase A2, alkaline phosphatase, transglutaminase or phosphatidylinositol-specific phospholipase C, have been found to be overexpressed in certain tissues, e.g., tumor tissues. In the presence of these enzymes, specially engineered enzyme-sensitive lipid entity of the invention can be disrupted and release the payload. An MMP2-cleavable octapeptide (Gly-Pro-Leu-Gly-Ile-Ala-Gly-Gln (SEQ ID No: 59)) can be incorporated into a linker, and can have antibody targeting, e.g., antibody 2C5.

In some embodiments, the responsive delivery is light- or energy-triggered delivery, e.g., the lipid entity of the invention can be light-sensitive, such that light or energy can facilitate structural and conformational changes, which lead to direct interaction of the lipid entity of the invention with the target cells via membrane fusion, photo-isomerism, photofragmentation or photopolymerization; such a moiety therefor can be benzoporphyrin photosensitizer. Ultrasound can be a form of energy to trigger delivery; a lipid entity of the invention with a small quantity of particular gas, including air or perflourinated hydrocarbon can be triggered to release with ultrasound, e.g., low-frequency ultrasound (LFUS). Magnetic delivery: A lipid entity of the invention can be magnetized by incorporation of magnetites, such as $Fe_3O_4$ or $\gamma$-$Fe_2O_3$, e.g., those that are less than 10 nm in size. Targeted delivery can be then by exposure to a magnetic field. Responsive delivery to the testis has been described. See e.g., He et al., 2015. Oncol. Rep. 34(5)-2318 (describes ultrasound microbubble-mediated delivery to the testis); Li et al., Curr. Drug. Deliv. 2020 17(5):438-446 (describes heat stress and pulsed unfocused ultrasound delivery into testicular seminiferous tubules), which can be adapted for use with the present disclosure to provide responsive delivery to the testis or testicular cell.

Further embodiments are illustrated in the following Examples which are given for illustrative purposes only and are not intended to limit the scope of the invention.

Feed and Food Products

The engineered fish described herein can be used as a feed or food source for humans or other animals. Without being bound by theory, the engineered fish described herein can have increased muscle mass or other growth properties that make them advantageous as a commercial food source. The feed or food source can contain all or part of the engineered fish.

Described in certain example embodiments herein are feed and/or food product comprising an engineered fish or portion thereof, wherein the engineered fish comprises a modified melanocortin-4 receptor gene or gene product, wherein the modified melanocortin-4 receptor gene or gene product has decreased or eliminated expression, activity, or both as compared to an unmodified control.

In certain example embodiments, the engineered fish further comprises one or more exogenous genes selected from an elongase gene, an n-3 fatty acid biosynthesis gene, a cecropin gene, a cathelicidin gene, a growth hormone gene, or a follistatin gene, optionally wherein a portion of or the entirety of the melanocortin-4 receptor gene is replaced with an exogenous gene.

In certain example embodiments, the engineered fish further comprises a modified myostatin gene.

In certain example embodiments, the engineered fish further comprises one or more exogenous genes selected from an elongase gene, an n-3 fatty acid biosynthesis gene, a cecropin gene, a cathelicidin gene, a growth hormone gene, or a follistatin gene, optionally wherein (a) a portion of or the entirety of the melanocortin-4 receptor gene is replaced with an exogenous gene; (b) a portion of or the entirety of the myostatin gene is replaced with an exogenous; or (c) both (a) and (b).

In certain example embodiments, the engineered fish is of the genus Ictalurus, Ameiurus, Pylodictus, or Noturus. In certain example embodiments, the engineered fish is I. punctatus, I. furcatus, A. catus, A. nebulosus, A. natalis, A. melas, P. olivaris, N. insignis, or N. flavus.

The engineered fish or portion thereof can be combined with other feed or food product ingredients.

The feed or food product described herein can be frozen, cooled, chilled, freeze dried, dried, cooked, or otherwise prepared for consumption, shipment, and/or storage. The feed or food product described herein can be packaged in appropriate packaging. In some embodiments, the packaging is a reduced oxygen environment packaging.

Other applications and uses of the engineered fish described herein will be appreciated by those of ordinary skill in the art in view of the description provided herein and are within the spirit and scope of the disclosure herein.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Example 1—Growth and Survival of Myostatin Gene Edited Channel Catfish, Ictalurus Punctatus 1. Introduction Myostatin (MSTN) is a member of the transforming growth factor-β (TGF-β) superfamily. It has been identified as an important gene in the regulation of skeletal muscle growth in vertebrates (Lee et al., 2001) by inhibiting myogenesis and hypertrophy (Thomas et al., 2000). Natural mutations in the gene have been associated with individuals displaying significant increases in growth and double muscling as seen in breeds of cattle, Bos taurus, such as the Belgian Blue and Piedmontese (McPherron et al., 1997). MSTN mutants have also been found in sheep, Ovis aries, goats, Capra aegagrus hircus, dogs, Canis lupus familiaris, and chickens, Gallus gallus domesticus (Clop et al., 2006, Mosher et al., 2007, Ye et al., 2007, Zhang et al., 2012). As such, myostatin is considered a valuable gene for increasing growth in animals raised for human consumption.

Advances in gene editing technology allows for precise deletions of genomic DNA, vastly expanding the research and commercial capabilities of the myostatin gene in a variety of animal food species. The myostatin gene is highly conserved among vertebrates (McPherron et al., 1997), however, the role of myostatin varies among different taxa (Maccatrozzo et al., 2001; Wang et al., 2018). While mammalian myostatin is regulated by a single copy of the gene and expressed exclusively in skeletal muscle, two copies of the myostatin gene have been identified in many species of teleost fish, with salmonids containing four copies due to a second duplication event. Moreover, myostatin is differentially expressed in many tissues of fish (Maccatrozzo et al., 2001; Ostbye et al., 2007). Within diploid teleosts myostatin-b retains its role in muscle development while myostatin-a relates to immune function (Wang et al., 2018). Ictalurid catfish are unique in possessing only a single copy of the myostatin gene, found on chromosome 6, containing 3 exons and most closely resembling MSTN-b in other diploid teleosts (Kocabas et al., 2002; Gregory et al., 2004; Karim et al., 2017).

Perhaps due to the variety of roles of myostatin across different taxa, its effect on growth shows high variability. Even within teleost fish, change in body weight between MSTN KO fish and wild type ranged from an 88 percent increase in spotted halibut, Verasper variegatus, (Li et al., 2012) to a 11 percent decrease in red sea bream, Pagrus major, (Kishimoto, 2018). In general, however, fish with a mutated myostatin gene show in an increase in body weight when compared to controls. This includes increases of 12% in olive flounder, Paralichthys olivaceus, at 250 days post hatch (dph), 15.5% and 55% in common carp, Cyprinus carpio, at 90 dph and 30 dph respectively, 52% in zebrafish, Danio rerio, males and 52% in females at 6 mpf, 80% and 25% in medaka, Oryzias latipes, at 5 wph and 8 wph respectively, 30% in channel catfish, Ictalurus punctatus, at 40 dph, 46% in zebrafish at 120 dph and 30% in medaka at 16 wph (Chisada et al., 2011; Gao et al., 2016; Zhong et. al., 2016; Khalil et al. 2017; Yeh et al., 2017; Wang et al., 2018; Kim et. al., 2019). Similar results are found in studies of other vertebrate taxa including increases in body weight of 8% in male chicken, Gallus gallus domesticus, at 18 wph, 31% in rabbit, Oryctolagus cuniculus, 23% in sheep, Ovis aries, 15% in pigs, Sus scrofa domesticus, at birth, 26% in male mice, Mus musculus, and 29% in female mice (Guo et al., 2009; Lv et al., 2015; Wang et al., 2015; Guo et al., 2016; Lv et al., 2016; Wang et al., 2018; Kim et. al., 2020;).

Myostatin also appears to play an important role in the immune system of teleost fish. In MSTN gene edited medaka challenged with red spotted grouper nervous necrosis virus (RGNNV), there were reduced expression levels of the interferon-stimulated genes, which is associated with viral immune response, when compared with the wild type, and subsequent high levels of the virus copy number (Chiang et al., 2016). These same mutants were 25 percent larger than the wild type (Chiang et al, 2016). When wild-type zebrafish were stressed under high stocking density, expression of both MSTN-1 (a) and MSTN-2 (b) was significantly higher in the spleen when compared to fish in low stocking densities (Helterline et al., 2007). There was no change in expression of MSTN-1 or MSTN-2 in the muscle or brain between either density treatment (Helterline et al., 2007). The upregulation in only the spleen, the primary immune organ in fish, during stress, indicates the potential role of both MSTN genes in immune response.

In another zebrafish study in which both MSTN-a and MSTN-b were knocked out using CRISPR/Cas9, mutations in both paralogues caused a reduction in transcriptional levels of several critical immune-related genes and subsequent increased mortality when exposed to *Edwardsiella tarda* (Wang et al., 2018). After exposure to *E. tarda*, the MSTN-b, but not MSTN-a, mutants had reduced expression of the important immune-related transcription factor NF-κB, and consequently, several pro-inflammatory cytokines (Wang et al., 2018). These results indicate that while both paralogues contribute to the immune response, MSTN-b impacts the immune system through activation of the NF-κB pathway, while MSTN-a likely acts upstream of NF-κB (Wang et al., 2018).

The orange spotted grouper, *Epinephelus coioides*, like the channel catfish, appears to have only one copy of the MSTN gene, which plays a role in disease resistance (Chen et al., 2017). Infection by nervous necrosis virus (NNV) in orange-spotted grouper induced myostatin promoter activity (Chen et al., 2017). This could be either due to the direct role of MSTN in disease resistance, or an immune response by the fish to allocate resources towards fighting infection, rather than promoting growth by upregulating MSTN. However, in a study on Japanese sea bass (*Lateolabrax japonicus*), liver isozyme activity was higher in fish fed diets of MSTN inhibitory peptides (Li et al., 2017). These findings indicate that reducing MSTN activity could improve immune capacity.

While there is high conservation in sequence and protein structure of both MSTN paralogues, this does not necessarily imply conservation of function. In mice, GDF 11 is 90 percent identical to MSTN (GDF8), yet their functions are completely different with MSTN regulating skeletal muscle growth and GDF11 acts as a neurogenesis inhibitor (Wu et al., 2003; Gabillard et al., 2013). This is largely due to the variation in expression both temporally and spatially, with MSTN expressed primarily in muscle and GDF 11 expressed in the brain (Wu et al, 2003; Gabillard et al., 2013). These discrepancies highlight the importance of research on commercially important species, and not relying solely on model species.

While there has been a large amount of research on the myostatin gene, its commercial use in agriculture has been mostly limited to natural mutations and selective breeding. Its limited industrial use can be attributed both to lack of technology, regulation on genetically modified organisms (GMOs), and an incomplete understanding of how the gene effects species across taxa. With the advent and advances of CRISPR/Cas9 and other gene editing technologies, commercialization is possible. In 2018, the U.S. Food and Drug Administration approved AquaBounty Technologies Inc. to raise the first genetically engineered animal (Atlantic salmon) for human consumption in the United States (Waltz et al., 2017). This event serves as a breakthrough for a growing aquaculture industry in the United States and abroad and it is expected to open the door to more mainstream use of genetic editing and engineering in the near future. With this understanding, it is essential that we improve our understanding of commercially important genes and further develop efficient methods of genetic enhancement.

Preliminary efforts demonstrated a high potential for improvement by generating myostatin knock out (MSTN-KO) lines. Myostatin gene edited channel catfish showed a 29.7 percent increase in body weight at 40 days post microinjection (Khalil et al., 2017). Histological analysis of muscle tissue showed that mutated individuals exhibited hyperplasia (33.7% increase in fiber number) and hypertrophy (2% increase in fiber diameter) of muscle fibers compared to controls (FIGS. 1A-1H) (Khalil et al., 2017).

Genetic redundancy, in which two or more genes share similar function, is fairly common, particularly relating to survival traits (Nowak et al., 1997; DeLuna et al., 2008; DeLuna et al., 2010). Functional knock out or reduced expression of a gene can cause an overexpression of other genes to compensate for its lack of function, especially if there is a paralogous gene (DeLuna et al., 2010). However, upregulation of a gene due to deletion of its paralog is fairly uncommon (~11%) except in the cases where overlapping function is essential for viability (DeLuna et al., 2010). In fish with multiple MSTN genes, it is possible that knock out of one gene would cause upregulation of its paralog. However, in fish with a single copy, such as ictalurid catfish, this compensatory effect may be taken up by another growth-related gene. Mutations in the SLC30A10 gene are associated with hypermagnesemia with dystonia, polycythemia and cirrhosis (HMDPC); a fatal disease due to excessive amounts of magnesium in the body (Xia et al., 2017). Zebrafish with mutated SLC30A10 genes had severe neurological and liver defects when exposed to high environmental Mn levels (Xia et al., 2017). However, overexpression of ATP2C1 (ATPase secretory pathway Ca2+ transporting 1) protected mutant embryos from Mn exposure, indicating compensatory role of ATP2C1 in the absence of SL30A10 (Xia et al., 2017). Overexpression of Hoxb4 in bone marrow cells promotes the growth of hematopoietic stem cells (HSC) (Biji et al., 2006). In homozygous Hoxb4 mutant mice, HSC levels remained normal due to compensatory up-regulation of several related Hoxb genes (Biji et al., 2006). To date, there have been no studies looking at compensatory gene effects in commercial aquaculture species. It is essential that the discipline examine expression of growth-related genes in MSTN gene edited channel catfish.

Disease resistance is a critical trait as 40% of all aquaculture production (Owens, 2012) and 40% of catfish production (Tucker, 2012) is lost to disease. Bacterial disease dominated the total number of submitted disease cases in the catfish industry in recent years (Peterman and Posadas, 2019). The most common bacterial infections in catfish are enteric septicemia of catfish (ESC) (*Edwardsiella ictaluri*), *E. piscicida, columnaris* disease (*Flavobacterium columnare*), and motile *Aeromonas* septicemia (MAS) (*Aeromonas hydrophila* and related motile aeromonads perhaps in conjunction with *A. veronii*) (Plumb and Hanson 2010; Tekedar et al., 2013). Further improvement is needed as direct economic loss due to diseases can be extrapolated at a minimum of $60 million/yr (Zhou et al., 2018, Peterman and Posadas, 2019), and there are additional costs associated with disease management.

This Example demonstrates at least knock out the myostatin (MSTN) gene in channel catfish, evaluation of the growth of the MSTN-KO fish, inheritance of the knock-out in the F1 generations, survival and disease resistance, gene expression, and effect of zygosity on growth rate. Mutation rate, growth rate, survival and gene expression at different target sites for different generations (P1 vs F1) and species were also compared. Finally, disease resistance to *Edwardsiella ictaluri* (ESC) was evaluated between mutants and wild type controls.

2. Materials and Methods 2.1. Design and Preparation of sgRNA and CRISPR Cas9 System Three customized small guide RNAs (sgRNAs) were designed and generated using the Maxiscript T7 PCR-based method. First, three gene-specific oligonucleotides (MSTN1, MSTN2, MSTN3; FIGS. 1A-1H) containing the protospacer adjacent motif (PAM) were designed using the CRISPRscan online tool to target the channel catfish MSTN gene (GenBank Accession No. AF396747.1). Exon 1 was targeted in all four sgRNA sites in order to truncate the protein as far upstream as possible to ensure the largest knockout effect. The Universal Primer (Table 1), containing the sgRNA scaffold was obtained from Thermo Fisher Scientific. Each oligonucleotide was reconstituted using DNase/RNase Free water to form a high stock at 10 mM. To create the template for sgRNA synthesis, the three oligos were used to were synthesize double stranded DNA (dsDNA) by mixing 25 μl 2× EconoTaq Plus Master Mix (Lucigen), 12.5 μl Universal Primer, and 12.5 μl gene-specific oligonucleotide. PCR cycling was carried out with initial denaturing at 95° C. for 3 min; 5 cycles of denaturation at 95° C. for 30 sec, annealing at 50° C. for 30 sec with a ramp speed of −0.2° C./sec, extension at 72° C. for 30 sec; 20 cycles of denaturation at 95° C. for 30 sec, extension at 72° C. for 20 sec with a ramp speed of −0.2° C./sec; and final extension at 72° C. for 10 min.

The Taq Polymerase was then inactivated using 4.8 μl of 0.5M ultrapure EDTA and incubated at 75° C. for 20 min. The PCR product was confirmed using 1% agarose gel. The sgRNA was synthesized using the Maxiscript T7 Kit (Thermo Fisher Scientific), following the manufacture's guidelines. A mix of 2 μl dH$_2$O, 10 μl dsDNA Template (created above), 2 μl 10× buffer, 1 μl ATP, 1 μl CTP, 1 μl GTP, 1 μl UTP and 2 μl Enzyme Mix was incubated at 37° C. for 90 min. The solution was cleared of DNA contamination by adding 1 μl of Turbo DNase I (Thermo Fisher Scientific), vortexing briefly and incubating at 37° C. for 15 min. The magnesium ions were chelated by adding 5 μl of 0.5M EDTA. The Turbo DNase I was inactivated by heating the solution at 75° C. for 10 min. The obtained sgRNAs were purified using Zymo RNA Clean and Concentrator kit (Zymo Research). The sgRNAs were stored in a −80° C. freezer.

The Cas9 protein was acquired from PNA Bio (3541 Old Conejo Rd, Newbury Park, CA 91320) and reconstituted in dH$_2$O to a concentration of 1 mg/ml. Twenty minutes prior to fertilizing the eggs, three sets of injection solutions were prepared by mixing equal parts of Cas9 protein with each of the sgRNAs individually, and a fourth solution combining all three sgRNA with Cas9 protein (MSTNmix). The mixture was incubated on ice for 10 minutes before adding phenol red to a total ratio of 1:1:1 of Cas9, sgRNA and phenol red, respectively. The final concentrations of Cas9 protein and sgRNA were 300-350 ng/l and 150-200 ng/l, respectively.

TABLE 1

| Oligo sequence (5' to 3') | Oligo name | SEQ ID NO: |
|---|---|---|
| AAAAGCACCGACTCGGTGCCACTTTTTCAAGTTGATAACGGACTAGCCTTATTTTAACTTGCTATTTCTAGCTCTAAAAC | Universal Primer | 60 |
| taatacgactcactataGGGATGGCGCTGATCACCAGgttttagagctagaa | MC4R-A | 61 |
| taatacgactcactataGGGAAAGGAACTCGGAGTCgttttagagctagaa | MC4R-B | 62 |
| taatacgactcactataGGGCAGGATGGTGAGCGTCAgttttagagctagaa | MC4R-C | 63 |
| taatacgactcactataGGTGGTGGCGTTCGGTCCGAgttttagagctagaa | MSTN1 | 64 |
| taatacgactcactataGGGCGAGGCGCAGTGTTCAGgtMagagctagaa | MSTN2 | 65 |
| taatacgactcactataGGGTCGAGCAGCTGCTGCACgtMagagctagaa | MSTN3 | 66 |
| GGAGATGGAGGACACGGAAG | MC4R-ALL-1F | 67 |
| GAGACATGAAGCAGACGCAATA | MC4R-ALL-1R | 68 |
| taatacgactcactataGTGATGGCGCTGATCACCAGgtMagagctagaa | MC4R-A2-sense | 69 |
| taatacgactcactataCGGGATGCAGCATGCACACCgtMagagctagaa | MC4R-D-antisense | 70 |
| taatacgactcactataCTTGTCTGTAAGCGGATGCCgttttagagctagaa | PUC57 Vector | 71 |
| TATCGAACGCGACAGAAACGGCTGTGATGGCGCTGATCACGCCGGGAGCAGACAAGCCCGTCAGGGCGCGTCAGCGGGTG | BsalElvol2_ssODN1 | 72 |

TABLE 1-continued

| Oligo sequence (5' to 3') | Oligo name | SEQ ID NO: |
|---|---|---|
| GCAGCTCCCGGAGACGGTCACAGCTTGTCTGTAAGCGGAT CAGCGGCAACCTGACCATCTCTGGAGACGTCGTGAAAAGC | BsalElvol2_ssODN2 | 73 |
| GAGGAGGTCTTGCGGATATGAACGTGTCGGAGCACCACGG GCCGGGAGCAGACAAGCCCGTCAGGGCGCGTCAGCGGGTG | BsalElvol2_ssODN3 | 74 |
| GCAGCTCCCGGAGACGGTCACAGCTTGTCTGTAAGCGGAT GATGCAGCATGCACACCGGAACCACAGCCTGGGCGTGCAG | BsalElvol2_ssODN4 | 75 |
| ACTCCTCTCTGAGACCTGAC | EX1-F | 76 |
| AGTTAGGCTATGAAGCAGTAGT | EX1-R | 77 |
| CGAAATCCGTTCCTTTTTACTG | Evol2-F | 78 |
| CTGGCCTGTTCCTCATGTATTT | Evol2-R | 79 |

Table 1 shows primers used to amplify partial sequences of channel catfish, *Ictalurus punctatus*, oligonucleotides to target specified regions for CRISPR/Cas9 cleavage and single-stranded oligo donor nucleotide (ssODN). Universal primer was used to bind oligonucleotides to Cas-9 protein. Red letters indicate binding site to target gRNAs. MC4R-A, MC4R-B, MC4R-C, MC4R-A2-sense and MC4R-D-antisense were all used to target various loci in exon 1 of the channel catfish MC4R gene. MSTN-1, MSTN-2 and MSTN-3 were all used to target various loci in exon 1 of the channel catfish MC4R gene. MC4R-ALL-1F and MC4R-ALL-1R were used to amplify DNA segments flanking the target sites for guide RNAs in the catfish MC4R gene. EX1-F and EX1-R were used to amplify DNA segments flanking the target sites for guide RNAs in the catfish MC4R gene. PUC57 Vector was used to amplify a partial sequence of the Evol2 plasmid containing the elongase gene. BsalElvol2_ssODN1 and BsalElvol2_ssODN2 were used to flank the cut site associated with the MC4R-A2-sense gRNA to facilitate Homologous Directed Repair (HDR) in the MC4R gene. BsalElvol2_ssODN3 and BsalElvol2_ssODN4 were used to flank the cut site associated with the MC4R-D-antisense gRNA to facilitate Homologous Directed Repair (HDR) in the MC4R gene.

2.2. Brood Stock Husbandry, Selection and Spawning

Brood stock were cultured in 0.04-ha earthen ponds averaging 1-meter in depth. They were fed a 32 percent protein catfish pellet at 1-2% of their body weight per day five days per week. Dissolved oxygen was maintained above 3 mg/L using a 1% horsepower surface aerator (Air-O-Lator).

The Kansas strain of channel catfish was chosen as broodstock due to their superior growth and fry output when induced by injection of luteinizing hormone releasing hormone analogs (LHRHa). Individuals were chosen based on their health and secondary sexual characteristics. Males with well-developed papilla and large, muscular heads that were wider than the rest of their bodies were chosen. Dark coloring and scarring from territorial fighting were also signs of quality males in reproductive condition. Females with soft, well-rounded abdomen that were wider than their head, and a swollen urogenital opening were chosen. Broodstock were minimally handled and kept in tanks for as short a time as possible to avoid stress.

Males were terminated by a percussive blow to the head followed by pithing. The body cavity was opened carefully with a scalpel, ensuring not to pierce any organs. Testes were removed using tweezers and/or scissors and washed in a weigh boat with 0.9 percent saline using bottled distilled water, removing any blood or tissue. The water was drained, and the testes weighed before macerating the testes using scissors to release sperm. The homogenized testes were then filtered into a 50 mL falcon tube using a 100-micron screen. The sperm was then diluted with 0.9 percent saline solution to a maximum of 10 mL/gram of testes. Sperm concentration was tested using a Nanodrop 2000 Spectrophotometer (Thermo Scientific) and running a simple linear regression between sperm concentration and absorbance using the equation y=−2.450+0.185lnX (Adjusted R2=0.601) at 450 nm (Cuevas-Uribe & Tiersch, 2011). Motility was analyzed under a 10× light microscope while sperm count was checked under 40× magnification. Ideally, sperm was used immediately, but could be stored at 4° C. for one week, with declining quality or up to two weeks with the addition of gentamycin at a concentration of 1 mg/mL sperm solution.

Females were weighed and gently placed in labeled 32 mm mesh bags. The spawning bags were then placed in a flow through holding tank so that the fish was fully submerged, ensuring that water quality was ideal with dissolved oxygen levels above 5 mg/L. A 14-gauge implanter was loaded with 100 µg/kg body weight of luteinizing hormone releasing hormone analog (LHRHa) implant. The needle was then inserted at a 45-degree angle ventrally adjacent to the pelvic fin and the implant was inserted. The ovulation time was predicted based on the degree-hours according to Phelps et al. (2007). Water temperature ranged from 26-28° C. Females were checked 36 hours after LHRHa injection and every four hours after that until ovulation. Once a female began ovulating, indicated by eggs visible on the bag, she was carefully transferred into a tank with 100 mg/L buffered tricaine methane sulfonate (MS-222) with equal parts sodium bicarbonate until completely anesthetized. Prior to this time, a thin layer of vegetable shortening, Crisco, was used to coat several 20 cm diameter metal egg collection pans. The fish was then dipped in fresh water to wash off the MS-222 and gently dried with a towel. A thick layer of vegetable shortening was applied around the urogenital opening, including the pelvic fins to prevent sticking of the eggs during stripping. The female was hand stripped into the greased pan by gently applying pressure on the abdomen from the anterior end of the abdomen posteriorly towards the vent. Eggs would usually flow freely, well rounded and golden in color, with minimal blood. The stripping ensured that the eggs could not contact freshwater, which can activate the eggs. Eggs were then covered with another spawning pan to maintain moisture and transported to the molecular laboratory.

Approximately 200-300 eggs were transferred to a greased pan for fertilization. Approximately 3 mL of sperm solution was added to the eggs and mixed gently with fingertips. Fresh water was added to barely cover the eggs in order to activate the sperm and eggs and the water was swirled to form a single layer and prevent sticking. After two minutes, the eggs should be fertilized, and three more cm of water was added to the eggs and the eggs were left to harden for 15 minutes.

While the embryos were hardening, 5-10 p of the Cas9/sgRNA/phenol red mixture was loaded into 1.0 mm OD borosilicate glass capillary microinjection needles using a microloader. The tips of the needles were opened by breaking the end with a scalpel. The needle was then inserted into the micropipette holder to its deepest range and tightened, ensuring a tight seal. The compressed air cylinder was opened, and pressure was adjusted to 7000 kPa and 0.824 m$^3$/hr using the pressure regulator. The injection volume was adjusted to 50 nl by manipulating the pressure, the length of injection and the needle diameter. Injection volume was measured by injecting a drop of mineral oil on a hemocytometer.

After 15 minutes 100-200 embryos were transferred in a single layer to a greased 100 mm petri dish and covered with Holtfreter's solution (Table 2). The petri dish was placed on the stage of the microscope. In one smooth motion, the needle was lowered until it pierced the chorion and yolk, and the pedal of the microinjector was depressed, delivering the CRISPR solution, and withdrawing slowly. For best results, the solution was injected as close to the blastodisc as possible. When the blastodisc was not visible, the solution was spread throughout the embryo by depressing the pedal while simultaneously withdrawing the needle smoothly. To reduce mosaicism, embryos were injected between 15 min and 90 min post-fertilization, while they remained in the one cell stage. Injection controls were injected with 50 nl of phenol red, while non-inject controls were not injected.

Embryos were placed in four-liter tubs of Holtfreter's solution (Table 2) with 10 mg/L doxycycline kept at 27° C. with continuous aeration. The solution was changed, and dead embryos were removed daily. After about 5 days, or when the embryos were moving rapidly within the egg membrane and close to hatch, doxycycline treatment was discontinued. At 20 dph fry were moved to aquaria in recirculating systems until large enough to be PIT (Passive Integrated Transponders) tagged and moved to earthen ponds.

The primer set EX1-F, EX1-R (Table 1) was designed using Primer3plus to encapsulate all possible mutation sites (FIGS. 1A-1H). The Expand High FidelityPLUS PCR System (Roche) was used with 500 ng of genomic DNA. A Bio-Rad T100 Thermal Cycler was used to run PCR with an initial denaturing at 95° C. for 3 min; 34 cycles of denaturation at 95° C. for 30 sec, annealing at 60° C. for 40 sec with a ramp speed of −0.2° C./sec, extension at 72° C. for 40 sec; and final extension at 72° C. for 10 min.

The PCR product was confirmed on a 1% TAE Tris base, acetic acid and EDTA agarose gel. The PCR product from the treatment fish was mixed with PCR product from a wild type control of the same family at a 1:1 ratio. The combined product was then hybridized in a BioRad Thermocycler using an initial denaturing at 95° C. for 3 min; 85° C. for 1 min with a ramp speed of −0.2° C./sec, 75° C. for 1 min with a ramp speed of −0.2° C./sec, 65° C. for 1 min with a ramp speed of −0.2° C./sec, 55° C. for 1 min with a ramp speed of −0.2° C./sec, 45° C. for 1 min with a ramp speed of −0.2° C./sec, 35° C. for 1 min with a ramp speed of −0.2° C./sec, 25° C. for 1 min with a ramp speed of −0.2° C./sec.

The Surveyor® mutation detection kit (Integrated DNA Technologies) was used to detect mutations. Hybridized products were mixed with Nuclease S, Enhancer S, MgCl2 and Reaction Buffer (2) according to kit instructions and incubated at 42° C. for one hour. The digested products were separated on a 1.5 percent TBE (Tris borate EDTA) agarose gel and compared with that of control samples.

To confirm and identify the mutations, positive samples were sequenced using the TA cloning method. The largest individuals from each treatment that repeatedly were confirmed as mutants using Surveyor Analysis were sequenced. First, genomic DNA from three mutants per treatment was amplified with PCR using Expand High Fidelity$^{PLUS}$ PCR System (Roche) using the above protocol. The PCR product was verified using a 1 percent TAE agarose gel and cloned into the TOPO® TA Cloning® Kit (Invitrogen) with 20 clones per sample and sent to MCLabs (320 Harbor Way, South San Francisco, CA 94080) for sequencing. The resulting sequences were interpreted using the MAFFT sequence alignment tool.

To test for mosaicism and relative gene expression in different tissues, three fish from each treatment group were sacrificed at 200 days post hatch (dph) and muscle, spleen, heart, liver, brain and gonad samples were collected in 1.5 mL tubes and immediately submerged in liquid nitrogen. All samples were stored at −80° C. until RNA extraction. Samples were ground up using a mortar and pestle in the presence of liquid nitrogen. RNA was extracted using TRIzol reagent following the manufactures protocol. The quality and concentration of each sample was tested using gel electrophoresis and NanoDrop 2000 spectrophotometer (Thermo Scientific). All samples had an A260/280 ratio above 1.8 and were diluted to 500 ng/μl.

All RNAs were reverse-transcribed to complimentary DNA (cDNA) using the iScript Synthesis Kit (Thermo Scientific). Each reaction had a total volume of 10.0 μl, comprised of 4.0 μl iScript reaction mix, 1.0 μl iScript reverse transcriptase, 500 ng RNA template and water to reach a total value of 10.0 μl. The solution was then brought to 25° C. for 5 min, 42° C. for 30 min, and 85° C. and 5 min using a Bio-Rad T100 Thermal Cycler.

Quantitative real time PCR (qRT-PCR) was performed on a Bio-Rad C1000 Thermal Cycler using SsoFast EvaGreen supermix kit (Thermo Scientific) following the manufacturer's protocol. All reactions were performed in a 10.0p total reaction volume comprised of 1.0 μl of each primer (5μmol/l, 5.0 μl SsoFast EvaGreen supermix, 2.0 μl RNase/DNase-free water and 1.0 μl 200 ng/μl cDNA. qRT-PCR cycling was carried out with initial denaturing at 95° C. for 3 min; 40 cycles of denaturation at 95° C. for 5 sec and fluorescence measurement at 57° C. for 5 sec, followed by 65° C. for 5 sec and 95° C. with a ramp speed of −0.1° C./sec to calculate the melting curve.

The mRNA levels of each sample were then normalized to the levels of 0 hpf PGC marker-gene expression for the control or to the control sample for the same time point for knockdown effect measurement. Ribosome 18S mRNA was used as the reference gene. Crossing-point (Ct) values were then exported into an Excel spreadsheet from the Bio-Rad CRX Manager program. The relative expression ratio of a target gene to the 18S ribosomal RNA gene was analyzed for significance using a randomization test in the REST software (http://rest.gene-quantification.info/), assuming 1000 quantification efficiency.

TABLE 2

Name, type of material, company, catalog number (if applicable) of materials and equipment used in microinjection protocol for CRISPR/Cas9 in channel catfish, *Ictalurus punctatus*.

| Name of Material/ Equipment | Type | Company | Catalog Number | Comments/Description |
|---|---|---|---|---|
| Reproboost ® implant | Hormone | Center of Marine Biotechnology | | Luteinizing hormone releasing hormone analog (LHRHa) for artificial spawning |
| TRICAINE-S | Anesthesia | Western Chemical. Inc. | | For sedation of brood stock fish during hormone injection and egg stripping. |
| Phenol red | Reagent | Sigma-Aldrich | P0290 | 0.5%, sterile filtered |
| Stereo microscope | Equipment | Olympus | 213709 | For visualizing the eggs during microinjection |
| Microinjector | Equipment | ASI-Applied Scientific Instrumentation | Model MPPI-3 | For the delivery of the injection material into the embryos |
| Micromanipulator | Equipment | ASI-Applied Scientific Instrumentation | Model MM33 | For holding and controlling the movement of the injection needle. |
| Eppendorf Microloader | Tool | Eppendorf | 5242956.003 | For loading injection solution into microinjection needles. |
| Vertical needle puller | Equipment | David Kopf Instruments | Model 720 | For pulling microinjection needles |
| Borosilicate glass capillaries | Tool | Fisher Scientific | | 1 mm outer diameter (OD), for making microinjection needles. |
| Petri dish | Tool | VWR | 25384-302 | For holding the embryos during the microinjection. |
| Crisco ® | Vegetable shortening | The J.M. Smucker Company | | For coating spawning pans and petri dishes. |
| Holtfreter's solution | Reagent | Lab Made | | 59 mM NaCl, 0.67 mM KCl, 2.4 mM NaHCO3, 0.76 mM CaCl2, 1.67 mM MgSO4 (Armstrong et al., 1989) to incubate the microinjected embryos till hatch. |
| Doxycycline hyclate USP (monohydrate) | Antibiotic | Letco Medical | 690904 | Added to Holtfreter's solution to 10 ppm to prevent bacterial infections. |

2.3. Mutation Analysis

Pelvic fin-clip samples (10-20 mg) were collected in sterile 1.5 mL Eppendorf tubes and kept in a −80° C. freezer until DNA extraction. Genomic DNA was extracted using proteinase K digestion and ethanol precipitation using the following protocol: fin clips were digested in 600 μl of cell lysis buffer (100 mM NaCl, 10 mM Tris, 25 mM EDTA, 0.5% SDS) and 2.5 μl of proteinase K in a 55° C. hot water bath for 4-8 hours, with occasional vortexing. Protein was precipitated by adding 200 μl of protein precipitation solution (Qiagen, 19300 Germantown Road Germantown, MD 20874), vortexed, stored on ice for 12 minutes and centrifuged for 8 minutes at 15,000rcf. The supernatant containing DNA was then precipitated with isopropanol followed by centrifugation for 5 minutes at 15,000rcf and finally washed twice with 75% ethanol by inverting gently 5-times before being dissolved in dH$_2$O. DNA concentration and purity was measured using a NanoDrop 2000 spectrophotometer (Thermo Scientific) and concentration was adjusted to 500 ng/μl.

2.4. Generation of F1 progeny

Two and three-year old P1 myostatin gene edited channel catfish with good secondary sexual characteristics were chosen as brood stock. In 2019, only two Kansas strain gene edited males were sexually mature, and each was paired with a wildtype Kansas female in 70-liter glass aquaria. Two pairs of wildtype Kansas strain channel catfish from the same family were paired in identical conditions as controls. The system received flow-through water from a source pond between 26-28° C. Dissolved oxygen was maintained above 5 mg/L using an air stone diffuser. Both males and females were injected with 100 μg liquid LHRHa/kg BW adjacent to the pelvic fin. Starting 24 hours after injection, the bottom of the aquaria were checked every two hours for courtship behavior and egg masses. Egg masses were weighed and transferred to 4 L bins of Holtfreter's solution and maintained according to the protocol in 2.2.

2.5. Grow Out and Growth Sampling

One-hundred fry per genetic type were stocked into 3-replicate 50 L aquaria in recirculating systems for growth experiments. Fish in each aquarium were fed ad-libitum with Aquamax powdered and pelleted fish diets and catfish diets.

Pellet feed size was adjusted to a maximum of 4 the size of the mouth as the fish grew. Fry were fed Purina® AquaMax® powdered starter feed until they were large enough to eat Purina® AquaMax® 100. Both feeds contained 50% protein. All fish were fed every day to satiation. Mutants and controls generated in 2017 were kept separately in 50 L aquaria until 12-months post-hatch, when they were pit-tagged and transferred to a 0.04ha earthen pond and kept communally with channel catfish, blue catfish, and hybrids to bring the density to a commercial level of 10,000 fish/ha. Fish were fed daily to satiation. P1 mutants and controls generated in 2018 were kept separately in 50 L aquaria until 12-months post hatch, when they were pit tagged and transferred to three 200 L communal recirculating system (RAS) tanks. The experimental fish were kept communally with channel catfish, blue catfish, and hybrid catfish, at a density of 2 fish/L and fed daily to satiation. F1 mutants and controls generated in 2018 were kept separately in 50 L aquaria until 12-months post hatch, when they were pit-tagged and transferred to a 0.04ha earthen pond and kept communally with channel catfish, blue catfish, and hybrids to bring the density to a commercial level of 10,000 fish/ha and fed daily to satiation. P1 mutants and controls were kept separately in 50 L aquaria until 12-months post hatch, when they were pit-tagged and transferred to a 200 L communal flow through tank with unrelated channel catfish, blue catfish, $I.\ furcatus$, and channel catfish x blue catfish hybrids at a density of 2 fish/L and fed daily to satiation. F1 mutants and controls generated in 2019 were kept separately in 50 L aquaria until 12-months post hatch, when they were pit-tagged and transferred to a 0.04ha earthen pond and kept communally with channel catfish, blue catfish, and hybrids to bring the density to a commercial level of 10,000 fish/ha and fed daily to satiation. Fifteen fish per genetic type remained in the aquaria in the recirculating system. The fish were sampled at 6-month intervals in both aquaria and ponds. During these growth trials any mortality due to disease was identified by family, genotype and sex, and the pathogen identified.

2.6. Enteric Septicemia of Catfish (ESC) Challenge

The $E.\ ictaluri$ isolate S97-773 was provided by the USDA-ARS, Aquatic Animal Health Research Unit, Auburn, AL and stored as a glycerinated stock at $-80°$ C. until thawed for use. The stock was inoculated in 50 mL brain heart infusion (BHI) broth with 131 mg/L deferoxamine (DFO) and grown on a stir plate at $28°$ C. for 24-48 hours, depending on growth. Cultures were expanded into 150 L and then 2 L BHI and DFO broth, by adding 20 mL and 100 mL suspensions respectively, and grown under the same conditions for about 24 hours each expansion until the cell density reached $1\times10^8$ cells/mL based on the absorbance value read at 600 nm ($OD_{600}$). The average number of colony forming units per milliliter (CFU/mL) of bacterial cells used to challenge the fish was determined using standard plate counts run in triplicate. Confirmation of $E.\ ictaluri$ was determined using an analytical profile index (API) 20E test (BioMerieux).

A total of 104 F1 heterozygous MSTN mutant channel catfish, $Ictalurus\ punctatus$, in two families (MSTN-A and MSTN-B) and 24 control channel catfish from two families were challenged with $E.\ ictaluri$. All water was treated and discharged into a septic system to eliminate all pathogens. Fish were acclimated in dechlorinated tap water at $27°$ C. for 48 h prior to experiment. Each family was divided evenly into four 365 L tanks (height, width and length were 57 cm, 72 cm and 3 m, respectively) with continuous aeration and individual sand bio-filters. Three tanks were used as identical treatment tanks (infected) and one as control. Throughout the experiment, water temperature was $28.0\pm0.5°$ C., pH was $7.0\pm0.2$, dissolved oxygen was $6.70\pm0.40$ mg/L, nitrite was <0.50 mg/L, alkalinity was 80 mg/L and ammonia concentration was <0.50 mg/L.

Before starting the challenge, water was lowered in each tank to 100 L and biofilters were turned off. One liter of $E.\ ictaluri$ bacterial suspension containing approximately $1.0\times10^8$ cells/mL was added to each treatment tank resulting in a final concentration of $\sim1.0\times10^6$ cells/mL. The control tank received 1 L of Tryptic soy broth (TSB) only. Fish were immersed statically for one hour with aeration. After one hour, water was added to a final volume of 250 L and the biofilters were turned on.

Fish were observed every 12 hours and dead or moribund fish were removed and sampled. Moribund fish were necropsied to confirm the cause of death. Kidney and liver samples were taken from fish to confirm $E.\ ictaluri$ as the causative agent of mortality. Moribund fish were euthanized with 300 ppm buffered MS-222 according to IACUC protocols. Dissolved oxygen and temperature were measured twice daily. Fish were not fed the day before or the day of the challenge but were fed ad libitum the day following infection and for the remainder of the experiment. Survivors and mortalities were genotyped as needed. The challenge was continued for one week until 100% mortality. Outgoing water was detoxified with 20 ppm Clorox.

2.8. Statistical Analysis

To calculate differences in body weight between MSTN mutants and controls, a paired t-test was performed using R programming language (R Core Team, Vienna, Austria). To calculate differences in body weight between multiple gRNAs, NIC and IC, as well as between F1 MSTN families and CNTRL families a one-way ANOVA and Tukey's multiple comparisons test were performed using R programming language. In cases where different treatments were kept in separate aquaria at varying densities, a regression based on density was calculated, and weights were adjusted accordingly before running the statistical analysis. Differences in mutation rate were calculated with logistic regression using R programming language. To calculate differences in mortality rate at specific time points and at the end of the ESC challenge, mean hours to death (MHD) and cumulative percent mortality (CPM) were analyzed using paired t-test, one-way ANOVA and Tukey's multiple comparisons test on R programming language. To calculate the rate of disease progress, area under the mortality progress curve (AUMPC) was used in conjunction with ANOVA. This measurement was adapted from the index of area under wilt progress curve (AUWPC) commonly used in crop research to evaluate quantitative disease resistance of different cultivars and measure disease severity (Jeger and Viljanen-Rollinson, 2001). In this study, AUMPC was calculated using the following formula (Formula 1):

$$AUMPC = \sum_{i=1}^{n-1}[(y_i + y_{i+1})/2](t_{i+1} - t_i) \quad \text{(Formula 1)}$$

where yi is the number of moribund fish and dead fish at time ti and n is the total number of time points. AUMPC index of each family at each time point was calculated with cumulative mortality data. ANOVA was used to compare AUMPC indices between treatments at each time point.

3. Results 3.1. Growth

A total of 8 MSTN mutant P1 channel catfish and 31 control channel catfish generated in 2017 were PIT tagged and transferred into a 0.04-ha earthen pond at 1-year post hatch (mean body weight for MSTN and CNTRL were 58.26 g and 46.90 g, respectively). At 12-months post hatch, MSTN mutants had an observed mean 25% and 11.36 g larger than controls, but not significantly ($p=0.328$, $r^2=0.029$) (Table 3). At 18-months post hatch and just reaching the lower end of market size, MSTN mutants had an observed mean 44% and 182.41 g larger than controls ($p=0.036$, $r^2=0.1203$) (FIGS. 1A-1H). At 24-months post hatch, the fish were at standard market size, and MSTN mutants had an observed mean 27% and 249.17 g larger than controls, but not significantly (p=0.096, r²=0.1545). At 31-months post hatch, the observed mean for MSTN mutants was 25% and 358.00 g larger than controls, but not significantly (p=0.191, r²=0.054). At 36-months post hatch, the fish were near oversize for processor acceptability, and MSTN mutants had an observed mean 10% and 176.00 g larger than controls (p=0.043, r²=0.058).

Figure 1A:
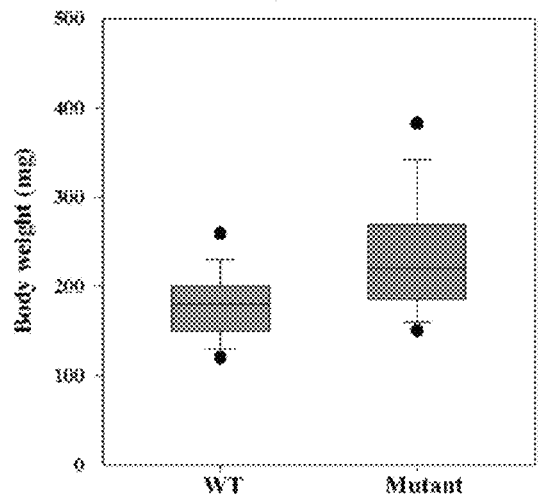
FIGS. 1A-1H—Evaluation of growth in myostatin (MSTN)-mutated one-month-old channel catfish fry. Body weight (FIG. 1A) and body length (FIG. 1B) of mutant (blue) and wild type (red) (n=330).
Figure 1B:
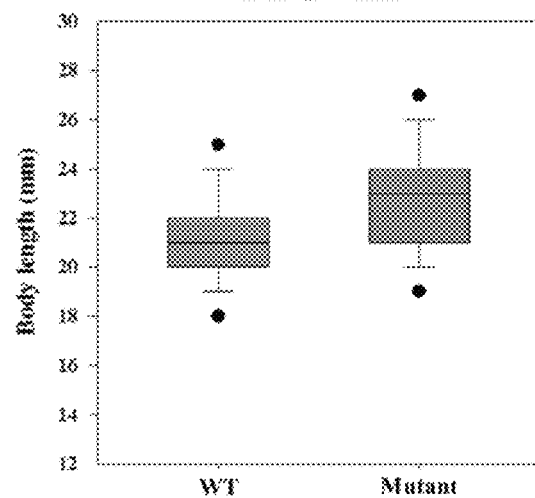
Figure 1C:
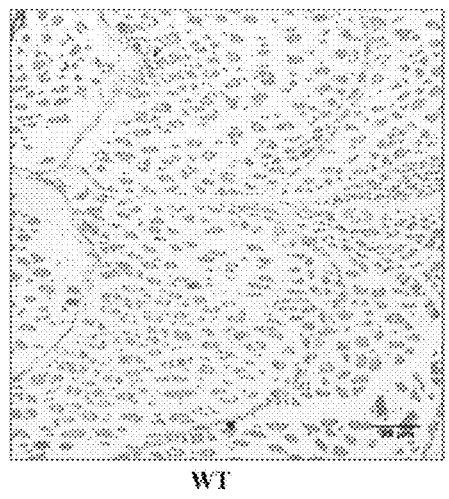
Figure 1D:
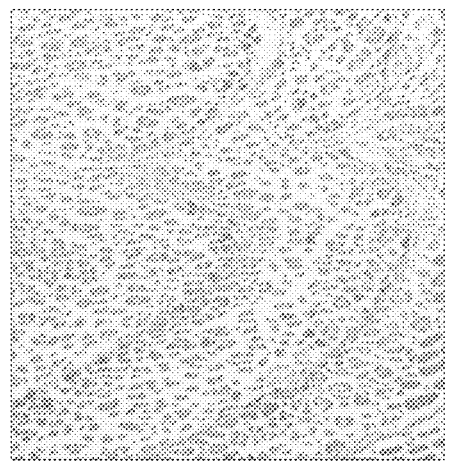
Figure 1E:
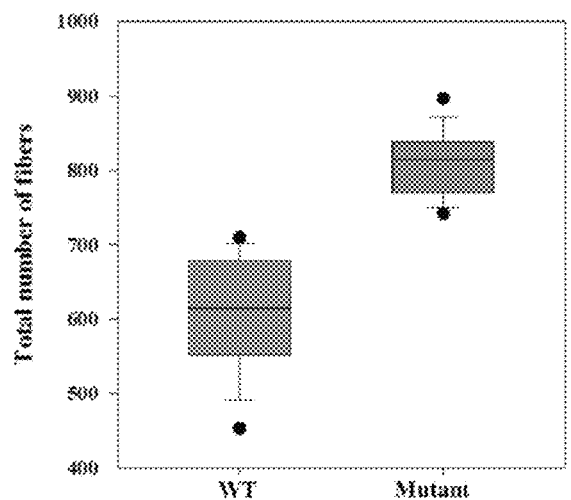
Figure 1F:
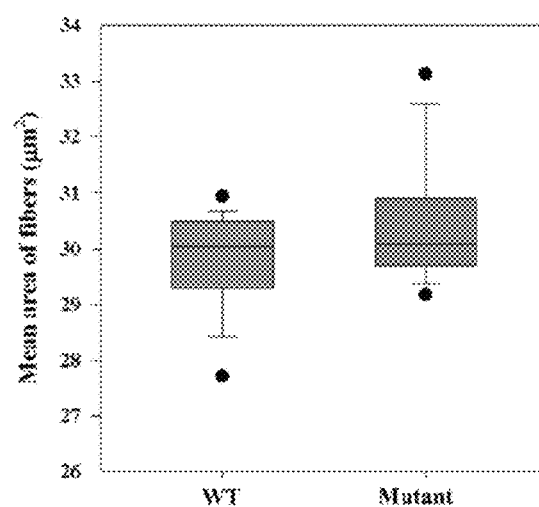
Figure 1G:
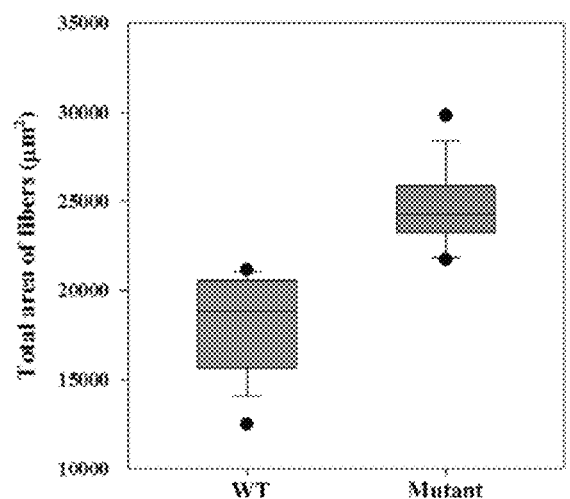
Figure 1H:
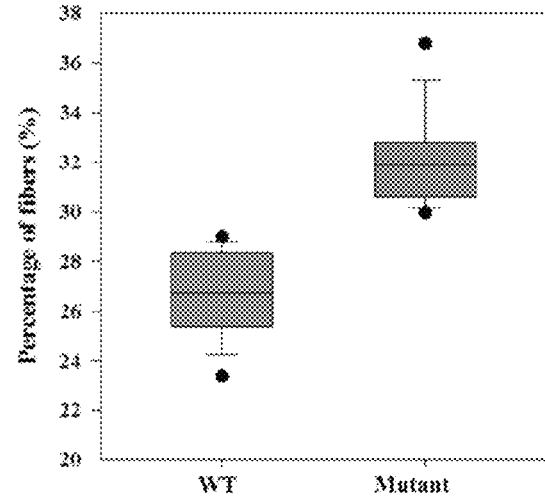
Figure 2:
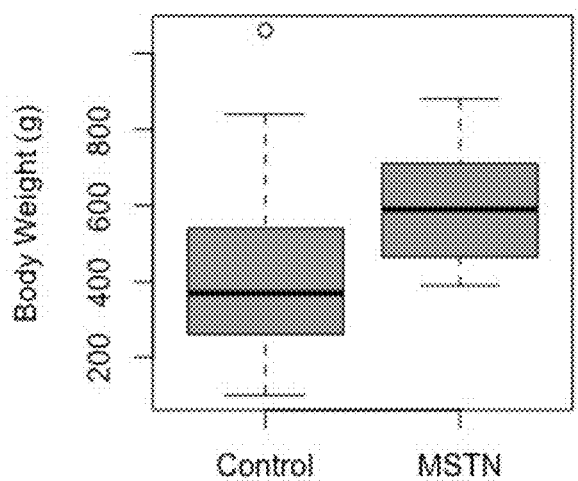
FIG. 2—Box and whisker plot of body weights (grams) of control (blue) and P1 myostatin (MSTN) knockout (red) channel catfish, *Ictalurus punctatus,* generated in 2017, at 18-months post hatch. Mutants and controls were kept separately in 50 L aquaria until 12-months post hatch, when they were pit-tagged and transferred to a 0.04ha earthen pond and kept communally with unrelated channel catfish, blue catfish, *I. furcatus,* and hybrids to bring the density to a commercial level of 10,000 fish/ha and fed daily to satiation. The plot shows median of the data (dark line), the lower and upper quartiles (25% and 75%; top and bottom of the box respectively), the area 1.5 times the interquartile range (whiskers), and outlier (circle). MSTN mutants (N=8) were 44% and 182.41 g larger than controls (N=29) (p=0.036, $r^2$=0.1203).

A total of 10 MSTN mutant P1 channel catfish and 27 control channel catfish were generated in 2018. At 6-months post hatch, the observed mean of MSTN mutants was 5% and 0.47 g smaller than controls, but not significantly (p=0.675, r²=0.005) (Table 4). At 18 months post hatch, MSTN mutants were 93.5% and 110.18 g larger than controls (p=3.34e-6, r²=0.447) (FIG. 2). At 30-months post hatch, MSTN mutants were 177% and 629.38 g larger than controls, but not significantly (p=0.639, r²=0.0002).

A total of 104 MSTN mutant P1 channel catfish and 22 control channel catfish were generated in 2019. Three different cut sites in exon 1 were targeted with sgRNAs (MSTN-1, MSTN-2, MSTN-3) as well as a mix of all three sgRNA's (MSTN-Mix) a control injected with just phenol red dye (IC) and a non-injected control (NIC). Mutants and controls were kept separately in 50 L aquaria until 6-months post hatch when they were large enough to be PIT tagged and moved to a 200 L communal recirculating aquaculture system (RAS) tank. They were kept at a density of 2 fish/L and fed daily to satiation. There were differences among treatments at 6-months post hatch (p=0.0036). At 6-months post hatch, the observed mean for Inject-Controls was 10% and 1.33 g smaller than Non-Inject Controls, but not significantly (p=0.655) (Table 5). MSTN-1 mutants were 47% and 6.33 g larger than Non-Inject Controls (p=0.001). MSTN-2 mutants were 31% and 4.15 g larger than Non-Inject Controls (p=0.015). The observed mean for MSTN-3 mutants was 5% and 0.69 g larger than Non-Inject Controls, but not significantly (p=0.735). The observed mean for MSTN-Mix mutants was 20% and 2.77 g larger than Non-Inject Controls, but not significantly (p=0.128). Overall, at 6-months post hatch MSTN mutants were 30% and 4.03 g larger than controls (p=0.004, r²=0.062).

There were differences in body weight among treatments at 12-months post hatch (p=0.0003). At 12-months post hatch, Inject-Controls were 42% and 44.94 g larger than Non-Inject Controls, but not significantly (p=0.095) (Table 5). Observed mean of MSTN-1 mutants was 8% and 9.83 g larger than Non-Inject Controls, but not significantly (p=0.563). MSTN-2 mutants were 38% and 41.25 g larger than Non-Inject Controls (p=0.007). MSTN-3 mutants were 14% and 15.54 g larger than Non-Inject Controls, but not significantly (p=0.397). Observed mean of MSTN-Mix mutants was 21% and 19.11 g smaller than Non-Inject Controls, but not significantly (p=0.241). Overall, at 12-months post hatch MSTN mutants were 4% and 5.26 g larger than controls, but not significantly (p=0.693, r²=0.001).

Figure 3:
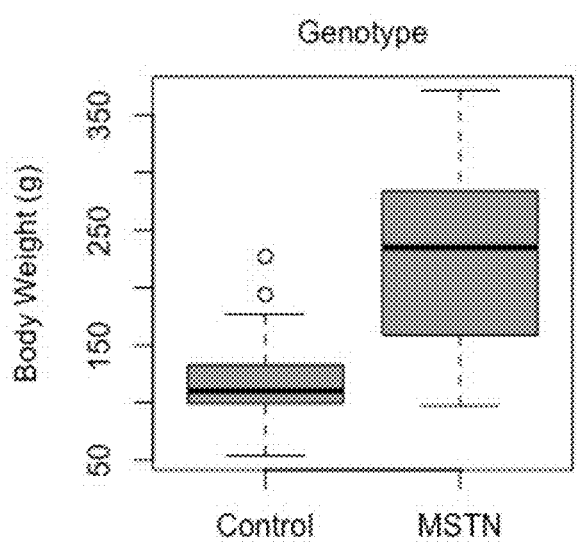
FIG. 3—Box and whisker plot of body weights (grams) of control (blue) and P1 myostatin (MSTN) knockout (red) channel catfish, *Ictalurus punctatus,* generated in 2018, at 18-months post hatch. Mutants and controls were kept separately in 50 L aquaria until 12-months post hatch, when they were pit-tagged and transferred to a 200 L communal flow through tank with unrelated channel catfish, blue catfish, *I. furcatus,* and channel catfish x blue catfish hybrids at a density of 2 fish/L and fed daily to satiation. The plot shows median of the data (dark line), the lower and upper quartiles (25% and 75%; top and bottom of the box respectively), the area 1.5 times the interquartile range (whiskers), and outliers (circles). MSTN mutants (N=8) were 93.5% and 110.18 g larger than controls (N=31) (p=3.34e-6, $r^2$=0.447).
Figure 4:
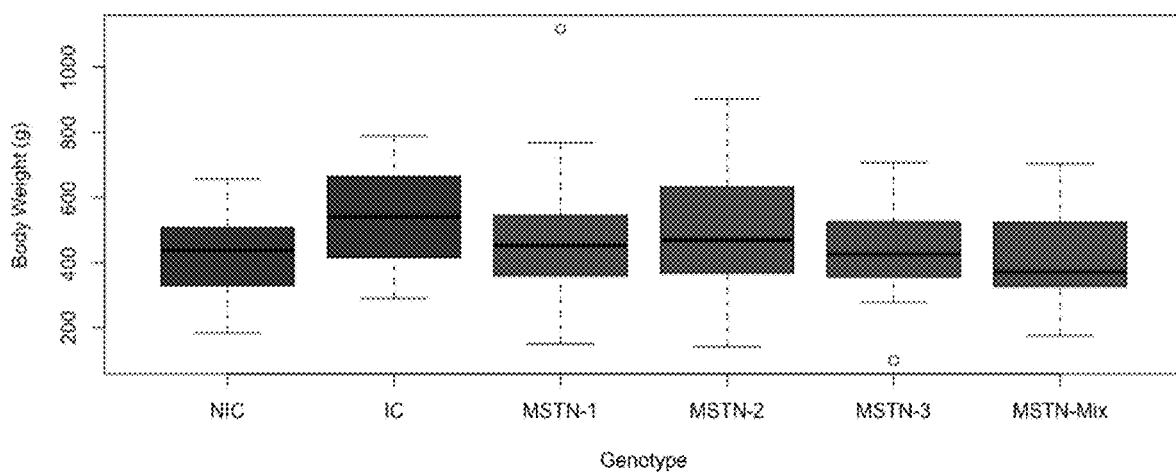
FIG. 4—Box and whisker plot of body weights (grams) of control (NIC and IC) and P1 myostatin (MSTN) knockout (red) channel catfish, *Ictalurus punctatus,* generated in 2019, at 18-months post hatch. Three different cut sites in exon 1 were targeted with sgRNAs (MSTN-1, MSTN-2, MSTN-3) as well as a mix of all three sgRNA's (MSTN-Mix) a control injected with just phenol red dye (IC) and a non-injected control (NIC). Mutants and controls were kept separately in 50 L aquaria until 12-months post hatch, when they were pit-tagged and transferred to a 200 L communal flow through tank with unrelated channel catfish, blue catfish, *I. furcatus,* and channel catfish x blue catfish hybrids at a density of 2 fish/L and fed daily to satiation. The plot shows median of the data (dark line), the lower and upper quartiles (25% and 75%; top and bottom of the box respectively), the area 1.5 times the interquartile range (whiskers), and outlier (circle). Overall, at 18-months post hatch MSTN mutants were 1% and 6.66 g larger than controls (p=0.880, $r^2$=0.0002, N=117).

There were no significant differences in body weight between treatments at 18-months post hatch (p=0.468) (Table 5). At 18-months post hatch, Inject-Controls were 24% and 104.98 g larger than Non-Inject Controls, but not significantly (p=0.349) (FIG. 3). MSTN-1 mutants were 7% and 31.01 g larger than Non-Inject Controls, but not significantly (p=0.591). MSTN-2 mutants were 14% and 60.04 g larger than Non-Inject Controls, but not significantly (p=0.255). MSTN-3 mutants were 0.65 g larger than Non-Inject Controls, but not significantly (p=0.992). MSTN-Mix mutants were 6% and 25.28 g smaller than Non-Inject Controls, but not significantly (p=0.651). Overall, at 18-months post hatch MSTN mutants were 1% and 6.66 g larger than controls, but not significantly (p=0.880, r²=0.0002).

A total of 71 control female x MSTN male heterozygous MSTN mutant F1 channel catfish in two families (MSTN-A and MSTN-B) and 60 control channel catfish in two families (CNTRL-A and CNTRL-B) were generated in 2019. Significant differences in body weight existed among treatments at 6-months post hatch (p=5.35e-14). At 6-months post hatch, CNTRL-B was 70% and 6.22 g smaller than CNTRL-A (p=3.32e-5) (Table 6). MSTN-A mutants were 36% and 5.46 g larger than CNTRL-A (p=8.34e-5). MSTN-B mutants were 25% and 3.77 g larger than CNTRL-A (p=0.010). Overall, at 6-months post hatch MSTN mutants were 65% and 7.86 g larger than controls (p=9.18e-12, r²=0.304).

Significant differences in body weight existed among treatments at 9-months post hatch (p=5.36e-14). At 9-months post hatch, CNTRL-B was 72% and 7.23 g smaller than CNTRL-A (p=6.99e-5) (Table 6). MSTN-A mutants were 34% and 6.88 g larger than CNTRL-A (p=4.31e-5). MSTN-B mutants were 39% and 5.80 g larger than CNTRL-A (p=0.001). Overall, at 9-months post hatch MSTN mutants were 72% and 9.99 g larger than controls (p=1.11e-12, r²=0.330).

Figure 5:
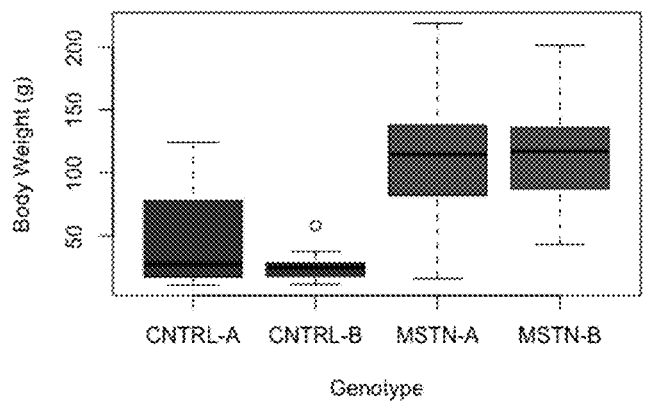
FIG. 5—Box and whisker plot of body weights (grams) of Control (CNTRL-A and CNTRL-B) and heterozygous F1 myostatin (MSTN) knockout (red) channel catfish, *Ictalurus punctatus,* generated in 2019 at 12-months post hatch. Two families of MSTN F1 progeny (MSTN-A and MSTN-B) and two families of wild-type (CNTRL-A and CNTRL-B) were generated. Mutants and controls were kept separately in 50 L aquaria until 12-months post hatch, when they were pit-tagged and transferred to a 0.04ha earthen pond and kept communally with unrelated channel catfish, blue catfish, *I. furcatus,* and hybrids to bring the density to a commercial level of 10,000 fish/ha and fed daily to satiation. The plot shows median of the data (dark line), the lower and upper quartiles (25% and 75%; top and bottom of the box respectively), the area 1.5 times the interquartile range (whiskers), and outlier (circle). Overall, at 12-months post hatch MSTN mutants were 218% and 77.56 g larger on average than controls (p<2.2e-16, $r^2$=0.565, N=120).

Significant differences in body weight existed among treatments at 12-months post hatch (p<2e-16). At 12-months post hatch, CNTRL-B was 92% and 22.33 g smaller than CNTRL-A (p=0.011) (Table 6; FIG. 5). MSTN-A mutants were 142% and 66.36 g larger than CNTRL-A (p=8.34e-13). MSTN-B mutants were 142% and 66.45 g larger than CNTRL-A (p=3.45e-12). Overall, at 12-months post hatch MSTN mutants were 218% and 77.56 g larger than controls (p<2.2e-16, r²=0.565).

TABLE 3

|  | 12 months | | | | 18 months | | | | 24 months | | | |
| --- | --- | --- | --- | --- | --- | --- | --- | --- | --- | --- | --- | --- |
|  | N | Mean | SD | CV | N | Mean | SD | CV | N | Mean | SD | CV |
| Control | 29 | 46.90 | 23.45 | 50.01 | 29 | 417.59 | 217.48 | 52.08 | 16 | 917.50 | 212.78 | 23.19 |
| MSTN | 8 | 58.26 | 24.71 | 42.42 | 8 | 600.00 | 169.79 | 28.30 | 3 | 1166.67 | 299.56 | 25.68 |
| p-value |  | 0.3280 | | | | 0.0360 | | | | 0.1545 | | |

|  | 31 months | | | | 36 months | | | |
| --- | --- | --- | --- | --- | --- | --- | --- | --- |
|  | N | Mean | SD | CV | N | Mean | SD | CV |
| Control | 15 | 1412.00 | 368.90 | 26.13 | 8 | 1820.00 | 305.75 | 16.80 |
| MSTN | 5 | 1770.00 | 177.20 | 10.01 | 5 | 1996.00 | 473.79 | 23.74 |
| p-value |  | 0.1914 | | | | 0.043 | | |

Table 3 shows mean body weights (grams), sample size (N), standard deviation (SD) and coefficient of variation (CV) of P1 myostatin (MSTN) knockout mutant and control channel catfish, Ictalurus punctatus, generated in 2017, at 12-months, 18-months, 24-months, 31-months and 36-months post hatch. Mutants and controls were kept separately in 50 L aquaria until 12-months post hatch, when they were pit-tagged and transferred to a 0.04ha earthen pond and kept communally with unrelated channel catfish, blue catfish, I. furcatus, and hybrids to bring the density to a commercial level of 10,000 fish/ha and fed daily to satiation. Sampling was performed with partial seining of the pond. Paired t-test was used to determine significant p-values (<0.05).

TABLE 4

| | Mean Weight (grams) | | | | | | | | | | | |
|---|---|---|---|---|---|---|---|---|---|---|---|---|
| | 6 months | | | | 18 months | | | | 30 months | | | |
| | N | Mean | SD | CV | N | Mean | SD | CV | N | Mean | SD | CV |
| Control | 27 | 9.07 | 2.34 | 25.74 | 31 | 117.82 | 36.61 | 31.07 | 10 | 356.45 | 198.78 | 55.8 |
| MSTN | 10 | 8.6 | 4.46 | 51.91 | 8 | 228 | 89.02 | 39.05 | 6 | 985.83 | 310.51 | 31.5 |
| p-value | | 0.675 | | | | 3.34E−06 | | | | 6.39E−01 | | |

Table 4 shows mean body weights (grams), sample size (N), standard deviation (SD) and coefficient of variation (CV) of P1 myostatin (MSTN) knockout mutant and control channel catfish, Ictalurus punctatus, generated in 2018, at 6-months, 18-months and 30-months post hatch. Mutants and controls were kept separately in 50 L aquaria until 12-months post hatch, when they were pit-tagged and transferred to a 200 L communal flow through tank with unrelated channel catfish, blue catfish, I. furcatus, and channel catfish x blue catfish hybrids at a density of 2 fish/L and fed daily to satiation. Sampling was performed with partial seining of the pond. Paired t-test was used to determine significant p-values (<0.05).

TABLE 5

| | | Mean Weight (grams) | | | | | | | | | | | |
|---|---|---|---|---|---|---|---|---|---|---|---|---|---|
| | | 6 months | | | | 12 months | | | | 18 months | | | |
| | | N | Mean | SD | CV | N | Mean | SD | CV | N | Mean | SD | CV |
| sgRNA | NIC | 17 | 13.529 | 3.75 | 28 | 17 | 108.06 | 36.1 | 33 | 17 | 435.35 | 140 | 32 |
| | IC | 5 | 12.2 | 2.28 | 19 | 5 | 153 | 46.5 | 30 | 3 | 540.33 | 249 | 46 |
| | MSTN-1 | 22 | *19.864 | 8.46 | 43 | 22 | 117.89 | 50.2 | 43 | 22 | 466.36 | 207 | 44 |
| | MSTN-2 | 41 | *17.683 | 6.34 | 36 | 41 | *149.3 | 68.1 | 46 | 36 | 495.39 | 205 | 41 |
| | MSTN-3 | 16 | 14.219 | 3.72 | 26 | 16 | 123.59 | 52 | 42 | 14 | 436 | 152 | 35 |
| | MSTN-Mix | 25 | 16.296 | 4.73 | 29 | 25 | 88.944 | 32.4 | 36 | 25 | 410.08 | 135 | 33 |
| Genotype | Control | 22 | 13.227 | 3.47 | 26 | 22 | 118.27 | 42.1 | 36 | 20 | 451.1 | 156 | 35 |
| | MSTN | 104 | *17.259 | 6.35 | 37 | 104 | 123.53 | 59.1 | 48 | 97 | 457.76 | 183 | 40 |

Table 5 shows mean body weights (grams), sample size (N) standard deviation (SD) and coefficient of variation (CV) of P1 myostatin (MSTN) knockout mutant and control channel catfish, Ictalurus punctatus, generated in 2019, at 6-months, 12-months and -18 months post hatch. Three different cut sites in exon 1 were targeted with sgRNAs (MSTN-1, MSTN-2, MSTN-3) as well as a mix of all three sgRNA's (MSTN-Mix) a control injected with just phenol red dye (IC) and a non-injected control (NIC). Mutants and controls were kept separately in 50 L aquaria until 12-months post hatch, when they were pit-tagged and transferred to a 200 L communal flow through tank with unrelated channel catfish, blue catfish, I. furcatus, and channel catfish x blue catfish hybrids at a density of 2 fish/L and fed daily to satiation. ANOVA was used to determine significant p-values (<0.05) indicated by asterisk.

TABLE 6

| | | 6 months | | | | 9 months | | | | 12 months | | | |
|---|---|---|---|---|---|---|---|---|---|---|---|---|---|
| | | N | Mean | SD | CV | N | Mean | SD | CV | N | Mean | SD | CV |
| Family | MSTN-A | 41 | *20.598 | 7.02 | 34 | 41 | *24.11 | 8.1 | 34 | 36 | *113.06 | 41.1 | 36.3 |
| | MSTN-B | 30 | *18.9 | 6.85 | 36 | 29 | *23.034 | 8.63 | 37 | 29 | *113.15 | 36.9 | 32.6 |
| | CNTRL-A | 30 | 15.133 | 4.34 | 29 | 30 | 17.233 | 5.46 | 32 | 30 | 46.7 | 35.5 | 76 |
| | CNTRL-B | 30 | 8.9167 | 1.79 | 20 | 29 | 10 | 2.07 | 21 | 30 | 24.367 | 9.01 | 37 |
| Treatment | MSTN | 71 | *19.88 | 6.95 | 35 | 70 | *23.664 | 8.28 | 35 | 65 | *113.1 | 38.9 | 34.4 |
| | CNTRL | 60 | 12.025 | 4.55 | 38 | 59 | 13.678 | 5.5 | 40 | 60 | 35.533 | 28 | 78.9 |

Table 6 shows mean body weights (grams), sample size (N), standard deviation (SD) and coefficient of variation (CV) of F1 heterozygous myostatin (MSTN) knockout mutants and control channel catfish, *Ictalurus punctatus*, at 6-months, 9-months and 12-months post hatch. Two families of MSTN F1 progeny (MSTN-A and MSTN-B) and two families of wild-type (CNTRL-A and CNTRL-B) were generated. Mutants and controls were kept separately in 50 L aquaria until 12-months post hatch, when they were pit-tagged and transferred to a 0.04ha earthen pond and kept communally with unrelated channel catfish, blue catfish, *I. furcatus*, and hybrids to bring the density to a commercial level of 10,000 fish/ha and fed daily to satiation. Sampling was performed with partial seining of the pond. ANOVA was used to determine significant p-values (<0.05) indicated by asterisk.

3.2. Mutation Analysis

A total of 209 fish survived microinjection of CRISPR/Cas9 and sgRNA targeting exon 1 of the MSTN gene over 3 years. The overall the mutation rate of the survivors was 58% (122/209) (Table 7). The highest mutation rate resulted from the MSTN-2 gRNA, although the difference was not statistically significant (p>0.05). Of the 122 P1 mutants 64% were homozygous/bi-allelic and 36% were heterozygous. MSTN-2 and MSTN-Mix led to higher levels of homozygosity/bi-allelism than other target sites (MSTN-2 p=0.014; MSTN-Mix 0.004). The average mutation rate for all F1 MSTN channel catfish was 88% (71/81). All F1 MSTN channel catfish were heterozygous.

Figure 6:
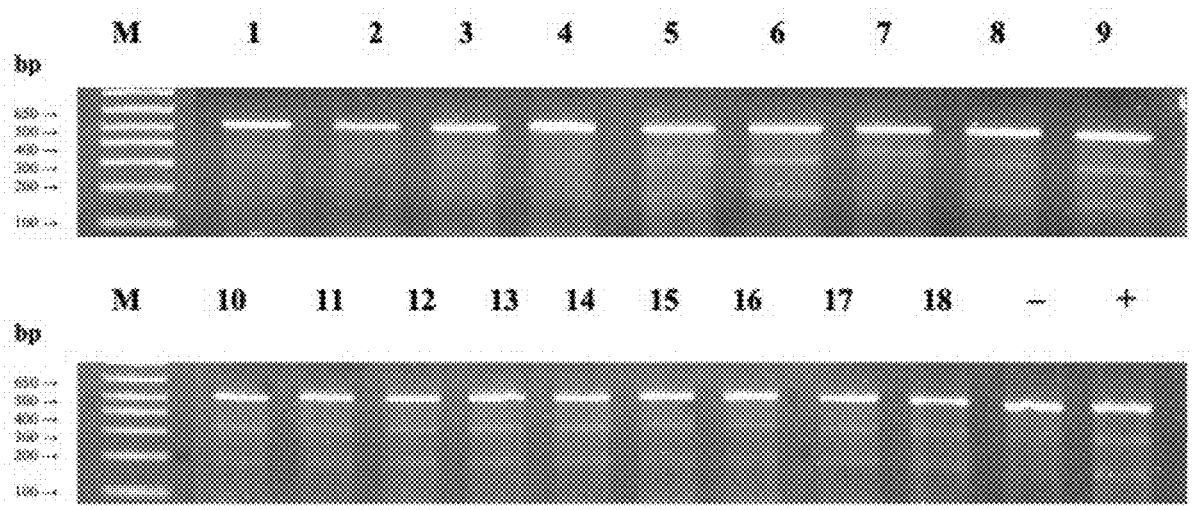
FIG. 6—Identification of edited myostatin (MSTN) gene sequences in channel catfish, *Ictalurus punctatus,* using the surveyor mutation detection assay. All samples were hybridized with an equal volume of non-injected control (Sample −) to detect both homozygotes/bi-allelic and heterozygotes. Wild-type sequences are indicated with a single 482 bp band, while mutations are signified by three bands. Sample 1 came from an embryo injected with MSTN-1 gRNA/Cas9. Samples 2-4 came from embryos injected with MSTN-2 gRNA/Cas9. Samples 5-13 came from F1 progeny of CNTRL female x MSTN male mutants (MSTN-A). Samples 14-18 came from F1 progeny of CNTRL female x MSTN male mutants (MSTN-B). Sample − came from wild-type control. Sample + came from previously identified MSTN P1 mutant. M indicates 1 kb marker.

Gel electrophoresis indicated mutations in each target site in both P1 and F1 generations (FIG. 6). Multiple bands in the image corresponded to expected cut sites. In most instances, 3 bands were associated with mutations while 1 band indicated a wild-type sequence, although some mutations were indicated by 5 bands, potentially indicating multiple cuts. Each positive result was confirmed with a second gel.

Sequence results confirmed mutations in each of the target sites indicated by gel electrophoresis. Each gRNA tested generated mutations in exon 1 in the MSTN gene (FIG. 8). All mutations occurred outside of the target sites and each gRNA and caused deletions. There were no insertions revealed. The MSTN mutation was inherited in the offspring (F1 MSTN-B). The MSTN-Mix treatment generated the same mutation as the MSTN-3 gRNA, indicating that only one gRNA bound to the Cas9 protein. Guide RNAs MSTN-2 caused a large deletion (2181 bp) outside of the target site.

TABLE 7

| Year | Genotype | Mutation Rate | Homozygosity/Bi-allelism |
|---|---|---|---|
| 2017 | P1 MSTN Channel | 31% (8/26) | 63% (5/8) |
| 2018 | P1 MSTN Channel | 100% (10/10) | 30% (3/10) |
| 2019 | P1 MSTN-1 Channel | 59% (22/37) | 41% (9/22) |
| 2019 | P1 MSTN-2 Channel | 66% (41/62) | 73% (30/41) |
| 2019 | P1 MSTN-3 Channel | 46% (16/35) | 68% (11/16) |
| 2019 | P1 MSTN-Mix Channel | 64% (25/39) | 84% (21/25) |
| 2019 | F1 CNTRL × MSTN-A (ch) | 91% (41/45) | 0% (0/41) |
| 2019 | F1 CNTRL × MSTN-B (ch) | 83% (30/36) | 0% (0/36) |

Table 7 shows the mutation rate and zygosity of all myostatin (MSTN) gene edited channel catfish, *Ictalurus punctatus*, generated in 2017, 2018 and 2019. P1 indicates fish gene edited through microinjection using CRISPR/Cas9. MSTN-1, MSTN-2 and MSTN-3 indicate gRNA's targeting different sites on exon 1 of the MSTN gene, while MSTN-Mix was an equal combination of all three sgRNA's. Approximately 50 nl of solution, composed of 300-350 ng/µl Cas9 protein and 200 ng/µl sgRNA, was injected into each embryo close to the blastodisc 15 min after fertilization using a glass capillary needle. F1 indicates the offspring of control channel catfish female x homozygous/bi-allelic MSTN mutant channel catfish male. Two families of F1 channel catfish (control (CNTRL)xMSTN-A and CNTRLxMSTN-B) were generated in 2019 from mutants spawned in 2017.

3.4. Relative Gene Expression

Figure 7:
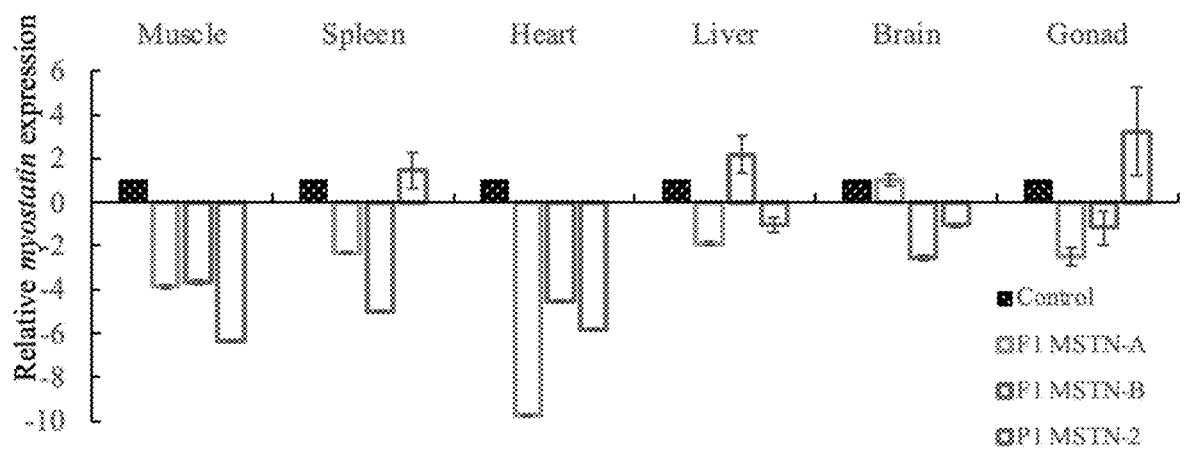
FIG. 7—Relative expression of myostatin (MSTN) in various tissues among two F1 heterozygous MSTN mutants from two families (MSTN-A and MSTN-B), one P1 homozygous/bi-allelic MSTN mutant (MSTN-2) and control channel catfish, *Ictalurus punctatus*. Bars below the 0 line indicate reduced MSTN RNA expression from the control while bars above the 0 line indicate increased expression from the control. Error bars indicate standard deviation (N=3 measurements per sample. The fish were 9-months post hatch.

Significant differences existed between overall expression levels of MSTN between treatments (p=5.02e-3) (FIG. 7). Mean expression level of MSTN was 3.63 times higher in controls than in MSTN-A (p=5.36e-3) Mean expression level of MSTN was 2.41 times higher in controls than in MSTN-B (p=0.036). Mean expression level of MSTN was 2.90 times higher in controls than in combined MSTN F1 progeny (p=0.009). No significant differences existed in expression levels of MSTN between tissues of wild-type fish (p=0.436). However, no one treatment had universally greater reduction in expression across all tissues, indicating MSTN expression is complex and dynamic.

Significant differences existed between overall expression levels of MSTN in muscle tissue between treatments (p=1.91e-4) (FIG. 7). Downregulation occurred in MSTN-A, MSTN-B and MSTN-2. Mean expression level of MSTN in brain tissue was 3.85 times higher in controls than in MSTN-A (p=3.37e-3). Mean expression level of MSTN in brain tissue was 3.66 times higher in controls than in MSTN-B (p=2.26e-3). Mean expression level of MSTN in brain tissue was 6.37 times higher in controls than in MSTN-2 (p=1.35e-4).

Significant differences existed between overall expression levels of MSTN in spleen tissue between treatments (p=9.97e-6) (FIG. 7). Downregulation occurred in MSTN-A and MSTN-B while upregulation occurred in MSTN-2. Mean expression level of MSTN in brain tissue was 2.32 times higher in controls than in MSTN-A (p=3.17e-3). Mean expression level of MSTN in brain tissue was 4.99 times higher in controls than in MSTN-B (p=1.64e-5).

Significant differences existed between overall expression levels of MSTN in heart tissue between treatments (p=3.68e-6) (FIG. 7). Downregulation occurred in MSTN-A, MSTN-B and MSTN-2. Mean expression level of MSTN in brain tissue was 9.76 times higher in controls than in MSTN-A (p=1.8e-6). Mean expression level of MSTN in brain tissue was 4.53 times higher in controls than in MSTN-B (p=1.21e-3). Mean expression level of MSTN in brain tissue was 5.80 times higher in controls than in MSTN-2 (p=2.91e-4).

Significant differences existed between overall expression levels of MSTN in liver tissue between treatments (p=6.52e-5) (FIG. 7). Downregulation occurred in MSTN-A and MSTN-2 and upregulation occurred in MSTN-B. Mean expression level of MSTN in brain tissue was 2.25 times higher in control than in MSTN-A (p=1.30e-3).

Significant differences existed between overall expression levels of MSTN in brain tissue between treatments (p=1.07e-3) (FIG. 7). Downregulation occurred in MSTN-B and MSTN-2. Mean expression level of MSTN in brain tissue was 2.61 times higher in controls than in MSTN-B (p=7.32e-4).

Significant differences existed between overall expression levels of MSTN in gonad tissue between treatments (p=0.030) (FIG. 7). Downregulation occurred in MSTN-A and MSTN-B, while upregulation occurred in MSTN-2. Mean expression level of MSTN in brain tissue was 8.18 times higher in MSTN-2 than in MSTN-A (p=0.028).

3.5. Enteric Septicemia of Catfish (ESC) Challenge

Figure 9:
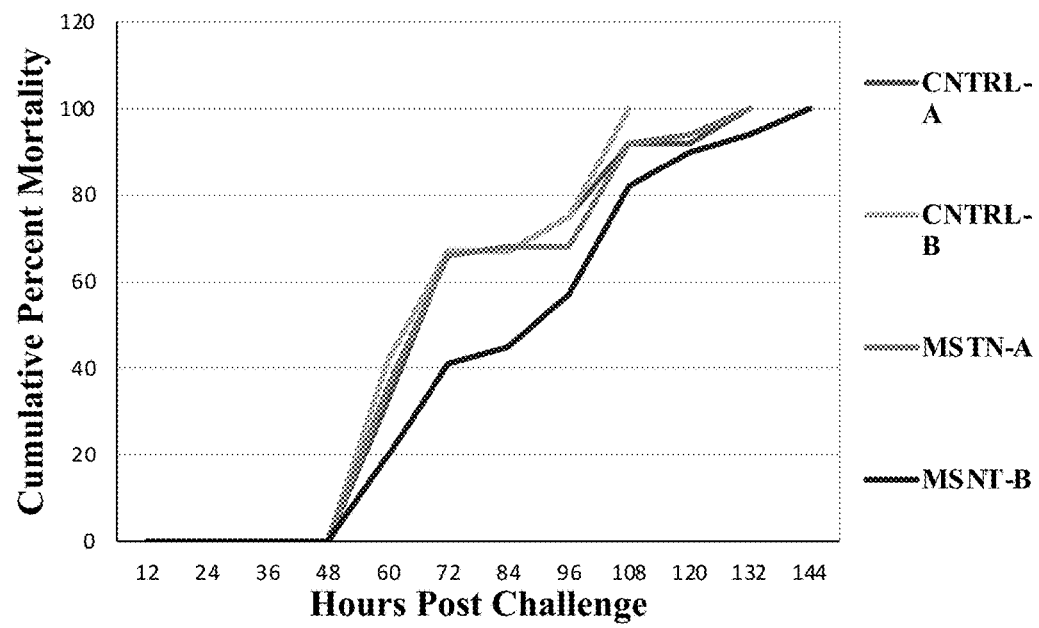
FIG. 9—A total of 104 F1 heterozygous myostatin (MSTN) mutant channel catfish, *Ictalurus punctatus*, in two families (MSTN-A and MSTN-B) and 24 control channel catfish in two families (CNTRL-A and CNTRL-B) were challenged with *Edwardsiella ictaluri*, causative agent for enteric septicemia of catfish (ESC). Fish were naïve and 7-months old, averaging 9.25±2.55 g at the start of the challenge. Fish were checked twice per day for 6 days until each family reached 100% mortality. The lines in the figure each represent the total mortality at each time point for each treatment.
Figure 10:
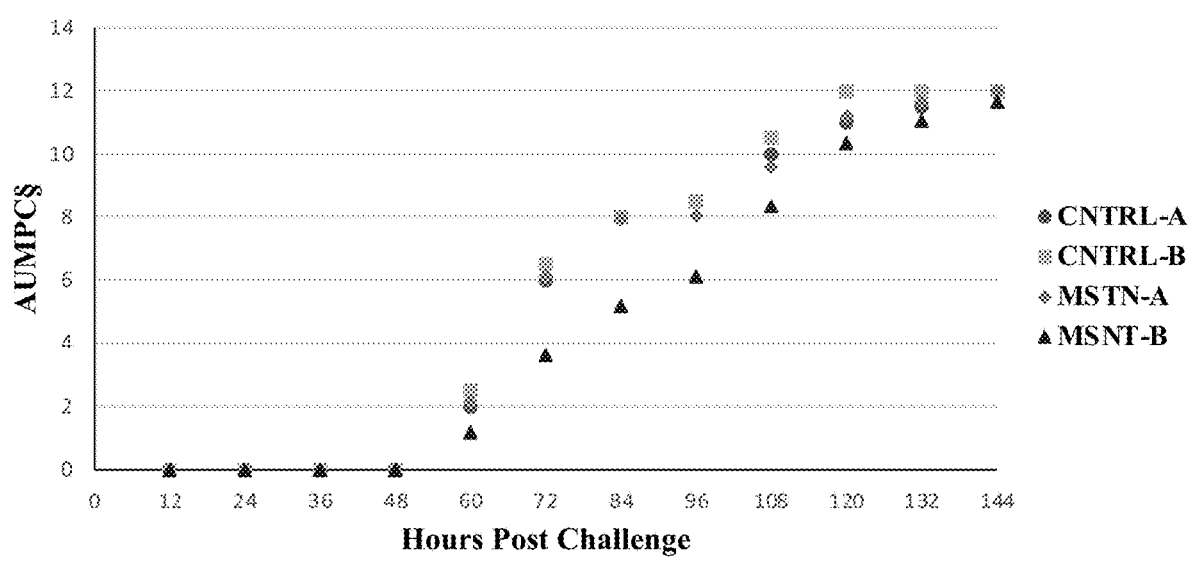
FIG. 10—Area under the mortality progress curve (AUMPC) of F1 myostatin (MSTN) mutant channel catfish, *Ictalurus punctatus*, and wild-type (CNTRL) channel catfish challenged with *Edwardsiella ictaluri*, causative agent for enteric septicemia of catfish (ESC). A total of 104 F1 heterozygous MSTN mutant channel catfish in two families (MSTN-A and MSTN-B) and 24 control channel catfish in two families (CNTRL-A and CNTRL-B) were challenged. Fish were naïve and 7-months old, averaging 9.25±2.55 g at the start of the challenge. Fish were checked twice per day for 6 days until each family reached 100% mortality. No significant differences in the total AUMPC were found between different families (p=0.241). The p-values of comparison of AUMPC at each time point after first mortality are 0.633, 0.383, 0.282, 0.334, 0.223, 0.306, 0.375, 0.441 at 60, 72, 84, 96, 108, 120, 132, 144-hours post challenge respectively.

All families reached 100% mortality within 144-hours after inoculation with *Edwardsiella ictaluri*. Mortality did not begin until 60-hours after inoculation for any family (FIG. 9). MSTN-A, CNTRL-A and CNTRL-B all surpassed 50% mortality at 56-hours after inoculation, while MSTN-B reached 50% mortality at 96-hours. Control family 1 (CNTRL-B) was the fastest to reach 100% mortality, reaching it at 108-hours while MSTN-B consistently had the slowest mortality rate throughout the entire challenge, reaching 100% mortality at 144-hours. There was a significant difference in mean hours to death (MID) post-challenge between families (p=0.032). MSTN-B had significantly higher MHD compared to CNTRL-B (p=0.030). There were no significant differences in cumulative percent mortality (CPM) between families at any time point (p>0.05) (Table 8). The largest difference in CPM between families was at 72 hours (p=0.204). Additionally, when both MSTN families were combined and both CNTRL families were combined, there was no significant differences in CPM between genotypes at any time point (p>0.05) (Table 8). The AUMPC indices over time are illustrated in FIG. 10. There was no significant difference in the total AUMPC between different families (p=0.241). The p-values of comparison of AUMPC at each time point after first mortality are 0.633, 0.383, 0.282, 0.334, 0.223, 0.306, 0.375, 0.441 at 60, 72, 84, 96, 108, 120, 132, 144-hours post challenge respectively. Thus, no significant difference was found among the AUMPC indices at any time point (P>0.05).

TABLE 8

| | Mean Cumulative Percent Mortality (CPM) | | | | | | |
|---|---|---|---|---|---|---|---|
| | 60 hours | 72 hours | 84 hours | 96 hours | 108 hours | 120 hours | 132 hours |
| CNTRL-A | 33.33% (4/12) | 66.67% (8/12) | 66.67% (8/12) | 75% (8/12) | 91.67% (11/12) | 91.67% (11/12) | 100% (12/12) |
| CNTRL_B | 41.67% (5/15) | 66.67% (8/12) | 66.67% (8/12) | 83.33% (10/12) | 100% (12/12) | 100% (12/12) | 100% (12/12) |
| MSTN-A | 35.84% (19/53) | 66.23% (35/53) | 66.23% (35/53) | 68.08% (36/53) | 92.48% (49/53) | 98.04% (52/53) | 100% (53/53) |
| MSTN-B | 19.61% (10/51) | 39.22% (20/51) | 45.1% (23/51) | 56.86% (29/51) | 82.38% (42/51) | 90.2% (46/51) | 94.12% (48/51) |
| CNTRL | 37.5% (9/24) | 66.67% (16/24) | 66.67% (16/24) | 75% (18/24) | 95.83% (23/24) | 95.83% (23/24) | 100% (24/24) |
| MSTN | 27.79% (29/104) | 53.65% (56/104) | 55.77% (58/104) | 62.50% (65/104) | 87.5% (91/104) | 92.31% (96/104) | 97.12% (101/104) |
| p-value | 0.4266 | 0.2222 | 0.3052 | 0.09745 | 0.1572 | 0.7363 | 0.221 |

Table 8 shows the mean cumulative percent mortality (CPM) between F1 myostatin (MSTN) mutant channel catfish, *Ictalurus punctatus*, and wild-type (CNTRL) channel catfish challenged with *Edwardsiella ictaluri*, causative agent for enteric septicemia of catfish (ESC). A total of 104 F1 heterozygous MSTN mutant channel catfish in two families (MSTN-A and MSTN-B) and 24 control channel catfish in two families (CNTRL-A and CNTRL-B) were challenged and cumulative percent mortality data was analyzed between the combined MSTN families and CNTRL families using a two sample t-test (α priori=0.05). Fish were naïve and 7-months old, averaging 9.25±2.55 g at the start of the challenge. Fish were checked twice per day for 6 days until each family reached 100% o mortality. ANOVA was used to determine significant differences in Family CPM. No significant differences were found between families (p>0.05). Paired t-test was used to determine significant differences in treatment CPM.

3.6 Hatching Rate and Survival of MSTN Gene Edited Channel Catfish

Hatching Rate and Survival of MSTN gene edited channel catfish to 30 days post hatch (dph) and 6 months post hatch (mph) was evaluated.

TABLE 20

| Year | Genotype | Hatching Rate | 30 dph Survival | 6 mph Survival | Mutation Rate | Homozygosity |
|---|---|---|---|---|---|---|
| 2017 | P1 MSTN Channel | 26% (64/200) | 27% (17/64) | 13% (8/64) | 31% (8/26) | 63% (5/8) |
| 2017 | Non-Injected Control | 62% (62/100) | 56% (35/62) | 47% (29/62) | N/A | N/A |
| 2018 | P1 MSTN Channel | 10% (28/200) | 57% (16/28) | 36% (10/28) | 100% (10/10) | 30% (3/10) |
| 2018 | Non-Injected Control | 55% (55/100) | 67% (37/55) | 49% (27/55) | N/A | N/A |
| 2019 | P1 MSTN-1 Channel | 37% (88/400) | 69% (52/88) | 42% (37/88) | 59% (22/37) | 41% (9/22) |
| 2019 | P1 MSTN-2 Channel | 62% (121/400) | 72% (87/121) | 51% (62/121) | 66% (41/62) | 73% (30/41) |
| 2019 | P1 MSTN-3 Channel | 35% (69/400) | 64% (44/69) | 51% (35/69) | 46% (16/35) | 68% (11/16) |
| 2019 | P1 MSTN-Mix Channel | 39% (65/400) | 75% (49/65) | 60% (39/65) | 64% (25/39) | 84% (21/25) |
| 2019 | Injected Control | 17% (17/100) | 71% (12/17) | 29% (5/17) | N/A | N/A |
| 2019 | Non-Injected Control | 51% (51/100) | 57% (29/51) | 33% (17/51) | N/A | N/A |
| 2019 | F1 CNTRL x MSTN-A (ch) | N/A | N/A | N/A | 91% (41/45) | 0% (0/41) |
| 2019 | F1 CNTRL x MSTN-B (ch) | N/A | N/A | N/A | 83% (30/36) | 0% (0/36) |

Table 20 shows hatching rate and survival to 30 dph and 6 months post hatch mph of microinjected P1 myostatin (MSTN) gene-edited channel catfish, *Ictalurus punctatus*, and mutation rate and zygosity of all MSTN channel catfish, generated in 2017, 2018, and 2019. P1 indicates fish that were gene-edited through microinjection using CRISPR/Cas9. MSTN-1, MSTN-2, and MSTN-3 indicate gRNA's targeting different sites on exon 1 of the MSTN gene, while MSTN-Mix included an equal combination of all three sgRNA's. Approximately 50 nL of solution, composed of 300-350 ng/µL Cas9 protein and 200 ng/µL sgRNA, was injected into each embryo close to the blastodisc 15 min after fertilization using a glass capillary needle. F1 indicates the offspring of control channel catfish female x homozygous/bi-allelic MSTN mutant channel catfish male. Two families of F1 channel catfish [control (CNTRL) x MSTN-A and CNTRL x MSTN-B]were generated in 2019 from mutants spawned in 2017. Hatching rate and survival to 30 dph and 6 mph were not calculated for F1 catfish due to different culture methods.

4. Discussion

In this Example, the effects of microinjection of three sgRNAs targeting exon 1 of the channel catfish myostatin gene in conjunction with Cas9 protein on mutation rate, expression level, growth and disease resistance were investigated. Efficient mutagenesis was achieved as demonstrated by PCR, Surveyor assay and DNA sequencing. The highest mutation rate of 66% was achieved by MSTN-2 gRNA. However, the highest rate of homozygosity/bi-allelism, 84%, was achieved by combining all three gRNAs (MSTN-Mix), indicating that combining multiple successful gRNAs can better cleave both DNA strands. An F1 generation was successfully produced. P1 and F1 mutants both showed enhanced growth, 10-400%. MSTN gene editing resulted in decreased MSTN gene expression. The resistance of the mutants to the bacterial pathogen, *E. ictaluri*, was slightly increased in one MSTN family.

A total of 209 fish survived microinjection over 3 years with an average mutation rate of 58%. Mutation rate showed high variability between years with the lowest rate of 31% in 2017 and highest rate of 100% in 2018. These results are more variable than a previous study where mutation rates of 88-100% were achieved using CRISPR/Cas9 to target MSTN in channel catfish (Khalil et al., 2017). Mutation rates of 60-100 percent using CRISPR/Cas9 are typical for channel catfish for various genes studied at our facility (Qin 2015; Khalil et al., 2017; Elaswad et al., 2018; Qin, 2019). Mutation rates in other teleosts using CRISPR/Cas9 vary considerably between studies, fluctuating between from 2% to 100% (Jao et al., 2013; Chakrapani et al., 2016; Liu et al., 2018). The variability in this study was likely due to a combination of variability of egg quality, period during the spawning season, timing after ovulation and/or human error. Future experiments should test family and strain effects on mutation rate.

MSTN F1 mutants were generated by individually mating two pairs of control females with MSTN mutant males. The offspring of both families inherited the mutation at a rate of 88%, indicating a very low level of mosaicism in the parent generation. As the dam was the control, all mutant offspring were heterozygous. Germline transmission rates range considerably among other studies. Varshney et al. (2015) attained a 53% mutation rate from 162 loci targeting 83 genes in zebrafish and had an average germline transmission rate of 28%. Similar to the current study, mutated founder individuals were mated with wild type fish. Zebrafish progeny generated from mating founders with mutations in the C9t2 and C9t3 genes had germline transmission rates of 43% and 20% respectively (Hruscha et al., 2013). Due to mosaicism, germline transmission of CRISPR/Cas9 induced mutations are not necessarily inherited with Mendelian distributions.

Growth was generally higher in MSTN mutants when compared to controls at all life stages and in both pond and tank environments. At the small fingerling stage (10-20 g), P1 MSTN mutants were 30% larger than controls on average. At the stocker stage (100-200 g), P1 MSTN mutants were 88% larger than controls on average and P1 MSTN mutants reached market size 27% faster than controls. Heterozygous F1 mutants were 218% larger than controls on average at 100 g. These increases in body weight are considerably higher than those in previous studies of teleost fish including zebrafish, medaka, red sea bream, spotted halibut, common carp and olive flounder, where MSTN mutants were 51% larger on average than wild-type and ranged from an 11% decrease to 88% increase in body weight (Kim et al., 2016; Kim et al., 2019; Zong et al., 2016; Wang et al., 2018; Chiang et al., 2016; Khalil et al., 2017; Yeh et al., 2017; Gao et al., 2016; Chisada et al., 2011; Kishimoto et al., 2018; Li et al., 2012).

Growth improvement through MSTN knockout in the current study was superior to typical results from selection, crossbreeding and hybridization in channel catfish. Selection typically yields increases of 7-14% per generation (Gjedrem and Thodesen, 2005; Dunham, 2011). Dunham and Smitherman (1983) found that six of nine (67%) channel catfish crossbreeds showed heterosis for body weight, averaging 10.3 percent above both parents, although 50% improvement is possible. Interspecific hybridization can yield substantial increases in body weight, such as in the case of hybrid catfish, which may grow 20% up to 100% faster than either parent depending upon the parent (Dunham et al., 1990; Dunham, 2011). Transgenesis has the potential for much larger gains in body weight than those achieved in this study. By incorporating the Chinook salmon, *Oncorhynchus tshawytscha*, growth hormone into an Atlantic salmon, Salmo salar, growth rate was increased by 400-600 percent, reducing the grow-out period from three years to 18 months (Elliot, 1998; Entis, 1998). However, growth hormone channel catfish grow 60-80% faster than controls (Abass et al., 2020; Abass et al., 2021). While transgenics can reduce grow-out time and cost, there are ethical and environmental concerns with introducing a foreign gene into an organism (Muir and Howard, 1999). Crispr/Cas9 gene knockout, while artificial in methodology produces an end product that could intrinsically come about through natural mutations.

Natural MSTN mutants are already used in terrestrial agriculture as Belgian Blue and Piedmontese cattle breeds are frequently utilized. However, mutations in fish result in larger phenotypic gains than terrestrial animals, as their mutants average 24% larger than wild-type (Kim et al., 2016; Lv et al., 2016; Crispo et al., 2015; McPherron et al., 1997; Wang et al., 2017). The larger gains in teleost fish are likely explained by the larger proportion of muscle to body weight in fish compared to terrestrial animals (Tlusty et al., 2018) or the indeterminate growth of fish. This faster growth to harvest makes MSTN mutants a potentially and extremely valuable genotype for commercial aquaculture. Future research should evaluate the difference in growth between homozygous and heterozygous F1 MSTN mutants.

The growth of individual MSTN mutants and different MSTN families varied. This is likely due to differences in knockout patterns and subsequent expression levels of MSTN, differences in genetic background coupled with epistatic interaction with other loci or differences in off-target mutations. The variability can be advantageous as combining gene editing with selection for the largest individuals might result in maximum genetic enhancement.

No genotype x environment interactions or age effects were observed. Variation in growth correlated more closely with year class than environment or age. However, only one generation of MSTN mutants reached sexual maturity, and therefore age effects may not be apparent at this time. Normal fish growth slows down after sexual maturity and future studies should evaluate whether MSTN plays a stronger role as the fish continue to grow.

MSTN mutants had reduced overall expression levels of MSTN when compared to controls. Mean expression level of MSTN was 2.90 times higher in controls than in combined MSTN F1 progeny. No one treatment had universally greater reduction in expression across all tissues, and no significant differences existed in expression levels of MSTN between tissues of wild-type fish, indicating MSTN expression is complex and dynamic. Expression was most reduced in muscle, spleen and heart. In muscle, spleen and heart, MSTN expression was reduced 5-fold, 3-fold and 7-fold, respectively. Previous studies indicate that MSTN is predominantly expressed in the brain, muscle and heart tissue (Du et al., 2014; Helterline et al., 2007). Therefore, the greatest reduction in MSTN expression can be expected from the tissues with highest normal expression levels. Due to the importance of optimal brain and heart function for survival, the gross characteristics should be evaluated in future experiments to determine if MSTN mutants have deformities in any organs. However, the MSTN mutants in this study appear normal and healthy, which is further supported and indicated by their rapid growth.

Along with the phenotypic differences and RNA expression levels, DNA sequencing confirmed large mutations in the MSTN gene leading to truncation of the MSTN protein. Deletions were found in each target site, with the MSTN-2 gRNA causing a 2184 bp deletion that knocked out nearly the entire MSTN gene. As only the largest mutants from each treatment were sequenced, more mutants should be sequenced to determine whether such large deletions are common. Future experiments should evaluate whether the type of mutation and MSTN expression levels influence growth.

When challenged for resistance to enteric septicemia of catfish (ESC), MSTN mutants performed equally or better than controls. MSTN-A, CNTRL-A and CNTRL-B all surpassed 50% mortality 56-hours after inoculation, while MSTN-B reached 50% mortality at 96-hours. One of two families, MSTN-B, had higher mean hours to death (MHD) compared to CNTRL-B. Thus, there appears to be a slight increase in the bacterial disease resistance of some MSTN genotypes, although more extensive research is needed. This contradicts results by Chiang et al. (2016), in which MSTN mutant medaka challenged with red spotted grouper nervous necrosis virus (RGNNV) had seemingly compromised immune systems, as indicated by reduced expression levels of interferon-stimulated genes and elevated virus copy numbers, when compared to wild-type medaka. A trade-off between growth and immunity is seen in a variety of animals (Henryon et al., 2002). Additionally, mice with chronic kidney disease and obesity show increased levels of MSTN expression, indicating the gene may play an important immune role (Rahimov and Kunkel, 2013; Zhang et al., 2011).

The non-congruence of the channel catfish with the medaka disease resistance results might be related to channel catfish being unique, having only one copy of the MSTN gene, and channel catfish taking a different evolutionary path. Within diploid teleosts myostatin-b retains its role in muscle development, while myostatin-a relates to immune function (Wang et al., 2018). Channel catfish MSTN is homologous to mstn-b in other diploid teleosts, and therefore may not play a role in immune function (Karim et al., 2017; Kocabas et al., 2002; Gregory et al., 2004). More research must be carried out on other diseases and species to determine the role of channel catfish MSTN on immune function, and how it relates to other teleosts.

The improved growth and potentially enhanced disease resistance indicate that the use of gene edited MSTN channel catfish could be beneficial for commercial farms. Catfish farming and production in the United States peaked in 2003, dramatically declined from 2007-2012 and has been gradually increasing since that time (Hanson and Sites, 2015; Torrans and Ott, 2018; FAO, 2020). Gene editing presents a valuable tool to increase profitability, sustainability and industry growth. There are, however, a number of ethical, logistical and regulatory hurdles for the MSTN mutant channel catfish to become applied commercially in the United States, as FDA currently regulates gene edited animals. The improvement of gene editing technologies, greater understanding of its effects and the commercial success of genetically improved organisms, including Aquabounty's AquaAdvantage salmon make this technology a viable option in the near future. By combining MSTN gene editing with other genetic techniques, such as selection, crossbreeding and hybridization, it is likely possible to achieve even greater growth results, shorten the grow-out period, and select for multiple traits. With an increasing human population and declining natural resources, all solutions should be evaluated to determine the most efficient and sustainable methods of food production.

References Related to Example 1

Abass, N. Y., et al. 2020. *Aquaculture*, 521, 735084.
Abass, N. Y., et al. 2021. *Aquaculture*, 536, 736468.
Chakrapani, V et al. 2016. *Developmental & Comparative Immunology*, 61, 242-247.
Chen, et al. (2017). *PloS One*, 12(10), e0186506.
Chiang et al. (2016). *Fish & Shellfish Immunology*, 48, 212-220.
Chisada, et al. (2011). *Developmental Biology*, 359(1), 82-94.
Clop, et al. (2006). *Nature Genetics*, 38(7), 813-818.
Cuevas-Uribe, R., and Tiersch, T. R. (2011). Estimation of fish sperm concentration by use of spectrophotometry. Cryopreservation in Aquatic Species, 2nd edition. World Aquaculture Society, Baton Rouge, LA, 162-200.
DeLuna et al. (2008). *Nature Genetics*, 40(5), 676.
DeLuna et al. (2010). *PLoS Biol*, 8(3), e1000347.
Du et al. (2014). *Gene*, 543(1), 153-160.
Dunham, R. A., & Smitherman, R. O. (1983b). *Growth*, 47(1), 97.
Dunham et al. (1987). *The Progressive Fish-Culturist*, 49(4), 293-296.
Dunham et al. (1990). Genotype-environment interactions for growth of blue, channel and hybrid catfish in ponds and cages at varying densities. *Aquaculture*, 85(1-4), 143-151.
Dunham, R. A. (2011). Aquaculture and fisheries biotechnology: genetic approaches. CABI Wallingford, Oxfordshire, UK
Elaswad et al., (2018). *JoVE (Journal of Visualized Experiments)*, (131), e56275.
Elliot E. (1998) Aquadvantage salmon: A case study in transgenic food. *Animal Biotechnology*, 9:3, 165-170. DOI: 10.1080/10495399809525906
Entis, E. (1998). Aquadvantage salmon: A case study in transgenic food. *Animal Biotechnology*, 9:3, 165-170
FAO (2020). The State of World Fisheries and Aquaculture 2020. Sustainability in action. Rome. https://doi.org/10.4060/ca9229en
Gabillard, J. C., et al. (2013). *General and Comparative Endocrinology*, 194, 45-54.
Gao et al. (2016). *Frontiers in Endocrinology*, 7, 88.
Gjedrem, T., & Thodesen, J. (2005). Selection and Breeding Programs in Aquaculture (pp. 89-111). Springer, Dordrecht.
Gregory et al. (2004). *Animal Genetics*, 35(6), 425-430.
Guo et al., (2009). *PloS One*, 4(3), e4937.
Guo et al. *Scientific Reports*, 6(1), 1-10.
Hanson, T. & Sites, D. (2015). 2014 U.S. Catfish Database. MSU AEC Information Report. Retrieved from http://www.agecon.msstate.edu/whatwedo/budgets/docs/catfish2014.pdf
Helterline et al., (2007). 151(1), 90-97.
Henryon et al., (2002). *Aquaculture*, 209(1-4), 59-76.
Hruscha et al., (2013). *Development*, 140(24), 4982-4987.
Jao et al., (2013). *Proceedings of the National Academy ofSciences*, 110(34), 13904-13909.
Jeger, M. J., & Viljanen-Rollinson, S. L. H. (2001). *Theoretical and Applied Genetics*, 102(1), 32-40.
Khalil, K., et al., (2017). *Scientific Reports*, 7(1), 1-12.
Kim et al., (2019). *Aquaculture*, 512, 734336.
Kim et al., (2020). *The FASEB Journal*, 34(4), 5688-5696.
Kishimoto et al., (2018). *Aquaculture*, 495, 415-427.
Kocabas et al., *Biochimica et Biophysica Acta (BBA)-Gene Structure and Expression*, 1575(1-3), 99-107.
Li et al., (2017). *Chinese Journal of Animal Nutrition*, 29(2), 519-528.
Li et al., (2012). *Comparative Biochemistry and Physiology Part B: Biochemistry and Molecular Biology*, 161(4), 315-322.
Liu et al., (2018). Efficient genome editing using CRISPR/Cas9 ribonucleoprotein approach in cultured Medaka fish cells. *Biology Open*, 7(8).
Lv, et al., (2015). *Genetics and Molecular Research*, 14(2), 3244-3256.
Lv, et al., (2016). *Scientific Reports*, 6, 25029.
Mosher, D. S., et al., (2007). *PLoS Genetics*, 3(5), e79.
Muir, W. M., & Howard, R. D. (1999). *Proceedings of the National Academy of Sciences*, 96(24), 13853-13856.
Nowak et al., (1997). Evolution of genetic redundancy. *Nature*, 388(6638), 167-171.
Phelps et al., A. (2007). *Aquaculture*, 273(1), 80-86.
Qin, Z. (2015). Gene editing of luteinizing hormone, follicle-stimulating hormone and gonadotropin-releasing hormone genes to sterilize channel catfish, *Ictalurus punctatus*, using zinc finger nuclease, transcription activator-like effector nuclease and clustered regularly interspaced short palindromic repeats/Cas9 technologies. Doctoral dissertation, Auburn University, AL, USA.
Qin, G. (2019). Gene Editing and Hormone Therapy to Control Reproduction in Channel Catfish, *Ictalurus punctatus*. Doctoral dissertation, Auburn University, AL, USA.
Qin, Z., et al., (2016). *Marine Biotechnology*, 18(2), 255-263.
Rahimov, F., & Kunkel, L. M. (2013). *Journal of Cell Biology*, 201(4), 499-510.
Tlusty et al., (2018). Commentary: comparing efficiency in aquatic and terrestrial animal production systems. *Environmental Research Letters*, 13(12).
Torrans, L., & Ott, B. (2018). *North American Journal ofAquaculture*, 80(2), 187-192.
Varshney et al., (2015). *Genome Research*, 25(7), 1030-1042.
Wang et al., (2018). *Fish & Shellfish Immunology*, 72, 572-580.
Wang et al., (2015). *Scientific Reports*, 5, 16623.
Wang et al., *Animal Genetics*, 49(1), 43-51.
Wu et al., (2003). Autoregulation of neurogenesis by GDF11. *Neuron*, 37(2), 197-207.
Xia et al., (2017). *PLoS Genetics*, 13(7), e1006892.
Ye et al. (2007). *Genetics Selection Evolution*, 39(1), 1-17.
Zhang et al., (2011). *The FASEB Journal*, 25(5), 1653-1663.
Zhang et al., *Molecular Biology Reports*, 39(3), 3081-3087.
Zhong et al., (2016). *Scientific Reports*, 6, 22953.

Example 2—Growth and Survival of Melanocortin-4 Receptor Gene Edited Channel Catfish, *Ictalurus punctatus*

1. Introduction

The melanocortin-4 receptor (MC4R) is a G protein-coupled receptor within the five-membered melanocortin receptor family (MC1R-MC5R) (Liu et al., 2019). This family of receptors regulate many functions, with MC4R primarily controlling energy homeostasis (Liu et al., 2019). MC4R is expressed in the hypothalamus and is activated by α-melanocyte stimulating hormone (α-MSH), a neuropeptide derived from proopiomelanocortin (POMC) (Liu et al., 2019) and antagonized by agouti-related peptide (AGRP), responsible for increasing appetite and decreasing metabolism and energy expenditure (Liu et al., 2019). MC4R is located upstream of kisspeptin and downstream of leptin and ghrelin, making it an essential metabolic component (Liu et al., 2019). Channel catfish MC4R gene is a two-exon gene with a transcript of 5,258 bp located on chromosome 20 (GenBank Accession No. LBML01001141.1).

In mammals, MC4R is predominantly expressed in the central nervous system (Liu et al., 2019). MC4R plays a key role in feeding inhibition with reduced expression leading to increased appetite (Fan et al., 1997). Homozygous MC4R deficient mice, Mus musculus, showed hyperphagic obesity and hyperinsulinemia, while heterozygous mice exhibited an intermediate phenotype (Vaisse et al., 1998). In humans, MC4R mutations are the leading genetic cause of obesity with some studies reporting up to 4% of early-onset obesity cases being caused by a missense of nonsense mutation in the gene (Carroll et al., 2005). Due to its effect on body weight and energy homeostasis, MC4R is a potentially valuable gene for improving growth and feed conversion traits in livestock.

In fish, MC4R plays a role in many physiological processes including appetite and energy expenditure (Cerda-Reverter et al., 2003; Schjolden et al., 2009). In zebrafish, Danio rerio, MC4R is largely controlled by MRAP2, which is found in two forms. Larval zebrafish produce MRAP2a, which down-regulates MC4R, thereby increasing appetite, and adults produce MRAP2b, which up-regulates MC4R (Liu et al., 2019). Similarly, CRISPR/Cas9 MC4R knockout zebrafish showed no phenotypic differences from wild-type individuals before 2.5 months post fertilization, while adults displayed increased food consumption, increased growth and higher body fat percentage compared to wild-type individuals (Fei et al., 2017). This compliments the natural growth rate of most fish, with larval fish exhibiting fast growth rate, which gradually slows down throughout its life and typically asymptotes after sexually maturity. Goldfish, Carassius auratus, and rainbow trout, Oncorhynchus mykiss, that were administered the MC4R agonist MTII showed feed inhibition, while those injected with MC4R antagonist, HS024 had increased feed intake and subsequent growth increases (Cerda-Reverter et al., 2003; Schjolden et al., 2009). Transgenic zebrafish overexpressing the MC4R antagonist agouti-related protein (AgRP) exhibited obesity, increased linear growth and adipocyte hypertrophy (Song and Cone, 2007).

Much of the research to date focused on SNPs and other natural mutations in the MC4R gene. In a study of Holland's carp, Spinibarbus hollandi, SNPs in the MC4R promoter region were associated with reduced expression levels of the gene and subsequently exhibited extremely high growth performance (Yang et al., 2018). In a study on F2 Mangalitsa x Pietrain pigs, Sus scrofa domesticus, heterozygous animals containing one of two mutations in the MC4R gene consumed 118 g more food and gained 32 g more per day than homozygous wild-types (Meidtner et al., 2006). The ease and precision of CRISPR/Cas9 and ability to generate large mutations that could potentially lead to larger phenotypic gains make the technology ideal for commercial use.

Previous studies show high mutation rates in MC4R gene edited fish. In a study by Xie et al. (2016), the mloxP gene was inserted into the zebrafish genome at the MC4R locus. Using a novel method in which oocytes are injected in advance and incubated in storage medium before fertilization, they were able to achieve a mutation rate of 94.4% in the MC4R locus in P1 individuals. Additionally, the germline transmission for MC4R mutation was 96.7%. Kawahara et al. (2015) achieved a 95% mutation rate in the MC4R locus of medaka, Oryzias latipes, using TALENs (Kawahara et al., 2015).

MC4R is a useful candidate not only for its role in body weight but also in fat production. In both brown and brindle cattle, Bos taurus, the C1069G SNP of the MC4R gene was associated with increased marbling (Lee et al., 2013). However, there was no association between the same SNP and marbling in a third breed, or any effect on carcass weight in any of the three breeds, indicating that certain mutations may only have commercial value in specific populations and species (Lee et al., 2013). If MC4R mutations cause a similar increase in fat production in fish, particularly in healthy omega-3 fatty acids, it could greatly increase economic value for its health and flavor qualities.

A third potentially useful trait of MC4R is its role in reproduction. Polymorphisms in swordtail and platyfish, Xiphophorus spp., males caused a nearly doubling of body weight as well as a delayed onset of sexual maturity and significant charge in mating behavior (Lampert et al., 2010). Large males with this polymorphism have complex mating rituals with females, while small, fast maturing males with normal MC4R genes exhibit sneak mating with females. The role of MC4R in reproduction varies between species and even sex. In mice, deletion of the MC4R gene causes hyperphagia, hyperinsulinemia, obesity and progressive infertility in females (Chen et al., 2017). MC4R knockout female mice had reduced levels of luteinizing hormone (lh), leading to irregular ovulation and reproductive ability, while males had no difference in testosterone levels (Chen et al., 2017). Medaka with mutations in the MC4R gene showed greater growth and slower embryonic development but no difference in onset of puberty (Liu et al., 2019). In spotted scat, Scatophagus argus, MC4R agonists NDP-MSH and THIQ significantly increased levels of primary reproductive hormones gnrh (Gonadotropin releasing hormone), fshb (Follicle-stimulating hormone beta subunit) and lhb (Luteinizing hormone beta subunit), while MC4R antagonists, SHU9119 Ipsen 5i reduced levels of these three hormones (Jiang et al., 2017). This study indicates that MC4R participates in reproductive regulation in fish by stimulating gnrh expression in the hypothalamus and fshb and lhb in the pituitary (Jiang et al., 2017).

Many fish raised in captivity exhibit reproductive problems as they do not experience the same conditions that they would in the wild during spawning. Females often fail to produce mature oocytes or undergo spawning behavior while males often produce lower quality and quantity of milt (Zohar and Mylonas, 2001). The most common solutions are environmental manipulation and hormone therapy. Reproductive hormones have been regularly used since the 1930's to induce final gamete maturation and spawning (Zohar and Mylonas, 2001). While early methods included ground up pituitaries containing gonadotropins, modern synthetic agonists and analogs, including LHRHa, GnRHa, and LHa exhibit increased potency and efficacy. These methods may overcome potential hormonal issues associated with MC4R mutations and allow germline transmission of the valuable mutation. By combining gene editing of the MC4R gene with hormone therapy, a farmer could have full reproductive control of their fish. They could therefore prevent unwanted mating, potentially prevent a slowdown in growth often associated with gonadal development and reduce environmental risk of escapement. A farmer could then restore fertility using hormonal therapy when required for spawning.

Successful knockout of MC4R and spawning of mutant broodstock does not guarantee that the mutation will be inherited in their progeny. Hruscha et al. (2013) achieved a 50% mutation rate in zebrafish using CRISPR/Cas9, but only 11% of progeny inherited the mutation. Varshney et al. (2015) attained a 53% mutation rate from 162 loci targeting 83 genes in zebrafish and had an average germline transmission rate of 28%. In this study however, mutated founder individuals were mated with wild-type fish, so that parents heterozygous for the mutation would skew the results towards a lower transmission rate. The study also included the 47% of the founders that did not carry mutations in their breeding program and results, further lowering the reported transmission rate. In a study on MC4R mutant mice and rats, *Rattus norvegicus*, half of the offspring of MC4R mutant rat crossed with wild-type rats tested positive for the mutation, indicating a high efficiency of germline transmission after CRISPR/Cas9 mutagenesis. CRISPR/Cas9 mediated MC4R mutant rats were 43% larger than wild-type individuals and showed increased food intake and larger perirenal fat pads (Li et al., 2013). Still, due to mosaicism, epistasis and other unforeseen effects, germline transmission of CRISPR/Cas9 induced mutations are not necessarily inherited with Mendelian distributions. The rate of transmission is also largely dependent on the species, target gene, gRNA design, genotype of the parents and administration procedure.

This Example at least demonstrates knock out of the melanocortin-4 receptor (MC4R) gene in channel catfish, evaluation of growth, survival, inheritance of the mutation in the F1 generation, effect of zygosity on growth rate.

2. Materials and Methods 2.1. Design and Preparation of sgRNA and CRISPR Cas9 System Three customized small guide RNAs (sgRNAs) were designed and generated using the Maxiscript T7 PCR-based method. First, four gene-specific oligonucleotides (MC4R-A, MC4R-B, MC4R-C, MC4R-D; Table 9) containing the PAM were designed using the CRISPRscan online tool to target the channel catfish MC4R gene (GenBank Accession No. LBML01001141.1). Exon 1 was targeted in all four sgRNA sites in order to truncate the protein as early as possible to have the largest knockout effect. The Universal Primer (Table 9), containing the sgRNA scaffold, was ordered through Thermo Fisher Scientific. Each of the oligos was reconstituted using DNase/RNase Free water to 10 mM. To create template for sgRNA synthesis, the three oligos were used to were synthesize double stranded DNA (dsDNA) by mixing 25 µl 2× EconoTaq Plus Master Mix (Lucigen), 12.5 µl Universal Primer, and 12.5 µl gene-specific oligonucleotide. PCR cycling was carried out with initial denaturing at 95° C. for 3 min; 5 cycles of denaturation at 95° C. for 30 sec, annealing at 50° C. for 30 sec with a ramp speed of –0.2° C./sec, extension at 72° C. for 30 sec; 20 cycles of denaturation at 95° C. for 30 sec, extension at 72° C. for 20 sec with a ramp speed of –0.2° C./sec; and final extension at 72° C. for 10 min.

The Taq Polymerase was then inactivated using 4.8 µl of 0.5M EDTA and incubated at 75° C. for 20 min. The PCR product was confirmed using 1% agarose gel. The sgRNA was synthesized using the Maxiscript T7 Kit (Thermo Fisher Scientific), following the manufacture guidelines. A mix of 2 µl dH2O, 10 µl dsDNA Template (created above), 2 µl 10× buffer, 1 µl ATP, 1 µl CTP, 1 µl GTP, 1 µl UTP and 2 µl Enzyme Mix was incubated at 37° C. for 90 min. The solution was cleared of DNA contamination by adding 1 µl of Turbo DNase I, vortexing briefly and incubating at 37° C. for 15 min. The magnesium ions were chelated by adding 5 µl of 0.5M EDTA. The Turbo DNase I was inactivated by heating the solution at 75° C. for 10 min. The obtained sgRNAs were purified using Zymo RNA Clean and Concentrator kit (Zymo Research). The sgRNAs were stored in –80° C. freezer.

The Cas9 protein was acquired from PNA Bio (3541 Old Conejo Rd, Newbury Park, CA 91320) and reconstituted in dH$_2$O to a concentration of 1 mg/ml. Twenty minutes prior to fertilizing the eggs, four sets of injection solutions were prepared by mixing equal parts of Cas9 protein with each of the sgRNAs individually, and a fourth solution combining all three sgRNA with Cas9 protein (MC4Rmix). The mixture was incubated on ice for 10 minutes before adding phenol red to a total ratio of 1:1:1 of Cas9, sgRNA and Phenol red, respectively. The final concentrations of Cas9 protein and sgRNA were 300-350 ng/µl and 150-200 ng/µl, respectively.

TABLE 9

| Oligo sequence (5' to 3') | Oligo name | SEQ ID NO: |
|---|---|---|
| AAAAGCACCGACTCGGTGCCACTTTTTCAAGTTGATAACGGACTAGCCTTATTTTAACTTGCTATTTCTAGCTCTAAAAC | Universal Primer | 80 |
| taatacgactcactataGGGATGGCGCTGATCACCAGgttttagagctagaa | MC4R-A | 81 |
| taatacgactcactataGGGAAAGGAACTCGGAGTCgttttagagctagaa | MC4R-B | 82 |
| taatacgactcactataGGGCAGGATGGTGAGCGTCAgttttagagctagaa | MC4R-C | 83 |
| taatacgactcactataGGTGGTGGCGTTCGGTCCAgttttagagctagaa | MSTN1 | 84 |
| taatacgactcactataGGGCGAGGCGCAGTGTTCAgttttagagctagaa | MSTN2 | 85 |
| taatacgactcactataGGGTCGAGCAGCTGCTGCACgttttagagctagaa | MSTN3 | 86 |
| GGAGATGGAGGACACGGAAG | MC4R-ALL-1F | 87 |
| GAGACATGAAGCAGACGCAATA | MC4R-ALL-1R | 88 |
| taatacgactcactataGTGATGGCGCTGATCACCAGgttttagagctagaa | MC4R-A2-sense | 89 |

TABLE 9-continued

| Oligo sequence (5' to 3') | Oligo name | SEQ ID NO: |
|---|---|---|
| taatacgactcactainCGGGATGCAGCATGCACACCgtt ttagagctagaa | MC4R-D-antisense | 90 |
| taatacgacicactataCTTGTCTGTAAGCGGATGCCgtt ttagagctagaa | PUC57 Vector | 91 |
| TATCGAACGCGACAGAAACGGCTGTGATGGCGCTGATCAC GCCGGGAGCAGACAAGCCCGTCAGGGCGCGTCAGCGGGTG | BsalElvol2_ssODN1 | 92 |
| GCAGCTCCCGGAGACGGTCACAGCTTGTCTGTAAGCGGAT CCAGCGGAACCTGACCATCTCTGGAGACGTCGTGAAAAGC | BsalElvol2_ssODN2 | 93 |
| GAGGAGGTCTTGCGGATATGAACGTGTCGGAGCACCACGG GCCGGGAGCAGACAAGCCCGTCAGGGCGCGTCAGCGGGTG | BsalElvol2_ssODN3 | 94 |
| GCAGCTCCCGGAGACGGTCACAGCTTGTCTGTAAGCGGAT GATGCAGCATGCACACCGGAACCACAGCCTGGGCGTGCAG | BsalElvol2_ssODN4 | 95 |
| ACTCCTCTCTGAGACCTGAC | EX1-F | 96 |
| AGTTAGGCTATGAAGCAGTAGT | EX1-R | 97 |
| CGAAATCCGTTCCTTTTTACTG | Evol2-F | 98 |
| CTGGCCTGTTCCTCATGTATTT | Evol2-R | 99 |

Table 9 shows primers used to amplify partial sequences of channel catfish, Ictalurus punctatus, oligonucleotides to target specified regions for CRISPR/Cas9 cleavage and single-stranded oligo donor nucleotide (ssODN). Universal primer was used to bind oligonucleotides to Cas-9 protein. Red letters indicate binding site to target gRNAs. MC4R-A, MC4R-B, MC4R-C, MC4R-A2-sense and MC4R-D-antisense were all used to target various loci in exon 1 of the channel catfish MC4R gene. MSTN-1, MSTN-2 and MSTN-3 were all used to target various loci in exon 1 of the channel catfish MC4R gene. MC4R-ALL-1F and MC4R-ALL-1R were used to amplify DNA segments flanking the target sites for guide RNAs in the catfish MC4R gene. EX1-F and EX1-R were used to amplify DNA segments flanking the target sites for guide RNAs in the catfish MC4R gene. PUC57 Vector was used to amplify a partial sequence of the Evol2 plasmid containing the elongase gene. BsalElvol2_ssODN1 and BsalElvol2_ssODN2 were used to flank the cut site associated with the MC4R-A2-sense gRNA to facilitate Homologous Directed Repair (HIDR) in the MC4R gene. BsalElvol2_ssODN3 and BsalElvol2_ssODN4 were used to flank the cut site associated with the MC4R-D-antisense gRNA to facilitate Homologous Directed Repair (HDR) in the MC4R gene.

2.2. Brood Stock Husbandry, Selection and Spawning

Brood stock were cultured in 0.04-ha earthen ponds averaging 1-meter in depth. They were fed a 32 percent protein catfish pellet at 1-2% of their body weight five days per week. Dissolved oxygen was maintained above 3 mg/L using a 12 horsepower surface aerator (Air-O-Lator).

The Kansas strain of channel catfish was chosen as broodstock due to their superior growth and fry output when induced by injection of luteinizing hormone releasing hormone analogs (LHRHa). Individuals were chosen based on their health and secondary sexual characteristics. Males with well-developed papilla and large, muscular heads that were wider than the rest of their bodies were chosen. Dark coloring and scarring from territorial fighting were also signs of quality males in reproductive condition. Females with soft, well-rounded abdomen that were wider than their head, and a swollen urogenital opening were chosen. Broodstock were minimally handled and kept in tanks for as short a time as possible to avoid stress.

Males were terminated by a percussive blow to the head followed by pithing. The body cavity was opened carefully with a scalpel, ensuring not to pierce any organs. Testes were removed using tweezers and/or scissors and washed in a weigh boat with 0.9 percent saline using bottled distilled water, removing any blood or tissue. The water was drained, and the testes weighed before macerating the testes using scissors to release sperm. The homogenized testes were then filtered into a 50 mL falcon tube using a 100-micron screen. The sperm was then diluted with 0.9 percent saline solution to a maximum of 10 mL/gram of testes. Sperm concentration was tested using a Nanodrop 2000 Spectrophotometer (Thermo Scientific) and running a simple linear regression between sperm concentration and absorbance using the equation $y=-2.450+0.185\ln X$ (Adjusted $R2=0.601$) at 450 nm (Cuevas-Uribe & Tiersch, 2011). Motility was analyzed under a 10× light microscope while sperm count was checked under 40× magnification. Ideally, sperm was used immediately, but could be stored at 4° C. for one week, with declining quality or up to two weeks with the addition of gentamycin at a concentration of 1 mg/mL sperm solution.

Females were weighed and gently placed in labeled 32 mm mesh bags. The spawning bags were then placed in a flow through holding tank so that the fish was fully submerged, ensuring that water quality was ideal with dissolved oxygen levels above 5 mg/L. A 14-gauge implanter was loaded with 100 µg/kg body weight of luteinizing hormone releasing hormone analog (LHRHa) implant. The needle was then inserted at a 45-degree angle ventrally adjacent to the pelvic fin and the implant was inserted. The ovulation time was predicted based on the degree-hours according to Phelps et al. (2007). Water temperature ranged from 26-28° C. Females were checked 36 hours after LHRHa injection and every four hours after that until ovulation. Once a female began ovulating, indicated by eggs visible on the bag, she was carefully transferred into a tank with 100 mg/L buffered tricaine methane sulfonate (MS-222) with equal parts sodium bicarbonate until completely anesthetized. Prior to this time, a thin layer of vegetable shortening, Crisco, was used to coat several 20 cm diameter metal egg collection pans. The fish was then dipped in fresh water to wash off the MS-222 and gently dried with a towel. A thick layer of vegetable shortening was applied around the urogenital opening, including the pelvic fins to prevent sticking of the eggs during stripping. The female was hand stripped into the greased pan by gently applying pressure on the abdomen from the anterior end of the abdomen posteriorly towards the vent. Eggs would usually flow freely, well rounded and golden in color, with minimal blood. The stripping ensured that the eggs could not contact freshwater, which can activate the eggs. Eggs were then covered with another spawning pan to maintain moisture and transported to the molecular laboratory.

Approximately 200-300 eggs were transferred to a greased pan for fertilization. Approximately 3 mL of sperm solution was added to the eggs and mixed gently with fingertips. Fresh water was added to barely cover the eggs in order to activate the sperm and eggs and the water was swirled to form a single layer and prevent sticking. After two minutes, the eggs should be fertilized, and three more cm of water was added to the eggs and the eggs were left to harden for 15 minutes.

While the embryos were hardening, 5-10 µl of the Cas9/sgRNA/phenol red mixture was loaded into 1.0 mm OD borosilicate glass capillary microinjection needles using a microloader. The tips of the needles were opened by breaking the end with a scalpel. The needle was then inserted into the micropipette holder to its deepest range and tightened, ensuring a tight seal. The compressed air cylinder was opened, and pressure was adjusted to 7000 kPa and 0.824 m$^3$/hr using the pressure regulator. The injection volume was adjusted to 50 nl by manipulating the pressure, the length of injection and the needle diameter. Injection volume was measured by injecting a drop of mineral oil on a hemocytometer.

After 15 minutes 100-200 embryos were transferred in a single layer to a greased 100 mm petri dish and covered with Holtfreter's solution (Table 10). The petri dish was placed on the stage of the microscope. In one smooth motion, the needle was lowered until it pierced the chorion and yolk, and the pedal of the microinjector was depressed, delivering the CRISPR solution, and withdrawing slowly. For best results, the solution was injected as close to the blastodisc as possible. When the blastodisc was not visible, the solution was spread throughout the embryo by depressing the pedal while simultaneously withdrawing the needle smoothly.

To reduce mosaicism, embryos were injected between 15 min and 90 min post-fertilization, while they remained in the one cell stage. Injection controls were injected with 50 nl of phenol red, while non-inject controls were not injected.

Embryos were placed in four-liter tubs of Holtfreter's solution with 10 mg/L doxycycline kept at 27° C. with continuous aeration. The solution was changed, and dead embryos were removed daily. After about 5 days, or when the embryos were moving rapidly within the egg membrane and close to hatch, doxycycline treatment was discontinued. At 20 dph fry were moved to aquaria in recirculating systems until large enough to be PIT (Passive Integrated Transponders) tagged and moved to earthen ponds.

TABLE 10

| Name of Material/ Equipment | Type | Company | Catalog Number | Comments/Description |
| --- | --- | --- | --- | --- |
| Reproboost ® implant | Hormone | Center of Marine Biotechnology | | Luteinizing hormone releasing hormone analog (LHRHa) for artificial spawning |
| TRICAINE-S | Anesthesia | Western Chemical. Inc. | | For sedation of brood stock fish during hormone injection and egg stripping. |
| Phenol red | Reagent | Sigma-Aldrich | P0290 | 0.5%, sterile filtered |
| Stereo microscope | Equipment | Olympus | 213709 | For visualizing the eggs during microinjection |
| Microinjector | Equipment | ASI-Applied Scientific Insturmentation | Model MPPI-3 | For the delivery of the injection material into the embryos |
| Micromanipulator | Equipment | ASI-Applied Scientific Insturmentation | Model MM33 | For holding and controlling the movement of the injection needle. |
| Eppendorf Microloader | Tool | Eppendorf | 5242956.003 | For loading injection solution into microinjection needles. |
| Vertical needle puller | Equipment | David Kopf Instruments | Model 720 | For pulling microinjection needles |
| Borosilicate glass capillaries | Tool | Fisher Scientific | | 1 mm outer diameter (OD), for making microinjection needles. |
| Petri dish | Tool | VWR | 25384-302 | For holding the embryos during the microinjection. |
| Crisco ® | Vegetable shortening | The J.M. Smucker Company | | For coating spawning pans and petri dishes. |
| Holtfreter's solution | Reagent | Lab Made | | 59 mM NaCl, 0.67 mM KCl, 2.4 mM NaHCO3, 0.76 mM CaCl2, 1.67 mM MgSO4 (Armstrong et al., 1989) to incubate the microinjected embryos till hatch. |
| Doxycycline hyclate USP (monohydrate) | Antibiotic | Letco Medical | 690904 | Added to Holtfreter's solution to 10 ppm to prevent bacterial infections. |

Table 10 shows name, type of material, company, catalog number (if applicable) of materials and equipment used in microinjection protocol for CRiISPR/Cas9 in channel catfish, *Ictalurus punctatus*.

2.3. Mutation Analysis

Pelvic fin-clip samples (10-20 mg) were collected in sterile 1.5 mL Eppendorf tubes and kept in a −80'C freezer until DNA extraction. Genomic DNA was extracted using proteinase K digestion and ethanol precipitation using the following protocol: fin clips were digested in 600 1 of cell lysis buffer (100 mM NaCl, 10 mM Tris, 25 mM EDTA, 0.500 SDS) and 2.5 µl of proteinase K in a 55'C hot water bath for 4-8 hours, with occasional vortexing. Protein was precipitated by adding 200 µl of protein precipitation solution (Qiagen, 19300 Germantown Road Germantown, MID 20874), vortexed, stored on ice for 12 minutes and centrifuged for 8 minutes at 15,000 rcf. The supernatant containing DNA was then precipitated with isopropanol followed by centrifugation for 5 minutes at 15,000 rcf and finally washed twice with 75% ethanol by inverting gently 5-times before being dissolved in $dH_2O$. DNA concentration and purity was measured using a NanoDrop 2000 spectrophotometer (Thermo Scientific) and concentration was adjusted to 500 ng/µl.

The primer set MC4R1-F, MC4R1-R (Table 9) was designed using Primer3plus to encapsulate all possible mutation sites. The Expand High FidelityPLUS PCR System (Roche) was used with 500 ng of genomic DNA. A Bio-Rad T100 Thermal Cycler was used to run PCR with an initial denaturing at 95° C. for 3 min; 34 cycles of denaturation at 95° C. for 30 sec, annealing at 60° C. for 40 sec with a ramp speed of −0.2° C./sec, extension at 72° C. for 40 sec; and final extension at 72° C. for 10 min.

The PCR product was confirmed on a 1% TAE Tris base, acetic acid and EDTA agarose gel. The PCR product from the treatment fish was mixed with PCR product from a wild type control of the same family at a 1:1 ratio. The combined product was then hybridized in a BioRad Thermocycler using an initial denaturing at 95° C. for 3 min; 85° C. for 1 min with a ramp speed of −0.2° C./sec, 75° C. for 1 min with a ramp speed of −0.2° C./sec, 65° C. for 1 min with a ramp speed of −0.2° C./sec, 55° C. for 1 min with a ramp speed of −0.2° C./sec, 45° C. for 1 min with a ramp speed of −0.2° C./sec, 35° C. for 1 min with a ramp speed of −0.2° C./sec, 25° C. for 1 min with a ramp speed of −0.2° C./sec.

The Surveyor© mutation detection kit (Integrated DNA Technologies) was used to detect mutations. Hybridized products were mixed with Nuclease S, Enhancer S, MgCl2 and Reaction Buffer (2) according to kit instructions and incubated at 42° C. for one hour. The digested products were separated on a 1.5 percent TBE (Tris borate EDTA) agarose gel and compared with that of control samples.

To confirm and identify the mutations, positive samples were sequenced using the TA cloning method. The largest individuals from each treatment that repeatedly were confirmed as mutants using Surveyor Analysis were sequenced. First, genomic DNA from three mutants per treatment was amplified with PCR using Expand High Fidelity$^{PLUS}$ PCR System (Roche) using the above protocol. The PCR product was verified using a 1 percent TAE agarose gel and cloned into the TOPO® TA Cloning® Kit (Invitrogen) with 20 clones per sample and sent to MCLabs for sequencing. The resulting sequences were interpreted using the MAFFT sequence alignment tool.

2.4. Generation of F1 Progeny

In 2016 and 2017 spawning of MC4R broodstock was unsuccessful, even though broodstock showed outstanding secondary sexual traits. Male and female MC4R mutants were paired in aquaria and injected with 100 µg/kg body weight of luteinizing hormone releasing hormone analog (LHRHa) implant in our standard procedure.

In 2018 both male and female P1 MC4R mutants were injected with 40 µg/kg LHRHa and 1600 international units (IU) HCG intraperitoneally, resulting in successful spawning of all pairs that were mated. A total of 8 MC4R pairings were generated. Five pairings were made between wild-type females xP1 MC4R mutant males, 2 pairings between P1 MC4R mutant females x wild-type males and 1 pairing between a P1 MC4R mutant female x P1 MC4R mutant male. One pair of wildtype Kansas strain channel catfish from the same family were paired in identical conditions as controls but using our standard protocol of 100 µg/kg LHRHa. The system received flow through water from a source pond between 26-28° C. and dissolved oxygen was maintained above 5 mg/L using an air stone diffuser. Starting 24 hours after injection, the bottom of the aquaria were checked every two hours for courtship behavior and egg masses. Egg masses were weighed and transferred to 4 L bins of Holtfreter's solution and maintained according to the protocol in 2.2.

In 2019, two more families of MC4RxMC4R and MC4RxCNTRL were generated using the same method as 2018. Two and three-year old MC4R gene edited channel catfish with good secondary sexual characteristics were chosen as brood stock. Both male and female P1 MC4R mutants were injected with 40 µg/kg LHRHa and 1600 international units (IU) HCG intraperitoneally and kept in 70-liter glass aquaria. Two pairs of wild-type Kansas strain channel catfish from the same family were paired in identical conditions as controls. The system received flow through water from a source pond between 26-28° C. and dissolved oxygen was maintained above 5 mg/L using an air stone diffuser. Starting 24 hours after injection, the bottom of the aquaria were checked every two hours for courtship behavior and egg masses. Egg masses were transferred to 4 L bins of Holtfreter's solution and maintained according to the protocol in 2.2.

2.5. Grow Out and Growth Sampling

One-hundred fry per genetic type were stocked into 3-replicate 50 L aquaria in recirculating systems for growth experiments. Fish in each aquarium were fed ad-libitum with Aquamax powdered and pelleted fish diets and catfish diets.

Pellet feed size was adjusted to a maximum of 4 the size of the mouth as the fish grew. Fry were fed Purina® AquaMax® powdered starter feed until they were large enough to eat Purina® AquaMax® 100. Both feeds contained 50% protein. All fish were fed every day to satiation. Fish were weighed at 4 months, pit tagged and stocked communally in a 0.04-ha pond at approximately 10,000 fish/ha in 3 replicate confined ponds. Fifteen fish per genetic type remained in the aquaria in the recirculating system. The fish were sampled at 10 months in both aquaria and ponds. At 15 months of age fish in ponds and in aquaria were harvested and body weight determined. During these growth trials any mortality due to disease was identified by family, genotype and sex, and the pathogen identified. Having fish in multiple environments is necessary to determine any genotype-environment interactions to ensure increased performance is observed in a more commercial-like culture unit.

2.6. Statistical Analysis

To calculate differences in body weight between MC4R mutants and controls, a paired t-test was performed using R programming language (R Core Team, Vienna, Austria). To calculate differences in body weight between F1 MC4R families and CNTRL families a one-way ANOVA and Tukey's multiple comparisons test were performed using R programming language. In cases where different treatments were kept in separate aquaria at varying densities, a regression based on density was calculated, and weights were adjusted accordingly before running the statistical analysis. Differences in mutation rate were calculated with logistic regression using R programming language.

3. Results
3.1. Growth

Figure 11:
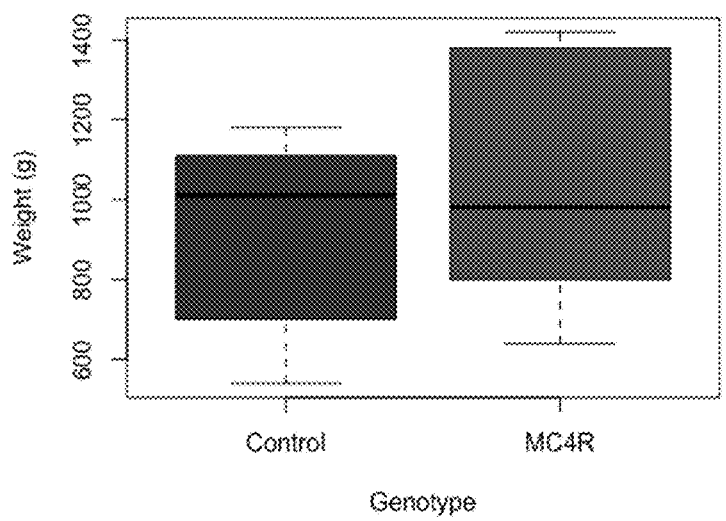
FIG. 11—Box and whisker plot of body weights (grams) of control and melanocortin-4 receptor (MC4R) P1 knockout channel catfish, *Ictalurus punctatus*, generated in 2017, at 27-months post hatch. Mutants and controls were kept separately in 50 L aquaria until 12-months post hatch, when they were pit-tagged and transferred to a 0.04ha earthen pond and kept communally with unrelated channel catfish, blue catfish, *I. furcatus*, and hybrids to bring the density to a commercial level of 10,000 fish/ha and fed daily to satiation. Sampling was performed with partial seining of the pond. The plot shows median of the data (dark line), the lower and upper quartiles (25% and 75%; top and bottom of the box respectively), the area 1.5 times the interquartile range (whiskers), and outlier (circle). Paired t-test was used to determine significant differences between treatments. MC4R mutants (N=29) were 14% and 126.50 g larger on average than controls (N=6) (p=0.330).

A total of 6 MC4R mutant P1 channel catfish and 29 control channel catfish generated in 2017 were PIT tagged and transferred into a 0.04-ha earthen pond at 12-months post hatch (mean body weight for MC4R and CNTRL were 55.75 g and 46.90 g, respectively). Mutants and controls were kept communally with channel catfish, blue catfish, and channel catfish female x blue catfish male hybrids, to bring the density to a commercial level of 10,000 fish/ha and fed daily to satiation. At 12-months post hatch, MC4R mutants had an observed mean 19% and 8.85 g s, but not significantly ($p=0.605$, $r^2=0.009$) (Table 11). At 18-months post hatch and market size, MC4R mutants had an observed mean 48% and 199.10 g larger than controls, but not significantly ($p=0.061$, $r^2=0.103$) (FIG. 11). At 27-months post hatch, the observed mean for MC4R mutants was 14% and 126.50 g larger than controls, but not significantly ($p=0.330$, $r^2=0.050$). At 33-months post hatch, MC4R mutants had an observed mean 13% and 188.00 g larger than controls, but not significantly ($p=0.400$, $r^2=0.038$). At 36-months post hatch, the fish were nearly too large for processor acceptability, and the observed mean for MC4R mutants was 16% and 300.00 g larger than controls, but not significantly ($p=0.231$, $r^2=0.128$).

A total of 21 MC4R female x MC4R male homozygous/bi-allelic MC4R mutant F1 channel catfish (MC4RxMC4R), 113 CNTRL female x MC4R male heterozygous MC4R mutant channel catfish in 5 families (CNTRLxMC4R-1, CNTRLxMC4R-2, CNTRLxMC4R-3, CNTRLxMC4R-4, CNTRLxMC4R-5), 36 MC4R female x CNTRL male heterozygous MC4R mutant channel catfish in 2 families (MC4RxCNTRL-1 and MC4RxCNTRL-2) and 20 control (CNTRLxCNTRL) channel catfish were generated in 2018. Mutants and controls were kept separately in 50 L aquaria until 6-months post hatch when they were large enough to be PIT tagged and transferred into a communal 0.04-ha pond. Mutants and controls were kept communally with channel catfish, blue catfish, and hybrid catfish, at a maximum density of 10,000 fish/ha and fed daily to satiation. Significant differences in body weight existed among treatments at 6-months post hatch ($p<2.2e-16$). At 6-months post hatch, MC4RxMC4R mutants were 7% and 1.186 g larger than CNTRLxCNTRL, but not significantly ($p=0.451$) (Table 12). CNTRLxMC4R-1 mutants were 20% and 2.75 g smaller than CNTRLxCNTRL ($p=0.046$). CNTRLxMC4R-2 mutants were 12% and 1.99 g larger than CNTRLxCNTRL, but not significantly ($p=0.232$). CNTRLxMC4R-3 mutants were 3% and 0.54 g smaller than CNTRLxCNTRL, but not significantly ($p=0.739$). CNTRLxMC4R-4 mutants were 86% and 14.31 g larger than CNTRLxCNTRL ($p=3.11e-15$). CNTRLxMC4R-5 mutants were 14% and 8.86 g smaller than CNTRLxCNTRL ($p=1.26e-7$). Overall, at 6-months post hatch, CNTRLxMC4R mutants were 1% and 0.15 g smaller on average than controls, but not significantly ($p=0.934$). MC4RxCNTRL-1 mutants were 18% and 2.55 g smaller than CNTRLxCNTRL, but not significantly ($p=0.111$). MC4RxCNTRL-2 mutants were 14% and 2.07 g smaller than CNTRLxCNTRL, but not significantly ($p=0.222$). Overall, at 6-months post hatch, MC4RxCNTRL mutants were 16% and 2.34 g smaller on average than controls, but not significantly ($p=0.253$).

Significant differences in body weight existed among treatments at 12-months post hatch ($p<2e-16$). At 12-months post hatch, MC4RxMC4R mutants were 3% and 3.21 g larger than CNTRLxCNTRL, but not significantly ($p=0.986$) (Table 12). CNTRLxMC4R-1 mutants were 38% and 8.94 g smaller than CNTRLxCNTRL ($p=0.001$). CNTRLxMC4R-2 mutants were 12% and 3.86 g larger than CNTRLxCNTRL, but not significantly ($p=0.277$). CNTRLxMC4R-3 mutants were 23% and 6.08 g smaller than CNTRLxCNTRL, but not significantly ($p=0.081$). CNTRLxMC4R-4 mutants were 71% and 23.18 g larger than CNTRLxCNTRL ($p=1.65e-10$). CNTRLxMC4R-5 mutants were 84% and 14.94 g smaller than CNTRLxCNTRL ($p=7.85e-6$). Overall, at 12-months post hatch, CNTRLxMC4R mutants were 11% and 3.20 g smaller on average than controls, but not significantly ($p=0.356$). MC4RxCNTRL-1 mutants were 8% and 2.41 g smaller than CNTRLxCNTRL, but not significantly ($p=0.452$). MC4RxCNTRL-2 mutants were 10% and 2.90 g smaller than CNTRLxCNTRL, but not significantly ($p=0.403$). Overall, at 12-months post hatch, MC4RxCNTRL mutants were 9% and 2.62 g smaller on average than controls, but not significantly ($p=0.509$).

Significant differences in body weight existed among treatments at 15-months post hatch ($p<2.67e-8$). At 15-months post hatch, MC4RxMC4R mutants were 5% and 10.14 g smaller than CNTRLxCNTRL, but not significantly ($p=0.999$) (Table 12). CNTRLxMC4R-1 mutants were 37% and 55.43 g smaller than CNTRLxCNTRL ($p=0.049$). CNTRLxMC4R-2 mutants were 26% and 42.44 g smaller than CNTRLxCNTRL, but not significantly ($p=0.475$). CNTRLxMC4R-3 mutants were 49% and 66.98 g smaller than CNTRLxCNTRL ($p=0.041$). CNTRLxMC4R-4 mutants were 36% and 73.96 g larger than CNTRLxCNTRL, but not significantly ($p=0.064$). CNTRLxMC4R-5 mutants were 58% and 74.91 g smaller than CNTRLxCNTRL ($p=0.005$). Overall, at 15-months post hatch, CNTRLxMC4R mutants were 32% and 48.77 g smaller on average than controls, but not significantly ($p=0.077$). MC4RxCNTRL-1 mutants were 23% and 37.83 g smaller than CNTRLxCNTRL, but not significantly ($p=0.519$). MC4RxCNTRL-2 mutants were 30% and 46.23 g smaller than CNTRLxCNTRL, but not significantly ($p=0.525$). Overall, at 15-months post hatch, MC4RxCNTRL mutants were 24% and 40.12 g smaller on average than controls, but not significantly ($p=0.262$).

Figure 12:
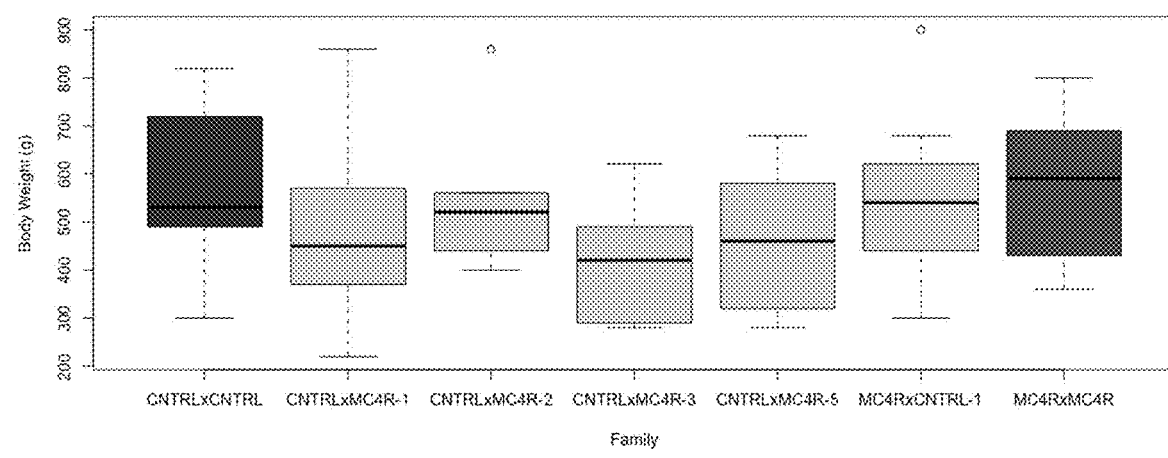
FIG. 12—Box and whisker plot of body weights (grams) of control (CNTRL), melanocortin-4 receptor (MC4R) F1 heterozygous knockout (pink) and MC4R F1 homozygous/bi-allelic knockout channel catfish, *Ictalurus punctatus*, generated in 2018, at 21-months post hatch. Mutants and controls were kept separately in 50 L aquaria until 12-months post hatch, when they were pit-tagged and transferred to a 0.04ha earthen pond and kept communally with unrelated channel catfish, blue catfish, *I. furcatus*, and hybrids to bring the density to a commercial level of 10,000 fish/ha and fed daily to satiation. Sampling was performed with partial seining of the pond. The plot shows median of the data (dark line), the lower and upper quartiles (25% and 75%; top and bottom of the box respectively), the area 1.5 times the interquartile range (whiskers), and outlier (circle). ANOVA was used to determine significant differences between treatments. There were no significant differences in body weight between any treatments (p=0.109).

There were no significant differences in body weight among treatments at 21-months post hatch when treatments were at market size ($p=0.109$) (FIG. 12). Significant differences in body weight existed among treatments at 24-months post hatch ($p=0.039$). At 24-months post hatch, MC4RxMC4R mutants were 9% and 67.71 larger than CNTRLxCNTRL ($p=0.999$) (Table 12). CNTRLxMC4R-1 mutants were 29% and 170.95 g smaller than CNTRLxCNTRL ($p=0.625$). CNTRLxMC4R-2 mutants were 16% and 105.95 g smaller than CNTRLxCNTRL ($p=0.980$). CNTRLxMC4R-3 mutants were 98% and 374.29 g smaller than CNTRLxCNTRL ($p=0.064$). CNTRLxMC4R-4 mutants were not measured during this sampling period, due to partial seining of the pond. CNTRLxMC4R-5 mutants were 34% and 190.29 g smaller than CNTRLxCNTRL (p=0.783). Overall, at 24-months post hatch, CNTRLxMC4R mutants were 36% and 197.43 g smaller on average than controls (p=0.177). MC4RxCNTRL-1 mutants were 14% and 90.00 g smaller than CNTRLxCNTRL (p=0.977). MC4RxCNTRL-2 mutants were not measured during this sampling period. Overall, at 24-months post hatch, MC4RxCNTRL mutants were 14% and 90.00 g smaller on average than controls (p=0.833).

No significant differences in body weight existed among families at 28-months post hatch (p=0.196). However, homozygous/bi-allelic mutants were 30% larger than pooled F1 heterozygotes (p=0.022).

A total of 112 MC4R female x MC4R male homozygous/bi-allelic MC4R mutant F1 channel catfish (MC4RxMC4R), 109 MC4R female x CNTRL male heterozygous MC4R mutant channel catfish (MC4RxCNTRL), and 108 control channel catfish in two families (CNTRLxCNTRL-1 and CNTRLxCNTRL-2) were generated in 2019. Mutants and controls were kept separately in 50 L aquaria until 6-months post hatch when they were large enough to be PIT tagged and transferred into a communal 0.04-ha pond. Mutants and controls were kept communally with channel catfish, blue catfish, and hybrid catfish, at a maximum density of 10,000 fish/ha and fed daily to satiation. Significant differences in body weight existed among treatments at 12-months post hatch (p=1.57e-7) (Table 13). At 12-months post hatch, MC4RxMC4R mutants were 30% and 8.77 g larger than the mean of both CNTRLxCNTRL families (p=7.1e-5) (Table 13). MC4RxCNTRL mutants were 9% and 2.34 g smaller than CNTRLxCNTRL (p=0.493).

Figure 13:
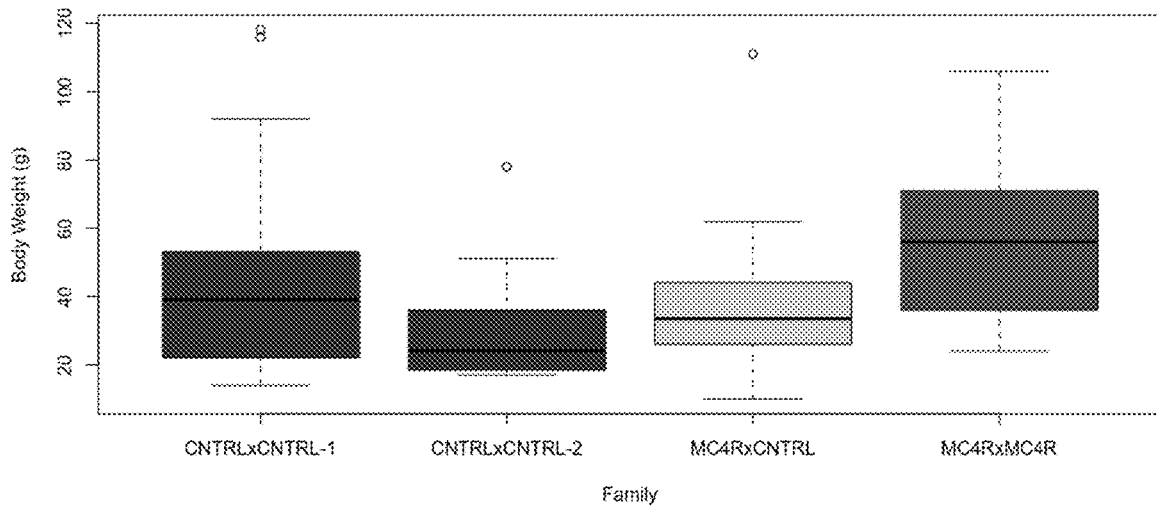
FIG. 13—Box and whisker plot of body weights (grams) of control, melanocortin-4 receptor (MC4R) F1 heterozygous knockout (pink) and MC4R F1 homozygous/bi-allelic knockout channel catfish, *Ictalurus punctatus*, generated in 2019 at 18-months post hatch. Mutants and controls were kept separately in 50 L aquaria until 12-months post hatch, when they were pit-tagged and transferred to a 0.04ha earthen pond and kept communally with unrelated channel catfish, blue catfish, *I. furcatus*, and hybrids to bring the density to a commercial level of 10,000 fish/ha and fed daily to satiation. Sampling was performed with partial seining of the pond. The plot shows median of the data (dark line), the lower and upper quartiles (25% and 75%; top and bottom of the box respectively), the area 1.5 times the interquartile range (whiskers), and outlier (circle). ANOVA was used to determine significant differences between treatments. At 18-months post hatch there was a significant difference in body weight between families (p=1.68e-4).

Significant differences in body weight existed among treatments at 18-months post hatch (p=1.68e-4). At 18-months post hatch, MC4RxMC4R mutants were 40% o and 15.75 g larger than the mean of both CNTRLxCNTRL families (p=0.005) (FIG. 13). MC4RxCNTRL mutants were 1000 and 3.73 g smaller than CNTRLxCNTRL (p=0.721).

TABLE 11

|  | 12 months | | | | 18 months | | | | 27 months | | | |
| --- | --- | --- | --- | --- | --- | --- | --- | --- | --- | --- | --- | --- |
|  | N | Mean | SD | CV | N | Mean | SD | CV | N | Mean | SD | CV |
| CNTRL | 27 | 46.90 | 23.45 | 50.01 | 29 | 417.59 | 217.48 | 52.08 | 16 | 917.50 | 212.78 | 23.19 |
| MC4R | 2 | 55.75 | 13.79 | 24.73 | 6 | 616.67 | 281.54 | 45.66 | 5 | 1044.00 | 346.81 | 33.22 |
| p-value |  | 0.522 | | | | 0.151 | | | | 0.475 | | |

|  | 33 months | | | | 36 months | | | |
| --- | --- | --- | --- | --- | --- | --- | --- | --- |
|  | N | Mean | SD | CV | N | Mean | SD | CV |
| CNTRL | 15 | 1412.00 | 368.90 | 26.13 | 8 | 1820.00 | 305.75 | 16.80 |
| MC4R | 6 | 1600.00 | 629.32 | 39.33 | 5 | 2120.00 | 556.06 | 26.23 |
| p-value |  | 0.517 | | | | 0.314 | | |

Table 11 shows mean body weights (grams), sample size (N), standard deviation (SD) and coefficient of variation (CV) of P1 melanocortin-4 receptor (MC4R) knockout mutant and control (CNTRL) channel catfish, *Ictalurus punctatus*, generated in 2017, at 12 months, 18 months, 27 months, 33 months and 36 months post hatch. Mutants and controls were kept separately in 50 L aquaria until 12-months post hatch, when they were pit-tagged and transferred to a 0.04ha earthen pond and kept communally with unrelated channel catfish, blue catfish, *furcatus*, and hybrids to bring the density to a commercial level of 10,000 fish/ha and fed daily to satiation. Sampling was performed with partial seining of the pond. Paired t-test was used to determine significant p-values_(_<0.05).

TABLE 12

|  | 6 months | | | | 12 months | | | | 15 months | | | |
| --- | --- | --- | --- | --- | --- | --- | --- | --- | --- | --- | --- | --- |
|  | N | Mean | SD | CV | N | Mean | SD | CV | N | Mean | SD | CV |
| MC4R x MC4R | 21 | 17.79 | 5.38 | 30.25 | 18 | 35.93 | 9.51 | 26.47 | 6 | 194.00 | 35.51 | 18.31 |
| CNTRL x MC4R-1 | 42 | *13.85 | 4.69 | 33.85 | 41 | *23.78 | 10.18 | 42.79 | 26 | *148.71 | 52.45 | 35.27 |
| CNTRL x MC4R-2 | 17 | 18.59 | 7.09 | 38.16 | 13 | 36.58 | 13.21 | 36.11 | 10 | 161.70 | 44.38 | 27.45 |
| CNTRL x MC4R-3 | 18 | 16.06 | 4.21 | 26.25 | 14 | 26.64 | 5.85 | 21.94 | 9 | *137.17 | 33.33 | 24.30 |
| CNTRL x MC4R-4 | 17 | *30.91 | 7.01 | 22.68 | 15 | *55.9 | 14.93 | 26.70 | 5 | 278.10 | 41.14 | 14.79 |
| CNTRL x MC4R-5 | 19 | *7.74 | 2.83 | 36.58 | 18 | *17.78 | 5.78 | 32.50 | 13 | *129.23 | 29.81 | 23.07 |
| MC4R x CNTRL-1 | 20 | 14.05 | 4.01 | 28.51 | 19 | 30.32 | 8.68 | 28.62 | 16 | 166.31 | 33.97 | 20.42 |
| MC4R x CNTRL-2 | 16 | 14.53 | 5.09 | 35.01 | 14 | 29.82 | 8.83 | 29.62 | 6 | 157.92 | 27.33 | 17.31 |
| CNTRL x CNTRL | 20 | 16.60 | 4.38 | 26.40 | 18 | 32.72 | 7.26 | 22.18 | 7 | 204.14 | 37.81 | 18.52 |
| MC4R x MC4R | 21 | 17.79 | 5.38 | 30.25 | 18 | 35.93 | 9.51 | 26.47 | 6 | 194.00 | 35.51 | 18.31 |
| CNTRL x MC4R | 113 | 16.45 | 8.61 | 52.32 | 101 | 29.52 | 15.94 | 53.98 | 63 | 155.37 | 57.02 | 36.70 |
| MC4R x CNTRL | 36 | 14.26 | 4.46 | 31.25 | 33 | 30.11 | 8.61 | 28.59 | 22 | 164.02 | 31.88 | 19.44 |
| CNTRL x CNTRL | 20 | 16.60 | 4.38 | 26.40 | 18 | 32.72 | 7.26 | 22.18 | 7 | 204.14 | 37.81 | 18.52 |

TABLE 12-continued

|  | 21 months | | | | 24 months | | | | 28 months | | | |
| --- | --- | --- | --- | --- | --- | --- | --- | --- | --- | --- | --- | --- |
|  | N | Mean | SD | CV | N | Mean | SD | CV | N | Mean | SD | CV |
| MC4R × MC4R | 8 | 572.50 | 154.16 | 26.93 | 5 | 822.00 | 182.26 | 22.17 | 7 | 1322.86 | 364.31 | 27.54 |
| CNTRL × MC4R-1 | 24 | 475.83 | 166.50 | 34.99 | 18 | 583.33 | 263.17 | 45.11 | 21 | 960.00 | 294.75 | 30.70 |
| CNTRL × MC4R-2 | 5 | 556.00 | 181.33 | 32.61 | 6 | 648.33 | 233.96 | 36.09 | 6 | 956.67 | 126.12 | 13.18 |
| CNTRL × MC4R-3 | 7 | 411.43 | 131.08 | 31.86 | 6 | 380.00 | 212.41 | 55.90 | 7 | 942.86 | 307.12 | 32.57 |
| CNTRL × MC4R-4 | — | — | — | — | — | — | — | — | 4 | 1030.00 | 529.28 | 51.39 |
| CNTRL × MC4R-5 | 9 | 462.22 | 156.35 | 33.83 | 5 | 564.00 | 213.26 | 37.81 | 6 | 1070.00 | 134.31 | 12.55 |
| MC4R × CNTRL-1 | 13 | 540.00 | 162.48 | 30.09 | 14 | 664.29 | 234.58 | 35.31 | 14 | 1148.57 | 324.46 | 28.25 |
| MC4R × CNTRL-2 | 6 | 399.50 | 63.67 | 15.94 | — | — | — | — | — | — | — | — |
| CNTRL × CNTRL | 12 | 578.33 | 149.78 | 25.90 | 7 | 754.29 | 114.14 | 15.13 | 10 | 1044.00 | 304.89 | 29.20 |
| MC4R × MC4R | 8 | 572.50 | 154.16 | 26.93 | 5 | 822.00 | 182.26 | 22.17 | 7 | 1322.86 | 364.31 | 27.54 |
| CNTRL × MC4R | 45 | 472.00 | 160.25 | 33.95 | 35 | 556.86 | 249.08 | 44.73 | 44 | 978.18 | 280.92 | 28.72 |
| MC4R × CNTRL | 14 | 524.29 | 166.81 | 31.82 | 14 | 664.29 | 234.58 | 35.31 | 14 | 1148.57 | 324.46 | 28.25 |
| CNTRL × CNTRL | 12 | 578.33 | 149.78 | 25.90 | 7 | 754.29 | 114.14 | 15.13 | 10 | 1044.00 | 304.89 | 29.20 |

Table 12 shows mean body weights (grams), sample size (N), standard deviation (SD) and coefficient of variation (CV) of control, melanocortin-4 receptor (MC4R) F1 heterozygous knockout and MC4R F1 homozygous/bi-all elic knockout channel catfish, Ictalurus punctatus, generated in 2018 at 6-months, 12-months, 15-months, 21-months, 24-months post hatch and 28-months post hatch. Mutants and controls were kept separately in 50 L aquaria until 12-months post hatch, when they were pit-tagged and transferred to a 0.04ha earthen pond and kept communally with unrelated channel catfish, blue catfish, L. furcatus, and hybrids to bring the density to a commercial level of 10,000 fish/ha and fed daily to satiation. Sampling was performed with partial seining of the pond. ANOVA was used to determine significant differences between treatments (p<0.0) indicated by asterisk in each column.

TABLE 13

| | Mean Body Weight (grams) | | | | | | | |
| --- | --- | --- | --- | --- | --- | --- | --- | --- |
| | 12 months | | | | 18 months | | | |
| | N | Mean | SD | CV | N | Mean | SD | CV |
| MC4R × MC4R | 112 | *37.58 | 10.07 | 26.79 | 41 | *55.44 | 21.18 | 38.21 |
| MC4R × CNTRL | 109 | 26.47 | 8.94 | 33.76 | 44 | 35.95 | 17.10 | 47.56 |
| CNTRL × CNTRL-1 | 79 | 30.49 | 25.98 | 85.19 | 26 | 43.88 | 29.30 | 66.76 |
| CNTRL × CNTRL-2 | 30 | 24.37 | 9.01 | 36.96 | 12 | 30.58 | 18.24 | 59.63 |
| MC4R × MC4R | 112 | *37.58 | 10.07 | 26.79 | 41 | *55.44 | 21.18 | 38.21 |
| MC4R × CNTRL | 108 | 26.39 | 8.94 | 33.88 | 44 | 35.95 | 17.10 | 47.56 |
| CNTRL × CNTRL | 109 | 28.81 | 22.73 | 78.91 | 38 | 39.68 | 26.80 | 67.52 |

Table 13 shows mean body weights (grams), sample size (N), standard deviation (SD) and coefficient of variation (CV) of melanocortin-4 receptor (MC4R) F1 heterozygous knockout, MC4R F1 homozygous/bi-allelic knockout and control (CNTRL), channel catfish, Ictalurus punctatus, generated in 2019 at 12-months and 18-months post hatch. Mutants and controls were kept separately in 50 L aquaria until 12-months post hatch, when they were pit-tagged and transferred to a 0.04ha earthen pond and kept communally with unrelated channel catfish, blue catfish, I. furcatus, and hybrids to bring the density to a commercial level of 10,000 fish/ha and fed daily to satiation. Sampling was performed with partial seining of the pond. ANOVA was used to determine significant differences between CNTRLxCNTRL-2 (p<0.05) indicated by asterisk in each column.

3.2. Mutation Analysis

A total of 18 fish survived microinjection of CRISPR/Cas9 and sgRNA targeting exon 1 of the MC4R gene in 2017. The mutation rate of the survivors was 33.3% (6/18) (Table 14). There was a significant difference in mutation rate between families generated in 2018 (p<0.05). Of the 6 P1 mutants 33.3% were homozygous/bi-allelic and 66.7% were heterozygous. In 2018, a total of 398 F1 MC4R offspring within 8 families were generated by pairing P1 mutants. One family was generated by pairing a MC4R mutant female with a MC4R mutant male (MC4RxMC4R), 5 families were generated by pairing a wild-type female with a MC4R mutant male (CNTRLxMC4R-1,2,3,4,5), and 2 families were generated by pairing a MC4R mutant female with a wild-type male (MC4RxCNTRL-1,2). The average mutation rate for all F1 MC4R channel catfish was 42% (170/398). Of the 21 MC4RxMC4R F1 mutants, 76% (16/21) were homozygotes/bi-allelic.

In 2019, a total of 130 F1 MC4R offspring were generated by pairing a MC4R mutant female with a MC4R mutant male (MC4RxMC4R). The mutation rate was 86% (112/130) and 72% of mutants were homozygotes/bi-allelic (81/112) (Table 14). The same year, a total of 180 F1 MC4R offspring were generated by pairing a MC4R mutant female with a wild-type male (MC4RxCNTRL). The mutation rate was 61% (109/180). The average mutation rate for all F1 MC4R channel catfish was 71% (221/310). There was a significant difference in mutation rate between families generated in 2019 (p<0.05).

Gel electrophoresis confirmed mutations in both P1 and F1 generations of MC4R mutants (FIG. 14). Multiple bands in the image corresponded to expected cut sites. In all cases, 1 band indicated a wild-type sequence, while multiple bands were associated with mutations. Each positive result was confirmed with a second gel.

Sequence results confirmed mutations indicated by gel electrophoresis. Two F1 mutants were tested with each possessing mutations in exon 1 in the MC4R gene (FIG. 15). Both samples had large deletions occurring outside of the target sites. There were no insertions generated. The MC4RxMC4R sample was a homozygous/bi-allelic mutant and contained a deletion (–-641 bp) spanning nearly the entire amplicon. The CNTRLxMC4R sample was a heterozygous mutant with four large deletions (–427 bp, –211 bp, –67 bp, –127 bp) and 26 substitutions.

TABLE 14

| Year Spawned | Family | Mutation Rate KO | Homozygosity/ Bi-allelism |
|---|---|---|---|
| 2017 | P1 MC4R Channel | 33% (6/18) | 33% (2/6) |
| 2018 | F1 MC4R × MC4R | 50% (21/42) | 76% (16/21) |
| 2018 | F1 CNTRL × MC4R-1 | 67% (42/63) | 0% (0/42) |
| 2018 | F1 CNTRL × MC4R-2 | 44% (17/39) | 0% (0/17) |
| 2018 | F1 CNTRL × MC4R-3 | 50% (18/36) | 0% (0/18) |
| 2018 | F1 CNTRL × MC4R-4 | 50% (17/34) | 0% (0/17) |
| 2018 | F1 CNTRL × MC4R-5 | 83% (19/23) | 0% (0/19) |
| 2018 | F1 MC4R × CNTRL-1 | 15% (20/133) | 0% (0/20) |
| 2018 | F1 MC4R × CNTRL-2 | 57% (16/28) | 0% (0/16) |
| 2018 | CNTRL × CNTRL | 0% (0/20) | 0% (0/0) |
| 2019 | F1 MC4R × MC4R | 86% (112/130) | 72% (81/112) |
| 2019 | F1 MC4R × CNTRL | 61% (109/180) | 0% (0/109) |

Table 14 shows mutation rate and zygosity of all melanocortin-4 receptor (MC4R) gene edited channel catfish, *Ictalurus punctatus*, generated in 2017, 2018 and 2019. Each row indicates a different family. P1 indicates fish gene edited through microinjection using CRISPR/Cas9 and various gRNAs targeting exon one of the MC4R gene. Approximately 50 nl of solution, composed of 300-350 ng/µl Cas9 protein and 0-200 ng/µl sgRNA, was injected into each embryo close to the blastodisc 15 min after fertilization using a glass capillary needle. F1 indicates the offspring of either control channel catfish female x control channel catfish male, control channel catfish female x homozygous/bi-allelic MC4R mutant channel catfish male, homozygous/bi-allelic MC4R mutant channel catfish female x control channel catfish or MC4R mutant channel catfish female x homozygous/bi-allelic MC4R mutant channel catfish male. Logistic regression was used to determine significant p-values (<0.05). There were significant differences in mutation rate between families in 2018 and 2019.

4. Discussion

In this Example, the effects of microinjection of gRNAs targeting exon 1 of the channel catfish melanocortin-4 receptor gene in conjunction with Cas9 protein on mutation rate and growth were investigated. Efficient mutagenesis was achieved as demonstrated by PCR, Surveyor assay and DNA sequencing. A total of 18 fish survived microinjection of CRISPR/Cas9 and sgRNA targeting exon one of the MC4R gene in 2017 with a mutation rate of 33% (6/18). Of the 6 P1 mutants 33% were homozygous/bi-allelic. This is substantially lower than the mutation rate of 87% achieved in both zebrafish and rats (Xie et al., 2016; Li et al., 2013). Growth was generally, but not always, higher in P1 MC4R mutants when compared to controls at all life stages and in pond and tank environments. A hormone mix of LHRHa and HCG was necessary as a therapy and inducement to allow P1 MC4R mutant channel catfish to spawn, resulting in the F1 generation. Homozygous F1 MC4R mutants grew 26.7% faster than controls in earthen ponds to a kg, but heterozygous F1 mutants were not different than controls for body weight.

Successful spawning of MC4R mutants to produce F1 progeny was achieved in both 2018 and 2019, and offspring inherited the mutation at a high rate. In 2018, a total of 398 F1 MC4R offspring within 8 families were generated by pairing P1 mutants. The average mutation rate for all F1 MC4R channel catfish was 42% (170/398). Of the 21 MC4RxMC4R F1 mutants, 76% (16/21) were homozygotes/bi-allelic. In 2019, a total of 310 F1 MC4R offspring within 2 families were generated by pairing P1 mutants. The average mutation rate for all F1 MC4R channel catfish was 71% (221/310). The inheritance rates were much higher than those achieved by Hruscha et al. (2013) and Vashney et al. (2015), where 11% and 28% of zebrafish progeny inherited the MC4R mutation, indicating much less mosaicism being generated with our protocols for catfish. The variability was likely due to a combination of environmental and genetic effects.

Growth was generally higher in MC4R mutants when compared to controls at all life stages and in both pond and tank environments. Beyond the stocker stage, MC4R mutants grew faster than controls. There was a positive relationship between zygosity and growth, with F1 homozygous/bi-allelic mutants growing faster than both MC4RxCNTRL and CNTRLxMC4R F1 heterozygotes. This increase in growth in MC4R mutants supports previous studies on fish, chickens, pigs and mice (Yang et al., 2018; Yang et al., 2020; Wan et al., 2012; Li et al., 2006; Kim et al., 2000; Lu et al., 1994). Homozygous F1 MC4R mutants grew 26.7% faster than controls to market size. Similarly, Holland's carp containing a SNP in the MC4R gene grew 25% faster at 1-year of age than wild-type carp (Yang, 2018). MC4R knockout zebrafish were 15.7% larger at 3-months of age than wild-type zebrafish (Fei et al., 2017; calculated using ImageJ). Chicken containing a SNP in the MC4R gene were between 1.1-6.7% larger than wild type chickens (Li and Li, 2006; Kubota et al., 2019). Al-Thuwaini et al. (2020) found that Awassi sheep breed containing a SNP in the MC4R gene grew 17.1% faster than the Arabi breed containing the wild-type MC4R gene. Pigs containing a SNP in the MC4R gene grew 0-6.0% faster than wild-type individuals (Meidtner et al., 2006; Panda et al., 2019). While few studies have investigated mutations of MC4R in fish, current data indicates that mutations in fish result in larger phenotypic gains than terrestrial animals. The larger gains in teleost fish are likely explained by the larger proportion of muscle to body weight in fish compared to terrestrial animals (Tlusty et al., 2018) or the indeterminate growth of fish. This faster growth to harvest makes MC4R a valuable gene commercially.

The growth of individual MC4R mutants and different MC4R families varied. This is likely due to differences in knockout patterns and subsequent expression levels of MC4R, differences in genetic background coupled with epistatic interaction with other loci. The variability can be advantageous as combining gene editing with selection for the largest individuals might result in maximum genetic enhancement.

There appeared to be an effect of zygosity on body weight. The wild-type allele appears to be dominant as body weight in heterozygous MC4R mutants was not different than that of controls, while homozygous mutants were generally larger than controls. This is the opposite of previous studies that found mutations in MC4R in humans are associated with a dominant form of obesity (Vaisse et al., 1998; Yeo et al., 1998; Hinney et al., 1999). Similar to our results with channel catfish, chickens with bi-allelic SNPs in the G54C locus of the MC4R gene were larger than heterozygous mutants and wild-type chickens, while heterozygotes were smaller than wild-type chickens (Li and Li, 2006). Ortega-Azorin (2012) found a third genetic mechanism in play for MC4R mutants, as there was an additive effect of human MC4R polymorphisms on appetite, while Kim et al. (2004; 2006) showed that additive action of MC4R may influence growth and fat deposition in pigs. In channel catfish, it appears that only one functional copy of the MC4R wild type allele is necessary for normal growth.

The improved growth indicates that the use of gene edited MC4R channel catfish could be beneficial for commercial farms. Catfish farming and production in the United States peaked in 2003, dramatically declined from 2007-2012 and has been gradually increasing since that time (Hanson and Sites, 2015; Torrans and Ott, 2018; FAO, 2020). Gene editing presents a valuable tool to increase profitability, sustainability and industry growth. There are, however, a number of ethical, logistical and regulatory hurdles for the MC4R mutant channel catfish to become applied commercially in the United States, as FDA currently regulates gene edited animals. The improvement of gene editing technologies, greater understanding of its effects and the commercial success of genetically improved organisms, including Aquabounty's AquaAdvantage salmon make this technology a viable option in the near future. By combining MC4R gene editing with other genetic techniques, such as selection, crossbreeding and hybridization, it is likely possible to achieve even greater growth results, shorten the grow-out period as well as select for multiple traits. With an increasing human population and declining natural resources, all solutions should be evaluated to determine the most efficient and sustainable methods of food production.

References for Example 2

Al-Thuwaini et al. (2020). Two co-inherited novel SNPs in the MC4R gene related to live body weight and hormonal assays in Awassi and Arabi sheep breeds of Iraq. *Veterinary Medicine and Science*.
Carroll et al., (2005). *Peptides*, 26(10), 1871-1885.
Cerda-Reverter et al., (2003). *Endocrinology*. 144:2336-49.
Chen et al., (2017). *Reproduction*, 153(3), 267-276.
Cuevas-Uribe, R., & Tiersch, T. R. (2011). Estimation of fish sperm concentration by use of spectrophotometry. Cryopreservation in Aquatic Species, 2nd edition. World Aquaculture Society, Baton Rouge, LA, 162-200.
Davoli et al., (2012). *Meat Science*, 90(4), 887-892.
Du et al., (2013). *Pakistan Veterinary Journal*, 33(4).
Ergün, et al., (2009). *Aquaculture International*, 17(4), 355-361.
Fan et al., (1997). *Nature*, 385(6612), 165-168.
Fei et al., (2017). *Sheng li xue bao*, 69(1), 61-69.
Goddard, S. (2012). *Feed management in intensive aquaculture*. Springer Science & Business Media. Chapman & Hall, Dept. BC, 115 Fifth Avenue, New York, NY 10003.
Godino-Gimeno et al., (2020). *Zebrafish*, 17(6), 373-381.
Hinney et al., (1999). *The Journal of Clinical Endocrinology & Metabolism*, 84(4), 1483-1486.
Hruscha et al., (2013). *Development*, 140(24), 4982-4987.
Jiang et al., (2017). *Scatophagus argus. Journal of Comparative Physiology B*, 187(4), 603-612.
Kawahara et al., (2015). *Targeted Genome Editing Using Site-Specific Nucleases (pp. 119-131)*. Springer, Tokyo.
Kim et al., (2000). *Mammalian Genome*, 11(2), 131-135.
Kim et al., (2004). *Obesity Research*, 12(12), 1981-1994.
Kim et al., (2006). *Animal Genetics*, 37(4), 419-421.
Koots, K. R. (1994). Analyses of published genetic parameter estimates for beef production traits. 2. Phenotypic and genetic correlations. *Animal Breeding Abstracts* (Vol. 62, pp. 825-853).
Kubota et al., (2019) *Poultry Science*, 98(10), 4327-4337.
Lampert et al., (2010). *CurrentBiology*, 20(19), 1729-1734.
Lee et al., (2013). *Electronic Journal ofBiotechnology*, 16(5), 14-14.
Li, C. Y., & Li, H. (2006). *Asian-Australasian Journal of Animal Sciences*, 19(6), 763-768.
Li et al., (2013). *Nature Biotechnology*, 31(8), 681-683.
Liu et al., (2019). *Frontiers in Endocrinology*, 10, 213.
Lu et al., (1994). *Nature*, 371(6500), 799-802.
Mrode et al., (1990). *Animal Science*, 51(1), 35-46.
Ortega-Azorin et al., (2012). *Cardiovascular Diabetology*, 11(1), 1-12.
Panda et al., (2019). *Indian Journal of Animal Sciences*, 89(5), 539-542.
Phelps et al., (2007). *Aquaculture*, 273(1), 80-86.
Rasband, W. S., ImageJ, U. S. National Institutes of Health, Bethesda, Maryland, USA, https://imagej. nih.gov/ij/, 1997-2018.
Robinson, E. H., & Li, M. H. (2015) Mississippi Agricultural & Forestry Experiment Station.
Schjolden et al., (2009). *Gen Comp Endocrinol*. 160:134-8.
Sharma, P. M. (2005). *Polymorphisms in genes associated with feed efficiency and production traits in broilers*. University of Arkansas.
Smith et al., (2015). *Environmental Biology ofFishes*, 98(1), 23-33.
Song, Y., & Cone, R. D. (2007). *The FASEB Journal*, 21(9), 2042-2049.
Tlusty et al., (2018). Commentary: comparing efficiency in aquatic and terrestrial animal production systems. *Environmental Research Letters*, 13(12).
Vaisse et al., (1998). *Nature Genetics*, 20, 113-114.
Varshney et al., (2015). *Genome Research*, 25(7), 1030-1042.
Wan et al., (2012). *Molecular Biology Reports*, 39(3), 2215-2223.
Xie et al., (2016). *Scientific Reports*, 6, 34555.
Yang et al., (2018). *Genes & Genomics*, 40(11), 1119-1125.
Yang et al., (2020). *Molecular and Cellular Endocrinology*, 110929.
Yeo et al., (1998). *Nature Genetics*, 20(2), 111-112.
Zohar, Y., & Mylonas, C. C. (2001). Endocrine manipulations of spawning in cultured fish: from hormones to genes. In *Reproductive Biotechnology in Finfish Aquaculture* (pp. 99-136).
Lee, C. S., & Donaldson, E. Elsevier. Amsterdam, The Netherlands Example 3—Effect of Simultaneous Knockout of MC4R Gene and Knock-In of Elongase Gene on Channel Catfish, Ictalurus punctatus 1. Introduction Catfish production constituted approximately 68% of the total domestic aquaculture production in 2015 (NOAA, 2016). However, catfish production has had more than a 50% reduction from 2003 (Hanson and Sites, 2015). The factors that caused the decline of catfish industry included intense competition from imported products from Asia, increased feed and fuel costs, and fish disease control problems (Wagner et al., 2002; FAO, 2020).

Growth and feed conversion efficiency are basic and important traits affecting production costs and profitability. In catfish farming, feed is 60% of the variable cost (Robinson and Li, 2015). Feed conversion is also important to optimize for environmental reasons, both in resource use and greenhouse gas emissions (Hasan and Soto, 2017). Growth rate and feed conversion efficiency are highly correlated, especially in fast growing genotypes compared to slower growing genotypes (Dunham, 2011).

Surveys indicate that consumers in China, the US and globally are likely to be more receptive to genetically engineered (GE) food if it lowers food costs or if the GE food is of enhanced nutritional quality (Curtis et al., 2004; Zhang et al., 2010). Thus, one major objective of the current study is to enhance the nutritional quality of catfish through genetic engineering by improving omega-3 fatty acid (FA) levels.

Omega-3 Fatt Acids

The long-chain omega-3 polyunsaturated fatty acids (PUFAs), especially eicosapentaenoic acid (EPA, C20:5n-3) and docosahexaenoic acid (DHA, C22:6n-3) have significant nutritional benefits in humans (Lauritzen et al. 2001). They are necessary for important biological processes of humans, such as lipid metabolism regulation, growth development stimulation, anticancer properties, anti-aging properties, immunoregulation, promoting cardiovascular health, aiding in weight loss, among others (Saunders et al., 2013). The American Dietetic Association and Dietitians of Canada recommend 500 mg/day of EPA+DHA (Kris-Etherton et al., 2007). The long chain PUFAs are predominantly derived from marine fish. However, global capture of wild fish is currently in decline due to overfishing and environmental problems, leading to long chain PUFAs being less available.

Farmed fish could serve as an alternative source for EPA/DHA. However, most freshwater fish are unable to naturally synthesize long chain PUFAs, although they can convert the medium chain length into long chain ones to a greater or lesser extent depending on the species (Wang et al., 2014). This limits which aquaculture species provide the added health benefit of high levels of Ω-3 FAs (Wang et al. 2014). Catfish lack an efficient endogenous pathway for converting the short/medium chain fatty acids into long-chain PUFAs, such as EPA and DHA, and subsequently have Ω-3 FA levels 7-12 times less than Ω-3 rich fish such as salmon (Wall et al., 2010).

Generation of fish lines capable of synthesizing EPA/DHA fatty acids from their feeds is a feasible solution. This might be achieved by overexpressing genes encoding enzymes involved in EPA/DHA biosynthesis. Fatty acid desaturases and elongases are among the key enzymes for the biosynthesis of PUFAs (Meesapyodsuk et al., 2007). Among them, Δ6-, Δ5- and Δ4-desaturases and elongase are membrane-bound desaturases and fatty acid metabolic enzymes, which behave as important factors in EPA and DHA biosynthesis (Simopoulos, 2002). Δ5-desaturase uses eicosatetraenoic acid (ETA, 20:4n-3) as a substrate and allows the insertion of a double bond to produce EPA. The ETA fatty acid substrate is chain elongated (by elongases) from octadecatetraenoic acid (18:4n-3), a product of Δ6-desaturation of α-linolenic acid. Further, DHA is synthesized from EPA by the sequential chain elongation to docosapentaenoic acid (DPA, 22:5n-3) and then to 24:5n-3, followed by a Δ6-desaturation to 24:6n-3, which is finally retroconverted by peroxisomes to DHA (Sprecher, 2000). Alternatively, Δ4-desaturase can convert DPA directly into DHA. The insertion of a single transgene generally increased Ω-3 FA production 10-30%, sometimes as much as a 2×increase for some omega-3 fatty acids (but a simultaneous decrease for others).

Previous work has accomplished a high rate of targeted gene insertion. For example, 37% of fish integrated a *masu* salmon, *Oncorhynchus masou*, elongase transgene into exon 2 of luteinizing hormone (LH) gene of channel catfish (De et al., in preparation) using a modification of CRISPR/Cas9 termed 'Two-Hit by RNA and Two-Oligos with a Targeting Plasmid' (2H2OP) (Yoshimi et al. 2016) with a great reduction in mosaicism. All 13 tissues tested across 3 individuals contained the transgene. Huang et al., (2021) generated multiple families of F1 β-actin-Δ5 transgenic channel catfish. Desaturase F1 channel catfish showed a 1.11-fold increase in n-3 fatty acid levels measured as a change in ALA, DHA, and EPA compared to control counterparts. Levels of n-6 fatty acids, LA, AA, and DGA, decreased 1.11-fold in transgenic individuals. Individually, n-3 fatty acids ALA and DHA increased by 44.3% and 13.2% respectively. Precursors to n-6 delta5-desaturation, LA and DGA, decreased 13.2% and 11.9% respectively. Significant increases were seen on a mg/g weight basis for EPA, DHA, total HUFA.

Average coefficient of variation, on a mg/g wet weight basis, was calculated across all fatty acids between control and desaturase fish in terms of variation between individual fish (Huang et al., 2021). Desaturase fish had an average variation in fatty acid levels of 7% while controls showed increased variation with a CV of 22%. Significance between the two variances in fatty acid profiles was calculated and the variance of the fatty acids of the controls was higher than that of the transgenic individuals.

MCR4

The central melanocortin pathway regulates energy homeostasis in vertebrates as well as somatic growth and feed efficiency. Natural mutations of MC4R in fish can affect growth. In the swordtail fish, *Xiphophorus nigrensis* and *X. multilineatus*, small and large male morphs point to a single locus encoding MC4R (Smith et al., 2015). Large male morphs in this species result from multiple copies of mutant forms of the receptor, at the Y chromosome-encoded P locus, that appear to function in a dominant negative fashion, blocking activity of the wild-type receptor.

Copy number variants of the MC4R gene have a dramatic effect on the onset of puberty in *Xiphophorus*, but in the closely related species, medaka, *Oryzias latipes*, MC4R had no effect on reproduction or puberty, and the knock-out of MC4R retarded embryonic development (Liu et al., 2019). In contrast, in vitro studies on the anadromous fish, spotted scat, *Scatophagus argus* revealed that MC4R regulates gonadotropin releasing hormone (GnRH) as well as follicle stimulating hormone (FSH) and luteinizing hormone (LH) both directly and indirectly (by affecting the expression of GnRH) (Jiang et al., 2017). These results indicate that mutations in the MC4R gene may lead to infertility.

This Example demonstrates simultaneous knock out of the MC4R gene while inserting *masu* salmon elongase (Evol2) transgene driven by the common carp j-actin promotor (ccOA-msEvol2) into channel catfish. After successful mutation, zygosity effects on growth rate was evaluated. Mutation rate, growth rate, survival, and gene expression at different target sites were compared. Finally, fatty acid levels in mutants and controls were determined and compared.

2. Materials and Methods 2.1. Design and Preparation of sgRNA and CRISPR Cas9 System A common carp β-actin promoter (Accession ID: M24113.1) was used to drive the expression of *masu* salmon elongase gene (Accession ID: KC847063.1). An antifreeze polyA terminator from ocean pout, *Zoarces americanus* (Accession ID: S65567.1) was used to terminate transcription. This synthetic construct (ccβA-msEvol2), totaling 9,267 bp, was built by GenScript (USA Inc., Piscataway, NJ 08854, USA). Two sets of two CRISPR short guide RNAs (sgRNA) plasmids were designed, targeting the coding region in exon one of the MC4R gene in channel catfish and the non-coding region adjacent to the PAM sequence of the transgene. The corresponding ccβA-msEvol2 transgene was designed to contain two arms, upstream and downstream, for homologous recombination, matching the cuts created by the sgRNA. sgRNAs and ssODNs were constructed for 2H2OP insertion of ccβA-msEvol2 into MC4R locus. Each of the oligos and plasmid was reconstituted using DNase/RNase Free water to 10 mM. To create template for sgRNA synthesis, the three oligos were used to were synthesize double stranded DNA (dsDNA) by mixing 25 µl 2×Econo-Taq Plus Master Mix (Lucigen), 12.5 µl Universal Primer, and 12.5 µl gene-specific oligonucleotide.

PCR cycling was carried out with initial denaturing at 95° C. for 3 min; 5 cycles of denaturation at 95° C. for 30 sec, annealing at 50° C. for 30 sec with a ramp speed of −0.2° C./sec, extension at 72° C. for 30 sec; 20 cycles of denaturation at 95° C. for 30 sec, extension at 72° C. for 20 sec with a ramp speed of −0.2° C./sec; and final extension at 72° C. for 10 min.

The Taq Polymerase was then inactivated using 4.8 µl of 0.5M EDTA and incubated at 75° C. for 20 min. The PCR product was confirmed using 1% agarose gel. The sgRNA was synthesized using the Maxiscript T7 Kit (Thermo Fisher Scientific), following the manufacture guidelines. A mix of 2 µl dH2O, 10 µl dsDNA template (created by PCR as described above), 2 µl 10× buffer, 1 µl ATP, 1 µl CTP, 1 µl GTP, 1 µl UTP and 2 µl Enzyme Mix was incubated at 37° C. for 90 min. The solution was cleared of DNA contamination by adding 1 µl of Turbo DNase I, vortexing briefly and incubating at 37° C. for 15 min. The magnesium ions were chelated by adding 5 µl of 0.5M EDTA. The Turbo DNase I was inactivated by heating the solution at 75° C. for 10 min. The obtained sgRNAs were purified using Zymo RNA Clean and Concentrator kit (Zymo Research). The sgRNAs were stored in −80° C. freezer.

The Cas9 protein was acquired from PNA Bio (3541 Old Conejo Rd, Newbury Park, CA 91320) and reconstituted in dH$_2$0 to a concentration of 1 mg/ml. The ccβA-msEvol2 plasmid was reconstituted to 250 ng/µl. Each of the ssODNs were reconstituted to 100 ng/µl. Twenty minutes prior to fertilizing the eggs, two sets of injection solutions were prepared by mixing 2 µl (200 ng) of each pair of ssODN, 1 µl ccβA-msEvol2 plasmid (125 ng), 1 µl ccβA-msEvol2 sgRNA (300 ng), 1 µl MC4R-(A or D) sgRNA (300 ng), 2 µl Cas9 and 2 µl phenol red (10%) to a total volume of 11 µl.

2.2. Brood Stock Husbandry, Selection and Spawning

Brood stock were cultured in 0.04-ha earthen ponds averaging 1-meter in depth. They were fed a 32 percent protein catfish pellet at 1-2% of their body weight five days per week. Dissolved oxygen was maintained above 3 mg/L using a ½ horsepower surface aerator (Air-O-Lator).

The Kansas strain of channel catfish was chosen as broodstock due to their superior growth and fry output when induced by injection of luteinizing hormone releasing hormone analogs (LHRHa). Individuals were chosen based on their health and secondary sexual characteristics. Males with well-developed papilla and large, muscular heads that were wider than the rest of their bodies were chosen. Dark coloring and scarring from territorial fighting were also signs of quality males in reproductive condition. Females with soft, well-rounded abdomen that were wider than their head, and a swollen urogenital opening were chosen. Broodstock were minimally handled and kept in tanks for as short a time as possible to reduce stress.

Males were terminated by a percussive blow to the head followed by pithing. The body cavity was opened carefully with a scalpel, ensuring not to pierce any organs. Testes were removed using tweezers and/or scissors and washed in a weigh boat with 0.9 percent saline using bottled distilled water, removing any blood or tissue. Excess water was drained and the testes weighed before macerating the testes using scissors to release sperm. The homogenized testes were then filtered into a 50 mL Falcon tube using a 100-micron screen. The sperm was then diluted with 0.9 percent saline solution to a maximum of 10 mL/gram of testes. Sperm concentration was tested using a Nanodrop 2000 Spectrophotometer (Thermo Scientific) and running a simple linear regression between sperm concentration and absorbance using the equation $y=-2.450+0.185\ln X$ (Adjusted $R2=0.601$) at 450 nm (Cuevas-Uribe & Tiersch, 2011). Motility was analyzed under a 10× light microscope while sperm count was checked under 40× magnification. Ideally, sperm was used immediately, but could be stored at 4° C. for one week, with declining quality or up to two weeks with the addition of gentamycin at a concentration of 1 mg/mL sperm solution.

Females were weighed and gently placed in labeled 32 mm mesh bags. The spawning bags were then placed in a flow through holding tank so that the fish was fully submerged, ensuring that water quality was ideal with dissolved oxygen levels above 5 mg/L. A 14-gauge implanter was loaded with 100 µg/kg body weight of luteinizing hormone releasing hormone analog (LHRHa) implant. The needle was then inserted at a 45-degree angle ventrally adjacent to the pelvic fin and the implant was inserted. The ovulation time was predicted based on the degree-hours according to Phelps et al. (2007). Water temperature ranged from 26-28° C. Females were checked 36 hours after LHRHa injection and every four hours after that until ovulation. Once a female began ovulating, indicated by eggs visible on the bag, she was carefully transferred into a tank with 100 mg/L buffered tricaine methane sulfonate (MS-222) with equal parts sodium bicarbonate until completely anesthetized. Prior to this time, a thin layer of vegetable shortening, Crisco, was used to coat several 20 cm diameter metal egg collection pans. The fish was then dipped in fresh water to wash off the MS-222 and gently dried with a towel. A thick layer of vegetable shortening was applied around the urogenital opening, including the pelvic fins to prevent sticking of the eggs during stripping. The female was hand stripped into the greased pan by gently applying pressure on the abdomen from the anterior end of the abdomen posteriorly towards the vent. Eggs would usually flow freely, well rounded and golden in color, with minimal blood. The stripping ensured that the eggs could not contact freshwater, which can activate the eggs. Eggs were then covered with another spawning pan to maintain moisture and transported to the molecular laboratory.

Approximately 200-300 eggs were transferred to a greased pan for fertilization. Approximately 3 mL of sperm solution was added to the eggs and mixed gently with fingertips. Fresh water was added to barely cover the eggs in order to activate the sperm and eggs and the water was swirled to form a single layer and prevent sticking. After two minutes, the eggs should be fertilized, and three more cm of water was added to the eggs and the eggs were left to harden for 15 minutes.

While the embryos were hardening, 5-10 p of the Cas9/sgRNA/phenol red mixture was loaded into 1.0 mm OD borosilicate glass capillary microinjection needles using a microloader. The tips of the needles were opened by breaking the end with a scalpel. The needle was then inserted into the micropipette holder to its deepest range and tightened, ensuring a tight seal. The compressed air cylinder was opened, and pressure was adjusted to 7000 kPa and 0.824 m³/hr using the pressure regulator. The injection volume was adjusted to 50 nl by manipulating the pressure, the length of injection and the needle diameter. Injection volume was measured by injecting a drop of mineral oil on a hemocytometer.

After 15 minutes 100-200 embryos were transferred in a single layer to a greased 100 mm petri dish and covered with Holtfreter's solution (Table 16). The petri dish was placed on the stage of the microscope. In one smooth motion, the needle was lowered until it pierced the chorion and yolk, and the pedal of the microinjector was depressed, delivering the CRISPR solution, and withdrawing slowly. For best results, the solution was injected as close to the blastodisc as possible. When the blastodisc was not visible, the solution was spread throughout the embryo by depressing the pedal while simultaneously withdrawing the needle smoothly. To reduce mosaicism, embryos were injected between 15 min and 90 min post-fertilization, while they remained in the one cell stage. Injection controls were injected with 50 nl of phenol red, while non-inject controls were not injected.

Embryos were placed in four-liter tubs of Holtfreter's solution with 10 mg/L doxycycline kept at 27° C. with continuous aeration. The solution was changed, and dead embryos were removed daily. After about 5 days, or when the embryos were moving rapidly within the egg membrane and close to hatch, doxycycline treatment was discontinued. At 20 dph fry were moved to aquaria in recirculating systems until large enough to be PIT (Passive Integrated Transponders) tagged and moved to earthen ponds.

TABLE 16

| Name of Material/Equipment | Type | Company | Catalog Number | Comments/Description |
|---|---|---|---|---|
| Reproboost ® implant | Hormone | Center of Marine Biotechnology | | Luteinizing hormone releasing hormone analog (LHRHa) for artificial spawning |
| TRICAINE-S | Anesthesia | Western Chemical. Inc. | | For sedation of brood stock fish during hormone injection and egg stripping. |
| Phenol red | Reagent | Sigma-Aldrich | P0290 | 0.5%, sterile filtered |
| Stereo microscope | Equipment | Olympus | 213709 | For visualizing the eggs during microinjection |
| Microinjector | Equipment | ASI-Applied Scientific Instrumentation | Model MPPI-3 | For the delivery of the injection material into the embryos |
| Micromanipulator | Equipment | ASI-Applied Scientific Instrumentation | Model MM33 | For holding and controlling the movement of the injection needle. |
| Eppendorf Microloader | Tool | Eppendorf | 5242956.003 | For loading injection solution into microinjection needles. |
| Vertical needle puller | Equipment | David Kopf Instruments | Model 720 | For pulling microinjection needles |
| Borosilicate glass capillaries | Tool | Fisher Scientific | | 1 mm outer diameter (OD), for making microinjection needles. |
| Petri dish | Tool | VWR | 25384-302 | For holding the embryos during the microinjection. |
| Crisco ® | Vegetable shortening | The J.M. Smucker Company | | For coating spawning pans and petri dishes. |
| Holtfreter's solution | Reagent | Lab Made | | 59 mM NaCl, 0.67 mM KCl, 2.4 mM NaHCO3, 0.76 mM CaCl2, 1.67 mM MgSO4 (Armstrong et al., 1989) to incubate the microinjected embryos till hatch. |
| Doxycycline hyclate USP (monohydrate) | Antibiotic | Letco Medical | 690904 | Added to Holtfreter's solution to 10 ppm to prevent bacterial infections. |

Table 16 shows the name, type of material, company, catalog number (if applicable) of materials and equipment used in microinjection protocol for CRISPR/Cas9 in channel catfish, *Ictalurus punctatus*.

2.3. Mutation Analysis

Pelvic fin-clip samples (10-20 mg) were collected in sterile 1.5 mL Eppendorf tubes and kept in a −80° C. freezer until DNA extraction. Genomic DNA was extracted using proteinase K digestion and ethanol precipitation using the following protocol: fin clips were digested in 600 µl of cell lysis buffer (100 mM NaCl, 10 mM Tris, 25 mM EDTA, 0.5% SDS) and 2.5 µl of proteinase K in a 55° C. hot water bath for 4-8 hours, with occasional vortexing. Protein was precipitated by adding 200 µl of protein precipitation solution (Qiagen, 19300 Germantown Road Germantown, MD 20874), vortexed, stored on ice for 12 minutes and centrifuged for 8 minutes at 15,000 rcf. The supernatant containing DNA was then precipitated with isopropanol followed by centrifugation for 5 minutes at 15,000 rcf and finally washed twice with 75% ethanol by inverting gently 5-times before being dissolved in dH$_2$O. DNA concentration and purity was measured using a NanoDrop 2000 spectrophotometer (Thermo Scientific) and concentration was adjusted to 500 ng/µl.

To determine the presence of the transgene, the primer set Evol2-F, Evol2-R (Table 15) was designed using Primer3plus to encapsulate all possible mutation sites in the ccOA-msEvol2 plasmid. The Expand High Fidelity$^{PLUS}$ PCR System (Roche) was used with 500 ng of genomic DNA. A Bio-Rad T100 Thermal Cycler was used to run PCR with an initial denaturing at 95° C. for 3 min; 34 cycles of denaturation at 95° C. for 30 sec, annealing at 62° C. for 40 sec with a ramp speed of −0.2° C./sec, extension at 72° C. for 40 sec; and final extension at 72° C. for 10 min. The PCR product was confirmed on a 1% TAE Tris base, acetic acid and EDTA agarose gel. The knock-in mutation was preliminarily identified by presence of the amplified DNA fragment.

The primer set MC4R-F, MC4R-R (Table 15) was designed using Primer3plus to encapsulate all possible mutation sites in the MC4R gene. The Expand High FidelityPLUS PCR System (Roche) was used with 500 ng of genomic DNA. A Bio-Rad T100 Thermal Cycler was used to run PCR with an initial denaturing at 95° C. for 3 min; 34 cycles of denaturation at 95° C. for 30 sec, annealing at 62° C. for 40 sec with a ramp speed of −0.2° C./sec, extension at 72° C. for 40 sec; and final extension at 72° C. for 10 min.

The PCR product was confirmed on a 1% TAE Tris base, acetic acid and EDTA agarose gel. The PCR product from the treatment fish was mixed with PCR product from a wild type control of the same family at a 1:1 ratio. The combined product was then hybridized in a BioRad Thermocycler using an initial denaturing at 95° C. for 3 min; 85° C. for 1 min with a ramp speed of −0.2° C./sec, 75° C. for 1 min with a ramp speed of −0.2° C./sec, 65° C. for 1 min with a ramp speed of −0.2° C./sec, 55° C. for 1 min with a ramp speed of −0.2° C./sec, 45° C. for 1 min with a ramp speed of −0.2° C./sec, 35° C. for 1 min with a ramp speed of −0.2° C./sec, 25° C. for 1 min with a ramp speed of −0.2° C./sec.

The Surveyor® mutation detection kit (Integrated DNA Technologies) was used to detect mutations. Hybridized products were mixed with Nuclease S, Enhancer S, MgCl2 and Reaction Buffer (2) according to kit instructions and incubated at 42° C. for one hour. The digested products were separated on a 1.5 percent TBE (Tris borate EDTA) agarose gel and compared with that of control samples.

To confirm and identify the mutations, positive samples were sequenced using the TA cloning method. The largest individuals from each treatment that repeatedly were confirmed as mutants using Surveyor Analysis (Fisher Scientific) were sequenced. First, genomic DNA from three mutants per treatment was amplified with PCR using Expand High FidelityPLUS PCR System (Roche) using the above protocol. The PCR product was verified using a 1 percent TAE agarose gel and cloned into the TOPO® TA Cloning® Kit (Invitrogen) with 20 clones per sample and sent to MCLabs for sequencing. Finally, the resulting sequences were interpreted using the MAFFT sequence alignment tool.

TABLE 15

| Oligo sequence (5' to 3') | Oligo name | SEQ ID NO: |
|---|---|---|
| AAAAGCACCGACTCGGTGCCACTTTTTCAAGTTGA TAACGGACTAGCCTTATTTTAACTTGCTATTTCTA GCTCTAAAAC | Universal Primer | 100 |
| taatacgactcactataGGGATGGCGCTGATCACC AGgattagagctagaa | MC4R-A | 101 |
| taatacgactcactataGGGAAAGGAACTCGGAGT Cgattagagctagaa | MC4R-B | 102 |
| taatacgactcactataGGGCAGGATGGTGAGCGT CAgttttagagctagaa | MC4R-C | 103 |
| taatacgactcactataGGTGGTGGCGTTCGGTCC GAgattagagctagaa | MSTN1 | 104 |
| taatacgactcactataGGGCGAGGCGCAGTGTTC AGgtatagagctagaa | MSTN2 | 105 |
| taatacgactcactataGGGTCGAGCAGCTGCTGC ACgttttagagctagaa | MSTN3 | 106 |
| GGAGATGGAGGACACGGAAG | MC4R-F | 107 |
| GAGACATGAAGCAGACGCAATA | MC4R-R | 108 |
| taatacgactcactataGTGATGGCGCTGATCACC AGgttttagagctagaa | MC4R-A2-sense | 109 |
| taataegactentataCGGGATGCAGCATGCACAC Cgttttagagctagaa | MC4R-D-antisense | 110 |
| taatacgactcactataCTTGTCTGTAAGCGGATG CCgttttagagctagaa | PUC57 Vector | 111 |
| TATCGAACGCGACAGAAACGGCTGTGATGGCGCTG ATCACGCCGGGAGCAGACAAGCCCGTCAGGGCGCG TCAGCGGGTG | BsaIElvol2_ssODN1 | 112 |

TABLE 15-continued

| Oligo sequence (5' to 3') | Oligo name | SEQ ID NO: |
|---|---|---|
| GCAGCTCCCGGAGACGGTCACAGCTTGTCTGTAAGCGGATCAGCGGCAACCTGACCATCTCTGGAGACGTCGTGAAAAGC | BsalElvol2_ssODN2 | 113 |
| GAGGAGGTCTTGCGGATATGAACGTGTCGGAGCACCACGGGCCGGGAGCAGACAAGCCCGTCAGGGCGCGTCAGCGGGTG | BsalElvol2_ssODN3 | 114 |
| GCAGCTCCCGGAGACGGTCACAGCTTGTCTGTAAGCGGATGATGCAGCATGCACACCGGAACCACAGCCTGGGCGTGCAG | BsalElvol2_ssODN4 | 115 |
| ACTCCTCTCTGAGACCTGAC | EX1-F | 116 |
| AGTTAGGCTATGAAGCAGTAGT | EX1-R | 117 |
| CGAAATCCGTTCCTTTTTACTG | Evol2-F | 118 |
| CTGGCCTGTTCCTCATGTATTT | Evol2-R | 119 |

Primers used to amplify partial sequences of channel catfish, *Ictalurus punctatus*, oligonucleotides to target specified regions for CRiISPR/Cas9 cleavage and single-stranded oligo donor nucleotide (ssODN). Universal primer was used to bind oligonucleotides to Cas-9 protein. Red letters indicate binding site to target gRNAs. MC4R-A, MC4R-B, MC4R-C, MC4R-A2-sense and MC4R-D-anti sense were all used to target various loci in exon 1 of the channel catfish MC4R gene. MSTN-1, MSTN-2 and MSTN-3 were all used to target various loci in exon 1 of the channel catfish MC4R gene. MC4R-ALL-1F and MC4R-ALL-1R were used to amplify DNA segments flanking the target sites for guide RNAs in the catfish MC4R gene. EX1-F and EX1-R were used to amplify DNA segments flanking the target sites for guide RNAs in the catfish MC4R gene. PUC57 Vector was used to amplify a partial sequence of the ccβ3A-msEvol2 plasmid containing the *masu* salmon, *Oncorhynchus masou*, elongase gene driven by the common carp β-actin promoter. BsalElvol2_ssODN1 and BsalElvol2_ssODN2 were used to flank the cut site associated with the MC4R-A2-sense gRNA to facilitate homologous directed repair (HDR) in the MC4R gene. BsalElvol2_ssODN3 and BsalElvol2_ssODN4 were used to flank the cut site associated with the MC4R-D-antisense gRNA to facilitate homologous directed repair (HDR) in the MC4R gene.

2.4 Fatt Acid Analysis

Muscle was sampled from 3 fish containing the ccβA-msEvol2 plasmid and mutated at the MC4R gene, 3 fish containing the MC4R mutation and not the ccβA-msEvol2 plasmid and 3 control fish with no mutation. Muscle samples were taken immediately after euthanizing the individual. They were then prepared for lipid extraction by first grinding into a slurry with a coffee grinder. Two grams of ground tissue was homogenized per extraction using a handheld tissue homogenizer until tissue was sufficiently homogenized. Lipid extraction was performed using the chloroform-methanol protocol from Folch et al. (1957) and done in triplicate for each sample. Extracts in hexane were kept in 2 ml borosilicate glass vials with PTFE caps and stored at −20° C. until they could be injected into a gas chromatograph (GC-MS7890A). The concentration of the fatty acid was measured using gas chromatography-mass spectrometry (GC-MS, Agilent Technologies 7890A GC with 5975C MS) equipped with an DB-1701 GC column. Helium was used as the carrier gas. The initial temperature of the oven was set at 100° C. for 5 min, followed with a ramp of 4° C./min to reach 250° C. and then held for 10 min. The detector was kept at 225° C. Peaks were identified and quality check of the resulting spectra, and calculation of concentrations and was done by comparing sample retention times to a standard mix (Supelco® $C_{4\text{-}2\,4}$ Fatty Acid Methyl Ester (FAME) Mix; Lot: LRAC7954).

2.5 Culture and Growth

Fry from each genetic type were stocked into 3-replicate 50 L aquaria in recirculating systems for growth experiments. Fish were kept at a density of 1 fish/L. Fish in each aquarium were fed ad-libitum with Aquamax powdered and pelleted fish diets and catfish diets with the appropriate fatty acid content. Based on our previous results with transgenic desaturase common carp (Cheng et al., 2014), the diets needed adequate precursors, Ω-6 fatty acids, for the desaturase transgenic catfish to produce Ω-omega-3 fatty acids in the muscle. In fact, diets high in Ω-3 fatty acids did not result in more Ω-3 fatty acids in the muscle of desaturase transgenics, but diets high in Ω-6 fatty acids did allow the desaturase transgenic carp to produce elevated Ω-3 fatty acids.

Feed size was adjusted as the fish grew. Fry were fed Purina® AquaMax® powdered starter feed until they were large enough to eat Purina® AquaMax® 100. Both feeds contained 50% protein. All fish were fed every day to satiation. The fish were sampled at 6-months post hatch.

2.5. Statistical Analysis

To calculate differences in body weight between ccβA-msEvol2 knockout/MC4R knock in mutants, MC4R knockout mutants and controls, a one-way ANOVA and Tukey's multiple comparisons test were performed using R programming language (R Core Team, Vienna, Austria). In cases where different treatments were kept in separate aquaria at varying densities, a regression based on density was calculated, and weights were adjusted accordingly before running the statistical analysis. Differences in mutation rate were calculated with logistic regression using R programming language.

3. Results 3.1. Growth

A total of 19 P1 Elongase transgenic MC4R knock-out channel catfish (ccβA-msEvol2), 33 Non-inject control (NIC) and 31 Inject-control (Inj-Cntrl) were generated in 2019. CcβA-msEvol2 mutants were 56% and 14.59 g larger than NIC fish (p=0.001) at 6-months post hatch (FIG. 16; Table 18). ccβA-msEvol2 mutants were 29% and 9.27 g larger than Inj-Cntrl fish (p=0.056). At 6-months post hatch, ccβA-msEvol2 mutants were 41.81% and 12.01 g larger than controls (p=0.005).

TABLE 17

| | Mean Body Weight (g) at 6-months post hatch | | | |
|---|---|---|---|---|
| | N | Mean | SD | CV |
| NIC | 33 | 26.15 | 10.74 | 41.05 |
| IC | 31 | 31.47 | 15.04 | 47.81 |
| Evol2 | 19 | 40.74 | 15.52 | 38.10 |
| CNTRL | 64 | 28.73 | 13.17 | 45.85 |
| Evol2 | 19 | 40.74 | 15.52 | 38.10 |

Table 17 shows mean weights (grams), sample size (N), standard deviation (SD) and coefficient of variation (CV) of Non-Inject Control (NIC), Inject-Control (Inj-Cntrl), overall controls (CNTRL) and P1 ccβA-msEvol2 transgenic MC4R knock-out (Evol2) channel catfish, *Ictalurus punctatus*, at 6-months post hatch. The ccβA-msEvol2 transgene containing *masu* salmon, *Oncorhynchus masou*, elongase gene driven by the common carp, *Cyprinus carpio*, beta-actin promoter was inserted into the channel catfish melanocortin-4 receptor (MC4R) gene using the 2-hit 2-oligo with plasmid (2H2OP) method. Mutants and controls were kept in separate 50 L aquaria at a maximum density of 1 fish/L and fed daily to satiation. Overall, at 6-months post hatch, ccβA-msEvol2 mutants were 41.81% and 12.01 g larger than controls (p=0.005). A paired t-test was used to compare treatments.

3.2. Mutation Rate

A total of 53 fish survived microinjection of CRISPR/Cas9, ccβA-msEvol2 transgene and the MC4R-D sgRNA. A total of 13/53 (25%) had a mutation in the MC4R target site and 3/53 (6%) integrated the ccβA-msEvol2 plasmid (Table 18). None of the 53 MC4R-D fish had both a mutation in the MC4R gene and insertion of the ccβA-msEvol2 transgene. A total of 39 fish survived microinjection of CRISPR/Cas9, ccβA-msEvol2 transgene and the MC4R-A sgRNA. A total of 36/39 (92%) fish had a mutation in the MC4R target site and 21/39 (54%) integrated the ccβA-msEvol2 plasmid at the MC4R target site. Nearly half (49%) of the 39 MC4R-A fish had both a mutation in the MC4R gene and insertion of the ccβA-msEvol2 transgene. A single band observed using the Evol2 primer set indicates integration of the ccβA-msEvol2 transgene (FIG. 17). Multiple bands using the MC4R primer set corresponded to expected cut sites in MC4R gene (FIG. 18). Each positive result was confirmed with a second gel. MC4R-A generated a greater rate of knockout of MC4R (p=1.14e-7) and knock-in of ccβA-msEvol2 (p=1.12e-5) than MC4R-D. Sequencing indicates insertion with complete fidelity into the channel catfish genome.

TABLE 18

| | MC4R KO Mutation Rate | ccβA-msEvol2 KI Mutation Rate | Both | Homozygosity KO |
|---|---|---|---|---|
| MC4R-D | 25% (13/53) | 6% (3/53) | 0% (0/53) | 38% (5/13) |
| MC4R-A | 92% (36/39) | 54% (21/39) | 49% (19/39) | 69% (25/36) |
| p-value | 1.14e−7 | 1.12E−05 | | 0.056 |

Table 18 shows mutation rates of two gRNA (MC4R-D and MC4R-A; Table 1 (Example 1)) targeting different loci in exon one of the channel catfish, *Ictalurus punctatus*, for CRISPR/Cas9 cleavage and simultaneous insertion of the ccβA-msEvol2 plasmid into the cut site. P1 fish were generated in 2020. The ccβA-msEvol2 transgene containing *masu* salmon, *Oncorhynchus masou*, elongase gene driven by the common carp, *Cyprinus carpio*, beta-actin promoter was inserted into the channel catfish melanocortin-4 receptor (MC4R) gene using the 2-hit 2-oligo with plasmid (2H2OP) method. Approximately 50 nl of solution, composed of 1 µg/µl Cas9 protein (1 µl), 400 ng/µl sgRNA1 (0.5 µl), 400 ng/µl sgRNA2 (0.5 µl), 50 ng/µl donor plasmid (1 µl), 100 ng/µl ssODN1 (0.5 µl), 100 ng/µl ssODN2 (0.5 µl) and 60% phenol red (1 µl), was injected into each embryo close to the blastodisc 15 min after fertilization using a glass capillary needle. Knockout and knock-in are denoted by KO and KI, respectively. Logistic regression was used to determine significant difference in mutation rates between MC4R-D and MC4R-A.

3.3. Fatt Acid Levels

There were no statistically significant differences in EPA (p=0.203) and DHA (p=0.380) levels between any of the groups (p=0.203) (Table 19). However, observed mean EPA levels in MC4R mutants and ccβA-msEvol2/MC4R mutants were 94.12% and 92.16% higher than controls, respectively (FIG. 19). Mean observed DHA levels for MC4R mutants and ccβA-msEvol2/MC4R mutants were 21.37% and 32.82% higher than controls, respectively. Overall observed, levels of EPA+DHA were 50.00% and 5.72% higher in ccOA-msEvol2/MC4R fish than controls and MC4R fish.

TABLE 19

Mean Fatty Acid Content in Muscle (mg/g)

| | N | EPA Mean | SD | CV | Range | DHA Mean | SD | CV | Range | EPA + DHA Mean | Range | Amount of fish (g) required to provide 500 mg EPA + DHA |
|---|---|---|---|---|---|---|---|---|---|---|---|---|
| CNTRL | 3 | 0.51 | 0.33 | 64.92 | 0.14-0.72 | 1.31 | 0.60 | 45.55 | 1.16-1.69 | 1.82 | 1.62-1.88 | 275.17 |
| MC4R | 3 | 0.99 | 0.52 | 52.32 | 0.93-1.06 | 1.59 | 0.59 | 36.93 | 1.29-2.15 | 2.58 | 2.35-3.09 | 193.94 |
| Evol2 | 3 | 0.98 | 0.75 | 76.35 | 0.55-2.34 | 1.74 | 0.71 | 40.56 | 1.39-1.95 | 2.73 | 2.35-4.23 | 183.45 |

Table 19 shows mean eicosapentaenoic acid (EPA, C20:5n-3) and docosahexaenoic acid (DHA, C22:6n-3) content (mg) per gram of muscle tissue in control (CNTRL), melanocortin-4 receptor (MC4R) knockout and MC4R knockout+ccβA-msEvol2 transgene (Evol2) knock-in channel catfish, *Ictalurus punctatus*. The ccβA-msEvol2 transgene containing *masu* salmon, *Oncorhynchus masou*, elongase gene driven by the common carp, *Cyprinus carpio*, beta-actin promoter was inserted into the channel catfish melanocortin-4 receptor (MC4R) gene using the 2-hit 2-oligo with plasmid (2H2OP) method. Muscle was sampled from 3 fish from each treatment. There was no significant difference in EPA or DHA levels between any of the groups using ANOVA (p=0.203; p=0.380).

4. Discussion

In this Example, the effects of microinjection of sgRNA targeting exon 1 of the channel catfish melanocortin-4 receptor gene in conjunction with ccβA-msEvol2 elongase plasmid, ssODNs and Cas9 protein on mutation rate, growth and omega-3 content were investigated. Efficient mutagenesis was achieved. There was high variability in mutation rate between both target sites with 49% of fish microinjected with MC4R-A having both the elongase insertion and MC4R deletion compared to 0% of MC4R-D fish. Microinjection of MC4R-A produced a mutation rate in the MC4R gene of 92%. This is far higher than the 33% mutation rate achieved in our lab in 2017 using the same sgRNAs (see Example 2). The two major differences in protocol between this study and previous experiments are the 2H2OP method and simultaneous insertion of the ccβA-msEvol2 transgene. The previous experiment used CRISPR/Cas9 with sgRNAs specifically designed to knockout the MC4R gene without adding in a transgene. Growth and overall omega-3 content was 45% and 50% higher, respectively, in MC4R/ccβA-msEvol2 mutants than in controls.

In regard to mutation rate, Yoshimi et al., (2016) reported knockout mutations of 82.4% for the Rosa26 locus and integration of the green fluorescent protein (GFP) of 17.6% in rats, *Rattus norvegicus*. The 2H2OP method, designed by Yoshimi et al. (2016), uses ssODNs as donor templates to facilitate homologous recombination (HR) rather than non-homologous end joining (NHEJ) to repair the double stranded break (DSB). NHEJ is the faster and typically more favored repair mechanism and is far more mutagenic, making it desirable for generating knockouts Mao et al., 2008. However, by introducing a plasmid with ssODNs homologous to the cut site, the gap can quickly be filled with the plasmid, thereby preventing reconstitution of the original sequence (Yoshimi et al., 2016). Additionally, the 5' degradation of ssODNs by exonucleases and removal by helicase in the 2H2OP method can lead to incomplete repair and cause a high rate of indel mutations (Yoshimi et al., 2016). The insertion of an entire transgene virtually guarantees complete knockout of the target gene and could cause greater phenotypic changes than smaller indels.

Growth was 45% higher in MC4R/ccβA-msEvol2 mutants than in controls. Previous MC4R knockout channel catfish generated in our lab in 2017 were 18.87% larger than controls at a similar size (~50 g) to this Example (see Example 2) and 56% and 37% larger than controls at 600 g and 3 kg, respectively, in initial aquaria experiments in 2016 (Dunham, personal communication). The much larger gains achieved with MC4R/ccβA-msEvol2 at the small fingerling stage could be due to pleiotropic effects of the transgene, a greater truncation of the MC4R protein, leading to greater phenotypic gain, or family effects. This faster growth makes MC4R/ccβA-msEvol2 mutants a potentially high value genotype for commercial aquaculture. While these results are promising, the experiment was not performed under commercial settings and future research should evaluate whether there is a genotype x age or genotype x environment interaction. Additionally, as these fish were P1 generation and were very likely mosaics, future research should evaluate performance in the F1 generation and the role of zygosity in growth.

Observed omega-3 fatty acid levels were increased in both MC4R mutants and ccβA-msEvol2/MC4R mutants when compared to controls, although the differences were not statistically significant. Observed EPA levels in MC4R mutants and ccOA-msEvol2/MC4R mutants were 94.12% and 92.16% higher than controls respectively. Observed levels of DHA levels in MC4R mutants and ccOA-msEvol2/MC4R mutants were 21.37% and 32.82% higher than controls respectively. Overall observed levels of EPA+DHA were 50.00% and 5.72% higher in ccOA-msEvol2/MC4R fish than controls and MC4R fish. This indicates that both MC4R and elongase play a key role in omega-3 synthesis. As the MC4R mutation alone caused as high an increase in EPA as ccOA-msEvol2/MC4R together, it is possible that the increases in EPA were due to MC4R knockout rather than ccβA-msEvol2 insertion. Fish typically have higher levels of DHA than EPA, and elongase plays a more essential role in DHA synthesis than in EPA synthesis, potentially explaining the relatively larger increase in DHA in ccβA-msEvol2 fish.

To obtain the recommended 500 mg of EPA+DHA per day, the consumer would need to eat approximately 275 g of wild-type catfish. A typical serving of fish is 112 g (Kris-Etherton et al., 2009). Thus, a consumer would need to eat nearly three servings to reach recommended levels. With the Evol2/MC4R genotype, a consumer would need to eat 1.64 servings of catfish per day to reach recommended levels of omega-3 fatty acids, half that of the wild type. While farmed Evol2/MC4R catfish still have EPA and DHA levels far below those of fatty marine fish such as salmon and tuna, they also have fewer of the issues associated with these fish including high mercury levels, microplastics and ecological disruption (Jackson et al., 2001; Burger et al., 2005; Lusher et al., 2017; Zupo et al., 2019).

The improved growth and omega-3 levels indicate that the use of ccβA-msEvol2/MC4R channel catfish could be beneficial for commercial farms. Catfish farming and production in the United States peaked in 2003, dramatically declined from 2007-2012 and has been gradually increasing since that time (Hanson and Sites, 2015; Torrans and Ott, 2018; FAO, 2020). Gene editing and transgenesis presents a valuable tool to increase profitability, sustainability and industry growth. There are, however, a number of ethical, logistical and regulatory hurdles for the ccOA-msEvol2/MC4R mutant channel catfish to become applied commercially in the United States, as FDA currently regulates gene edited animals. The improvement of gene editing technologies, greater understanding of its effects and the commercial success of genetically improved organisms, including Aquabounty's AquAdvantage salmon make this technology a viable option in the near future. By combining transgenesis and gene editing with other genetic techniques, such as selection, crossbreeding and hybridization, it is likely possible to achieve even greater growth results, shorten the grow-out period as well as select for multiple traits. With an increasing human population and declining natural resources, all solutions should be evaluated to determine the most efficient and sustainable methods of food production.

References for Example 3

Burger et al. (2005). *Environmental Health Perspectives*, 113(3), 266-271.
Cheng et al., (2014). *Transgenic Research*, 23(5), 729-742.
Cuevas-Uribe, R., & Tiersch, T. R. (2011). Estimation of fish sperm concentration by use of spectrophotometry. Cryopreservation in Aquatic Species, 2nd edition. World Aquaculture Society, Baton Rouge, LA, 162-200.
Curtis et al., (2004). *AgBioForum*, 7(1&2): 70-75.
Dunham, R. A. (2011). Aquaculture and fisheries biotechnology: genetic approaches. CABI Wallingford, Oxfordshire, UK
FAO (2020). The State of World Fisheries and Aquaculture 2020. Sustainability in action. Rome. https://doi.org/10.4060/ca9229en
Hanson, T. & Sites, D. (2015). 2014 U.S. Catfish Database. MSU AEC Information Report. Retrieved from http://www.agecon.msstate.edu/whatwedo/budgets/docs/catfish2014.pdf
Hasan, M. R., & Soto, S. Improving Feed Conversion Ratio and Its Impact on Reducing
Greenhouse Gas Emissions in Aquaculture. FAO Non-Serial Publication 33 (FAO, Rome, 2017).
Huang et al., (2021). *Transgenic Research*. April; 30(2):185-200.
Jackson et al., (2001). *Science*, 293(5530), 629-637.
Jiang et al., (2017). *Journal of Comparative Physiology B*, 187(4), 603-612.
Kris-Etherton, P. M., Innis, S., & Association, A. D. (2007). Position of the American Dietetic Association and Dietitians of Canada: dietary fatty acids. *Journal of the American Dietetic Association*, 107(9), 1599-1611.
Lauritzen, L. (2001). *Prog Lipid Res*, 40, 1-94.
Liu et al., (2019). *Frontiers in Endocrinology*, 10, 213.
Lusher et al., (2017). *Microplastics in fisheries and aquaculture: status of knowledge on their occurrence and implications for aquatic organisms and food safety.* FAO Fisheries and Aquaculture Technical Paper. No. 615. (FAO, Rome, 2017).
Meesapyodsuk et al., (2007). *Journal of Biological Chemistry*, 282(28), 20191-20199.
NMFS/NOAA (National Marine Fisheries Service—National Oceanic and Atmospheric Administration). (2013) Fisheries of the United States 2016. Current Fisheries Statistics No. 2016. NOAA, September 2013.
Owens L (2012) Diseases. In: Lucas J S, Southgate P C (eds) Aquaculture: Farming Aquatic Animals and Plants, pp. 214-228. John Wiley & Sons, New York, NY.
Peterman, M. A., & Posadas, B. C. (2019). *North American Journal of Aquaculture*, 81(3), 222-229.
Phelps et al., (2007). *Aquaculture*, 273(1), 80-86.
Robinson, E. H., & Li, M. H. (2015). *Feed conversion ratio for pond-raised catfish.* Mississippi Agricultural & Forestry Experiment Station.
Saunders et al., (2013). *Medical Journal of Australia*, 199, S22-S26.
Simopoulos, A. P. (2002). *Biomedicine & Pharmacotherapy*, 56(8), 365-379.
Smith et al., (2015). *Environmental Biology of Fishes*, 98(1), 23-33.
Sprecher, H. (2000). *Biochem Biophys Acta*, 1486, 219-231.
Tekedar et al., (2013). Complete genome sequence of channel catfish gastrointestinal septicemia isolate Edwardsiella tarda C07-087. *Genome Announcements*, 1(6).
Tucker, C. (2012). Channel catfish. *Aquaculture Farming Aquatic Animals and Plants*. 2ndEdition. pp. 365-383. Wiley-Blackwell, Sussex, UK.
Wagner et al., (2002) *Journal of Aquatic Animal Health*, 14:4, 263-272
Wall et al., (2010). *Nutrition Reviews*, 68(5), 280-289.
Wang et al., (2014). *Aquaculture*, 434, 57-65.
Yoshimi et al., (2016). *Nature Communications*, 7(1), 1-10.
Zhang et al., (2010). *Food Policy*, 35(5), 456-462.
Zhou et al., (2018). *Frontiers in Physiology*, 9, 1113.
Zupo et al., (2019). *Environmental Pollution*, 255, 112975.

Example 4—Combining Ability for Body Weight of Fingerling and Food Size Channel Catfish, *Ictalurus punctatus*, Female X Blue Catfish, *I. furcatus*, Male Hybrid Progeny 1. Introduction The basis for genetic improvement through breeding is means and variance (Bernardo, 2002). Assuming higher values of a trait are desired, a high mean for that trait in the starting population provides a head start and ensures that the desirable alleles are present. A large genetic variance allows for greater potential for genetic gain. Having a high mean and genetic variance are slightly contradictory however, as removing the bottom 50% of a population would increase the mean but decrease genetic variability. It is therefore essential to choose a population with a mean and variance that is appropriate for that particular genetic enhancement program. Choosing a high performing strain results in the best ending genetic product when conducting selection or utilizing other genetic enhancement program (Dunham and Smitherman 1983a, Dunham 2011). The Kansas strain is the oldest and one of the fastest growing domestic strains of channel catfish (Dunham and Smitherman 1983a, 1984), perhaps likely due to long domestication for growth, and some of the experimental fish were further growth enhanced through multiple generations of selection (Rezk et al. 2003, Dunham 2007, Dunham et al. 2008). Utilizing the best performing strain or line is an important first step in a genetic enhancement program.

The genetic basis of interspecific hybridization is dominance, epistasis and overdominance. Combining ability is a measurement of how well strains, breeds, lines or species combine to produce heterosis (Griffing, 1956). General combining ability (GCA) informs the breeder which parents should be used in breeding programs by quantifying the additive genetic effects (Costa et al., 2018). Specific combining ability (SCA) can measure non-additive effects, such as dominance epistasis and heterosis and is useful in determining which genetic combinations perform better or worse than expectations based on the average performance of the parents. Some strains may show sexual dimorphism for combining ability and therefore reciprocal crossbreeds often exhibit different performance. In the case of ictalurid catfish, this is likely due to genetic maternal effects. In channel catfish for example, Auburn strain females have good combining ability, while Auburn strain males do not (Dunham and Smitherman, 1983b). This maternal effect on combining ability is also apparent in interspecific hybridization of ictalurids, as 42 interspecific catfish hybrids have been assessed with the two best performing hybrids having channel catfish as the female parent.

In general, interspecific hybridization programs are unsuccessful for aquaculture application. Even if the many reproductive isolating mechanisms are overcome, heterosis is rarely achieved. The most commercially valuable exception is the channel catfish female x blue catfish male hybrid. Of the 42 North American catfish hybrids tested, only the channel catfish x blue catfish hybrid shows improvement in growth, disease resistance, low dissolved oxygen tolerance, dressing percentage and seinability (Smitherman and Dunham, 1985). However, while this hybrid is the best genotype for aquaculture, reproductive mechanisms hindered commercial utilization for nearly 4 decades. Channel catfish x blue catfish hybrids grow from fingerling to food sized fish 18-100% percent faster than either parent (Yant et al., 1975; Dunham and Smitherman, 1987; Dunham et al. 1990). However, the success of the hybrid varies by parental genotype and combining ability of the parents. Other examples of fish hybrids with improved growth include silver carp, *Hypophthalmichthys molitrix* x bighead carp, *Hypophthalmichthys nobilis* black crappie, *Pomoxis nigromaculatus* x white crappie, *Pomoxis annularis* (Hooe et al., 1994), and African catfish, *Clarias gariepinus*, x Vundu, *Heterobranchus longifilis* (Salami et al., 1993; Nwadukwe, 1995).

Combining ability is an important predictor that can be used to determine if selection, crossbreeding or reciprocal recurrent selection are good options to produce genetic gain. Progeny from two separate factorial mating designs of channel catfish female x blue male catfish showed high dam general combining ability, intermediate sire general combining abilities and low dam x sire specific combining ability for both growth and carcass yield (Bosworth and Waldbieser, 2014). The data indicates that the genetic variance for harvest weight and carcass yield of hybrid catfish was mostly additive.

A diallel design involves a group of individuals to be used as male parents and a group of individuals to be used as female parents. In a diallel design, each male is mated with each female and each female is mated with each male so that all possible combinations of offspring are produced. While being resource intensive, especially with large numbers of crosses, it is useful in identifying strains, families or individuals with high breeding values, identifying crosses with good combining ability and potentially improving multiple traits at once. It is essential to have replicates of each cross in relevant simulated commercial environments to determine whether there is a genotype environment interaction and determine the best crosses for a particular environment, if the germplasm will be commercialized. Simulated models indicate that fully factorial models are more efficient at generating long term genetic variability and genetic response when compared to partial factorial, nested and single pair matings (Dupont-Nivet et al., 2006; D'Agaro et al., 2007). A higher number of offspring per mating pair is preferred (D'Agaro et al., 2007). The major drawback to factorial breeding programs is the high resource cost to maintaining a large number of genotypes.

This Example examines combining ability for growth for fingerlings grown in aquaria and food fish cultured in earthen ponds for channel catfish female X blue catfish male hybrid catfish using a 6×6 diallel design, thereby allowing prediction of the bet potential genetic enhancement programs for growth improvement.

2. Materials and Methods

All experiments were conducted at the Fish Genetics Research Unit, E. W. Shell Fisheries Research Center, Auburn University, AL. All experimental protocols used in this experiment were approved by the Auburn University Institutional Animal Care and Use Committee (IACUC) before the experiment was initiated and followed the Association for Assessment and Accreditation of Laboratory Animal Care (AAALAC) protocols and guidelines.

2.1. Broodstock Husbandry

Broodstock were cultured in 0.04-ha earthen ponds averaging 1-meter in depth. They were fed a 32 percent protein catfish pellet at 1-2% of their body weight five days per week. Dissolved oxygen was maintained above 3 mg/L using a 12 horsepower surface aerator (Air-O-Lator). Genotypes of fish are distinguished through various identification tools including Passive Integrated Transponder (PIT) tags, and heat brands. Individuals were chosen for spawning based on their health and secondary sexual characteristics.

2.2. Mating Design

For determination of interspecific combining ability, channel catfish females with Kansas ancestry were mated with Rio Grande strain blue catfish males. In 2017, three female Kansas Random strain and three female Kansas Mix strain (six females total) were each paired in a 6×6 diallel design with six male Rio Grande blue catfish for a total of 36 pairings.

2.3. Spawning

Male blue catfish, with large, muscular heads that were wider than the rest of their bodies and well-developed papilla were chosen. Dark coloring and scarring from territorial fighting were also signs of quality males in reproductive condition. Females with soft, well-rounded abdomen that were wider than their head, and a swollen urogenital opening were chosen. Broodstock were minimally handled and kept in tanks for as short a period of time as possible to limit stress.

Males were euthanized by a percussive blow to the head followed by pithing. The body cavity was opened carefully with a scalpel, ensuring not to pierce any organs. Testes were removed using tweezers and/or scissors and washed in a weigh boat with 0.9 percent saline using bottled distilled water, removing any blood or tissue. The water was drained, and the testes weighed before macerating the testes using scissors to release sperm. The homogenized testes were then filtered into a 50 ml falcon tube using a 100-micron screen. The sperm was then diluted with 0.9 percent saline solution to a maximum of 10 ml/gram of testes. Sperm concentration was tested using a Nanodrop 2000 Spectrophotometer (Thermo Scientific) and running a simple linear regression between sperm concentration and absorbance using the equation y=−2.450+0.185lnX (Adjusted R2=0.601) at 450 nm (Cuevas-Uribe & Tiersch, 2011). Motility was analyzed under a 10× light microscope while sperm count was checked under 40× magnification.

Females were weighed and gently placed in labeled 32 mm mesh bags. The spawning bags were then placed in a flow through holding tank so that the fish was fully submerged, ensuring that water quality was ideal with dissolved oxygen levels above 5 mg/L. A 14-gauge implanter was loaded with 100 μg/kg body weight of luteinizing hormone releasing hormone analog (LHRHa) implant. The needle was then inserted at a 45-degree angle ventrally adjacent to the pelvic fin and the implant was inserted. The ovulation time was predicted based on the degree-hours according to Phelps et al. (2007). Water temperature ranged from 26-28° C. Females were checked 36 hours after LHRHa injection and every four hours after that until ovulation. Once a female began ovulating, indicated by eggs visible on the bag, she was carefully transferred into a tank with 100 mg/L buffered tricaine methane sulfonate (MS-222) with equal parts sodium bicarbonate until completely anesthetized. Prior to this time, a thin layer of vegetable shortening was used to coat several 20 cm diameter metal egg collection pans. The fish was then dipped in fresh water to wash off the MS-222 and gently dried with a towel. A thick layer of vegetable shortening, Crisco, was applied around the urogenital opening, including the pelvic fins to prevent sticking of the eggs during stripping. The female was hand stripped into the greased pan by gently applying pressure on the abdomen from the anterior end of the abdomen posteriorly towards the vent. Eggs would usually flow freely that were well-rounded and golden in color, with minimal blood. They were hand stripped ensuring no contact with freshwater, which can activate the eggs.

Approximately 3 mL of sperm solution was added to the eggs and mixed gently. Fresh water was added to barely cover the eggs to activate the sperm and eggs, and the water was swirled to accomplish fertilization. After two minutes, the eggs should be fertilized, and after an additional 3 minutes, the spawning pan with the eggs was carefully submerged in a hatching trough with flow through water and a slow drip of calcium chloride. The eggs were left to harden for 1 hour. After 1 hour of hardening, the eggs were transferred into a labeled mesh basket suspended just below the surface in a 600 L-hatching trough filled with flow through water and a slow drip of calcium chloride.

Paddlewheels were installed in the hatching troughs to circulate the water and gently agitate and aerate the eggs, mimicking the behavior of the male catfish parent. Water flow in the hatching troughs was maintained at ~25 L/min, ensuring an exchange rate of 100%/25 min. Calcium chloride drips were placed at the upstream end of the hatching troughs to maintain hardness above 50 ppm. Dissolved oxygen was maintained above 5 ppm with compressed air and paddlewheels. Temperatures in hatching troughs were maintained between 24-28° C. Eggs were monitored daily for fungus growth. Treatment for fungus included manual removal of fungus and dead eggs and chemical treatment. Chemical treatments consisted of alternating 100 ppm formalin and 32 ppm copper sulfate static baths for 15 min every 8 hours. Chemical treatments were terminated 24 hours before expected hatch.

After about 5 days, or when the embryos are moving rapidly and close to hatch, fry catchers were placed around the mesh baskets to ensure newly hatched fry did not escape and mix within the tank. At the swim up stage, fry were transferred to 50 L aquaria in recirculating systems until large enough to be PIT (Passive Integrated Transponders) tagged and moved out to ponds. Water quality was measured twice per week in the recirculating system.

2.4. Grow Out and Evaluation

Pellet feed size was adjusted to a maximum of 4 the size of the mouth as the fish grew. Fry were fed Purina® AquaMax® powdered starter feed until they were large enough to eat Purina® AquaMax® 100. Both feeds contained 50% protein. All fish were fed daily to satiation. Fish were weighed at 14 months, PIT tagged and stocked communally in a 0.04-ha pond at approximately 14,000 fish/ha. Fifteen fish per genetic type remained in the aquaria in the recirculating system. Fish were fed ad-libitum daily with 32% protein pelleted catfish feed. Fish were then harvested at 40-months post hatch, individually identified, weighed, sexed. During these growth trials any mortality due to disease was identified by family, genotype and sex, and the pathogen identified.

2.5. Statistical Analysis

Statistical analysis was conducted using SAS version 9.4 (Cary, NC, USA). Due to differential mortality in aquaria leading to differences in density, a regression between weight and density was calculated. The Proc Mixed function with a restricted estimation of likelihood was used to calculate the variance for the dam, sire, and dam x sire interactions and error.

General combining ability of the dams ($GCA_D$) equals the variance of the dams, calculated as the difference between the least squares means fitted for female parent effects in the model and the overall means of the progeny trial (Cotterill et al., 1986). Sire general combining ability ($GCA_S$) equals the variance of the sires. Specific combining ability, the proportion of variance due to the dam x sire interaction, was calculated as the means of the difference between the observed and predicted genetic values for each particular cross (Cotterill et al., 1986).

To compare the sources of variation in body weight, ANOVA and Tukey's multiple comparisons test was performed using R programming language (R Core Team, Vienna, Austria). Differences in variances between crosses were calculated using unpaired t-tests. Significance was tested at α=0.05.

3. Results

In 2017 a total of 1320 channel x blue hybrid catfish were generated from 36 families in a 6×6 diallel cross. At 14-months post hatch, the mean weight of the hybrid progeny was 9.69 g±8.78 g. The $GCA_D$ estimate for body weight was 0.0021 and was responsible for 4.50% of total variance (FIG. 20). The GCAs estimate for body weight was 0.0040 and was responsible for 8.42% of total variance. The SGA estimate for body weight was 0.0098 and was responsible for 20.76% of total variance. The remaining 66.32% of variance was due to error. There were significant differences among mean body weights of families at 14-months post hatch (p<2e-16). At 14-months post hatch the heaviest family was 700% and 38.95 g larger than the lightest family (p<2e-16).

At 40-months the mean weight was 836.64g±250.71. The $GCA_D$ estimate for body weight was 0.0007 and was responsible for 1.09% of total variance (FIG. 21). The $GCA_S$ estimate for body weight was 0. The SGA estimate for body weight was 0.0031 and was responsible for 4.61% of total variance. The remaining 94.30% of variance was due to error. There were no significant differences between mean body weights of different families at 40-months post hatch (p=0.243). At 14-months post hatch the observed mean of the heaviest family was 88% and 543.33 g larger than the lightest family, but was not significantly different (p=0.414). The heaviest and lightest families at 40-months post hatch were not the same as those at 14-months post hatch, indicating genotype-environment interactions.

Example 5—Optimization of Hormone Therapy and Induced Spawning of Mc4R Knockout Channel Catfish Bodyweight of males and females and those with good secondary sexual characteristics indicative of readiness for spawning are paired in suitable aquaria (e.g., 120 L aquaria). Males are used multiple times as needed. Males and females are treated with the same injection regimes with 10 replicate pairings per treatment.

The injection regimes for determining optimized hormone therapy are as follows:

LHRHa [0 (saline), 50, 100 µg/kg] and hCG [0 (saline), 1,200, 1,600, 2,000 IU] using a 3×4 factorial design. Each female is administered two intraperitoneal injections with a priming dose (20% of hormone) and resolving dose (80% of hormone) 15 h later. Males receive a single injection. Spawning is checked every 4 h beginning 24 h. Spawns are collected, egg number calculated for each pair. Eggs (~20) are also randomly sampled from each female to analyze egg diameter (mm).

qPCR is used to assess the expression of gonadotropin receptors (fshr, lhcgr1, lhcgr2) and estrogen receptors (esr1, esr2a, esr2b, gpera, gperb), and progesterone receptors (pgr, mPRa) and the androgen receptor (ar) in males. This is completed for 3 pairs per hormonal treatment, where samples (via ovarian biopsy) are collected before first injection (time 0), right before spawning, and in the unfertilized eggs.

Individual egg masses are incubated separately utilizing standard procedures in paddlewheel troughs. Then fine mesh containers are placed under the egg masses to catch hatching fry and prevent mixing of the families just prior to hatching. Fecundity, hatch and fry/kg female body weight is determined.

In some embodiments, at least a 40% hatch rate is indicative of a successful hormone treatment regime.

Various modifications and variations of the described methods, pharmaceutical compositions, and kits of the invention will be apparent to those skilled in the art without departing from the scope and spirit of the invention. Although the invention has been described in connection with specific embodiments, it will be understood that it is capable of further modifications and that the invention as claimed should not be unduly limited to such specific embodiments. Indeed, various modifications of the described modes for carrying out the invention that are obvious to those skilled in the art are intended to be within the scope of the invention. This application is intended to cover any variations, uses, or adaptations of the invention following, in general, the principles of the invention and including such departures from the present disclosure come within known customary practice within the art to which the invention pertains and may be applied to the essential features herein before set forth.

What is claimed is:

1. An engineered fish of the genus *Ictalurus* whose genome comprises:
   a modified melanocortin-4 receptor gene or gene product, wherein the modified melanocortin-4 receptor gene or gene product has decreased or eliminated expression, activity, or both as compared to a suitable control; and
   an exogenous elongase gene,
   wherein the engineered fish of the genus *Ictalurus* has increased body weight, as compared to an engineered fish of the genus *Ictalurus* having only the modified melanocortin-4 receptor gene or gene product, and wherein the exogenous elongase gene is inserted into the melanocortin-4 receptor gene such that at least
   a portion of exon 1 or the entirety of the melanocortin-4 receptor gene is replaced with the exogenous elongase gene.

2. The engineered fish of claim 1, further comprising a modified myostatin gene or gene product, wherein the modified myostatin gene or gene product has decreased or eliminated expression, activity, or both as compared to the suitable control.

3. The engineered fish of claim 1, wherein the engineered fish has increased body weight, increased body mass, increased growth rate, increased amount of n-3 fatty acids, sterility, or any combination thereof as compared to a suitable control.

4. The engineered fish of claim 1, wherein the modified melanocortin-4 receptor gene or gene product expression, activity, or both are each decreased 2-1000 fold.

5. The engineered fish of claim 2, wherein the modified melanocortin-4 receptor gene or gene product expression, activity, or both are each independently decreased 2-1000 fold, wherein the myostatin gene or gene product expression, activity, or both, are each independently decreased 2-1000 fold, or both.

6. The engineered fish of claim 2, wherein a second exogenous gene is inserted into the myostatin gene such that at least a portion of or the entirety of the myostatin gene is replaced with the exogenous gene to generate the modified myostatin gene.

7. The engineered fish of claim 6, wherein the engineered fish has increased amount of docosahexaenoic acid in one or more cells or tissues, increased amount of eicosapentaenoic acid in one or more cells or tissues, increased disease resistance, or any combination thereof as compared to a suitable control.

8. The engineered fish of claim 2, wherein the engineered fish has increased body mass, increased growth rate, increased amount of docosahexaenoic acid in one or more cells or tissues, increased amount of eicosapentaenoic acid in one or more cells or tissues, increased disease resistance, or any combination thereof as compared to a suitable control.

9. The engineered fish of claim 1, wherein the engineered fish has increased body mass, increased growth rate, increased amount of docosahexaenoic acid in one or more cells or tissues, increased amount of eicosapentaenoic acid in one or more cells or tissues, or any combination thereof as compared to a suitable control.

10. The engineered fish of claim 1, wherein the engineered fish is *I. punctatus, I. furcatus*, or is a hybrid thereof.

11. The engineered fish of claim 1, wherein the modified melanocortin-4 receptor A gene or gene product is produced using a programmable nuclease system.

12. The engineered fish of claim 11, wherein the programmable nuclease system is a CRISPR-Cas system, a TALEN system, a Zinc Finger Nuclease system, or an IscB system.

13. A feed or food product comprising:
   an engineered fish or portion thereof, wherein the engineered fish is an engineered fish according to claim 1.

* * * * *

SEQUENCE LISTING

```
<160> NUMBER OF SEQ ID NOS: 119

<210> SEQ ID NO 1
<211> LENGTH: 482
<212> TYPE: DNA
<213> ORGANISM: Ictalurus punctatus

<400> SEQUENCE: 1
actcctctct gagacctgac ctggctgatc atgcatttag cgcaggttct gatttcgctg      60
ggcttcgtgg tggcgttcgg tccgatggcg cgcactgaca ccggagcacc ggagcagcag     120
cagcagcagc aacctaccgc cgtgacgagg gagcgcgagg cgcagtgttc agcggccagc     180
gcgtgcgctt ccgccagca cagcaagcag ctccgtctgc aagccatcaa gtcccagatt     240
ctgagcaaac tgcgcctcaa acaagctccc aacgtgagcc gcgatgtggt caagcagttg     300
ctcccgaaag cgccaccggt gcagcagctg ctcgacctgt acgacgtgct cggggacgac     360
ggcaagccgg gcacagcgct ccaggacgag gaggaggacg acgaggagca cgccaccacc     420
gagaccgtca tgagcatggc cgccgagcgt gagtcccttt actactgctt catagcctaa     480
ct                                                                    482

<210> SEQ ID NO 2
<211> LENGTH: 75
<212> TYPE: DNA
<213> ORGANISM: Ictalurus punctatus

<400> SEQUENCE: 2
ttcgtggtgg cgttcggtcc gatggcgcgc actgacaccg gagcaccgga gcagcagcag      60
cagcagcaac ctacc                                                       75
```

<210> SEQ ID NO 3
<211> LENGTH: 25
<212> TYPE: PRT
<213> ORGANISM: Ictalurus punctatus

<400> SEQUENCE: 3

Phe Val Val Ala Phe Gly Pro Met Ala Arg Thr Asp Thr Gly Ala Pro
1               5                   10                  15

Glu Gln Gln Gln Gln Gln Gln Pro Thr
            20                  25

<210> SEQ ID NO 4
<211> LENGTH: 72
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (49)..(50)
<223> OTHER INFORMATION: six deleted nucleotides

<400> SEQUENCE: 4
ttcgtggtgg cgttcggtcc gatggcgcgc actgacaccg gagcaccgga gcagcagcag        60
cagcaaccta cc                                                            72

<210> SEQ ID NO 5
<211> LENGTH: 23
<212> TYPE: PRT
<213> ORGANISM: Artificial Sequence
<220> FEATURE:
<223> OTHER INFORMATION: Synthetic

<400> SEQUENCE: 5

Phe Val Val Ala Phe Gly Pro Met Ala Arg Thr Asp Thr Gly Ala Pro
1               5                   10                  15

Glu Gln Gln Gln Gln Pro Thr
            20

<210> SEQ ID NO 6
<211> LENGTH: 53
<212> TYPE: DNA
<213> ORGANISM: Ictalurus punctatus
<220> FEATURE:
<221> NAME/KEY: misc_feature
<222> LOCATION: (3)..(4)
<223> OTHER INFORMATION: wild-type continuation of the sequence
<220> FEATURE:
<221> NAME/KEY: misc_feature
<222> LOCATION: (34)..(35)
<223> OTHER INFORMATION: wild-type continuation of the sequence

<400> SEQUENCE: 6
accgagcgcg aggcgcagtg ttcagcggcc agcgccaacc ccactgaaca cgt               53

<210> SEQ ID NO 7
<211> LENGTH: 17
<212> TYPE: PRT
<213> ORGANISM: Ictalurus punctatus
<220> FEATURE:
<221> NAME/KEY: MISC_FEATURE
<222> LOCATION: (1)..(2)
<223> OTHER INFORMATION: wild-type continuation of the sequence
<220> FEATURE:
<221> NAME/KEY: MISC_FEATURE
<222> LOCATION: (11)..(12)

-continued

<223> OTHER INFORMATION: wild-type continuation of the sequence

<400> SEQUENCE: 7

Thr Glu Arg Glu Ala Gln Cys Ser Ala Ala Ser Pro Thr Pro Leu Asn
1               5                   10                  15

Thr

<210> SEQ ID NO 8
<211> LENGTH: 22
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (3)..(4)
<223> OTHER INFORMATION: 38 deleted nucleotides followed by a large
      deletion followed by 33 deleted nucleotides

<400> SEQUENCE: 8
acctcaaccc cactgaacac gt                                          22

<210> SEQ ID NO 9
<211> LENGTH: 7
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (1)..(2)
<223> OTHER INFORMATION: wild-type continuation of the sequence followed
      by 5 deleted amino acids followed by wild-type continuation of the
      sequence

<400> SEQUENCE: 9

Thr Ser Thr Pro Leu Asn Thr
1               5

<210> SEQ ID NO 10
<211> LENGTH: 53
<212> TYPE: DNA
<213> ORGANISM: Ictalurus punctatus

<400> SEQUENCE: 10
aagcagttgc tcccgaaagc gccaccggtg cagcagctgc tcgacctgta cga         53

<210> SEQ ID NO 11
<211> LENGTH: 17
<212> TYPE: PRT
<213> ORGANISM: Ictalurus punctatus

<400> SEQUENCE: 11

Lys Gln Leu Leu Pro Lys Ala Pro Pro Val Gln Gln Leu Leu Asp Leu
1               5                   10                  15

Tyr

<210> SEQ ID NO 12
<211> LENGTH: 41
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (7)..(8)
<223> OTHER INFORMATION: 11 deleted nucleotides

<400> SEQUENCE: 12
agcagttcgc caccggtgca gcagctgctc gacctgtacg a          41

<210> SEQ ID NO 13
<211> LENGTH: 12
<212> TYPE: PRT
<213> ORGANISM: Artificial Sequence
<220> FEATURE:
<223> OTHER INFORMATION: Synthetic

<400> SEQUENCE: 13

Ser Ser Pro Pro Val Gln Gln Leu Leu Asp Leu Tyr
1               5                   10

<210> SEQ ID NO 14
<211> LENGTH: 83
<212> TYPE: DNA
<213> ORGANISM: Ictalurus punctatus
<220> FEATURE:
<221> NAME/KEY: misc_feature
<222> LOCATION: (27)..(28)
<223> OTHER INFORMATION: wild-type continuation of the sequence
<220> FEATURE:
<221> NAME/KEY: misc_feature
<222> LOCATION: (55)..(56)
<223> OTHER INFORMATION: wild-type continuation of the sequence

<400> SEQUENCE: 14
ttcgtggtgg cgttcggtcc gatggcgagc gcgaggcgca gtgttcagcg gccagccacc          60
ggtgcagcag ctgctcgacc tgt                                                   83

<210> SEQ ID NO 15
<211> LENGTH: 26
<212> TYPE: PRT
<213> ORGANISM: Ictalurus punctatus
<220> FEATURE:
<221> NAME/KEY: MISC_FEATURE
<222> LOCATION: (9)..(10)
<223> OTHER INFORMATION: wild-type continuation of the sequence
<220> FEATURE:
<221> NAME/KEY: MISC_FEATURE
<222> LOCATION: (17)..(18)
<223> OTHER INFORMATION: wild-type continuation of the sequence

<400> SEQUENCE: 15

Phe Val Val Ala Phe Gly Pro Met Ala Arg Glu Ala Gln Cys Ser Ala
1               5                   10                  15

Ala Pro Pro Val Gln Gln Leu Leu Asp Leu
            20                  25

<210> SEQ ID NO 16
<211> LENGTH: 41
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (7)..(8)
<223> OTHER INFORMATION: 11 deleted nucleotides

<400> SEQUENCE: 16
agcagttcgc caccggtgca gcagctgctc gacctgtacg a          41

<210> SEQ ID NO 17
<211> LENGTH: 12

```
<212> TYPE: PRT
<213> ORGANISM: Artificial Sequence
<220> FEATURE:
<223> OTHER INFORMATION: Synthetic

<400> SEQUENCE: 17

Ser Ser Pro Pro Val Gln Gln Leu Leu Asp Leu Tyr
1               5                   10

<210> SEQ ID NO 18
<211> LENGTH: 69
<212> TYPE: DNA
<213> ORGANISM: Ictalurus punctatus

<400> SEQUENCE: 18
ttcgtggtgg cgttcggtcc gatggcgcgc actgacaccg agcaccgga gcagcagcag    60 cagcagcaa                                                          69

<210> SEQ ID NO 19
<211> LENGTH: 25
<212> TYPE: PRT
<213> ORGANISM: Ictalurus punctatus

<400> SEQUENCE: 19

Phe Val Val Ala Phe Gly Pro Met Ala Arg Thr Asp Thr Gly Ala Pro
1               5                   10                  15

Glu Gln Gln Gln Gln Gln Gln Pro Thr
            20                  25

<210> SEQ ID NO 20
<211> LENGTH: 72
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (49)..(50)
<223> OTHER INFORMATION: 6 deleted nucleotides

<400> SEQUENCE: 20
ttcgtggtgg cgttcggtcc gatggcgcgc actgacaccg agcaccgga gcagcagcag    60 cagcaaccta cc                                                      72

<210> SEQ ID NO 21
<211> LENGTH: 23
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (19)..(20)
<223> OTHER INFORMATION: 2 deleted amino acids

<400> SEQUENCE: 21

Phe Val Val Ala Phe Gly Pro Met Ala Arg Thr Asp Thr Gly Ala Pro
1               5                   10                  15

Glu Gln Gln Gln Gln Pro Thr
            20

<210> SEQ ID NO 22
<211> LENGTH: 932
<212> TYPE: DNA
<213> ORGANISM: Ictalurus punctatus
```

<400> SEQUENCE: 22

```
ggagatggag gacacggaag agactcgcag attagaataa acgcagatga agacggaaag      60
cggaggactg tggtgaggag gtcttgcgga tatgaacgtg tcggagcacc acgggatgca     120
gcatgcacac cggaaccaca gcctgggcgt gcagattgga aacaaagccg gctcggggga     180
aaggaactcg gagtcgggct gctacgagca gctgttgatc tccaccgagg tcttcatcac     240
gctagggttg gtcagccttc tggagaacat cctggtaatc gcggccatcg tcaagaacaa     300
gaacttccac tcgcccatgt acttcttcat ctgcagcctg gcggtggccg acctgctggt     360
gagcgtatcg aacgcgacag aaacggctgt gatggcgctg atcaccagcg gcaacctgac     420
catctctgga gacgtcgtga aaagcatgga caatgtgttc gactccatga tctgcagctc     480
actcctggcc tccatttgga gtctcctggc catcgccgtg gaccgctacg tcaccatctt     540
ctacgccctg cgctaccaca acatcatgac ccaacgccgc gcggcgctca tcatcgtatg     600
catatggagc ttctgcacgg cgtccggtgt gctcttcatc atctactcgg agagcgctac     660
agtcctcatc tgccttatca gcatgttctt caccatgctg gccctcatgg cctcgcttta     720
cgtgcacatt ttcctcttgg cgcggcttca catgaaacgc atcgccgcct taccggggaa     780
cggccccgtg tggcaggcgg ccaacatgaa gggcgccgtg acgctcacca tcctgctcgg     840
agtgtttgtc gtgtgctggg cgccgttttt tctccacctc attctcatga tctcttgtcc     900
gaggaacccg tattgcgtct gcttcatgtc tc                                    932
```

<210> SEQ ID NO 23
<211> LENGTH: 61
<212> TYPE: DNA
<213> ORGANISM: Ictalurus punctatus
<220> FEATURE:
<221> NAME/KEY: misc_feature
<222> LOCATION: (45)..(46)
<223> OTHER INFORMATION: wild-type continuation of the sequence

<400> SEQUENCE: 23

```
tggaaacaaa gccggctcgg gggaaaggaa ctcggagtcg ggctgcaggc ggccaacatg      60
a                                                                     61
```

<210> SEQ ID NO 24
<211> LENGTH: 217
<212> TYPE: PRT
<213> ORGANISM: Ictalurus punctatus

<400> SEQUENCE: 24

```
Gly Asn Lys Ala Gly Ser Gly Glu Arg Asn Ser Glu Ser Gly Cys Tyr
1               5                   10                  15

Glu Gln Leu Leu Ile Ser Thr Glu Val Phe Ile Thr Leu Gly Leu Val
            20                  25                  30

Ser Leu Leu Glu Asn Ile Leu Val Ile Ala Ala Ile Val Lys Asn Lys
        35                  40                  45

Asn Phe His Ser Pro Met Tyr Phe Phe Ile Cys Ser Leu Ala Val Ala
    50                  55                  60

Asp Leu Leu Val Ser Val Ser Asn Ala Thr Glu Thr Ala Val Met Ala
65                  70                  75                  80

Leu Ile Thr Ser Gly Asn Leu Thr Ile Ser Gly Asp Val Val Lys Ser
                85                  90                  95

Met Asp Asn Val Phe Asp Ser Met Ile Cys Ser Ser Leu Leu Ala Ser
            100                 105                 110
```

Ile Trp Ser Leu Leu Ala Ile Ala Val Asp Arg Tyr Val Thr Ile Phe
            115                 120                 125

Tyr Ala Leu Arg Tyr His Asn Ile Met Thr Gln Arg Arg Ala Ala Leu
        130                 135                 140

Ile Ile Val Cys Ile Trp Ser Phe Cys Thr Ala Ser Gly Val Leu Phe
145                 150                 155                 160

Ile Ile Tyr Ser Glu Ser Ala Thr Val Leu Ile Cys Leu Ile Ser Met
                165                 170                 175

Phe Phe Thr Met Leu Ala Leu Met Ala Ser Leu Tyr Val His Met Phe
            180                 185                 190

Leu Leu Ala Arg Leu His Met Lys Arg Ile Ala Ala Leu Pro Gly Asn
        195                 200                 205

Gly Pro Val Trp Gln Ala Ala Asn Met
    210                 215

<210> SEQ ID NO 25
<211> LENGTH: 29
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (13)..(14)
<223> OTHER INFORMATION: 11 deleted nucleotides followed by large
      deletion followed by 11 deleted nucleotides

<400> SEQUENCE: 25
tggaaacaaa gcccaggcgg ccaacatga                                    29

<210> SEQ ID NO 26
<211> LENGTH: 9
<212> TYPE: PRT
<213> ORGANISM: Artificial Sequence
<220> FEATURE:
<223> OTHER INFORMATION: Synthetic

<400> SEQUENCE: 26

Gly Asn Lys Ala Gln Ala Ala Asn Met
1               5

<210> SEQ ID NO 27
<211> LENGTH: 68
<212> TYPE: DNA
<213> ORGANISM: Ictalurus punctatus
<220> FEATURE:
<221> NAME/KEY: misc_feature
<222> LOCATION: (3)..(4)
<223> OTHER INFORMATION: wild-type continuation of the sequence
<220> FEATURE:
<221> NAME/KEY: misc_feature
<222> LOCATION: (22)..(23)
<223> OTHER INFORMATION: wild-type continuation of the sequence
<220> FEATURE:
<221> NAME/KEY: misc_feature
<222> LOCATION: (29)..(30)
<223> OTHER INFORMATION: wild-type continuation of the sequence followed
      by wild-type continuation of the sequence
<220> FEATURE:
<221> NAME/KEY: misc_feature
<222> LOCATION: (44)..(45)
<223> OTHER INFORMATION: wild-type continuation of the sequence followed
      by wild-type continuation of the sequence

<400> SEQUENCE: 27
aagggacaat gtgttcgact cctcagcatt cacatgaaac gcagatctct tgtccgagga    60
acccgtat 68

<210> SEQ ID NO 28
<211> LENGTH: 162
<212> TYPE: PRT
<213> ORGANISM: Ictalurus punctatus

<400> SEQUENCE: 28

Met Asp Asn Val Phe Asp Ser Met Ile Cys Ser Ser Leu Leu Ala Ser
1               5                   10                  15

Ile Trp Ser Leu Leu Ala Ile Ala Val Asp Arg Tyr Val Thr Ile Phe
            20                  25                  30

Tyr Ala Leu Arg Tyr His Asn Ile Met Thr Gln Arg Ala Ala Leu
        35                  40                  45

Ile Ile Val Cys Ile Trp Ser Phe Cys Thr Ala Ser Gly Val Leu Phe
    50                  55                  60

Ile Ile Tyr Ser Glu Ser Ala Thr Val Leu Ile Cys Leu Ile Ser Met
65                  70                  75                  80

Phe Phe Thr Met Leu Ala Leu Met Ala Ser Leu Tyr Val His Met Phe
                85                  90                  95

Leu Leu Ala Arg Leu His Met Lys Arg Ile Ala Ala Leu Pro Gly Asn
            100                 105                 110

Gly Pro Val Trp Gln Ala Ala Asn Met Lys Gly Ala Val Thr Leu Thr
        115                 120                 125

Ile Leu Leu Gly Val Phe Val Val Cys Trp Ala Pro Phe Phe Leu His
    130                 135                 140

Leu Ile Leu Met Ile Ser Cys Pro Arg Asn Pro Tyr Cys Val Cys Phe
145                 150                 155                 160

Met Ser

<210> SEQ ID NO 29
<211> LENGTH: 68
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (3)..(4)
<223> OTHER INFORMATION: 2 deleted nucleotides followed by large
      deletion followed by 2 deleted nucleotides
<220> FEATURE:
<221> NAME/KEY: misc_feature
<222> LOCATION: (22)..(23)
<223> OTHER INFORMATION: 2 deleted nucleotides followed by large
      deletion followed by 2 deleted nucleotides
<220> FEATURE:
<221> NAME/KEY: misc_feature
<222> LOCATION: (29)..(30)
<223> OTHER INFORMATION: 2 deleted nucleotides followed by large
      deletion followed by 2 deleted nucleotides
<220> FEATURE:
<221> NAME/KEY: misc_feature
<222> LOCATION: (44)..(45)
<223> OTHER INFORMATION: 2 deleted nucleotides followed by large
      deletion followed by 2 deleted nucleotides

<400> SEQUENCE: 29
aaggagtagt atgtccgaat tctcagtatt catataaaga gtagaccagt aatacgtgga      60
tgacctat                                                              68

<210> SEQ ID NO 30

```
<211> LENGTH: 25
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (10)..(11)
<223> OTHER INFORMATION: 1 deleted amino acid
<220> FEATURE:
<221> NAME/KEY: MISC_FEATURE
<222> LOCATION: (14)..(15)
<223> OTHER INFORMATION: 1 deleted amino acid

<400> SEQUENCE: 30

Ser Ser Met Ser Glu Phe Ser Val Phe Ile Arg Val Asp Gln Tyr Val
1               5                   10                  15
Asp Asp Leu Leu Arg Leu Leu His Val
            20                  25

<210> SEQ ID NO 31
<211> LENGTH: 31
<212> TYPE: PRT
<213> ORGANISM: Ascaris suum

<400> SEQUENCE: 31

Ser Trp Leu Ser Lys Thr Ala Lys Lys Leu Glu Asn Ser Ala Lys Lys
1               5                   10                  15
Arg Ile Ser Glu Gly Ile Ala Ile Ala Ile Gln Gly Gly Pro Arg
            20                  25                  30

<210> SEQ ID NO 32
<211> LENGTH: 31
<212> TYPE: PRT
<213> ORGANISM: Artificial Sequence
<220> FEATURE:
<223> OTHER INFORMATION: mature peptide sequence

<400> SEQUENCE: 32

Ser Trp Leu Ser Lys Thr Tyr Lys Lys Leu Glu Asn Ser Ala Lys Lys
1               5                   10                  15
Arg Ile Ser Glu Gly Ile Ala Ile Ala Ile Gln Gly Gly Pro Arg
            20                  25                  30

<210> SEQ ID NO 33
<211> LENGTH: 31
<212> TYPE: PRT
<213> ORGANISM: Artificial Sequence
<220> FEATURE:
<223> OTHER INFORMATION: mature peptide sequence

<400> SEQUENCE: 33

Ser Trp Leu Ser Lys Thr Tyr Lys Lys Leu Glu Asn Ser Ala Lys Lys
1               5                   10                  15
Arg Ile Ser Glu Gly Ile Ala Ile Ala Ile Lys Gly Gly Ser Arg
            20                  25                  30

<210> SEQ ID NO 34
<211> LENGTH: 31
<212> TYPE: PRT
<213> ORGANISM: Artificial Sequence
<220> FEATURE:
<223> OTHER INFORMATION: mature peptide sequence

<400> SEQUENCE: 34

Ser Trp Leu Ser Lys Thr Tyr Lys Lys Leu Glu Asn Ser Ala Lys Lys
```

```
                1               5                  10                  15
Arg Ile Ser Glu Gly Ile Ala Ile Ala Ile Leu Gly Gly Leu Arg
                20                  25                  30

<210> SEQ ID NO 35
<211> LENGTH: 7
<212> TYPE: PRT
<213> ORGANISM: Simian virus 40

<400> SEQUENCE: 35

Pro Lys Lys Lys Arg Lys Val
1               5

<210> SEQ ID NO 36
<211> LENGTH: 10
<212> TYPE: PRT
<213> ORGANISM: Simian virus 40

<400> SEQUENCE: 36

Pro Lys Lys Lys Arg Lys Val Glu Ala Ser
1               5                  10

<210> SEQ ID NO 37
<211> LENGTH: 16
<212> TYPE: PRT
<213> ORGANISM: Simian virus 40

<400> SEQUENCE: 37

Lys Arg Pro Ala Ala Thr Lys Lys Ala Gly Gln Ala Lys Lys Lys Lys
1               5                  10                  15

<210> SEQ ID NO 38
<211> LENGTH: 9
<212> TYPE: PRT
<213> ORGANISM: Homo sapiens

<400> SEQUENCE: 38

Pro Ala Ala Lys Arg Val Lys Leu Asp
1               5

<210> SEQ ID NO 39
<211> LENGTH: 11
<212> TYPE: PRT
<213> ORGANISM: Homo sapiens

<400> SEQUENCE: 39

Arg Gln Arg Arg Asn Glu Leu Lys Arg Ser Pro
1               5                  10

<210> SEQ ID NO 40
<211> LENGTH: 38
<212> TYPE: PRT
<213> ORGANISM: Homo sapiens

<400> SEQUENCE: 40

Asn Gln Ser Ser Asn Phe Gly Pro Met Lys Gly Gly Asn Phe Gly Gly
1               5                  10                  15

Arg Ser Ser Gly Pro Tyr Gly Gly Gly Gly Gln Tyr Phe Ala Lys Pro
                20                  25                  30

Arg Asn Gln Gly Gly Tyr
            35

<210> SEQ ID NO 41
```

```
<211> LENGTH: 42
<212> TYPE: PRT
<213> ORGANISM: Homo sapiens

<400> SEQUENCE: 41

Arg Met Arg Ile Glx Phe Lys Asn Lys Gly Lys Asp Thr Ala Glu Leu
1               5                   10                  15

Arg Arg Arg Arg Val Glu Val Ser Val Glu Leu Arg Lys Ala Lys Lys
                20                  25                  30

Asp Glu Gln Ile Leu Lys Arg Arg Asn Val
                35                  40

<210> SEQ ID NO 42
<211> LENGTH: 8
<212> TYPE: PRT
<213> ORGANISM: Homo sapiens

<400> SEQUENCE: 42

Val Ser Arg Lys Arg Pro Arg Pro
1               5

<210> SEQ ID NO 43
<211> LENGTH: 8
<212> TYPE: PRT
<213> ORGANISM: Homo sapiens

<400> SEQUENCE: 43

Pro Pro Lys Lys Ala Arg Glu Asp
1               5

<210> SEQ ID NO 44
<211> LENGTH: 8
<212> TYPE: PRT
<213> ORGANISM: Homo sapiens

<400> SEQUENCE: 44

Pro Gln Pro Lys Lys Lys Pro Leu
1               5

<210> SEQ ID NO 45
<211> LENGTH: 12
<212> TYPE: PRT
<213> ORGANISM: Mus sp.

<400> SEQUENCE: 45

Ser Ala Leu Ile Lys Lys Lys Lys Lys Met Ala Pro
1               5                   10

<210> SEQ ID NO 46
<211> LENGTH: 5
<212> TYPE: PRT
<213> ORGANISM: Influenza virus

<400> SEQUENCE: 46

Asp Arg Leu Arg Arg
1               5

<210> SEQ ID NO 47
<211> LENGTH: 7
<212> TYPE: PRT
<213> ORGANISM: Influenza virus

<400> SEQUENCE: 47

Pro Lys Gln Lys Lys Arg Lys
```

```
1               5

<210> SEQ ID NO 48
<211> LENGTH: 10
<212> TYPE: PRT
<213> ORGANISM: Hepatitis virus

<400> SEQUENCE: 48

Arg Lys Leu Lys Lys Lys Ile Lys Lys Leu
1               5                   10

<210> SEQ ID NO 49
<211> LENGTH: 10
<212> TYPE: PRT
<213> ORGANISM: Mus sp.

<400> SEQUENCE: 49

Arg Glu Lys Lys Lys Phe Leu Lys Arg Arg
1               5                   10

<210> SEQ ID NO 50
<211> LENGTH: 20
<212> TYPE: PRT
<213> ORGANISM: Homo sapiens

<400> SEQUENCE: 50

Lys Arg Lys Gly Asp Glu Val Asp Gly Val Asp Glu Val Ala Lys Lys
1               5                   10                  15

Lys Ser Lys Lys
            20

<210> SEQ ID NO 51
<211> LENGTH: 17
<212> TYPE: PRT
<213> ORGANISM: Homo sapiens

<400> SEQUENCE: 51

Arg Lys Cys Leu Gln Ala Gly Met Asn Leu Glu Ala Arg Lys Thr Lys
1               5                   10                  15

Lys

<210> SEQ ID NO 52
<211> LENGTH: 10
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (2)..(4)
<223> OTHER INFORMATION: X is any amino acid
<220> FEATURE:
<221> NAME/KEY: MISC_FEATURE
<222> LOCATION: (6)..(7)
<223> OTHER INFORMATION: X is any amino acid
<220> FEATURE:
<221> NAME/KEY: MISC_FEATURE
<222> LOCATION: (9)..(9)
<223> OTHER INFORMATION: X is any amino acid

<400> SEQUENCE: 52

Leu Xaa Xaa Xaa Leu Xaa Xaa Leu Xaa Leu
1               5                   10

<210> SEQ ID NO 53
<211> LENGTH: 4
```

```
<212> TYPE: PRT
<213> ORGANISM: Artificial Sequence
<220> FEATURE:
<223> OTHER INFORMATION: Synthetic

<400> SEQUENCE: 53

Lys Asp Glu Leu
1

<210> SEQ ID NO 54
<211> LENGTH: 4
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (3)..(4)
<223> OTHER INFORMATION: X is any amino acid

<400> SEQUENCE: 54

Lys Asp Xaa Xaa
1

<210> SEQ ID NO 55
<211> LENGTH: 4
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (3)..(4)
<223> OTHER INFORMATION: X is any amino acid

<400> SEQUENCE: 55

Lys Lys Xaa Xaa
1

<210> SEQ ID NO 56
<211> LENGTH: 9
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (1)..(1)
<223> OTHER INFORMATION: X is R or K
<220> FEATURE:
<221> NAME/KEY: MISC_FEATURE
<222> LOCATION: (2)..(2)
<223> OTHER INFORMATION: X is L, V, or I
<220> FEATURE:
<221> NAME/KEY: MISC_FEATURE
<222> LOCATION: (3)..(7)
<223> OTHER INFORMATION: X is any amino acid
<220> FEATURE:
<221> NAME/KEY: MISC_FEATURE
<222> LOCATION: (8)..(8)
<223> OTHER INFORMATION: X is H or Q
<220> FEATURE:
<221> NAME/KEY: MISC_FEATURE
<222> LOCATION: (9)..(9)
<223> OTHER INFORMATION: X is L, A, or F

<400> SEQUENCE: 56

Xaa Xaa Xaa Xaa Xaa Xaa Xaa Xaa Xaa
1               5

<210> SEQ ID NO 57
```

<211> LENGTH: 15
<212> TYPE: PRT
<213> ORGANISM: Artificial Sequence
<220> FEATURE:
<223> OTHER INFORMATION: Synthetic

<400> SEQUENCE: 57

Gly Gly Gly Gly Gly Gly Gly Gly Gly Gly Gly Gly Gly Gly Gly
1               5                   10                  15

<210> SEQ ID NO 58
<211> LENGTH: 15
<212> TYPE: PRT
<213> ORGANISM: Artificial Sequence
<220> FEATURE:
<223> OTHER INFORMATION: Synthetic

<400> SEQUENCE: 58

Gly Gly Gly Gly Ser Gly Gly Gly Gly Ser Gly Gly Gly Gly Ser
1               5                   10                  15

<210> SEQ ID NO 59
<211> LENGTH: 8
<212> TYPE: PRT
<213> ORGANISM: Artificial Sequence
<220> FEATURE:
<223> OTHER INFORMATION: Synthetic

<400> SEQUENCE: 59

Gly Pro Leu Gly Ile Ala Gly Gln
1               5

<210> SEQ ID NO 60
<211> LENGTH: 80
<212> TYPE: DNA
<213> ORGANISM: Artificial Sequence
<220> FEATURE:
<223> OTHER INFORMATION: Synthetic

<400> SEQUENCE: 60
aaaagcaccg actcggtgcc acttttttcaa gttgataacg gactagcctt attttaactt      60
gctatttcta gctctaaaac                                                   80

<210> SEQ ID NO 61
<211> LENGTH: 52
<212> TYPE: DNA
<213> ORGANISM: Artificial Sequence
<220> FEATURE:
<223> OTHER INFORMATION: Synthetic

<400> SEQUENCE: 61
taatacgact cactataggg atggcgctga tcaccaggtt ttagagctag aa               52

<210> SEQ ID NO 62
<211> LENGTH: 51
<212> TYPE: DNA
<213> ORGANISM: Artificial Sequence
<220> FEATURE:
<223> OTHER INFORMATION: Synthetic

<400> SEQUENCE: 62
taatacgact cactataggg aaaggaactc ggagtcgttt tagagctaga a                51

<210> SEQ ID NO 63
<211> LENGTH: 52
<212> TYPE: DNA

```
<213> ORGANISM: Artificial Sequence
<220> FEATURE:
<223> OTHER INFORMATION: Synthetic

<400> SEQUENCE: 63
taatacgact cactataggg caggatggtg agcgtcagtt ttagagctag aa        52

<210> SEQ ID NO 64
<211> LENGTH: 52
<212> TYPE: DNA
<213> ORGANISM: Artificial Sequence
<220> FEATURE:
<223> OTHER INFORMATION: Synthetic

<400> SEQUENCE: 64
taatacgact cactataggt ggtggcgttc ggtccgagtt ttagagctag aa        52

<210> SEQ ID NO 65
<211> LENGTH: 52
<212> TYPE: DNA
<213> ORGANISM: Artificial Sequence
<220> FEATURE:
<223> OTHER INFORMATION: Synthetic

<400> SEQUENCE: 65
taatacgact cactataggg cgaggcgcag tgttcaggtt ttagagctag aa        52

<210> SEQ ID NO 66
<211> LENGTH: 52
<212> TYPE: DNA
<213> ORGANISM: Artificial Sequence
<220> FEATURE:
<223> OTHER INFORMATION: Synthetic

<400> SEQUENCE: 66
taatacgact cactataggg tcgagcagct gctgcacgtt ttagagctag aa        52

<210> SEQ ID NO 67
<211> LENGTH: 20
<212> TYPE: DNA
<213> ORGANISM: Artificial Sequence
<220> FEATURE:
<223> OTHER INFORMATION: Synthetic

<400> SEQUENCE: 67
ggagatggag gacacggaag                                            20

<210> SEQ ID NO 68
<211> LENGTH: 22
<212> TYPE: DNA
<213> ORGANISM: Artificial Sequence
<220> FEATURE:
<223> OTHER INFORMATION: Synthetic

<400> SEQUENCE: 68
gagacatgaa gcagacgcaa ta                                         22

<210> SEQ ID NO 69
<211> LENGTH: 52
<212> TYPE: DNA
<213> ORGANISM: Artificial Sequence
<220> FEATURE:
<223> OTHER INFORMATION: Synthetic

<400> SEQUENCE: 69
taatacgact cactatagtg atggcgctga tcaccaggtt ttagagctag aa        52
```

<210> SEQ ID NO 70
<211> LENGTH: 52
<212> TYPE: DNA
<213> ORGANISM: Artificial Sequence
<220> FEATURE:
<223> OTHER INFORMATION: Synthetic

<400> SEQUENCE: 70
taatacgact cactatacgg gatgcagcat gcacaccgtt ttagagctag aa        52

<210> SEQ ID NO 71
<211> LENGTH: 52
<212> TYPE: DNA
<213> ORGANISM: Artificial Sequence
<220> FEATURE:
<223> OTHER INFORMATION: Synthetic

<400> SEQUENCE: 71
taatacgact cactatactt gtctgtaagc ggatgccgtt ttagagctag aa        52

<210> SEQ ID NO 72
<211> LENGTH: 80
<212> TYPE: DNA
<213> ORGANISM: Artificial Sequence
<220> FEATURE:
<223> OTHER INFORMATION: Synthetic

<400> SEQUENCE: 72
tatcgaacgc gacagaaacg gctgtgatgg cgctgatcac gccgggagca gacaagcccg        60
tcagggcgcg tcagcgggtg        80

<210> SEQ ID NO 73
<211> LENGTH: 80
<212> TYPE: DNA
<213> ORGANISM: Artificial Sequence
<220> FEATURE:
<223> OTHER INFORMATION: Synthetic

<400> SEQUENCE: 73
gcagctcccg gagacggtca cagcttgtct gtaagcggat cagcggcaac ctgaccatct        60
ctggagacgt cgtgaaaagc        80

<210> SEQ ID NO 74
<211> LENGTH: 80
<212> TYPE: DNA
<213> ORGANISM: Artificial Sequence
<220> FEATURE:
<223> OTHER INFORMATION: Synthetic

<400> SEQUENCE: 74
gaggaggtct tgcggatatg aacgtgtcgg agcaccacgg gccgggagca gacaagcccg        60
tcagggcgcg tcagcgggtg        80

<210> SEQ ID NO 75
<211> LENGTH: 80
<212> TYPE: DNA
<213> ORGANISM: Artificial Sequence
<220> FEATURE:
<223> OTHER INFORMATION: Synthetic

<400> SEQUENCE: 75
gcagctcccg gagacggtca cagcttgtct gtaagcggat gatgcagcat gcacaccgga        60
accacagcct gggcgtgcag                                                        80

<210> SEQ ID NO 76
<211> LENGTH: 20
<212> TYPE: DNA
<213> ORGANISM: Artificial Sequence
<220> FEATURE:
<223> OTHER INFORMATION: Synthetic

<400> SEQUENCE: 76
actcctctct gagacctgac                                                        20

<210> SEQ ID NO 77
<211> LENGTH: 22
<212> TYPE: DNA
<213> ORGANISM: Artificial Sequence
<220> FEATURE:
<223> OTHER INFORMATION: Synthetic

<400> SEQUENCE: 77
agttaggcta tgaagcagta gt                                                     22

<210> SEQ ID NO 78
<211> LENGTH: 22
<212> TYPE: DNA
<213> ORGANISM: Artificial Sequence
<220> FEATURE:
<223> OTHER INFORMATION: Synthetic

<400> SEQUENCE: 78
cgaaatccgt tcctttttac tg                                                     22

<210> SEQ ID NO 79
<211> LENGTH: 22
<212> TYPE: DNA
<213> ORGANISM: Artificial Sequence
<220> FEATURE:
<223> OTHER INFORMATION: Synthetic

<400> SEQUENCE: 79
ctggcctgtt cctcatgtat tt                                                     22

<210> SEQ ID NO 80
<211> LENGTH: 80
<212> TYPE: DNA
<213> ORGANISM: Artificial Sequence
<220> FEATURE:
<223> OTHER INFORMATION: Synthetic

<400> SEQUENCE: 80
aaaagcaccg actcggtgcc acttttcaa gttgataacg gactagcctt attttaactt            60
gctatttcta gctctaaaac                                                        80

<210> SEQ ID NO 81
<211> LENGTH: 52
<212> TYPE: DNA
<213> ORGANISM: Artificial Sequence
<220> FEATURE:
<223> OTHER INFORMATION: Synthetic

<400> SEQUENCE: 81
taatacgact cactataggg atggcgctga tcaccaggtt ttagagctag aa                    52

<210> SEQ ID NO 82
<211> LENGTH: 51

```
<212> TYPE: DNA
<213> ORGANISM: Artificial Sequence
<220> FEATURE:
<223> OTHER INFORMATION: Synthetic

<400> SEQUENCE: 82
taatacgact cactataggg aaaggaactc ggagtcgttt tagagctaga a            51

<210> SEQ ID NO 83
<211> LENGTH: 52
<212> TYPE: DNA
<213> ORGANISM: Artificial Sequence
<220> FEATURE:
<223> OTHER INFORMATION: Synthetic

<400> SEQUENCE: 83
taatacgact cactataggg caggatggtg agcgtcagtt ttagagctag aa           52

<210> SEQ ID NO 84
<211> LENGTH: 52
<212> TYPE: DNA
<213> ORGANISM: Artificial Sequence
<220> FEATURE:
<223> OTHER INFORMATION: Synthetic

<400> SEQUENCE: 84
taatacgact cactataggt ggtggcgttc ggtccgagtt ttagagctag aa           52

<210> SEQ ID NO 85
<211> LENGTH: 52
<212> TYPE: DNA
<213> ORGANISM: Artificial Sequence
<220> FEATURE:
<223> OTHER INFORMATION: Synthetic

<400> SEQUENCE: 85
taatacgact cactataggg cgaggcgcag tgttcaggtt ttagagctag aa           52

<210> SEQ ID NO 86
<211> LENGTH: 52
<212> TYPE: DNA
<213> ORGANISM: Artificial Sequence
<220> FEATURE:
<223> OTHER INFORMATION: Synthetic

<400> SEQUENCE: 86
taatacgact cactataggg tcgagcagct gctgcacgtt ttagagctag aa           52

<210> SEQ ID NO 87
<211> LENGTH: 20
<212> TYPE: DNA
<213> ORGANISM: Artificial Sequence
<220> FEATURE:
<223> OTHER INFORMATION: Synthetic

<400> SEQUENCE: 87
ggagatggag gacacggaag                                              20

<210> SEQ ID NO 88
<211> LENGTH: 22
<212> TYPE: DNA
<213> ORGANISM: Artificial Sequence
<220> FEATURE:
<223> OTHER INFORMATION: Synthetic

<400> SEQUENCE: 88
```
gagacatgaa gcagacgcaa ta                                           22

<210> SEQ ID NO 89
<211> LENGTH: 52
<212> TYPE: DNA
<213> ORGANISM: Artificial Sequence
<220> FEATURE:
<223> OTHER INFORMATION: Synthetic

<400> SEQUENCE: 89
taatacgact cactatagtg atggcgctga tcaccaggtt ttagagctag aa          52

<210> SEQ ID NO 90
<211> LENGTH: 52
<212> TYPE: DNA
<213> ORGANISM: Artificial Sequence
<220> FEATURE:
<223> OTHER INFORMATION: Synthetic

<400> SEQUENCE: 90
taatacgact cactatacgg gatgcagcat gcacaccgtt ttagagctag aa          52

<210> SEQ ID NO 91
<211> LENGTH: 52
<212> TYPE: DNA
<213> ORGANISM: Artificial Sequence
<220> FEATURE:
<223> OTHER INFORMATION: Synthetic

<400> SEQUENCE: 91
taatacgact cactatactt gtctgtaagc ggatgccgtt ttagagctag aa          52

<210> SEQ ID NO 92
<211> LENGTH: 80
<212> TYPE: DNA
<213> ORGANISM: Artificial Sequence
<220> FEATURE:
<223> OTHER INFORMATION: Synthetic

<400> SEQUENCE: 92
tatcgaacgc gacagaaacg gctgtgatgg cgctgatcac gccgggagca gacaagcccg  60
tcagggcgcg tcagcgggtg                                             80

<210> SEQ ID NO 93
<211> LENGTH: 80
<212> TYPE: DNA
<213> ORGANISM: Artificial Sequence
<220> FEATURE:
<223> OTHER INFORMATION: Synthetic

<400> SEQUENCE: 93
gcagctcccg gagacggtca cagcttgtct gtaagcggat cagcggcaac ctgaccatct  60
ctggagacgt cgtgaaaagc                                             80

<210> SEQ ID NO 94
<211> LENGTH: 80
<212> TYPE: DNA
<213> ORGANISM: Artificial Sequence
<220> FEATURE:
<223> OTHER INFORMATION: Synthetic

<400> SEQUENCE: 94
gaggaggtct tgcggatatg aacgtgtcgg agcaccacgg gccgggagca gacaagcccg  60
tcagggcgcg tcagcgggtg                                             80

<210> SEQ ID NO 95
<211> LENGTH: 80
<212> TYPE: DNA
<213> ORGANISM: Artificial Sequence
<220> FEATURE:
<223> OTHER INFORMATION: Synthetic

<400> SEQUENCE: 95
gcagctcccg agacggtca cagcttgtct gtaagcggat gatgcagcat gcacaccgga    60
accacagcct gggcgtgcag                                               80

<210> SEQ ID NO 96
<211> LENGTH: 20
<212> TYPE: DNA
<213> ORGANISM: Artificial Sequence
<220> FEATURE:
<223> OTHER INFORMATION: Synthetic

<400> SEQUENCE: 96
actcctctct gagacctgac                                               20

<210> SEQ ID NO 97
<211> LENGTH: 22
<212> TYPE: DNA
<213> ORGANISM: Artificial Sequence
<220> FEATURE:
<223> OTHER INFORMATION: Synthetic

<400> SEQUENCE: 97
agttaggcta tgaagcagta gt                                            22

<210> SEQ ID NO 98
<211> LENGTH: 22
<212> TYPE: DNA
<213> ORGANISM: Artificial Sequence
<220> FEATURE:
<223> OTHER INFORMATION: Synthetic

<400> SEQUENCE: 98
cgaaatccgt tcctttttac tg                                            22

<210> SEQ ID NO 99
<211> LENGTH: 22
<212> TYPE: DNA
<213> ORGANISM: Artificial Sequence
<220> FEATURE:
<223> OTHER INFORMATION: Synthetic

<400> SEQUENCE: 99
ctggcctgtt cctcatgtat tt                                            22

<210> SEQ ID NO 100
<211> LENGTH: 80
<212> TYPE: DNA
<213> ORGANISM: Artificial Sequence
<220> FEATURE:
<223> OTHER INFORMATION: Synthetic

<400> SEQUENCE: 100
aaaagcaccg actcggtgcc acttttcaa gttgataacg gactagcctt attttaactt    60
gctatttcta gctctaaaac                                               80

<210> SEQ ID NO 101

```
<211> LENGTH: 52
<212> TYPE: DNA
<213> ORGANISM: Artificial Sequence
<220> FEATURE:
<223> OTHER INFORMATION: Synthetic

<400> SEQUENCE: 101
taatacgact cactataggg atggcgctga tcaccaggtt ttagagctag aa        52

<210> SEQ ID NO 102
<211> LENGTH: 51
<212> TYPE: DNA
<213> ORGANISM: Artificial Sequence
<220> FEATURE:
<223> OTHER INFORMATION: Synthetic

<400> SEQUENCE: 102
taatacgact cactataggg aaaggaactc ggagtcgttt tagagctaga a         51

<210> SEQ ID NO 103
<211> LENGTH: 52
<212> TYPE: DNA
<213> ORGANISM: Artificial Sequence
<220> FEATURE:
<223> OTHER INFORMATION: Synthetic

<400> SEQUENCE: 103
taatacgact cactataggg caggatggtg agcgtcagtt ttagagctag aa        52

<210> SEQ ID NO 104
<211> LENGTH: 52
<212> TYPE: DNA
<213> ORGANISM: Artificial Sequence
<220> FEATURE:
<223> OTHER INFORMATION: Synthetic

<400> SEQUENCE: 104
taatacgact cactataggt ggtggcgttc ggtccgagtt ttagagctag aa        52

<210> SEQ ID NO 105
<211> LENGTH: 52
<212> TYPE: DNA
<213> ORGANISM: Artificial Sequence
<220> FEATURE:
<223> OTHER INFORMATION: Synthetic

<400> SEQUENCE: 105
taatacgact cactataggg cgaggcgcag tgttcaggtt ttagagctag aa        52

<210> SEQ ID NO 106
<211> LENGTH: 52
<212> TYPE: DNA
<213> ORGANISM: Artificial Sequence
<220> FEATURE:
<223> OTHER INFORMATION: Synthetic

<400> SEQUENCE: 106
taatacgact cactataggg tcgagcagct gctgcacgtt ttagagctag aa        52

<210> SEQ ID NO 107
<211> LENGTH: 20
<212> TYPE: DNA
<213> ORGANISM: Artificial Sequence
<220> FEATURE:
<223> OTHER INFORMATION: Synthetic

<400> SEQUENCE: 107
```
ggagatggag gacacggaag                                              20

<210> SEQ ID NO 108
<211> LENGTH: 22
<212> TYPE: DNA
<213> ORGANISM: Artificial Sequence
<220> FEATURE:
<223> OTHER INFORMATION: Synthetic

<400> SEQUENCE: 108
gagacatgaa gcagacgcaa ta                                           22

<210> SEQ ID NO 109
<211> LENGTH: 52
<212> TYPE: DNA
<213> ORGANISM: Artificial Sequence
<220> FEATURE:
<223> OTHER INFORMATION: Synthetic

<400> SEQUENCE: 109
taatacgact cactatagtg atggcgctga tcaccaggtt ttagagctag aa          52

<210> SEQ ID NO 110
<211> LENGTH: 52
<212> TYPE: DNA
<213> ORGANISM: Artificial Sequence
<220> FEATURE:
<223> OTHER INFORMATION: Synthetic

<400> SEQUENCE: 110
taatacgact cactatacgg gatgcagcat gcacaccgtt ttagagctag aa          52

<210> SEQ ID NO 111
<211> LENGTH: 52
<212> TYPE: DNA
<213> ORGANISM: Artificial Sequence
<220> FEATURE:
<223> OTHER INFORMATION: Synthetic

<400> SEQUENCE: 111
taatacgact cactatactt gtctgtaagc ggatgccgtt ttagagctag aa          52

<210> SEQ ID NO 112
<211> LENGTH: 80
<212> TYPE: DNA
<213> ORGANISM: Artificial Sequence
<220> FEATURE:
<223> OTHER INFORMATION: Synthetic

<400> SEQUENCE: 112
tatcgaacgc gacagaaacg gctgtgatgg cgctgatcac gccgggagca gacaagcccg  60
tcagggcgcg tcagcgggtg                                              80

<210> SEQ ID NO 113
<211> LENGTH: 80
<212> TYPE: DNA
<213> ORGANISM: Artificial Sequence
<220> FEATURE:
<223> OTHER INFORMATION: Synthetic

<400> SEQUENCE: 113
gcagctcccg gagacggtca cagcttgtct gtaagcggat cagcggcaac ctgaccatct  60
ctggagacgt cgtgaaaagc                                              80

```
<210> SEQ ID NO 114
<211> LENGTH: 80
<212> TYPE: DNA
<213> ORGANISM: Artificial Sequence
<220> FEATURE:
<223> OTHER INFORMATION: Synthetic

<400> SEQUENCE: 114
gaggaggtct tgcggatatg aacgtgtcgg agcaccacgg gccgggagca gacaagcccg    60
tcagggcgcg tcagcgggtg                                                80

<210> SEQ ID NO 115
<211> LENGTH: 80
<212> TYPE: DNA
<213> ORGANISM: Artificial Sequence
<220> FEATURE:
<223> OTHER INFORMATION: Synthetic

<400> SEQUENCE: 115
gcagctcccg gagacggtca cagcttgtct gtaagcggat gatgcagcat gcacaccgga    60
accacagcct gggcgtgcag                                                80

<210> SEQ ID NO 116
<211> LENGTH: 20
<212> TYPE: DNA
<213> ORGANISM: Artificial Sequence
<220> FEATURE:
<223> OTHER INFORMATION: Synthetic

<400> SEQUENCE: 116
actcctctct gagacctgac                                                20

<210> SEQ ID NO 117
<211> LENGTH: 22
<212> TYPE: DNA
<213> ORGANISM: Artificial Sequence
<220> FEATURE:
<223> OTHER INFORMATION: Synthetic

<400> SEQUENCE: 117
agttaggcta tgaagcagta gt                                             22

<210> SEQ ID NO 118
<211> LENGTH: 22
<212> TYPE: DNA
<213> ORGANISM: Artificial Sequence
<220> FEATURE:
<223> OTHER INFORMATION: Synthetic

<400> SEQUENCE: 118
cgaaatccgt tcctttttac tg                                             22

<210> SEQ ID NO 119
<211> LENGTH: 22
<212> TYPE: DNA
<213> ORGANISM: Artificial Sequence
<220> FEATURE:
<223> OTHER INFORMATION: Synthetic

<400> SEQUENCE: 119
ctggcctgtt cctcatgtat tt                                             22
```